US012695613B2

(12) United States Patent
Yoshimi et al.

(10) Patent No.: US 12,695,613 B2
(45) Date of Patent: Jul. 28, 2026

(54) DATA COMMUNICATION SYSTEM, CENTER DEVICE, MASTER DEVICE, STORAGE MEDIUM STORING ENCRYPTION PROGRAM, AND STORAGE MEDIUM STORING DECRYPTION PROGRAM

(71) Applicant: DENSO CORPORATION, Kariya-city (JP)

(72) Inventors: Hideo Yoshimi, Kariya-city (JP); Masaaki Abe, Kariya-city (JP); Koto Tomatsu, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 64 days.

(21) Appl. No.: 18/618,840

(22) Filed: Mar. 27, 2024

(65) Prior Publication Data

US 2024/0267221 A1     Aug. 8, 2024

Related U.S. Application Data

(63) Continuation of application No. PCT/JP2022/024875, filed on Jun. 22, 2022.

(30) Foreign Application Priority Data

Sep. 30, 2021    (JP) ................................ 2021-161212

(51) Int. Cl.
| | |
|---|---|
| *H04L 9/30* | (2006.01) |
| *H04L 9/06* | (2006.01) |
| *H04L 9/08* | (2006.01) |

(52) U.S. Cl.
CPC ............ H04L 9/302 (2013.01); H04L 9/0631 (2013.01); H04L 9/0637 (2013.01); H04L 9/0825 (2013.01)

(58) Field of Classification Search
CPC ..... H04L 9/302; H04L 9/0631; H04L 9/0637; H04L 9/0825; H04L 2209/84; H04L 9/08;
(Continued)

(56) References Cited

U.S. PATENT DOCUMENTS

| | | | | |
|---|---|---|---|---|
| 10,009,325 | B1 * | 6/2018 | David | ........................ H04L 9/16 |
| 2015/0180840 | A1 * | 6/2015 | Jung | ..................... H04L 9/3247 |
| | | | | 713/150 |

(Continued)

FOREIGN PATENT DOCUMENTS

| | | |
|---|---|---|
| JP | 2014088062 A | 5/2014 |
| JP | 2020027624 A | 2/2020 |

(Continued)

OTHER PUBLICATIONS

U.S. Appl. No. 18/617,974, filed Mar. 27, 2024, Hideo Yoshimi et. al.

(Continued)

*Primary Examiner* — Mohammed Waliullah
(74) *Attorney, Agent, or Firm* — Harness, Dickey & Pierce, P.L.C.

(57) ABSTRACT

A data communication system includes a center device that distributes update data to a master device, and a master device that installs the update data downloaded from the center device in an electronic control unit to be reprogrammed. The center device generates a common key for encrypting the update data; encrypts the update data with the common key; encrypts the common key; stores the common key encrypted in a campaign notification; places the update data encrypted with the common key in a content delivery network (CDN); and transmits the campaign notification. The master device acquires the common key from the campaign notification; decrypts the encrypted common key to extract the common key; downloads and acquires (Continued)

encrypted update data from the CDN; performs an exclusive OR operation; and transfers the decrypted update data to the electronic control unit, and installs the update data in the electronic control unit.

23 Claims, 224 Drawing Sheets

(58) Field of Classification Search
CPC ....... H04L 9/0822; H04L 9/0891; H04L 9/14; H04L 9/3242; H04L 67/10; B60R 16/02; G06F 8/65; G09C 1/00
See application file for complete search history.

(56) References Cited

U.S. PATENT DOCUMENTS

| | | | |
|---|---|---|---|
| 2019/0281052 A1* | 9/2019 | Lekkas | ..................... H04L 9/14 |
| 2020/0145188 A1* | 5/2020 | Ghosh | ................. H04W 12/033 |
| 2020/0267547 A1 | 8/2020 | Tal et al. | |

| | | | |
|---|---|---|---|
| 2020/0389289 A1 | 12/2020 | Khanna | |
| 2021/0157568 A1 | 5/2021 | Sakurai et al. | |
| 2021/0165916 A1* | 6/2021 | Abhyankar | ........... H04L 9/0637 |

FOREIGN PATENT DOCUMENTS

| | | | |
|---|---|---|---|
| JP | 2021072047 A | 5/2021 |
| WO | WO-2015034020 A1 | 3/2015 |

OTHER PUBLICATIONS

U.S. Appl. No. 18/618,188, filed Mar. 27, 2024, Hideo Yoshimi et. al.

U.S. Appl. No. 18/444,812, filed Feb. 19, 2024, Reiichiro Imoto et. al.

Seiichiro Mizoguchi et. al., "Implementation of Secure Remote Re-Programming Schemes", Computer Security Symposium 2016, Oct. 4, 2016, pp. 379-383.

Keisuke Hakuta et. al., "Current status and issues of control system security, Towards the realization of encrypted communication functions for control controllers", measurement and control, Oct. 2014, vol. 53, No. 10, pp. 936-942.

* cited by examiner

ENCRYPTION PROCESS IN CTR MODE

Counter (CTR) mode encryption

DECRYPTION PROCESS IN CTR MODE

Counter (CTR) mode decryption

FIG. 5

| | NAME | ADVANTAGES | DISADVANTAGES | RECOMMENDATION |
|---|---|---|---|---|
| CBC MODE | Cipher Block Chaining CIPHER BLOCK CHAINING MODE | · REPEATED PLAINTEXT IS NOT REFLECTED IN CIPHERTEXT, AND HIGH-SECURITY | · WHEN CIPHERTEXT HAVING ERROR IN UNITS OF BITS IS DECRYPTED, ENTIRE ONE BLOCK AND NEXT CORRESPONDING BIT BECOME ERROR (ERROR SPREADS). · IT IS POSSIBLE TO PERFORM PREPARATION FOR ENCRYPTION AND DECRYPTION · IT IS NOT POSSIBLE TO PERFORM PARALLEL PROCESS OF ENCRYPTION | CRYPTOREC RECOMMENDED ENCRYPTION |
| CTR MODE | Counter COUNTER MODE | · IT IS POSSIBLE TO PERFORM PREPARATION FOR ENCRYPTION AND DECRYPTION IS POSSIBLE, SO THAT HIGH SPEED IS POSSIBLE · IT IS POSSIBLE TO PERFORM A PARALLEL PROCESS OF ENCRYPTION AND DECRYPTION · DECRYPTING CIPHERTEXT WITH A BITWISE ERROR FALLS WITHIN ERROR OF ONLY CORRESPONDING BIT OF PLAINTEXT | · WHEN ACTIVE ATTACKER BIT-INVERTS CIPHER BLOCK, CORRESPONDING PLAINTEXT BLOCK IS BIT-INVERTED. | CRYPTOREC RECOMMENDED ENCRYPTION |

SINCE INPUT IS CIPHERTEXT, DECRYPTION PROCESS CANNOT BE STARTED UNLESS UPDATE PACKAGE THAT IS CIPHERTEXT IS RECEIVED.

Cipher Block Chaining (CBC) mode decryption

FIG. 8

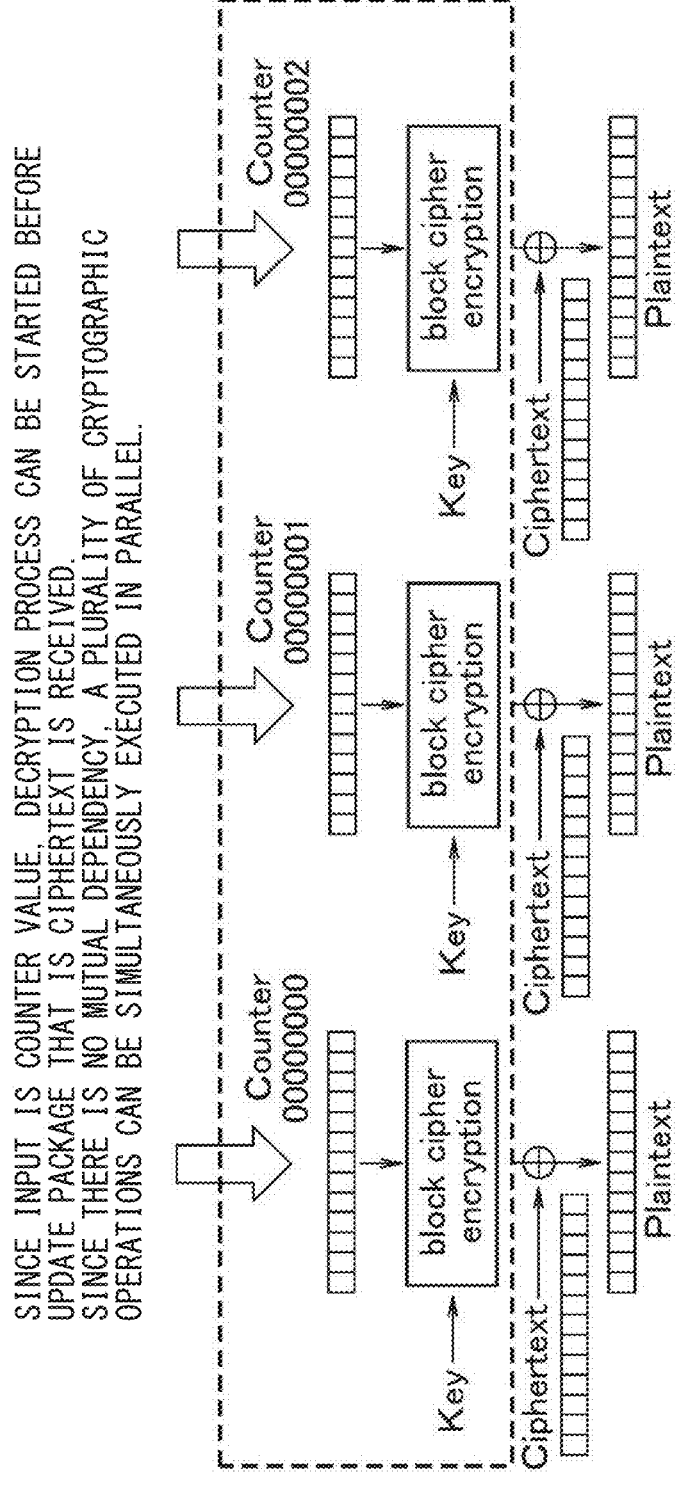

SINCE INPUT IS COUNTER VALUE, DECRYPTION PROCESS CAN BE STARTED BEFORE UPDATE PACKAGE THAT IS CIPHERTEXT IS RECEIVED.
SINCE THERE IS NO MUTUAL DEPENDENCY, A PLURALITY OF CRYPTOGRAPHIC OPERATIONS CAN BE SIMULTANEOUSLY EXECUTED IN PARALLEL.

Counter
00000000

Counter
00000001

Counter
00000002 block cipher encryption block cipher encryption block cipher encryption

Key

Key

Key

Ciphertext

Ciphertext

Ciphertext

Plaintext

Plaintext

Plaintext

Counter (CTR) mode decryption (ENCRYPTION PROCESS OF UPDATE PKG)

START

A011 — GENERATE AES KEY FOR ENCRYPTING UPDATE PKG

A012 — ENCRYPT UPDATE PKG WITH AES KEY IN CTR MODE

TO 01-1

AES KEY (Key_AES)

UPDATE PKG (PKG)

ENC

AES ENCRYPTION PKG (AES_CTR_Encrypted_PKG)

FIG. 11

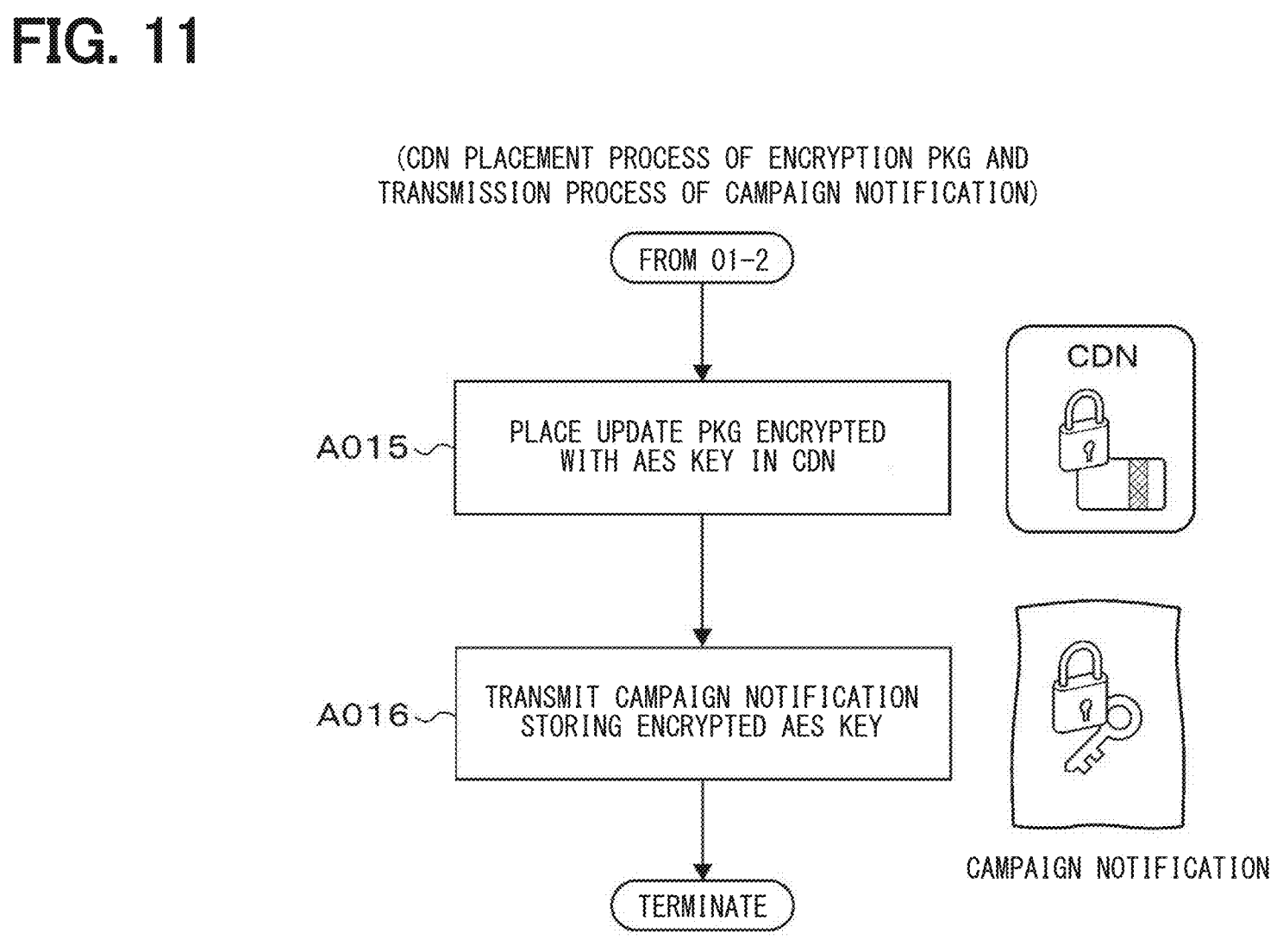

(CDN PLACEMENT PROCESS OF ENCRYPTION PKG AND
TRANSMISSION PROCESS OF CAMPAIGN NOTIFICATION)

CDN

CAMPAIGN NOTIFICATION

FROM 01-2

A0015  PLACE UPDATE PKG ENCRYPTED
WITH AES KEY IN CDN

A0016  TRANSMIT CAMPAIGN NOTIFICATION
STORING ENCRYPTED AES KEY

TERMINATE (INSTALL PROCESS OF UPDATE PKG)

FROM 01-4

B016 TRANSFER DECRYPTED UPDATE PKG TO TARGET ECU, AND INSTALL UPDATE PKG IN TARGET ECU

TERMINATE

BY ENCRYPTING AND DECRYPTING DIFFERENCE PROGRAM IN UPDATE PACKAGE IN CTR MODE INSTEAD OF ENCRYPTING AND DECRYPTING DIFFERENCE PROGRAM IN CBC MODE, THROUGHPUT OF DECRYPTION PROCESS IN TARGET ECU CAN BE IMPROVED BY ABOUT 40%.

ENCRYPTION PROCESS IN OFB MODE

Output Feedback (OFB) mode encryption

DECRYPTION PROCESS IN OFB MODE

Output Feedback (OFB) mode decryption

FIG. 17

| | NAME | ADVANTAGES | DISADVANTAGES | RECOMMENDATION |
|---|---|---|---|---|
| CBC MODE | Cipher Block Chaining CIPHER BLOCK CHAINING MODE | • REPEATED PLAINTEXT IS NOT REFLECTED IN CIPHERTEXT, AND HIGH-SECURITY | • WHEN CIPHERTEXT HAVING ERROR IN UNITS OF BITS IS DECRYPTED, ENTIRE ONE BLOCK AND NEXT CORRESPONDING BIT BECOME ERROR (ERROR SPREADS). <br> • IT IS POSSIBLE TO PERFORM PREPARATION FOR ENCRYPTION AND DECRYPTION <br> • IT IS NOT POSSIBLE TO PERFORM PARALLEL PROCESS OF ENCRYPTION | CRYPTOREC RECOMMENDED ENCRYPTION |
| OFB MODE | Output Feedback OUTPUT FEEDBACK MODE | • IT IS POSSIBLE TO PERFORM PREPARATION FOR ENCRYPTION AND DECRYPTION IS POSSIBLE, SO THAT HIGH SPEED IS POSSIBLE <br> • DECRYPTING CIPHERTEXT WITH A BITWISE ERROR FALLS WITHIN ERROR OF ONLY CORRESPONDING BIT OF PLAINTEXT | • WHEN ACTIVE ATTACKER BIT-INVERTS CIPHER BLOCK, CORRESPONDING PLAINTEXT BLOCK IS BIT-INVERTED. <br> • IT IS NOT POSSIBLE TO PERFORM PARALLEL PROCESS (BOTH ENCRYPTION AND DECRYPTION) | CRYPTOREC RECOMMENDED ENCRYPTION |

FIG. 19
SINCE INPUT IS COUNTER VALUE, DECRYPTION PROCESS CAN BE STARTED BEFORE UPDATE PACKAGE THAT IS CIPHERTEXT IS RECEIVED.
SINCE THERE IS NO MUTUAL DEPENDENCY, A PLURALITY OF CRYPTOGRAPHIC OPERATIONS CAN BE SIMULTANEOUSLY EXECUTED IN PARALLEL.
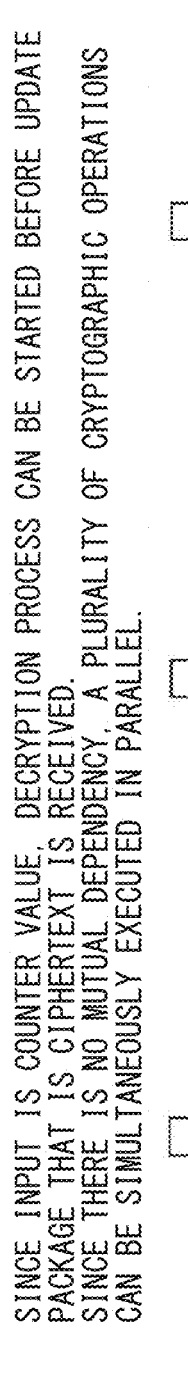
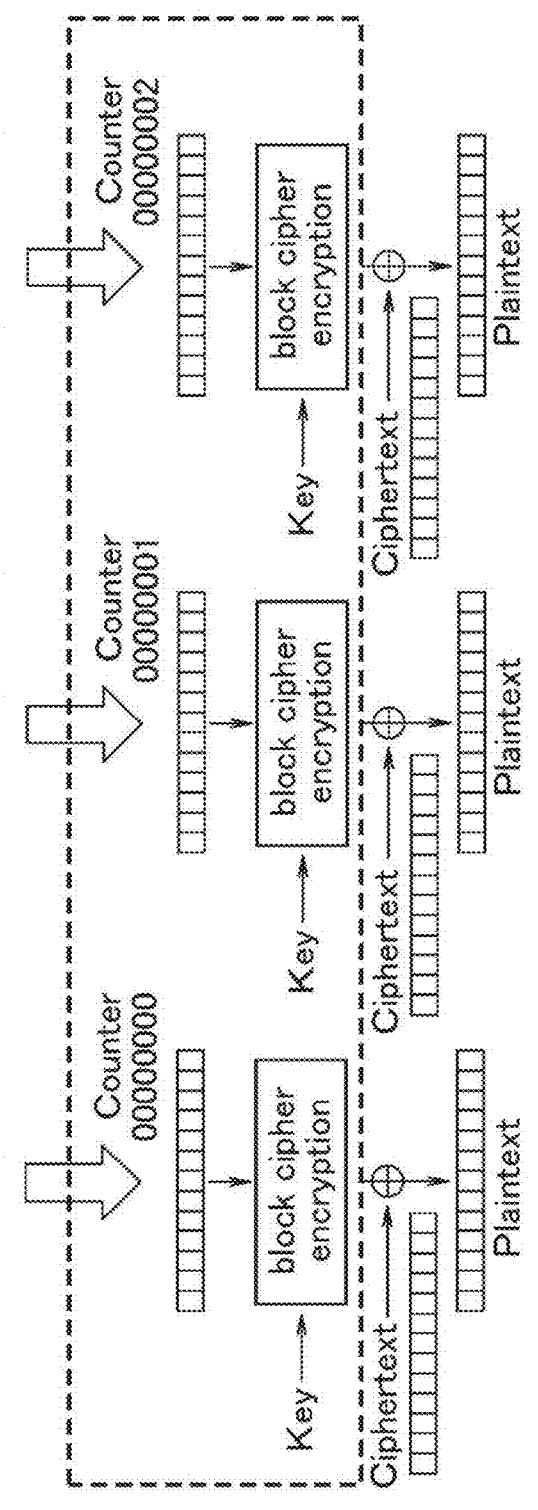
Counter (CTR) mode decryption BECAUSE OF MUTUAL DEPENDENCY, A PLURALITY OF CRYPTOGRAPHIC OPERATIONS CANNOT BE EXECUTED SIMULTANEOUSLY IN PARALLEL.

Output Feedback (OFB) mode decryption (ENCRYPTION PROCESS OF UPDATE PKG)

START

AO21 — GENERATE AES KEY FOR ENCRYPTING UPDATE PKG

AO22 — ENCRYPT UPDATE PKG WITH AES KEY IN OFB MODE

TO O2-1

AES KEY (Key_AES)

UPDATE PKG (PKG)

ENC

AES ENCRYPTION PKG (AES_OFB_Encrypted_PKG)

(INSTALL PROCESS OF UPDATE PKG)

FROM 02-4

B026 — TRANSFER DECRYPTED UPDATE PKG TO TARGET ECU, AND INSTALL UPDATE PKG IN TARGET ECU

TERMINATE

BY ENCRYPTING AND DECRYPTING DIFFERENCE PROGRAM IN UPDATE PACKAGE IN OFB MODE INSTEAD OF ENCRYPTING AND DECRYPTING DIFFERENCE PROGRAM IN CBC MODE, THROUGHPUT OF DECRYPTION PROCESS IN TARGET ECU CAN BE IMPROVED BY ABOUT 25%.

(CDN PLACEMENT PROCESS OF ENCRYPTION PKG AND TRANSMISSION PROCESS OF CAMPAIGN NOTIFICATION)

FROM 03-2

A035 — PLACE UPDATE PKG ENCRYPTED WITH AES KEY IN CDN

A036 — TRANSMIT CAMPAIGN NOTIFICATION STORING ENCRYPTED AES KEY AFTER ESTABLISHING TLS COMMUNICATION

TERMINATE

CDN

CAMPAIGN NOTIFICATION

FIG. 37

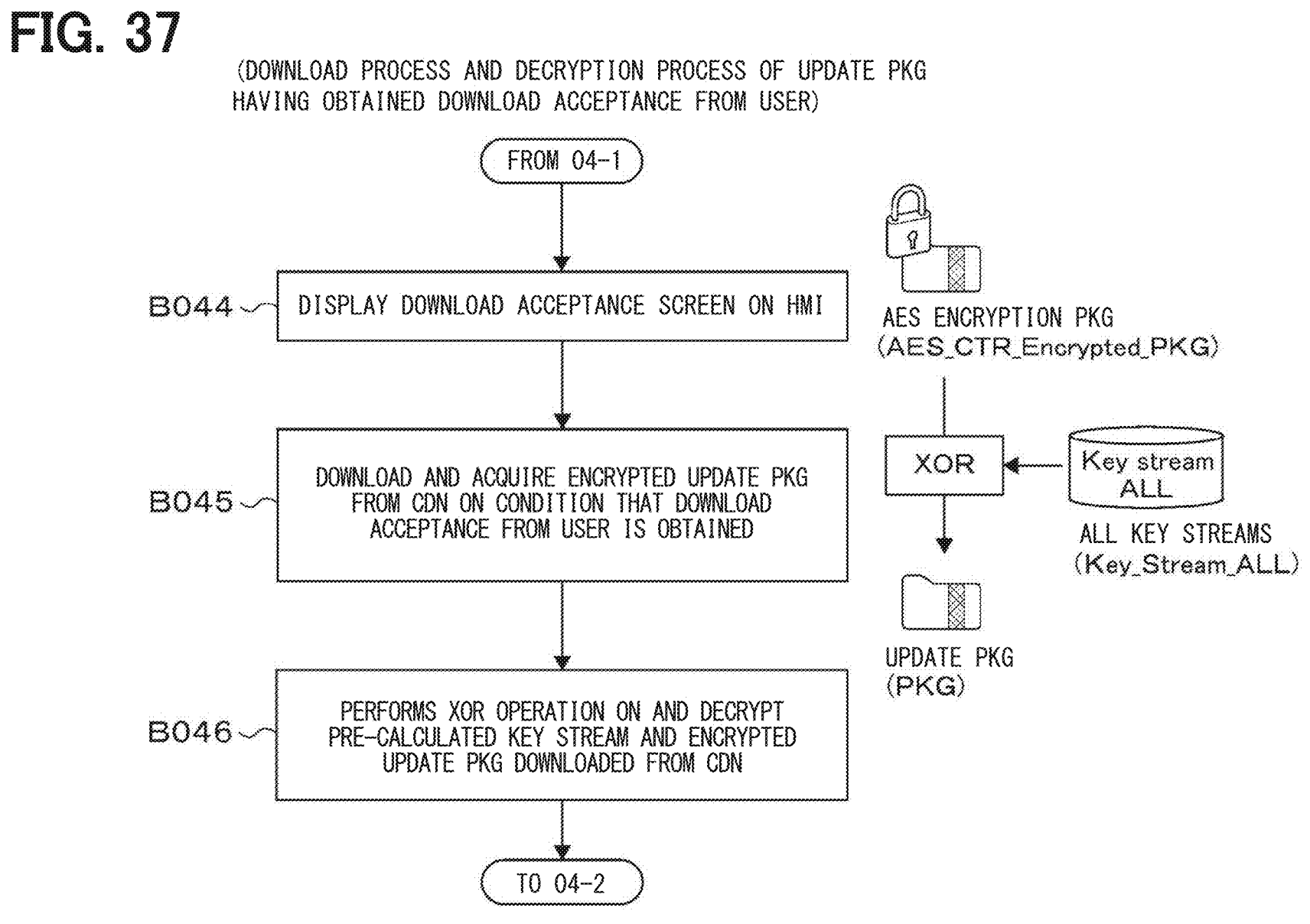

(DOWNLOAD PROCESS AND DECRYPTION PROCESS OF UPDATE PKG HAVING OBTAINED DOWNLOAD ACCEPTANCE FROM USER)

AES ENCRYPTION PKG (AES_CTR_Encrypted_PKG)

Key stream ALL

ALL KEY STREAMS (Key_Stream_ALL)

XOR

UPDATE PKG (PKG)

FROM 04-1

B044 — DISPLAY DOWNLOAD ACCEPTANCE SCREEN ON HMI

B045 — DOWNLOAD AND ACQUIRE ENCRYPTED UPDATE PKG FROM CDN ON CONDITION THAT DOWNLOAD ACCEPTANCE FROM USER IS OBTAINED

B046 — PERFORMS XOR OPERATION ON AND DECRYPT PRE-CALCULATED KEY STREAM AND ENCRYPTED UPDATE PKG DOWNLOADED FROM CDN

TO 04-2

(INSTALL PROCESS OF UPDATE PKG)

FROM 04-2

B047 — TRANSFER DECRYPTED UPDATE PKG TO TARGET ECU, AND INSTALL UPDATE PKG IN TARGET ECU

TERMINATE

FIG. 39

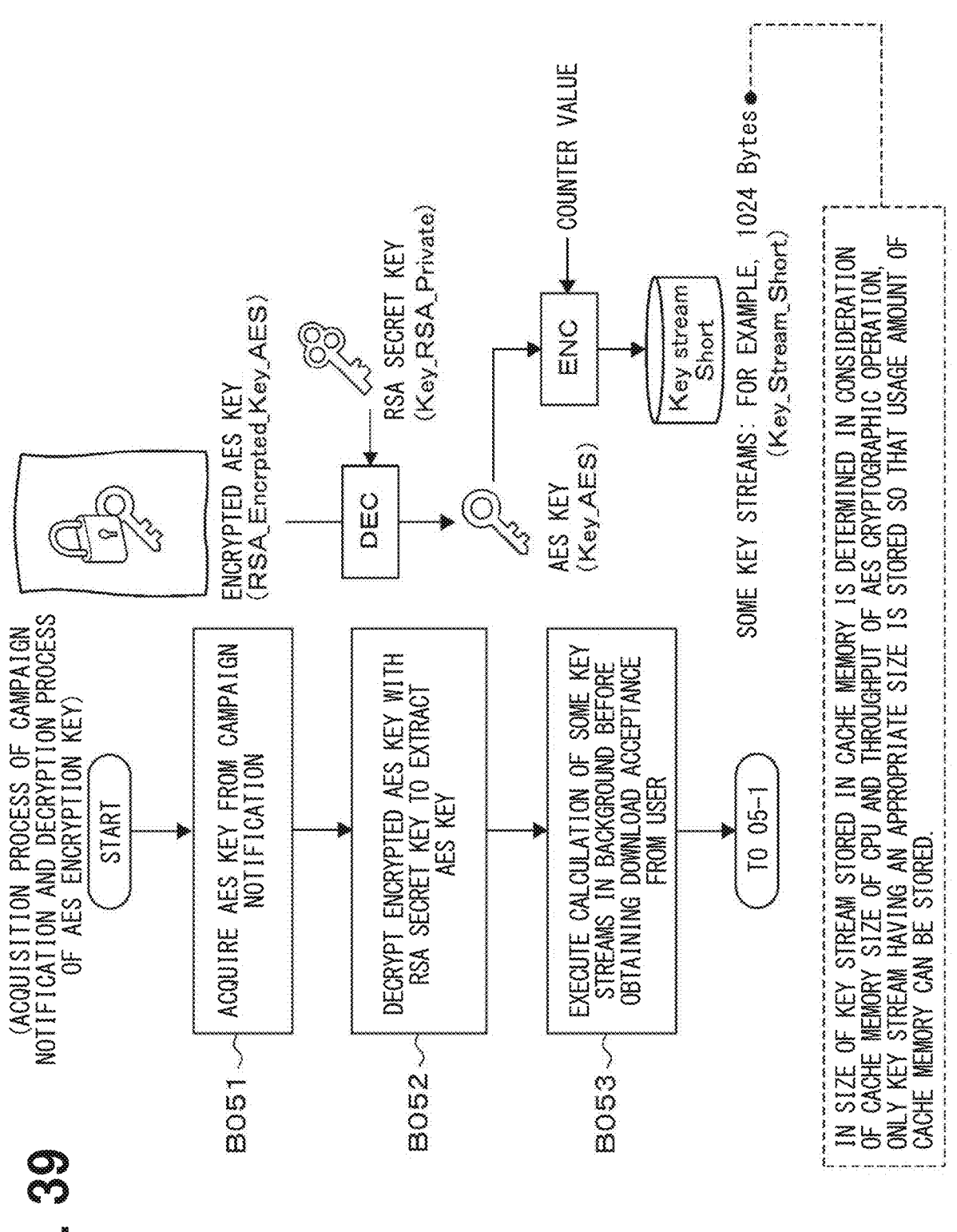

(ACQUISITION PROCESS OF CAMPAIGN NOTIFICATION AND DECRYPTION PROCESS OF AES ENCRYPTION KEY)

START

B051 — ACQUIRE AES KEY FROM CAMPAIGN NOTIFICATION

B052 — DECRYPT ENCRYPTED AES KEY WITH RSA SECRET KEY TO EXTRACT AES KEY

B053 — EXECUTE CALCULATION OF SOME KEY STREAMS IN BACKGROUND BEFORE OBTAINING DOWNLOAD ACCEPTANCE FROM USER

TO 05-1

ENCRYPTED AES KEY (RSA_Encrpted_Key_AES)

RSA SECRET KEY (Key_RSA_Private)

DEC

AES KEY (Key_AES)

ENC

COUNTER VALUE

Key stream Short

SOME KEY STREAMS: FOR EXAMPLE, 1024 Bytes (Key_Stream_Short)

IN SIZE OF KEY STREAM STORED IN CACHE MEMORY IS DETERMINED IN CONSIDERATION OF CACHE MEMORY SIZE OF CPU AND THROUGHPUT OF AES CRYPTOGRAPHIC OPERATION, ONLY KEY STREAM HAVING AN APPROPRIATE SIZE IS STORED SO THAT USAGE AMOUNT OF CACHE MEMORY CAN BE STORED.

FIG. 46

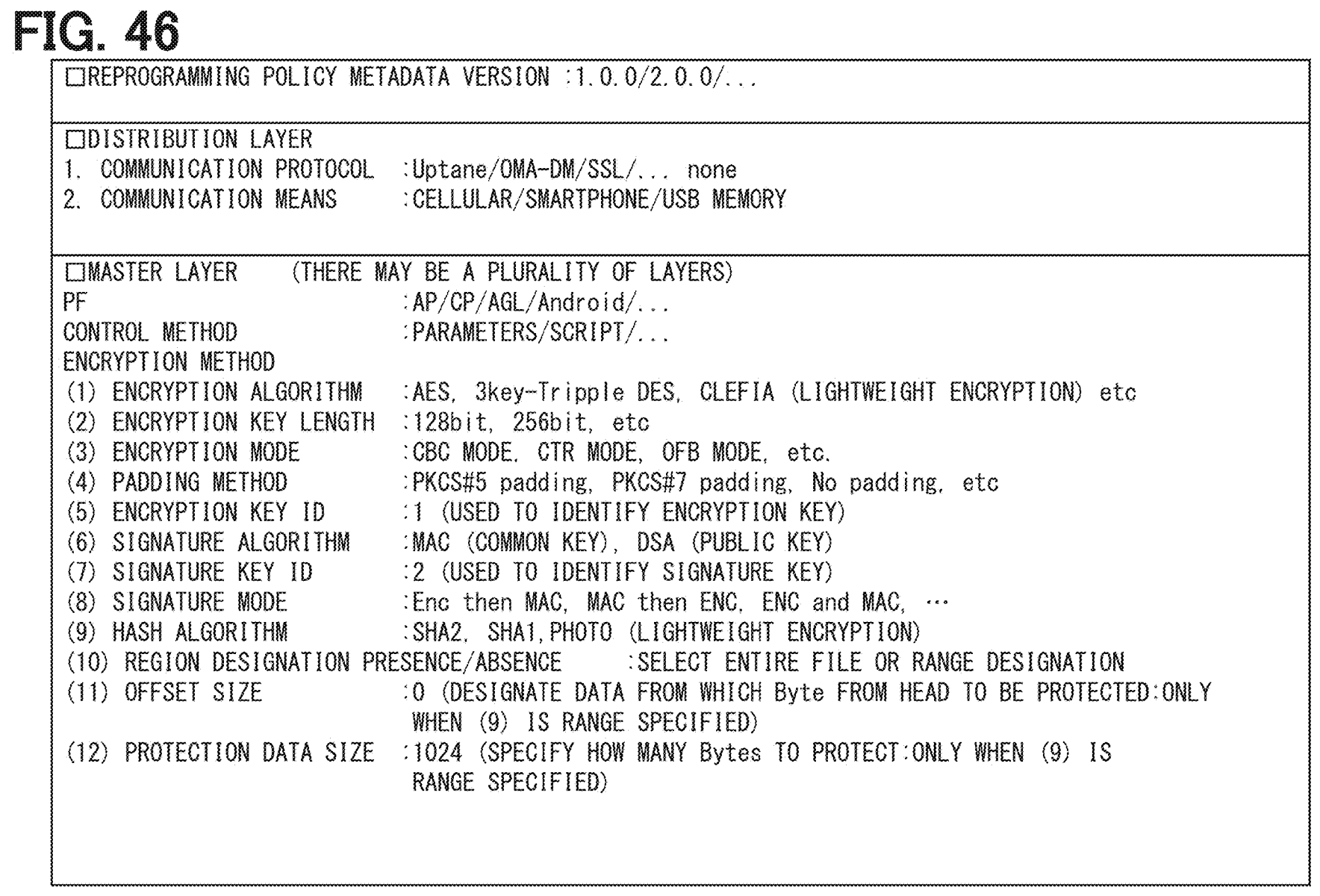

☐REPROGRAMMING POLICY METADATA VERSION :1.0.0/2.0.0/...

☐DISTRIBUTION LAYER
1. COMMUNICATION PROTOCOL    :Uptane/OMA-DM/SSL/... none
2. COMMUNICATION MEANS      :CELLULAR/SMARTPHONE/USB MEMORY ☐MASTER LAYER      (THERE MAY BE A PLURALITY OF LAYERS)
PF               :AP/CP/AGL/Android/...
CONTROL METHOD         :PARAMETERS/SCRIPT/...
ENCRYPTION METHOD
(1) ENCRYPTION ALGORITHM    :AES, 3key-Tripple DES, CLEFIA (LIGHTWEIGHT ENCRYPTION) etc
(2) ENCRYPTION KEY LENGTH   :128bit, 256bit, etc
(3) ENCRYPTION MODE        :CBC MODE. CTR MODE, OFB MODE, etc.
(4) PADDING METHOD         :PKCS#5 padding, PKCS#7 padding, No padding, etc
(5) ENCRYPTION KEY ID      :1 (USED TO IDENTIFY ENCRYPTION KEY)
(6) SIGNATURE ALGORITHM    :MAC (COMMON KEY), DSA (PUBLIC KEY)
(7) SIGNATURE KEY ID       :2 (USED TO IDENTIFY SIGNATURE KEY)
(8) SIGNATURE MODE         :Enc then MAC, MAC then ENC, ENC and MAC, ...
(9) HASH ALGORITHM         :SHA2, SHA1, PHOTO (LIGHTWEIGHT ENCRYPTION)
(10) REGION DESIGNATION PRESENCE/ABSENCE    :SELECT ENTIRE FILE OR RANGE DESIGNATION
(11) OFFSET SIZE           :0 (DESIGNATE DATA FROM WHICH Byte FROM HEAD TO BE PROTECTED·ONLY WHEN (9) IS RANGE SPECIFIED)
(12) PROTECTION DATA SIZE   :1024 (SPECIFY HOW MANY Bytes TO PROTECT·ONLY WHEN (9) IS RANGE SPECIFIED)

FIG. 47

```
□TARGET LAYER    (THERE MAY BE A PLURALITY OF LAYERS)
PF                        :AP/CP/AGL/Android/...
TRANSFER METHOD           :STORAGE METHOD/STREAMING METHOD/...
CONTROL METHOD            :PARAMETERS/SCRIPT /...
Target ID                 :(OPTIONAL)
ENCRYPTION METHOD
(1) ENCRYPTION ALGORITHM  :AES, 3key-Tripple DES, CLEFIA (LIGHTWEIGHT ENCRYPTION), etc
(2) ENCRYPTION KEY LENGTH :128bit, 256bit, etc
(3) ENCRYPTION MODE       :CBC MODE, CTR MODE, OFB MODE, etc
(4) PADDING METHOD        :PKCS#5 padding, PKCS#7 padding, No padding, etc
(5) ENCRYPTION KEY ID     :1 (USED TO IDENTIFY ENCRYPTION KEY)
(6) SIGNATURE ALGORITHM   :MAC (COMMON KEY), DSA (PUBLIC KEY)
(7) SIGNATURE KEY ID      :2 (USED TO IDENTIFY SIGNATURE KEY)
(8) SIGNATURE MODE        :Enc then MAC, MAC then ENC, ENC and MAC, ...
(9) HASH ALGORITHM        :SHA2, SHA1, PHOTO (LIGHTWEIGHT ENCRYPTION)
(10) REGION DESIGNATION PRESENCE/ABSENCE    :SELECT ENTIRE FILE OR RANGE DESIGNATION
(11) OFFSET SIZE          :0 (DESIGNATE DATA FROM WHICH Byte FROM HEAD TO BE PROTECTED:ONLY
                           WHEN (9) IS RANGE SPECIFIED)
(12) PROTECTION DATA SIZE :1024 (SPECIFY HOW MANY Bytes TO PROTECT:ONLY WHEN (9) IS RANGE
                           SPECIFIED)
```

(RP METADATA GENERATION PROCESS AND ENCRYPTION PROCESS)

FIG. 51

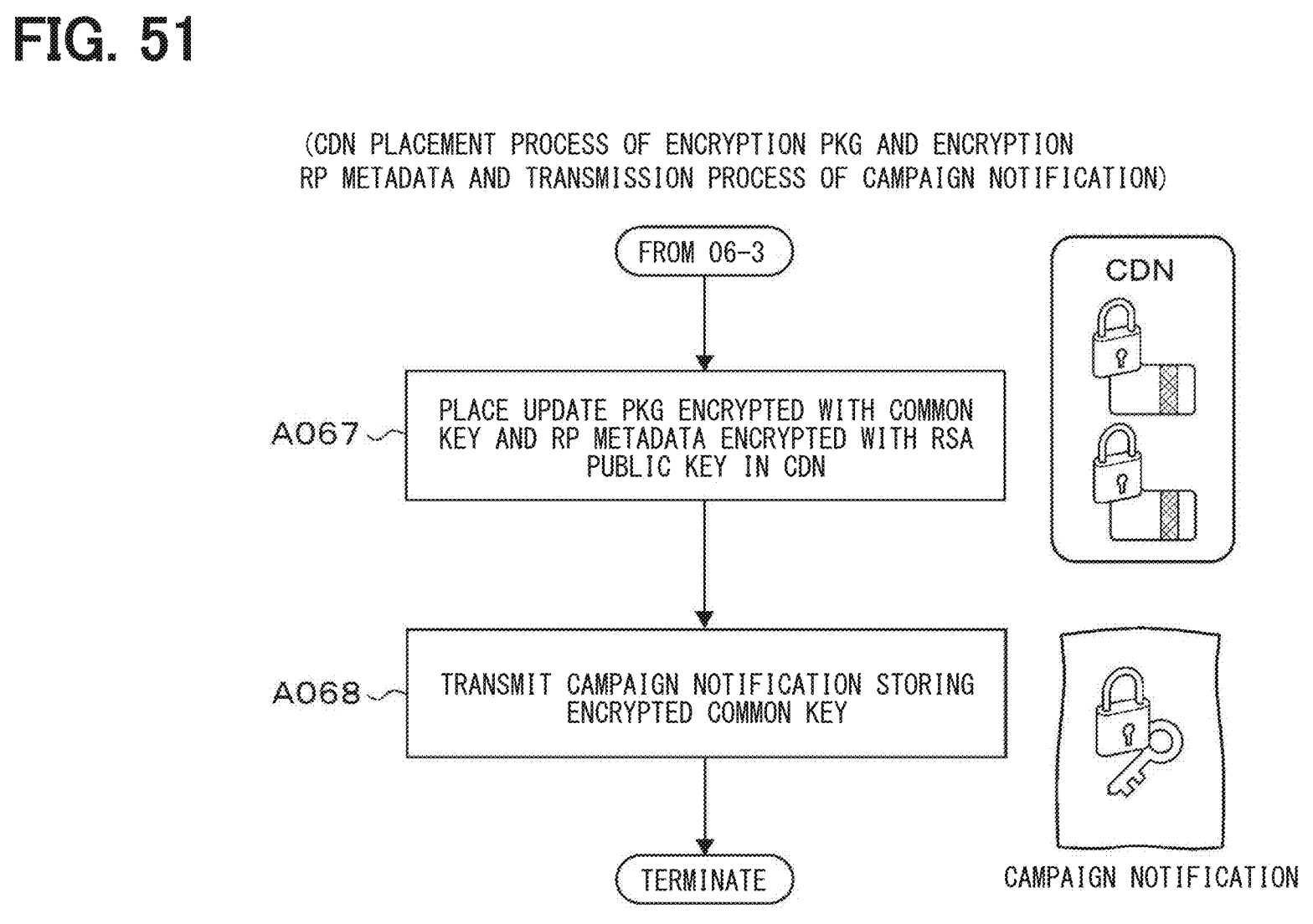

(CDN PLACEMENT PROCESS OF ENCRYPTION PKG AND ENCRYPTION RP METADATA AND TRANSMISSION PROCESS OF CAMPAIGN NOTIFICATION)

CDN

CAMPAIGN NOTIFICATION

FROM 06-3

A067 — PLACE UPDATE PKG ENCRYPTED WITH COMMON KEY AND RP METADATA ENCRYPTED WITH RSA PUBLIC KEY IN CDN

A068 — TRANSMIT CAMPAIGN NOTIFICATION STORING ENCRYPTED COMMON KEY

TERMINATE

FIG. 52

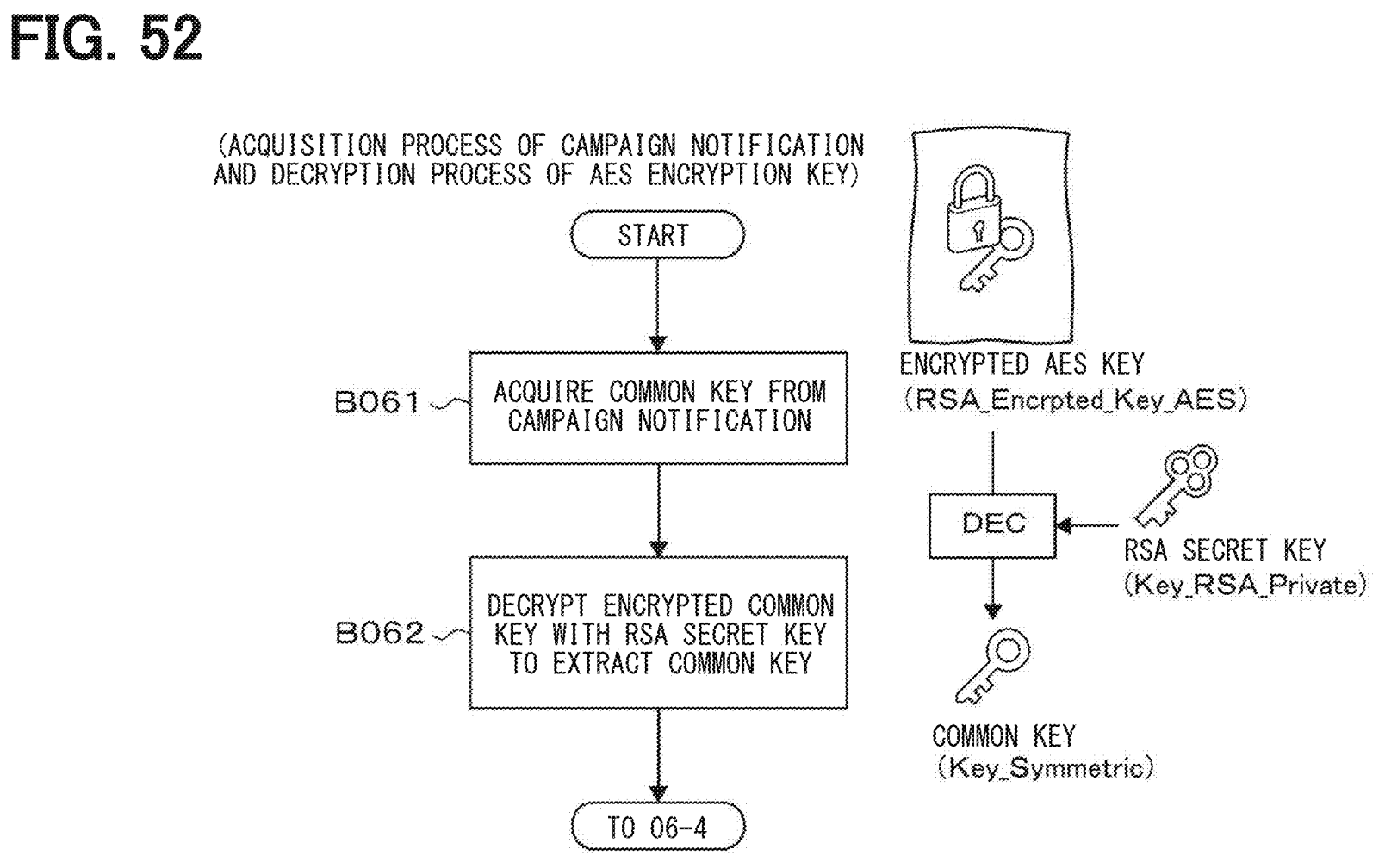

(ACQUISITION PROCESS OF CAMPAIGN NOTIFICATION
AND DECRYPTION PROCESS OF AES ENCRYPTION KEY)

START

B061 — ACQUIRE COMMON KEY FROM CAMPAIGN NOTIFICATION

B062 — DECRYPT ENCRYPTED COMMON KEY WITH RSA SECRET KEY TO EXTRACT COMMON KEY

TO 06-4

ENCRYPTED AES KEY
(RSA_Encrpted_Key_AES)

RSA SECRET KEY
(Key_RSA_Private)

DEC

COMMON KEY
(Key_Symmetric)

(DECRYPTION PROCESS OF ENCRYPTION RP METADATA)

FROM 06-4

B063 — DOWNLOAD AND ACQUIRE ENCRYPTED RP METADATA FROM CDN

B064 — DECRYPT ENCRYPTED RP METADATA USING RSA SECRET KEY TO EXTRACT RP METADATA

TO 06-5

ENCRYPTED RP METADATA (RSA_Encrpted_Repro_Meta_PKG)

RSA PUBLIC KEY (Key_RSA_Public)

DEC

RP METADATA (Repro_Meta_PKG)

ESTIMATION OF THROUGHPUT IN CCMP MODE

AES DECRYPTION IS NEGLIGIBLE BECAUSE OF CTR MODE (A FEW + us ORDER)

| | MAIN CORE | HW ACCELERATOR |
|---|---|---|
| RECEPTION (DECRYPTION + MAC OPERATION PROCESS) | 613 [μs] | 0.6 [ms] (AES DECRYPTION ≈ 0 ms + CBC-MAC 0.6 ms) |

CALCULATE THROUGHPUT HERE BECAUSE PROCESSING TIME OF HW ACCELERATOR IS DOMINANT COMPARED TO THAT IN MAIN CORE

AMOUNT OF DATA: 15,796 [Byte]

PROCESSING TIME OF ETHERNET FRAME 1518 × 11 = 16,698 [Byte] is 613 [us] + 0.6 [ms] = 1.2 [ms].

->DATA THROUGHPUT: 15,796 [B] × 8 [bit/B] ÷ (1.2/1000) [s] ≈ 105 [Mbps]

AES CBC-HMAC SHA2 DECRYPTION/SIGNATURE VERIFICATION

FIG. 59

ESTIMATE THROUGHPUT ACCORDING TO CONVENTIONAL METHOD

| | MAIN CORE | HW ACCELERATOR |
|---|---|---|
| RECEPTION (DECRYPTION + MAC OPERATION PROCESS) | 613 [μs] | 2.2 [ms] (= AES DECRYPTION 0.6 ms + HMAC 1.6 ms) |

CALCULATE THROUGHPUT HERE BECAUSE PROCESSING TIME OF HW ACCELERATOR IS DOMINANT COMPARED TO THAT IN MAIN CORE

AMOUNT OF DATA: 15,796 [Byte]

PROCESSING TIME OF ETHERNET FRAME 1518 × 11 = 16,698 [Byte] is 613 [us] + 2.2 [ms] = 2.8 [ms].

->Data THROUGHPUT: 15,796 [B] × 8 [bit/B] ÷ (2.8/1000) [s] ≈ 45 [Mbps]

(ENCRYPTION PROCESS OF UPDATE PKG)

START

A071 — GENERATE AES KEY FOR ENCRYPTING UPDATE PKG AND MAC KEY FOR PREVENTING TAMPERING OF UPDATE PKG

A072 — ENCRYPT UPDATE PKG WITH AES KEY AND MAC KEY IN CCMP MODE, AND ASSIGN MAC

TO 07-1

MAC KEY (Key_MAC)

AES KEY (Key_AES)

UPDATE PKG (PKG)

CCMP ENC

CCMP ENCRYPTION PKG (AES_CCMP_Encrypted_PKG)

(CDN PLACEMENT PROCESS OF COMP-ENCRYPTION PKG
AND TRANSMISSION PROCESS OF CAMPAIGN NOTIFICATION)

FROM 07-2

A075 — PLACE UPDATE PKG ENCRYPTED WITH AES KEY AND MAC KEY IN CDN

A076 — TRANSMIT CAMPAIGN NOTIFICATION STORING ENCRYPTED AES KEY AND MAC KEY

TERMINATE

CDN

CAMPAIGN NOTIFICATION (ACQUISITION PROCESS OF CAMPAIGN NOTIFICATION AND DECRYPTION PROCESS OF AES ENCRYPTION KEY)

FIG. 70

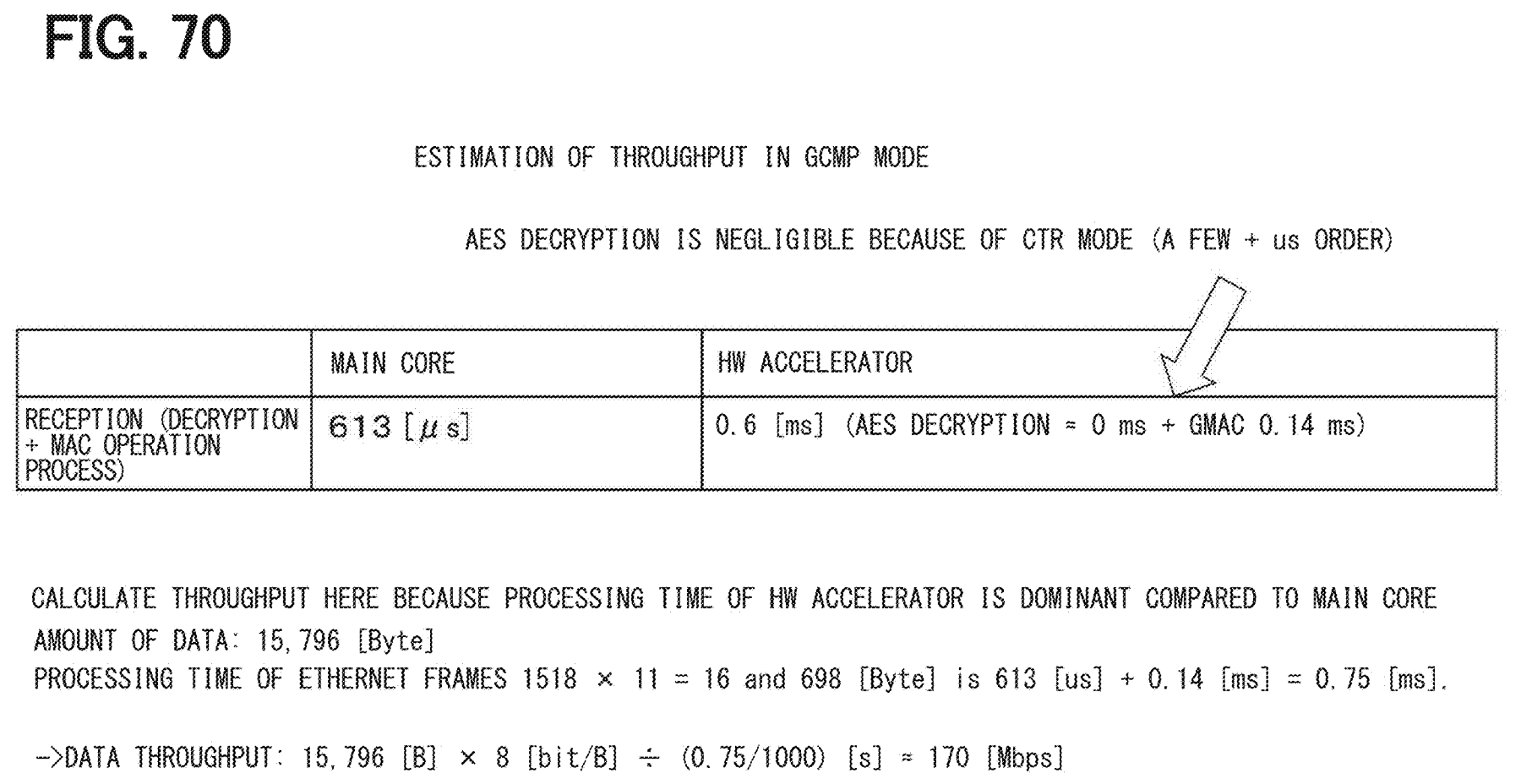

ESTIMATION OF THROUGHPUT IN GCMP MODE

AES DECRYPTION IS NEGLIGIBLE BECAUSE OF CTR MODE (A FEW + us ORDER)

| | MAIN CORE | HW ACCELERATOR |
|---|---|---|
| RECEPTION (DECRYPTION + MAC OPERATION PROCESS) | 613 [μs] | 0.6 [ms] (AES DECRYPTION = 0 ms + GMAC 0.14 ms) |

CALCULATE THROUGHPUT HERE BECAUSE PROCESSING TIME OF HW ACCELERATOR IS DOMINANT COMPARED TO MAIN CORE

AMOUNT OF DATA: 15,796 [Byte]

PROCESSING TIME OF ETHERNET FRAMES 1518 × 11 = 16 and 698 [Byte] is 613 [us] + 0.14 [ms] = 0.75 [ms].

->DATA THROUGHPUT: 15,796 [B] × 8 [bit/B] ÷ (0.75/1000) [s] = 170 [Mbps]

FIG. 72

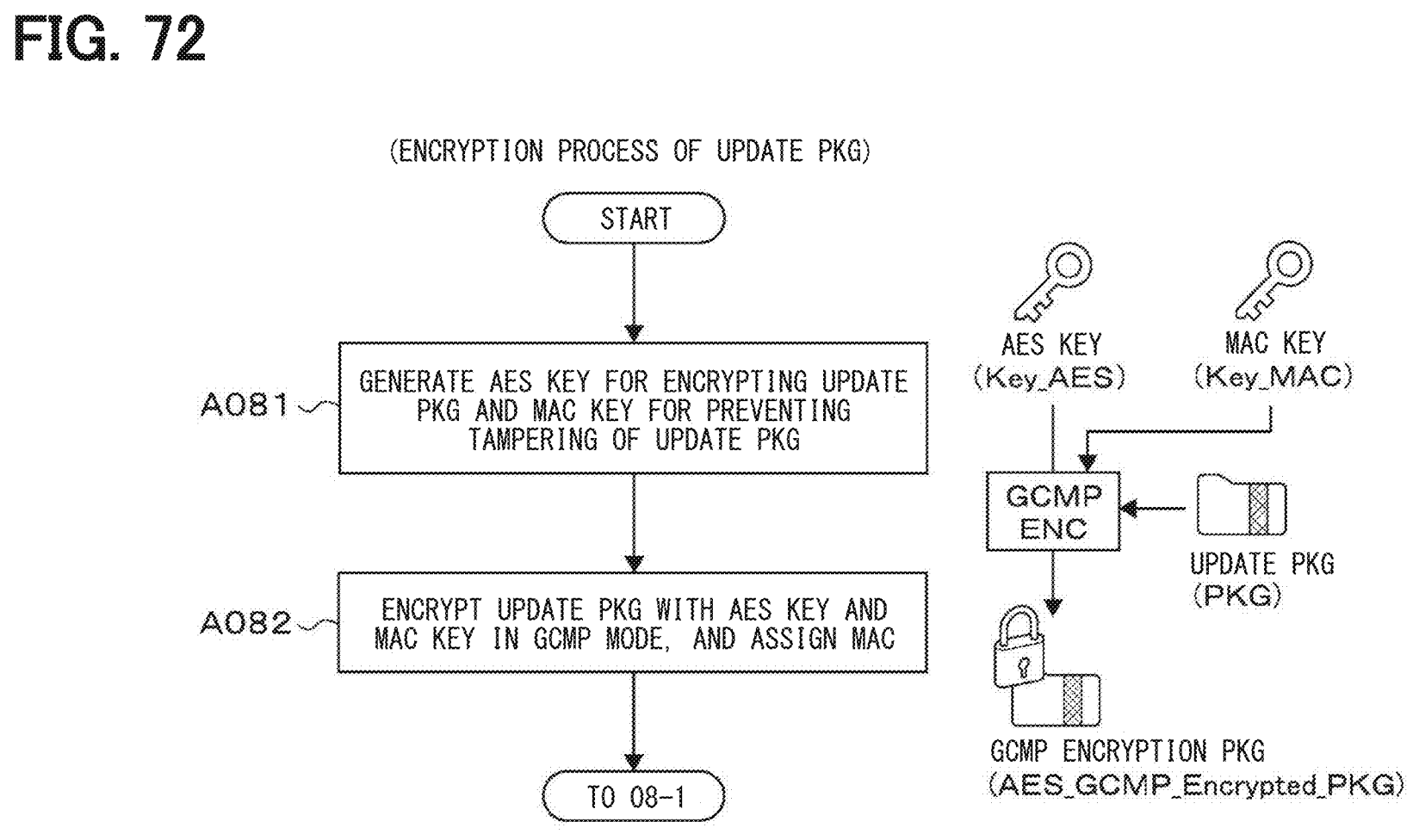

(ENCRYPTION PROCESS OF UPDATE PKG)

START

AO81 — GENERATE AES KEY FOR ENCRYPTING UPDATE PKG AND MAC KEY FOR PREVENTING TAMPERING OF UPDATE PKG

AO82 — ENCRYPT UPDATE PKG WITH AES KEY AND MAC KEY IN GCMP MODE, AND ASSIGN MAC

TO 08-1

AES KEY (Key_AES)

MAC KEY (Key_MAC)

UPDATE PKG (PKG)

GCMP ENC

GCMP ENCRYPTION PKG (AES_GCMP_Encrypted_PKG)

(CDN PLACEMENT PROCESS OF GCMP ENCRYPTION PKG
AND TRANSMISSION PROCESS OF CAMPAIGN NOTIFICATION)

FROM 08-2

A085 — PLACE UPDATE PKG ENCRYPTED WITH AES KEY AND MAC KEY IN CDN

A086 — TRANSMIT CAMPAIGN NOTIFICATION STORING ENCRYPTED AES KEY AND MAC KEY

TERMINATE

CDN

CAMPAIGN NOTIFICATION (ACQUISITION PROCESS OF CAMPAIGN NOTIFICATION
AND DECRYPTION PROCESS OF AES ENCRYPTION KEY)

FIG. 81

(RP METADATA GENERATION PROCESS AND ENCRYPTION PROCESS)

FIG. 82

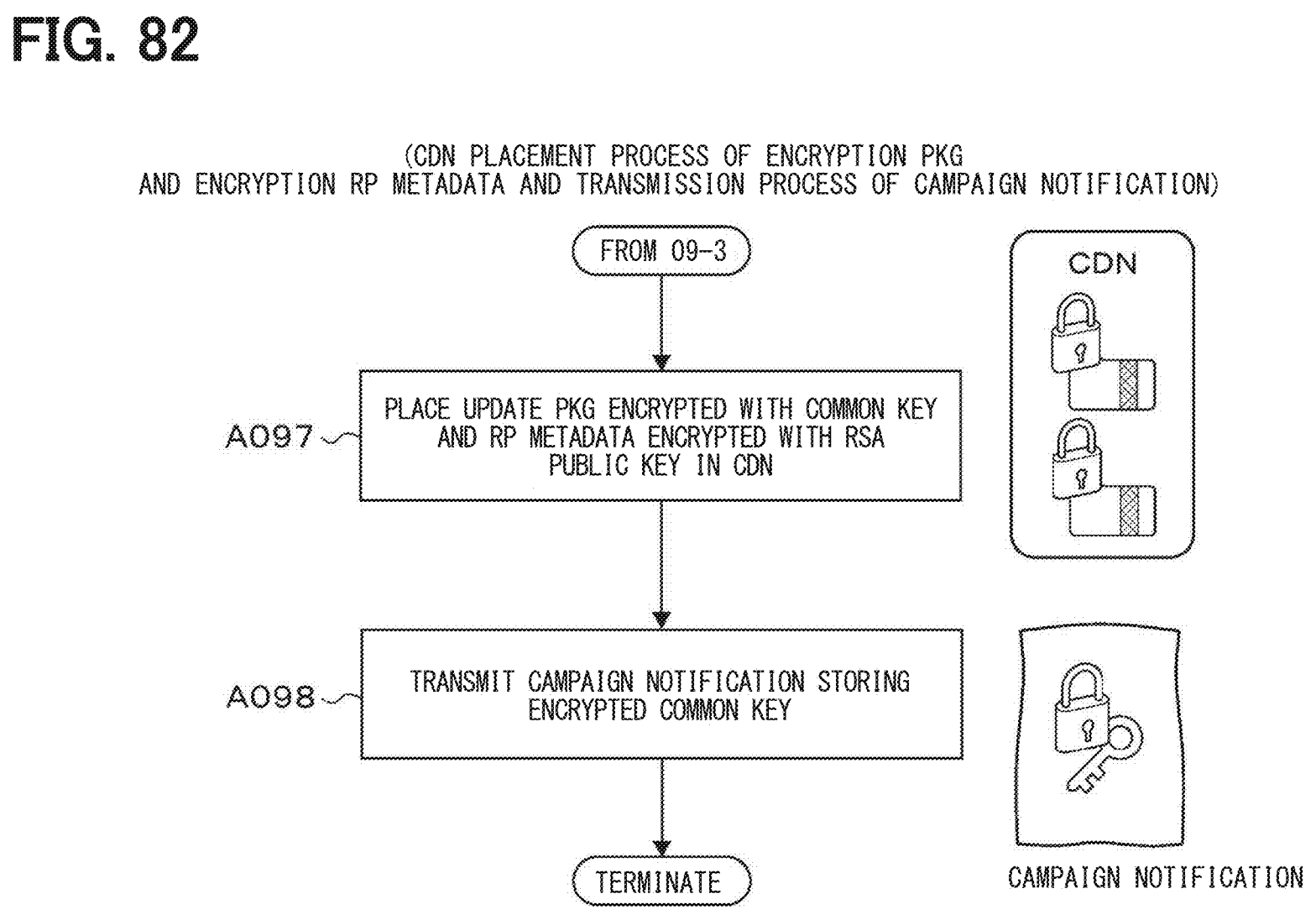

(CDN PLACEMENT PROCESS OF ENCRYPTION PKG
AND ENCRYPTION RP METADATA AND TRANSMISSION PROCESS OF CAMPAIGN NOTIFICATION)

FIG. 83

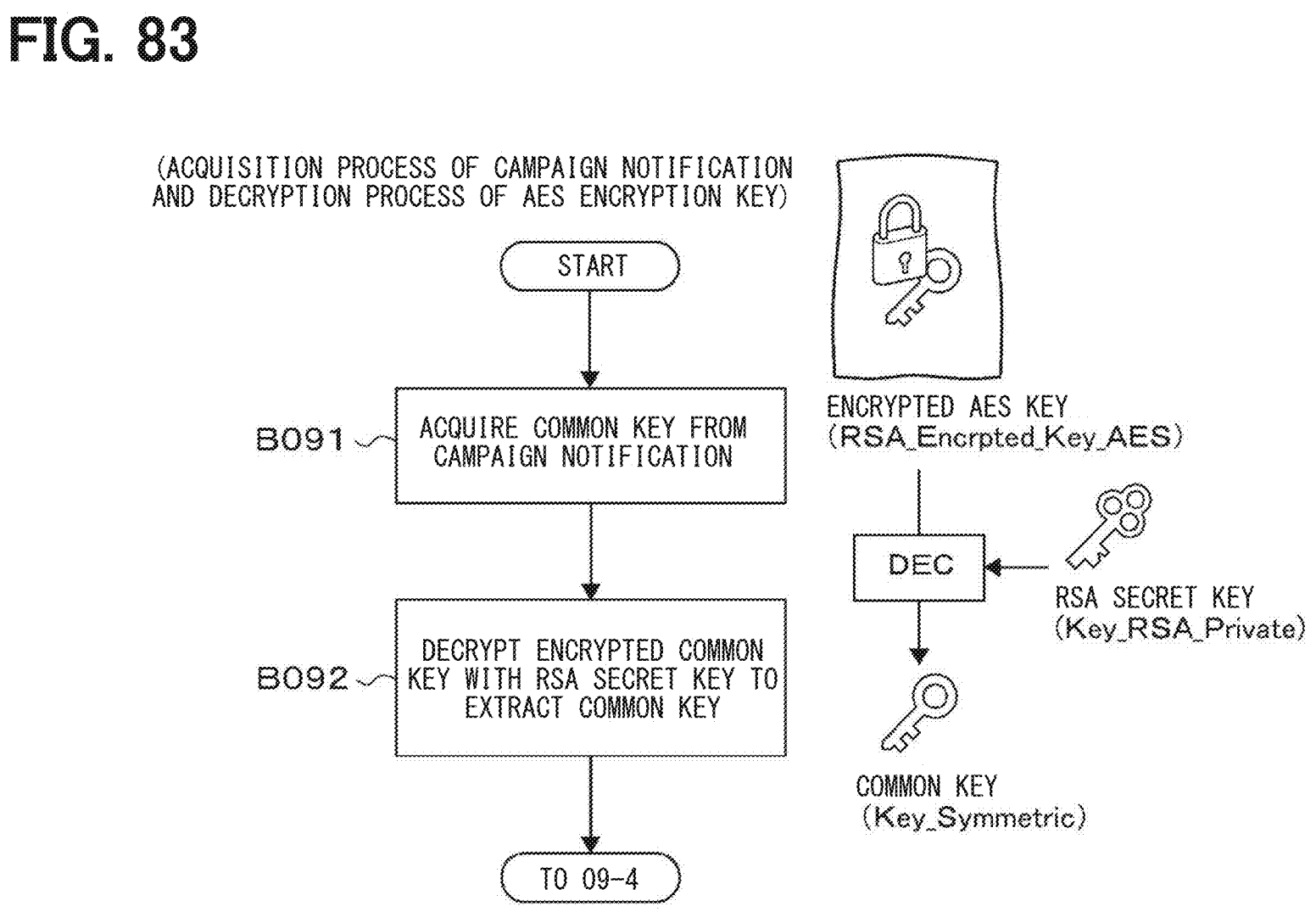

(ACQUISITION PROCESS OF CAMPAIGN NOTIFICATION
AND DECRYPTION PROCESS OF AES ENCRYPTION KEY)

```
        START
          │
          ▼
B091 ─  ACQUIRE COMMON KEY FROM
        CAMPAIGN NOTIFICATION
          │
          ▼
B092 ─  DECRYPT ENCRYPTED COMMON
        KEY WITH RSA SECRET KEY TO
        EXTRACT COMMON KEY
          │
          ▼
        TO 09-4
```

ENCRYPTED AES KEY
(RSA_Encrpted_Key_AES)

RSA SECRET KEY
(Key_RSA_Private)

DEC

COMMON KEY
(Key_Symmetric)

(PROCESS OF ACQUIRING ENCRYPTION PKG FROM SMARTPHONE OR USB MEMORY)

FROM 09-6

B096 ACQUIRE ENCRYPTED UPDATE PKG VIA IDENTIFIED DISTRIBUTION ROUTE

PROCESS AFTER STEP B014 OR PROCESS AFTER STEP B024

VEHICLE-SIDE SYSTEM

OTA MASTER

AES ENCRYPTION PKG

DEC

UPDATE PKG

EXTRACTED COMMON KEY

FIG. 90

CDN-DB-1
CDN PRICE TABLE OF EACH CLOUD SERVICE (BASE)

CDN VENDOR MANAGEMENT DB

| CDN1 | FEE TABLE PER GB | | | | | | |
|---|---|---|---|---|---|---|---|
| | ~10TB | ~40TB | ~100TB | ~350TB | ~500TB | ~4PB | 5PB~ |
| JAPAN | 0.0129 USD | 0.121 USD | 0.112 USD | 0.093 USD | 0.075 USD | 0.065 USD | 0.065 USD |
| NORTH AMERICA | 0.081 USD | 0.075 USD | 0.056 USD | 0.037 USD | 0.028 USD | 0.023 USD | 0.023 USD |
| EU | 0.081 USD | 0.075 USD | 0.056 USD | 0.037 USD | 0.028 USD | 0.023 USD | 0.023 USD |

| CDN2 | FEE TABLE PER GB | | | | | | |
|---|---|---|---|---|---|---|---|
| | ~10TB | ~40TB | ~100TB | ~350TB | ~524TB | ~4PB | 5PB~ |
| JAPAN | 0.114 USD | 0.089 USD | 0.086 USD | 0.084 USD | 0.080 USD | 0.070 USD | 0.060 USD |
| NORTH AMERICA | 0.085 USD | 0.080 USD | 0.060 USD | 0.040 USD | 0.030 USD | 0.025 USD | 0.020 USD |
| EU | 0.085 USD | 0.080 USD | 0.060 USD | 0.040 USD | 0.030 USD | 0.025 USD | 0.015 USD |

| CDN2 | REQUEST FEE TABLE FOR HTTP METHOD | |
|---|---|---|
| | HTTP REQUEST | HTTPS REQUEST |
| JAPAN | 0.009 USD | 0.012 USD |
| NORTH AMERICA | 0.075 USD | 0.010 USD |
| EU | 0.009 USD | 0.012 USD |

FIG. 91

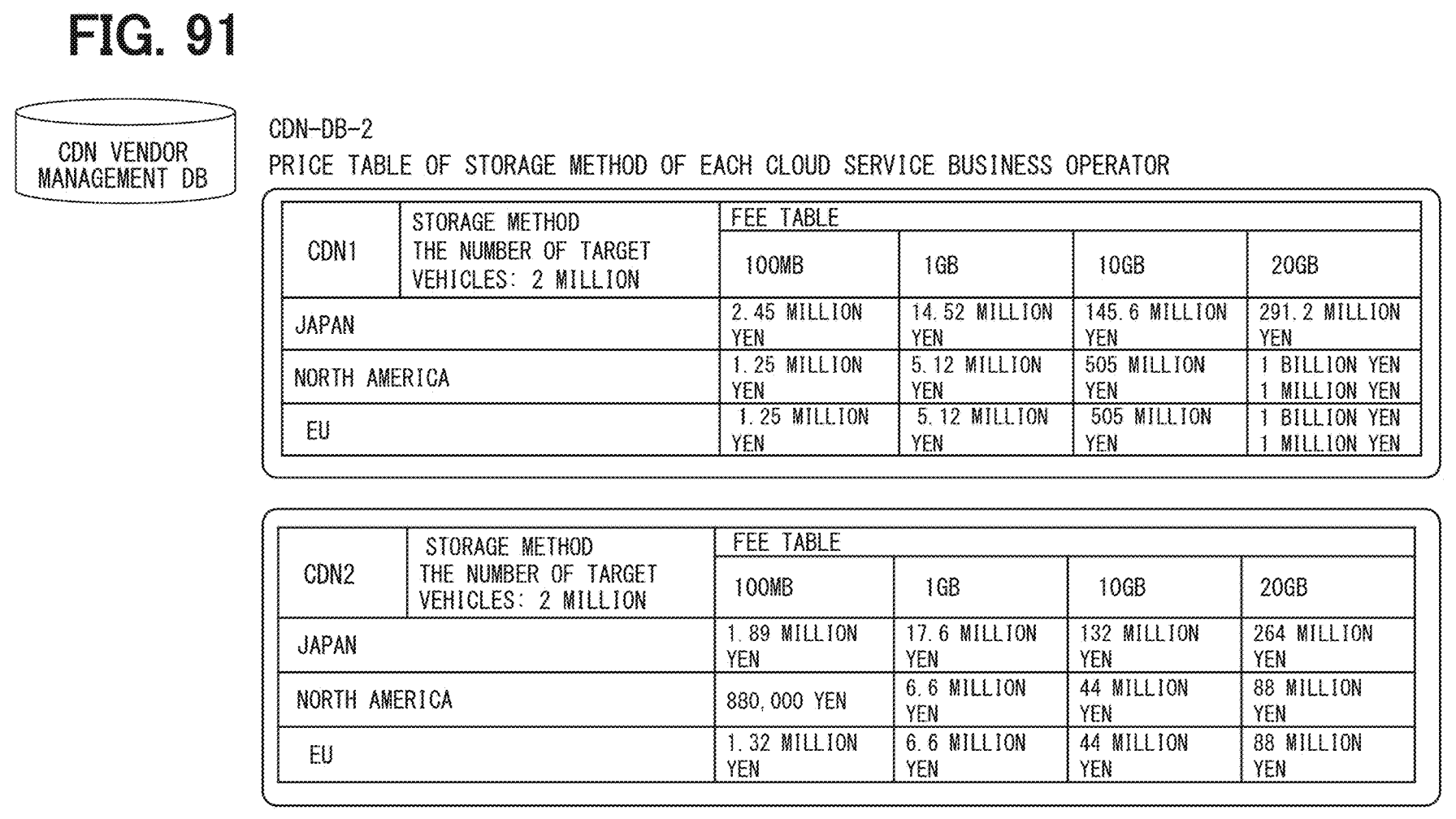

CDN VENDOR MANAGEMENT DB

CDN-DB-2
PRICE TABLE OF STORAGE METHOD OF EACH CLOUD SERVICE BUSINESS OPERATOR

| CDN1 | STORAGE METHOD THE NUMBER OF TARGET VEHICLES: 2 MILLION | FEE TABLE | | | | |
|---|---|---|---|---|---|---|
| | | 100MB | 1GB | 10GB | 20GB | |
| JAPAN | | 2.45 MILLION YEN | 14.52 MILLION YEN | 145.6 MILLION YEN | 291.2 MILLION YEN | |
| NORTH AMERICA | | 1.25 MILLION YEN | 5.12 MILLION YEN | 505 MILLION YEN | 1 BILLION YEN 1 MILLION YEN | |
| EU | | 1.25 MILLION YEN | 5.12 MILLION YEN | 505 MILLION YEN | 1 BILLION YEN 1 MILLION YEN | |

| CDN2 | STORAGE METHOD THE NUMBER OF TARGET VEHICLES: 2 MILLION | FEE TABLE | | | | |
|---|---|---|---|---|---|---|
| | | 100MB | 1GB | 10GB | 20GB | |
| JAPAN | | 1.89 MILLION YEN | 17.6 MILLION YEN | 132 MILLION YEN | 264 MILLION YEN | |
| NORTH AMERICA | | 880,000 YEN | 6.6 MILLION YEN | 44 MILLION YEN | 88 MILLION YEN | |
| EU | | 1.32 MILLION YEN | 6.6 MILLION YEN | 44 MILLION YEN | 88 MILLION YEN | |

FIG. 92

CDN-DB-3-1

PRICE TABLE FOR EACH STREAMING SIZE IN STREAMING METHOD OF EACH CLOUD SERVICE BUSINESS OPERATOR

| CDN1 | STREAMING SIZE: 1KB THE NUMBER OF TARGET VEHICLES: 2 MILLION | FEE TABLE | | | | |
|---|---|---|---|---|---|---|
| | | 100MB | 1GB | 10GB | 20GB |
| JAPAN | | 2.45 MILLION YEN | 14.52 MILLION YEN | 145.6 MILLION YEN | 291.2 MILLION YEN |
| NORTH AMERICA | | 1.25 MILLION YEN | 5.12 MILLION YEN | 505 MILLION YEN | 1 BILLION YEN 1 MILLION YEN |
| EU | | 1.25 MILLION YEN | 5.12 MILLION YEN | 505 MILLION YEN | 1 BILLION YEN 1 MILLION YEN |

| CDN1 | STREAMING SIZE: 10KB THE NUMBER OF TARGET VEHICLES: 2 MILLION | FEE TABLE | | | | |
|---|---|---|---|---|---|---|
| | | 100MB | 1GB | 10GB | 20GB |
| JAPAN | | 2.45 MILLION YEN | 14.52 MILLION YEN | 145.6 MILLION YEN | 291.2 MILLION YEN |
| NORTH AMERICA | | 1.25 MILLION YEN | 5.12 MILLION YEN | 505 MILLION YEN | 1 BILLION YEN 1 MILLION YEN |
| EU | | 1.25 MILLION YEN | 5.12 MILLION YEN | 505 MILLION YEN | 1 BILLION YEN 1 MILLION YEN |

| CDN1 | STREAMING SIZE: 100KB THE NUMBER OF TARGET VEHICLES: 2 MILLION | FEE TABLE | | | | |
|---|---|---|---|---|---|---|
| | | 100MB | 1GB | 10GB | 20GB |
| JAPAN | | 2.45 MILLION YEN | 14.52 MILLION YEN | 145.6 MILLION YEN | 291.2 MILLION YEN |
| NORTH AMERICA | | 1.25 MILLION YEN | 5.12 MILLION YEN | 505 MILLION YEN | 1 BILLION YEN 1 MILLION YEN |
| EU | | 1.25 MILLION YEN | 5.12 MILLION YEN | 505 MILLION YEN | 1 BILLION YEN 1 MILLION YEN |

CDN VENDOR MANAGEMENT DB

FIG. 93

CDN VENDOR MANAGEMENT DB  CDN-DB-3-2  PRICE TABLE FOR EACH STREAMING SIZE IN STREAMING METHOD OF EACH CLOUD SERVICE BUSINESS OPERATOR

STREAMING SIZE: 1KB
THE NUMBER OF TARGET VEHICLES: 2 MILLION

FEE TABLE (HTTP/HTTPS)

| CDN2 | 100MB | 1GB | 10GB | 20GB |
|---|---|---|---|---|
| JAPAN | 21.69 MILLION YEN/ 28.29 MILLION YEN | 215.6 MILLION YEN/ 281.6 MILLION YEN | 2112 MILLION YEN/ 2772 MILLION YEN | 4224 MILLION YEN/ 5544 MILLION YEN |
| NORTH AMERICA | 17.38 MILLION YEN/ 22.88 MILLION YEN | 171.6 MILLION YEN/ 226.6 MILLION YEN | 1694 MILLION YEN/ 2244 MILLION YEN | 3388 MILLION YEN/ 4488 MILLION YEN |
| EU | 21.12 MILLION YEN/ 27.72 MILLION YEN | 204.6 MILLION YEN/ 270.6 MILLION YEN | 2024 MILLION YEN/ 2684 MILLION YEN | 4048 MILLION YEN/ 5368 MILLION YEN |

STREAMING SIZE: 10KB
THE NUMBER OF TARGET VEHICLES: 2 MILLION

FEE TABLE (HTTP/HTTPS)

| CDN2 | 100MB | 1GB | 10GB | 20GB |
|---|---|---|---|---|
| JAPAN | 3.87 MILLION YEN/ 4.53 MILLION YEN | 37.4 MILLION YEN/ 44 MILLION YEN | 330 MILLION YEN/ 396 MILLION YEN | 660 MILLION YEN/ 792 MILLION YEN |
| NORTH AMERICA | 2.53 MILLION YEN/ 3.08 MILLION YEN | 23.1 MILLION YEN/ 28.6 MILLION YEN | 209 MILLION YEN/ 264 MILLION YEN | 485 MILLION YEN/ 528 MILLION YEN |
| EU | 3.3 MILLION YEN/ 3.96 MILLION YEN | 26.4 MILLION YEN/ 33 MILLION YEN | 242 MILLION YEN/ 308 MILLION YEN | 484 MILLION YEN/ 616 MILLION YEN |

STREAMING SIZE: 100KB
THE NUMBER OF TARGET VEHICLES: 2 MILLION

FEE TABLE (HTTP/HTTPS)

| CDN2 | 100MB | 1GB | 10GB | 20GB |
|---|---|---|---|---|
| JAPAN | 2.09 MILLION YEN/ 2.16 MILLION YEN | 19.58 MILLION YEN/ 20.24 MILLION YEN | 151.8 MILLION YEN/ 158.4 MILLION YEN | 303.6 MILLION YEN/ 316.8 MILLION YEN |
| NORTH AMERICA | 1.05 MILLION YEN/ 1.1 MILLION YEN | 8.25 MILLION YEN/ 8.8 MILLION YEN | 60.5 MILLION YEN/ 66 MILLION YEN | 121 MILLION YEN/ 132 MILLION YEN |
| EU | 1.52 MILLION YEN/ 1.58 MILLION YEN | 8.58 MILLION YEN/ 9.24 MILLION YEN | 63.8 MILLION YEN/ 70.4 MILLION YEN | 127.6 MILLION YEN/ 140.8 MILLION YEN |

(SELECTION LOGIC OF CDN PLACEMENT DESTINATION WITH LOWEST PRICE FOR EACH AREA AND PLACEMENT PROCESS OF UPDATE PKG FOR EACH AREA)

FIG. 98

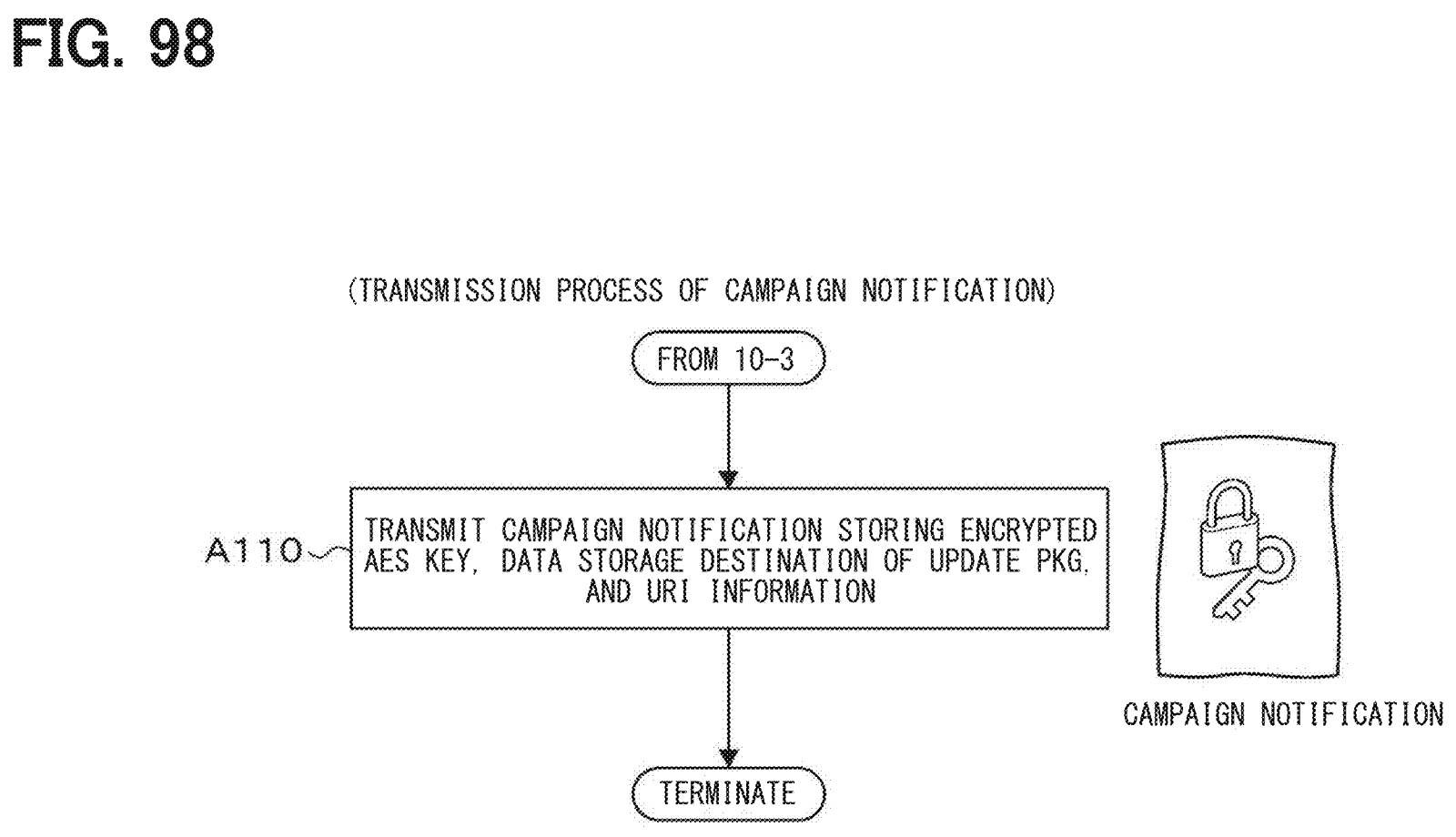

(TRANSMISSION PROCESS OF CAMPAIGN NOTIFICATION)

FROM 10-3

A110 — TRANSMIT CAMPAIGN NOTIFICATION STORING ENCRYPTED AES KEY, DATA STORAGE DESTINATION OF UPDATE PKG. AND URI INFORMATION

CAMPAIGN NOTIFICATION

TERMINATE (ENCRYPTION PROCESS OF UPDATE PKG)

START

A111 — GENERATE AES KEY FOR ENCRYPTING UPDATE PKG

A112 — ENCRYPT UPDATE PKG WITH AES KEY IN CTR MODE

TO 11-1

AES KEY (Key_AES)

UPDATE PKG (PKG)

ENC

AES ENCRYPTION PKG (AES_CTR_Encrypted_PKG)

(ACQUISITION PROCESS OF CAMPAIGN NOTIFICATION AND DECRYPTION PROCESS OF AES ENCRYPTION KEY)

FIG. 107

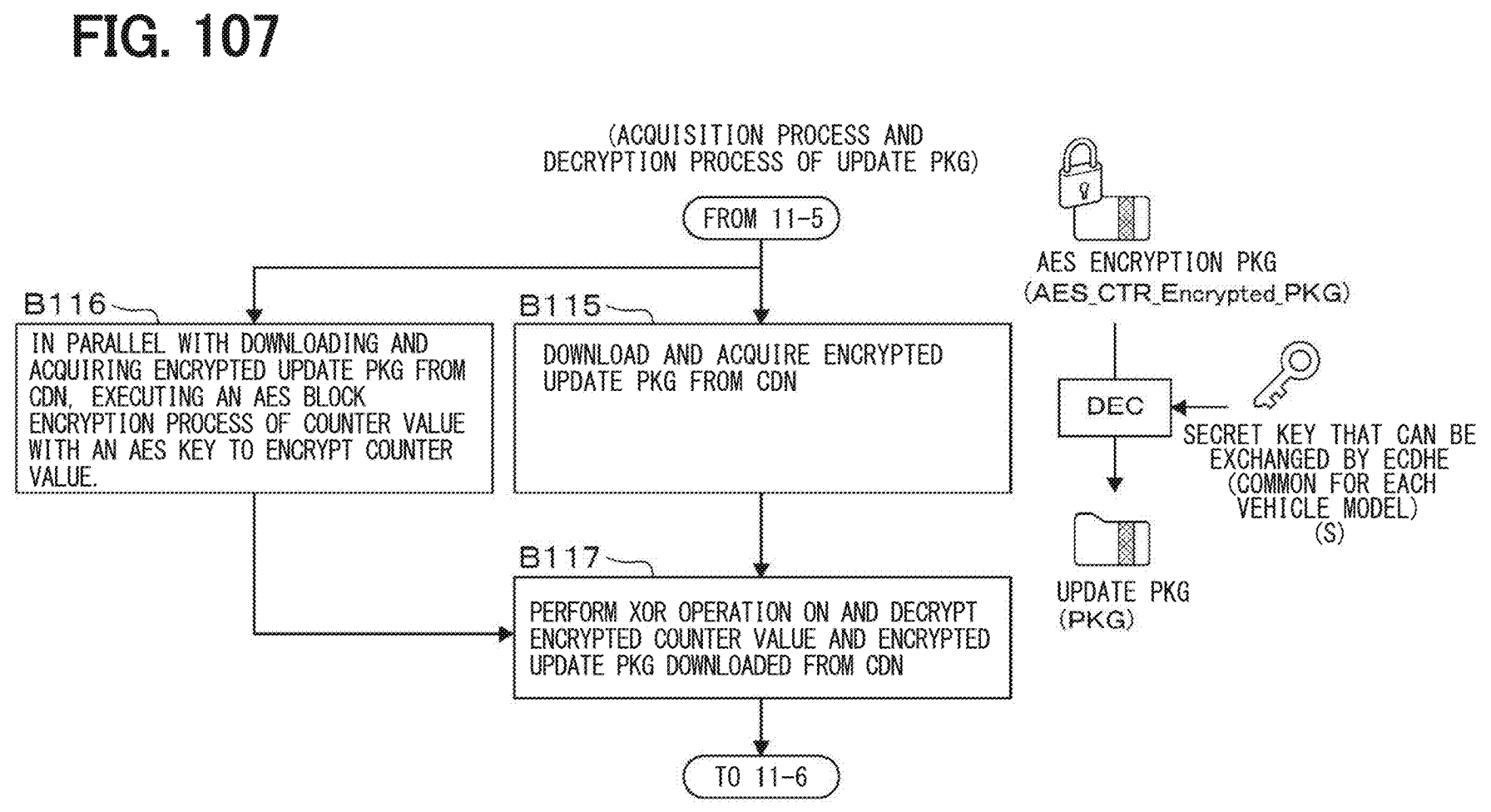

(ACQUISITION PROCESS AND
DECRYPTION PROCESS OF UPDATE PKG)

FROM 11-5

B115

DOWNLOAD AND ACQUIRE ENCRYPTED
UPDATE PKG FROM CDN

B116

IN PARALLEL WITH DOWNLOADING AND
ACQUIRING ENCRYPTED UPDATE PKG FROM
CDN, EXECUTING AN AES BLOCK
ENCRYPTION PROCESS OF COUNTER VALUE
WITH AN AES KEY TO ENCRYPT COUNTER
VALUE.

B117

PERFORM XOR OPERATION ON AND DECRYPT
ENCRYPTED COUNTER VALUE AND ENCRYPTED
UPDATE PKG DOWNLOADED FROM CDN

TO 11-6

AES ENCRYPTION PKG
(AES_CTR_Encrypted_PKG)

SECRET KEY THAT CAN BE
EXCHANGED BY ECDHE
(COMMON FOR EACH
VEHICLE MODEL)
(S)

DEC

UPDATE PKG
(PKG)

FIG. 110

(KEY EXCHANGE PROCESS COMMON TO VEHICLE MODELS BY ECDHE)

FIG. 111

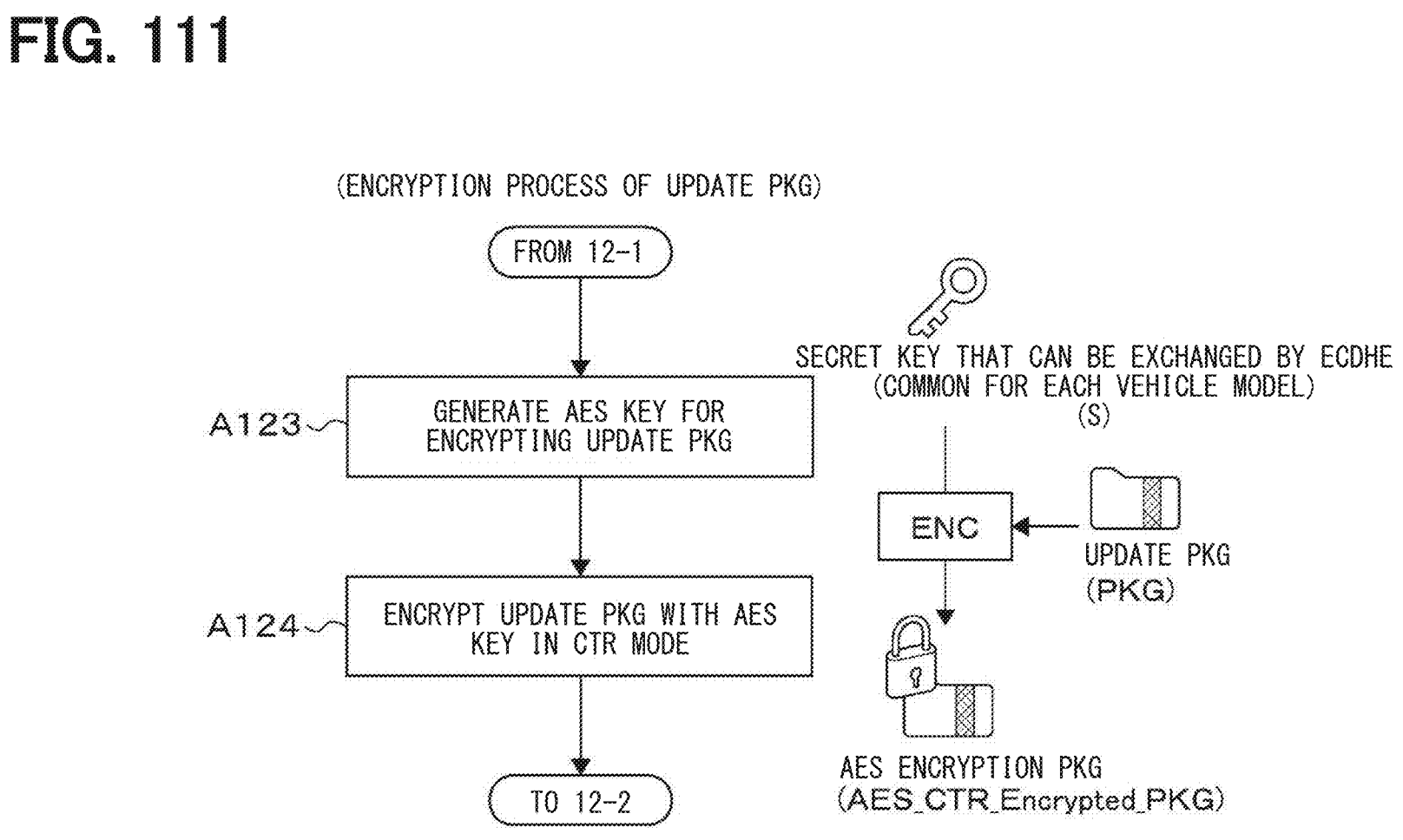

(ENCRYPTION PROCESS OF UPDATE PKG)

SECRET KEY THAT CAN BE EXCHANGED BY ECDHE
(COMMON FOR EACH VEHICLE MODEL)
(S)

FROM 12-1

A123 — GENERATE AES KEY FOR ENCRYPTING UPDATE PKG

A124 — ENCRYPT UPDATE PKG WITH AES KEY IN CTR MODE

TO 12-2

UPDATE PKG
(PKG)

ENC

AES ENCRYPTION PKG
(AES_CTR_Encrypted_PKG)

FIG. 112

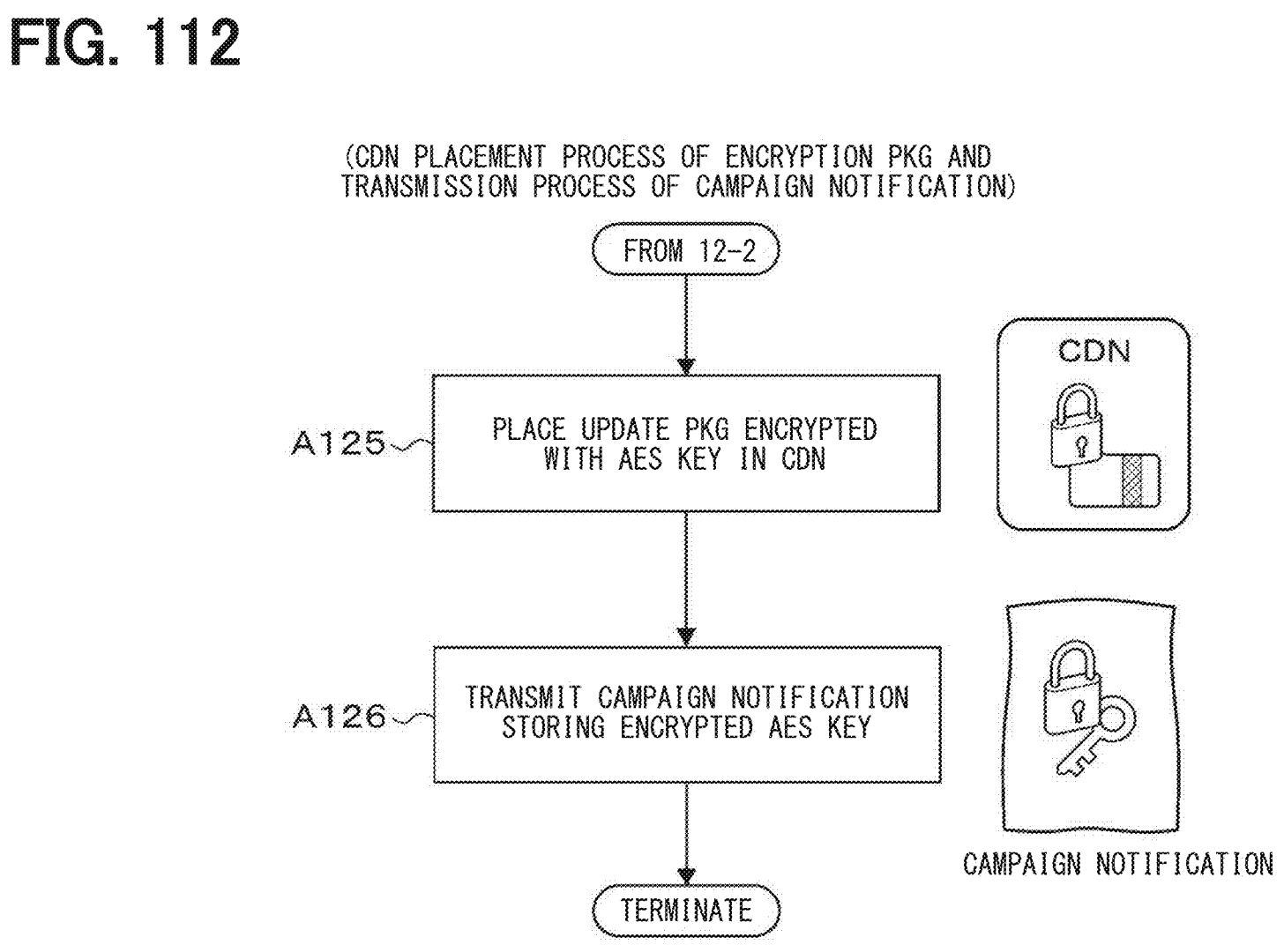

(CDN PLACEMENT PROCESS OF ENCRYPTION PKG AND
TRANSMISSION PROCESS OF CAMPAIGN NOTIFICATION)

CDN

CAMPAIGN NOTIFICATION

FROM 12-2

A125 — PLACE UPDATE PKG ENCRYPTED WITH AES KEY IN CDN

A126 — TRANSMIT CAMPAIGN NOTIFICATION STORING ENCRYPTED AES KEY

TERMINATE (KEY EXCHANGE PROCESS BY ECDHE)

START

B121 — GENERATE KEY PAIR OF ECDHE FROM RANDOM NUMBER GENERATED ACCORDING TO SPECIFIC RULE

B122 — EXCHANGE SECRET KEY WITH OTA CENTER IN ECDHE ALGORITHM

TO 12-3

ECDHE KEY (Key_ECDHE_Center)

ECDHE

SECRET KEY THAT CAN BE EXCHANGED BY ECDHE (COMMON FOR EACH VEHICLE MODEL) (S)

FIG. 114

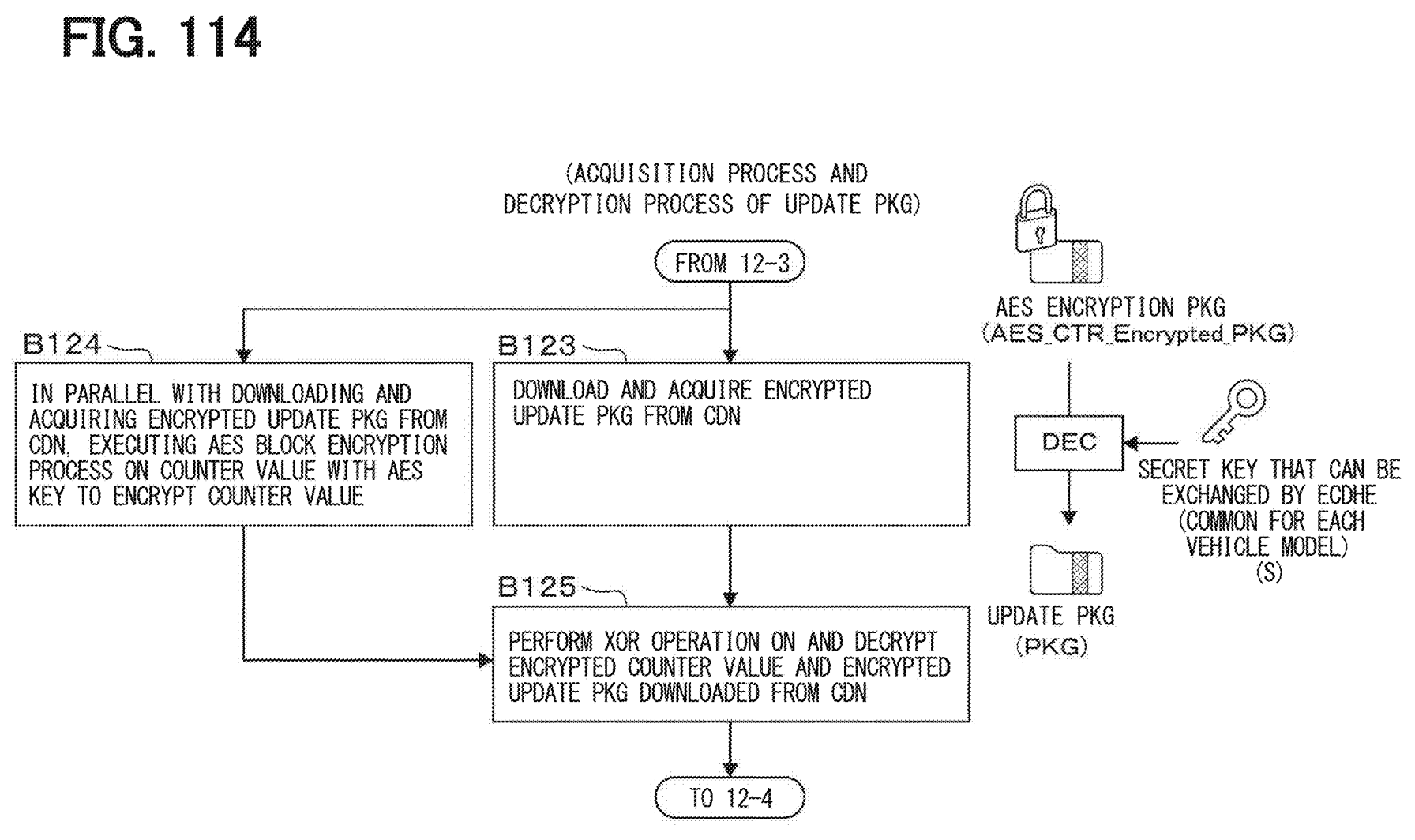

(ACQUISITION PROCESS AND
DECRYPTION PROCESS OF UPDATE PKG)

FROM 12-3

B123
DOWNLOAD AND ACQUIRE ENCRYPTED
UPDATE PKG FROM CDN

B124
IN PARALLEL WITH DOWNLOADING AND
ACQUIRING ENCRYPTED UPDATE PKG FROM
CDN, EXECUTING AES BLOCK ENCRYPTION
PROCESS ON COUNTER VALUE WITH AES
KEY TO ENCRYPT COUNTER VALUE

AES ENCRYPTION PKG
(AES_CTR_Encrypted_PKG)

DEC

SECRET KEY THAT CAN BE
EXCHANGED BY ECDHE
(COMMON FOR EACH
VEHICLE MODEL)
(S)

UPDATE PKG
(PKG)

B125
PERFORM XOR OPERATION ON AND DECRYPT
ENCRYPTED COUNTER VALUE AND ENCRYPTED
UPDATE PKG DOWNLOADED FROM CDN

Figure 115:
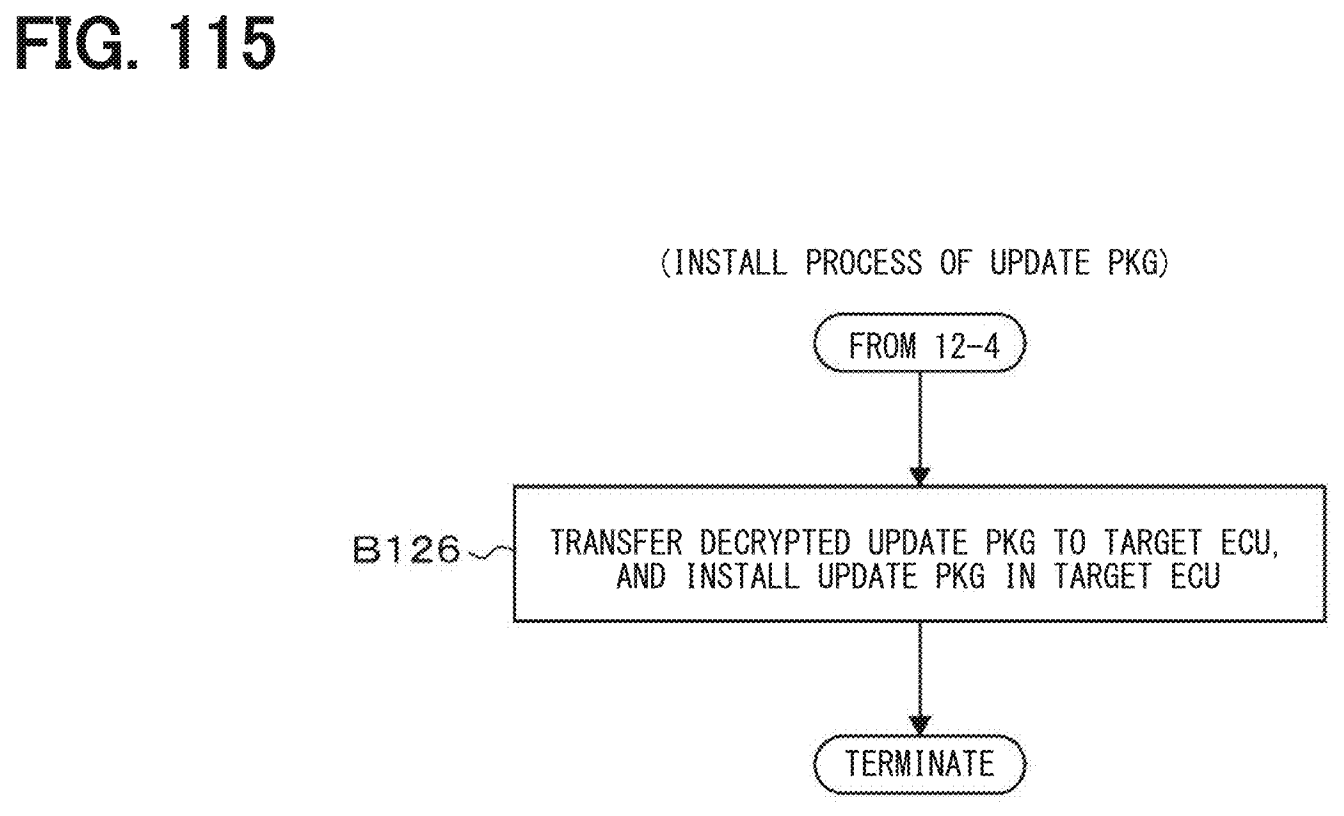

(INSTALL PROCESS OF UPDATE PKG)

FROM 12-4

B126

TRANSFER DECRYPTED UPDATE PKG TO TARGET ECU, AND INSTALL UPDATE PKG IN TARGET ECU

TERMINATE

ENCRYPTION PROCESS IN CTR MODE

Counter (CTR) mode encryption

FIG. 118

DECRYPTION PROCESS IN CTR MODE

Counter (CTR) mode decryption

FIG. 119

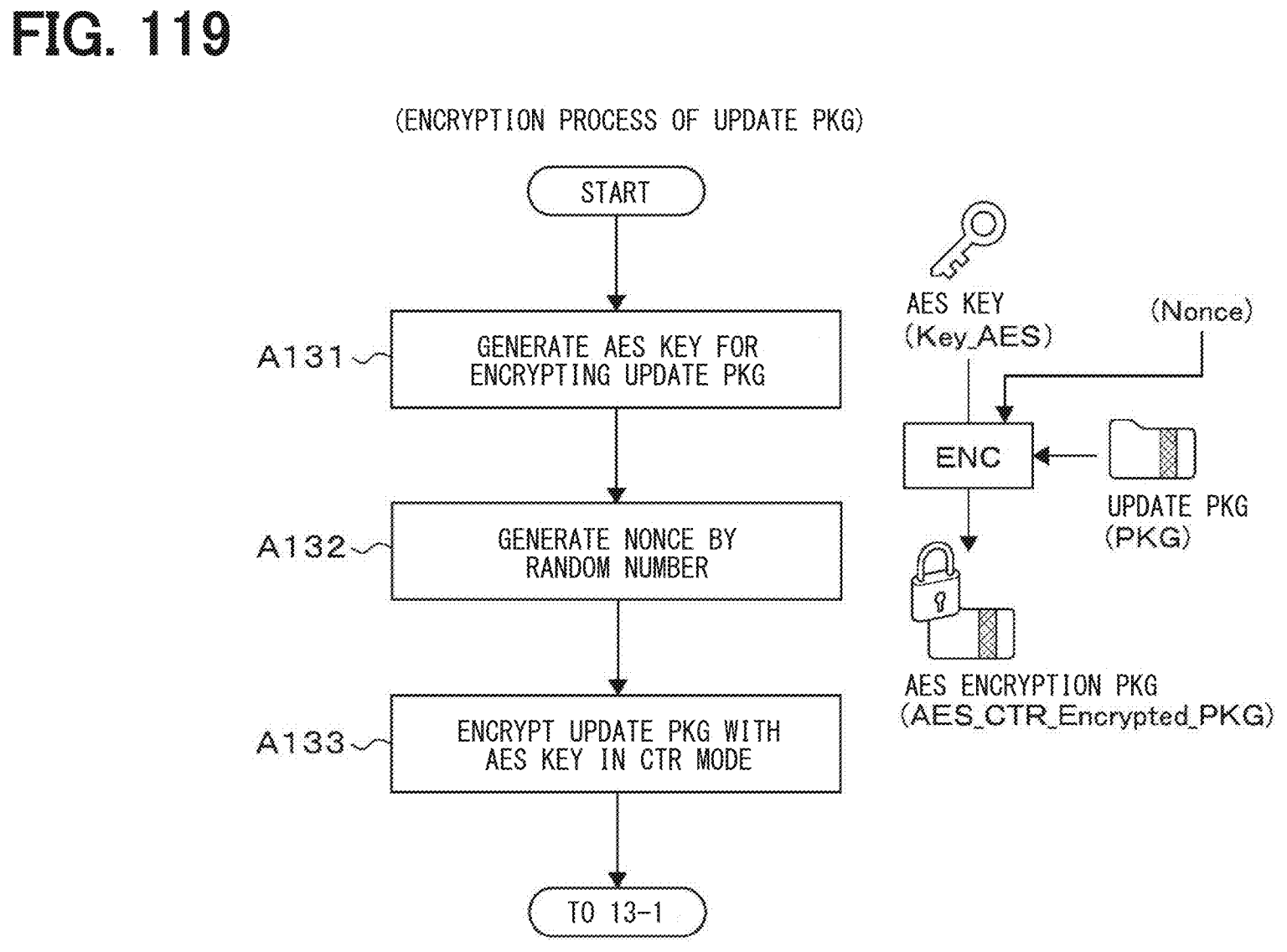

(ENCRYPTION PROCESS OF UPDATE PKG)

```
     START
       │
       ▼
┌──────────────────────┐
│  GENERATE AES KEY FOR │ ─── A131
│  ENCRYPTING UPDATE PKG│
└──────────────────────┘
       │
       ▼
┌──────────────────────┐
│  GENERATE NONCE BY    │ ─── A132
│  RANDOM NUMBER        │
└──────────────────────┘
       │
       ▼
┌──────────────────────┐
│  ENCRYPT UPDATE PKG   │ ─── A133
│  WITH AES KEY IN CTR  │
│  MODE                 │
└──────────────────────┘
       │
       ▼
     TO 13-1
```

(Nonce)

AES KEY
(Key_AES)

UPDATE PKG
(PKG)

ENC

AES ENCRYPTION PKG
(AES_CTR_Encrypted_PKG)

FIG. 121

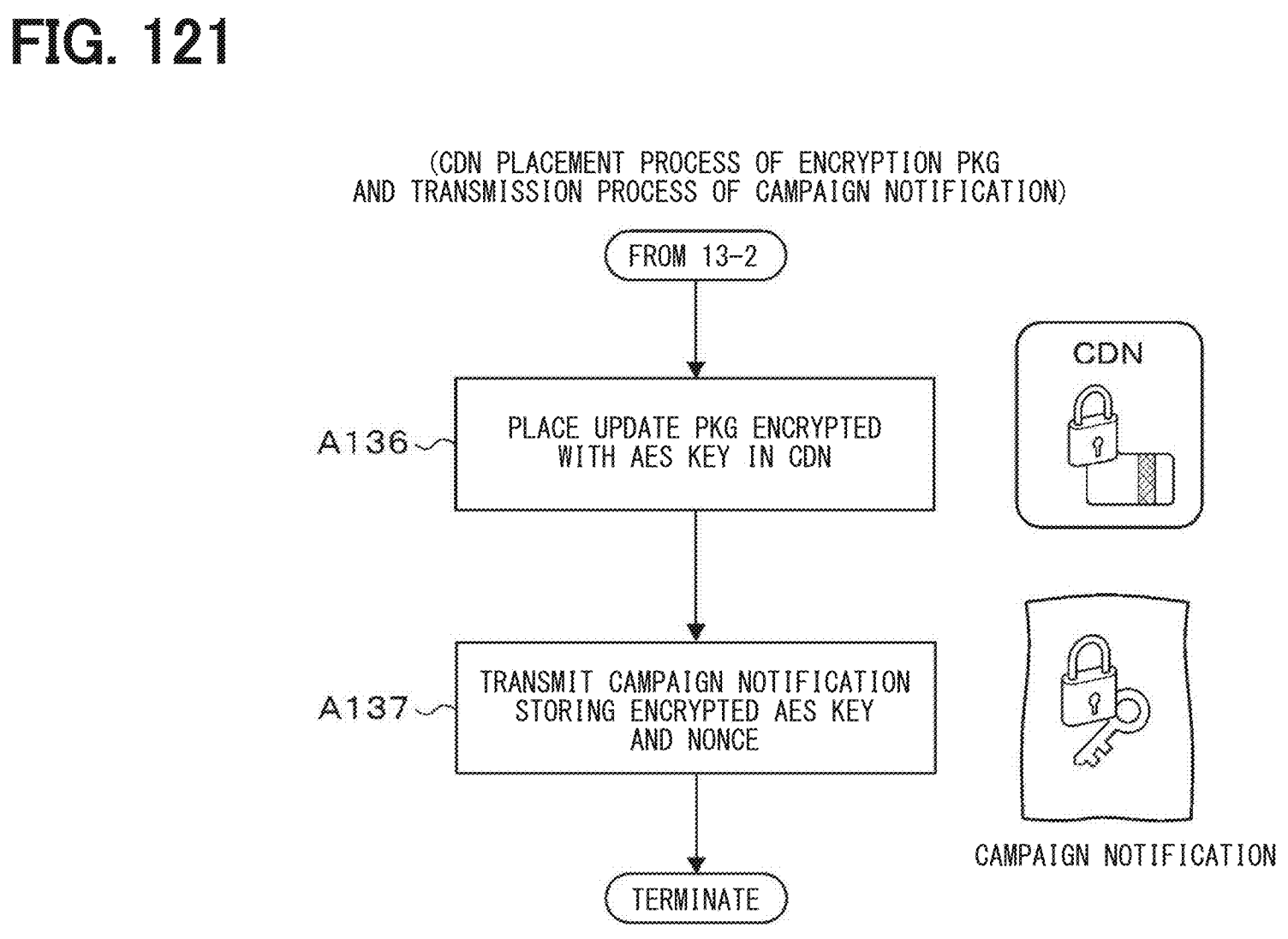

(CDN PLACEMENT PROCESS OF ENCRYPTION PKG AND TRANSMISSION PROCESS OF CAMPAIGN NOTIFICATION)

CDN

CAMPAIGN NOTIFICATION

FROM 13-2

A136 — PLACE UPDATE PKG ENCRYPTED WITH AES KEY IN CDN

A137 — TRANSMIT CAMPAIGN NOTIFICATION STORING ENCRYPTED AES KEY AND NONCE

TERMINATE

FIG. 122

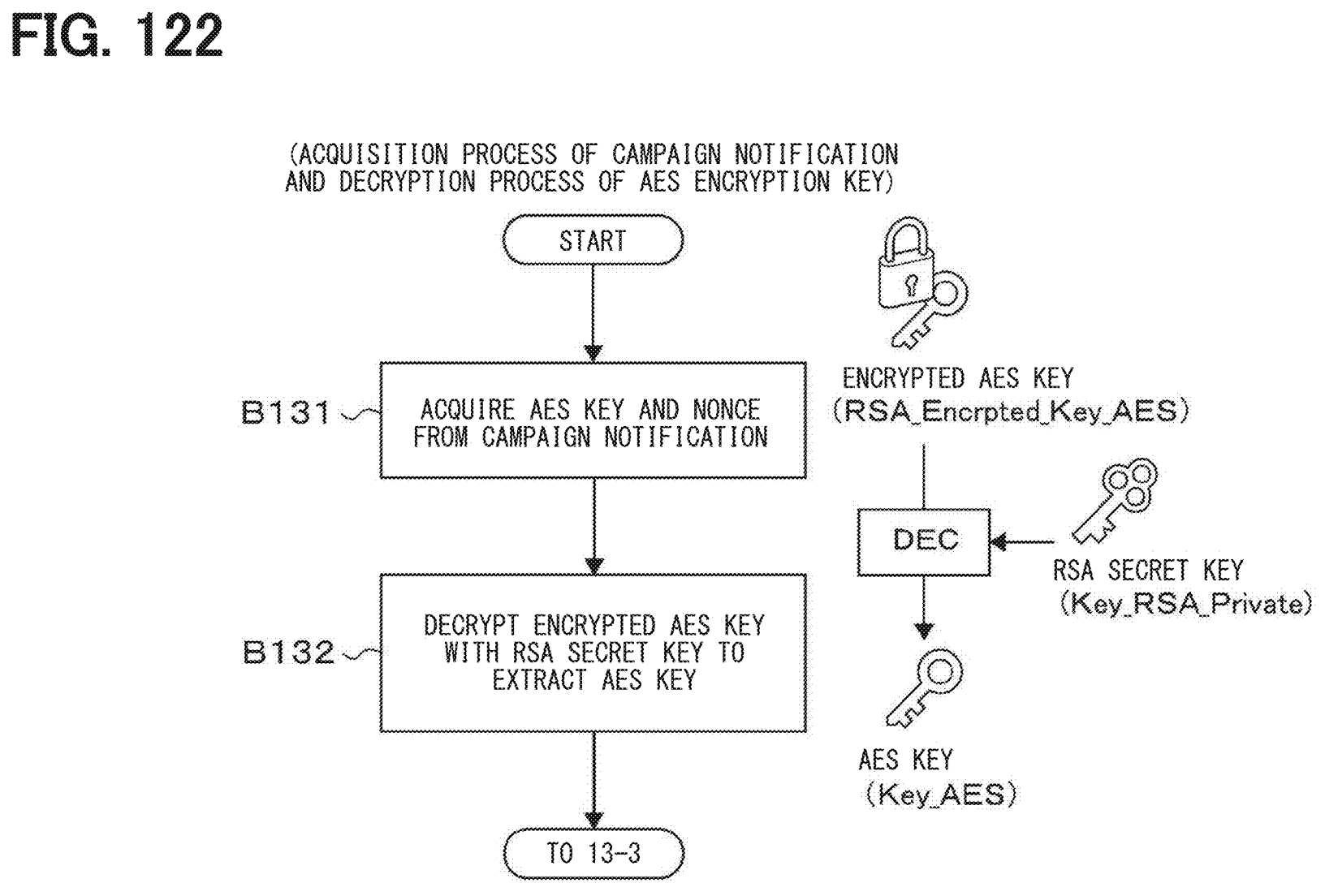

(ACQUISITION PROCESS OF CAMPAIGN NOTIFICATION
AND DECRYPTION PROCESS OF AES ENCRYPTION KEY)

START

B131 — ACQUIRE AES KEY AND NONCE
FROM CAMPAIGN NOTIFICATION

B132 — DECRYPT ENCRYPTED AES KEY
WITH RSA SECRET KEY TO
EXTRACT AES KEY

TO 13-3

ENCRYPTED AES KEY
(RSA_Encrpted_Key_AES)

RSA SECRET KEY
(Key_RSA_Private)

DEC

AES KEY
(Key_AES)

FIG. 123

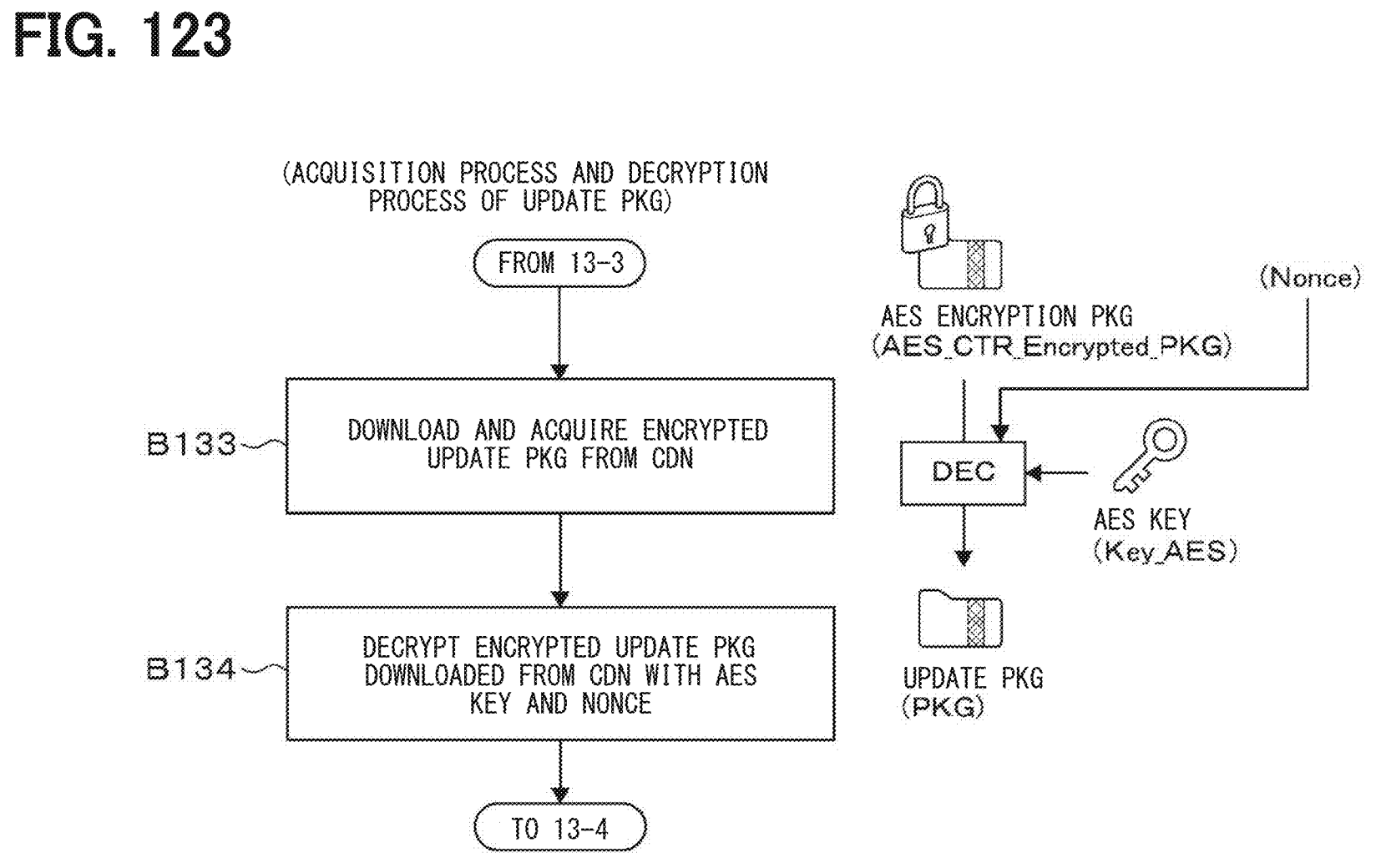

(ACQUISITION PROCESS AND DECRYPTION PROCESS OF UPDATE PKG)

FROM 13-3

B133 — DOWNLOAD AND ACQUIRE ENCRYPTED UPDATE PKG FROM CDN

B134 — DECRYPT ENCRYPTED UPDATE PKG DOWNLOADED FROM CDN WITH AES KEY AND NONCE

TO 13-4

AES ENCRYPTION PKG (AES_CTR_Encrypted_PKG)

(Nonce)

AES KEY (Key_AES)

DEC

UPDATE PKG (PKG)

FIG. 129

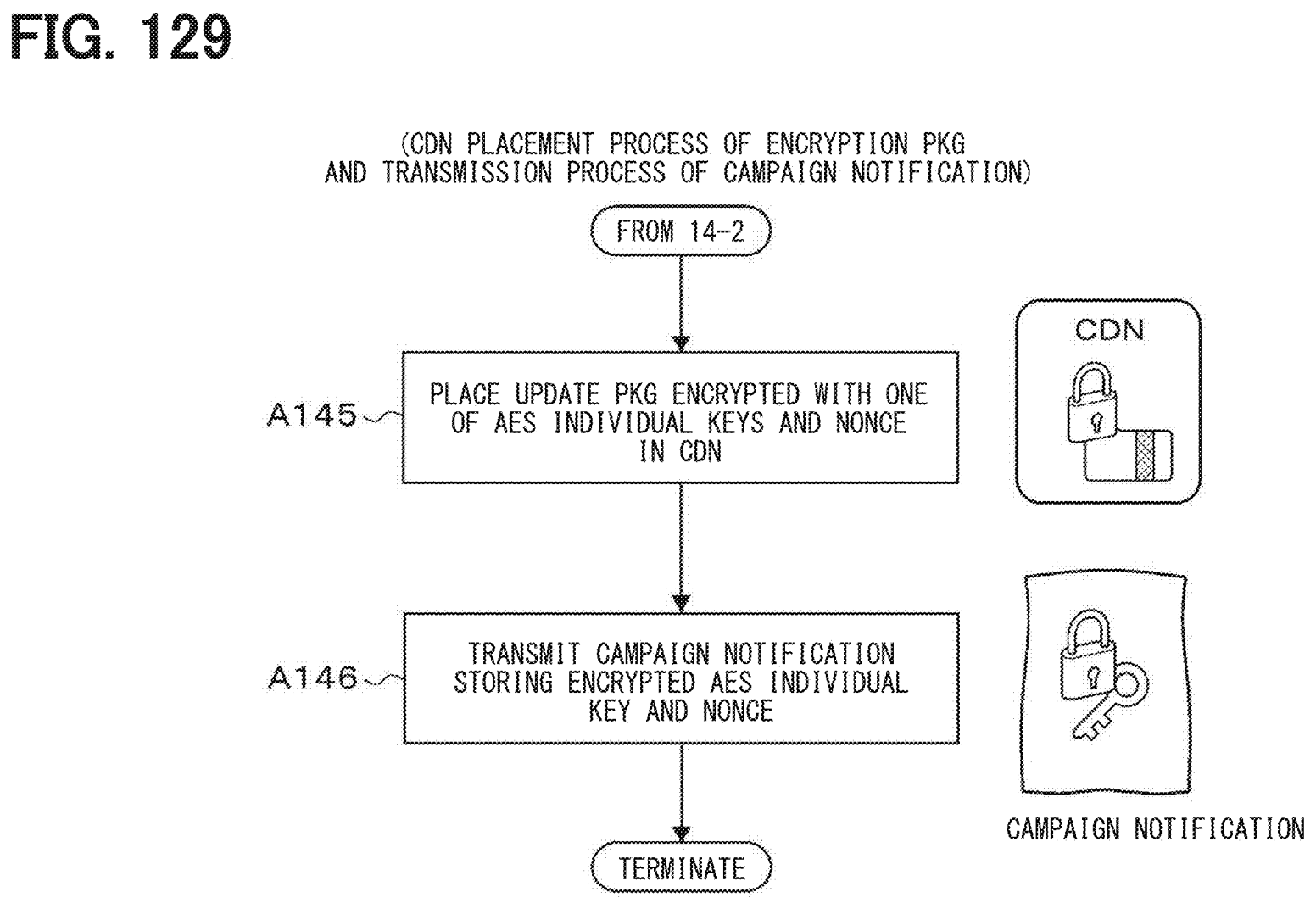

(CDN PLACEMENT PROCESS OF ENCRYPTION PKG
AND TRANSMISSION PROCESS OF CAMPAIGN NOTIFICATION)

FROM 14-2

A145 — PLACE UPDATE PKG ENCRYPTED WITH ONE OF AES INDIVIDUAL KEYS AND NONCE IN CDN

A146 — TRANSMIT CAMPAIGN NOTIFICATION STORING ENCRYPTED AES INDIVIDUAL KEY AND NONCE

TERMINATE

CDN

CAMPAIGN NOTIFICATION

FIG. 130

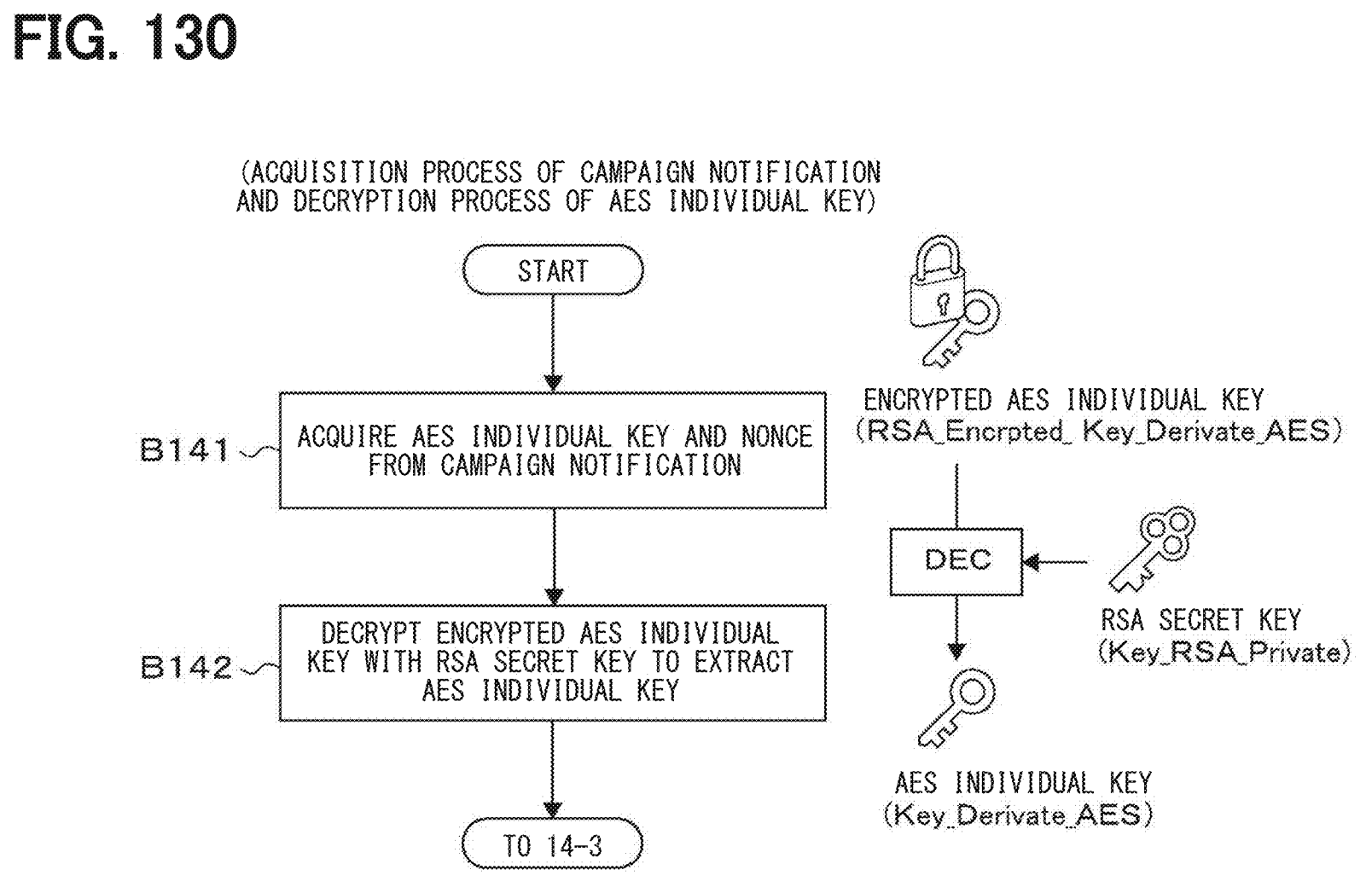

(ACQUISITION PROCESS OF CAMPAIGN NOTIFICATION AND DECRYPTION PROCESS OF AES INDIVIDUAL KEY)

START

B141 — ACQUIRE AES INDIVIDUAL KEY AND NONCE FROM CAMPAIGN NOTIFICATION

B142 — DECRYPT ENCRYPTED AES INDIVIDUAL KEY WITH RSA SECRET KEY TO EXTRACT AES INDIVIDUAL KEY

TO 14-3

ENCRYPTED AES INDIVIDUAL KEY
(RSA_Encrpted_Key_Derivate_AES)

RSA SECRET KEY
(Key_RSA_Private)

DEC

AES INDIVIDUAL KEY
(Key_Derivate_AES)

FIG. 131

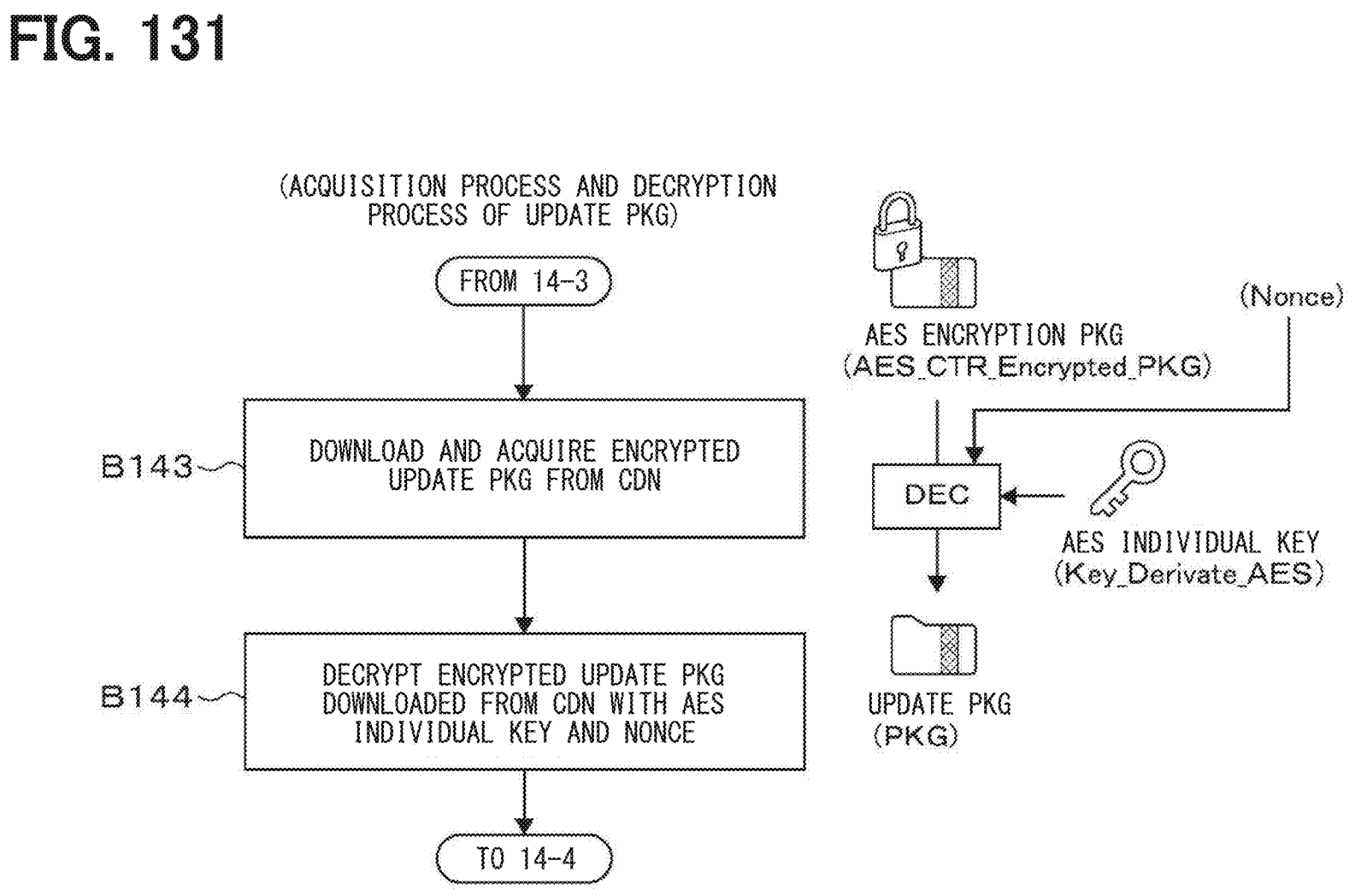

(ACQUISITION PROCESS AND DECRYPTION PROCESS OF UPDATE PKG)

AES ENCRYPTION PKG
(AES_CTR_Encrypted_PKG)

(Nonce)

AES INDIVIDUAL KEY
(Key_Derivate_AES)

DEC

UPDATE PKG
(PKG)

FROM 14-3

DOWNLOAD AND ACQUIRE ENCRYPTED UPDATE PKG FROM CDN — B143

DECRYPT ENCRYPTED UPDATE PKG DOWNLOADED FROM CDN WITH AES INDIVIDUAL KEY AND NONCE — B144

TO 14-4

(GENERATION PROCESS OF NEW KEY)

START

A151 — GENERATE NEW KEY PAIR OF NEW RSA SECRET KEY AND NEW RSA PUBLIC KEY

A152 — ENCRYPT AND PERFORM MAC OPERATION ON GENERATED NEW RSA SECRET KEY USING KEY UPDATE KEY IN CTR MODE, AND GENERATE A KEY UPDATE PKG.

TO 15-1

RSA SECRET KEY (NEW)

RSA PUBLIC KEY (NEW)

KEY UPDATE KEY (Key_Update_AES)

ENC

KEY UPDATE PKG (AES_Key_Update_PKG)

FIG. 135

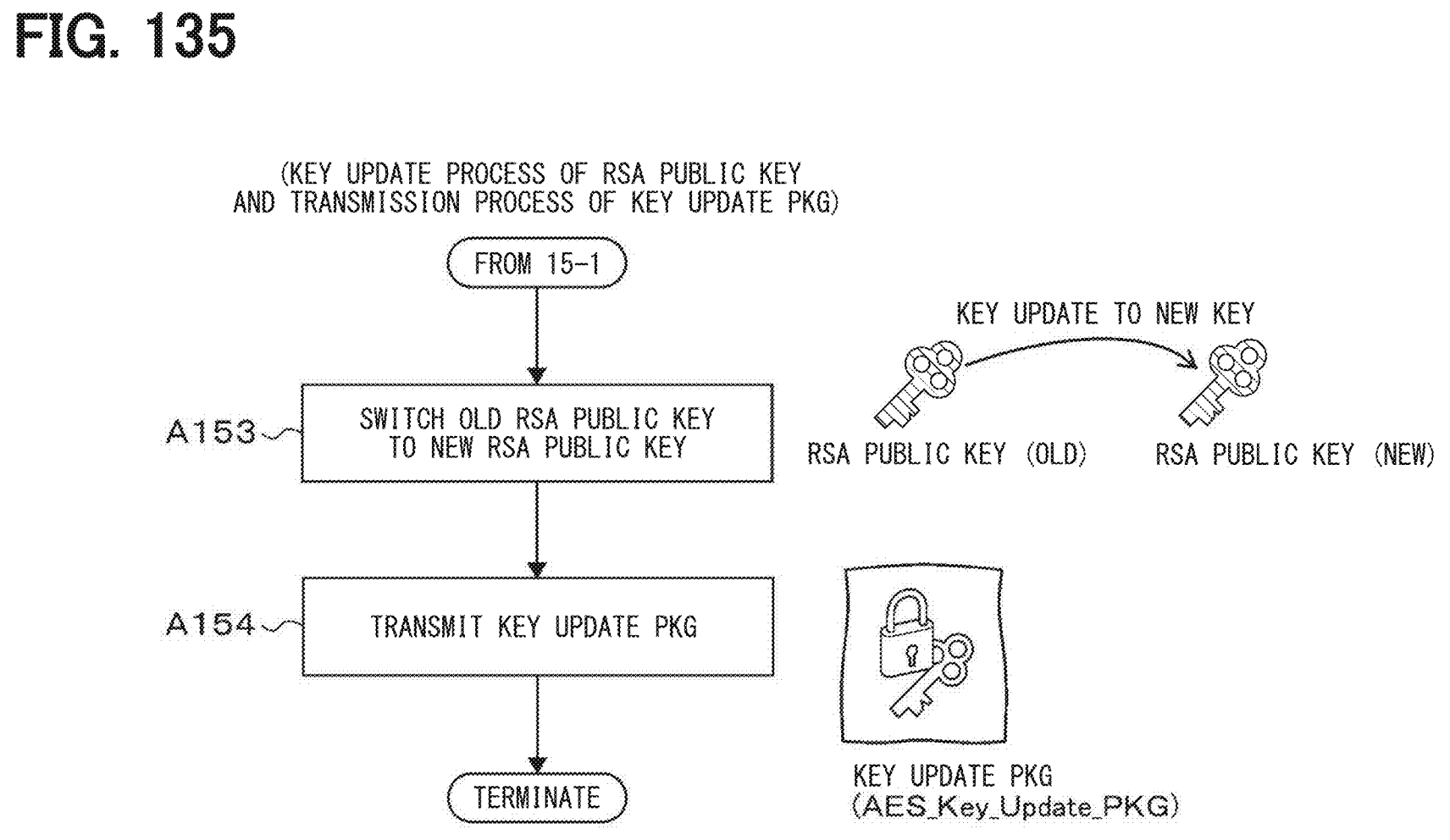

(KEY UPDATE PROCESS OF RSA PUBLIC KEY
AND TRANSMISSION PROCESS OF KEY UPDATE PKG)

FROM 15-1

A153 — SWITCH OLD RSA PUBLIC KEY
TO NEW RSA PUBLIC KEY

A154 — TRANSMIT KEY UPDATE PKG

TERMINATE

KEY UPDATE TO NEW KEY

RSA PUBLIC KEY (OLD)        RSA PUBLIC KEY (NEW)

KEY UPDATE PKG
(AES_Key_Update_PKG)

FIG. 136

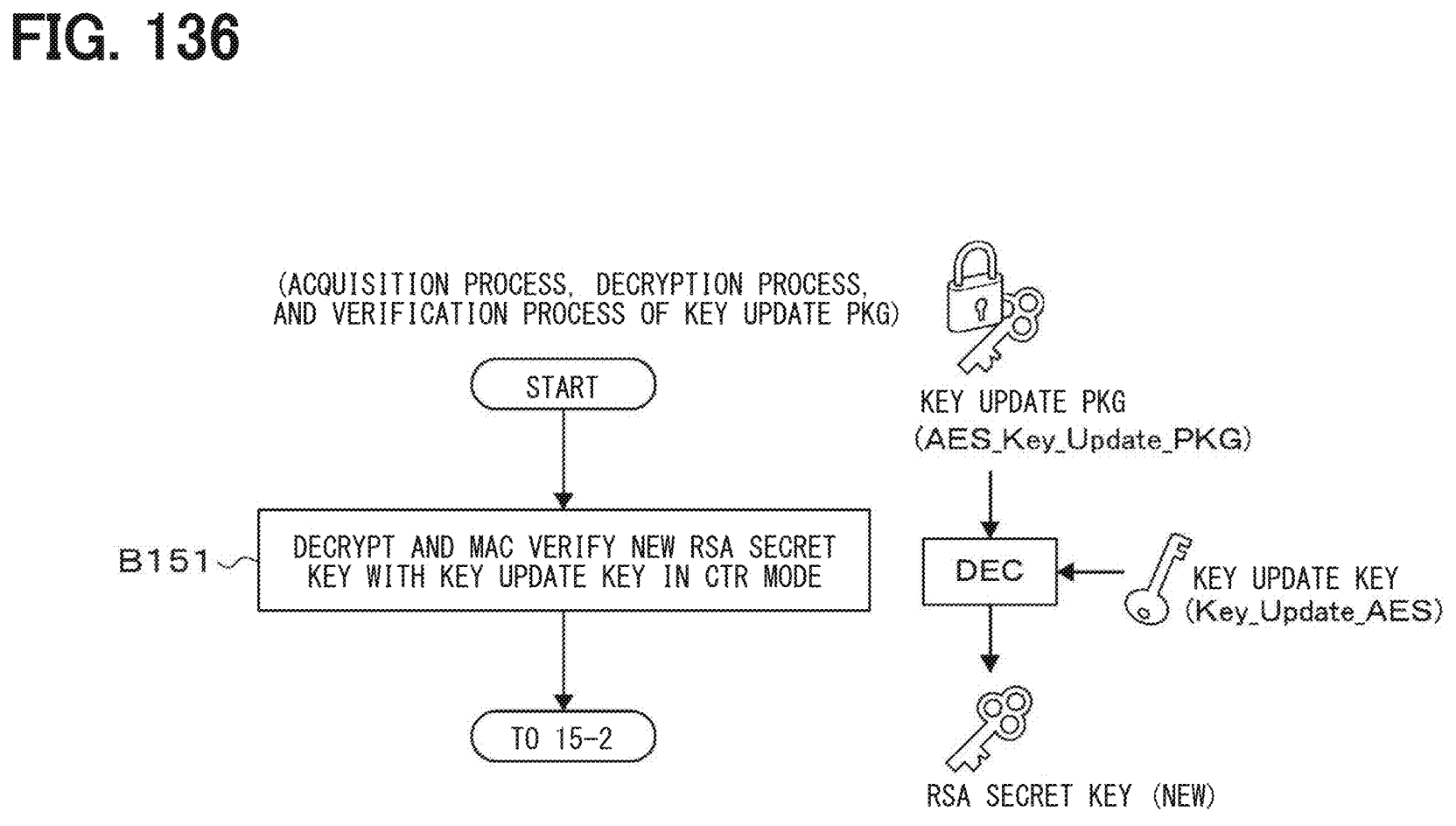

(ACQUISITION PROCESS, DECRYPTION PROCESS, AND VERIFICATION PROCESS OF KEY UPDATE PKG)

KEY UPDATE PKG
(AES_Key_Update_PKG)

KEY UPDATE KEY
(Key_Update_AES)

DEC

RSA SECRET KEY (NEW)

START

B151 — DECRYPT AND MAC VERIFY NEW RSA SECRET KEY WITH KEY UPDATE KEY IN CTR MODE

Figure 137:
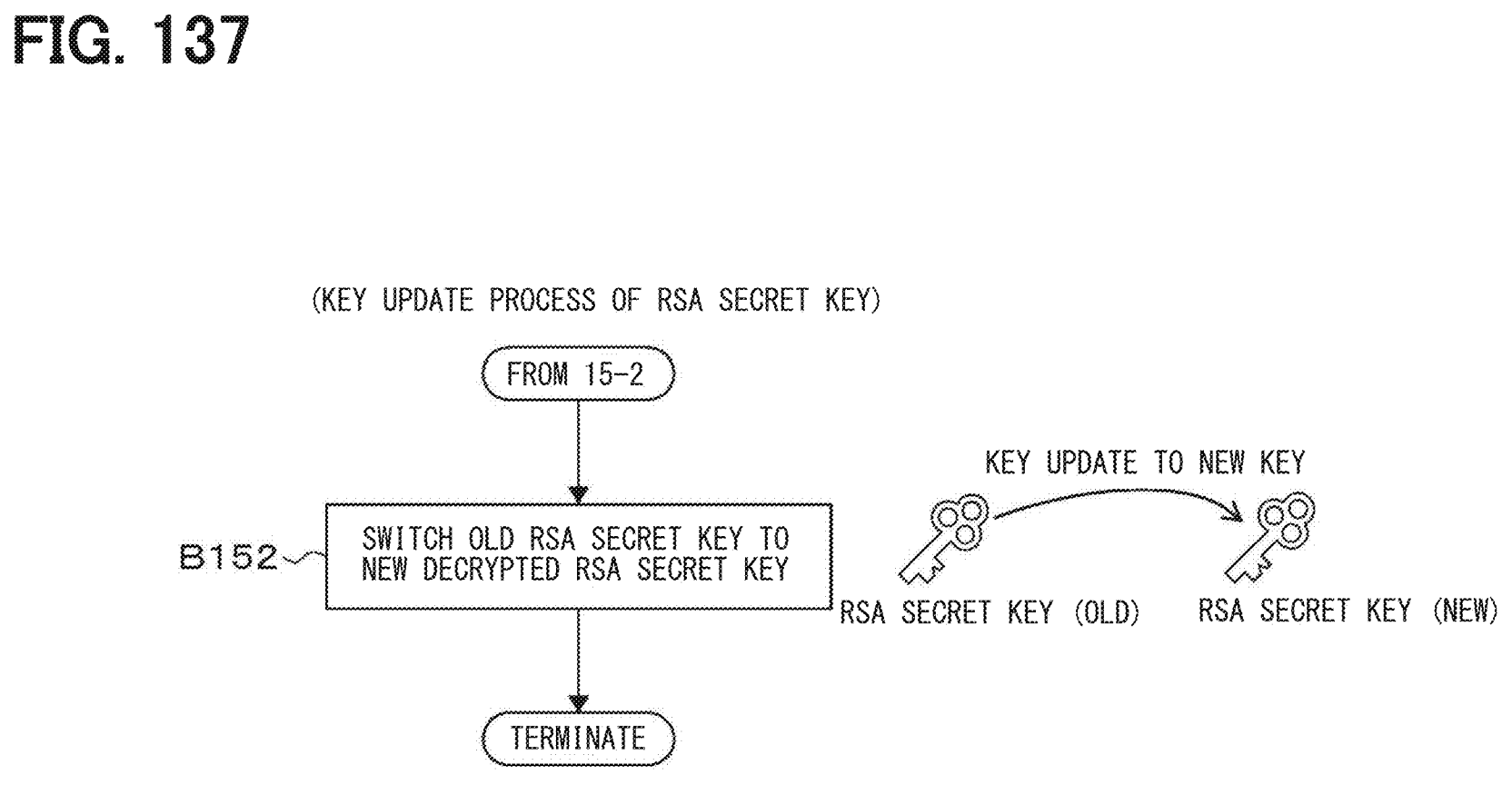

(KEY UPDATE PROCESS OF RSA SECRET KEY)

FROM 15-2

B152 — SWITCH OLD RSA SECRET KEY TO NEW DECRYPTED RSA SECRET KEY

TERMINATE

KEY UPDATE TO NEW KEY

RSA SECRET KEY (OLD)     RSA SECRET KEY (NEW)

FIG. 141

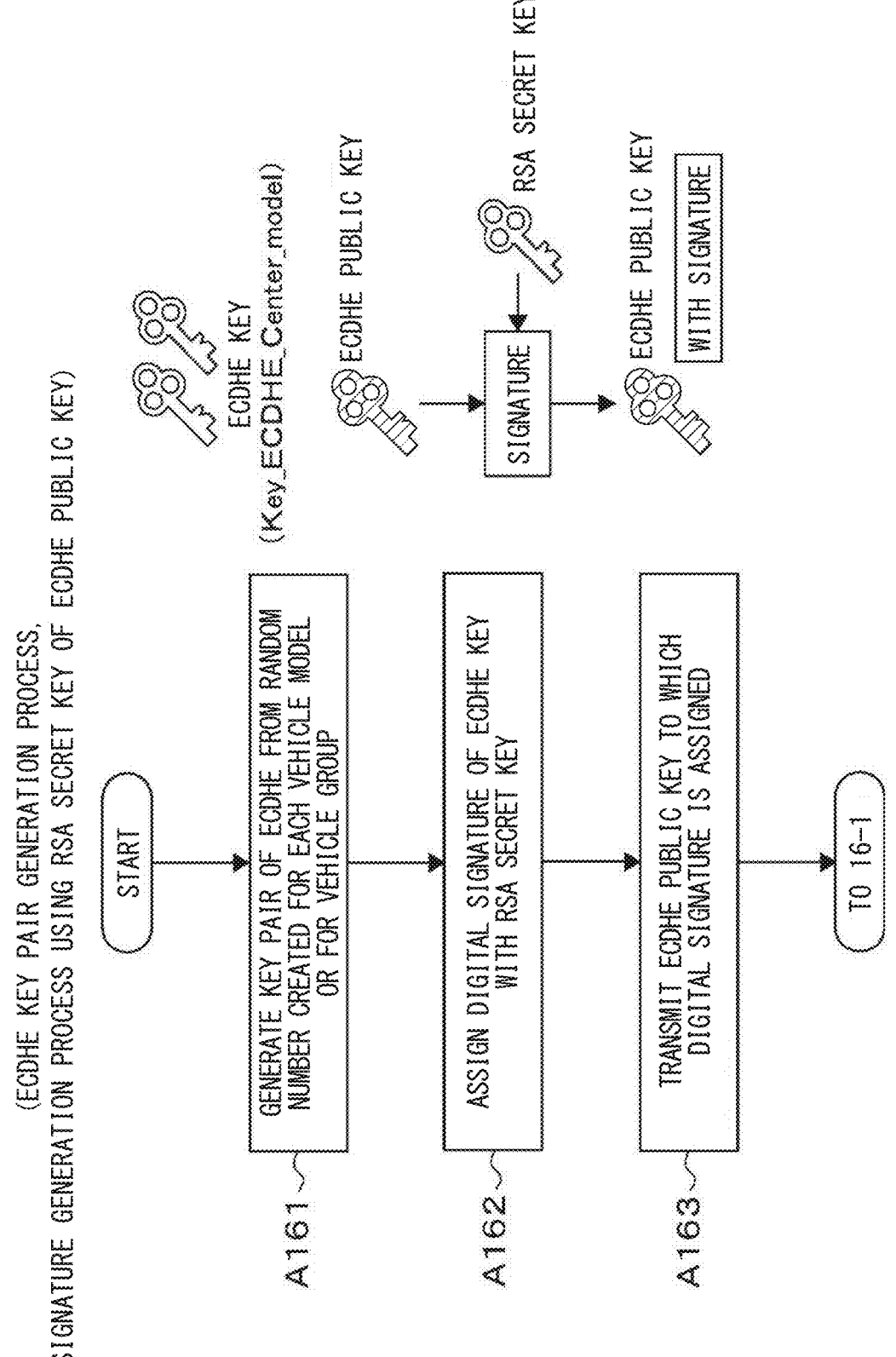

(ECDHE KEY PAIR GENERATION PROCESS, SIGNATURE GENERATION PROCESS USING RSA SECRET KEY OF ECDHE PUBLIC KEY)

START

A161 — GENERATE KEY PAIR OF ECDHE FROM RANDOM NUMBER CREATED FOR EACH VEHICLE MODEL OR FOR VEHICLE GROUP

ECDHE KEY (Key_ECDHE_Center_model)

A162 — ASSIGN DIGITAL SIGNATURE OF ECDHE KEY WITH RSA SECRET KEY

ECDHE PUBLIC KEY

RSA SECRET KEY

SIGNATURE

A163 — TRANSMIT ECDHE PUBLIC KEY TO WHICH DIGITAL SIGNATURE IS ASSIGNED

ECDHE PUBLIC KEY WITH SIGNATURE

Figure 143:
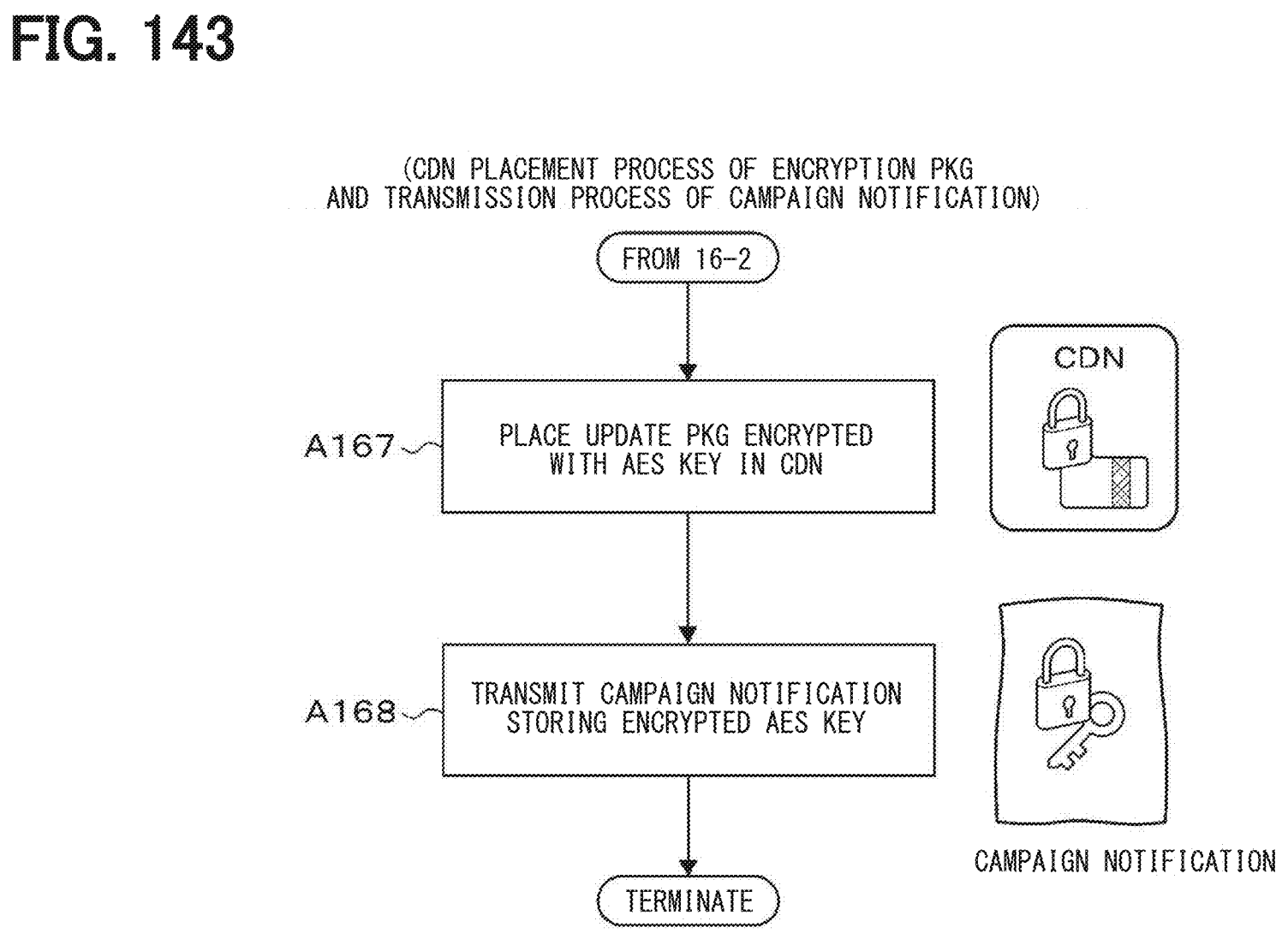

(CDN PLACEMENT PROCESS OF ENCRYPTION PKG
AND TRANSMISSION PROCESS OF CAMPAIGN NOTIFICATION)

FROM 16-2

A167 — PLACE UPDATE PKG ENCRYPTED WITH AES KEY IN CDN

A168 — TRANSMIT CAMPAIGN NOTIFICATION STORING ENCRYPTED AES KEY

TERMINATE

CDN

CAMPAIGN NOTIFICATION

FIG. 144

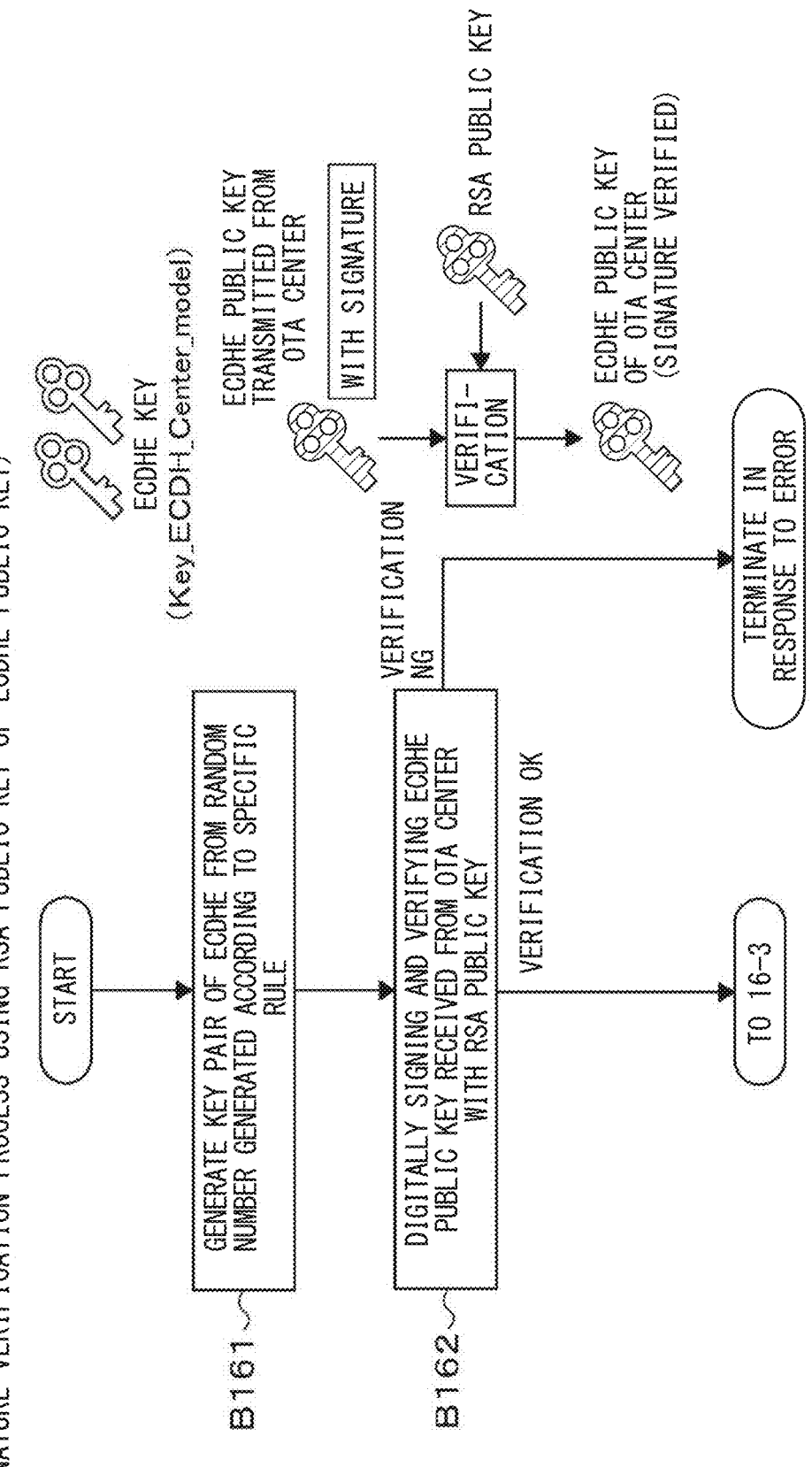

(ECDHE KEY PAIR GENERATION PROCESS, SIGNATURE VERIFICATION PROCESS USING RSA PUBLIC KEY OF ECDHE PUBLIC KEY)

START

B161 — GENERATE KEY PAIR OF ECDHE FROM RANDOM NUMBER GENERATED ACCORDING TO SPECIFIC RULE

ECDHE KEY (Key_ECDH_Center_model)

B162 — DIGITALLY SIGNING AND VERIFYING ECDHE PUBLIC KEY RECEIVED FROM OTA CENTER WITH RSA PUBLIC KEY

ECDHE PUBLIC KEY TRANSMITTED FROM OTA CENTER

WITH SIGNATURE

RSA PUBLIC KEY

VERIFI-CATION

ECDHE PUBLIC KEY OF OTA CENTER (SIGNATURE VERIFIED)

VERIFICATION NG

TERMINATE IN RESPONSE TO ERROR

VERIFICATION OK

TO 16-3

(KEY EXCHANGE PROCESS BY ECDHE)

FROM 16-3

B163 — EXCHANGE SECRET KEY WITH OTA CENTER IN ECDHE ALGORITHM

PROCESS AFTER STEP B113

SECRET KEY THAT CAN BE EXCHANGED BY ECDHE (COMMON FOR EACH VEHICLE MODEL) (S)

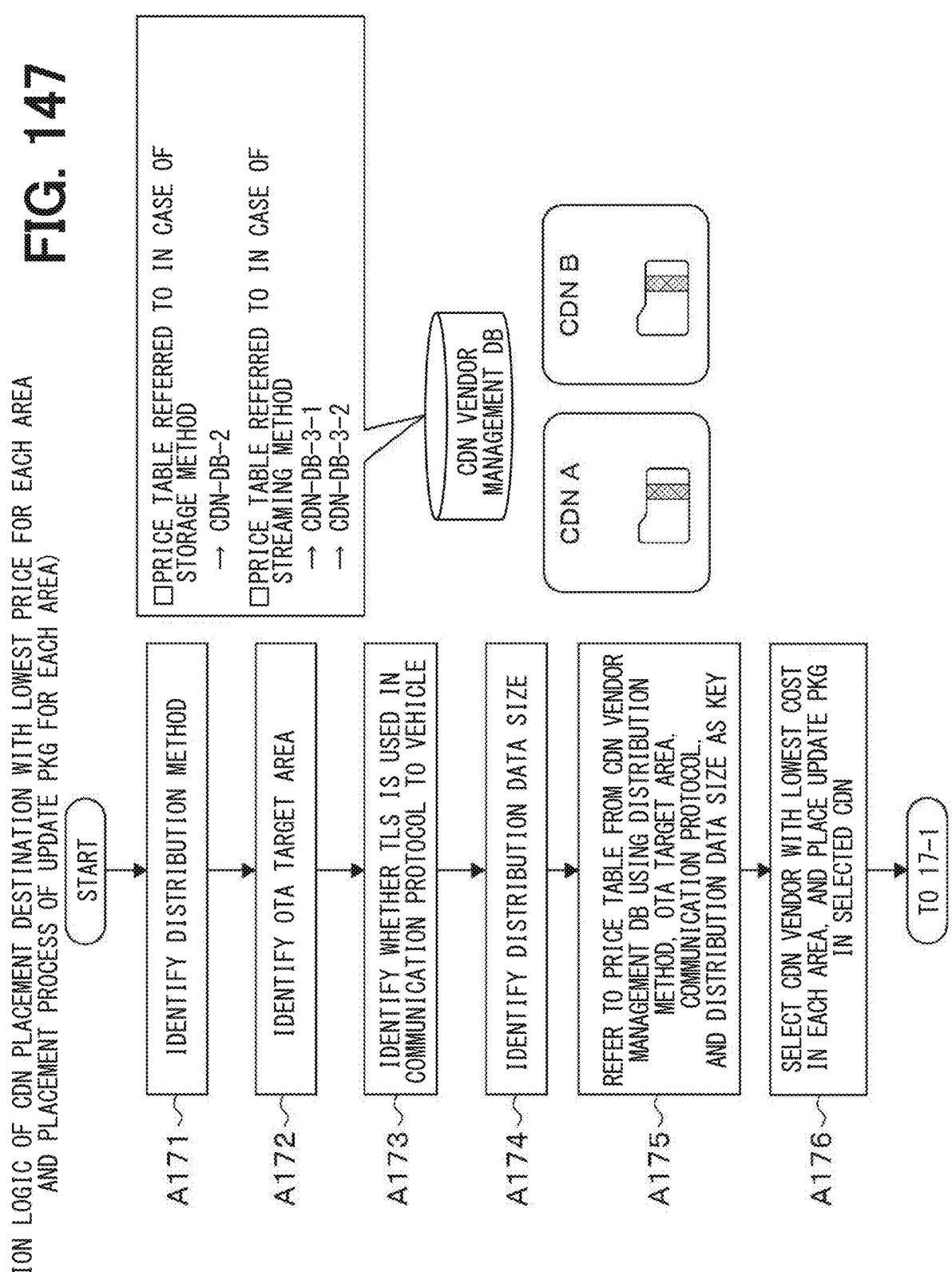

FIG. 147

(SELECTION LOGIC OF CDN PLACEMENT DESTINATION WITH LOWEST PRICE FOR EACH AREA AND PLACEMENT PROCESS OF UPDATE PKG FOR EACH AREA)

START

A171 — IDENTIFY DISTRIBUTION METHOD

A172 — IDENTIFY OTA TARGET AREA

A173 — IDENTIFY WHETHER TLS IS USED IN COMMUNICATION PROTOCOL TO VEHICLE

A174 — IDENTIFY DISTRIBUTION DATA SIZE

A175 — REFER TO PRICE TABLE FROM CDN VENDOR MANAGEMENT DB USING DISTRIBUTION METHOD, OTA TARGET AREA, COMMUNICATION PROTOCOL, AND DISTRIBUTION DATA SIZE AS KEY

A176 — SELECT CDN VENDOR WITH LOWEST COST IN EACH AREA, AND PLACE UPDATE PKG IN SELECTED CDN

TO 17-1

□ PRICE TABLE REFERRED TO IN CASE OF STORAGE METHOD
  → CDN-DB-2
□ PRICE TABLE REFERRED TO IN CASE OF STREAMING METHOD
  → CDN-DB-3-1
  → CDN-DB-3-2

CDN VENDOR MANAGEMENT DB

CDN A

CDN B (TRANSMISSION PROCESS OF CAMPAIGN NOTIFICATION)

FROM 17-1

A177

TRANSMIT CAMPAIGN NOTIFICATION

TERMINATE

CDN VENDOR (1)

DATA STORAGE DESTINATION URI INFORMATION (2)

CAMPAIGN NOTIFICATION

FIG. 149

(ACQUISITION PROCESS OF CAMPAIGN NOTIFICATION
AND ESTABLISHING PROCESS OF TLS COMMUNICATION PATH WITH CDN)

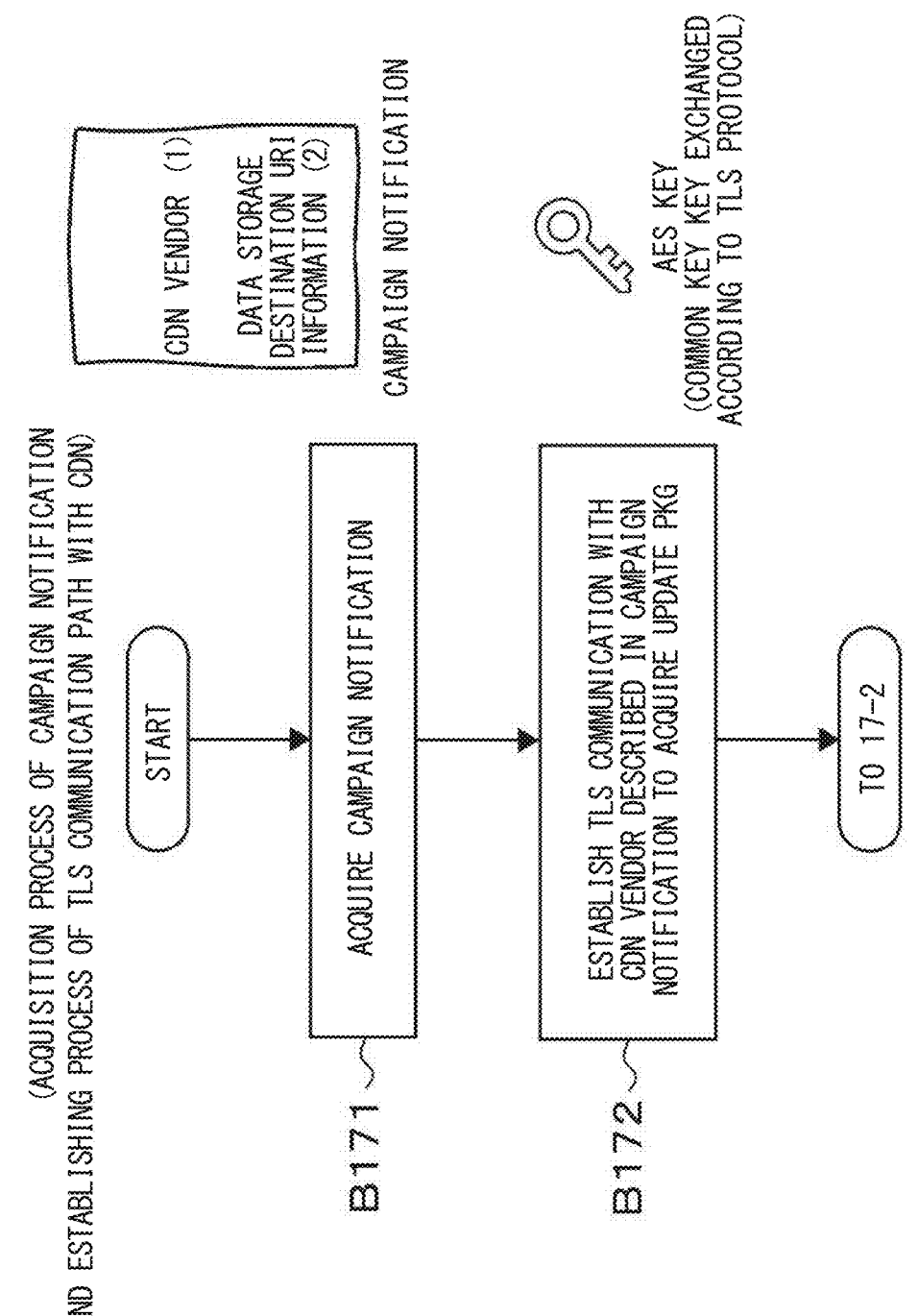

START

B171 — ACQUIRE CAMPAIGN NOTIFICATION

B172 — ESTABLISH TLS COMMUNICATION WITH CDN VENDOR DESCRIBED IN CAMPAIGN NOTIFICATION TO ACQUIRE UPDATE PKG

TO 17-2

CDN VENDOR  (1)

DATA STORAGE DESTINATION URI INFORMATION  (2)

CAMPAIGN NOTIFICATION

AES KEY
(COMMON KEY KEY EXCHANGED ACCORDING TO TLS PROTOCOL)

FIG. 150

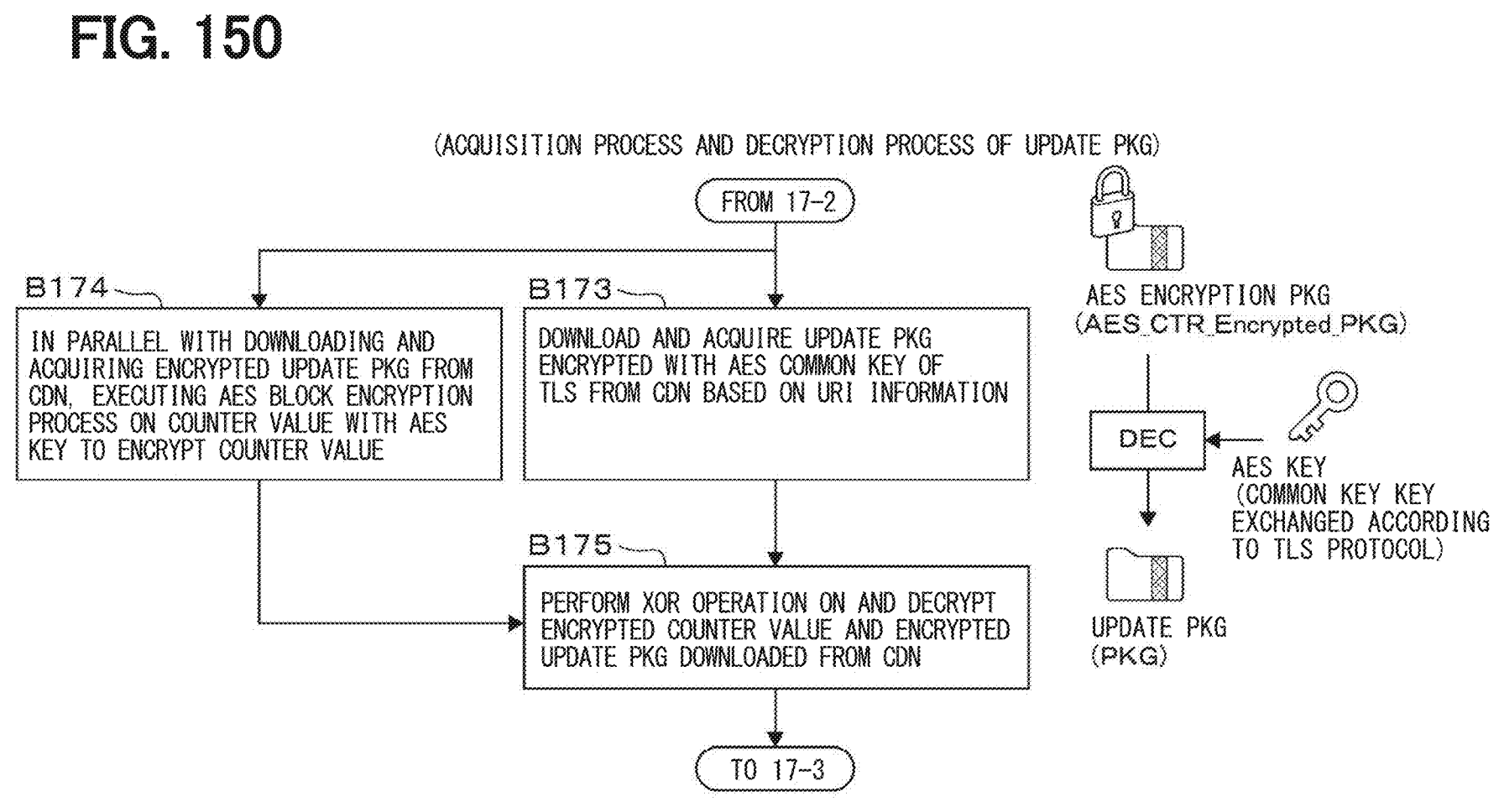

(ACQUISITION PROCESS AND DECRYPTION PROCESS OF UPDATE PKG)

FROM 17-2

B173

DOWNLOAD AND ACQUIRE UPDATE PKG ENCRYPTED WITH AES COMMON KEY OF TLS FROM CDN BASED ON URI INFORMATION

B174

IN PARALLEL WITH DOWNLOADING AND ACQUIRING ENCRYPTED UPDATE PKG FROM CDN, EXECUTING AES BLOCK ENCRYPTION PROCESS ON COUNTER VALUE WITH AES KEY TO ENCRYPT COUNTER VALUE

B175

PERFORM XOR OPERATION ON AND DECRYPT ENCRYPTED COUNTER VALUE AND ENCRYPTED UPDATE PKG DOWNLOADED FROM CDN

TO 17-3

AES ENCRYPTION PKG (AES_CTR_Encrypted_PKG)

DEC

AES KEY (COMMON KEY KEY EXCHANGED ACCORDING TO TLS PROTOCOL)

UPDATE PKG (PKG)

FIG. 153

CDN-DB-1
CDN PRICE TABLE OF EACH CLOUD SERVICE (BASE)

CDN1 · FEE TABLE PER GB

| | ~10TB | ~40TB | ~100TB | ~350TB | ~500TB | ~4PB | 5PB~ |
|---|---|---|---|---|---|---|---|
| JAPAN | 0.129 USD | 0.121 USD | 0.112 USD | 0.093 USD | 0.075 USD | 0.065 USD | 0.065 USD |
| NORTH AMERICA | 0.081 USD | 0.075 USD | 0.056 USD | 0.037 USD | 0.028 USD | 0.023 USD | 0.023 USD |
| EU | 0.081 USD | 0.075 USD | 0.056 USD | 0.037 USD | 0.028 USD | 0.023 USD | 0.023 USD |

CDN2 · FEE TABLE PER GB

| | ~10TB | ~40TB | ~100TB | ~350TB | ~524TB | ~4PB | 5PB~ |
|---|---|---|---|---|---|---|---|
| JAPAN | 0.114 USD | 0.089 USD | 0.086 USD | 0.084 USD | 0.080 USD | 0.070 USD | 0.060 USD |
| NORTH AMERICA | 0.085 USD | 0.080 USD | 0.060 USD | 0.040 USD | 0.030 USD | 0.025 USD | 0.020 USD |
| EU | 0.085 USD | 0.080 USD | 0.060 USD | 0.040 USD | 0.030 USD | 0.025 USD | 0.015 USD |

CDN2 · REQUEST FEE TABLE FOR HTTP METHOD

| | HTTP REQUEST | HTTPS REQUEST |
|---|---|---|
| JAPAN | 0.009 USD | 0.012 USD |
| NORTH AMERICA | 0.075 USD | 0.010 USD |
| EU | 0.009 USD | 0.012 USD |

CDN VENDOR MANAGEMENT DB

FIG. 154

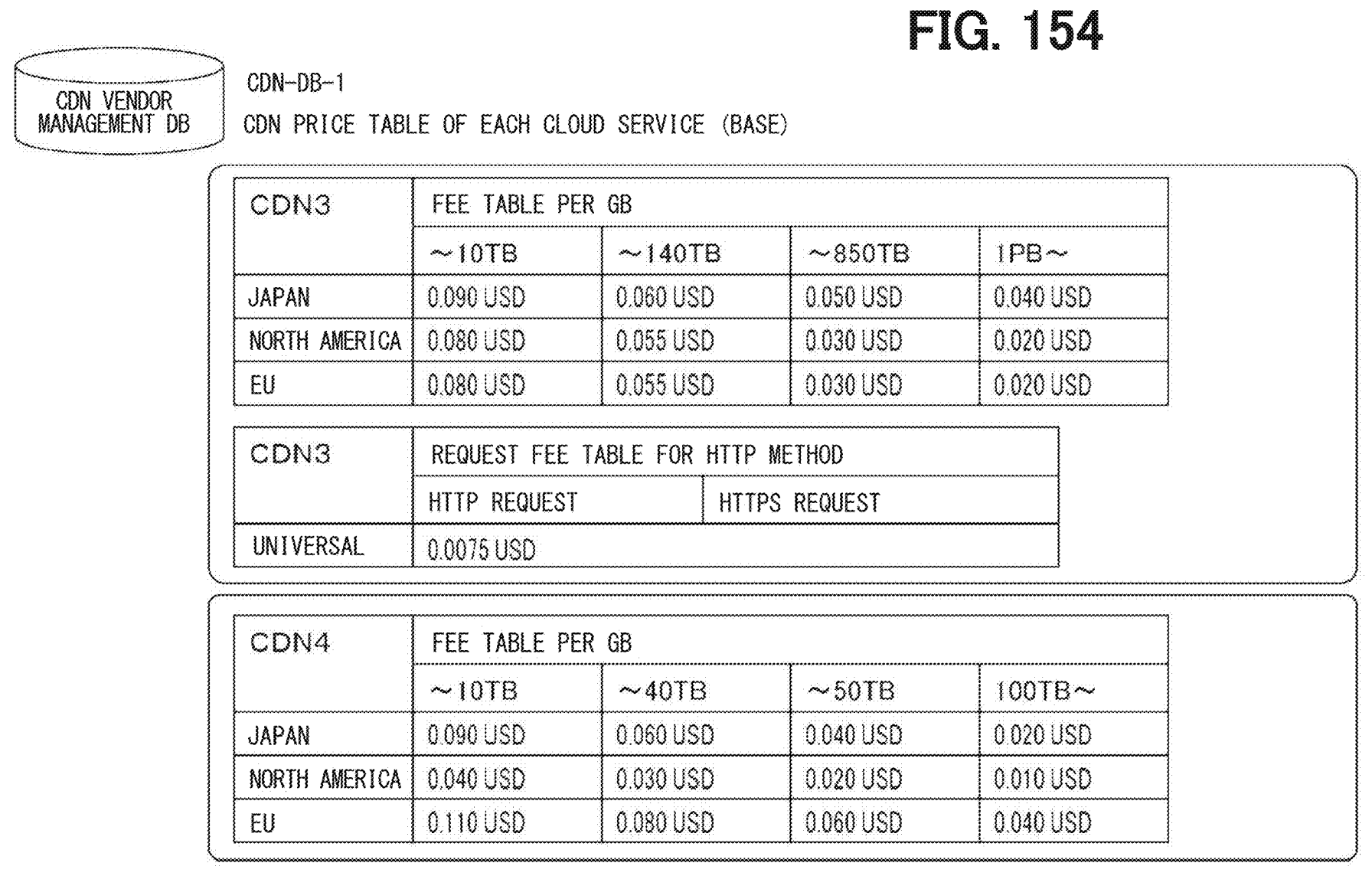

CDN-DB-1
CDN PRICE TABLE OF EACH CLOUD SERVICE (BASE)

| CDN3 | FEE TABLE PER GB | | | | |
|---|---|---|---|---|---|
| | ~10TB | ~140TB | ~850TB | 1PB~ | |
| JAPAN | 0.090 USD | 0.060 USD | 0.050 USD | 0.040 USD | |
| NORTH AMERICA | 0.080 USD | 0.055 USD | 0.030 USD | 0.020 USD | |
| EU | 0.080 USD | 0.055 USD | 0.030 USD | 0.020 USD | |

| CDN3 | REQUEST FEE TABLE FOR HTTP METHOD | |
|---|---|---|
| | HTTP REQUEST | HTTPS REQUEST |
| UNIVERSAL | 0.0075 USD | |

| CDN4 | FEE TABLE PER GB | | | |
|---|---|---|---|---|
| | ~10TB | ~40TB | ~50TB | 100TB~ |
| JAPAN | 0.090 USD | 0.060 USD | 0.040 USD | 0.020 USD |
| NORTH AMERICA | 0.040 USD | 0.030 USD | 0.020 USD | 0.010 USD |
| EU | 0.110 USD | 0.080 USD | 0.060 USD | 0.040 USD |

CDN VENDOR
MANAGEMENT DB

FIG. 155

CDN VENDOR MANAGEMENT DB

CDN-DB-2
PRICE TABLE OF STORAGE METHOD OF EACH CLOUD SERVICE BUSINESS OPERATOR

CDN1

| STORAGE METHOD<br>THE NUMBER OF TARGET VEHICLES: 2 MILLION | FEE TABLE | | | |
|---|---|---|---|---|
| | 100MB | 1GB | 10GB | 20GB |
| JAPAN | 2.45 MILLION YEN | 14.52 MILLION YEN | 145.6 MILLION YEN | 291.2 MILLION YEN |
| NORTH AMERICA | 1.25 MILLION YEN | 5.12 MILLION YEN | 505 MILLION YEN | 1001 MILLION YEN |
| EU | 1.25 MILLION YEN | 5.12 MILLION YEN | 505 MILLION YEN | 1001 MILLION YEN |

CDN2

| STORAGE METHOD<br>THE NUMBER OF TARGET VEHICLES: 2 MILLION | FEE TABLE | | | |
|---|---|---|---|---|
| | 100MB | 1GB | 10GB | 20GB |
| JAPAN | 1.89 MILLION YEN | 17.6 MILLION YEN | 132 MILLION YEN | 264 MILLION YEN |
| NORTH AMERICA | 880,000 YEN | 6.6 MILLION YEN | 44 MILLION YEN | 88 MILLION YEN |
| EU | 1.32 MILLION YEN | 6.6 MILLION YEN | 44 MILLION YEN | 88 MILLION YEN |

FIG. 156

CDN VENDOR MANAGEMENT DB

CDN-DB-2
PRICE TABLE OF STORAGE METHOD OF EACH CLOUD SERVICE BUSINESS OPERATOR

| CDN3 STORAGE METHOD THE NUMBER OF TARGET VEHICLES: 2 MILLION | FEE TABLE | | | |
|---|---|---|---|---|
| | 100MB | 1GB | 10GB | 20GB |
| JAPAN | 2.45 MILLION YEN | 14.52 MILLION YEN | 145.6 MILLION YEN | 291.2 MILLION YEN |
| NORTH AMERICA | 1.25 MILLION YEN | 5.12 MILLION YEN | 505 MILLION YEN | 1001 MILLION YEN |
| EU | 1.25 MILLION YEN | 5.12 MILLION YEN | 505 MILLION YEN | 1001 MILLION YEN |

| CDN4 STORAGE METHOD THE NUMBER OF TARGET VEHICLES: 2 MILLION | FEE TABLE | | | |
|---|---|---|---|---|
| | 100MB | 1GB | 10GB | 20GB |
| JAPAN | 1.89 MILLION YEN | 17.6 MILLION YEN | 132 MILLION YEN | 264 MILLION YEN |
| NORTH AMERICA | 880,000 YEN | 6.6 MILLION YEN | 44 MILLION YEN | 88 MILLION YEN |
| EU | 1.32 MILLION YEN | 6.6 MILLION YEN | 44 MILLION YEN | 88 MILLION YEN |

FIG. 157

GDN VENDOR MANAGEMENT DB   CDN-DB-3-1   PRICE TABLE FOR EACH STREAMING SIZE IN STREAMING METHOD OF EACH CLOUD SERVICE BUSINESS OPERATOR

FEE TABLE

| CDN1 | STREAMING SIZE: 1KB THE NUMBER OF TARGET VEHICLES: 2 MILLION | 100MB | 1GB | 10GB | 20GB |
|---|---|---|---|---|---|
| JAPAN | | 2.45 MILLION YEN | 14.52 MILLION YEN | 145.6 MILLION YEN | 291.2 MILLION YEN |
| NORTH AMERICA | | 1.25 MILLION YEN | 5.12 MILLION YEN | 505 MILLION YEN | 1001 MILLION YEN |
| EU | | 1.25 MILLION YEN | 5.12 MILLION YEN | 505 MILLION YEN | 1001 MILLION YEN |

FEE TABLE

| CDN1 | STREAMING SIZE: 10KB THE NUMBER OF TARGET VEHICLES: 2 MILLION | 100MB | 1GB | 10GB | 20GB |
|---|---|---|---|---|---|
| JAPAN | | 2.45 MILLION YEN | 14.52 MILLION YEN | 145.6 MILLION YEN | 291.2 MILLION YEN |
| NORTH AMERICA | | 1.25 MILLION YEN | 5.12 MILLION YEN | 505 MILLION YEN | 1001 MILLION YEN |
| EU | | 1.25 MILLION YEN | 5.12 MILLION YEN | 505 MILLION YEN | 1001 MILLION YEN |

FEE TABLE

| CDN1 | STREAMING SIZE: 100KB THE NUMBER OF TARGET VEHICLES: 2 MILLION | 100MB | 1GB | 10GB | 20GB |
|---|---|---|---|---|---|
| JAPAN | | 2.45 MILLION YEN | 14.52 MILLION YEN | 145.6 MILLION YEN | 291.2 MILLION YEN |
| NORTH AMERICA | | 1.25 MILLION YEN | 5.12 MILLION YEN | 505 MILLION YEN | 1001 MILLION YEN |
| EU | | 1.25 MILLION YEN | 5.12 MILLION YEN | 505 MILLION YEN | 1001 MILLION YEN |

FIG. 158

CDN VENDOR MANAGEMENT DB   CDN-DB-3-2   PRICE TABLE FOR EACH STREAMING SIZE IN STREAMING METHOD OF EACH CLOUD SERVICE BUSINESS OPERATOR

STREAMING SIZE: 1KB, THE NUMBER OF TARGET VEHICLES: 2 MILLION

FEE TABLE (HTTP/HTTPS)

| CDN2 | 100MB | 1GB | 10GB | 20GB |
|---|---|---|---|---|
| JAPAN | 21.69 MILLION YEN/ 28.29 MILLION YEN | 215.6 MILLION YEN/ 281.6 MILLION YEN | 2112 MILLION YEN/ 2772 MILLION YEN | 4224 MILLION YEN/ 5544 MILLION YEN |
| NORTH AMERICA | 17.38 MILLION YEN/ 22.88 MILLION YEN | 171.6 MILLION YEN/ 226.6 MILLION YEN | 1694 MILLION YEN/ 2244 MILLION YEN | 3388 MILLION YEN/ 4488 MILLION YEN |
| EU | 21.12 MILLION YEN/ 27.72 MILLION YEN | 204.6 MILLION YEN/ 270.6 MILLION YEN | 2024 MILLION YEN/ 2684 MILLION YEN | 4048 MILLION YEN/ 5368 MILLION YEN |

STREAMING SIZE: 10KB, THE NUMBER OF TARGET VEHICLES: 2 MILLION

FEE TABLE (HTTP/HTTPS)

| CDN2 | 100MB | 1GB | 10GB | 20GB |
|---|---|---|---|---|
| JAPAN | 3.87 MILLION YEN/ 4.53 MILLION YEN | 37.4 MILLION YEN/ 44 MILLION YEN | 330 MILLION YEN/ 396 MILLION YEN | 660 MILLION YEN/ 792 MILLION YEN |
| NORTH AMERICA | 2.53 MILLION YEN/ 3.08 MILLION YEN | 23.1 MILLION YEN/ 28.6 MILLION YEN | 209 MILLION YEN/ 264 MILLION YEN | 485 MILLION YEN/ 528 MILLION YEN |
| EU | 3.3 MILLION YEN/ 3.96 MILLION YEN | 26.4 MILLION YEN/ 33 MILLION YEN | 242 MILLION YEN/ 308 MILLION YEN | 484 MILLION YEN/ 616 MILLION YEN |

STREAMING SIZE: 100KB, THE NUMBER OF TARGET VEHICLES: 2 MILLION

FEE TABLE (HTTP/HTTPS)

| CDN2 | 100MB | 1GB | 10GB | 20GB |
|---|---|---|---|---|
| JAPAN | 2.09 MILLION YEN/ 2.16 MILLION YEN | 19.58 MILLION YEN/ 20.24 MILLION YEN | 151.8 MILLION YEN/ 158.4 MILLION YEN | 303.6 MILLION YEN/ 316.8 MILLION YEN |
| NORTH AMERICA | 1.05 MILLION YEN/ 1.1 MILLION YEN | 8.25 MILLION YEN/ 8.8 MILLION YEN | 60.5 MILLION YEN/ 66 MILLION YEN | 121 MILLION YEN/ 132 MILLION YEN |
| EU | 1.52 MILLION YEN/ 1.58 MILLION YEN | 8.58 MILLION YEN/ 9.24 MILLION YEN | 63.8 MILLION YEN/ 70.4 MILLION YEN | 127.6 MILLION YEN/ 140.8 MILLION YEN |

FIG. 159

CDN VENDOR MANAGEMENT DB

CDN-DB-3-3  PRICE TABLE FOR EACH STREAMING SIZE IN STREAMING METHOD OF EACH CLOUD SERVICE BUSINESS OPERATOR

| CDN3 STREAMING SIZE: 1KB THE NUMBER OF TARGET VEHICLES: 2 MILLION | FEE TABLE | | | | |
|---|---|---|---|---|---|
| | 100MB | 1GB | 10GB | 20GB |
| JAPAN | 1.34 MILLION YEN | 4.57 MILLION YEN | 45.67 MILLION YEN | 91.3 MILLION YEN |
| NORTH AMERICA | 1.34 MILLION YEN | 4.57 MILLION YEN | 45.67 MILLION YEN | 91.3 MILLION YEN |
| EU | 1.34 MILLION YEN | 4.57 MILLION YEN | 45.67 MILLION YEN | 91.3 MILLION YEN |

| CDN3 STREAMING SIZE: 10KB THE NUMBER OF TARGET VEHICLES: 2 MILLION | FEE TABLE | | | | |
|---|---|---|---|---|---|
| | 100MB | 1GB | 10GB | 20GB |
| JAPAN | 1.32 MILLION YEN | 4.42 MILLION YEN | 44.17 MILLION YEN | 88.33 MILLION YEN |
| NORTH AMERICA | 1.32 MILLION YEN | 4.42 MILLION YEN | 44.17 MILLION YEN | 88.33 MILLION YEN |
| EU | 1.32 MILLION YEN | 4.42 MILLION YEN | 44.17 MILLION YEN | 88.33 MILLION YEN |

| CDN3 STREAMING SIZE: 100KB THE NUMBER OF TARGET VEHICLES: 2 MILLION | FEE TABLE | | | | |
|---|---|---|---|---|---|
| | 100MB | 1GB | 10GB | 20GB |
| JAPAN | 1.32 MILLION YEN | 4.4 MILLION YEN | 44 MILLION YEN | 88 MILLION YEN |
| NORTH AMERICA | 1.32 MILLION YEN | 4.4 MILLION YEN | 44 MILLION YEN | 88 MILLION YEN |
| EU | 1.32 MILLION YEN | 4.4 MILLION YEN | 44 MILLION YEN | 88 MILLION YEN |

FIG. 160

CDN-DB-3-4

CDN VENDOR MANAGEMENT DB    PRICE TABLE FOR EACH STREAMING SIZE IN STREAMING METHOD OF EACH CLOUD SERVICE BUSINESS OPERATOR

FEE TABLE

| CDN4 | STREAMING SIZE: 1KB THE NUMBER OF TARGET VEHICLES: 2 MILLION | 100MB | 1GB | 10GB | 20GB |
|---|---|---|---|---|---|
| JAPAN | | 440,000 YEN | 4.4 MILLION YEN | 44 MILLION YEN | 88 MILLION YEN |
| NORTH AMERICA | | 220,000 YEN | 2.2 MILLION YEN | 22 MILLION YEN | 44 MILLION YEN |
| EU | | 880,000 YEN | 8.8 MILLION YEN | 88 MILLION YEN | 176 MILLION YEN |

FEE TABLE

| CDN4 | STREAMING SIZE: 10KB THE NUMBER OF TARGET VEHICLES: 2 MILLION | 100MB | 1GB | 10GB | 20GB |
|---|---|---|---|---|---|
| JAPAN | | 440,000 YEN | 4.4 MILLION YEN | 44 MILLION YEN | 88 MILLION YEN |
| NORTH AMERICA | | 220,000 YEN | 2.2 MILLION YEN | 22 MILLION YEN | 44 MILLION YEN |
| EU | | 880,000 YEN | 8.8 MILLION YEN | 88 MILLION YEN | 176 MILLION YEN |

FEE TABLE

| CDN4 | STREAMING SIZE: 100KB THE NUMBER OF TARGET VEHICLES: 2 MILLION | 100MB | 1GB | 10GB | 20GB |
|---|---|---|---|---|---|
| JAPAN | | 440,000 YEN | 4.4 MILLION YEN | 44 MILLION YEN | 88 MILLION YEN |
| NORTH AMERICA | | 220,000 YEN | 2.2 MILLION YEN | 22 MILLION YEN | 44 MILLION YEN |
| EU | | 880,000 YEN | 8.8 MILLION YEN | 88 MILLION YEN | 176 MILLION YEN |

FIG. 161

CDN-DB-4
QUALITY INFORMATION ABOUT EACH CLOUD SERVICE BUSINESS OPERATOR

| THROUGHPUT COMPARISON | JAPAN | NORTH AMERICA | EC |
|---|---|---|---|
| CDN2 | RANK A | RANK B | RANK A |
| CDN1 | RANK A | RANK B | RANK A |
| CDN3 | RANK A | RANK A | RANK B |
| CDN4 | RANK C | RANK C | RANK C |

| DELAY TIME COMPARISON | JAPAN | NORTH AMERICA | EC |
|---|---|---|---|
| CDN2 | RANK A | RANK C | RANK B |
| CDN1 | RANK B | RANK B | RANK A |
| CDN3 | RANK A | RANK A | RANK A |
| CDN4 | RANK B | RANK A | RANK B |

CDN VENDOR MANAGEMENT DB

FIG. 162

CDN-DB-Logic

CDN VENDOR
SELECTION LOGIC DB

| CDN VENDOR SELECTION LOGIC | (1) DISTRIBUTION COST | (2) WEIGHTING OF THROUGHPUT | (3) WEIGHTING OF RESPONSE DELAY TIME |
|---|---|---|---|
| CDN VENDOR | DISTRIBUTION COST (YEN) | RANK A: 0.8<br>RANK B: 1.0<br>RANK C: 1.2 | RANK A: 0.8<br>RANK B: 1.0<br>RANK C: 1.2 |

CDN VENDOR A: (1) DISTRIBUTION COST: 100 MILLION YEN
(2) THROUGHPUT RANK: RANK A
(3) RESPONSE DELAY TIME RANK: RANK A
→IN THIS CASE, REPUTATION VALUE OF CDN VENDOR A
(1) × (2) × (3) = 100 MILLION YEN × 0.8 × 0.8 = 64 MILLION YEN

CDN VENDOR B: (1) DISTRIBUTION COST: 80 MILLION YEN
(2) THROUGHPUT RANK: RANK C
(3) RESPONSE DELAY TIME RANK: RANK C
→IN THIS CASE, REPUTATION VALUE OF CDN VENDOR B
(1) × (2) × (3) = 80 MILLION YEN × 1.2 × 1.2 = 110 MILLION YEN

FIG. 163

(SELECTION LOGIC OF CDN PLACEMENT DESTINATION WITH LOWEST PRICE FOR EACH AREA AND PLACEMENT PROCESS OF UPDATE PKG FOR EACH AREA)

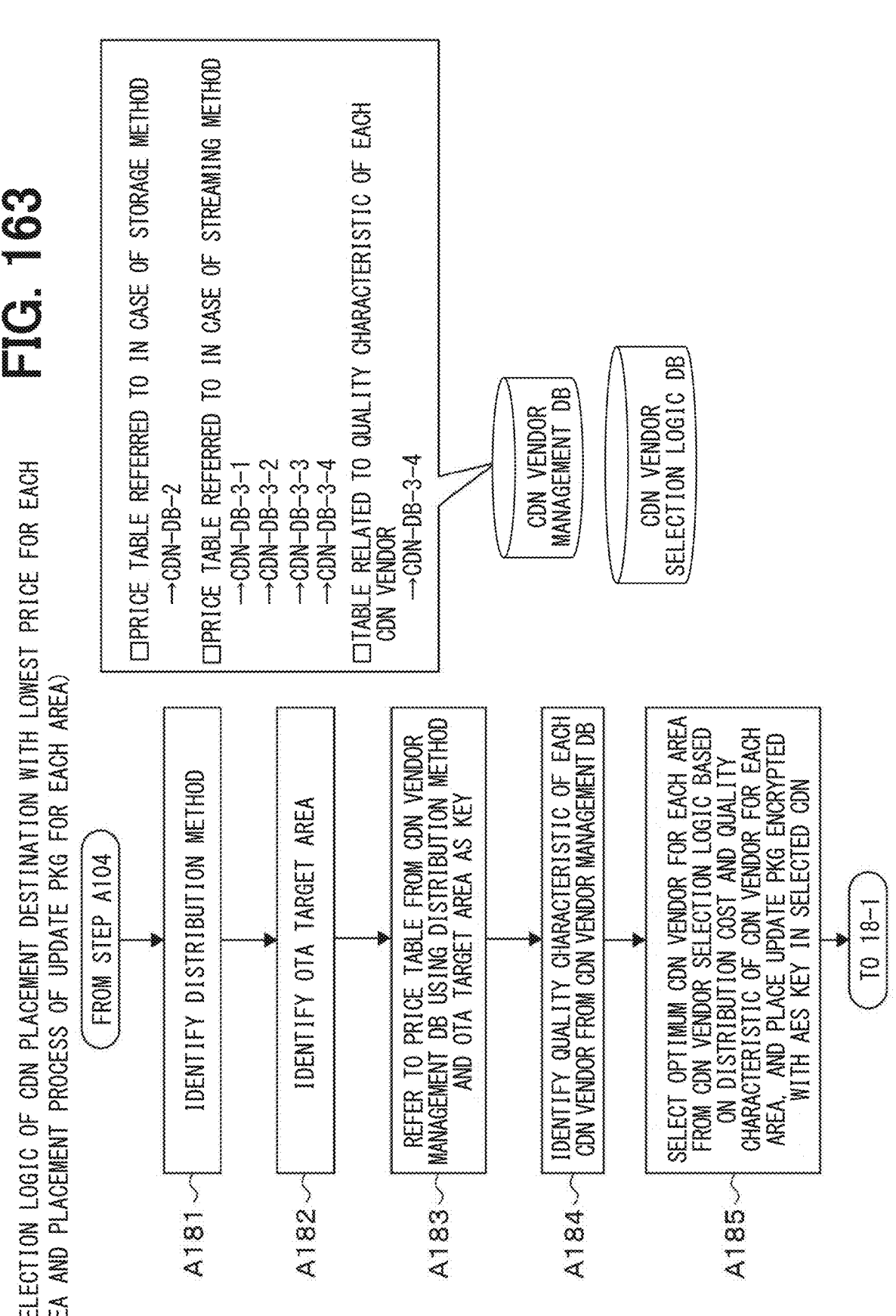

□PRICE TABLE REFERRED TO IN CASE OF STORAGE METHOD
  →CDN-DB-2
□PRICE TABLE REFERRED TO IN CASE OF STREAMING METHOD
  →CDN-DB-3-1
  →CDN-DB-3-2
  →CDN-DB-3-3
  →CDN-DB-3-4
□TABLE RELATED TO QUALITY CHARACTERISTIC OF EACH CDN VENDOR
  →CDN-DB-3-4

CDN VENDOR MANAGEMENT DB

CDN VENDOR SELECTION LOGIC DB

FROM STEP A104

A181 — IDENTIFY DISTRIBUTION METHOD

A182 — IDENTIFY OTA TARGET AREA

A183 — REFER TO PRICE TABLE FROM CDN VENDOR MANAGEMENT DB USING DISTRIBUTION METHOD AND OTA TARGET AREA AS KEY

A184 — IDENTIFY QUALITY CHARACTERISTIC OF EACH CDN VENDOR FROM CDN VENDOR MANAGEMENT DB

A185 — SELECT OPTIMUM CDN VENDOR FOR EACH AREA FROM CDN VENDOR SELECTION LOGIC BASED ON DISTRIBUTION COST AND QUALITY CHARACTERISTIC OF CDN VENDOR FOR EACH AREA, AND PLACE UPDATE PKG ENCRYPTED WITH AES KEY IN SELECTED CDN

Figure 164:
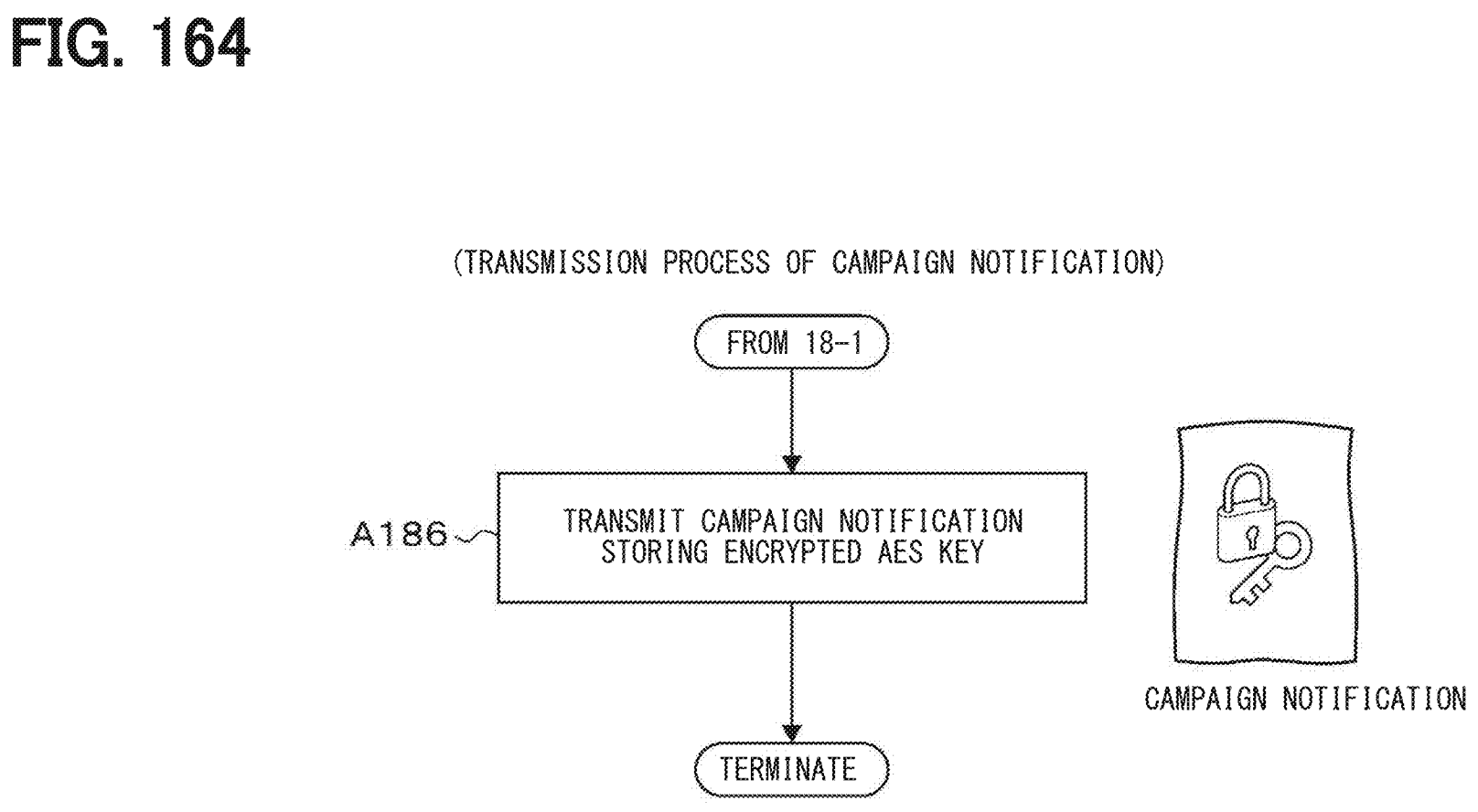

(TRANSMISSION PROCESS OF CAMPAIGN NOTIFICATION)

FROM 18-1

A186

TRANSMIT CAMPAIGN NOTIFICATION STORING ENCRYPTED AES KEY

TERMINATE

CAMPAIGN NOTIFICATION (UPDATE PROCESS OF CDN VENDOR MANAGEMENT DB)

START

A187 — AUTOMATICALLY ACQUIRE PRICE TABLE OF EACH CDN VENDOR FROM Website, AND UPDATE CDN VENDOR MANAGEMENT DB A188 — MEASURE THROUGHPUT AND RESPONSE DELAY TIME OF EACH CDN VENDOR AND UPDATE CDN VENDOR MANAGEMENT DB

TERMINATE

CDN VENDOR MANAGEMENT DB

FIG. 170

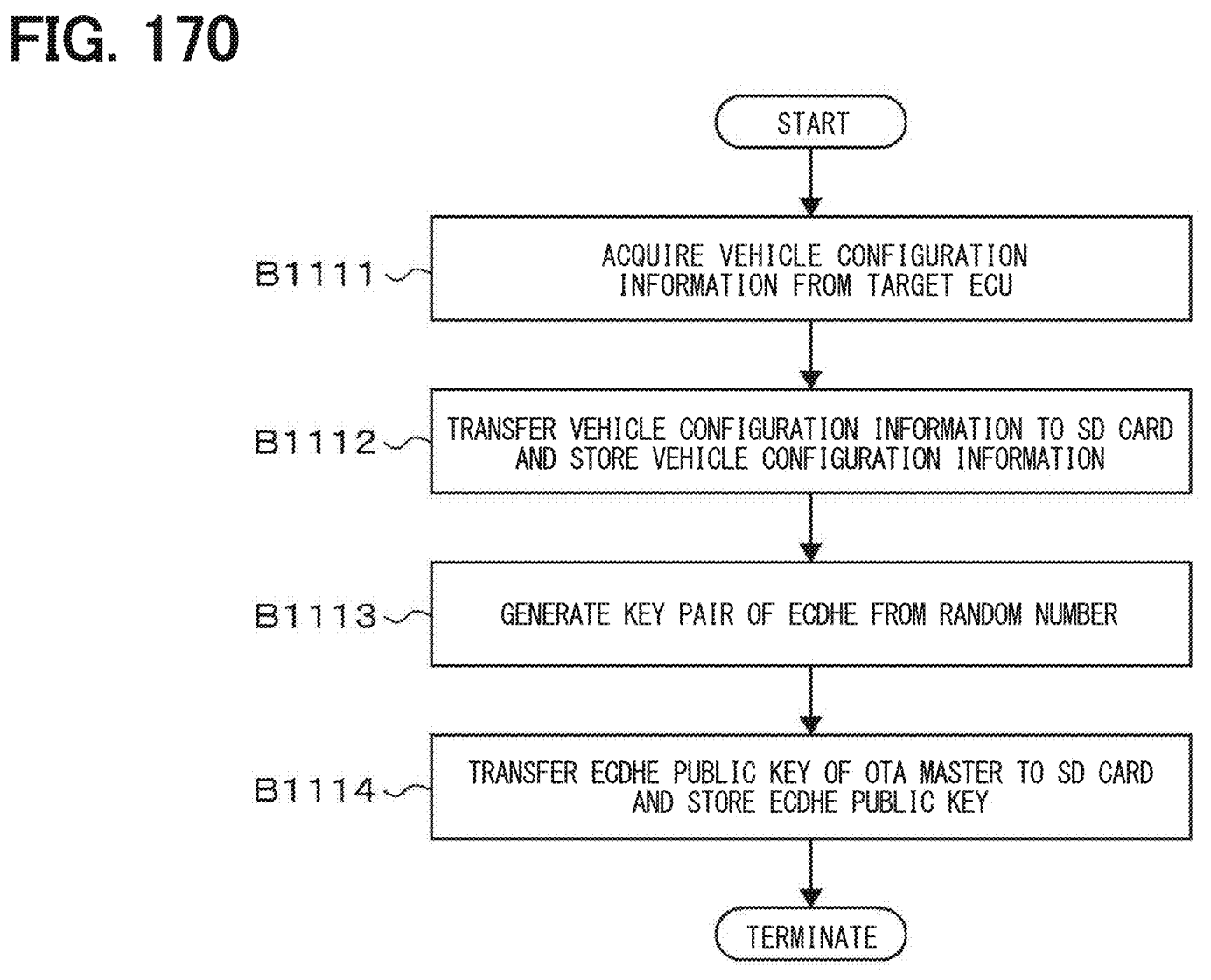

START

B1111 — ACQUIRE VEHICLE CONFIGURATION INFORMATION FROM TARGET ECU

B1112 — TRANSFER VEHICLE CONFIGURATION INFORMATION TO SD CARD AND STORE VEHICLE CONFIGURATION INFORMATION

B1113 — GENERATE KEY PAIR OF ECDHE FROM RANDOM NUMBER

B1114 — TRANSFER ECDHE PUBLIC KEY OF OTA MASTER TO SD CARD AND STORE ECDHE PUBLIC KEY

TERMINATE

FIG. 173

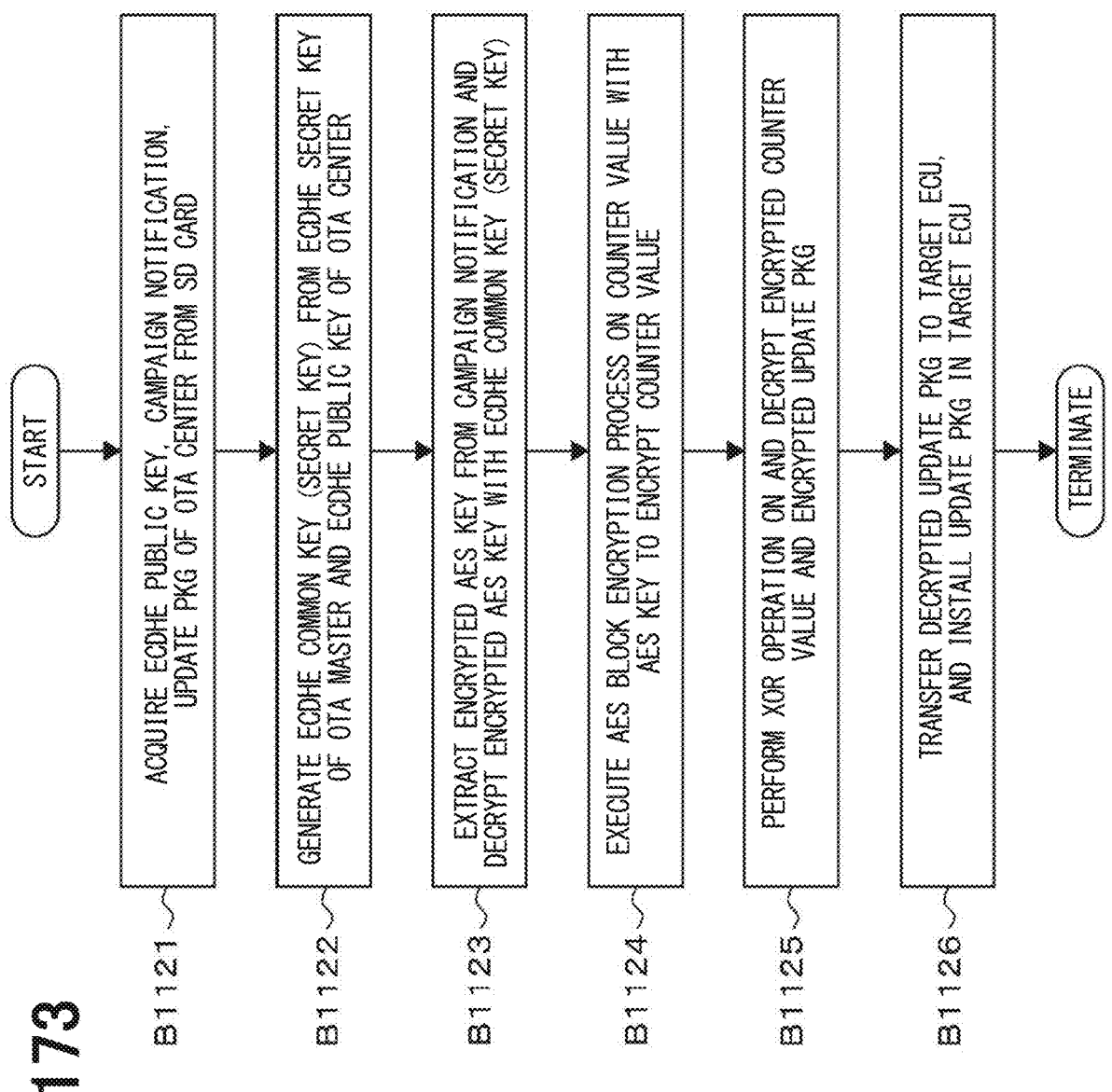

START

B1121 — ACQUIRE ECDHE PUBLIC KEY, CAMPAIGN NOTIFICATION, UPDATE PKG OF OTA CENTER FROM SD CARD

B1122 — GENERATE ECDHE COMMON KEY (SECRET KEY) FROM ECDHE SECRET KEY OF OTA MASTER AND ECDHE PUBLIC KEY OF OTA CENTER

B1123 — EXTRACT ENCRYPTED AES KEY FROM CAMPAIGN NOTIFICATION AND DECRYPT ENCRYPTED AES KEY WITH ECDHE COMMON KEY (SECRET KEY)

B1124 — EXECUTE AES BLOCK ENCRYPTION PROCESS ON COUNTER VALUE WITH AES KEY TO ENCRYPT COUNTER VALUE

B1125 — PERFORM XOR OPERATION ON AND DECRYPT ENCRYPTED COUNTER VALUE AND ENCRYPTED UPDATE PKG

B1126 — TRANSFER DECRYPTED UPDATE PKG TO TARGET ECU, AND INSTALL UPDATE PKG IN TARGET ECU

TERMINATE

FIG. 178

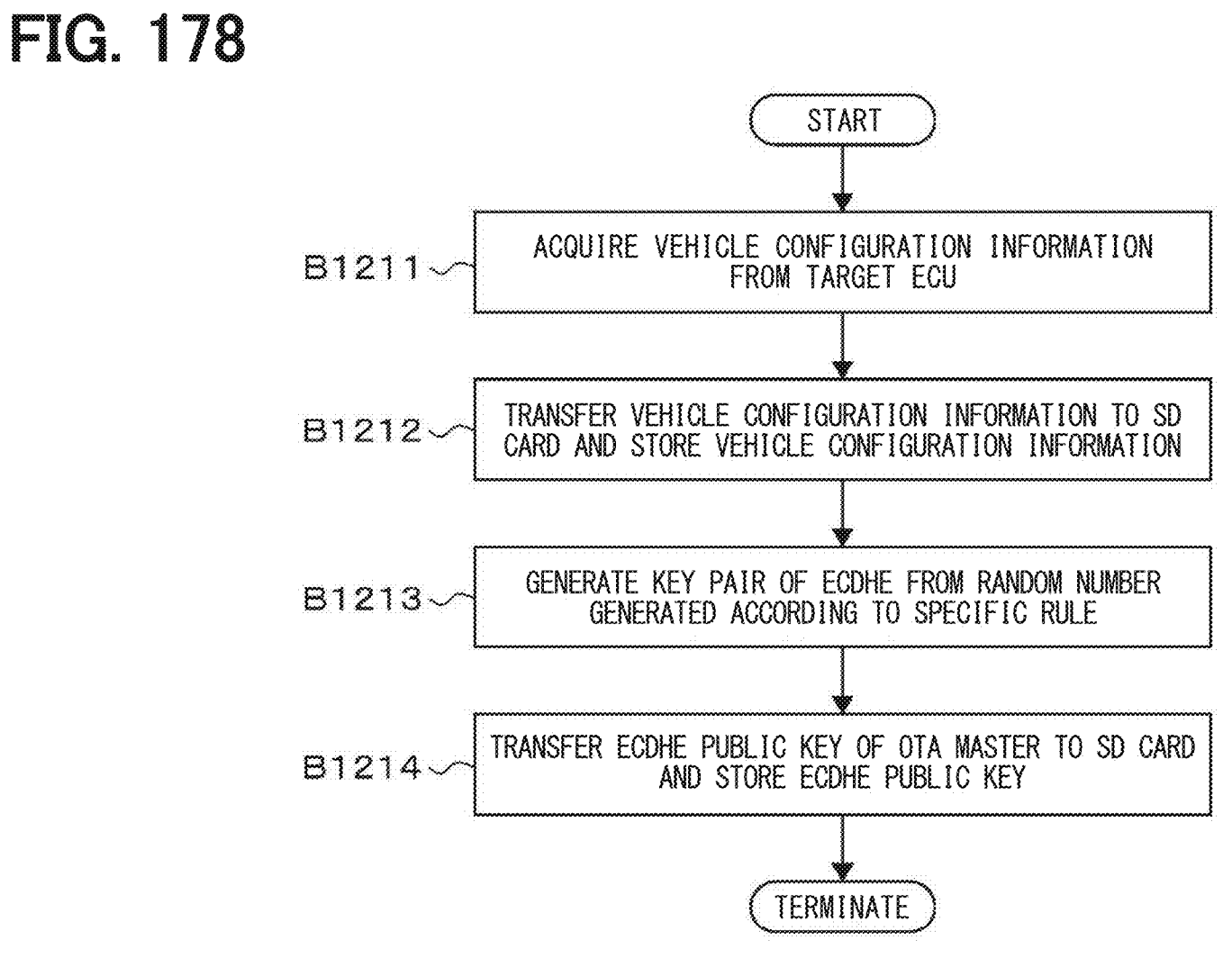

START

B1211 — ACQUIRE VEHICLE CONFIGURATION INFORMATION FROM TARGET ECU

B1212 — TRANSFER VEHICLE CONFIGURATION INFORMATION TO SD CARD AND STORE VEHICLE CONFIGURATION INFORMATION

B1213 — GENERATE KEY PAIR OF ECDHE FROM RANDOM NUMBER GENERATED ACCORDING TO SPECIFIC RULE

B1214 — TRANSFER ECDHE PUBLIC KEY OF OTA MASTER TO SD CARD AND STORE ECDHE PUBLIC KEY

TERMINATE

FIG. 180

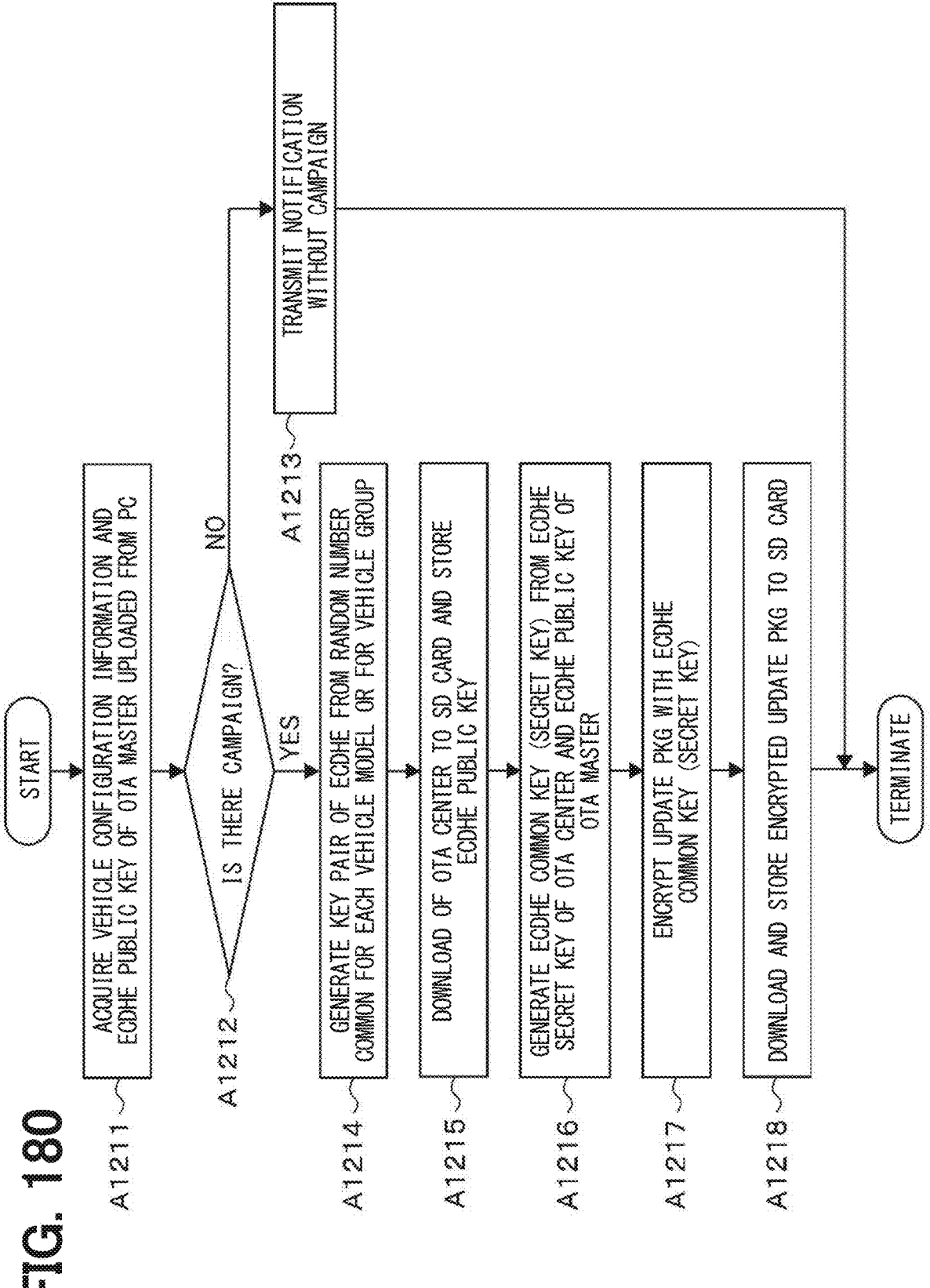

START

A1211 — ACQUIRE VEHICLE CONFIGURATION INFORMATION AND ECDHE PUBLIC KEY OF OTA MASTER UPLOADED FROM PC

A1212 — IS THERE CAMPAIGN?

NO → A1213 — TRANSMIT NOTIFICATION WITHOUT CAMPAIGN

YES

A1214 — GENERATE KEY PAIR OF ECDHE FROM RANDOM NUMBER COMMON FOR EACH VEHICLE MODEL OR FOR VEHICLE GROUP

A1215 — DOWNLOAD OF OTA CENTER TO SD CARD AND STORE ECDHE PUBLIC KEY

A1216 — GENERATE ECDHE COMMON KEY (SECRET KEY) FROM ECDHE SECRET KEY OF OTA CENTER AND ECDHE PUBLIC KEY OF OTA MASTER

A1217 — ENCRYPT UPDATE PKG WITH ECDHE COMMON KEY (SECRET KEY)

A1218 — DOWNLOAD AND STORE ENCRYPTED UPDATE PKG TO SD CARD

TERMINATE

FIG. 186

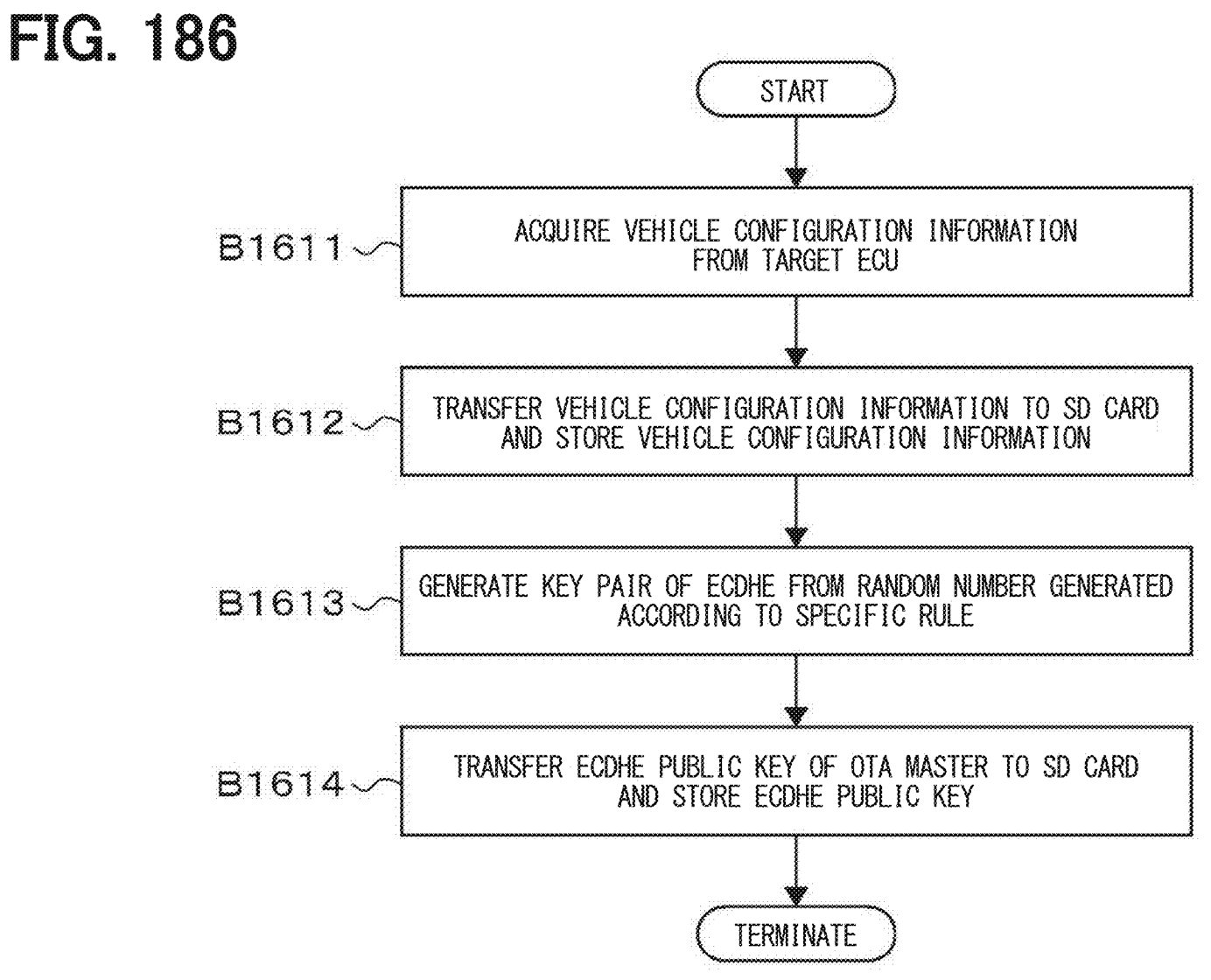

START

B1611 — ACQUIRE VEHICLE CONFIGURATION INFORMATION FROM TARGET ECU

B1612 — TRANSFER VEHICLE CONFIGURATION INFORMATION TO SD CARD AND STORE VEHICLE CONFIGURATION INFORMATION

B1613 — GENERATE KEY PAIR OF ECDHE FROM RANDOM NUMBER GENERATED ACCORDING TO SPECIFIC RULE

B1614 — TRANSFER ECDHE PUBLIC KEY OF OTA MASTER TO SD CARD AND STORE ECDHE PUBLIC KEY

TERMINATE

FIG. 188

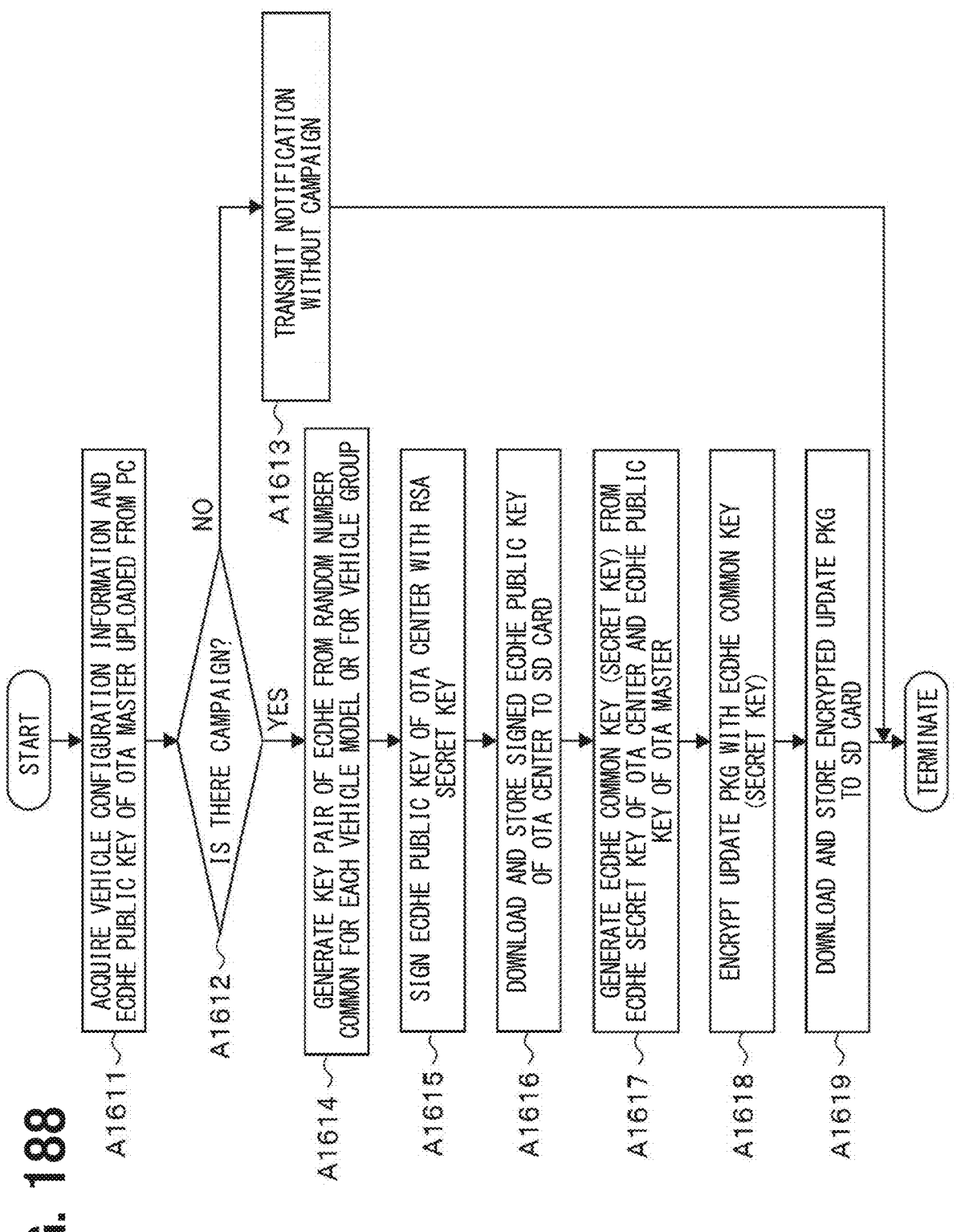

START

A1611 — ACQUIRE VEHICLE CONFIGURATION INFORMATION AND ECDHE PUBLIC KEY OF OTA MASTER UPLOADED FROM PC

A1612 — IS THERE CAMPAIGN?

NO

A1613 — TRANSMIT NOTIFICATION WITHOUT CAMPAIGN

YES

A1614 — GENERATE KEY PAIR OF ECDHE FROM RANDOM NUMBER COMMON FOR EACH VEHICLE MODEL OR FOR VEHICLE GROUP

A1615 — SIGN ECDHE PUBLIC KEY OF OTA CENTER WITH RSA SECRET KEY

A1616 — DOWNLOAD AND STORE SIGNED ECDHE PUBLIC KEY OF OTA CENTER TO SD CARD

A1617 — GENERATE ECDHE COMMON KEY (SECRET KEY) FROM ECDHE SECRET KEY OF OTA CENTER AND ECDHE PUBLIC KEY OF OTA MASTER

A1618 — ENCRYPT UPDATE PKG WITH ECDHE COMMON KEY (SECRET KEY)

A1619 — DOWNLOAD AND STORE ENCRYPTED UPDATE PKG TO SD CARD

TERMINATE

FIG. 189

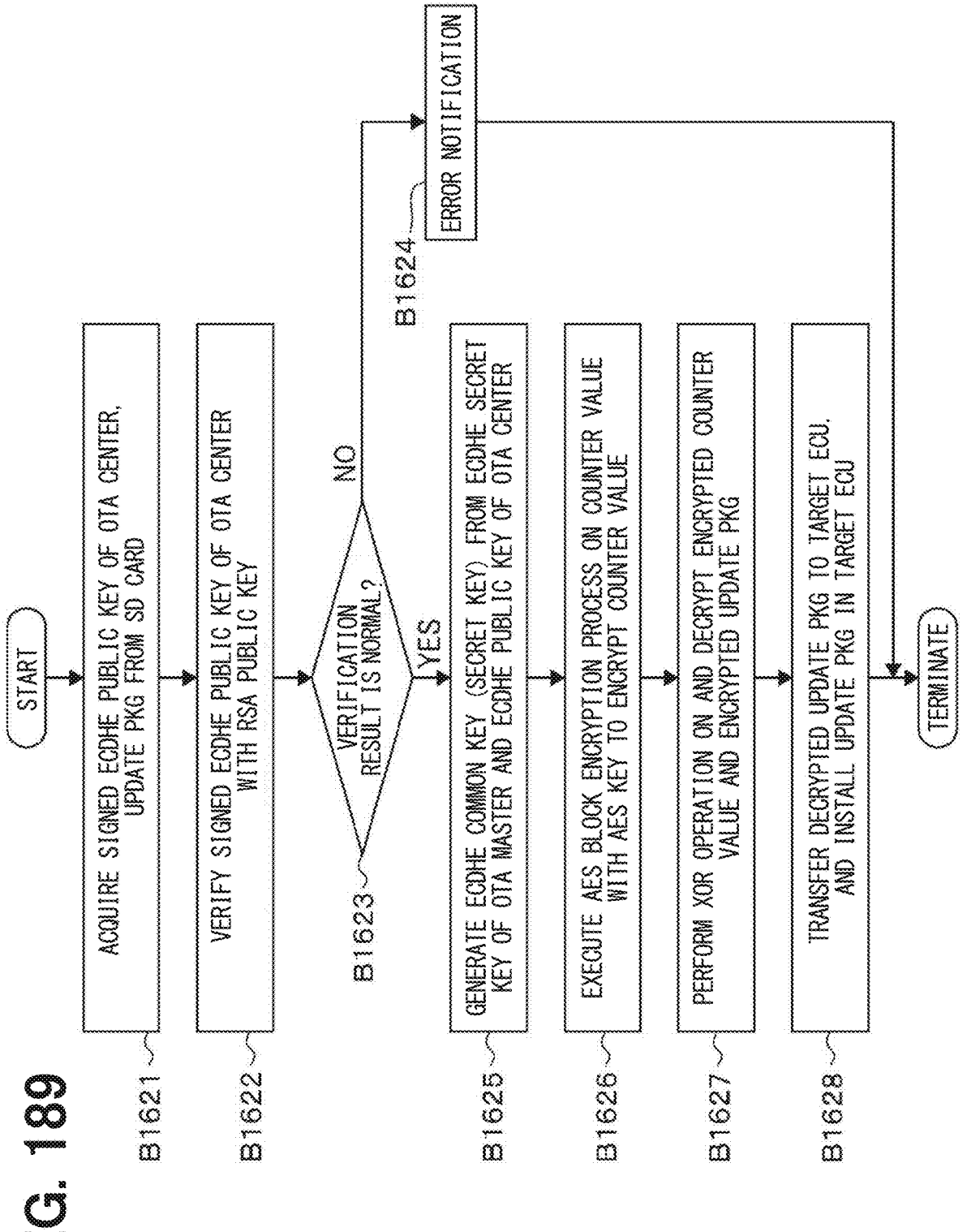

START

B1621 — ACQUIRE SIGNED ECDHE PUBLIC KEY OF OTA CENTER, UPDATE PKG FROM SD CARD

B1622 — VERIFY SIGNED ECDHE PUBLIC KEY OF OTA CENTER WITH RSA PUBLIC KEY

B1623 — VERIFICATION RESULT IS NORMAL?

NO → B1624 — ERROR NOTIFICATION

YES

B1625 — GENERATE ECDHE COMMON KEY (SECRET KEY) FROM ECDHE SECRET KEY OF OTA MASTER AND ECDHE PUBLIC KEY OF OTA CENTER

B1626 — EXECUTE AES BLOCK ENCRYPTION PROCESS ON COUNTER VALUE WITH AES KEY TO ENCRYPT COUNTER VALUE

B1627 — PERFORM XOR OPERATION ON AND DECRYPT ENCRYPTED COUNTER VALUE AND ENCRYPTED UPDATE PKG

B1628 — TRANSFER DECRYPTED UPDATE PKG TO TARGET ECU, AND INSTALL UPDATE PKG IN TARGET ECU

TERMINATE

FIG. 191

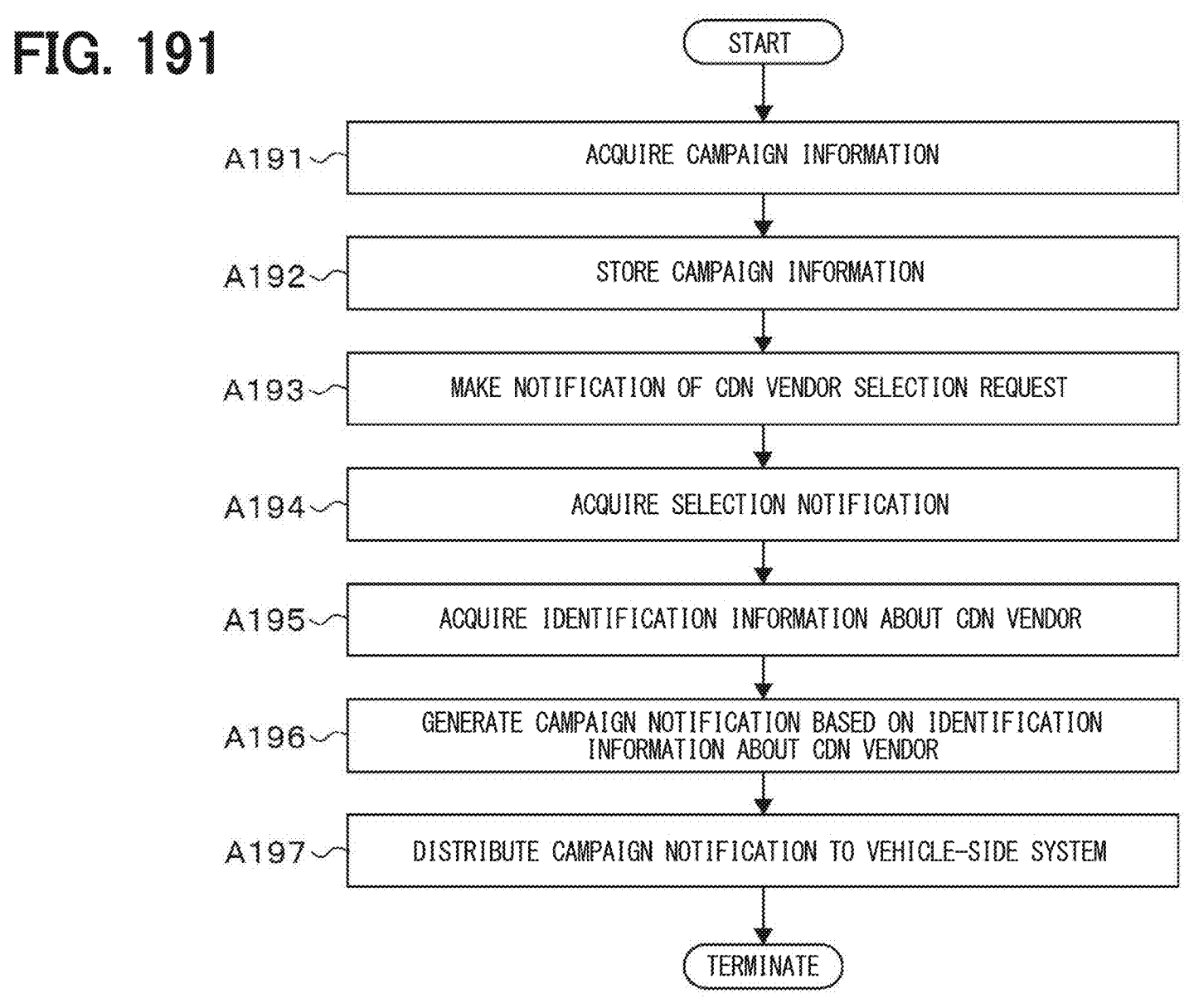

A191 ⟶ ACQUIRE CAMPAIGN INFORMATION

A192 ⟶ STORE CAMPAIGN INFORMATION

A193 ⟶ MAKE NOTIFICATION OF CDN VENDOR SELECTION REQUEST

A194 ⟶ ACQUIRE SELECTION NOTIFICATION

A195 ⟶ ACQUIRE IDENTIFICATION INFORMATION ABOUT CDN VENDOR

A196 ⟶ GENERATE CAMPAIGN NOTIFICATION BASED ON IDENTIFICATION INFORMATION ABOUT CDN VENDOR

A197 ⟶ DISTRIBUTE CAMPAIGN NOTIFICATION TO VEHICLE-SIDE SYSTEM

START

TERMINATE

FIG. 192

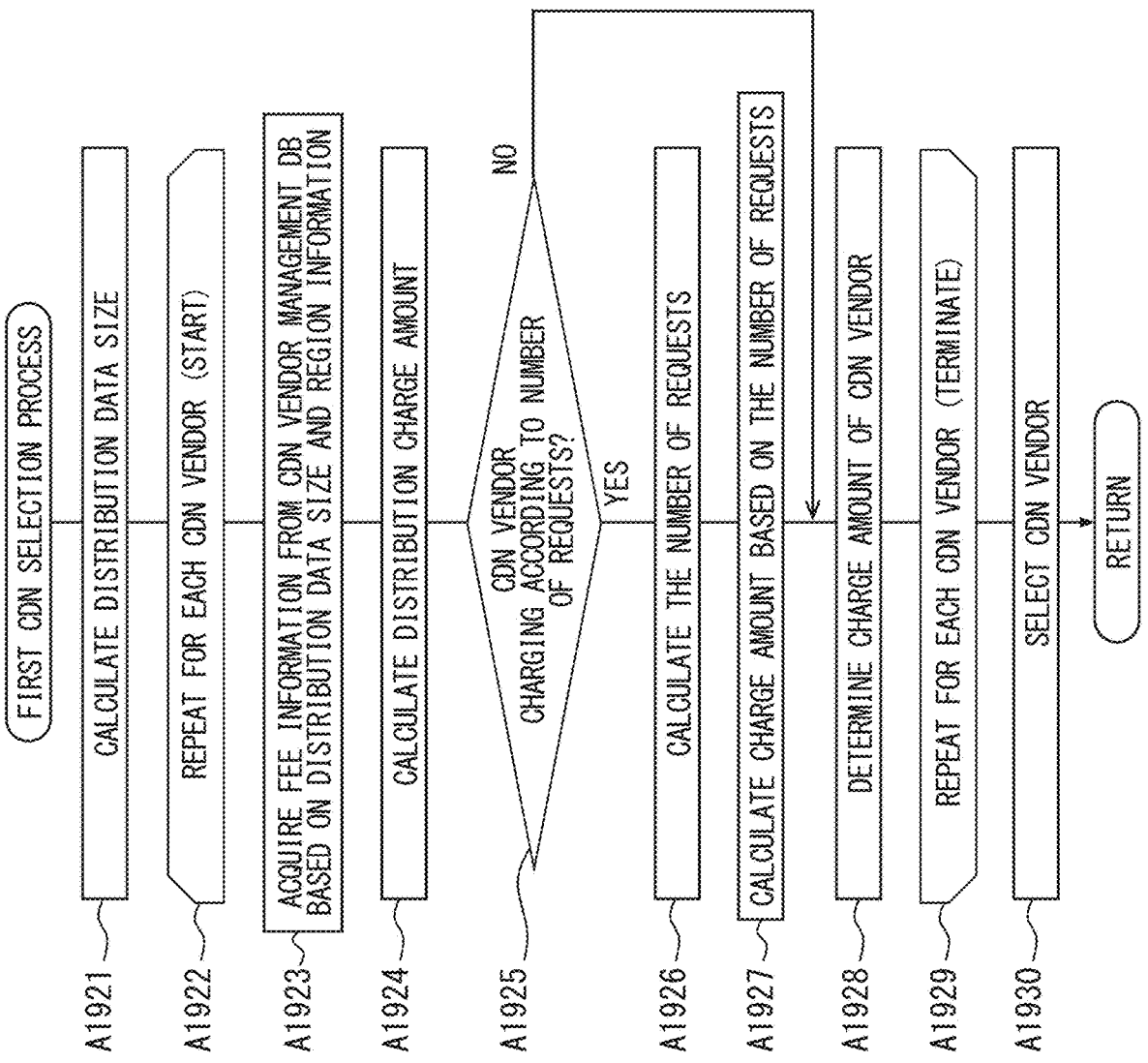

FIG. 193

FIRST CDN SELECTION PROCESS

A1921 — CALCULATE DISTRIBUTION DATA SIZE

A1922 — REPEAT FOR EACH CDN VENDOR (START)

A1923 — ACQUIRE FEE INFORMATION FROM CDN VENDOR MANAGEMENT DB BASED ON DISTRIBUTION DATA SIZE AND REGION INFORMATION

A1924 — CALCULATE DISTRIBUTION CHARGE AMOUNT

A1925 — CDN VENDOR CHARGING ACCORDING TO NUMBER OF REQUESTS?    NO    YES

A1926 — CALCULATE THE NUMBER OF REQUESTS

A1927 — CALCULATE CHARGE AMOUNT BASED ON THE NUMBER OF REQUESTS

A1928 — DETERMINE CHARGE AMOUNT OF CDN VENDOR

A1929 — REPEAT FOR EACH CDN VENDOR (TERMINATE)

A1930 — SELECT CDN VENDOR

RETURN

FIG. 195

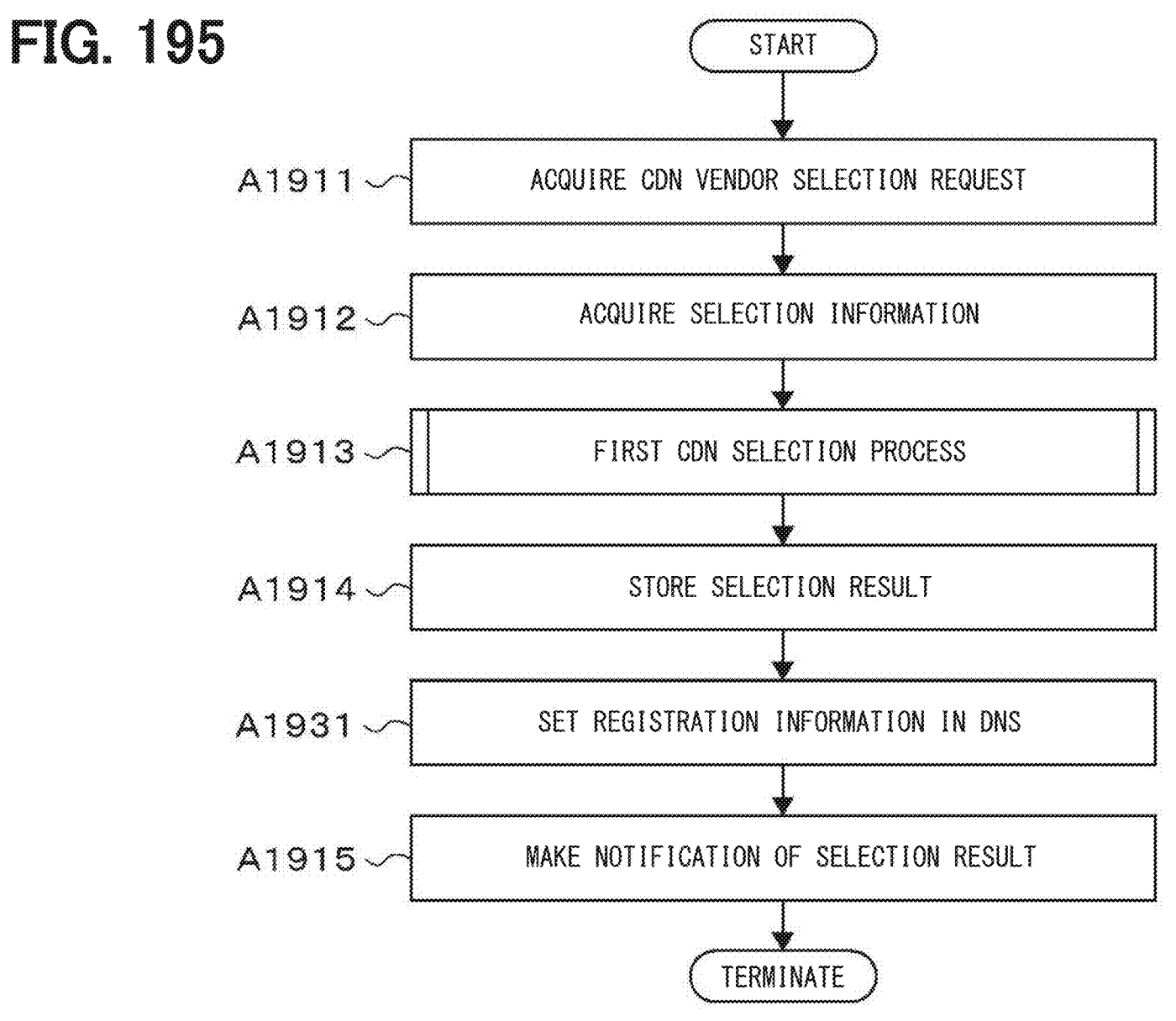

START

A1911 — ACQUIRE CDN VENDOR SELECTION REQUEST

A1912 — ACQUIRE SELECTION INFORMATION

A1913 — FIRST CDN SELECTION PROCESS

A1914 — STORE SELECTION RESULT

A1931 — SET REGISTRATION INFORMATION IN DNS

A1915 — MAKE NOTIFICATION OF SELECTION RESULT

TERMINATE

FIG. 197

SELECTION TABLE

| CDN VENDOR | DISTRIBUTION TIME | DISTRIBUTION FLAG | COST RANK |
|---|---|---|---|
| AAA | Xms | FALSE | 1 |
| BBB | Yms | TRUE | 2 |
| CCC | Zms | TRUE | 3 |

FIG. 199

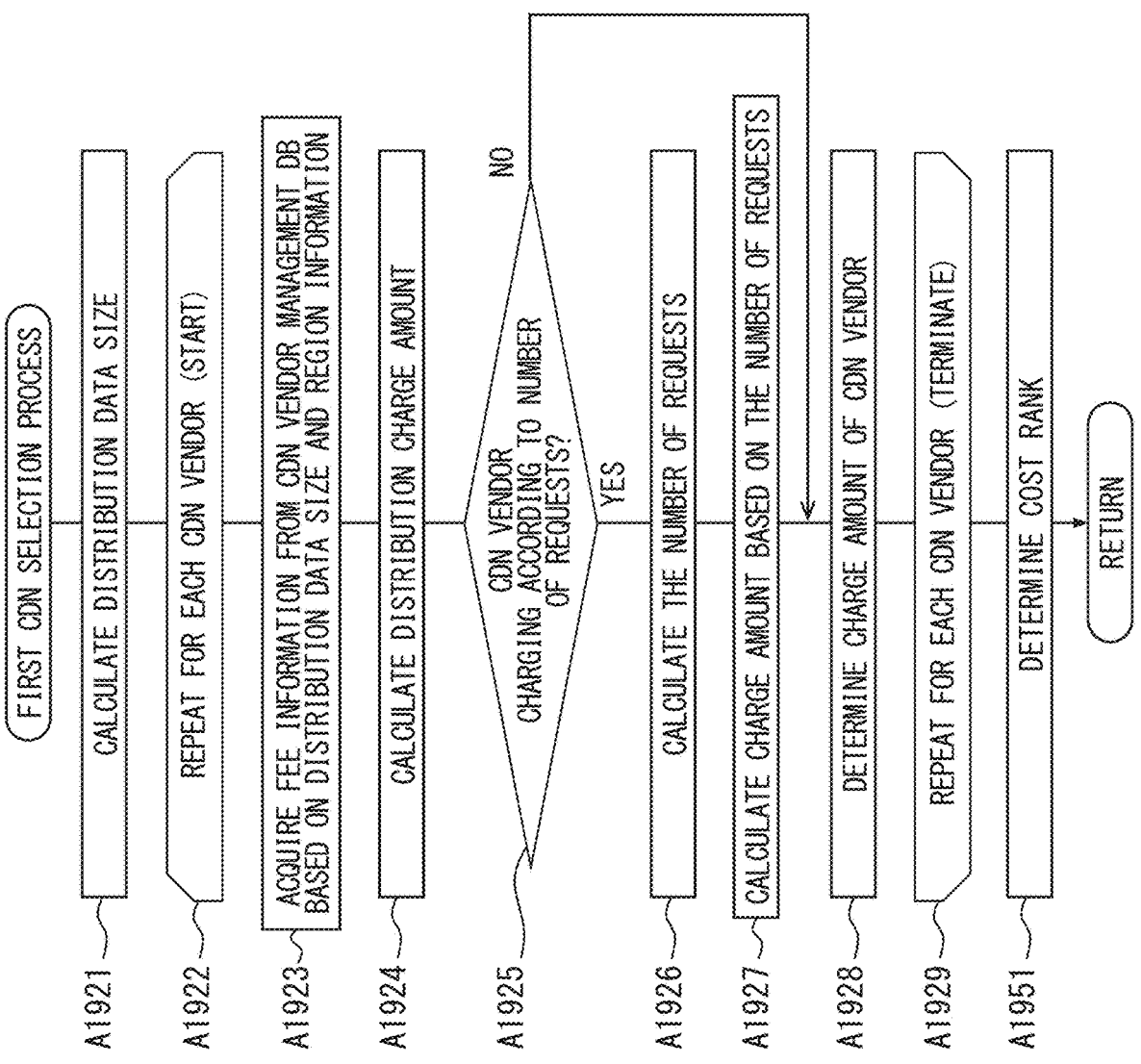

FIRST CDN SELECTION PROCESS

A1921 — CALCULATE DISTRIBUTION DATA SIZE

A1922 — REPEAT FOR EACH CDN VENDOR (START)

A1923 — ACQUIRE FEE INFORMATION FROM CDN VENDOR MANAGEMENT DB BASED ON DISTRIBUTION DATA SIZE AND REGION INFORMATION

A1924 — CALCULATE DISTRIBUTION CHARGE AMOUNT

A1925 — CDN VENDOR CHARGING ACCORDING TO NUMBER OF REQUESTS?
NO
YES

A1926 — CALCULATE THE NUMBER OF REQUESTS

A1927 — CALCULATE CHARGE AMOUNT BASED ON THE NUMBER OF REQUESTS

A1928 — DETERMINE CHARGE AMOUNT OF CDN VENDOR

A1929 — REPEAT FOR EACH CDN VENDOR (TERMINATE)

A1951 — DETERMINE COST RANK

RETURN

FIG. 201

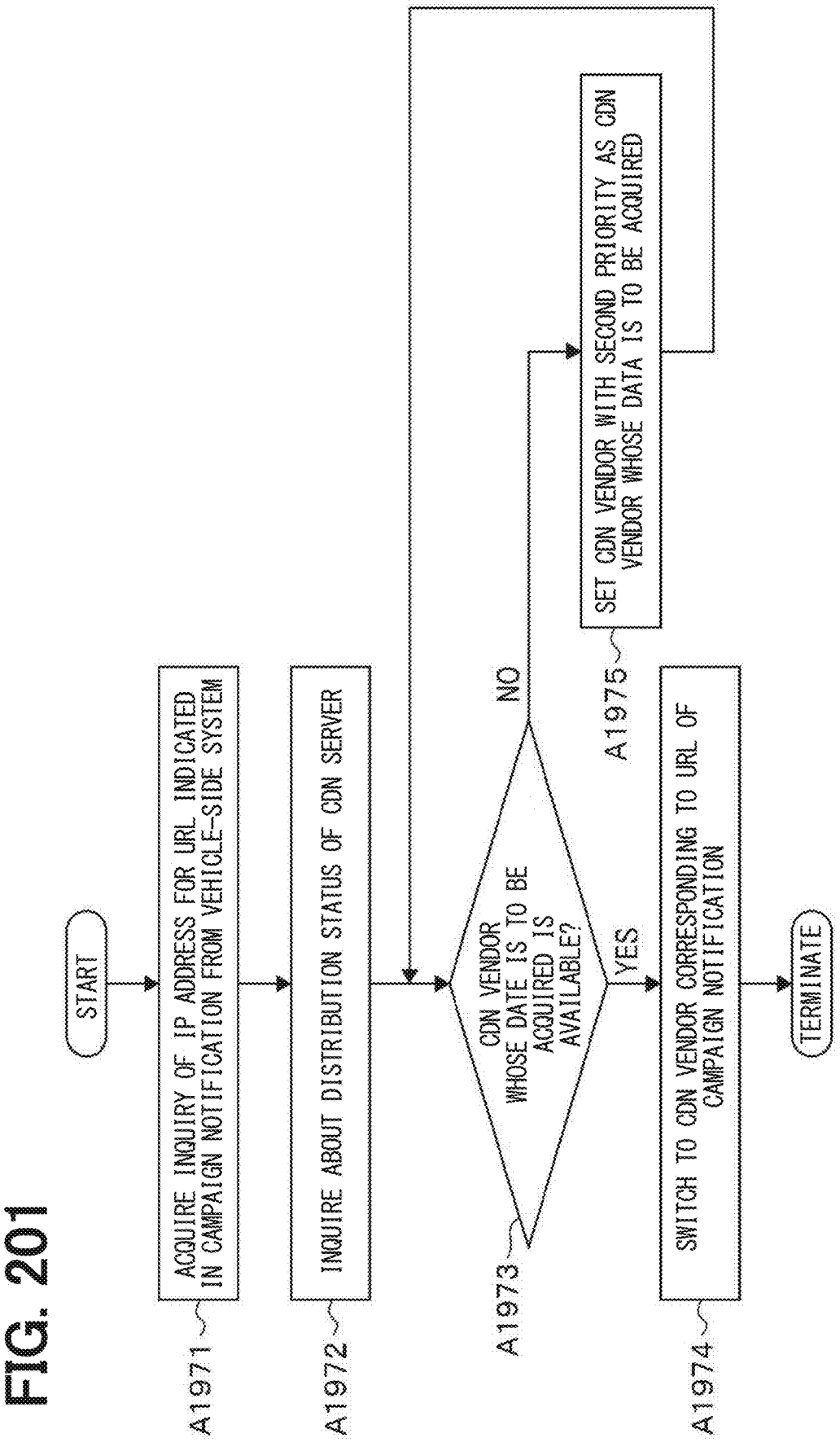

START

A1971 — ACQUIRE INQUIRY OF IP ADDRESS FOR URL INDICATED IN CAMPAIGN NOTIFICATION FROM VEHICLE-SIDE SYSTEM

A1972 — INQUIRE ABOUT DISTRIBUTION STATUS OF CDN SERVER

A1973 — CDN VENDOR WHOSE DATE IS TO BE ACQUIRED IS AVAILABLE?

NO → A1975 — SET CDN VENDOR WITH SECOND PRIORITY AS CDN VENDOR WHOSE DATA IS TO BE ACQUIRED

YES → A1974 — SWITCH TO CDN VENDOR CORRESPONDING TO URL OF CAMPAIGN NOTIFICATION

TERMINATE

FIG. 206

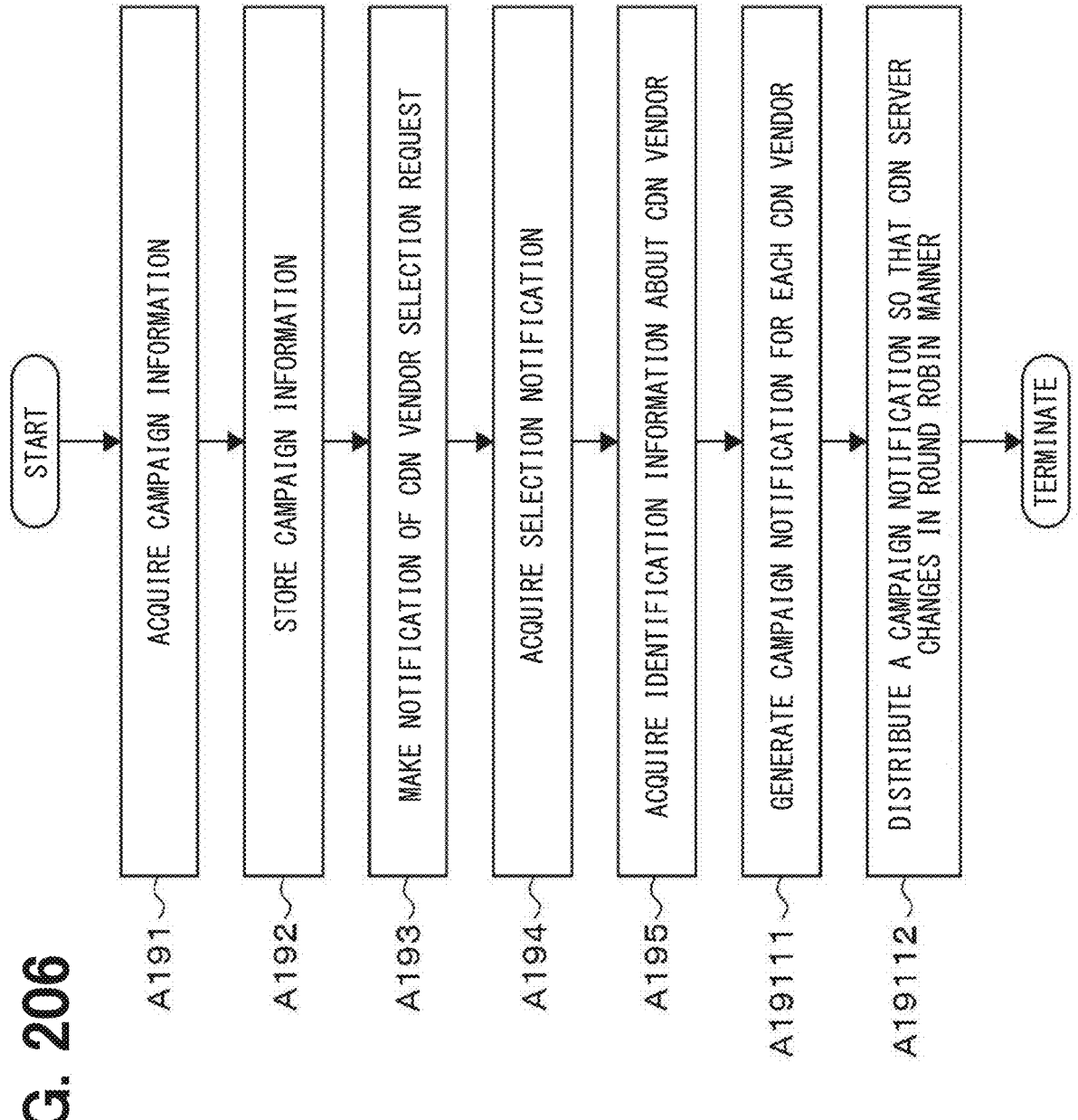

START

A191 — ACQUIRE CAMPAIGN INFORMATION

A192 — STORE CAMPAIGN INFORMATION

A193 — MAKE NOTIFICATION OF CDN VENDOR SELECTION REQUEST

A194 — ACQUIRE SELECTION NOTIFICATION

A195 — ACQUIRE IDENTIFICATION INFORMATION ABOUT CDN VENDOR

A19111 — GENERATE CAMPAIGN NOTIFICATION FOR EACH CDN VENDOR

A19112 — DISTRIBUTE A CAMPAIGN NOTIFICATION SO THAT CDN SERVER CHANGES IN ROUND ROBIN MANNER

TERMINATE

START

A1911 — ACQUIRE CDN VENDOR SELECTION REQUEST

A1912 — ACQUIRE SELECTION INFORMATION

A1913 — FIRST CDN SELECTION PROCESS

A1914 — STORE SELECTION RESULT

A19121 — SELECT A PLURALITY OF CDN VENDORS IN ASCENDING ORDER OF DISTRIBUTION COST

A1915 — MAKE NOTIFICATION OF SELECTION RESULT

TERMINATE

FIG. 209

ROUND ROBIN RECORD vehicle.ota001 IN A 192.168.100.10 vehicle.ota001 IN A 192.168.100.11 vehicle.ota001 IN A 192.168.100.12

START

A19911　ACQUIRE CDN VENDOR SELECTION REQUEST

A19912　ACQUIRE SELECTION INFORMATION

A19913　FIRST CDN SELECTION PROCESS

A19914　STORE SELECTION RESULT

A19121　SELECT A PLURALITY OF CDN VENDORS IN ASCENDING ORDER OF DISTRIBUTION COST

A19131　SET ROUND ROBIN RECORD

A19915　MAKE NOTIFICATION OF SELECTION RESULT

TERMINATE

START

A19141 — ACQUIRE INQUIRY OF IP ADDRESS FROM VEHICLE-SIDE SYSTEM

A19142 — REFERENCE TO ROUND ROBIN RECORD

A19143 — TRANSMIT IP ADDRESS CORRESPONDING TO CDN SERVER TO VEHICLE-SIDE SYSTEM

TERMINATE

FIG. 213

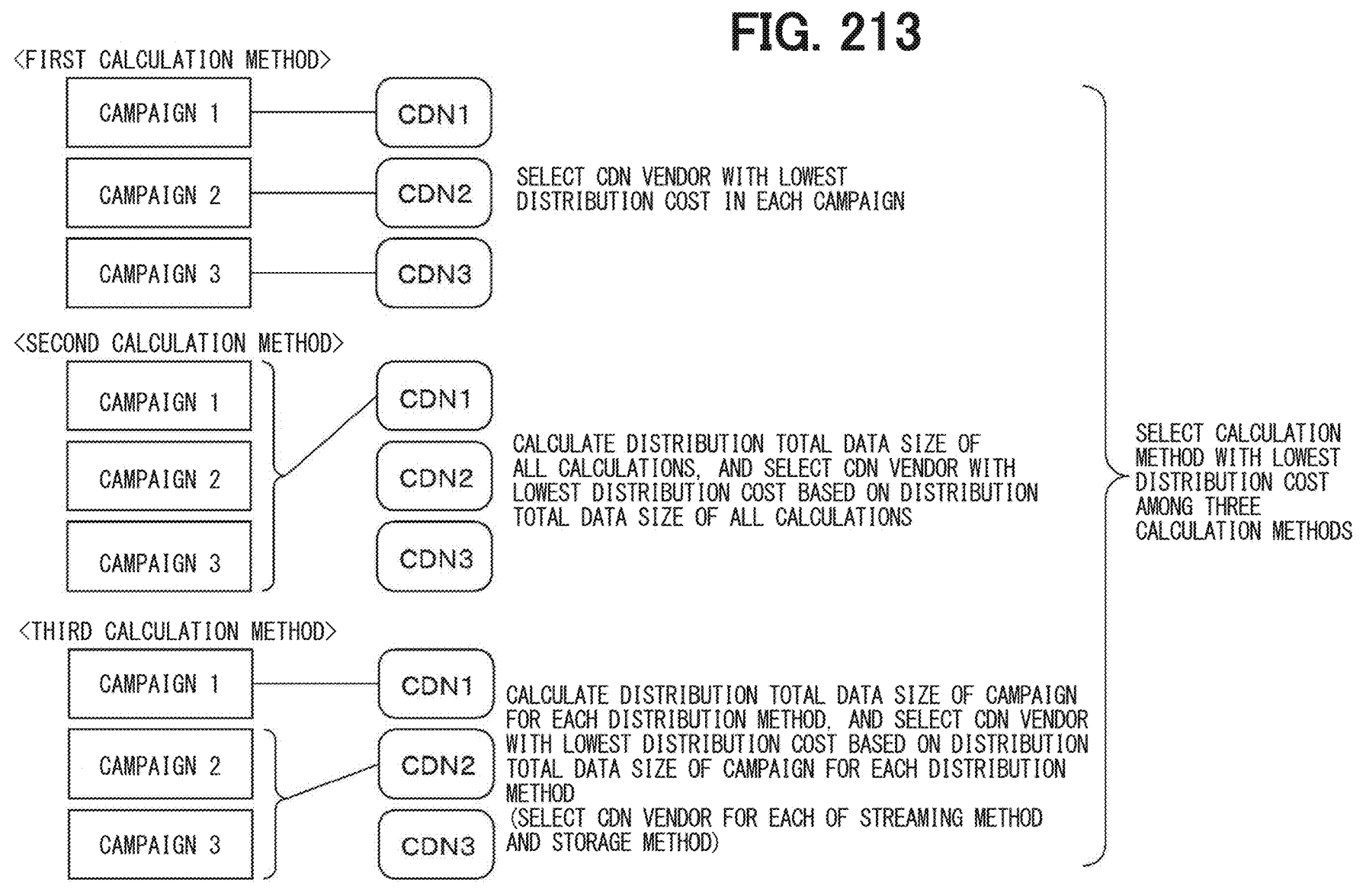

SELECT CALCULATION METHOD WITH LOWEST DISTRIBUTION COST AMONG THREE CALCULATION METHODS

<FIRST CALCULATION METHOD>

CDN1 — CAMPAIGN 1
CDN2 — CAMPAIGN 2
CDN3 — CAMPAIGN 3

SELECT CDN VENDOR WITH LOWEST DISTRIBUTION COST IN EACH CAMPAIGN

<SECOND CALCULATION METHOD>

CDN1
CDN2
CDN3

CAMPAIGN 1
CAMPAIGN 2
CAMPAIGN 3

CALCULATE DISTRIBUTION TOTAL DATA SIZE OF ALL CALCULATIONS, AND SELECT CDN VENDOR WITH LOWEST DISTRIBUTION COST BASED ON DISTRIBUTION TOTAL DATA SIZE OF ALL CALCULATIONS

<THIRD CALCULATION METHOD>

CDN1
CDN2
CDN3

CAMPAIGN 1
CAMPAIGN 2
CAMPAIGN 3

CALCULATE DISTRIBUTION TOTAL DATA SIZE OF CAMPAIGN FOR EACH DISTRIBUTION METHOD, AND SELECT CDN VENDOR WITH LOWEST DISTRIBUTION COST BASED ON DISTRIBUTION TOTAL DATA SIZE OF CAMPAIGN FOR EACH DISTRIBUTION METHOD
(SELECT CDN VENDOR FOR EACH OF STREAMING METHOD AND STORAGE METHOD)

FIG. 214

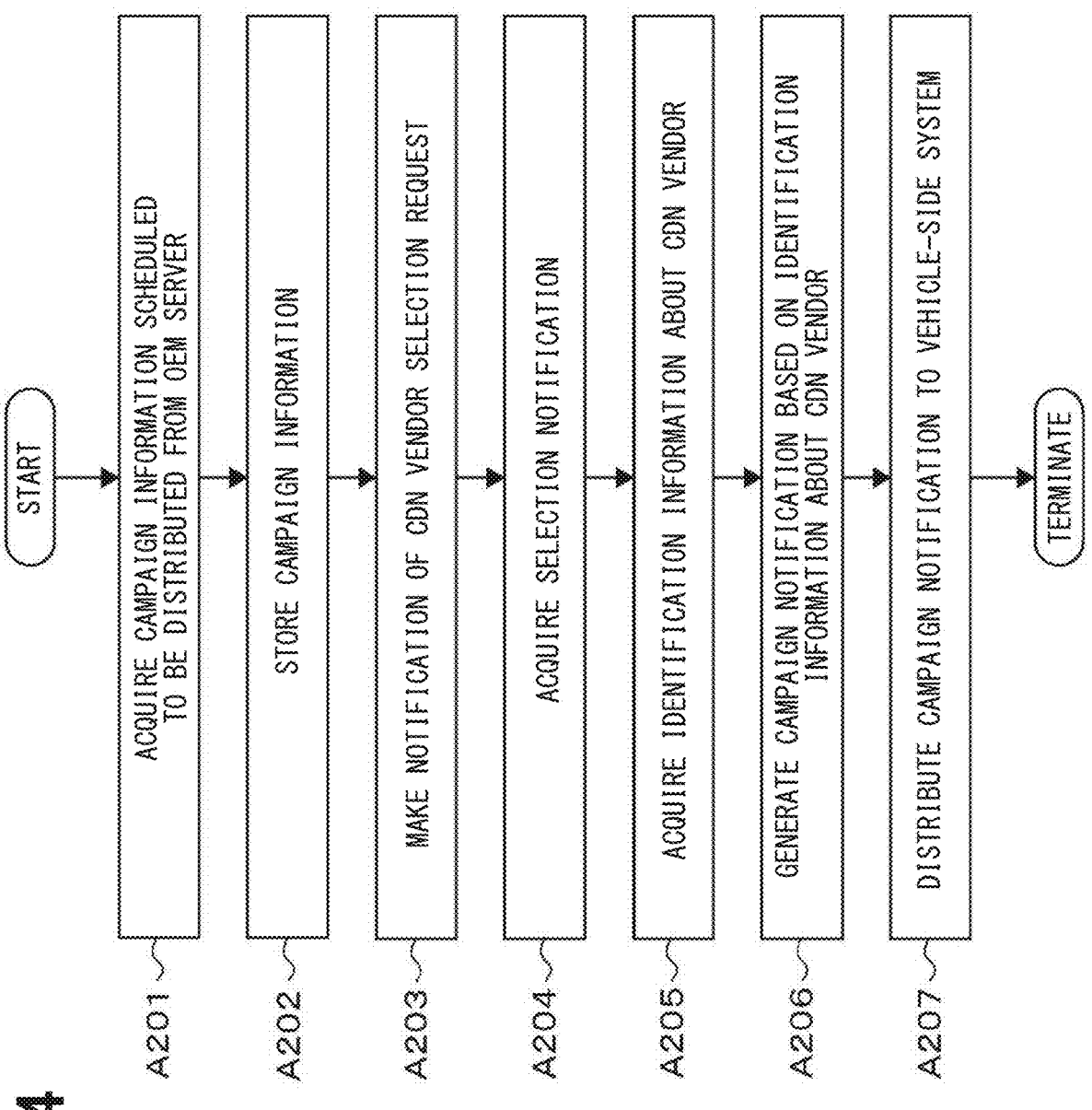

START

A201 — ACQUIRE CAMPAIGN INFORMATION SCHEDULED TO BE DISTRIBUTED FROM OEM SERVER

A202 — STORE CAMPAIGN INFORMATION

A203 — MAKE NOTIFICATION OF CDN VENDOR SELECTION REQUEST

A204 — ACQUIRE SELECTION NOTIFICATION

A205 — ACQUIRE IDENTIFICATION INFORMATION ABOUT CDN VENDOR

A206 — GENERATE CAMPAIGN NOTIFICATION BASED ON IDENTIFICATION INFORMATION ABOUT CDN VENDOR

A207 — DISTRIBUTE CAMPAIGN NOTIFICATION TO VEHICLE-SIDE SYSTEM

TERMINATE

START

A2011 — ACQUIRE CDN VENDOR SELECTION REQUEST

A2012 — ACQUIRE SELECTION INFORMATION

A2013 — ACQUIRE DISTRIBUTION PREDICTION VALUE

A2014 — CALCULATE DISTRIBUTION DATA SIZ FOR EACH CAMPAIGN

A2015 — SECOND CDN SELECTION PROCESS

A2016 — STORE SELECTION RESULT

A2017 — MAKE NOTIFICATION OF SELECTION RESULT

TERMINATE

FIG. 217

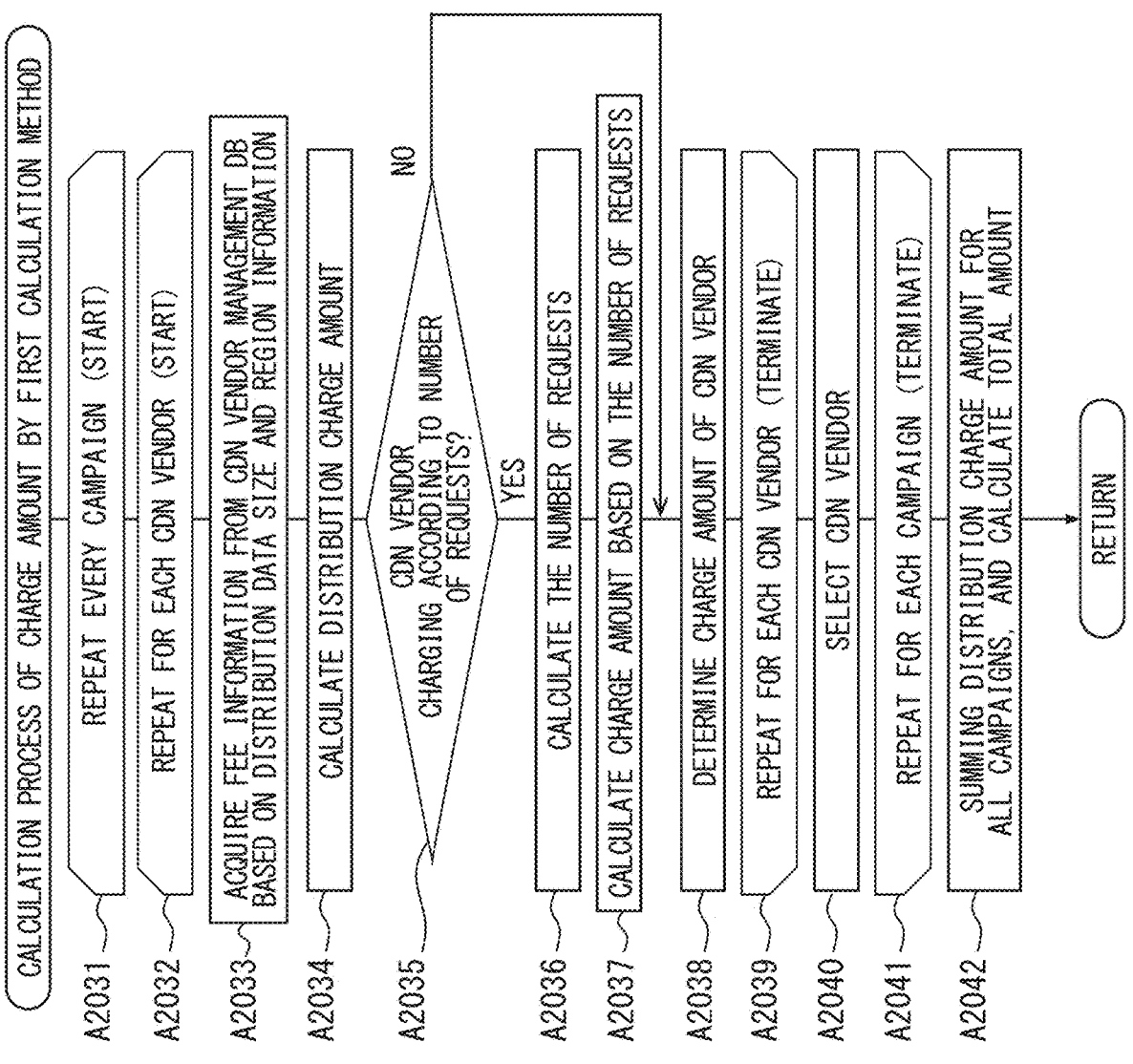

CALCULATION PROCESS OF CHARGE AMOUNT BY FIRST CALCULATION METHOD

A2031 — REPEAT EVERY CAMPAIGN (START)

A2032 — REPEAT FOR EACH CDN VENDOR (START)

A2033 — ACQUIRE FEE INFORMATION FROM CDN VENDOR MANAGEMENT DB BASED ON DISTRIBUTION DATA SIZE AND REGION INFORMATION

A2034 — CALCULATE DISTRIBUTION CHARGE AMOUNT

A2035 — CDN VENDOR CHARGING ACCORDING TO NUMBER OF REQUESTS?

NO

YES

A2036 — CALCULATE THE NUMBER OF REQUESTS

A2037 — CALCULATE CHARGE AMOUNT BASED ON THE NUMBER OF REQUESTS

A2038 — DETERMINE CHARGE AMOUNT OF CDN VENDOR

A2039 — REPEAT FOR EACH CDN VENDOR (TERMINATE)

A2040 — SELECT CDN VENDOR

A2041 — REPEAT FOR EACH CAMPAIGN (TERMINATE)

A2042 — SUMMING DISTRIBUTION CHARGE AMOUNT FOR ALL CAMPAIGNS, AND CALCULATE TOTAL AMOUNT

RETURN

FIG. 220

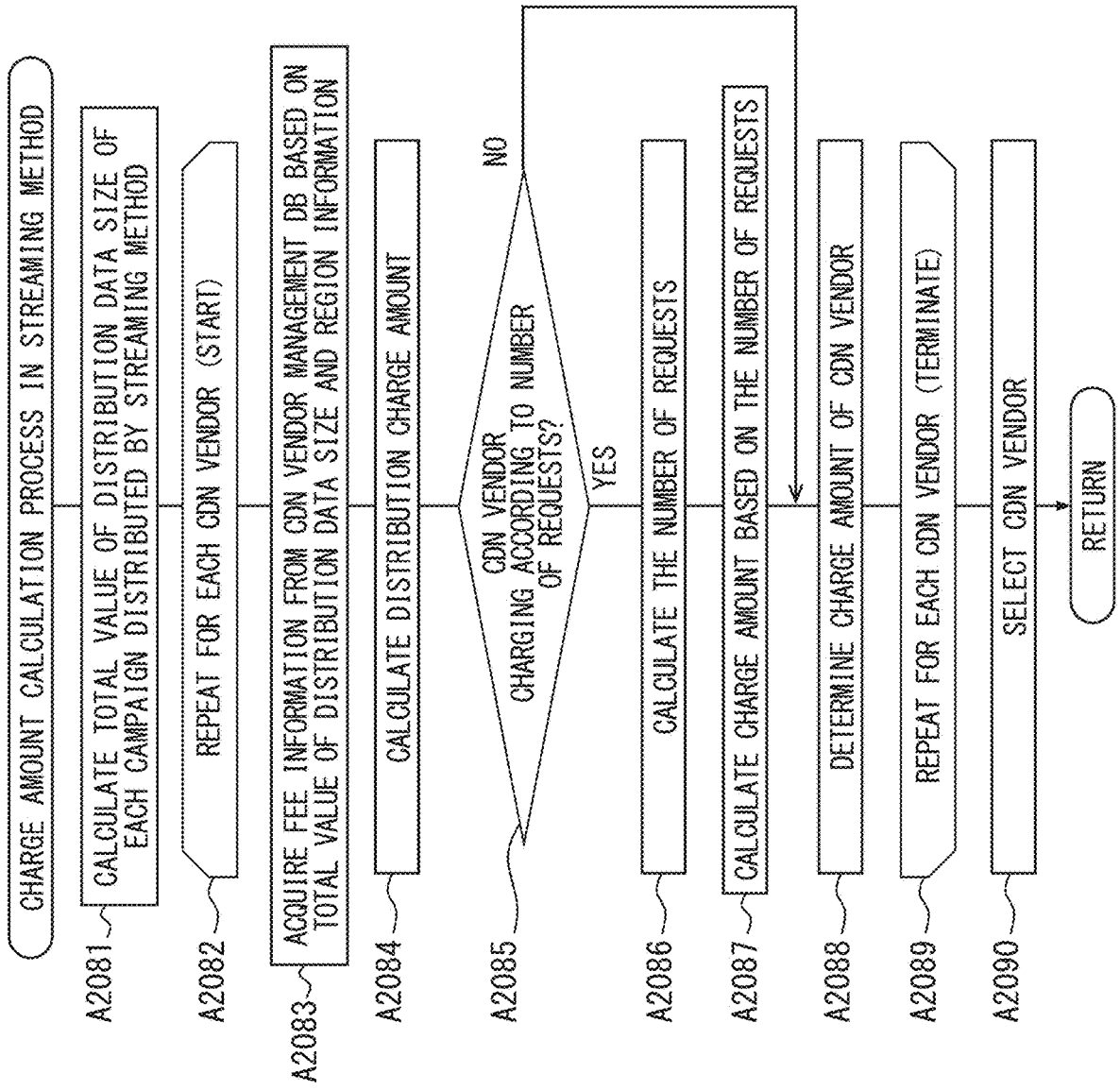

CHARGE AMOUNT CALCULATION PROCESS IN STREAMING METHOD

A2081 — CALCULATE TOTAL VALUE OF DISTRIBUTION DATA SIZE OF EACH CAMPAIGN DISTRIBUTED BY STREAMING METHOD

A2082 — REPEAT FOR EACH CDN VENDOR (START)

A2083 — ACQUIRE FEE INFORMATION FROM CDN VENDOR MANAGEMENT DB BASED ON TOTAL VALUE OF DISTRIBUTION DATA SIZE AND REGION INFORMATION

A2084 — CALCULATE DISTRIBUTION CHARGE AMOUNT

A2085 — CDN VENDOR CHARGING ACCORDING TO NUMBER OF REQUESTS?

NO

YES

A2086 — CALCULATE THE NUMBER OF REQUESTS

A2087 — CALCULATE CHARGE AMOUNT BASED ON THE NUMBER OF REQUESTS

A2088 — DETERMINE CHARGE AMOUNT OF CDN VENDOR

A2089 — REPEAT FOR EACH CDN VENDOR (TERMINATE)

A2090 — SELECT CDN VENDOR

RETURN

FIG. 221

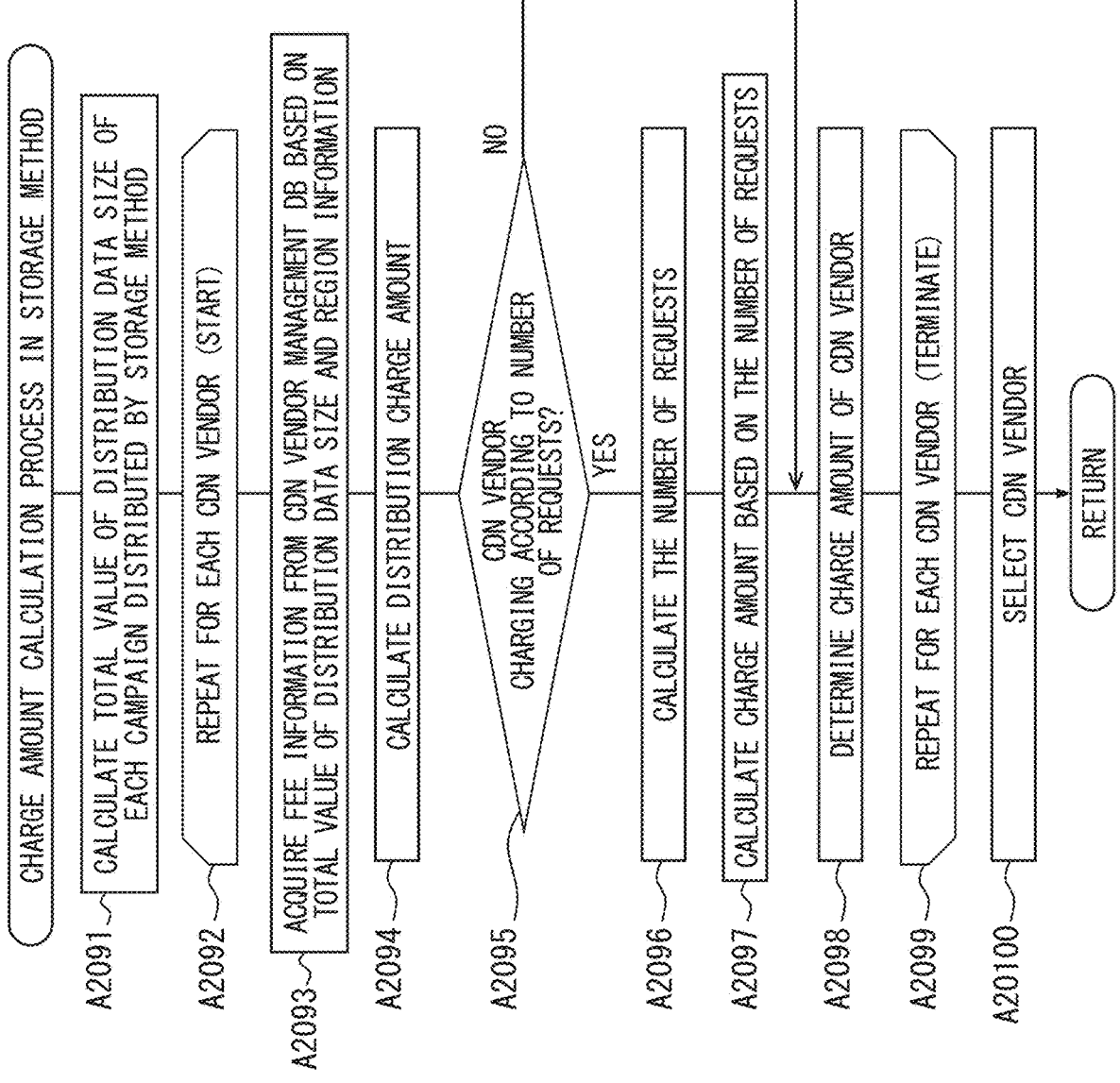

CHARGE AMOUNT CALCULATION PROCESS IN STORAGE METHOD

A2091 — CALCULATE TOTAL VALUE OF DISTRIBUTION DATA SIZE OF EACH CAMPAIGN DISTRIBUTED BY STORAGE METHOD

A2092 — REPEAT FOR EACH CDN VENDOR (START)

A2093 — ACQUIRE FEE INFORMATION FROM CDN VENDOR MANAGEMENT DB BASED ON TOTAL VALUE OF DISTRIBUTION DATA SIZE AND REGION INFORMATION

A2094 — CALCULATE DISTRIBUTION CHARGE AMOUNT

A2095 — CDN VENDOR CHARGING ACCORDING TO NUMBER OF REQUESTS?

NO

YES

A2096 — CALCULATE THE NUMBER OF REQUESTS

A2097 — CALCULATE CHARGE AMOUNT BASED ON THE NUMBER OF REQUESTS

A2098 — DETERMINE CHARGE AMOUNT OF CDN VENDOR

A2099 — REPEAT FOR EACH CDN VENDOR (TERMINATE)

A20100 — SELECT CDN VENDOR

RETURN

START

A20121 — ACQUIRE UPDATE OF PREDICTION VALUE

A20122 — ACQUIRE SELECTION INFORMATION

A20123 — ACQUIRE DISTRIBUTION PREDICTION VALUE

A20124 — CALCULATE DISTRIBUTION DATA SIZE FOR EACH CAMPAIGN

A20125 — SECOND CDN SELECTION PROCESS

A20126 — CDN VENDOR CHANGES?

NO

YES

A20127 — UPDATE SELECTION RESULT

A20128 — TRANSMIT CDN CHANGE NOTIFICATION

TERMINATE

DATA COMMUNICATION SYSTEM, CENTER DEVICE, MASTER DEVICE, STORAGE MEDIUM STORING ENCRYPTION PROGRAM, AND STORAGE MEDIUM STORING DECRYPTION PROGRAM

CROSS REFERENCE TO RELATED APPLICATIONS

The present application is a continuation application of International Patent Application No. PCT/JP2022/024875 filed on Jun. 22, 2022 which designated the U.S. and claims the benefit of priority from Japanese Patent Application No. 2021-161212 filed on Sep. 30, 2021. The entire disclosures of all of the above applications are incorporated herein by reference.

TECHNICAL FIELD

The present disclosure relates to a data communication system, a center device, a master device, an encryption program, and a decryption program.

BACKGROUND

In recent years, with diversification of vehicle control such as a driving assistance function and an automated driving function, a scale of application programs for vehicle control, diagnosis, and the like mounted on an electronic control unit (hereinafter, referred to as an ECU) has increased. In addition, with the version up by function improvement or the like, there are increasing opportunities for reprogramming the application program of the ECU. The reprogramming may also be referred to as program updating. On the other hand, with the development of communication networks and the like, connected car technology has also become widespread. Under such circumstances, for example, a related art discloses a technique of distributing an update package in which update data is packaged from a center device to a master device on a vehicle side by an Over The Air (OTA) technique. The master device is a device that controls reprogramming of the application program of the ECU. The update data distributed from the center device to the master device includes, for example, application programs and data of automated driving, advanced driver-assistance systems (ADAS), multimedia, and the like.

SUMMARY

A data communication system includes a center device that distributes update data to a master device, and a master device that installs the update data downloaded from the center device in an electronic control unit to be reprogrammed. The center device generates a common key for encrypting the update data; encrypts the update data with the common key; encrypts the common key; stores the common key encrypted in a campaign notification; places the update data encrypted with the common key in a content delivery network (CDN); and transmits the campaign notification. The master device acquires the common key from the campaign notification; decrypts the encrypted common key to extract the common key; downloads and acquires encrypted update data from the CDN; performs an exclusive OR operation; and transfers the decrypted update data to the electronic control unit, and installs the update data in the electronic control unit.

BRIEF DESCRIPTION OF DRAWINGS

The above object and other objects, features, and advantages of the present disclosure will become more apparent from the following detailed description with reference to the accompanying drawings. The drawings include:

FIG. 5 is a diagram illustrating a comparison between advantages and disadvantages of a CBC mode and a CTR mode;

FIG. 8 is a diagram for describing a decryption process in a CTR mode;

FIG. 11 is a diagram illustrating a process by the OTA center;

FIG. 17 is a diagram illustrating a comparison of advantages and disadvantages between the CBC mode and the OFB mode;

FIG. 19 is a diagram for describing a decryption process in a CTR mode;

FIG. 37 is a diagram illustrating a process by the OTA master;

FIG. 39 is a diagram illustrating a process by the OTA master according to the fifth embodiment;

FIG. 46 is a diagram illustrating a configuration of the RP metadata;

FIG. 47 is a diagram illustrating a configuration of the RP metadata;

FIG. 51 is a diagram illustrating a process by the OTA center;

FIG. 52 is a diagram illustrating a process by the OTA master;

Figure 56:
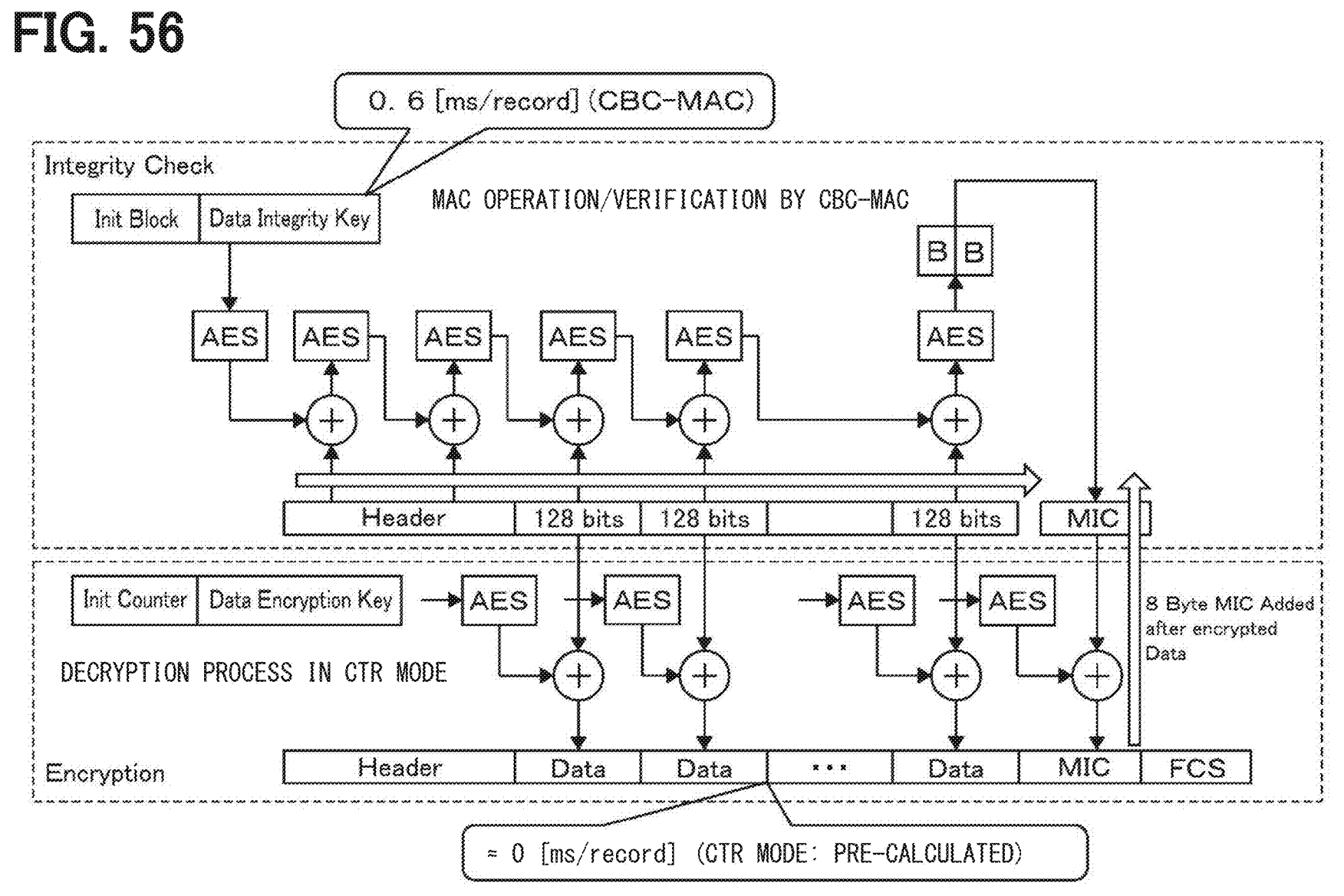

FIG. 56 illustrates a function in a CCMP mode;

FIG. 57 is a diagram for describing estimation of throughput in the CCMP mode;

FIG. 59 is a diagram for describing estimation of throughput by a conventional method;

FIG. 70 is a diagram for describing estimation of throughput in the GCMP mode;

FIG. 72 is a diagram illustrating a process by the OTA center;

Figure 81:
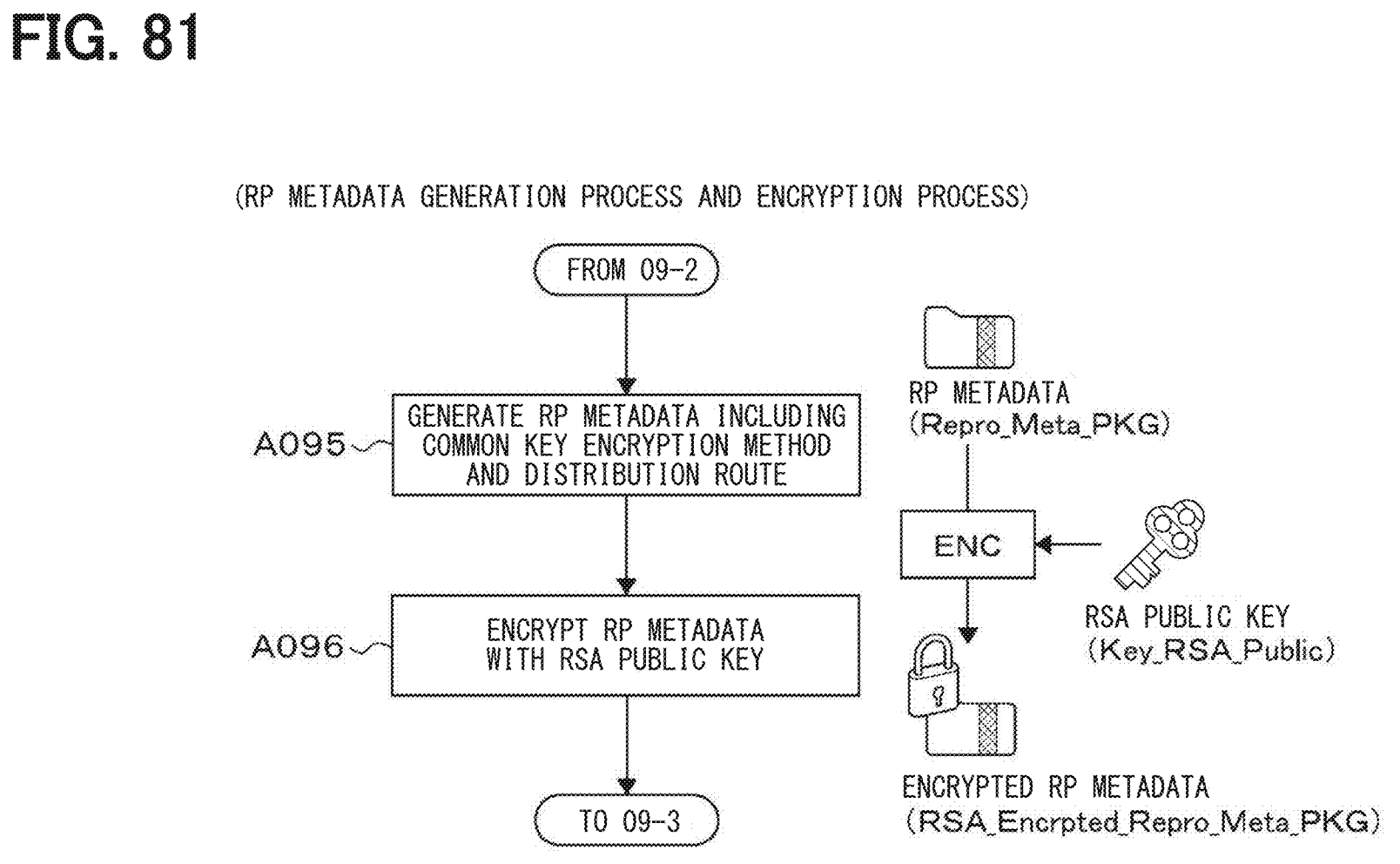

FIG. 81 is a diagram illustrating a process by the OTA center;

FIG. 82 is a diagram illustrating a process by the OTA center;

FIG. 83 is a diagram illustrating a process by the OTA master;

FIG. 90 is a diagram illustrating a CDN price table of each cloud service;

FIG. 91 is a diagram illustrating a price table of a storage method of each cloud service business operator;

FIG. 92 is a diagram illustrating a price table for each streaming size in a streaming method of a cloud service business operator;

FIG. 93 is a diagram illustrating a price table for each streaming size in the streaming method of each cloud service business operator;

FIG. 98 is a diagram illustrating a process by the OTA center;

FIG. 107 is a diagram illustrating a process by the OTA master;

FIG. 110 is a diagram illustrating a process by the OTA center;

FIG. 111 is a diagram illustrating a process by the OTA center;

FIG. 112 is a diagram illustrating a process by the OTA center;

FIG. 114 is a diagram illustrating a process by the OTA master;

FIG. 115 is a diagram illustrating a process by the OTA master;

FIG. 118 is a diagram for describing a decryption process in the CTR mode;

FIG. 119 is a diagram illustrating a process by the OTA center;

FIG. 120 is a diagram illustrating a process by the OTA center;

FIG. 121 is a diagram illustrating a process by the OTA center;

FIG. 122 is a diagram illustrating a process by the OTA master;

FIG. 123 is a diagram illustrating a process by the OTA master;

FIG. 124 is a diagram illustrating a process by the OTA master;

FIG. 125 is a diagram illustrating a flow of a process in the entire system according to the fourteenth embodiment;

FIG. 126 is a diagram for describing AES individual keys;

FIG. 127 is a diagram illustrating a process by the OTA center;

FIG. 128 is a diagram illustrating a process by the OTA center;

FIG. 129 is a diagram illustrating a process by the OTA center;

FIG. 130 is a diagram illustrating a process by the OTA master;

Figure 132:
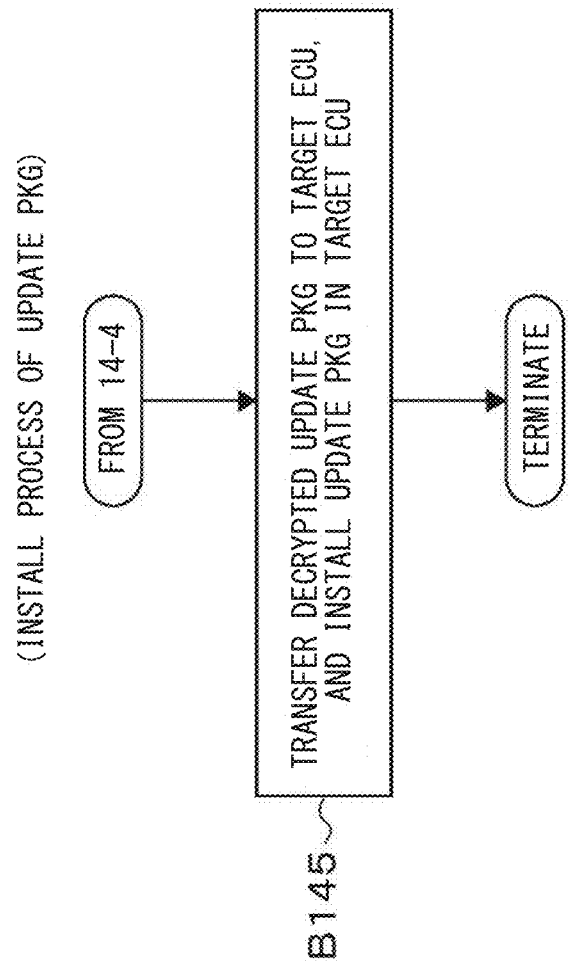
Figure 133:
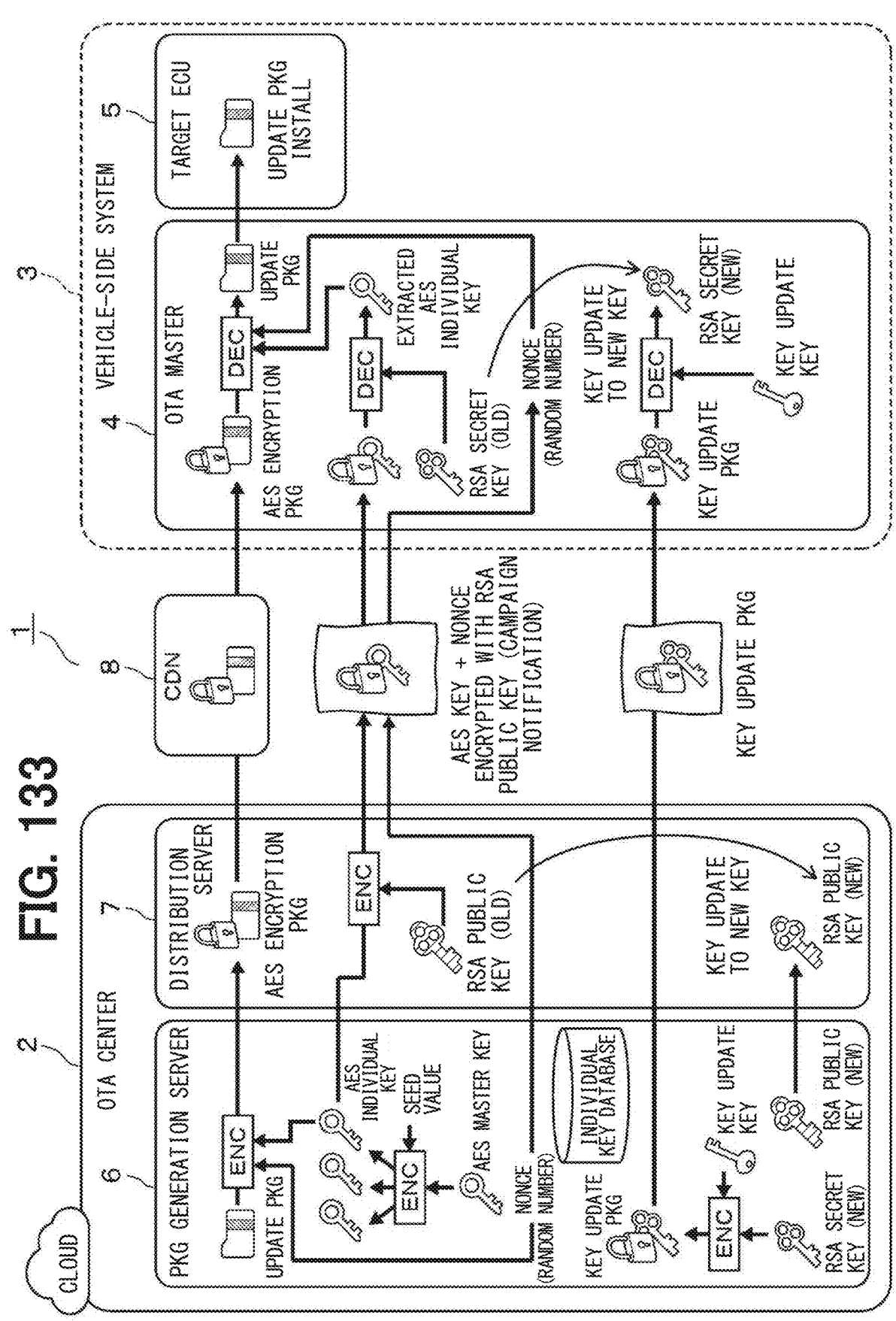
Figure 134:
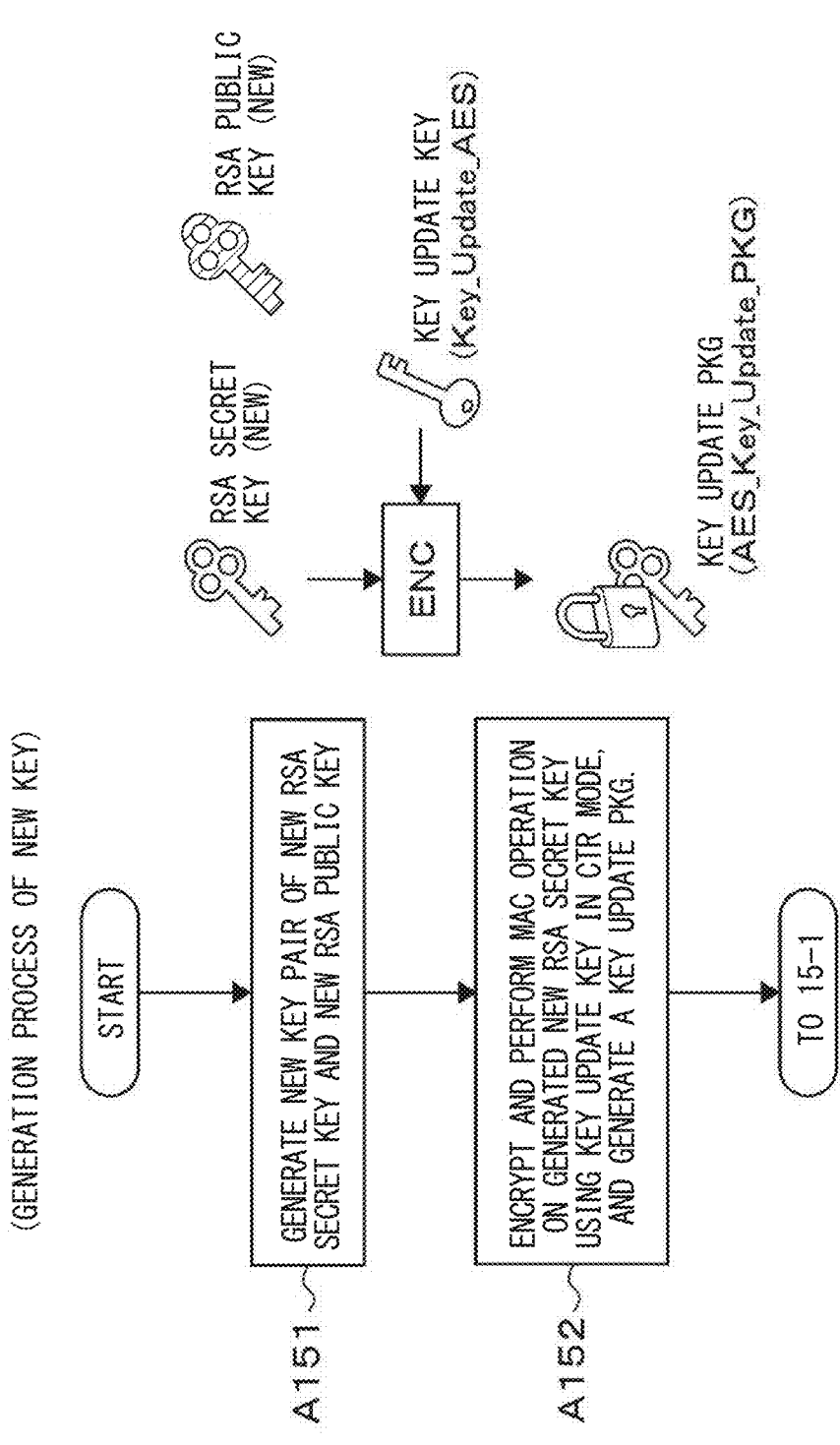
Figure 138:
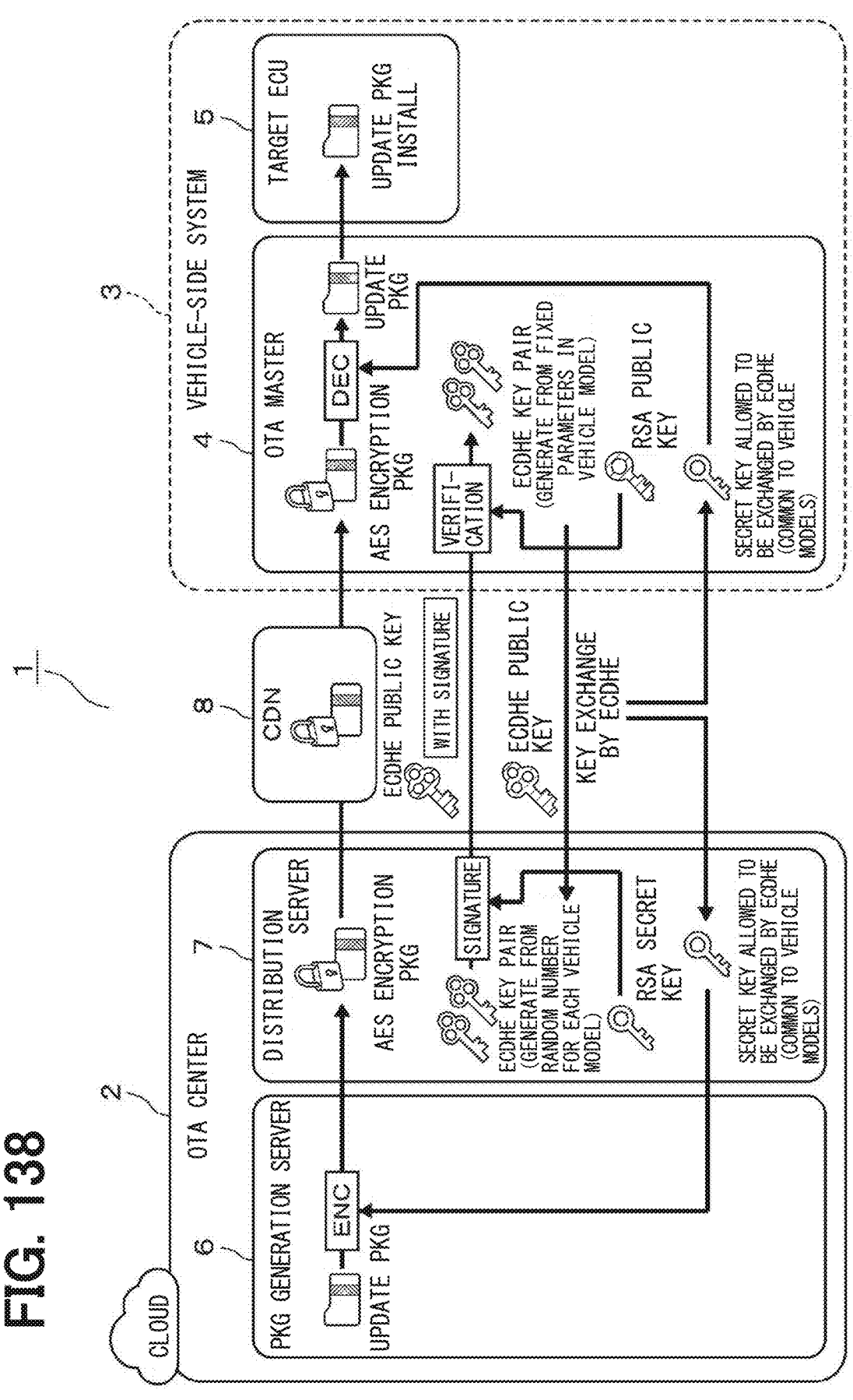
Figure 139:
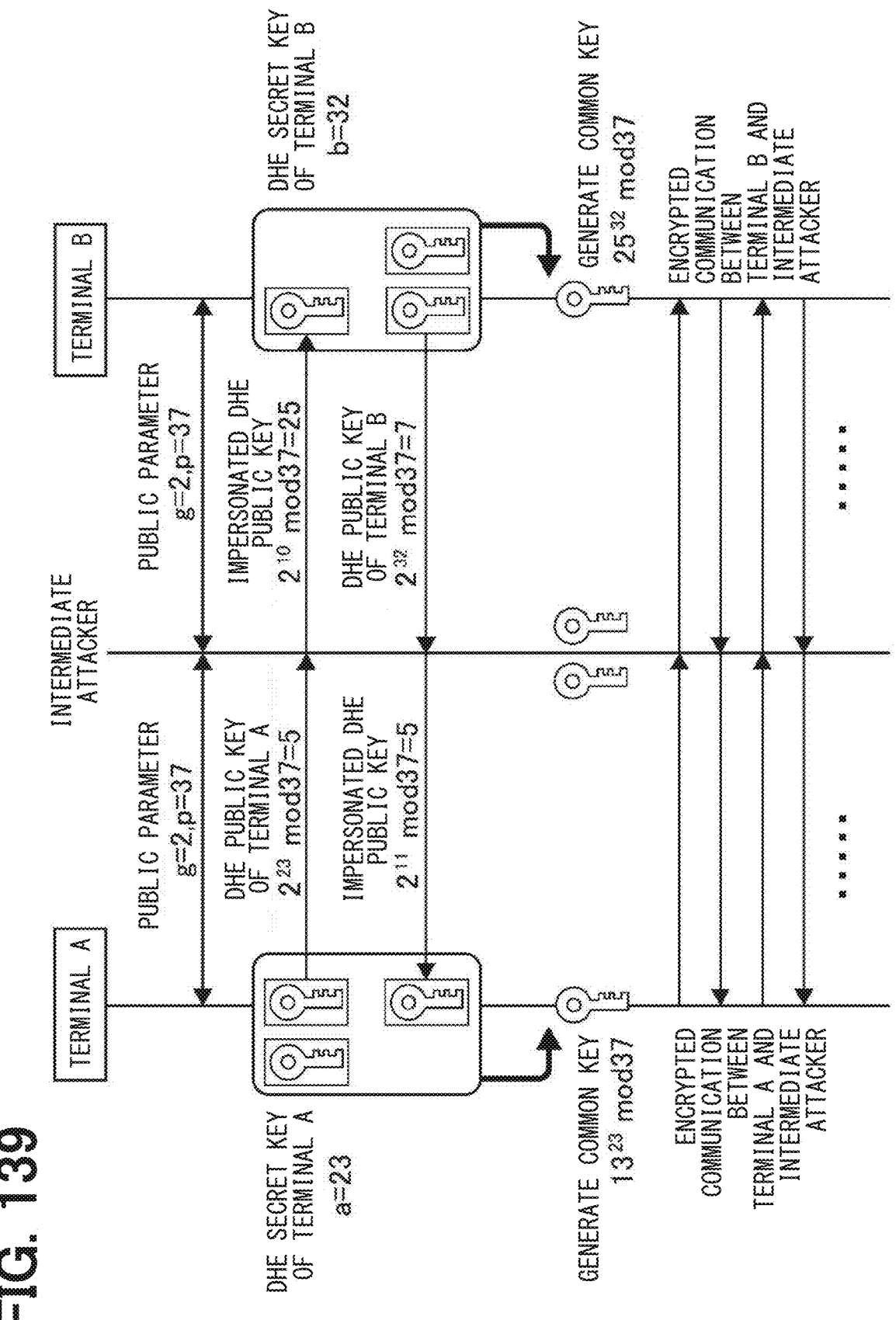
Figure 140:
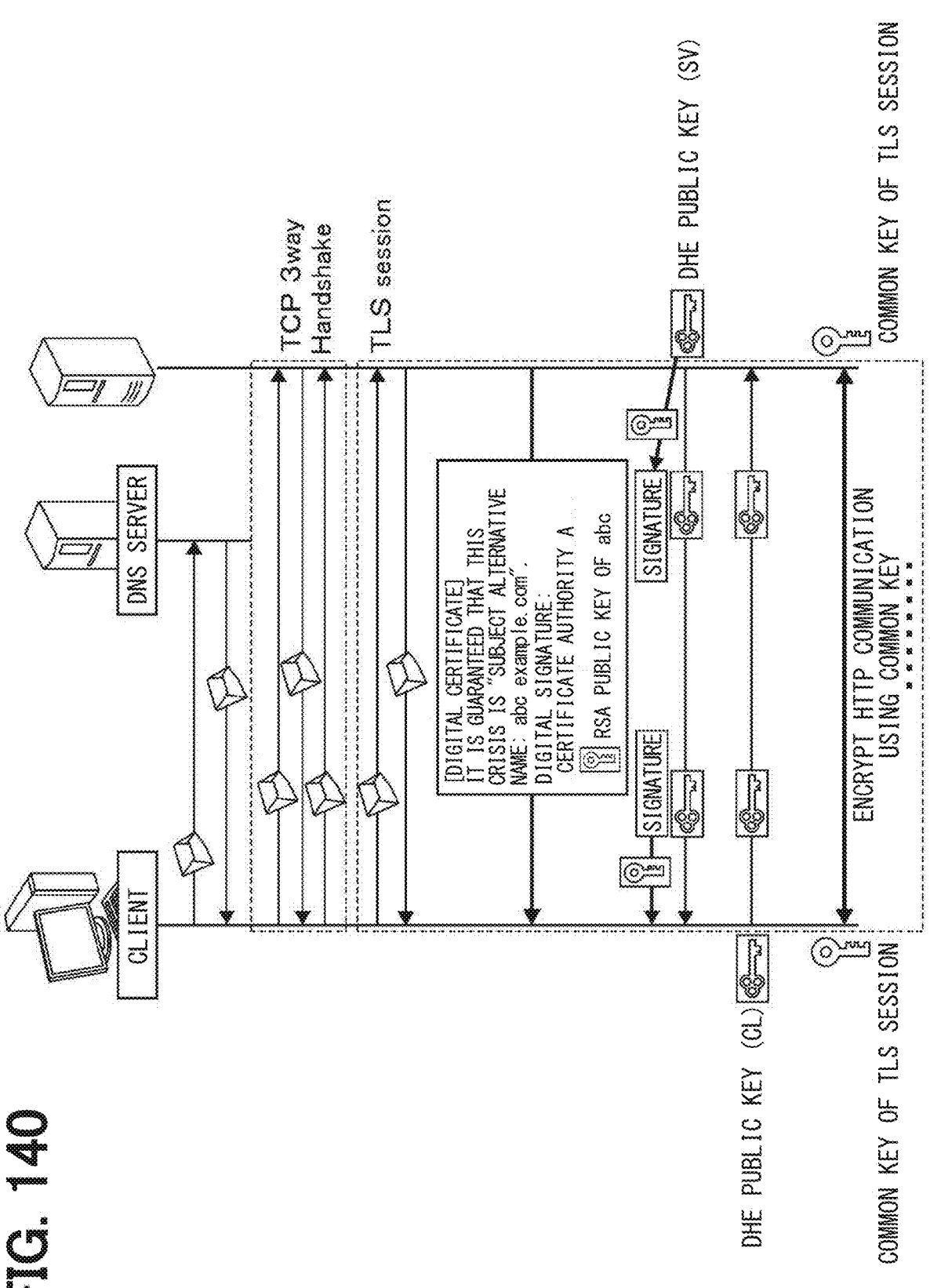
Figure 142:
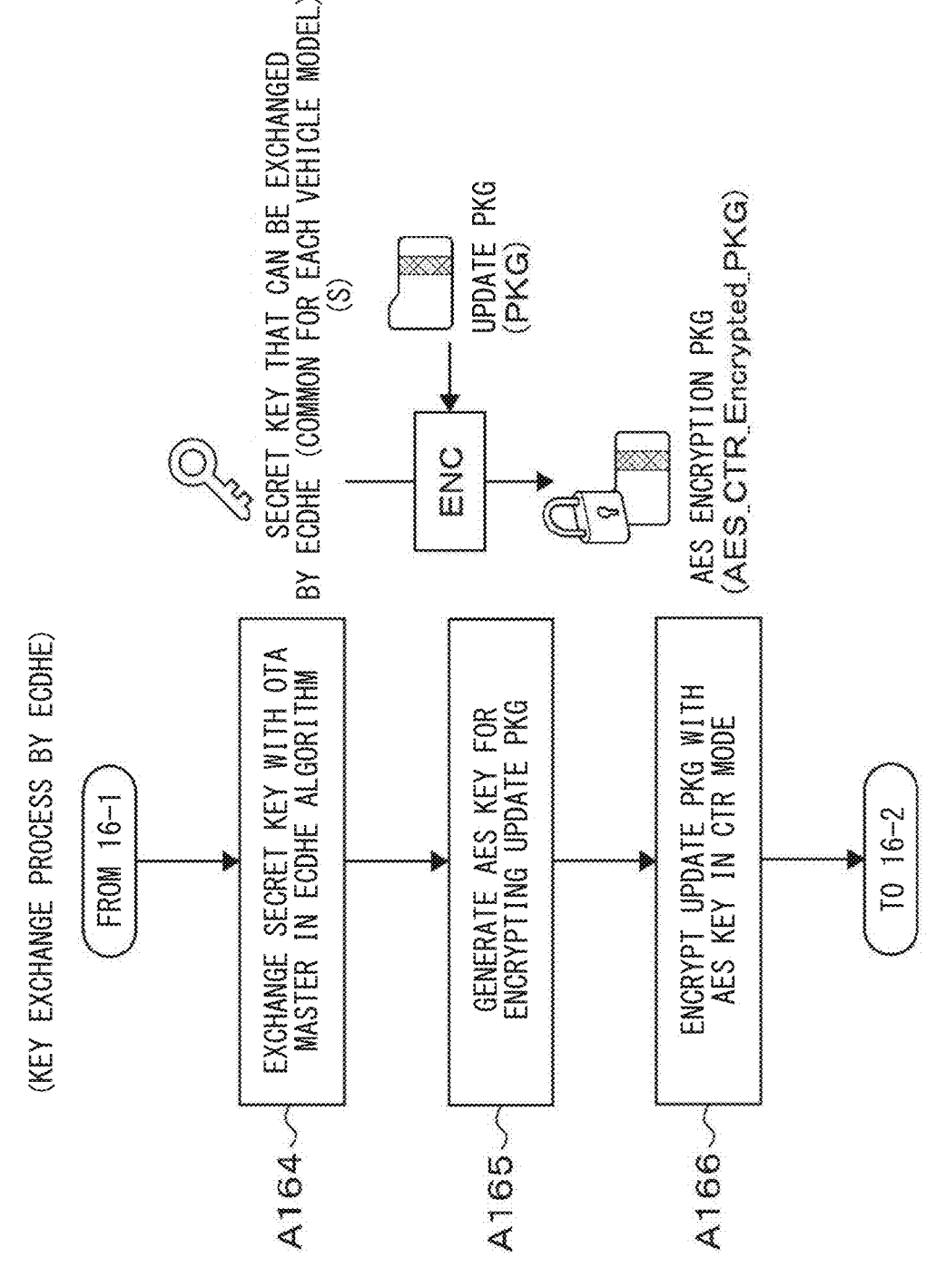
Figure 145:
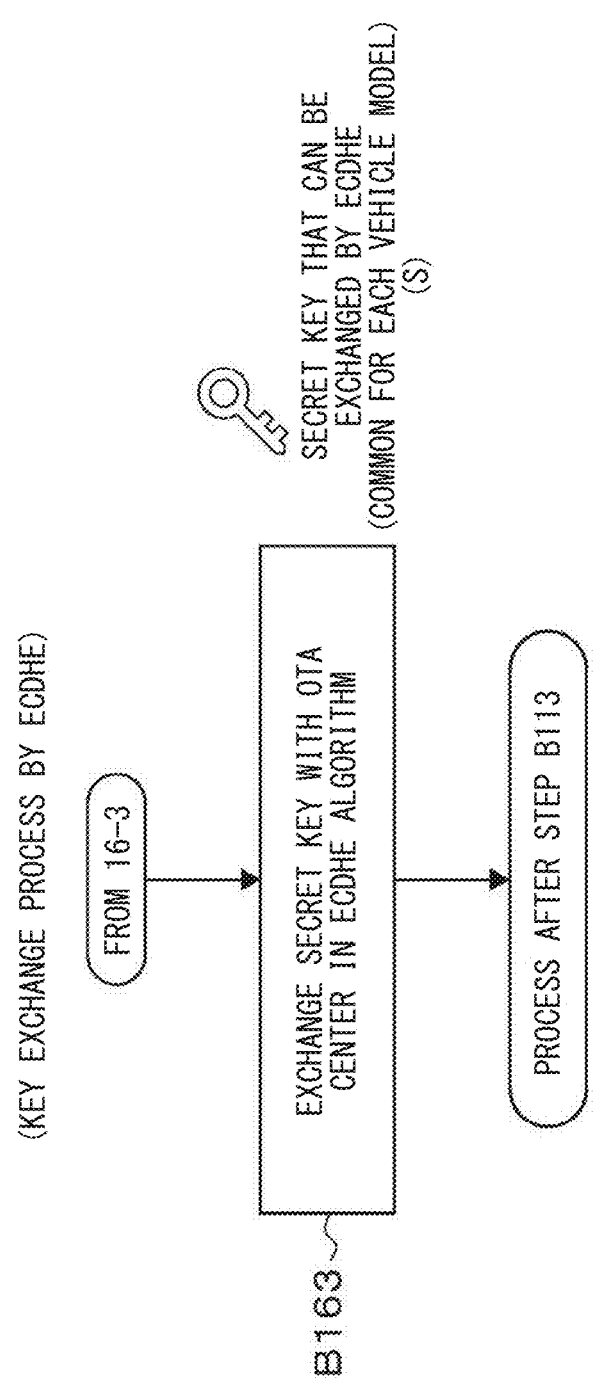
Figure 146:
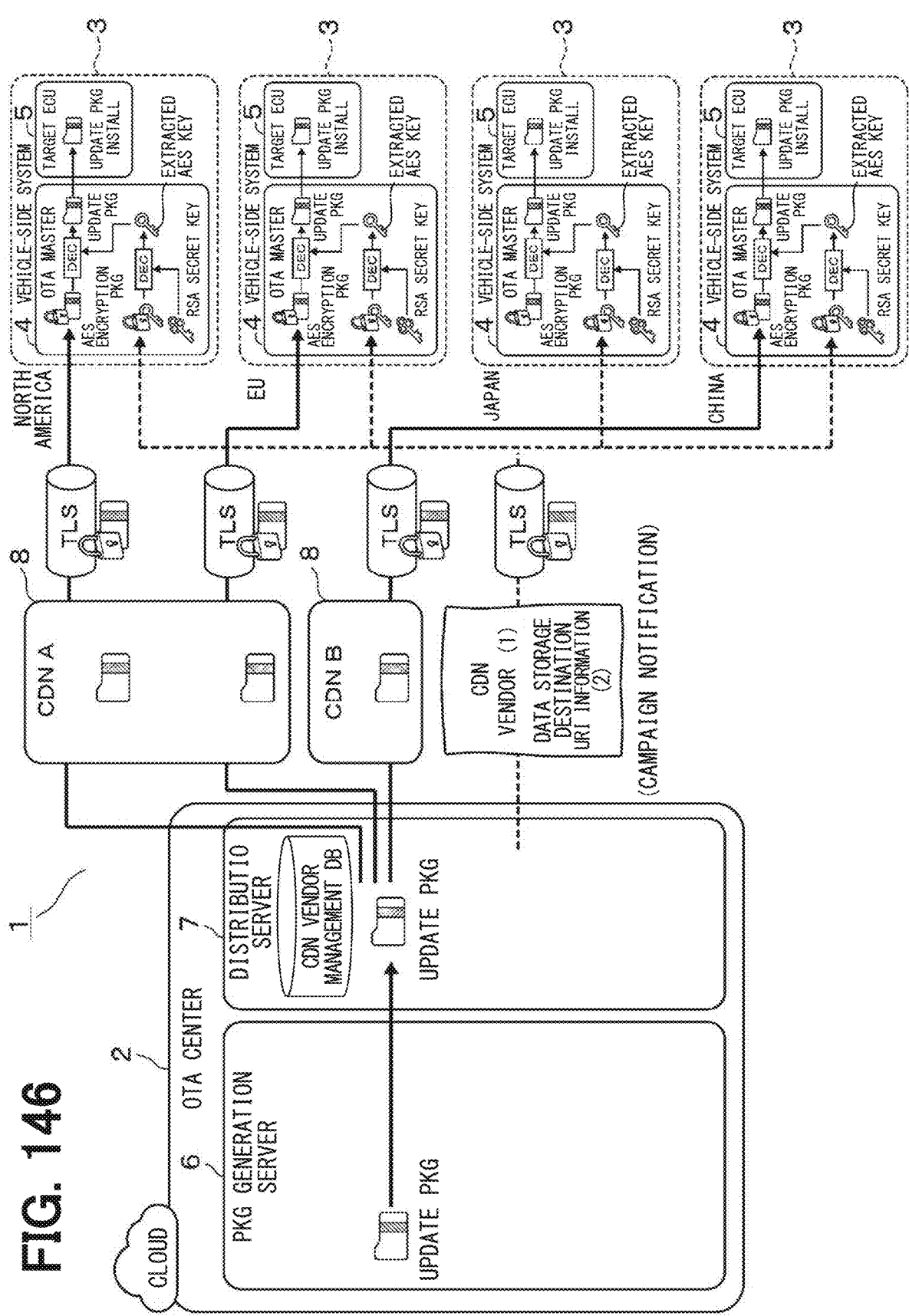
Figure 148:
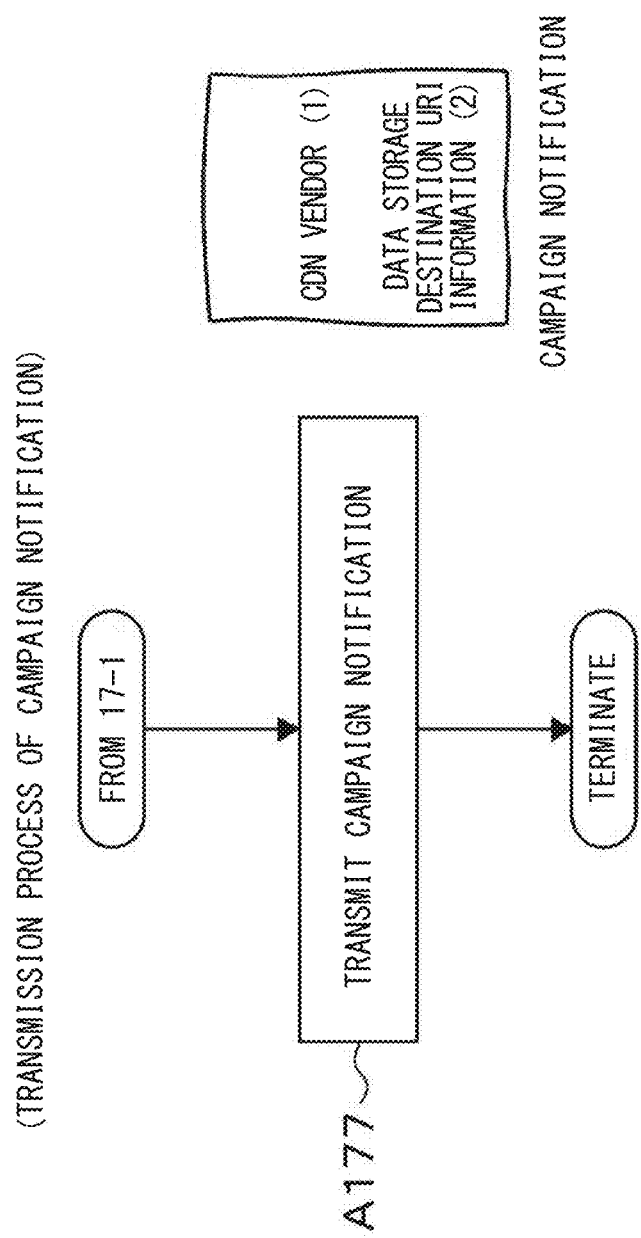
Figure 151:
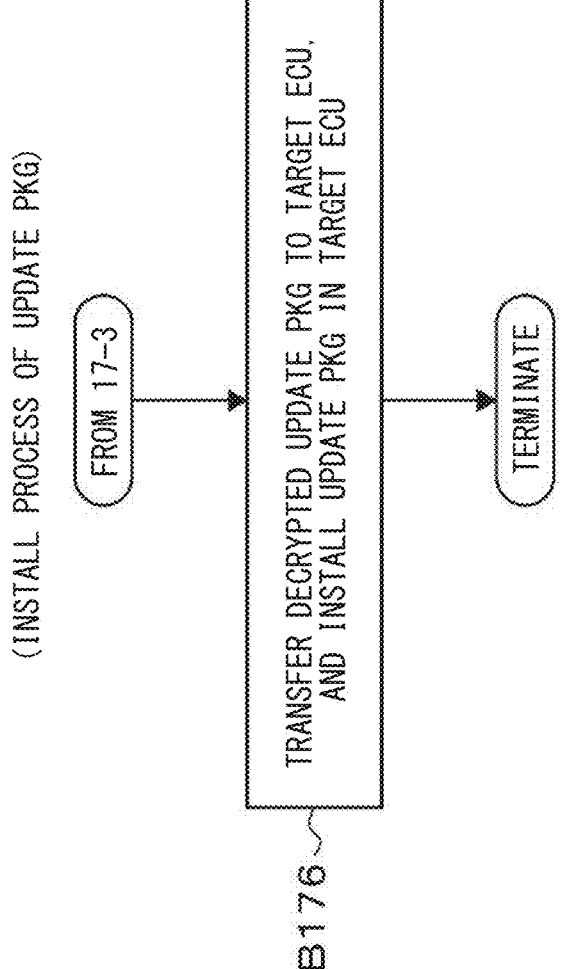
Figure 152:
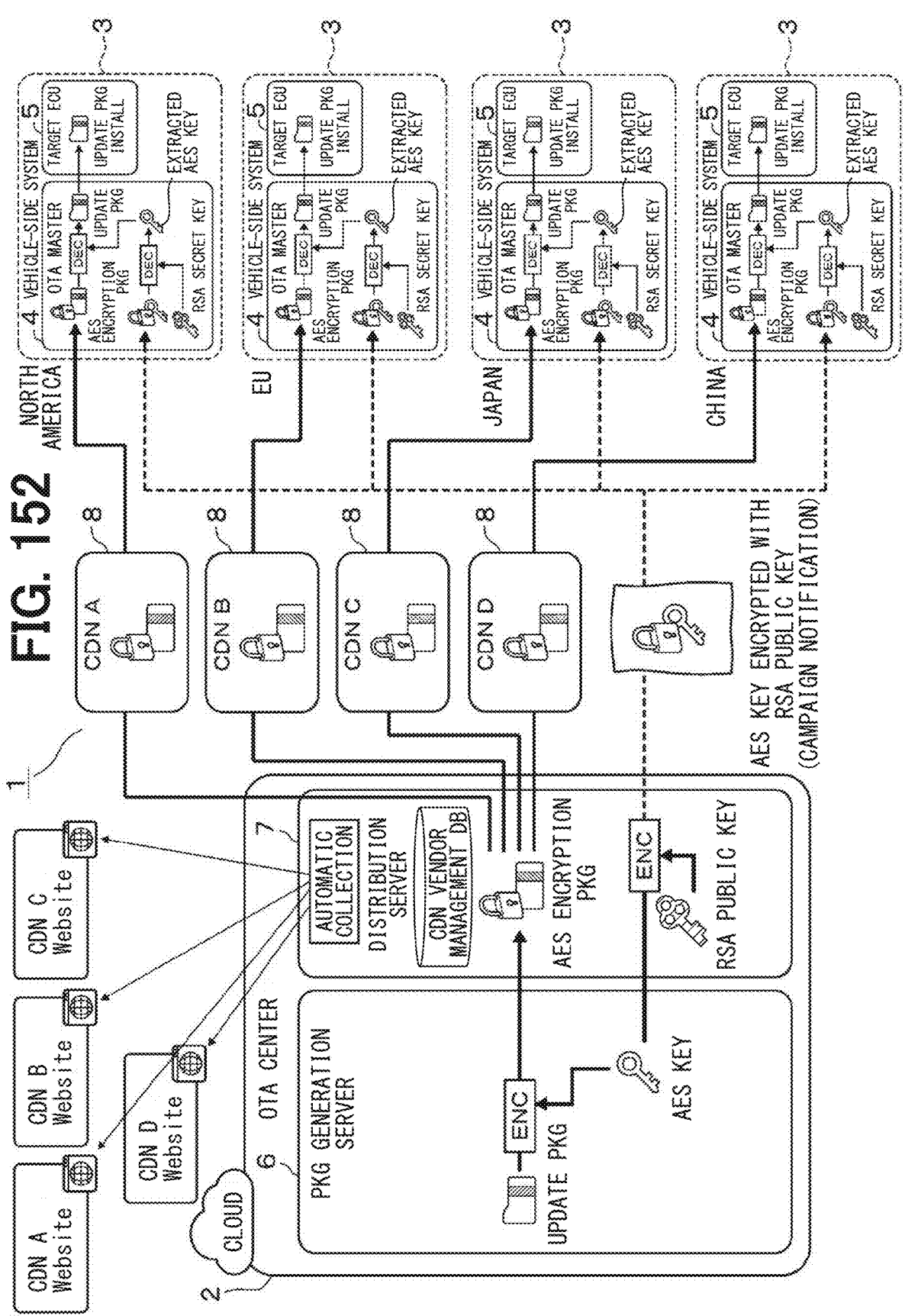
Figure 165:
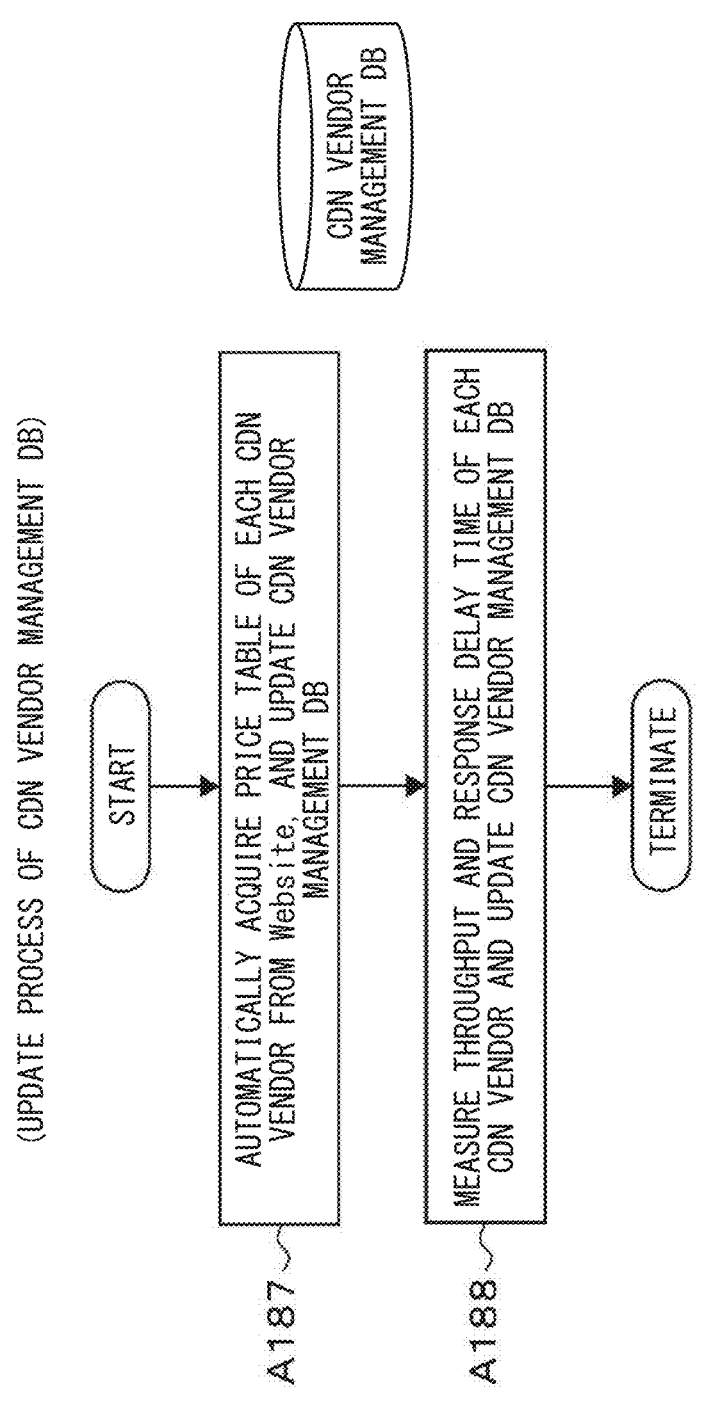
Figure 166:
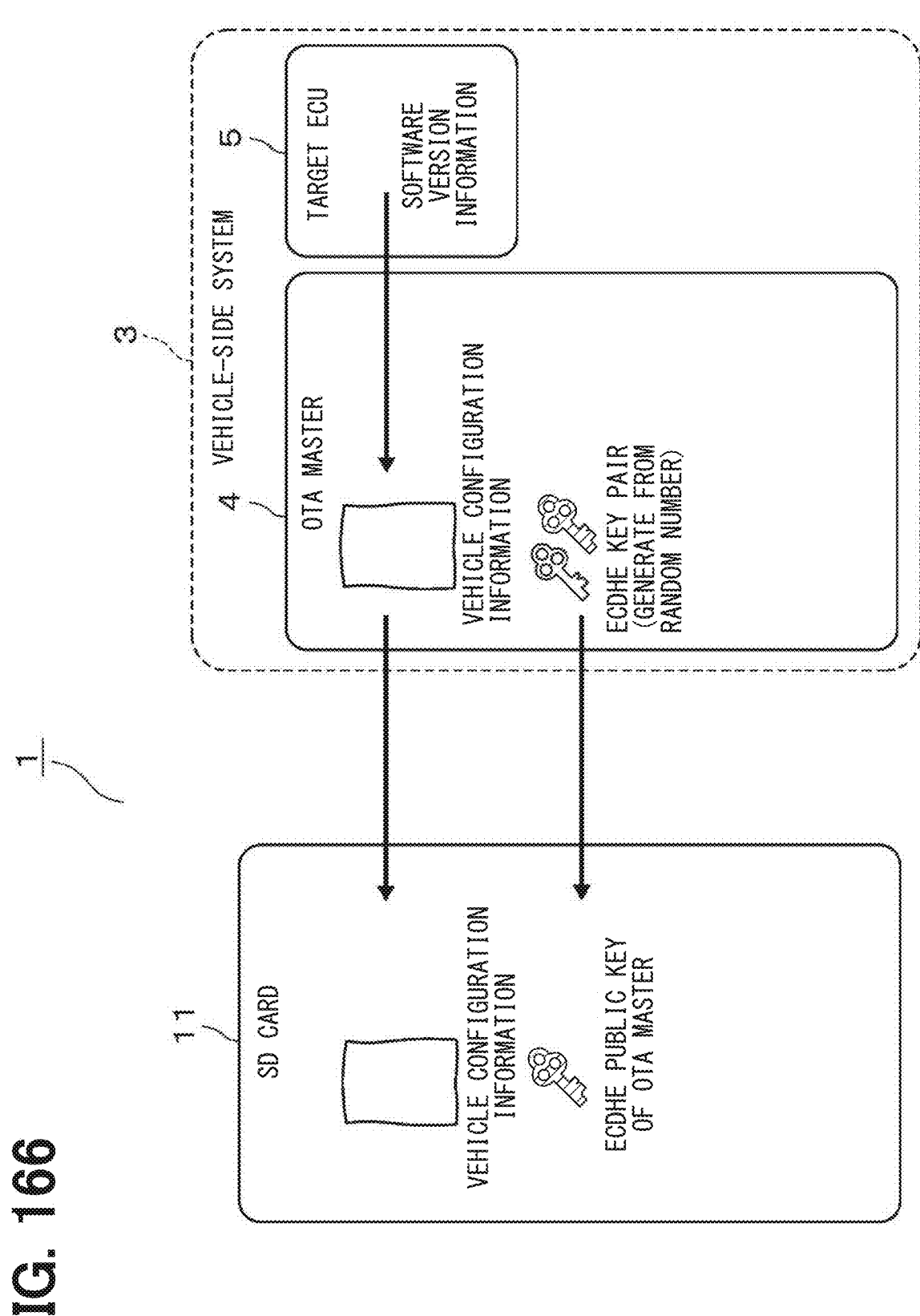
Figure 167:
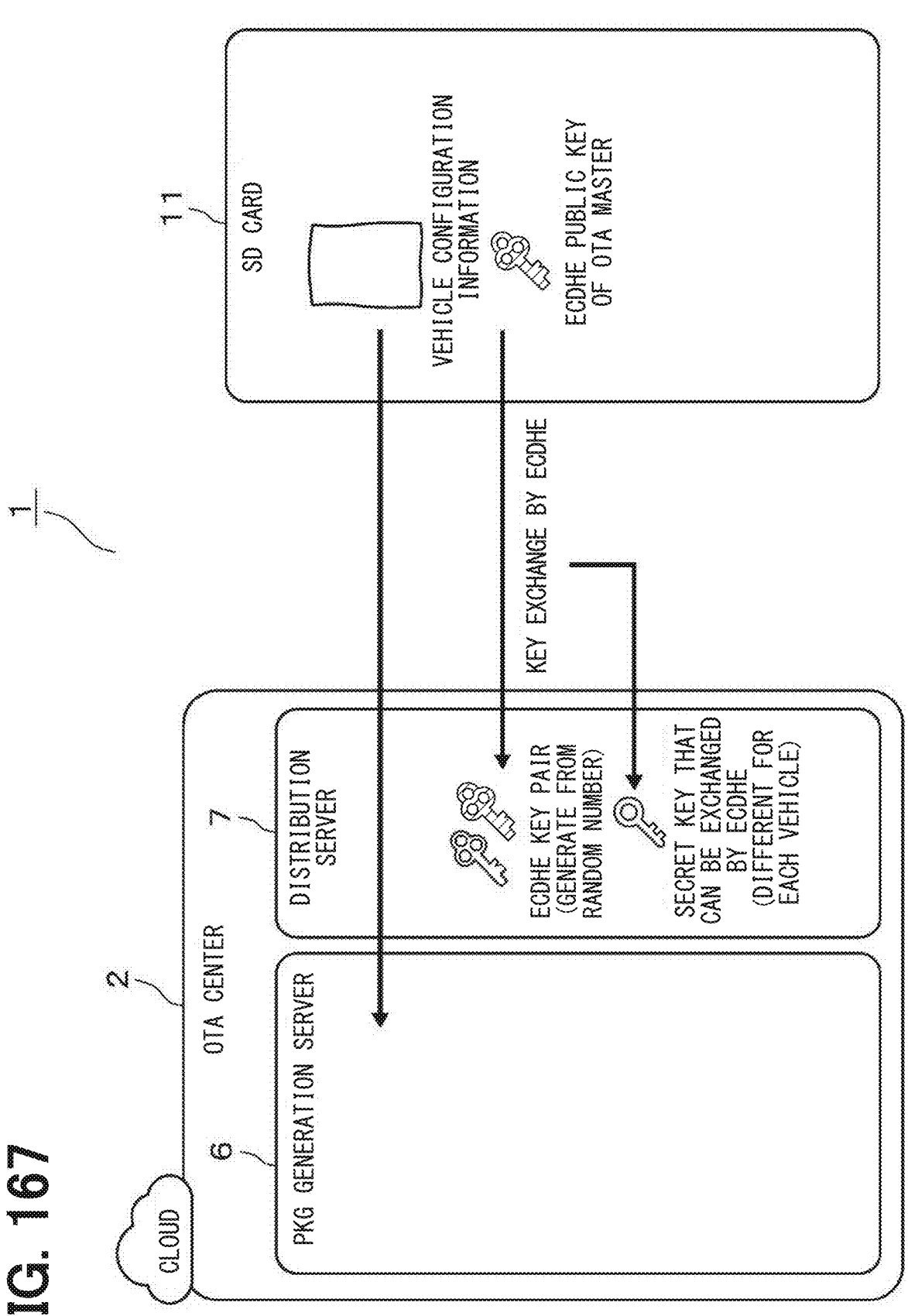
Figure 168:
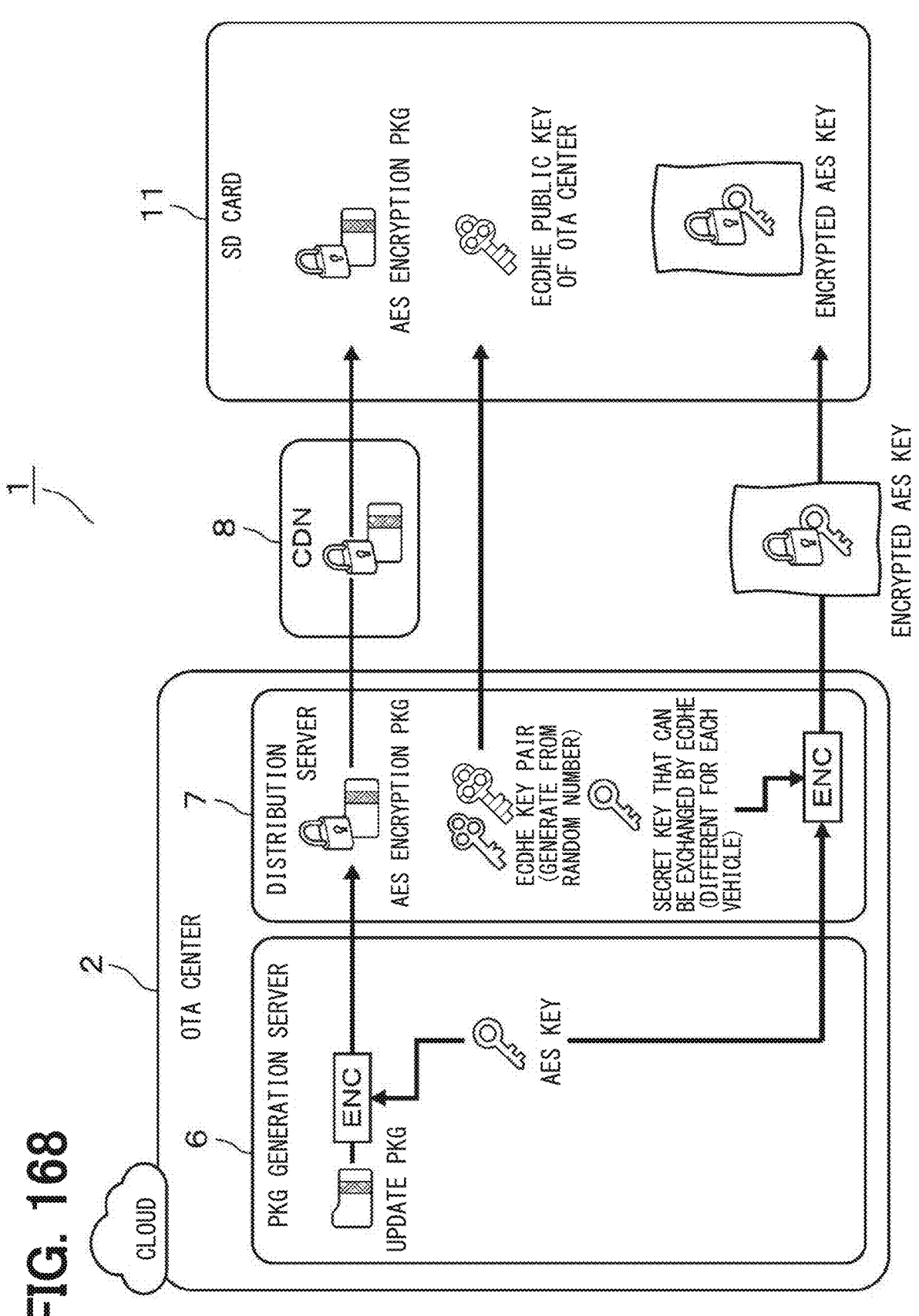
Figure 169:
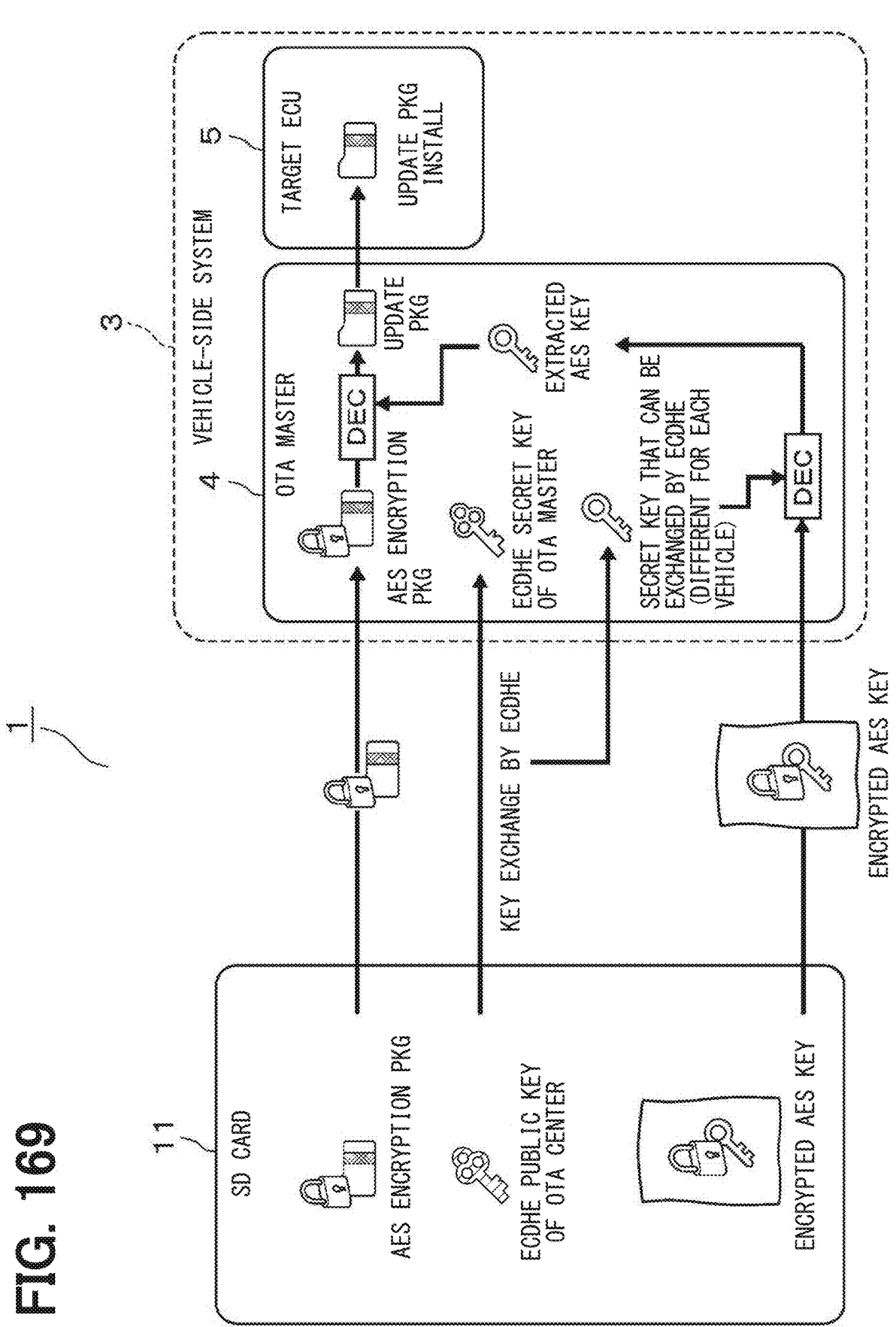
Figure 171:
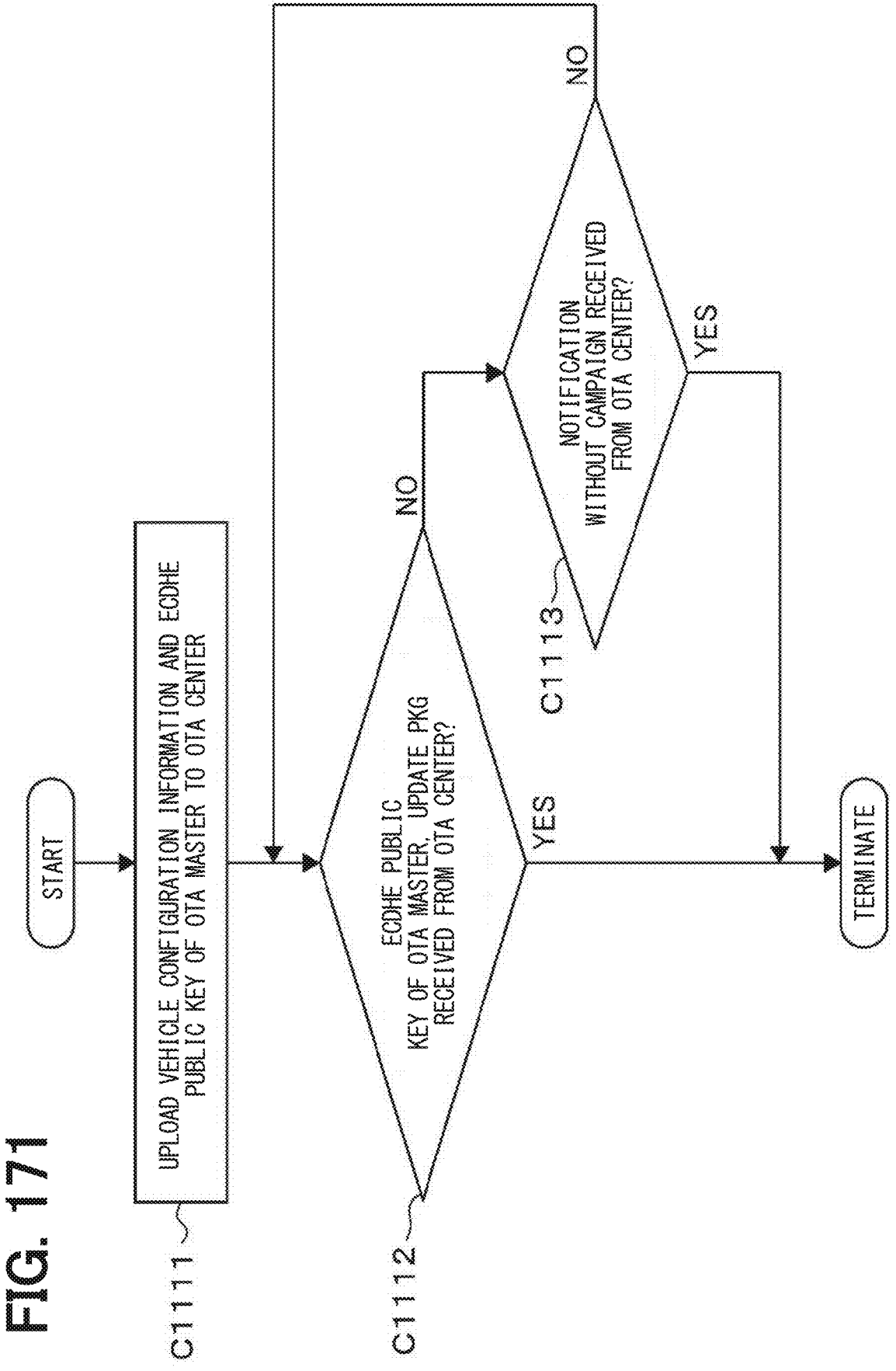
Figure 172:
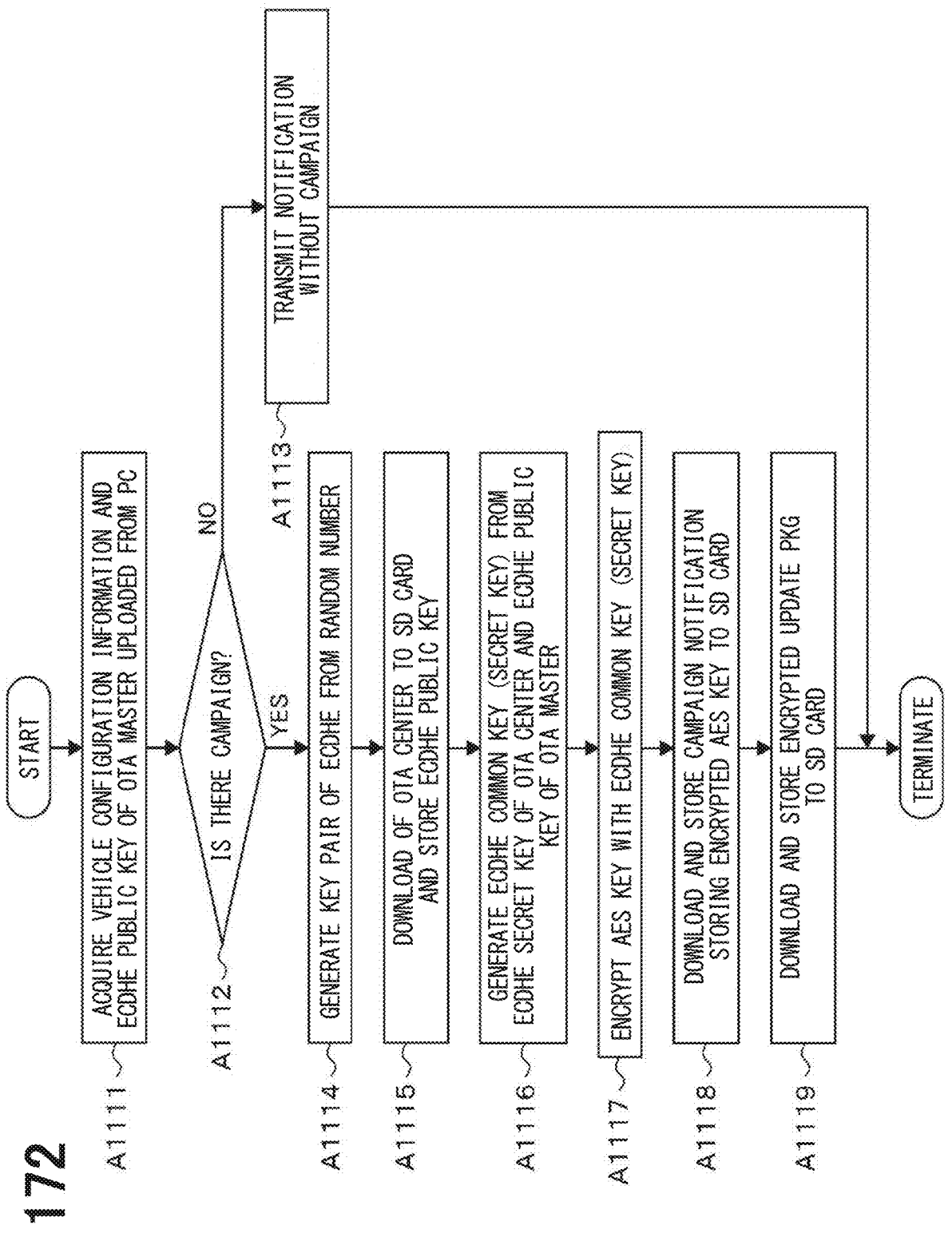
Figure 174:
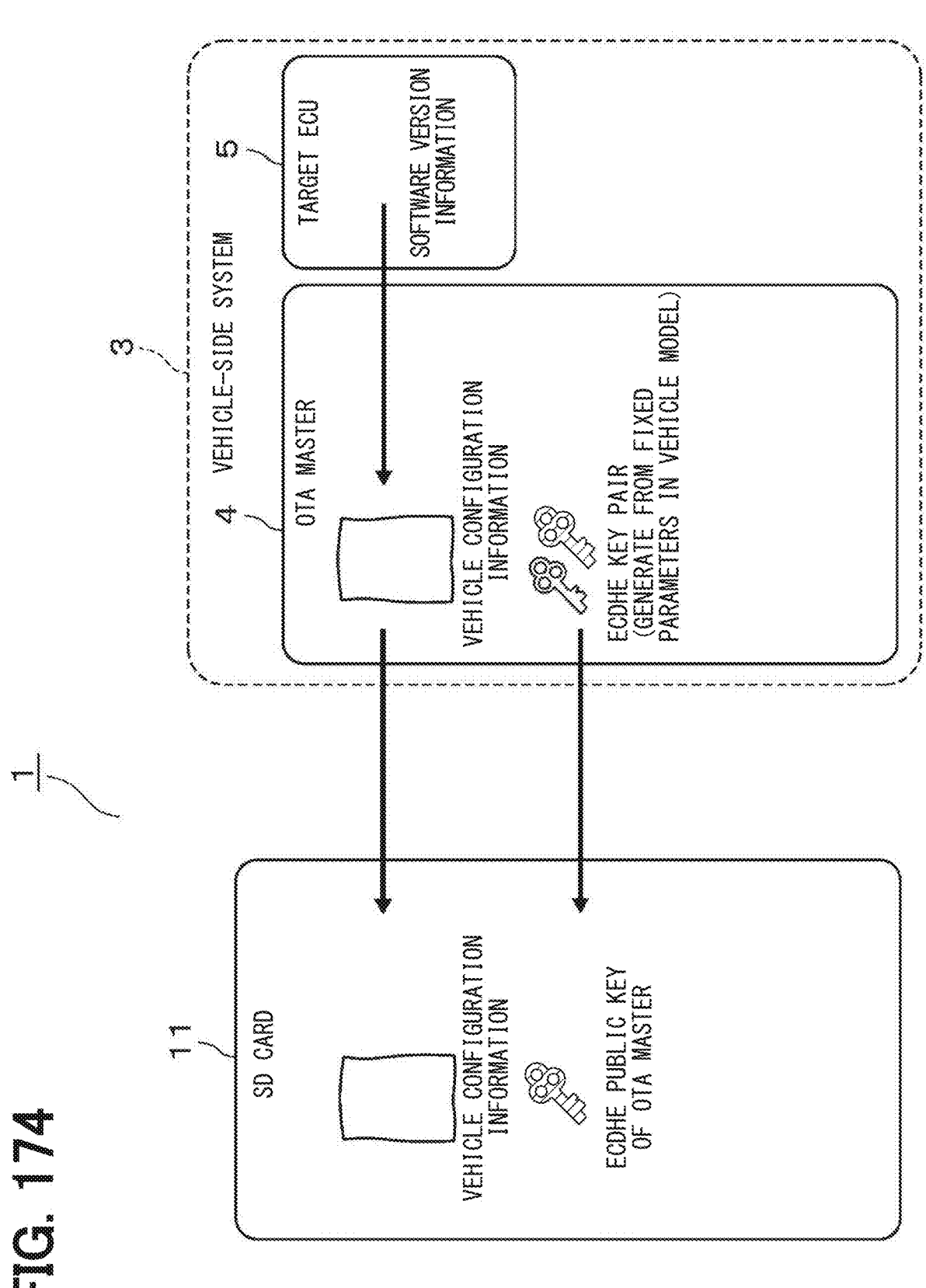
Figure 175:
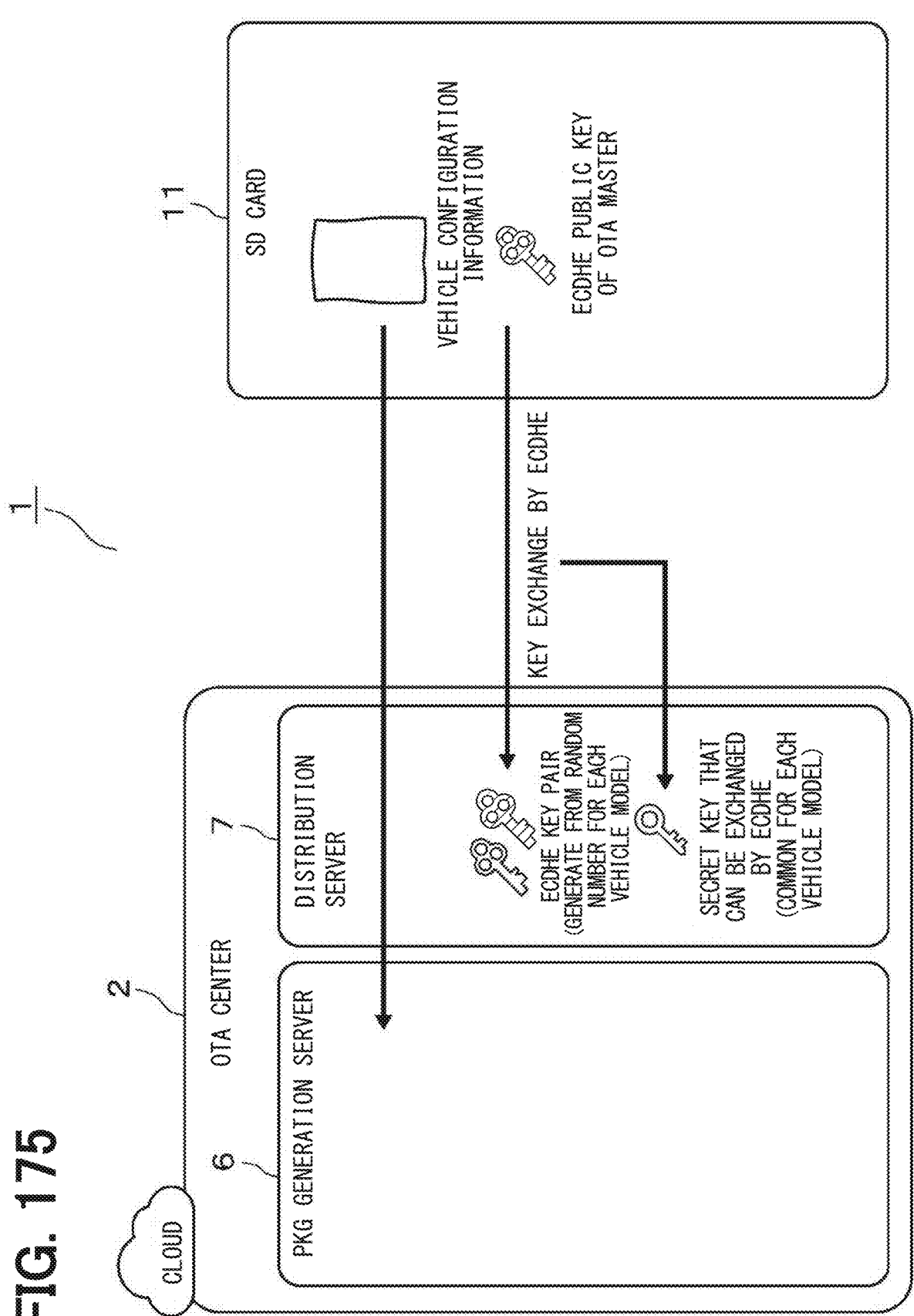
Figure 176:
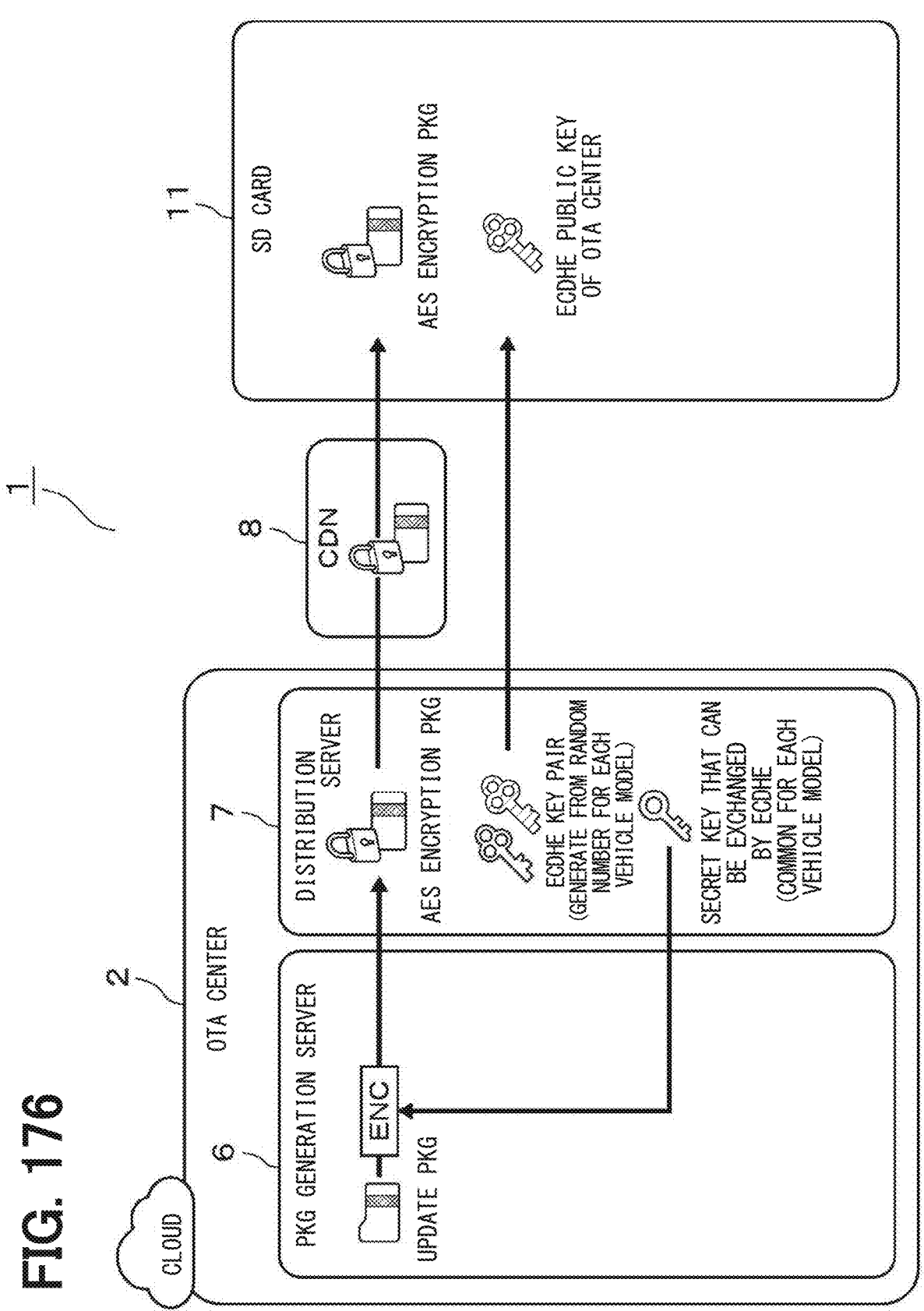
Figure 177:
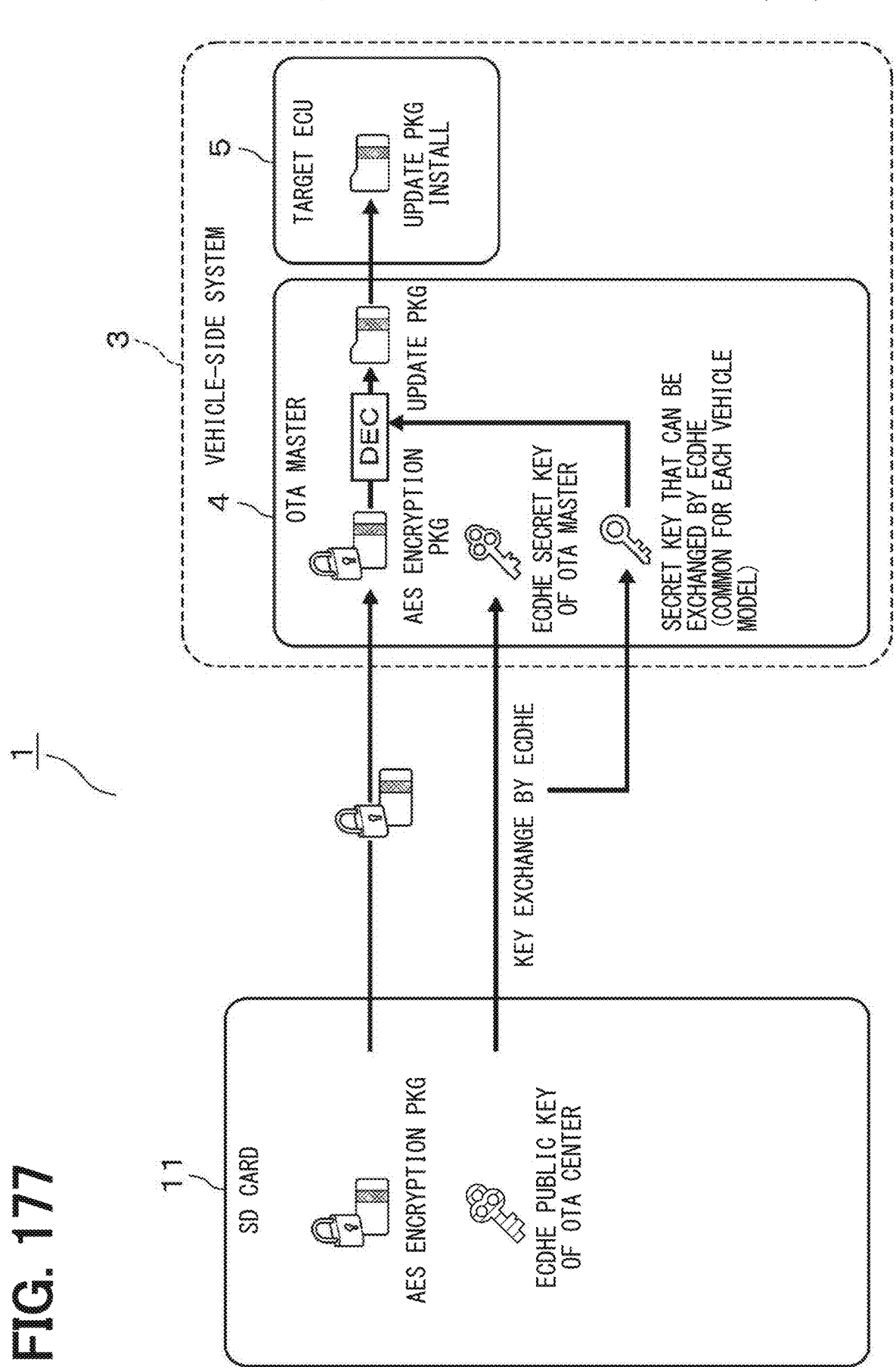
Figure 179:
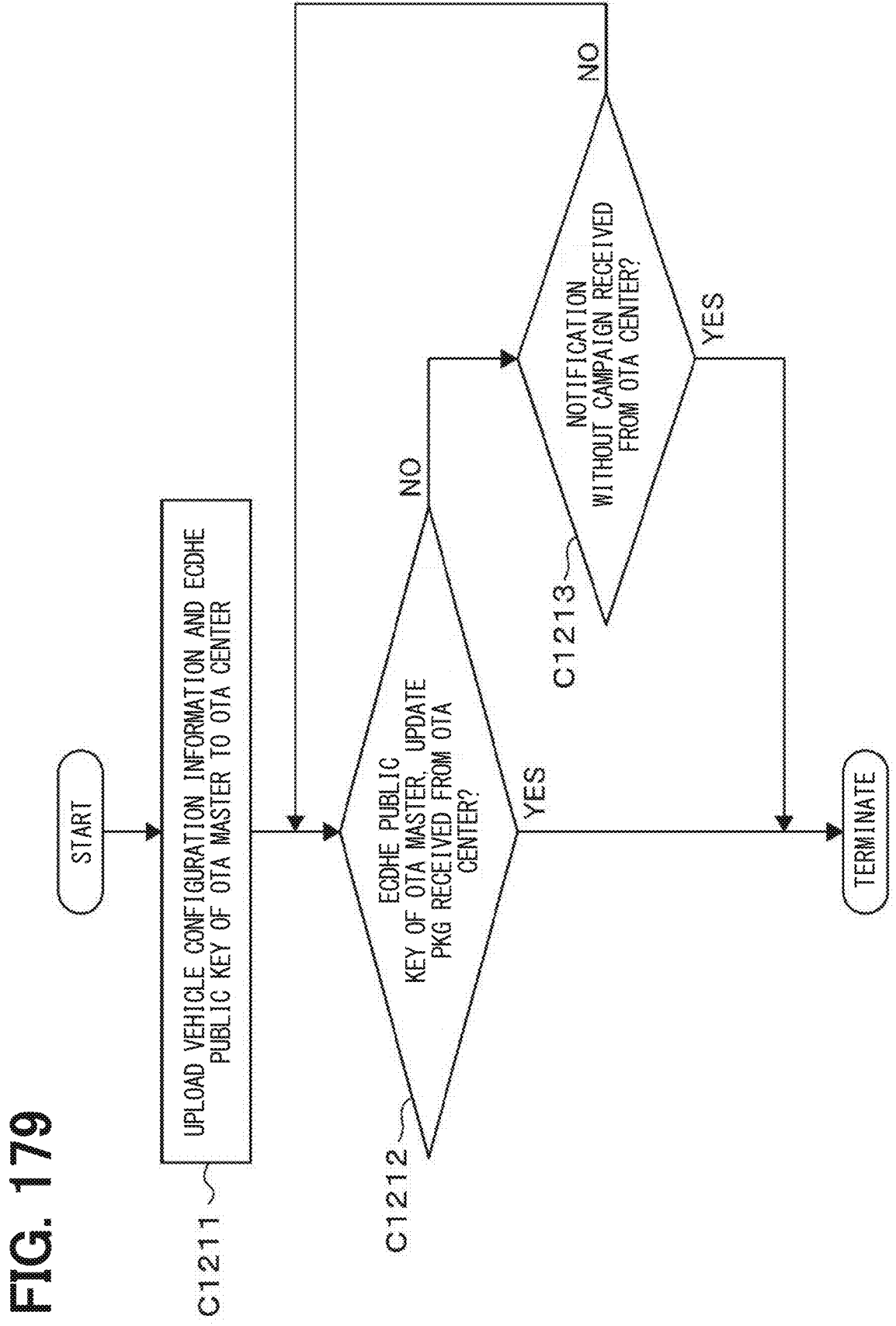
Figure 181:
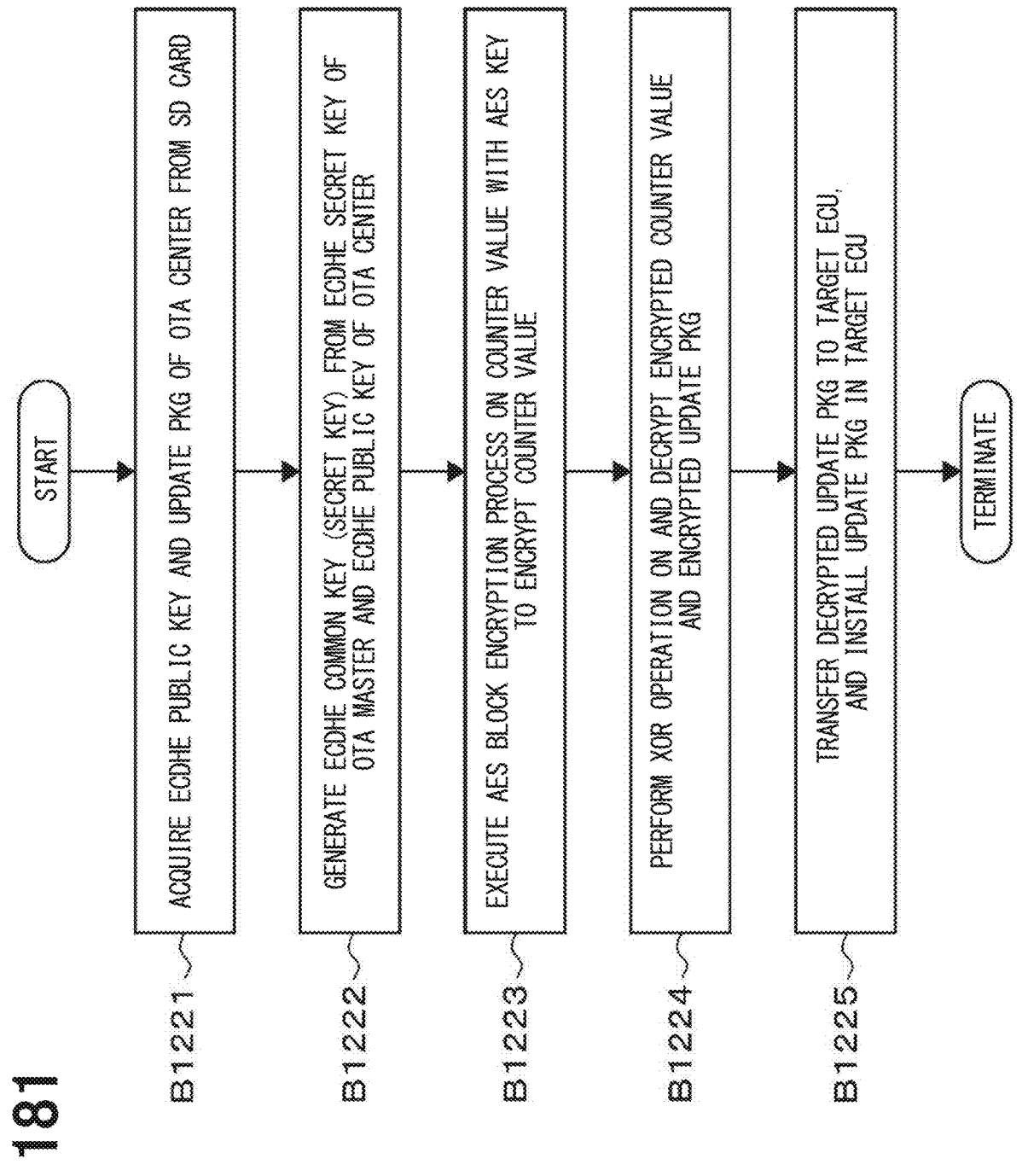
Figure 182:
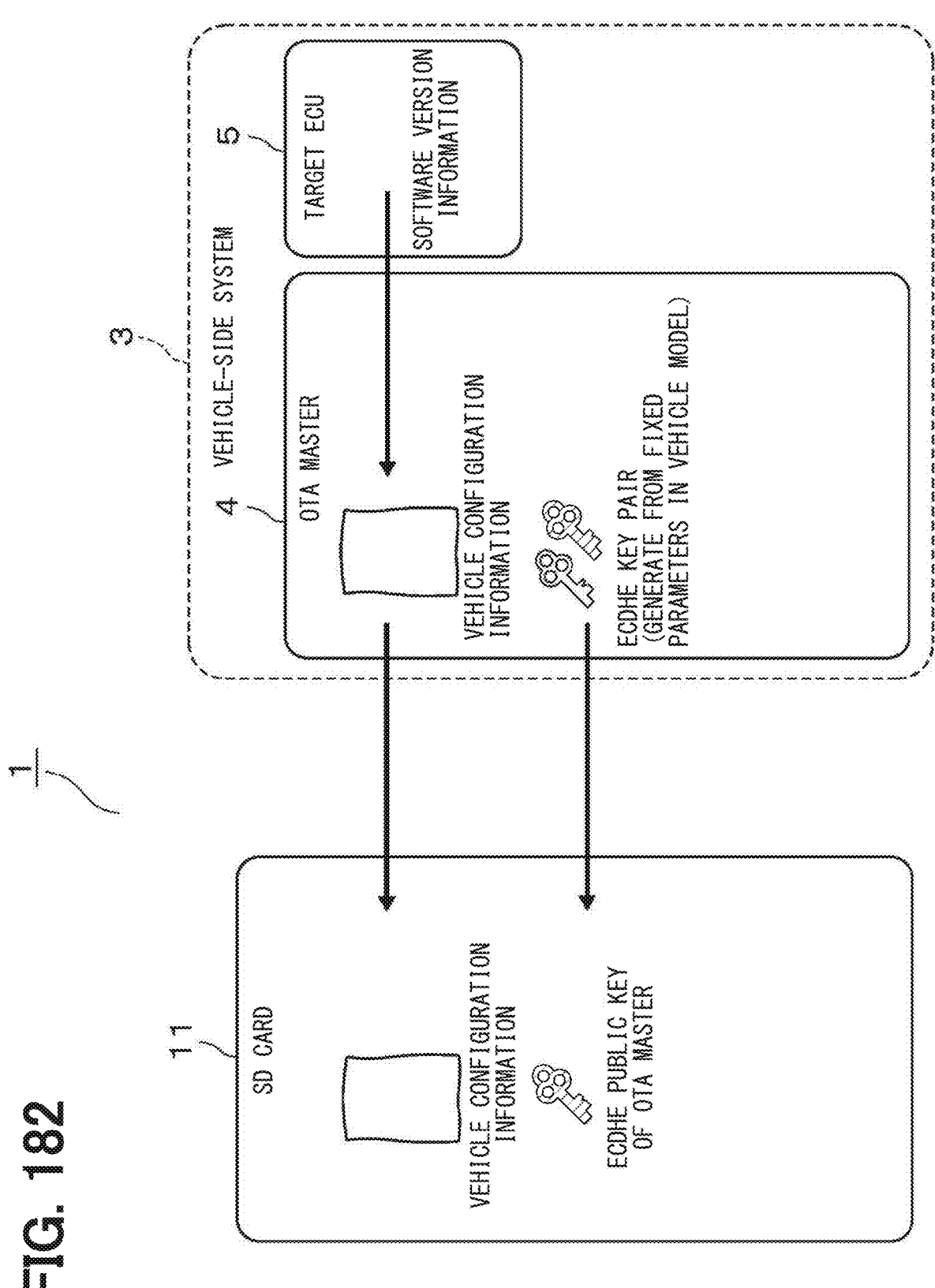
Figure 183:
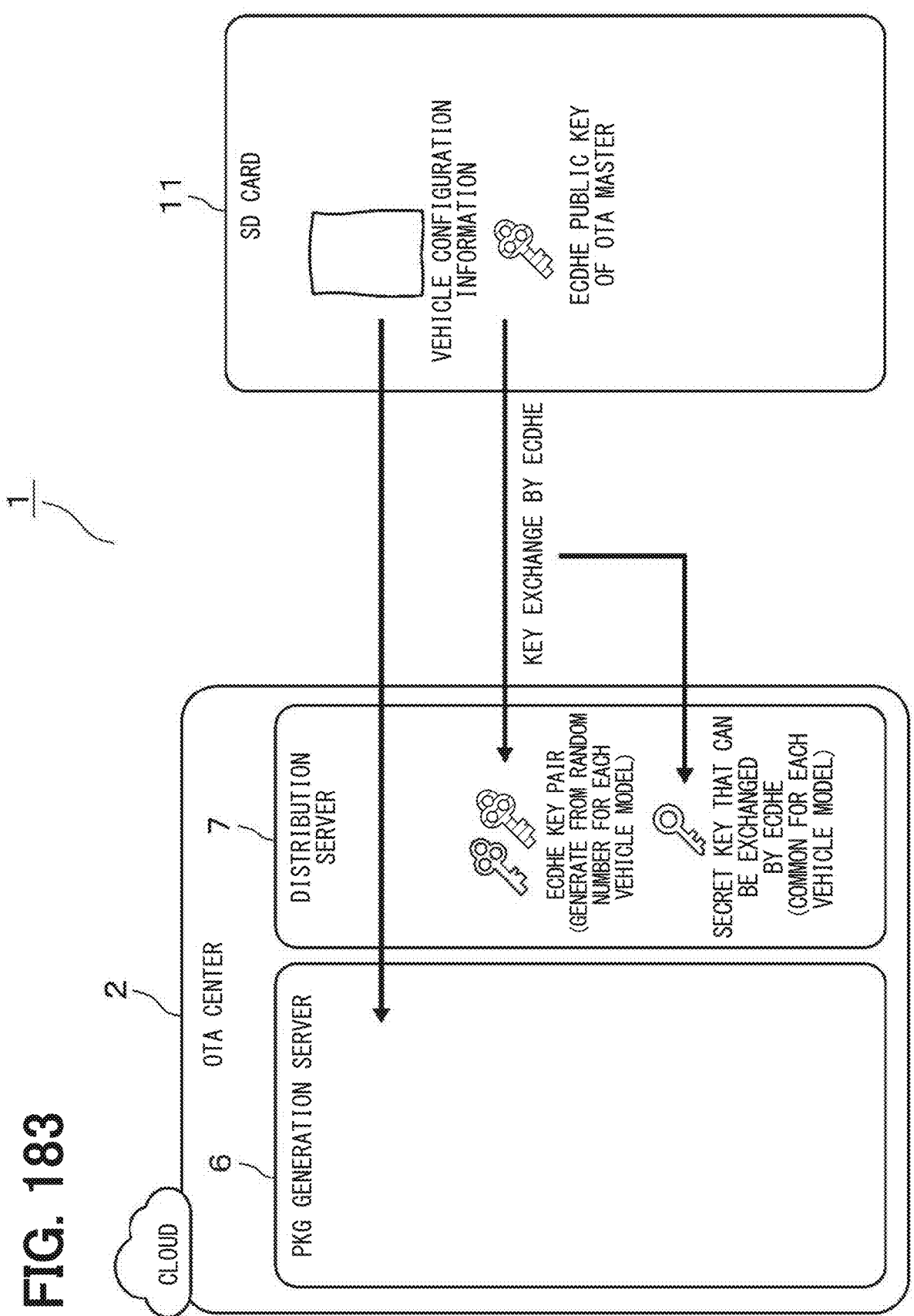
Figure 184:
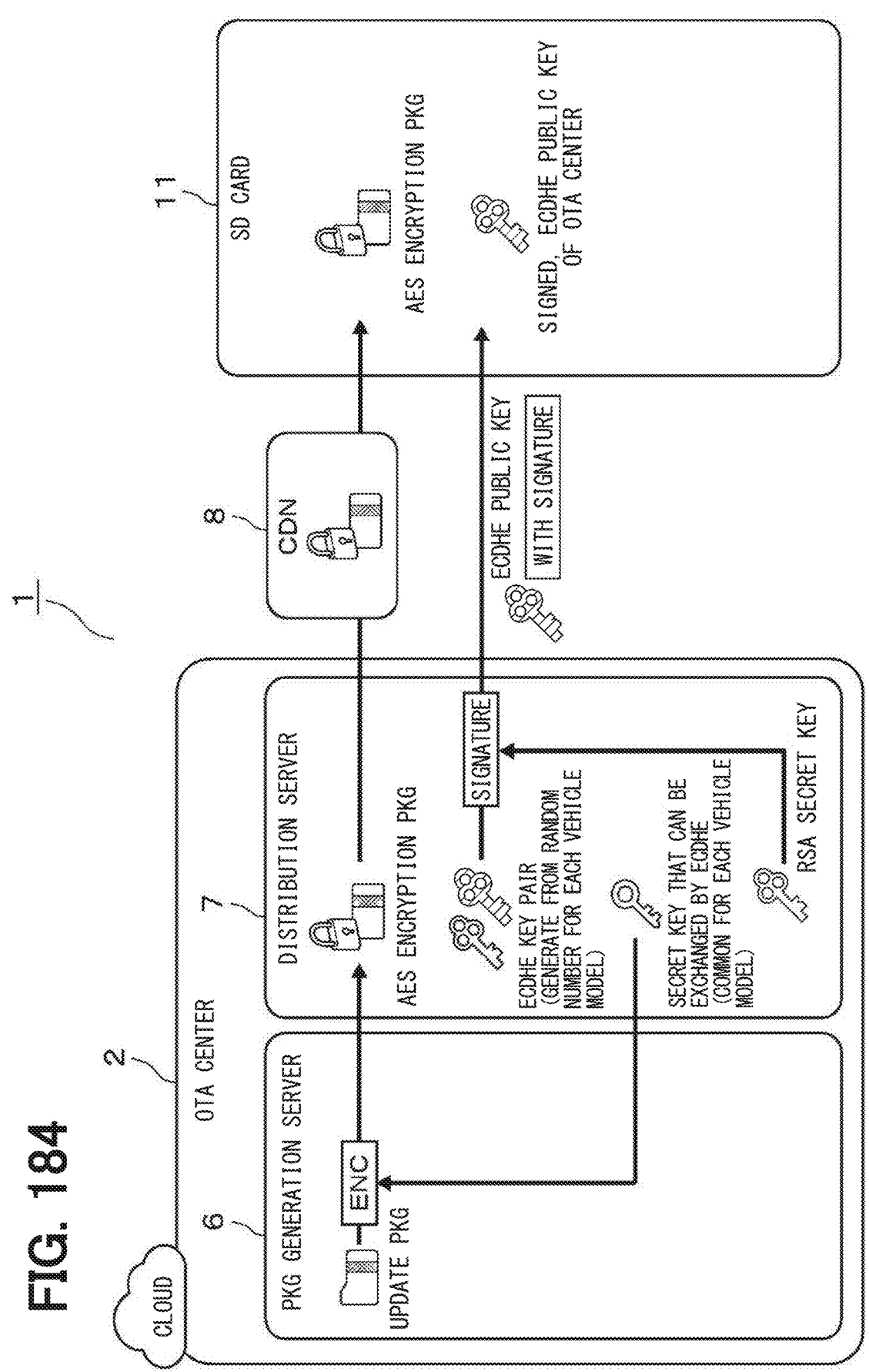
Figure 185:
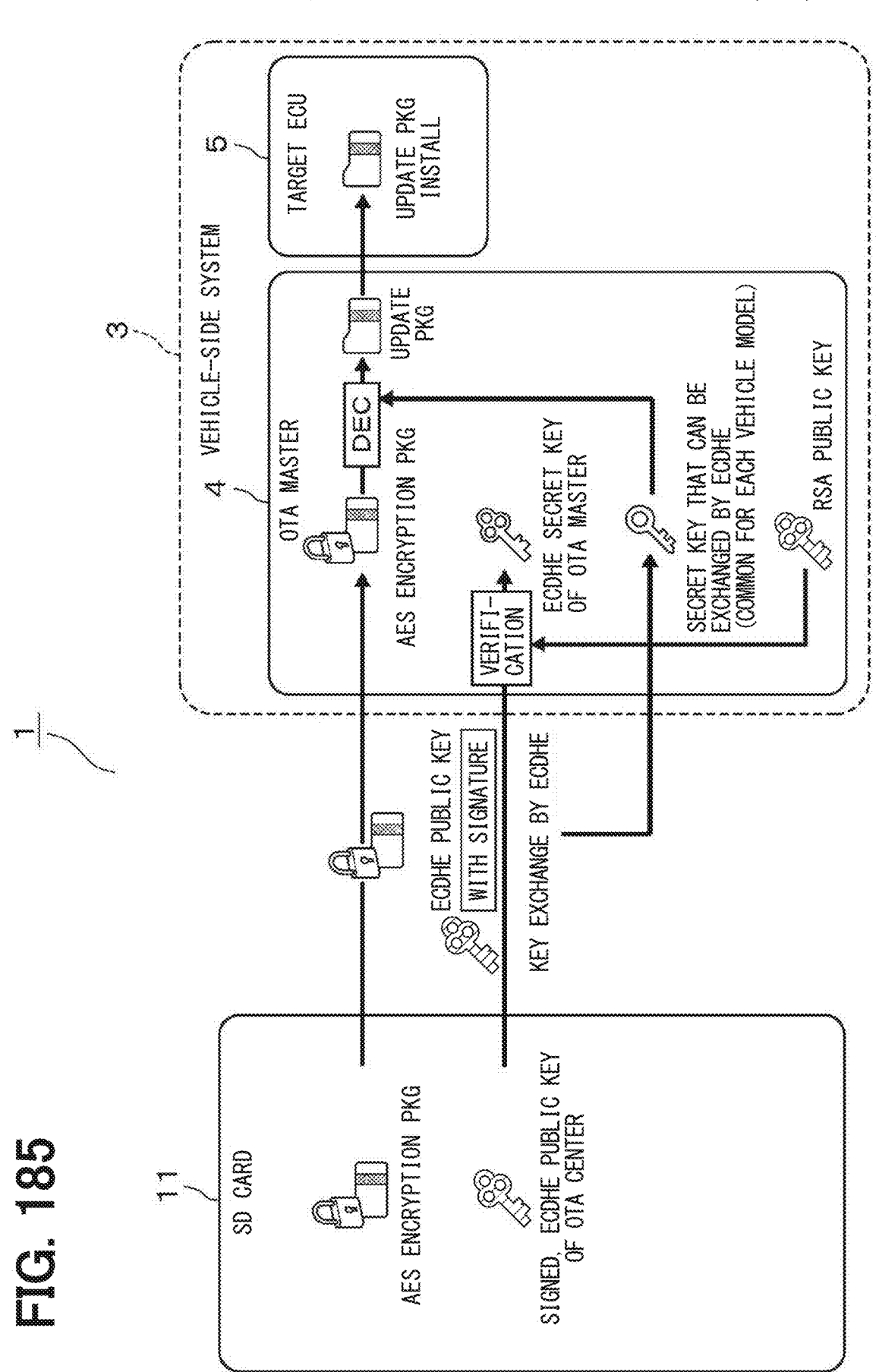
Figure 187:
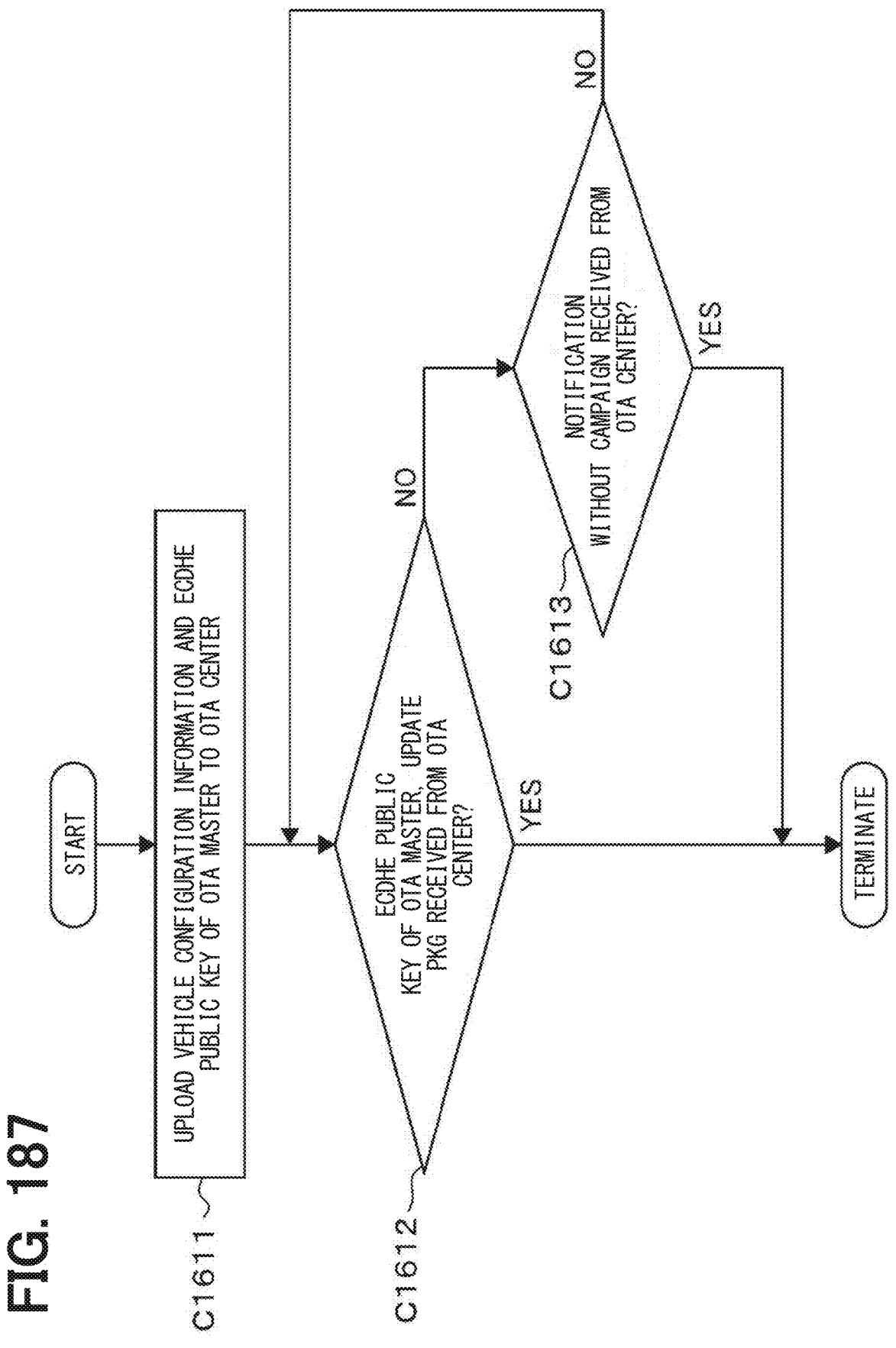
Figure 190:
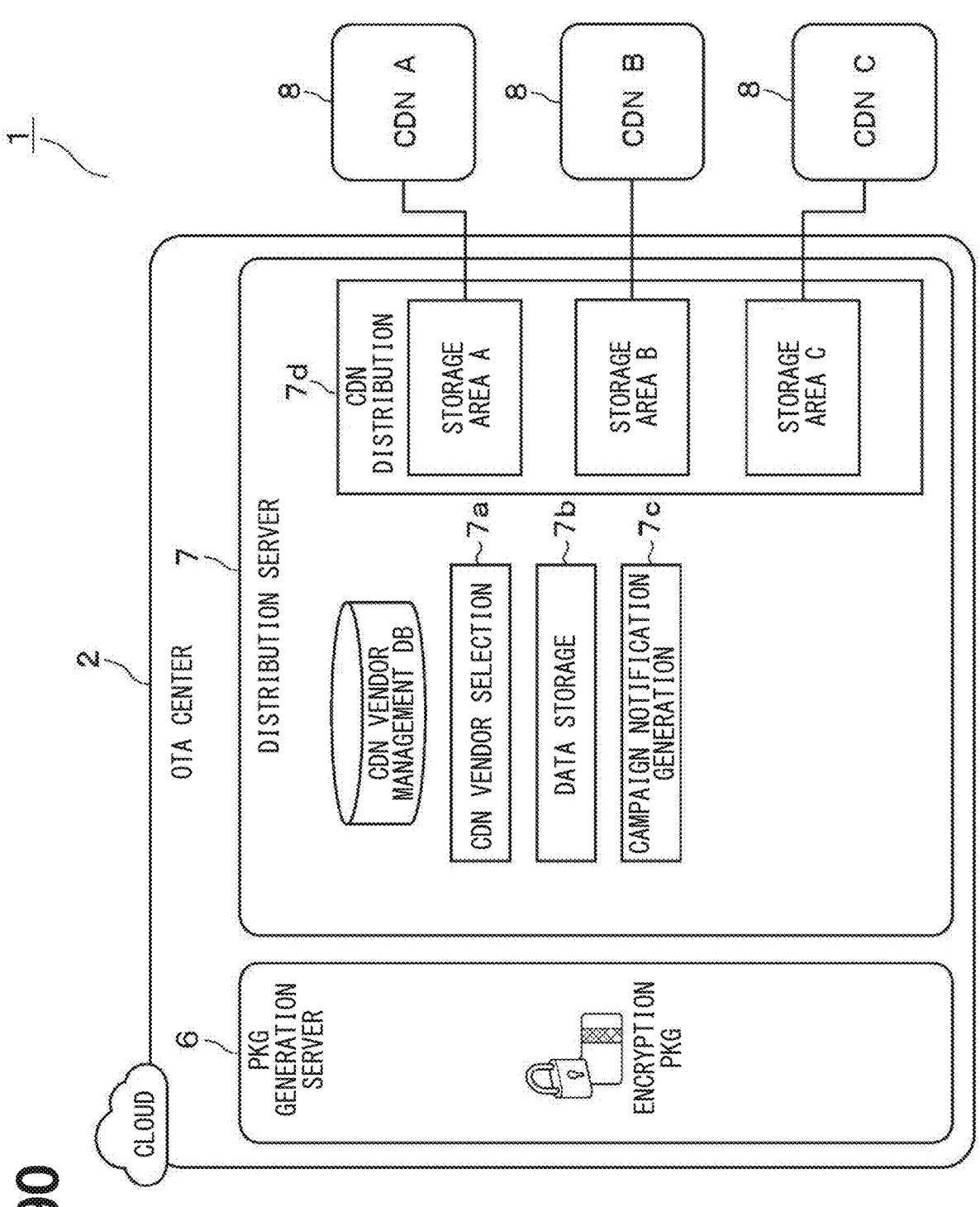
Figure 194:
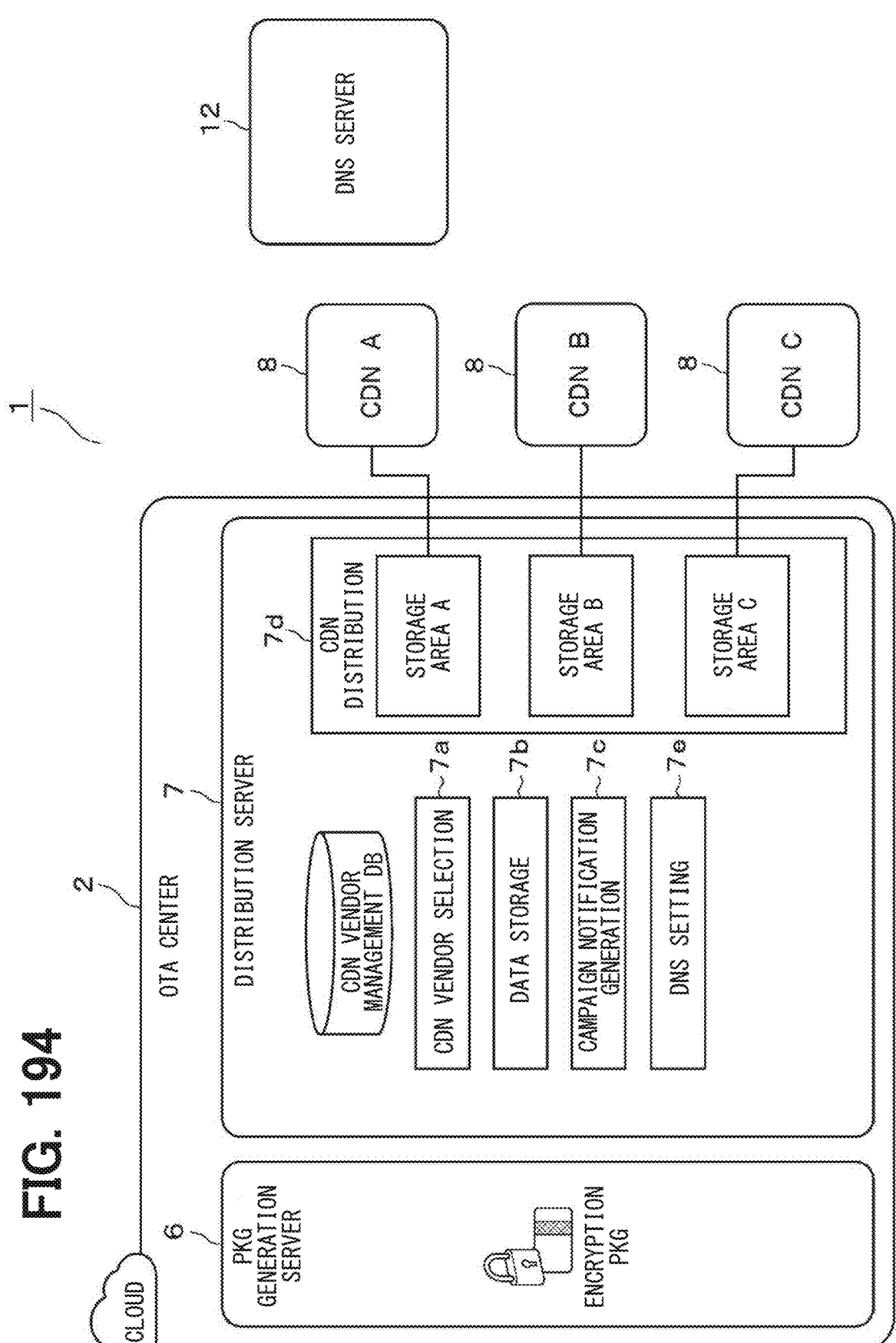
Figure 196:
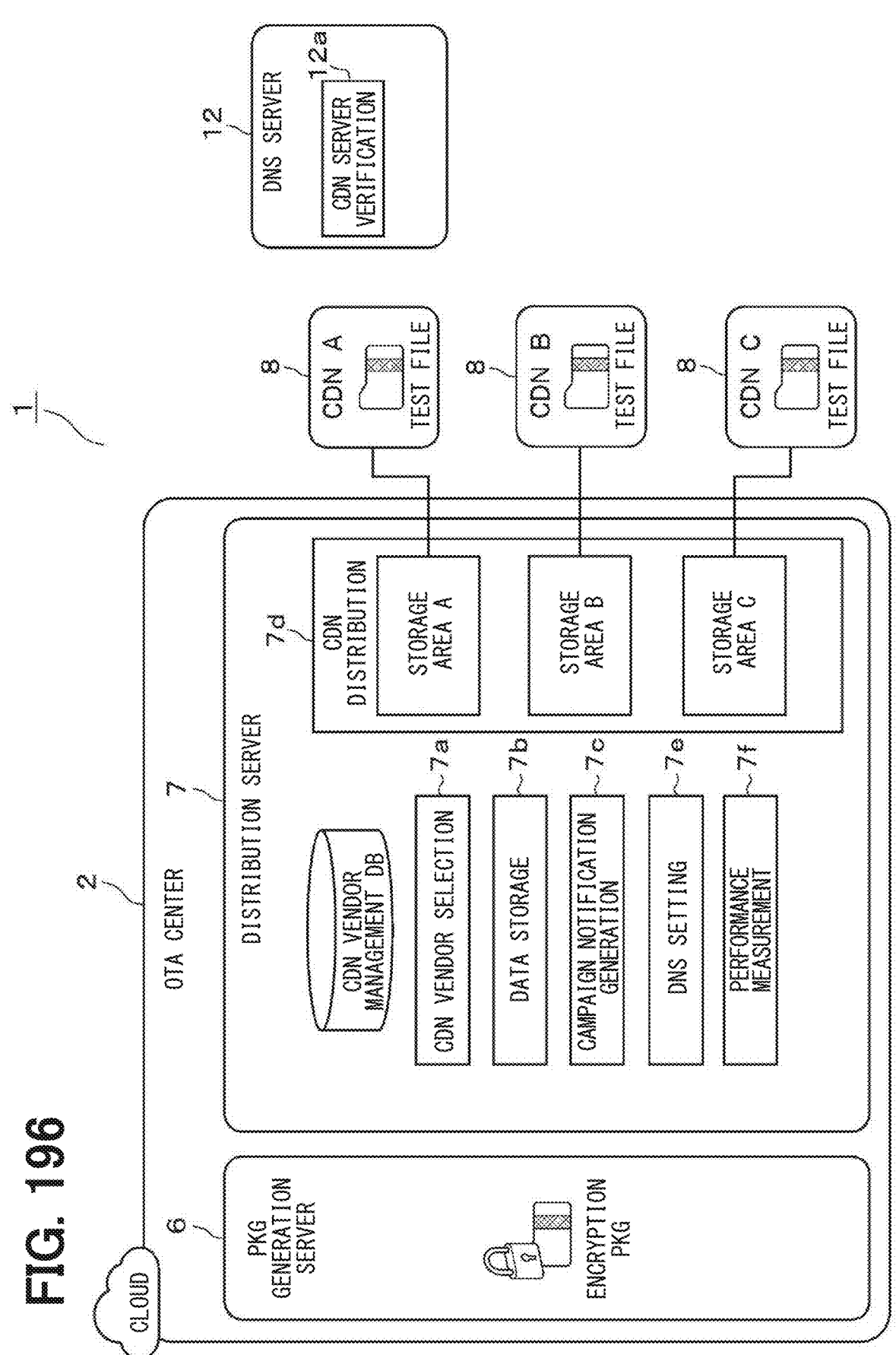
Figure 198:
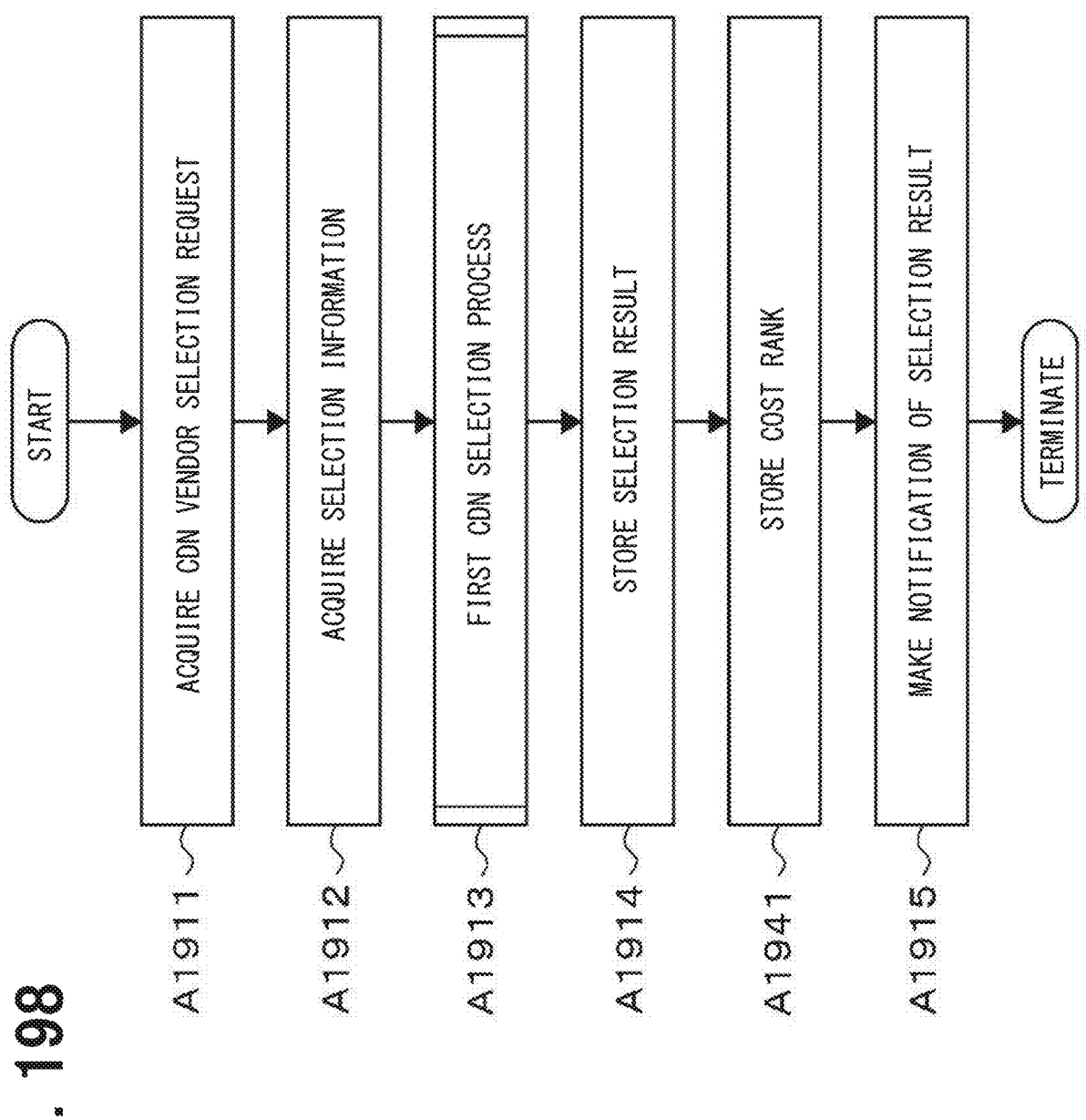
Figure 200:
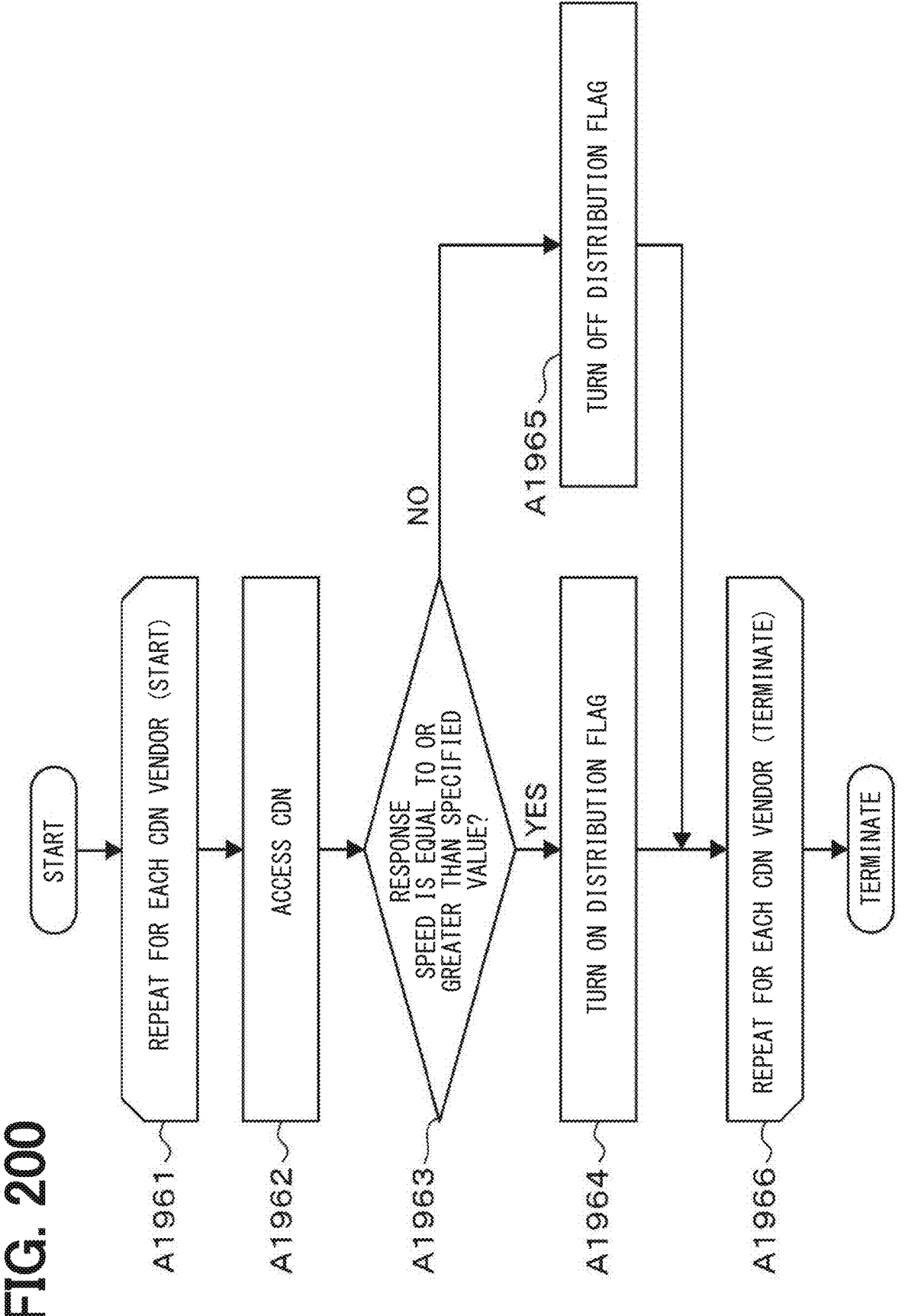
Figure 202:
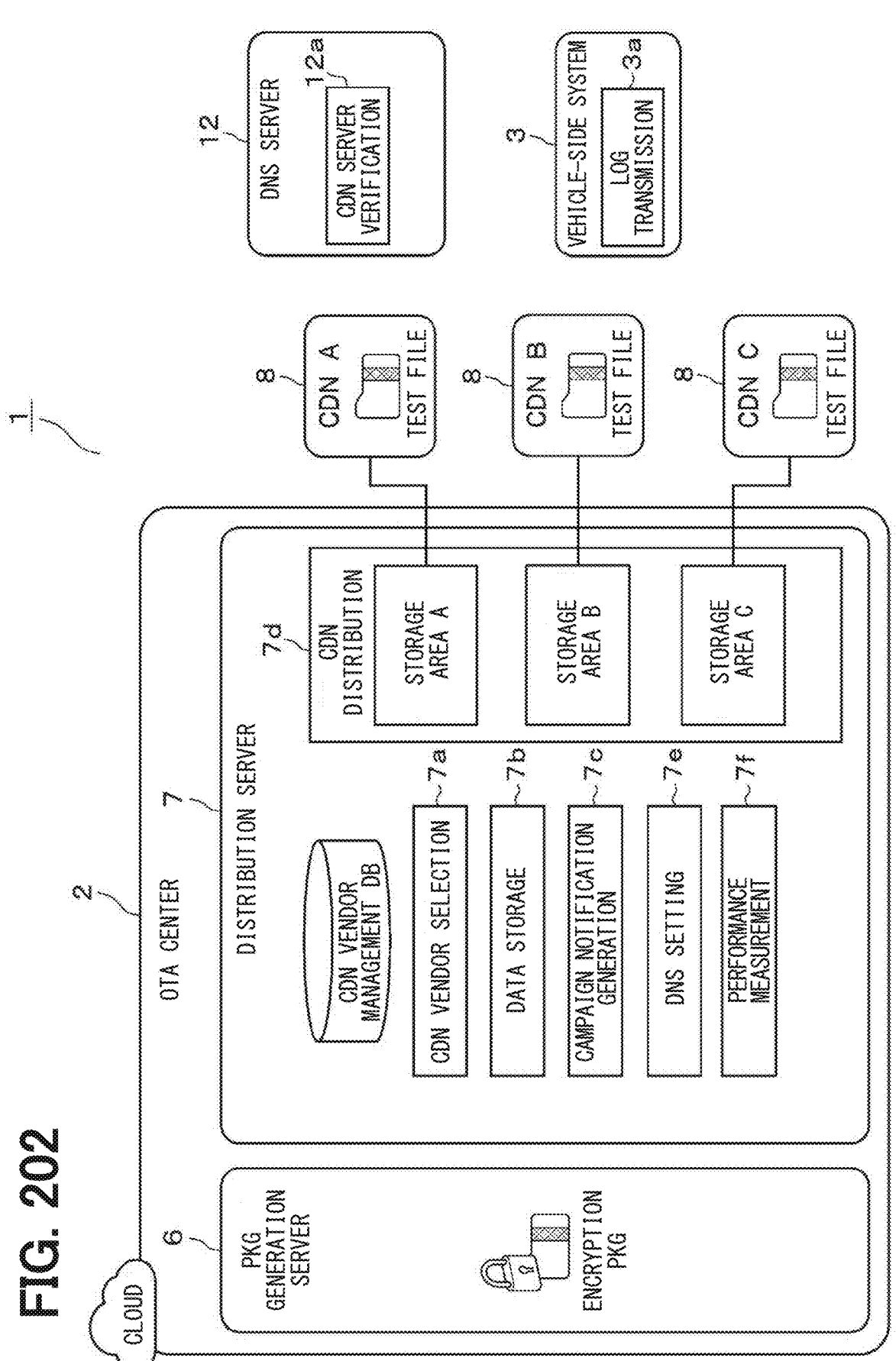
Figure 203:
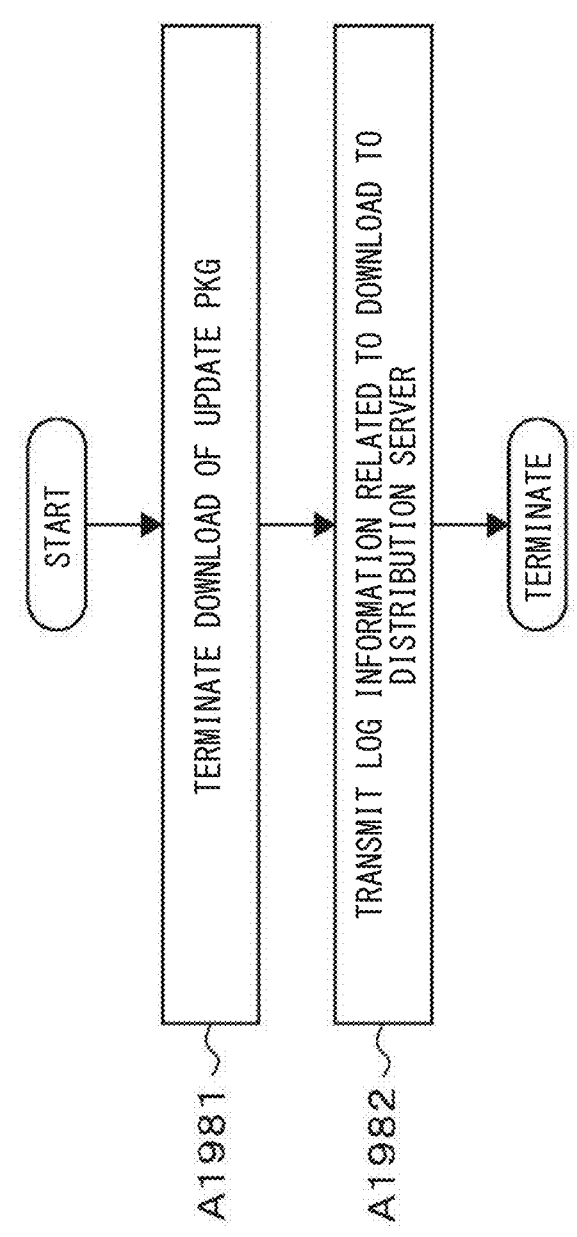
Figure 204:
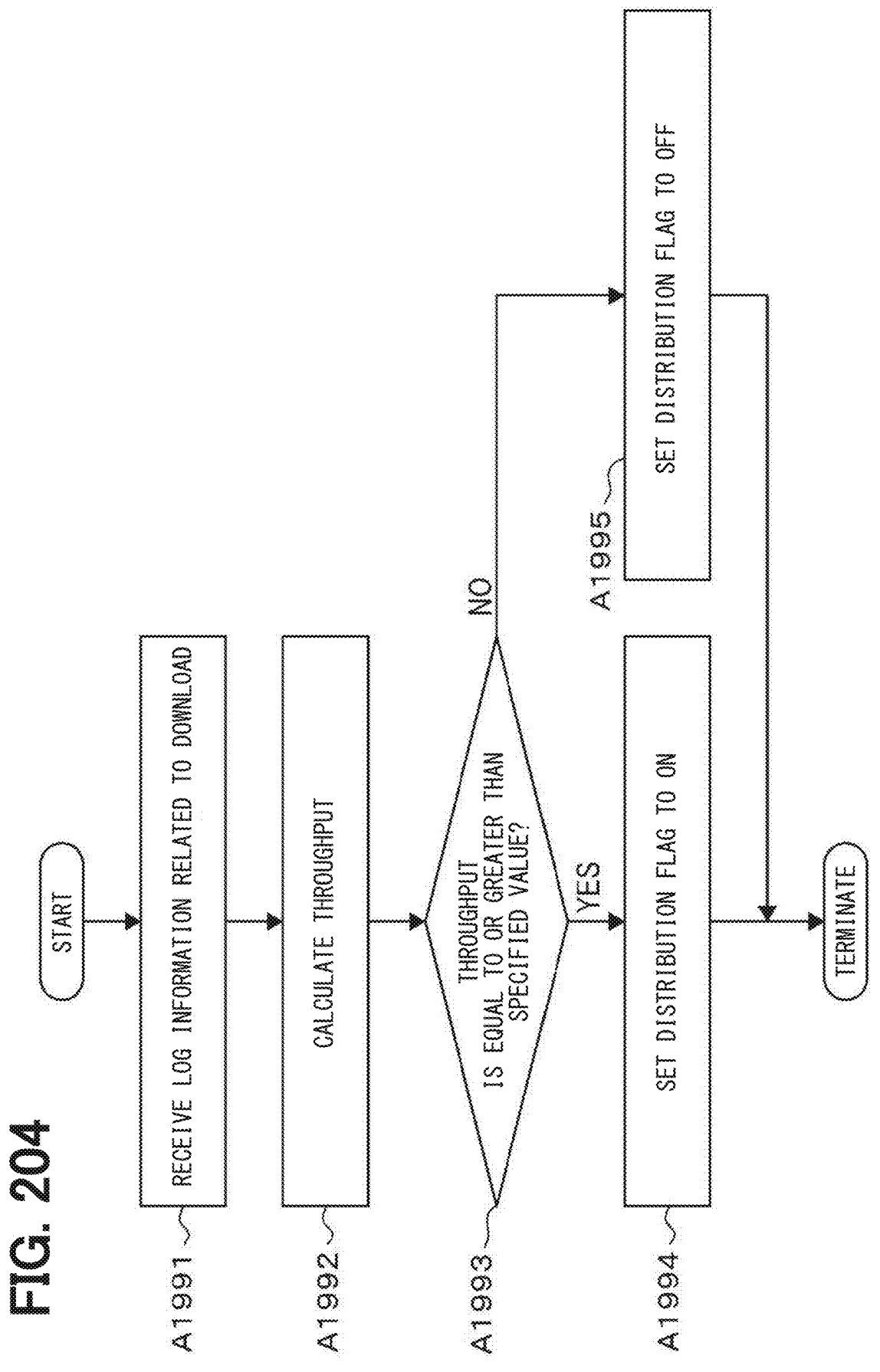
Figure 205:
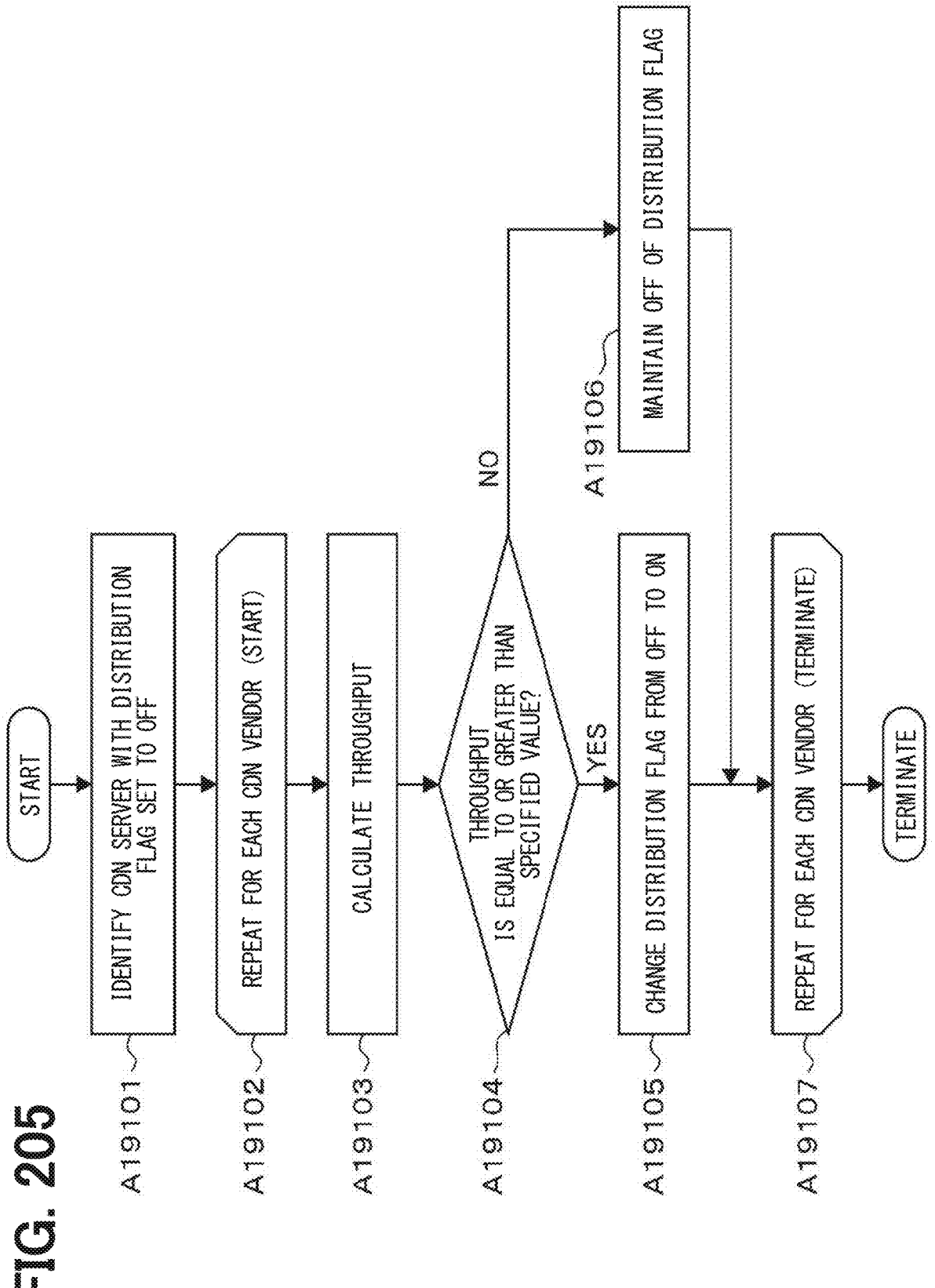
Figure 207:
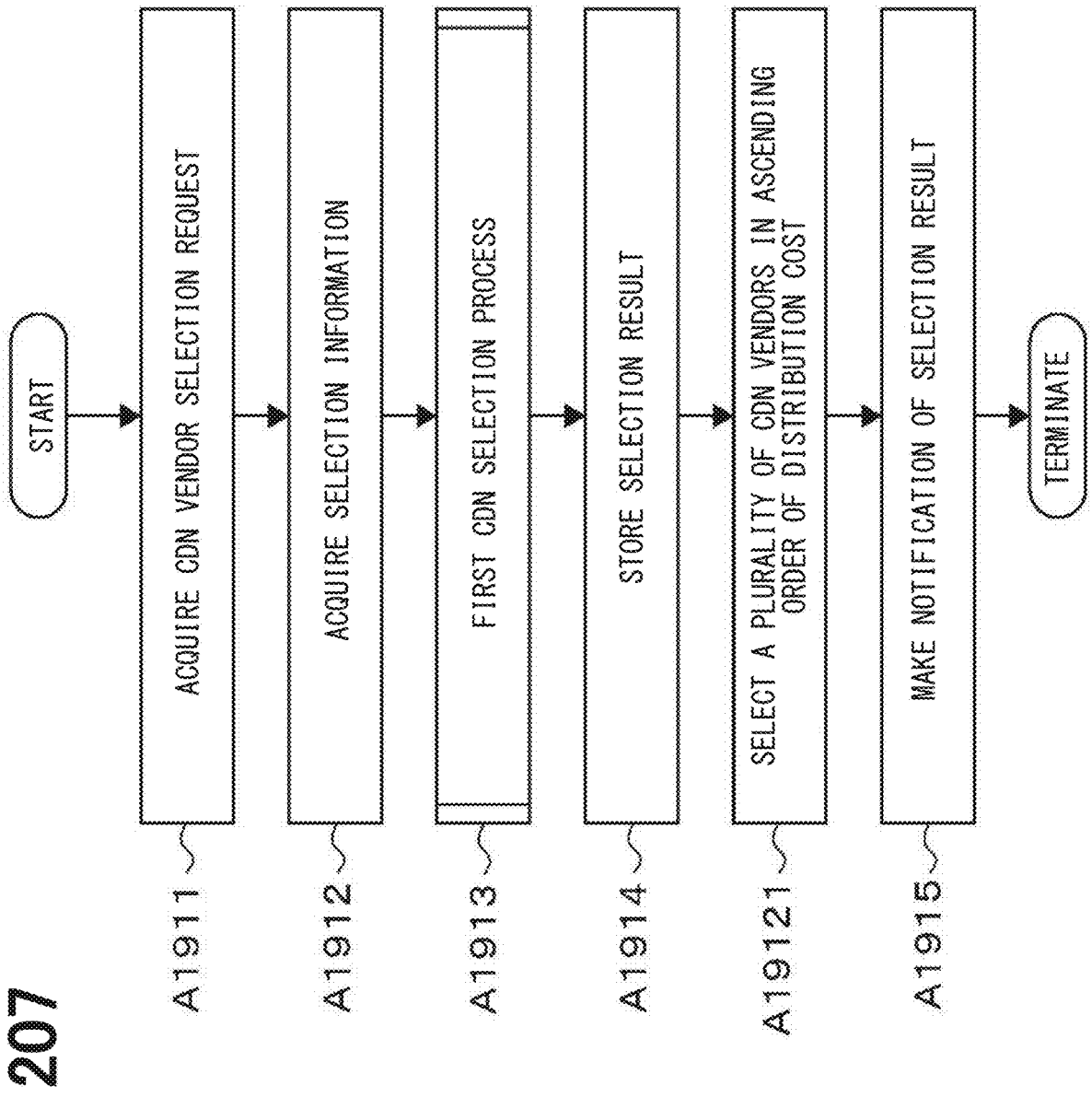
Figure 208:
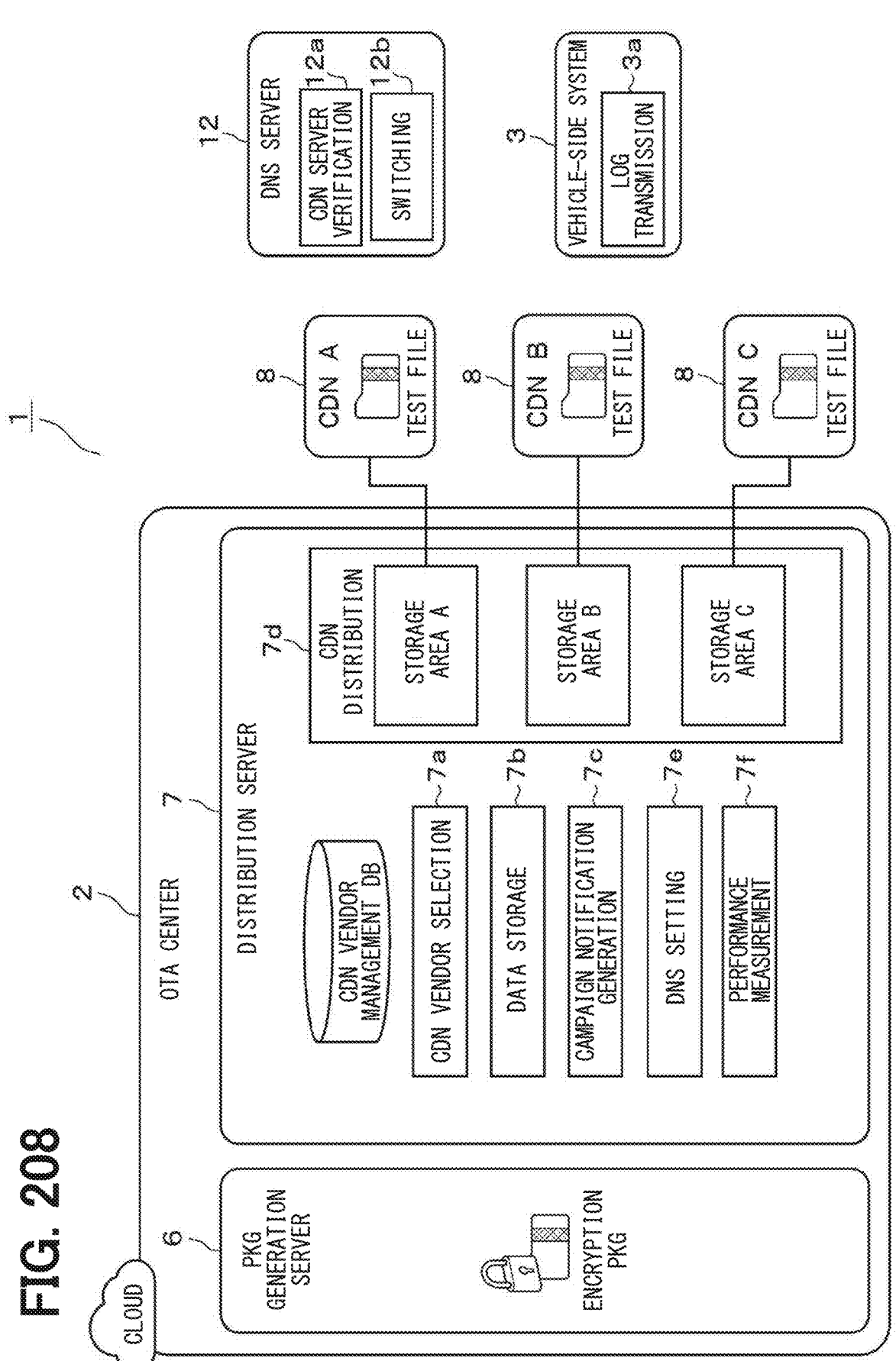
Figure 210:
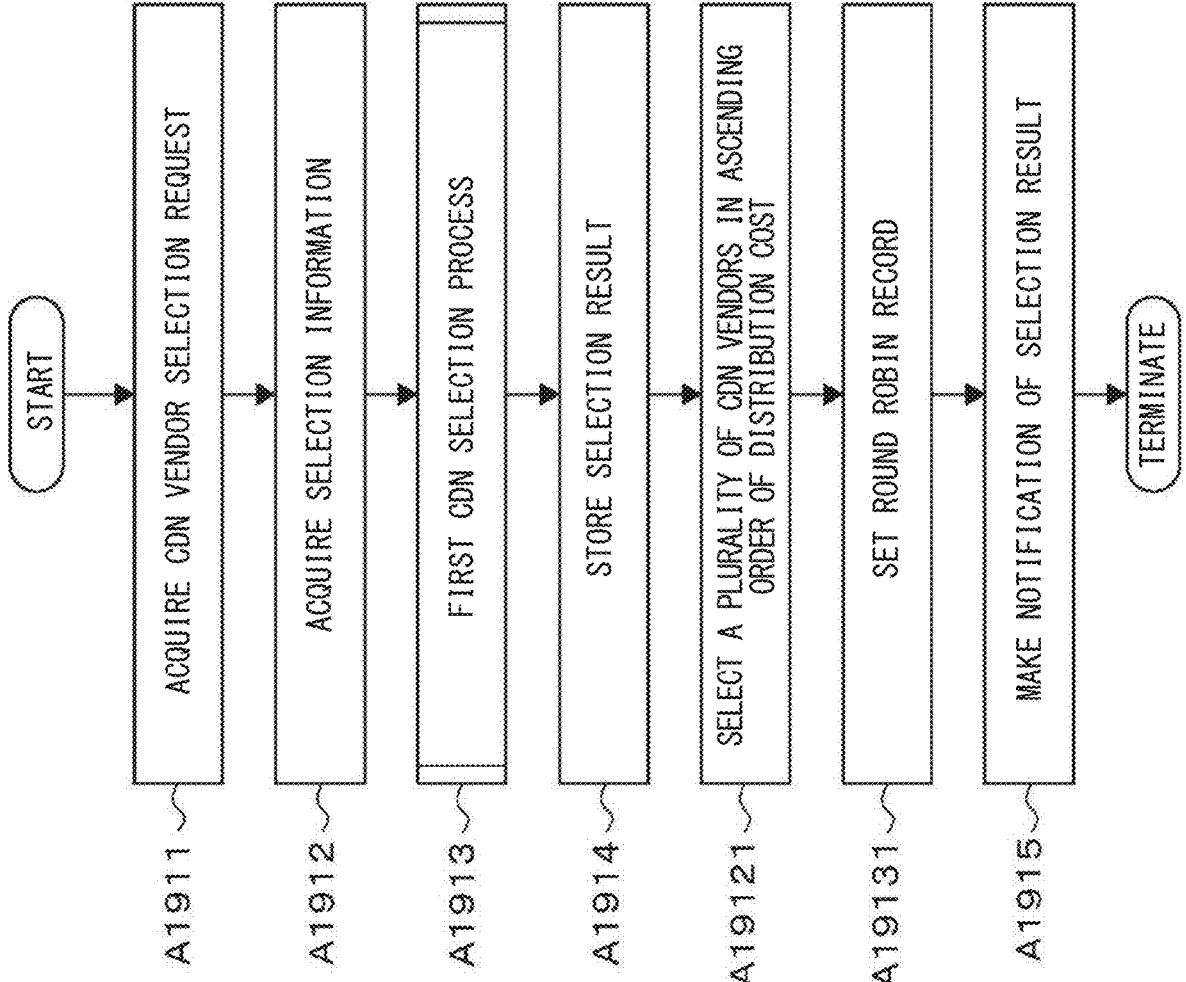
Figure 211:
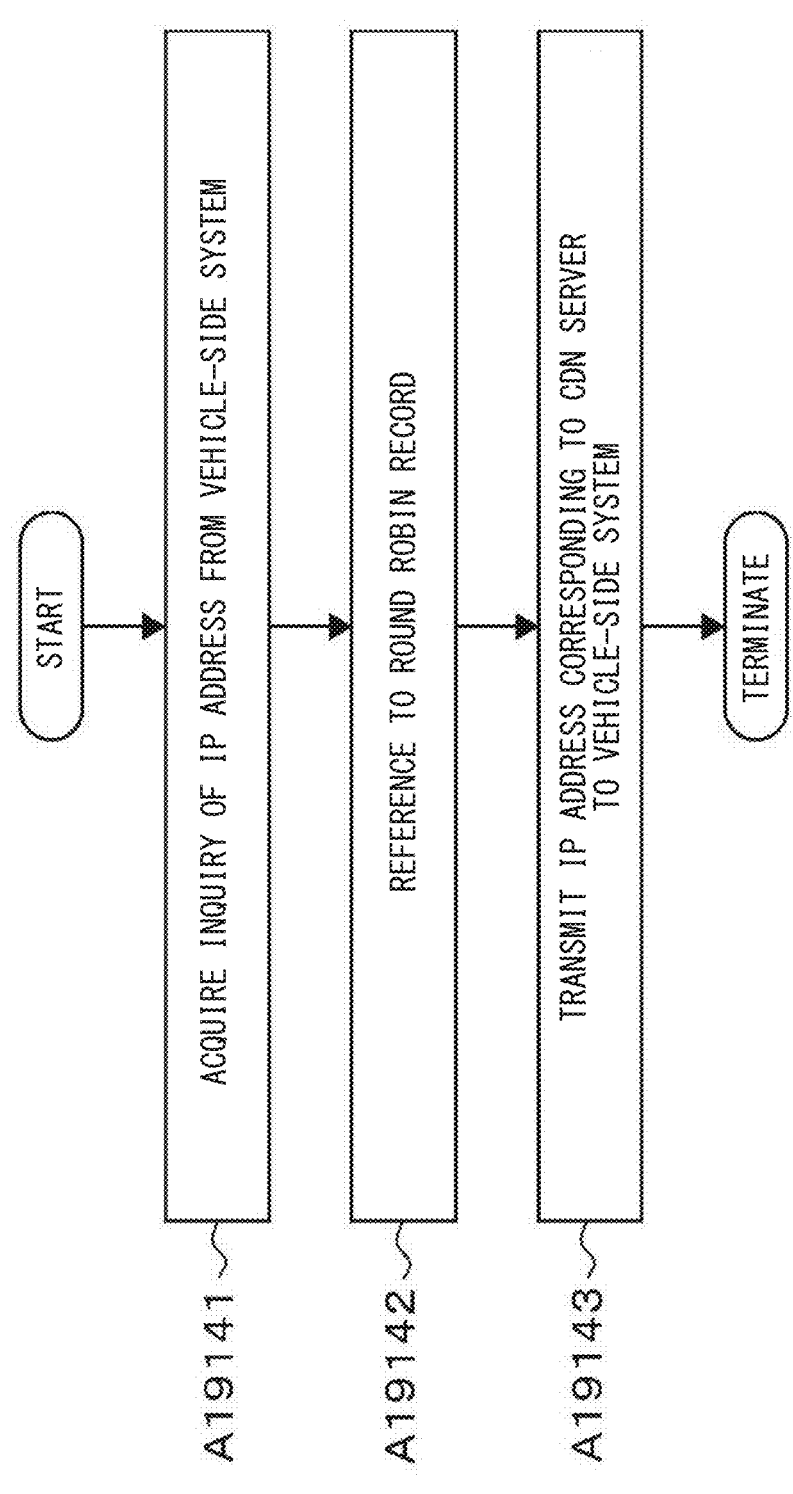
Figure 212:
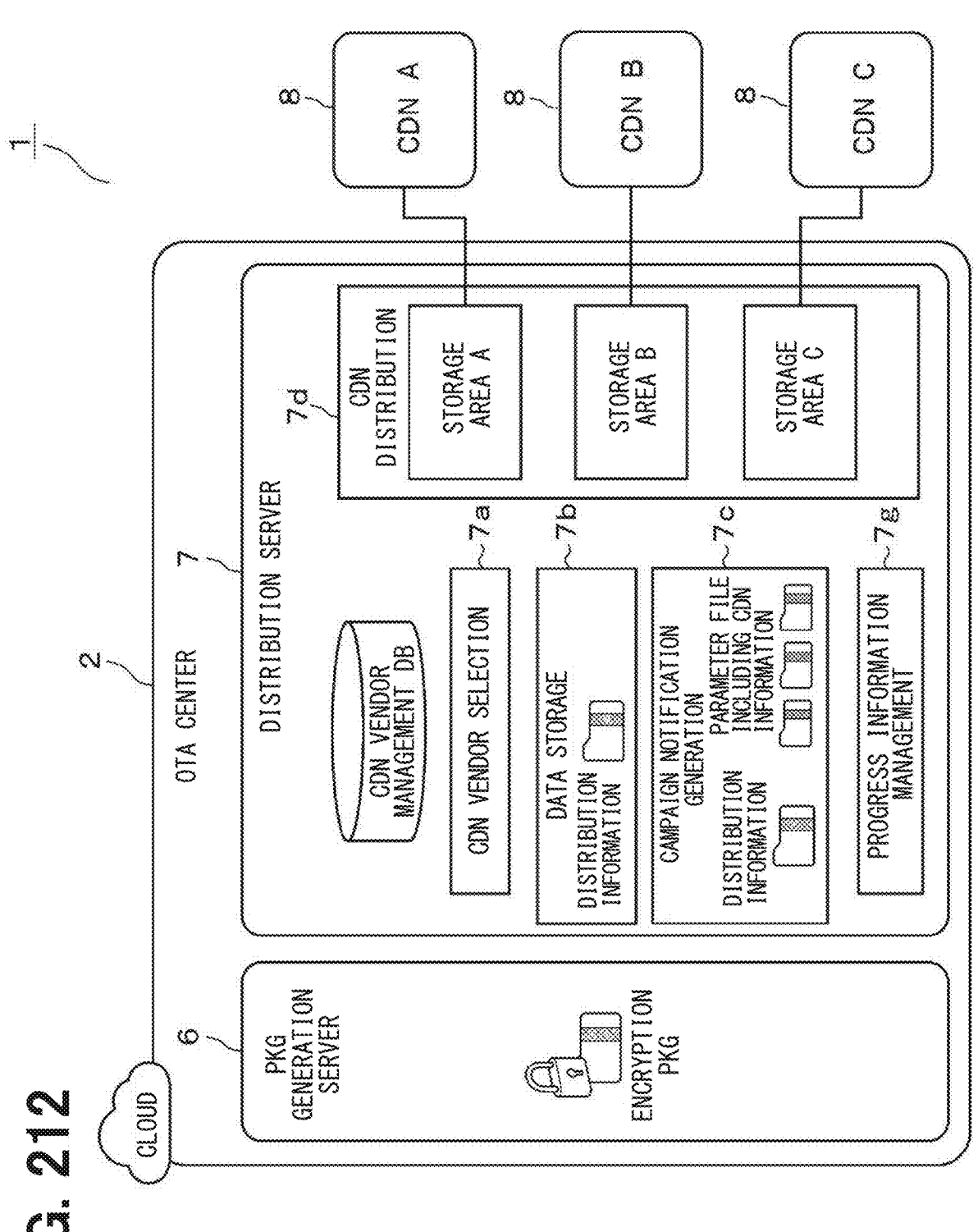
Figure 215:
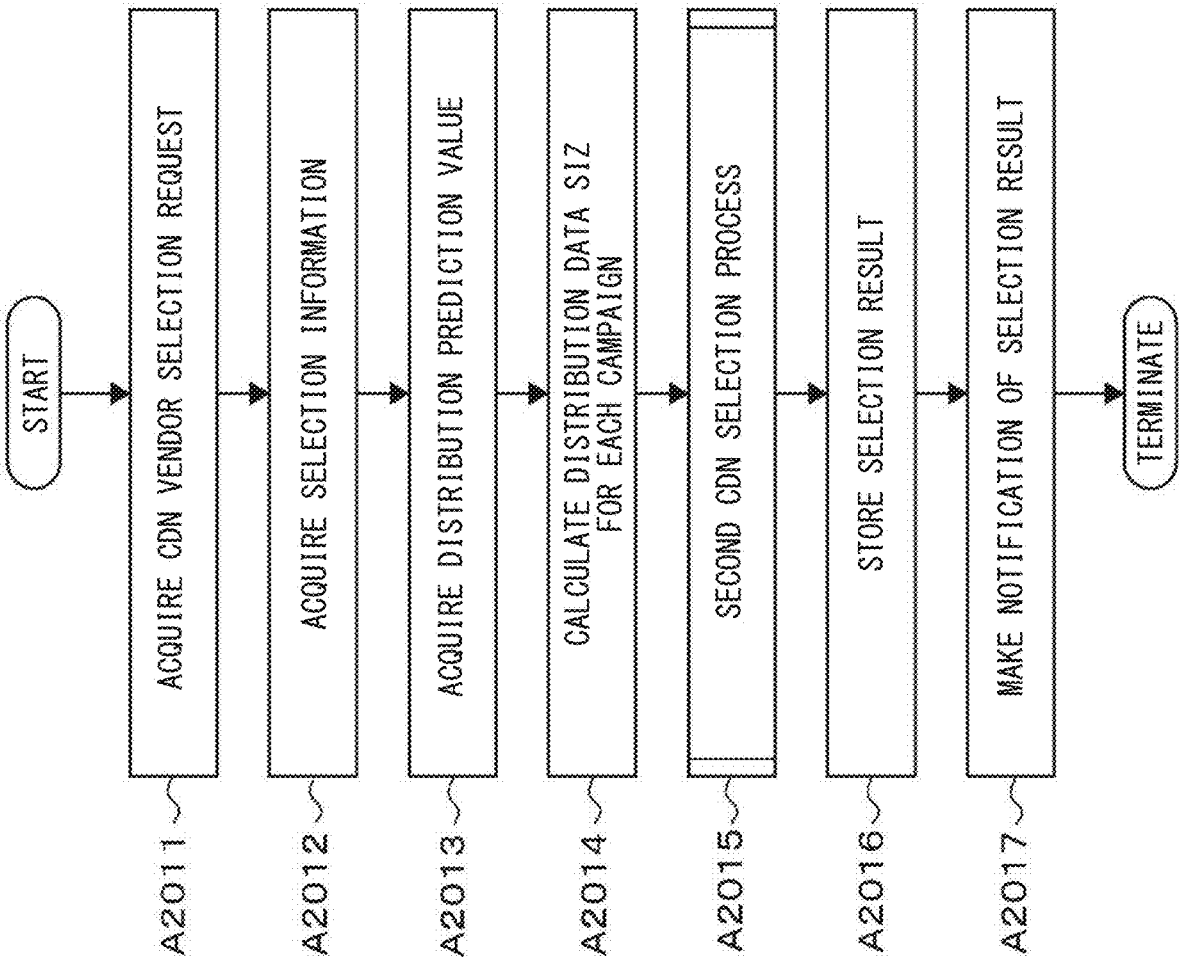
Figure 216:
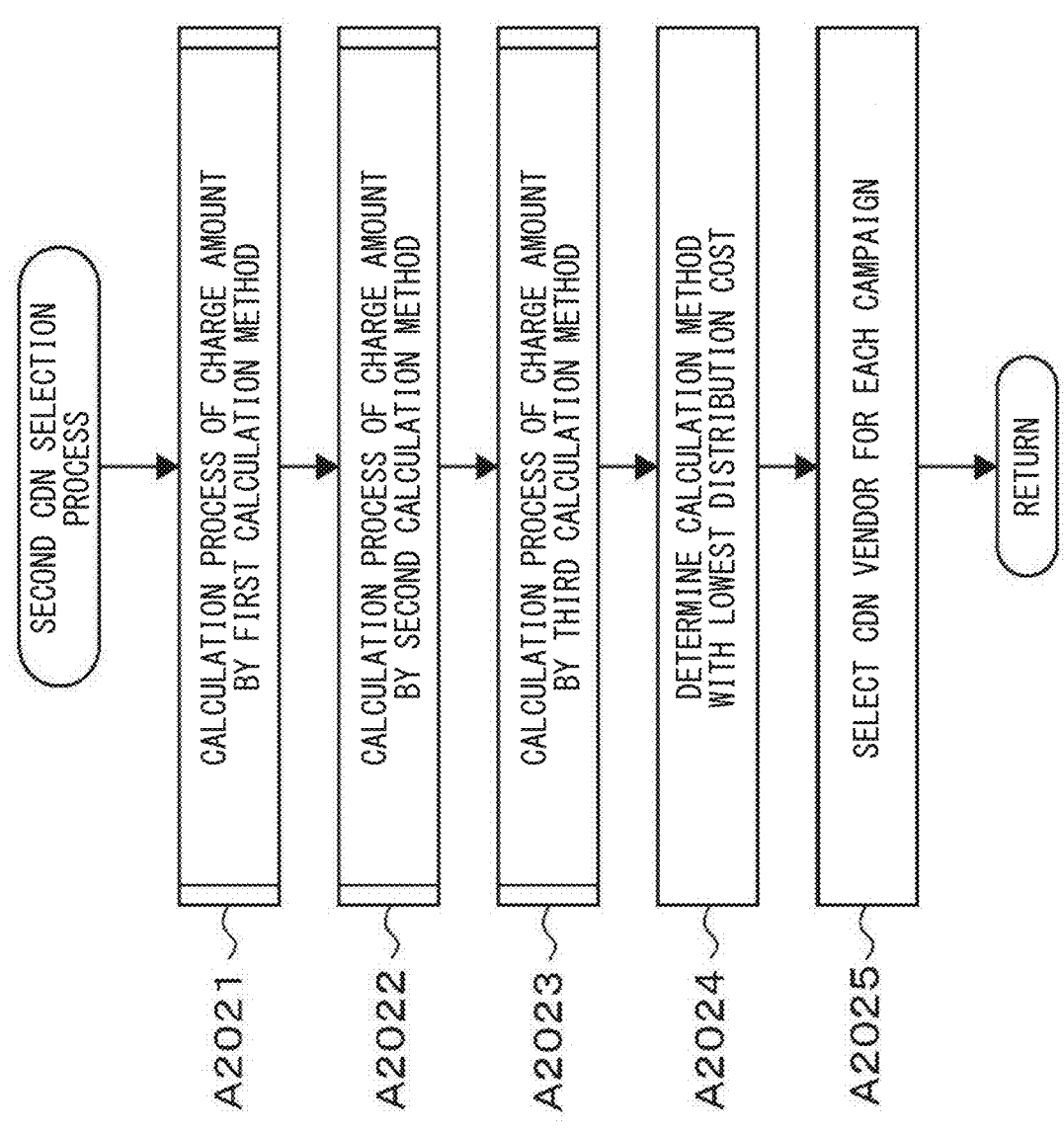
Figure 218:
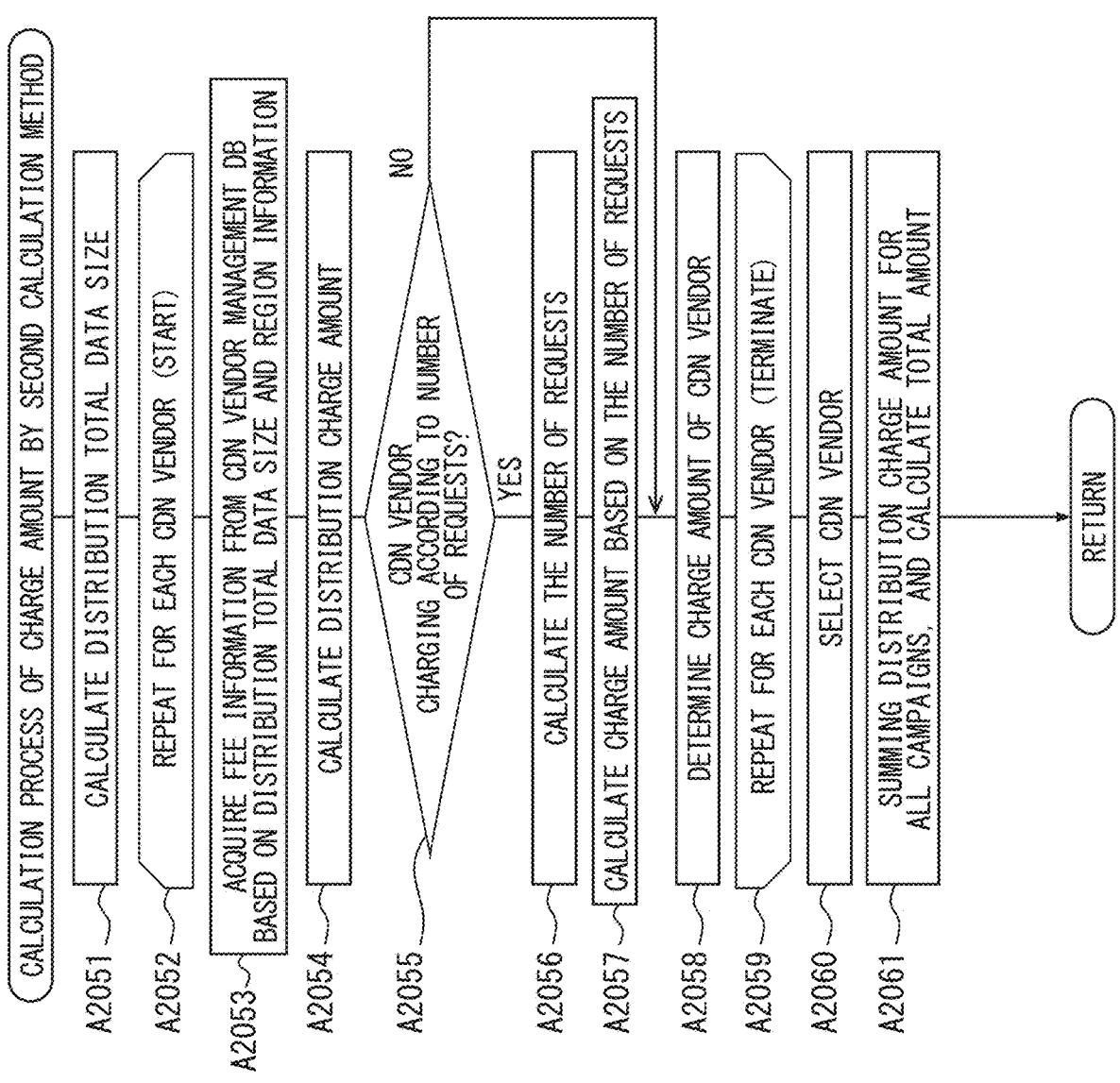
Figure 219:
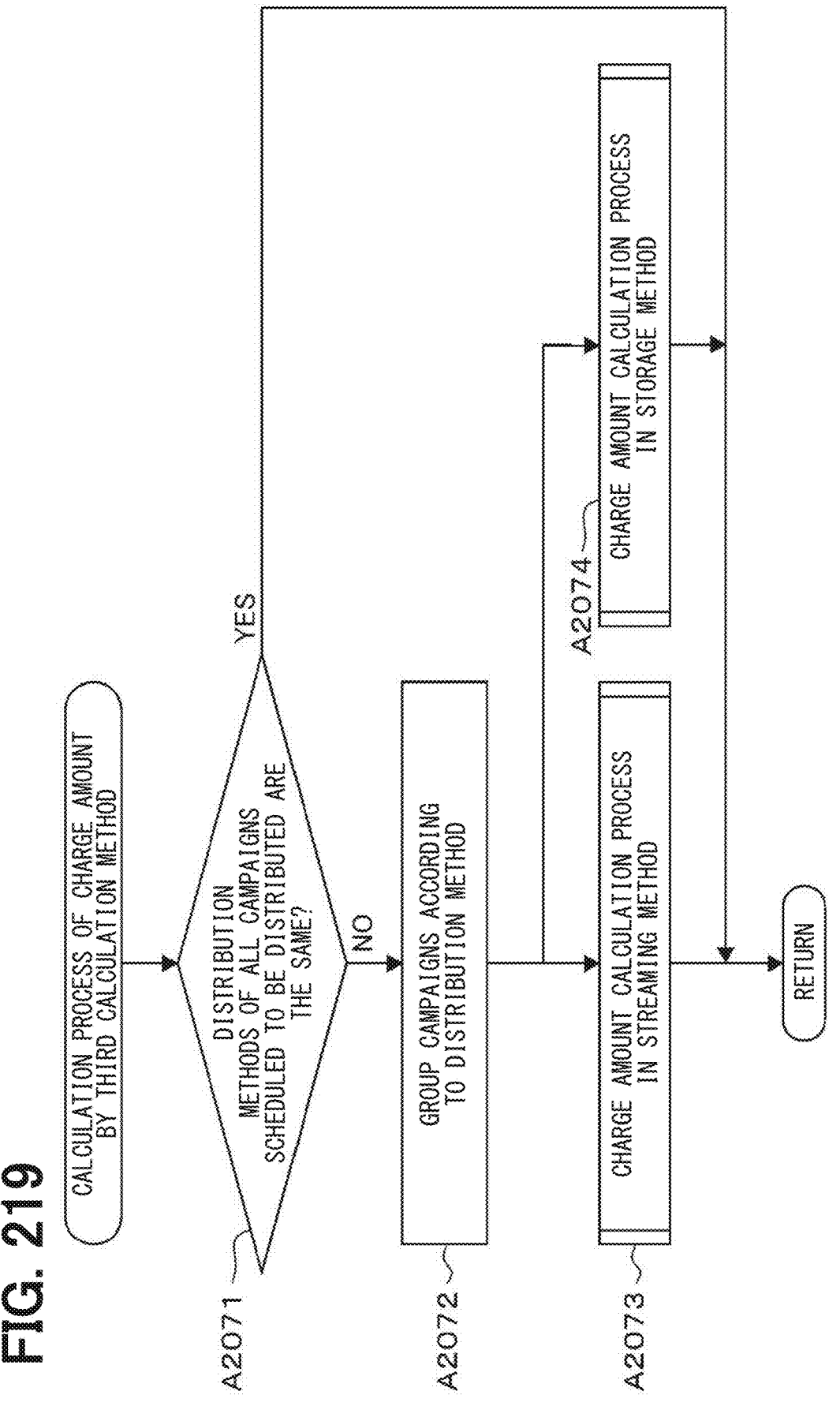
Figure 222:
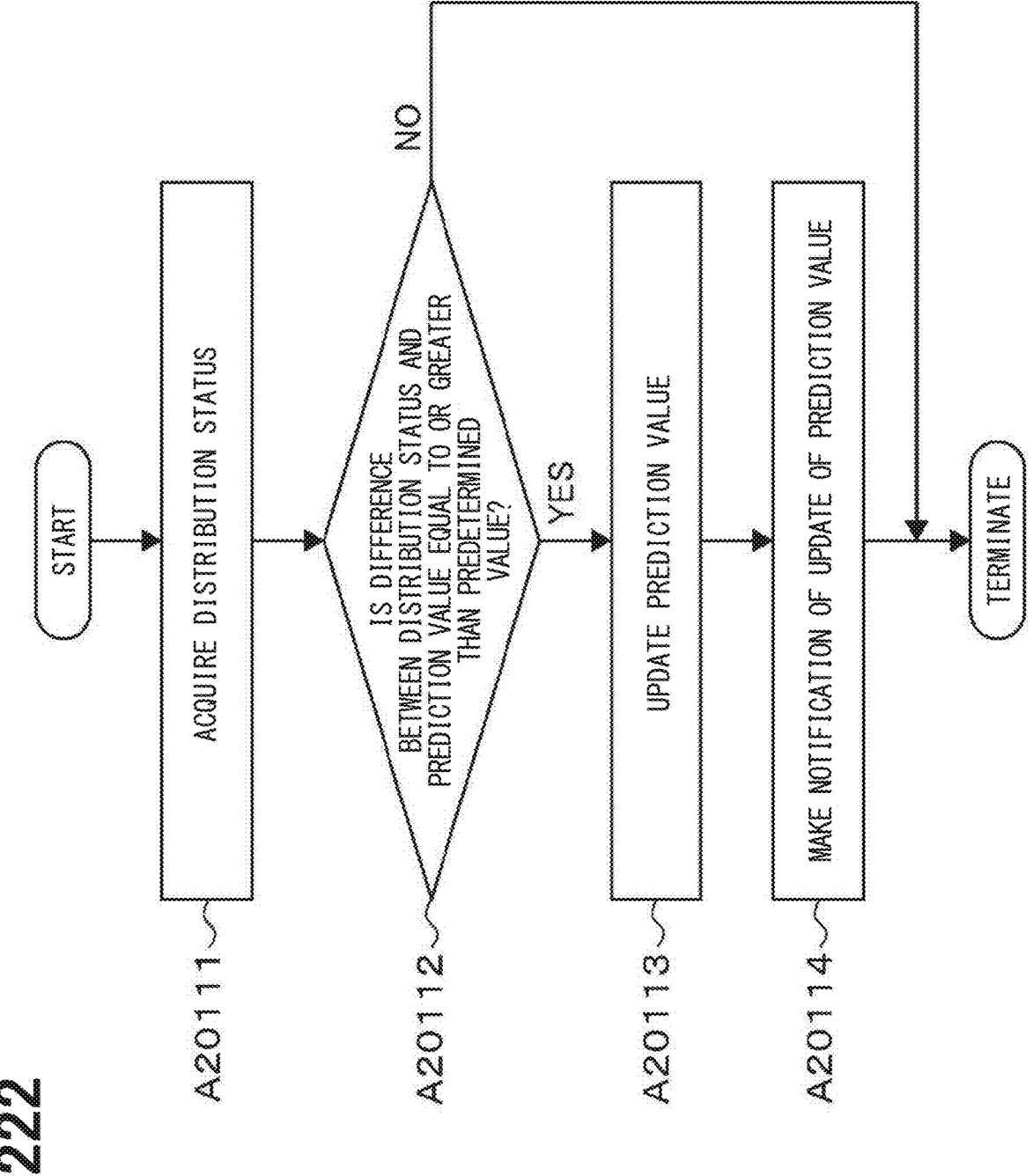
Figure 223:
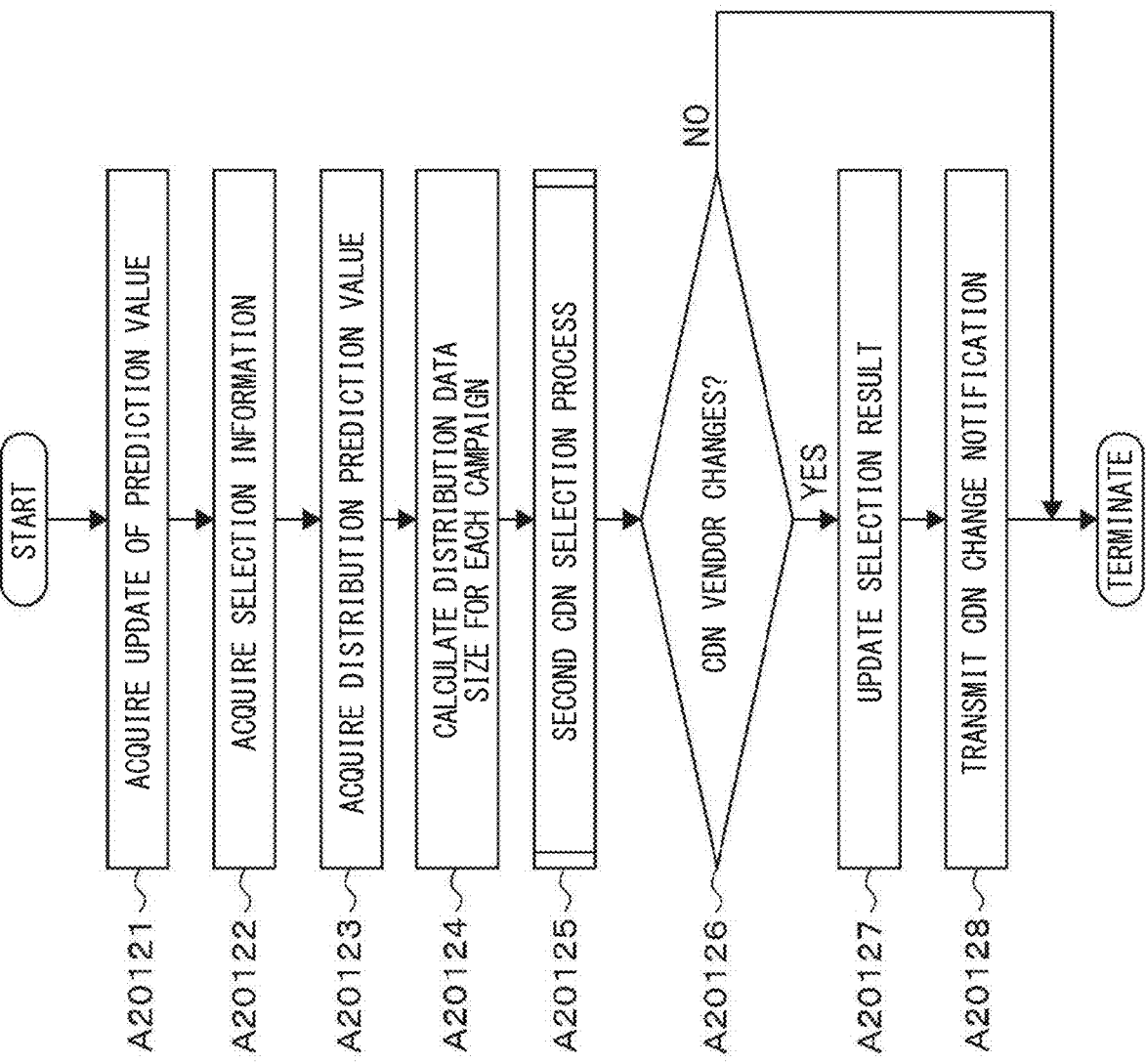
Figure 224:
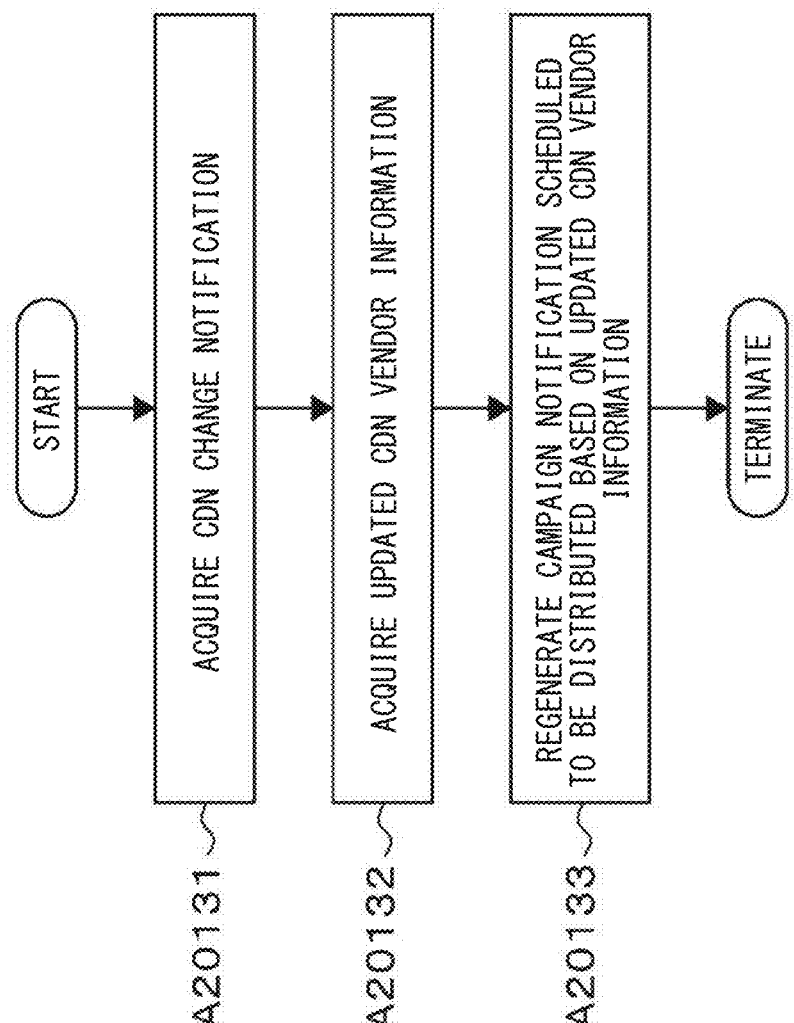

FIG. 131 is a diagram illustrating a process by the OTA master;

FIG. 132 is a diagram illustrating a process by the OTA master;

FIG. 133 is a diagram illustrating a flow of a process in the entire system according to the fifteenth embodiment;

FIG. 134 is a diagram illustrating a process by the OTA center;

FIG. 135 is a diagram illustrating a process by the OTA center;

FIG. 136 is a diagram illustrating a process by the OTA master;

FIG. 137 is a diagram illustrating a process by the OTA master;

FIG. 138 is a diagram illustrating a flow of a process in the entire system according to the sixteenth embodiment;

FIG. 139 is a diagram illustrating an attack from an intermediate attacker;

FIG. 140 is a diagram illustrating a mode in which a digital signature is assigned;

FIG. 141 is a diagram illustrating a process by the OTA center;

FIG. 142 is a diagram illustrating a process by the OTA center;

FIG. 143 is a diagram illustrating a process by the OTA center;

FIG. 144 is a diagram illustrating a process by the OTA master;

FIG. 145 is a diagram illustrating a process by the OTA master;

FIG. 146 is a diagram illustrating a flow of a process in the entire system according to the seventeenth embodiment;

FIG. 147 is a diagram illustrating a process by the OTA center;

FIG. 148 is a diagram illustrating a process by the OTA center;

FIG. 149 is a diagram illustrating a process by the OTA master;

FIG. 150 is a diagram illustrating a process by the OTA master;

FIG. 151 is a diagram illustrating a process by the OTA master;

FIG. 152 is a diagram illustrating a flow of a process in the entire system according to the eighteenth embodiment;

FIG. 153 is a diagram illustrating a CDN price table of each cloud service;

FIG. 154 is a diagram illustrating a CDN price table of each cloud service;

FIG. 155 is a diagram illustrating a price table of a storage method of each cloud service business operator;

FIG. 156 is a diagram illustrating a price table of a storage method of each cloud service business operator;

FIG. 157 is a diagram illustrating a price table for each streaming size in the streaming method of each cloud service business operator;

FIG. 158 is a diagram illustrating a price table for each streaming size in the streaming method of each cloud service business operator;

FIG. 159 is a diagram illustrating a price table for each streaming size in the streaming method of each cloud service business operator;

FIG. 160 is a diagram illustrating a price table for each streaming size in the streaming method of each cloud service business operator;

FIG. 161 is a diagram illustrating quality information about each cloud service business operator;

FIG. 162 is a diagram for describing selection of a CDN vendor;

FIG. 163 is a diagram illustrating a process by the OTA center;

FIG. 164 is a diagram illustrating a process by the OTA center;

FIG. 165 is a diagram illustrating a process by the OTA center;

FIG. 166 is a diagram showing a modification of the eleventh embodiment and showing part of a flow of a process in the entire system;

FIG. 167 is a diagram illustrating part of a flow of a process in the entire system;

FIG. 168 is a diagram illustrating part of a flow of a process in the entire system;

FIG. 169 is a diagram illustrating part of a flow of a process in the entire system;

FIG. 170 is a diagram illustrating a process by the OTA master;

FIG. 171 is a diagram illustrating a process by the PC;

FIG. 172 is a diagram illustrating a process by the OTA center;

FIG. 173 is a diagram illustrating a process by the OTA master;

FIG. 174 is a diagram showing a modification of the twelfth embodiment and showing part of a flow of a process in the entire system;

FIG. 175 is a diagram illustrating part of a flow of a process in the entire system;

FIG. 176 is a diagram illustrating part of a flow of a process in the entire system;

FIG. 177 is a diagram illustrating part of a flow of a process in the entire system;

FIG. 178 is a diagram illustrating a process by the OTA master;

FIG. 179 is a diagram illustrating a process by the PC;

FIG. 180 is a diagram illustrating a process by the OTA center;

FIG. 181 is a diagram illustrating a process by the OTA master;

FIG. 182 is a diagram showing a modification of the sixteenth embodiment and showing part of a flow of a process in the entire system;

FIG. 183 is a diagram illustrating part of a flow of a process in the entire system;

FIG. 184 is a diagram illustrating part of a flow of a process in the entire system;

FIG. 185 is a diagram illustrating part of a flow of a process in the entire system;

FIG. 186 is a diagram illustrating a process by the OTA master;

FIG. 187 is a diagram illustrating a process by the PC;

FIG. 188 is a diagram illustrating a process by the OTA center;

FIG. 189 is a diagram illustrating a process by the OTA master;

FIG. 190 is a diagram illustrating a flow of a process in the entire system according to the nineteenth embodiment;

FIG. 191 is a diagram showing a process by a campaign notification generation section;

Figure 192:
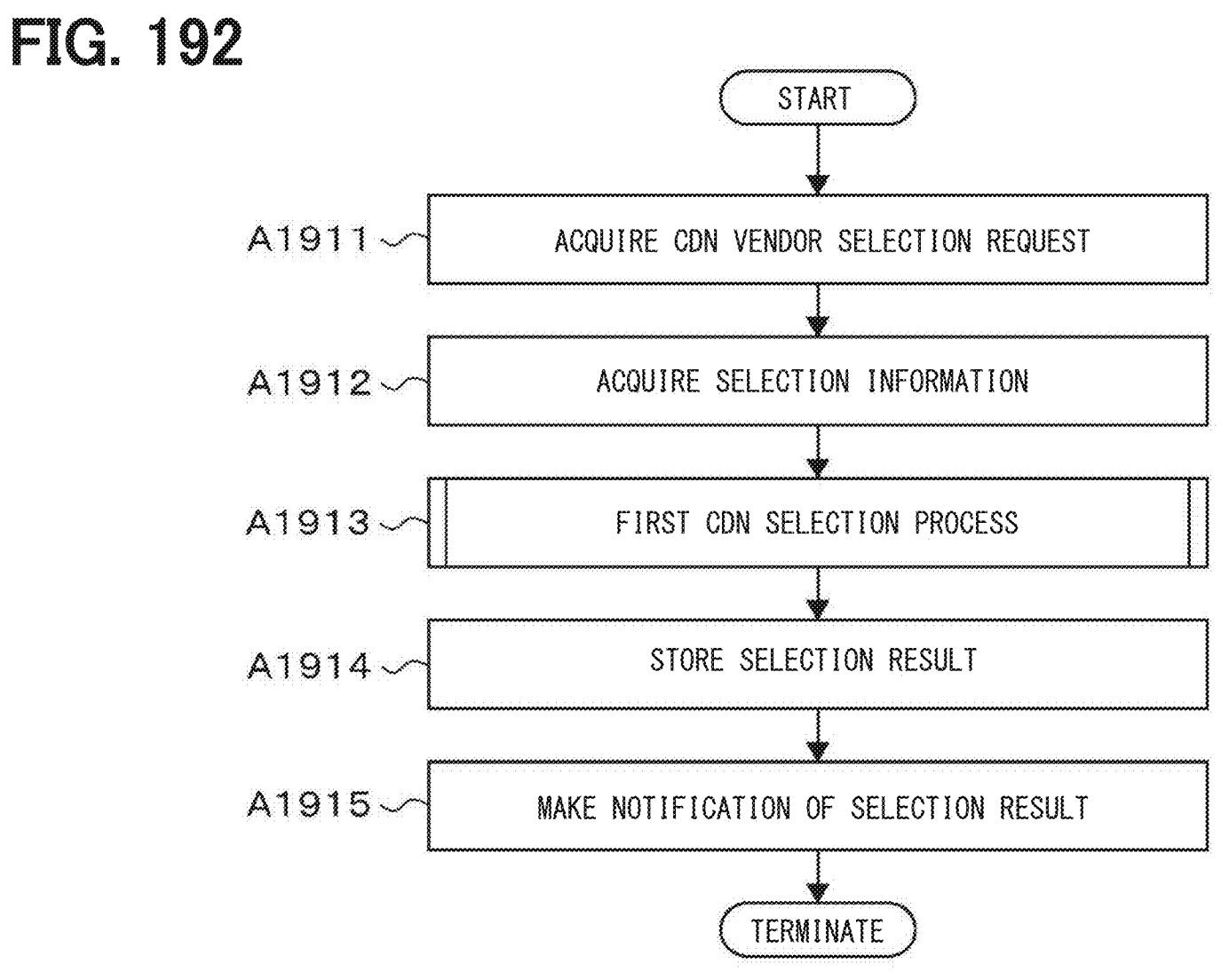

FIG. 192 is a diagram illustrating a process by the CDN vendor selection section;

FIG. 193 is a diagram illustrating a process by the CDN vendor selection section;

FIG. 194 is a diagram illustrating a flow of a process in the entire system according to the first modification of the nineteenth embodiment;

FIG. 195 is a diagram illustrating a process by the CDN vendor selection section;

FIG. 196 is a diagram illustrating a flow of a process in the entire system according to the second modification of the nineteenth embodiment;

FIG. 197 is a view illustrating a selection table;

FIG. 198 is a diagram illustrating a process by the CDN vendor selection section;

FIG. 199 is a diagram illustrating a process by the CDN vendor selection section;

FIG. 200 is a diagram illustrating a process by the performance measurement section;

FIG. 201 is a diagram illustrating a process by a CDN server verification section;

FIG. 202 is a diagram illustrating a flow of a process in the entire system according to the third modification of the nineteenth embodiment;

FIG. 203 is a diagram illustrating a process of a log transmission section;

FIG. 204 is a diagram illustrating a process by a performance measurement section;

FIG. 205 is a diagram illustrating a process by the performance measurement section;

FIG. 206 is a diagram illustrating the fourth modification of the nineteenth embodiment and illustrating a process by a CDN vendor selection section;

FIG. 207 is a diagram illustrating a process by a campaign notification generation section;

FIG. 208 is a diagram illustrating a flow of a process in the entire system according to the fifth modification of the nineteenth embodiment;

Figure 209:
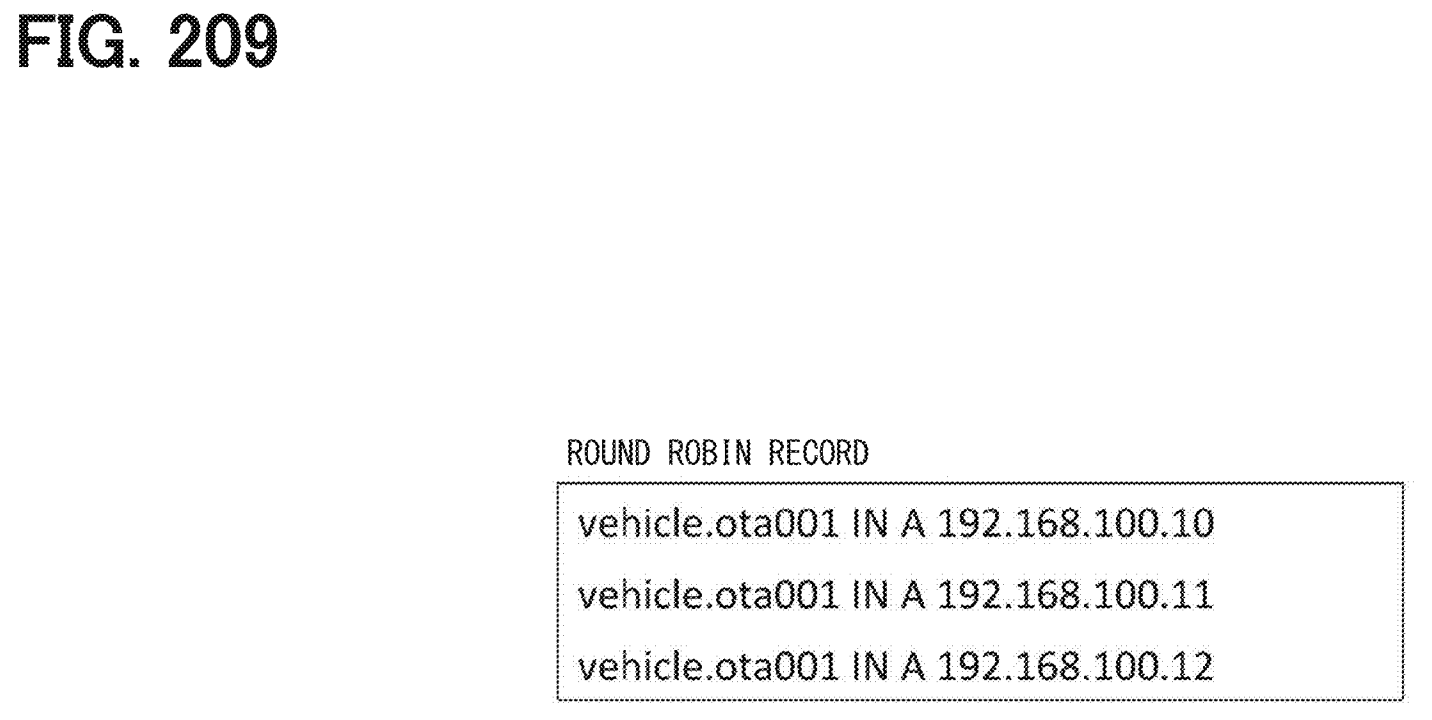

FIG. 209 is a diagram illustrating a round robin record;

FIG. 210 is a diagram illustrating a process by the CDN vendor selection section;

FIG. 211 is a diagram illustrating a process by a switching section;

FIG. 212 is a diagram illustrating a flow of a process in the entire system according to the twentieth embodiment;

FIG. 213 is a diagram illustrating a calculation method;

FIG. 214 is a diagram showing a process by the campaign notification generation section;

FIG. 215 is a diagram illustrating a process by the CDN vendor selection section;

FIG. 216 is a diagram illustrating a process by the CDN vendor selection section;

FIG. 217 is a diagram illustrating a process by the CDN vendor selection section;

FIG. 218 is a diagram illustrating a process by the CDN vendor selection section;

FIG. 219 is a diagram illustrating a process by the CDN vendor selection section;

FIG. 220 is a diagram illustrating a process by the CDN vendor selection section;

FIG. 221 is a diagram illustrating a process by the CDN vendor selection section;

FIG. 222 is a diagram illustrating a process by a progress information management section;

FIG. 223 is a diagram illustrating a process by the CDN vendor selection section; and FIG. 224 is a diagram illustrating a process by the campaign notification generation section.

DETAILED DESCRIPTION

In recent years, in order to enhance a user experience (hereinafter, referred to as a UX) of a vehicle, a data size of an update package distributed from a center device to a master device is increased to an order of several GB or more.

In addition, it has also been studied to increase the update frequency by frequently updating the application program.

However, considering the hardware restriction of the microcomputer mounted on the master device, the decryption process of the Advanced Encryption Standard (hereinafter, it is abbreviated as an AES) is a bottleneck. Therefore, when a Cipher Block Chaining Mode (hereinafter, referred to as a CBC Mode) of general block encryption is used as the encryption method and the decryption method, the throughput is expected to be about 10 Mbps. In the master device, in a case where an update package with a data size of several GB or more is downloaded from the center device at a throughput of about 10 Mbps, for example, it takes nearly 30 minutes to download the update package in a case where the data size is 2 GB, and it takes nearly 5 hours to download the update package in a case where the data size is 20 GB. As described above, when the time required to download the update package is long, the driver may be made to wait more than necessary during the download of the update package depending on the use scene, and the UX of the driver may be damaged.

The present disclosure provides a technique that appropriately increases a throughput when a master device downloads update data from a center device.

According to one aspect of the present disclosure, a data communication system includes a center device that distributes update data to a master device, and a master device that installs the update data downloaded from the center device in an electronic control unit to be reprogrammed. The center device generates a common key for encrypting the update data; encrypts the update data with the common key in a counter (CTR) mode; encrypts the common key with an RSA public key; stores the common key encrypted with the RSA public key in a campaign notification; places the update data encrypted with the common key in a content delivery network (CDN); and transmits the campaign notification in which the encrypted common key is stored to a vehicle-side system to be reprogrammed. The master device acquires the common key from the campaign notification acquired from the center device; decrypts the encrypted common key with an RSA secret key to extract the common key; downloads and acquires encrypted update data from the CDN; encrypts a counter value by executing an AES block encryption process on the counter value with an AES key in parallel with downloading and acquiring of the encrypted update data from the CDN; performs an exclusive OR operation on the encrypted counter value and the encrypted update data downloaded from the CDN to decrypt the encrypted counter value and the encrypted update data; and transfers the decrypted update data to the electronic control unit to be reprogrammed, and installs the update data in the electronic control unit.

In the configuration in which the CBC mode is used as the encryption method and the decryption method, there are disadvantages that it is not possible to perform preparation for encryption and decryption, it is not possible to perform the parallel process of encryption, and the like. On the other hand, in the configuration in which the CTR mode is used as the encryption method and the decryption method, there is an advantage of contributing to improvement of the throughput such that it is possible to perform preparation for encryption and decryption and it is possible to perform the parallel process of encryption and decryption. The CTR mode having an advantage of contributing to the improvement of the throughput is used unlike the conventional method using the CBC mode. It is possible to appropriately increase the throughput when the master device downloads the update data from the center device.

According to one aspect of the represent disclosure, a data communication system includes a center device that distributes update data to a master device, and a master device that installs the update data downloaded from the center device in an electronic control unit to be reprogrammed. The center device generates a common key for encrypting update data; encrypts the update data with the common key in an output feedback (OFB) mode; encrypts the common key with an RSA public key; stores the common key encrypted with the RSA public key in a campaign notification; places the update data encrypted with the common key in a content delivery network (CDN); and transmits the campaign notification in which the encrypted common key is stored to a vehicle-side system to be reprogrammed. The master device acquires the common key from the campaign notification acquired from the center device; decrypts the encrypted common key with an RSA secret key to extract the common key; downloads and acquires encrypted update data from the CDN; encrypts an initialization vector (IV) value by executing an IV value-based common stream encryption process with an AES key in parallel with downloading and acquiring of the encrypted update data from the CDN; performs an exclusive OR operation on the encrypted IV value and the encrypted update data downloaded from the CDN to decrypt the encrypted IV value and the encrypted update data; and transfers the decrypted update data to the electronic control unit to be reprogrammed, and installs the update data in the electronic control unit.

In the configuration in which the CBC mode is used as the encryption method and the decryption method, there are disadvantages that it is not possible to perform preparation for encryption and decryption, it is not possible to perform the parallel process of encryption, and the like. On the other hand, in the configuration in which the OFB mode is used as the encryption method and the decryption method, there is an advantage of contributing to improvement of the throughput such as it is possible to perform preparation for encryption and decryption. The OFB mode having an advantage of contributing to the improvement of the throughput is used unlike the conventional method using the CBC mode. It is possible to appropriately increase the throughput when the master device downloads the update data from the center device.

Hereinafter, a plurality of embodiments will be described with reference to the drawings. In the subsequent embodiment, description of content overlapping with the preceding embodiment may be omitted.

First Embodiment

Figure 1:
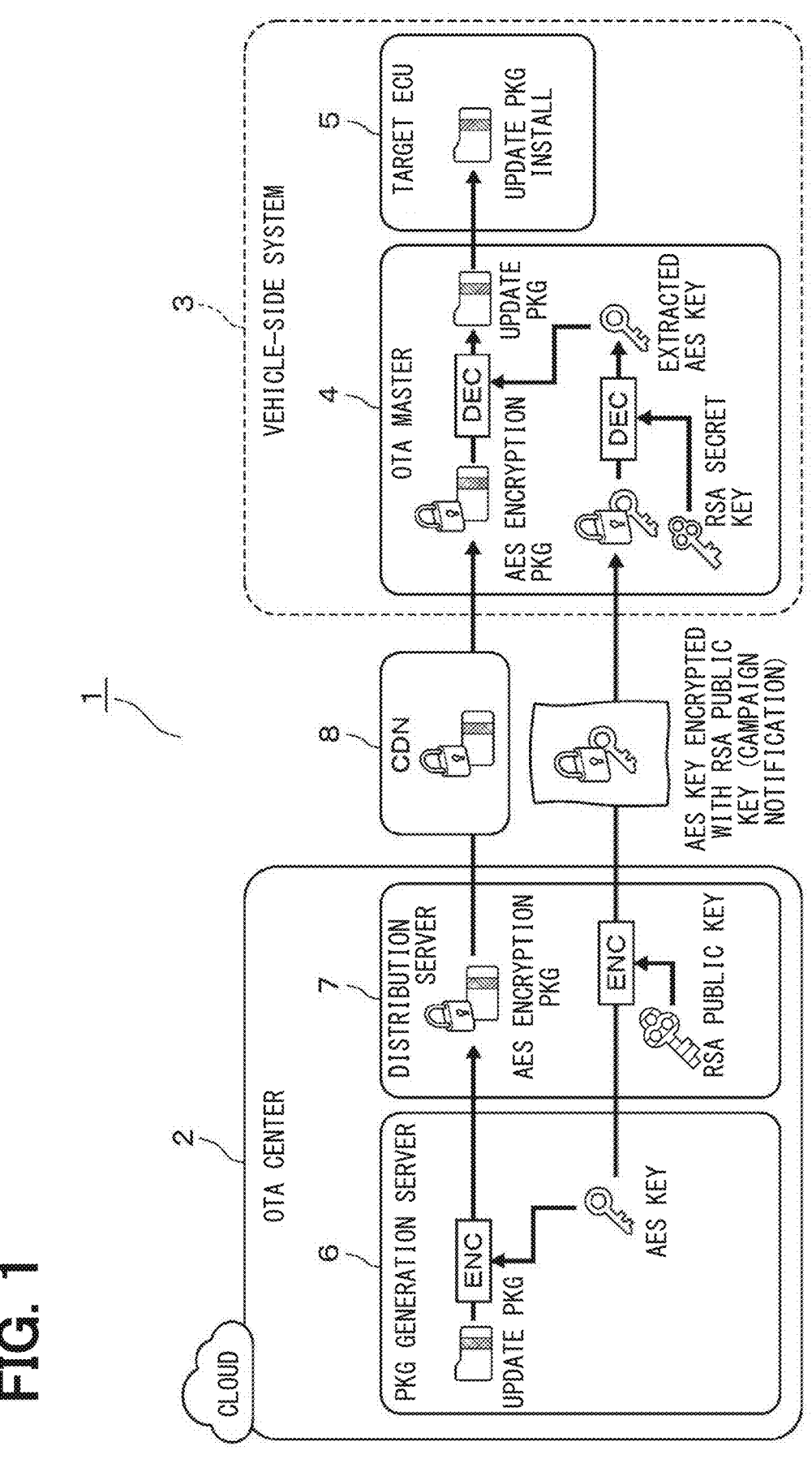
FIG. 1 is a diagram illustrating a flow of a process in an entire system according to the first embodiment.

The first embodiment will be described with reference to FIGS. 1 to 14. As illustrated in FIG. 1, a data communication system 1 includes an OTA center 2 and a vehicle-side system 3 mounted on a vehicle, and the OTA center 2 and the vehicle-side system 3 are configured to be able to perform data communication. The OTA center 2 corresponds to a center device. The OTA center 2 and the vehicle-side system 3 have a one-to-multiple relationship, and, and the OTA center 2 can perform data communication with an unspecified number of vehicle-side systems 3.

The vehicle-side system 3 includes an OTA master 4 and a target ECU 5. The OTA master 4 corresponds to a master device. The OTA master 4 and the target ECU 5 are connected to an in-vehicle network such as a Controller Area Network (CAN) (registered trademark), for example, and are data communicably connected via the in-vehicle network. The in-vehicle network may be Local Interconnect Network (LIN), FlexRay (registered trademark), CAN Flexible Data rate (CAN FD) (registered trademark), Ethernet (registered trademark), or the like. The target ECU 5 is an ECU that is a reprogramming target of the application program, and may be, for example, any of an ECU that controls an automated driving system, an ECU that controls an ADAS system, an ECU that controls a multimedia system, and the like. The application program is a program related to execution of an application, and includes, for example, an application program, a firmware program, and an operating system program.

The OTA center 2 includes a package generation server 6 and a distribution server 7. The package generation server 6 is a server having a function of packaging update data to generate an update package. The update package is, for example, a zip file in which a plurality of files storing update data is compressed and stored. The distribution server 7 is a server having a function of distributing the update package generated by the package generation server 6 to the vehicle-side system 3.

The OTA center 2 distributes a campaign notification to the vehicle-side system 3 or a mobile information terminal such as a smartphone owned by the user when a reprogramming request for an application program of the ECU is generated in accordance with version upgrade by function improvement or the like, for example. The OTA center 2 places an update package in a content delivery network (hereinafter, this is referred to as a CDN) 8 and distributes the update package to the OTA master 4 via the CDN 8 on condition that the download acceptance has been obtained from the user. Alternatively, in a case where the update package has already been placed in the CDN 8, the OTA center 2 distributes the update package from the CDN 8 to the OTA master 4 on condition that the download acceptance from the user has been obtained.

When the OTA master 4 downloads the update package from the OTA center 2, the OTA master 4 transfers the update package to the target ECU 5 and installs the update package in the target ECU 5 on condition that the installation acceptance is obtained from the user. A business operator that provides the CDN 8 as a service is referred to as a CDN vendor. In addition, the OTA master 4 acquires the update package by accessing the CDN server of the CDN 8.

In the present embodiment, in order to speed up the decryption process of the advanced encryption standard (hereinafter, it is abbreviated as an AES) in the vehicle-side system 3, not the cipher block chaining mode (hereinafter, referred to as a CBC mode) of general block encryption but the counter mode (hereinafter, the mode is referred to as a CTR mode) that is representative of streaming encryption is used as the encryption mode. In the present embodiment, the OTA center 2 encrypts the update package with the AES key in the CTR mode. Further, the vehicle-side system 3 encrypts the update package with the AES key in the CTR mode. The OTA center 2 includes an RSA (Rivest-Shamir-Adleman cryptosystem) public key for each vehicle. The RSA secret key is written to the OTA master 4 at the vehicle manufacturing stage.

Figure 2:
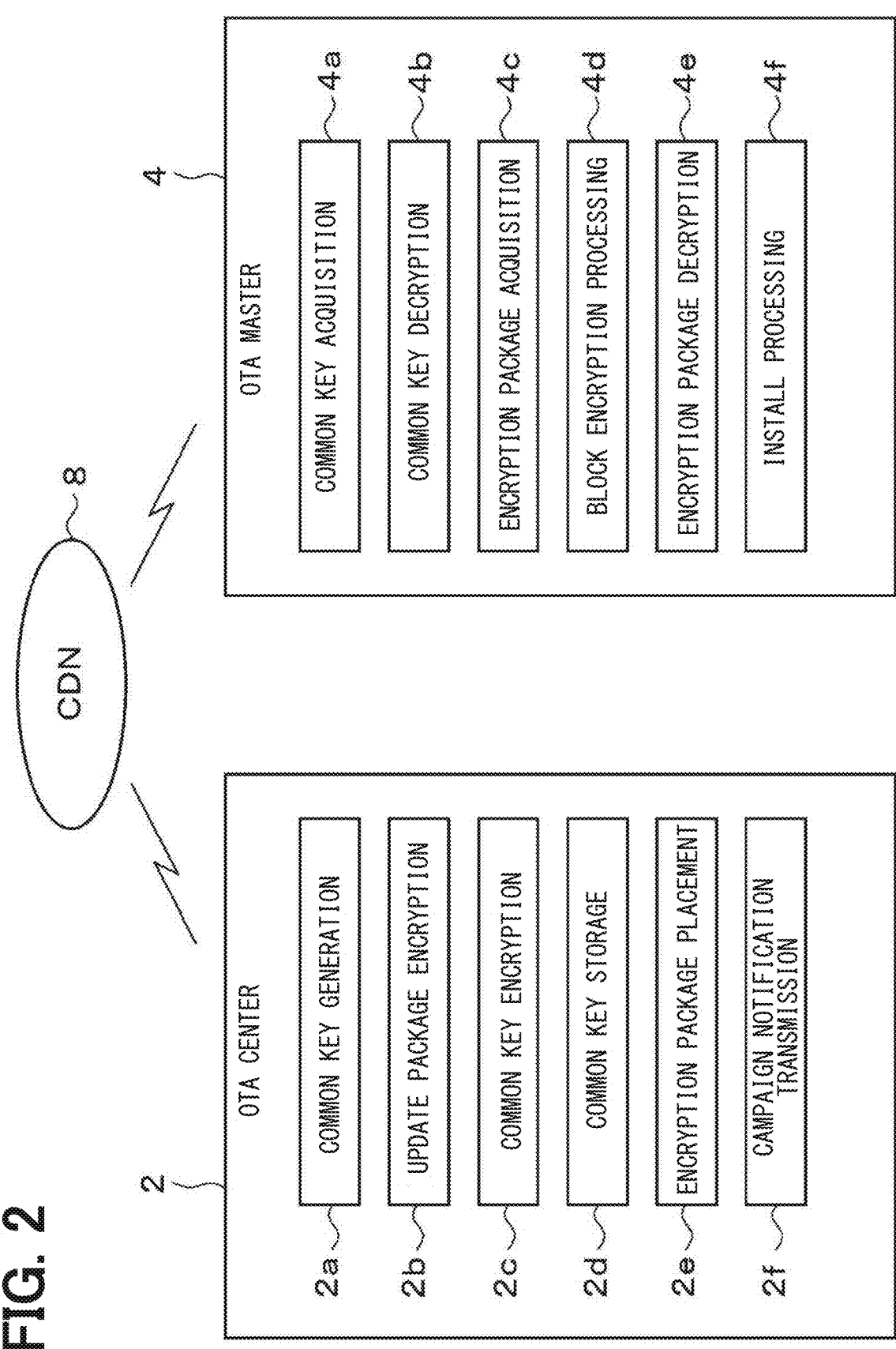
FIG. 2 is a functional block diagram of an OTA center and an OTA master.

As illustrated in FIG. 2, the OTA center 2 includes, as functional blocks related to encryption, a common key generation section 2a, an update package encryption section 2b, a common key encryption section 2c, a common key storage section 2d, an encryption package placement section 2e, and a campaign notification transmission section 2f. The update package encryption section 2b corresponds to an update data encryption section. The encryption package placement section 2e corresponds to an encrypted data placement section. Each of the sections 2a to 2f is realized by cooperation of hardware and software of a microcomputer including a central processing unit (CPU), a random access memory (RAM), a read only memory (ROM), an input/output (I/O), and the like. The CPU realizes the function of the OTA center 2 by executing various programs including an encryption program, an update data placement program, a secret information exchange program, and the like stored in the ROM.

The common key generation section 2a generates an AES key as a common key for encrypting the update package. The package encryption section 2b encrypts the update package with the generated AES key in the CTR mode. The package encryption section 2b executes an AES block encryption process on the counter value with the AES key to encrypt the counter value. The package encryption section 2b performs an exclusive OR (XOR) operation on the encrypted counter value and the update package, combines the plurality of encrypted fragments, and generates an update package encrypted with the AES key. The counter value is, for example, an eight-digit number and increases by "1" for each AES block.

The common key encryption section 2c encrypts the AES key with the RSA public key. The common key storage section 2d stores the AES key encrypted with the RSA public key in the campaign notification. The encryption package placement section 2e places the update package encrypted with the AES key in the CDN 8. The campaign notification transmission section 2f transmits a campaign notification in which the encrypted AES key is stored to the vehicle-side system 3 to be reprogrammed. The campaign notification transmission section 2f may distribute the campaign notification to a mobile information terminal such as a smartphone owned by the user.

The OTA master 4 includes, as functional blocks related to decryption, a common key acquisition section 4a, a common key decryption section 4b, an encryption package acquisition section 4c, a block encryption processing section 4d, an encryption package decryption section 4e, and an installation processing section 4f. The encryption package acquisition section 4c corresponds to an encrypted data acquisition section. The encryption package decryption section 4e corresponds to an encrypted data decryption section. Each of the sections 4a to 4f is realized by cooperation of hardware and software of a microcomputer including a CPU, a RAM, a ROM, an I/O, and the like. The CPU realizes the function of the OTA master 4 by executing various programs including a decryption program, an update data acquisition program, a secret information exchange program, and the like stored in the ROM.

When the common key acquisition section 4a acquire the campaign notification as the campaign notification transmitted from the OTA center 2 is received by the OTA master 4, the common key acquisition section 4a acquires an encrypted AES key from the acquired campaign notification. The common key decryption section 4b decrypts the encrypted AES key with the RSA secret key to extract the AES key. The encryption package acquisition section 4c downloads and acquires the encrypted update package from the CDN 8. At this time, in parallel with the encryption package acquisition section 4c downloading and acquiring the encrypted update package from the CDN 8, the block encryption processing section 4d executes an AES block encryption process of the counter value with the AES key to encrypt the counter value. The encryption package decryption section 4e performs an exclusive OR (hereinafter referred to as XOR (Exclusively-OR) operation on the encrypted counter value and the encrypted update package downloaded from the CDN 8 to decrypt the counter value and the encrypted update package. The installation processing section 4f transfers the decrypted update package to the target ECU 5, and installs the update package in the target ECU 5.

Figure 3:
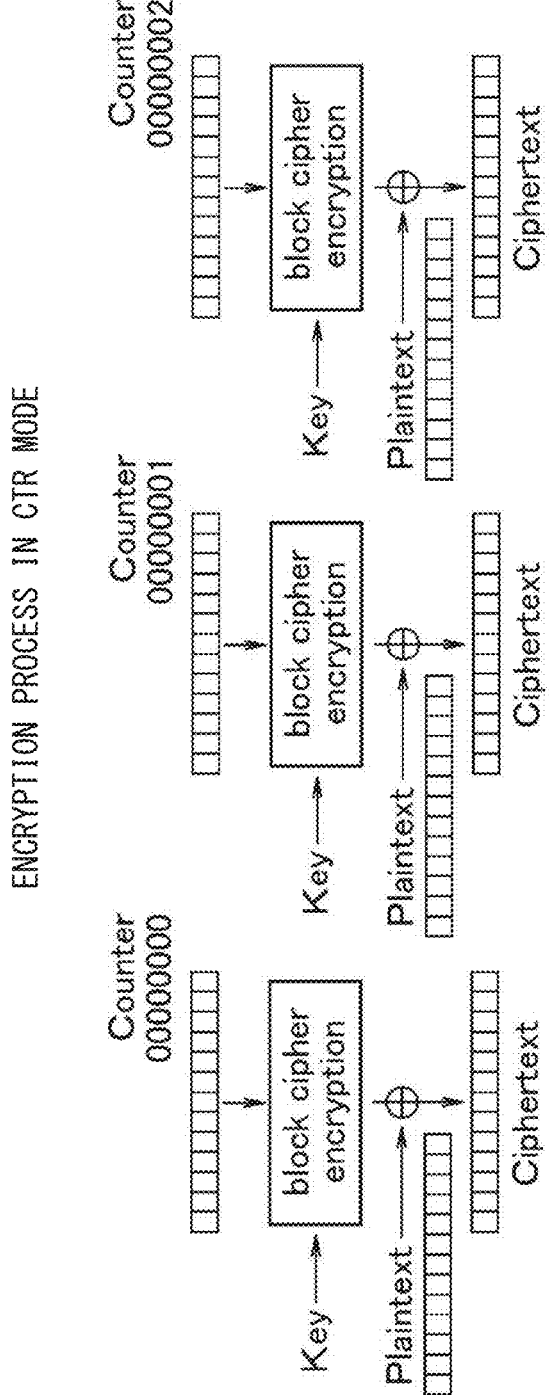
FIG. 3 is a diagram for describing an encryption process in a CTR mode.
Figure 4:
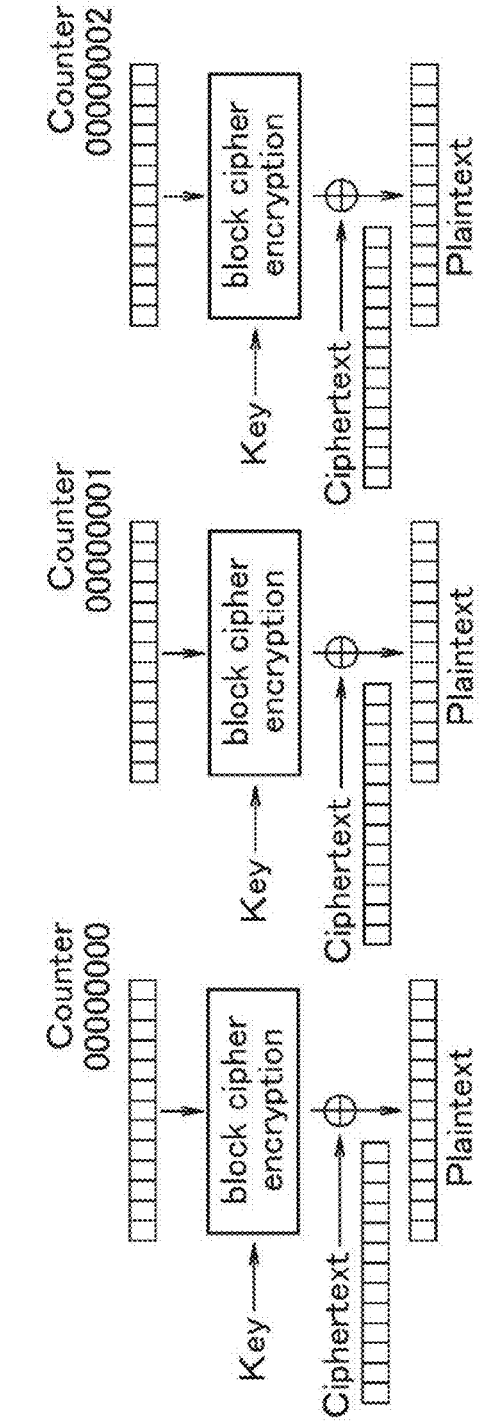
FIG. 4 is a diagram for describing a decryption process in a CTR mode.
Figure 6:
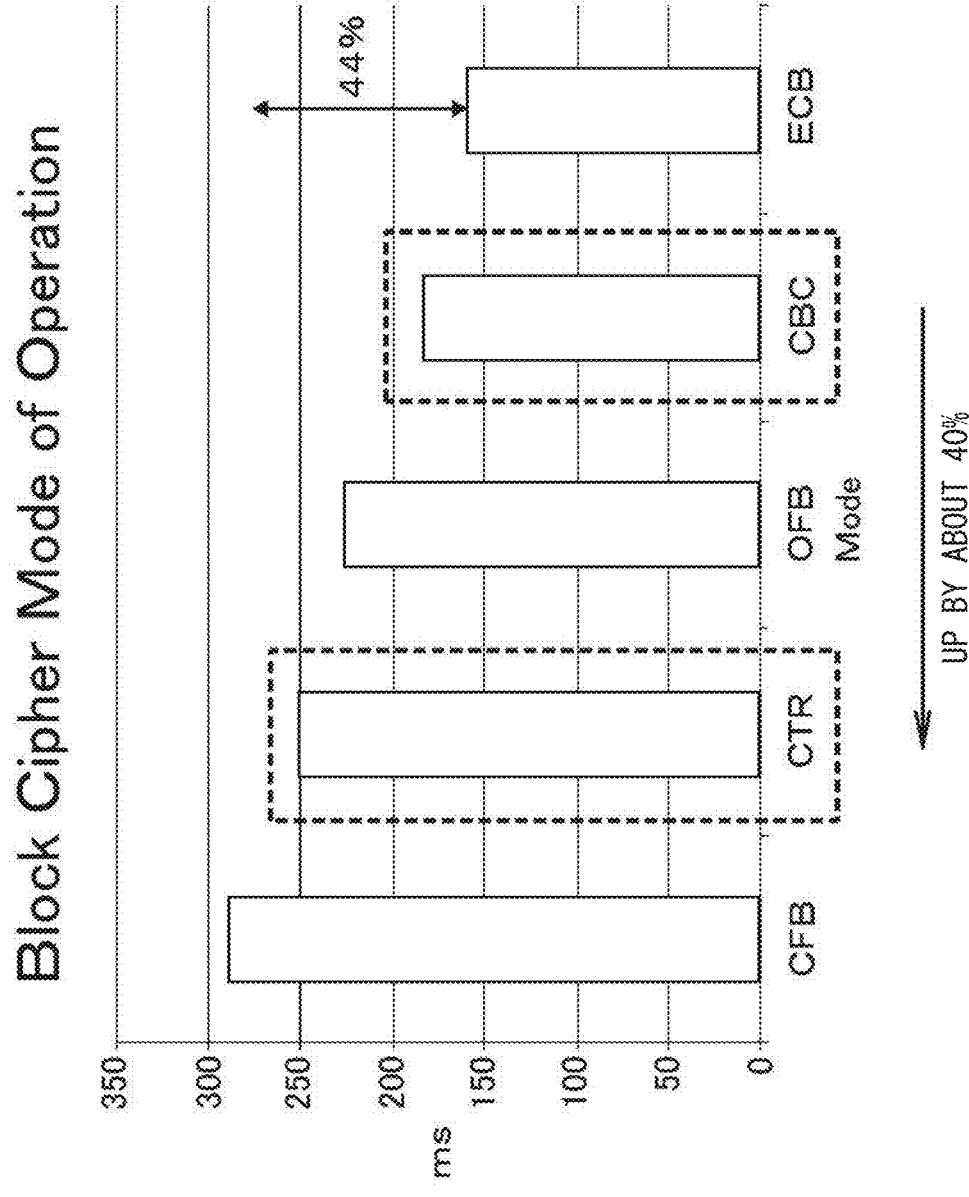
FIG. 6 is a diagram illustrating comparison in throughput between a CBC mode and a CTR mode.

The encryption process in the CTR mode is as illustrated in FIG. 3, and the decryption process in the CTR mode is as illustrated in FIG. 4. As illustrated in FIG. 5, while the disadvantage of the CBC mode is that "it is not possible to perform preparation for encryption and decryption" and "it is not possible to perform parallel process of encryption", the advantage of the CTR mode is that "it is possible to perform preparation for encryption and decryption, so that high speed is possible" and "it is possible to perform the parallel process of encryption and decryption". That is, as an advantage of contributing to the improvement of the throughput by using the CTR mode as the encryption mode, the throughput can be improved by about 40% as compared with the case of using the CBC mode of general block encryption as illustrated in FIG. 6.

Figure 7:
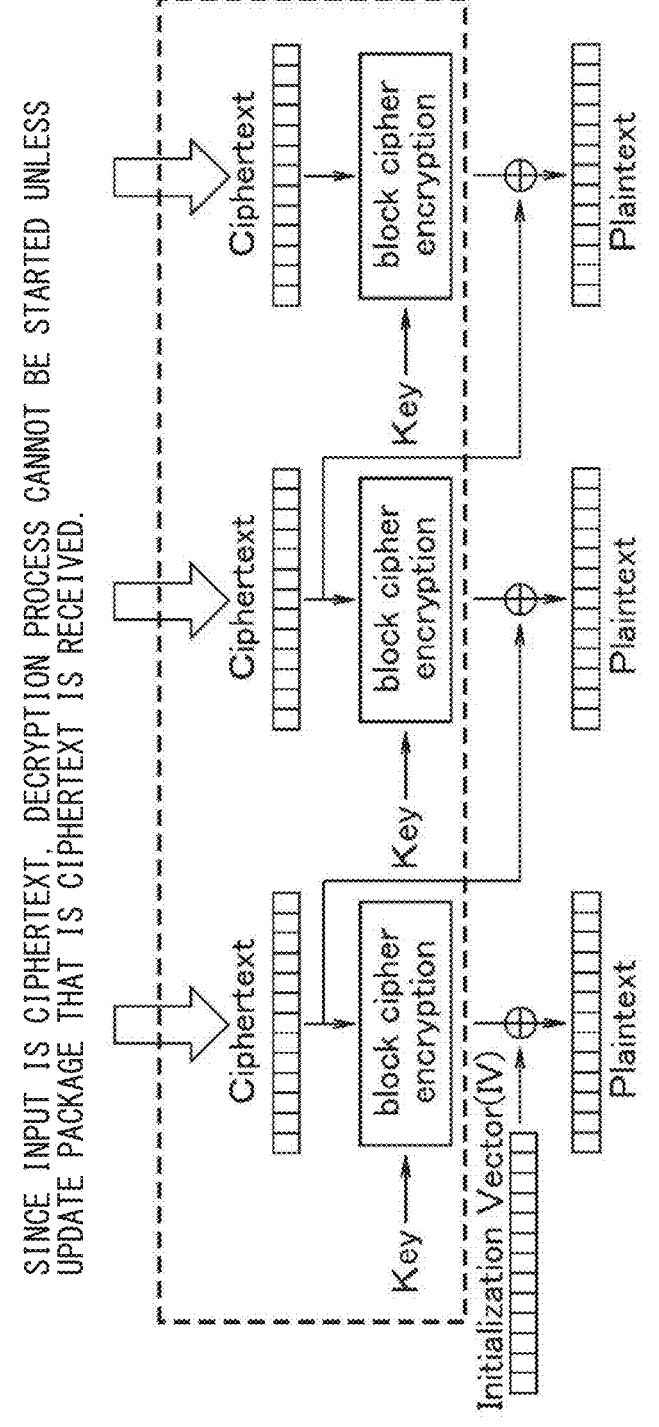
FIG. 7 is a diagram for describing a decryption process in a CBC mode.

As illustrated in FIG. 7, in the decryption process in the CBC mode, since the input is the ciphertext, the decryption process cannot be started unless the update package that is the ciphertext is received. On the other hand, as illustrated in FIG. 8, in the decryption process in the CTR mode, since the input is the counter value, the decryption process can be started before the update package that is the ciphertext is received. In addition, since there is no dependency relationship with each other, a plurality of cryptographic operations can be executed simultaneously in parallel.

Next, the operation of the above-described configuration will be described with reference to FIGS. 9 to 14.

Figure 9:
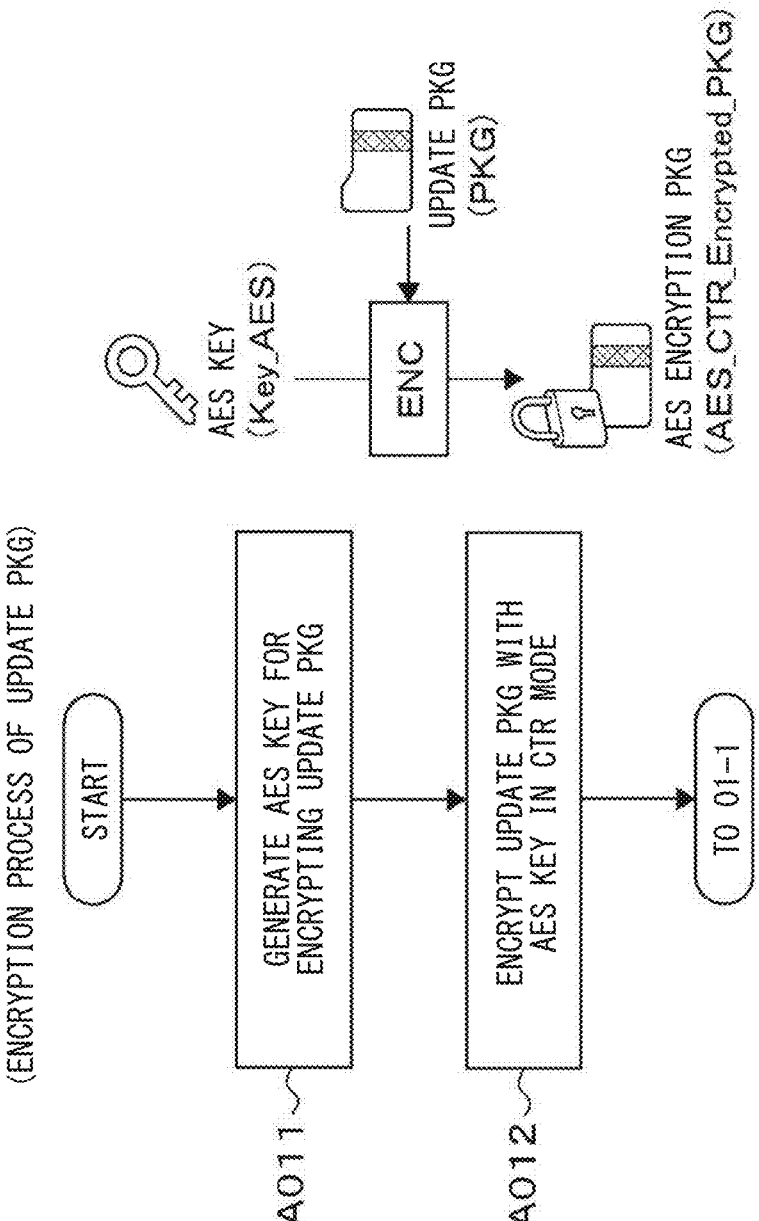
FIG. 9 is a diagram illustrating a process by an OTA center.
Figure 10:
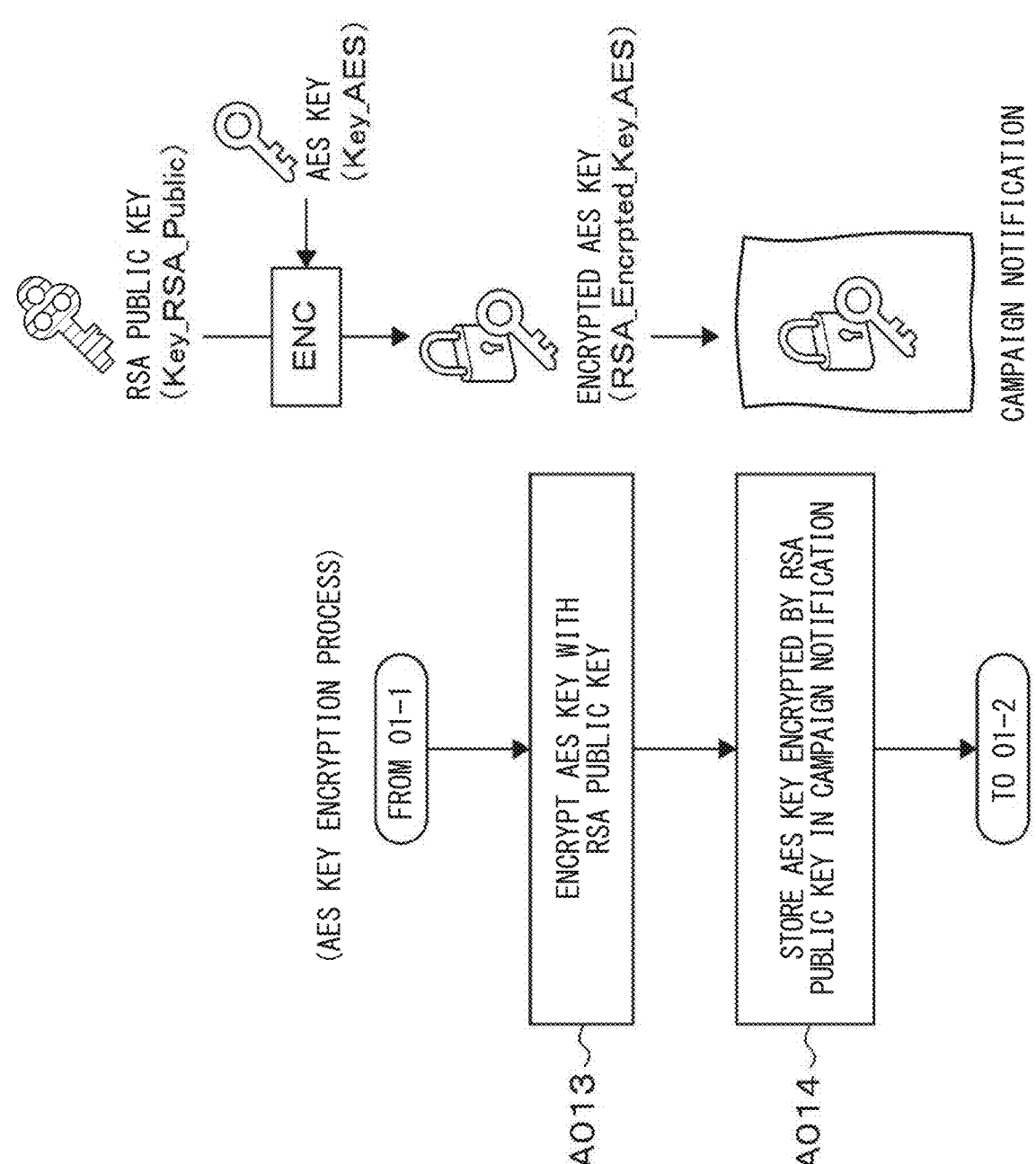
FIG. 10 is a diagram illustrating a process by the center.

(1-1) Process by OTA Center 2 (See FIGS. 9 to 11)

The OTA center 2 generates an AES key for encrypting the update package (A011, corresponding to common key generation step). The OTA center 2 encrypts the update package with the generated AES key in the CTR mode (A012, corresponding to update data encryption step). The OTA center 2 encrypts the AES key with the RSA public key (A013, corresponding to common key encryption step). The OTA center 2 stores the AES key encrypted with the RSA public key in the campaign notification (A014, corresponding to common key storage step). The OTA center 2 places the update package encrypted with the AES key in the CDN 8 (A015, corresponding to encrypted data placement step). Placing the update package in the CDN 8 indicates placing the update package in the origin server of the CDN 8. The OTA center 2 transmits a campaign notification storing the encrypted AES key to the vehicle-side system 3 to be reprogrammed (A016, corresponding to campaign notification transmission step).

Figure 12:
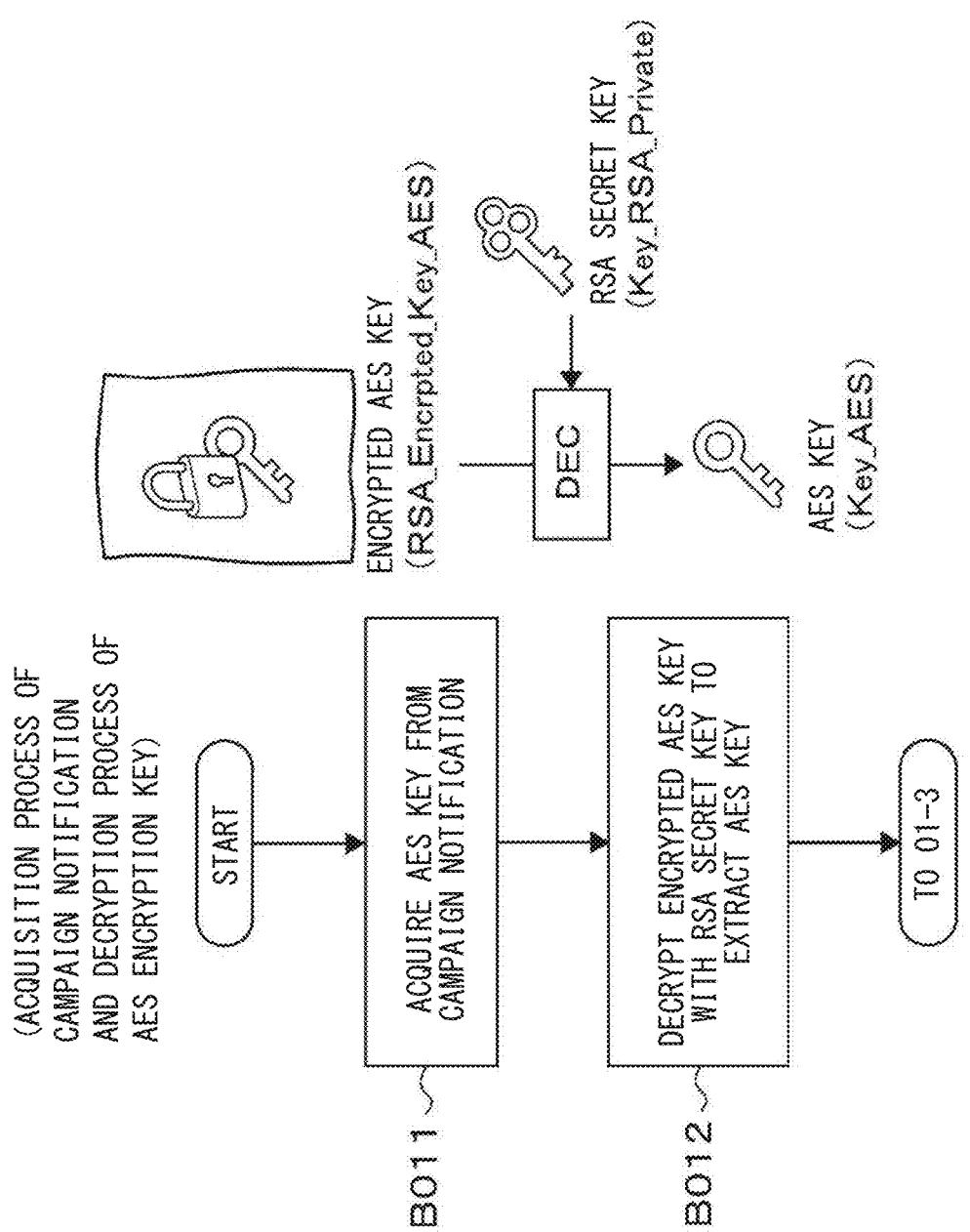
FIG. 12 is a diagram illustrating a process by an OTA master.
Figure 13:
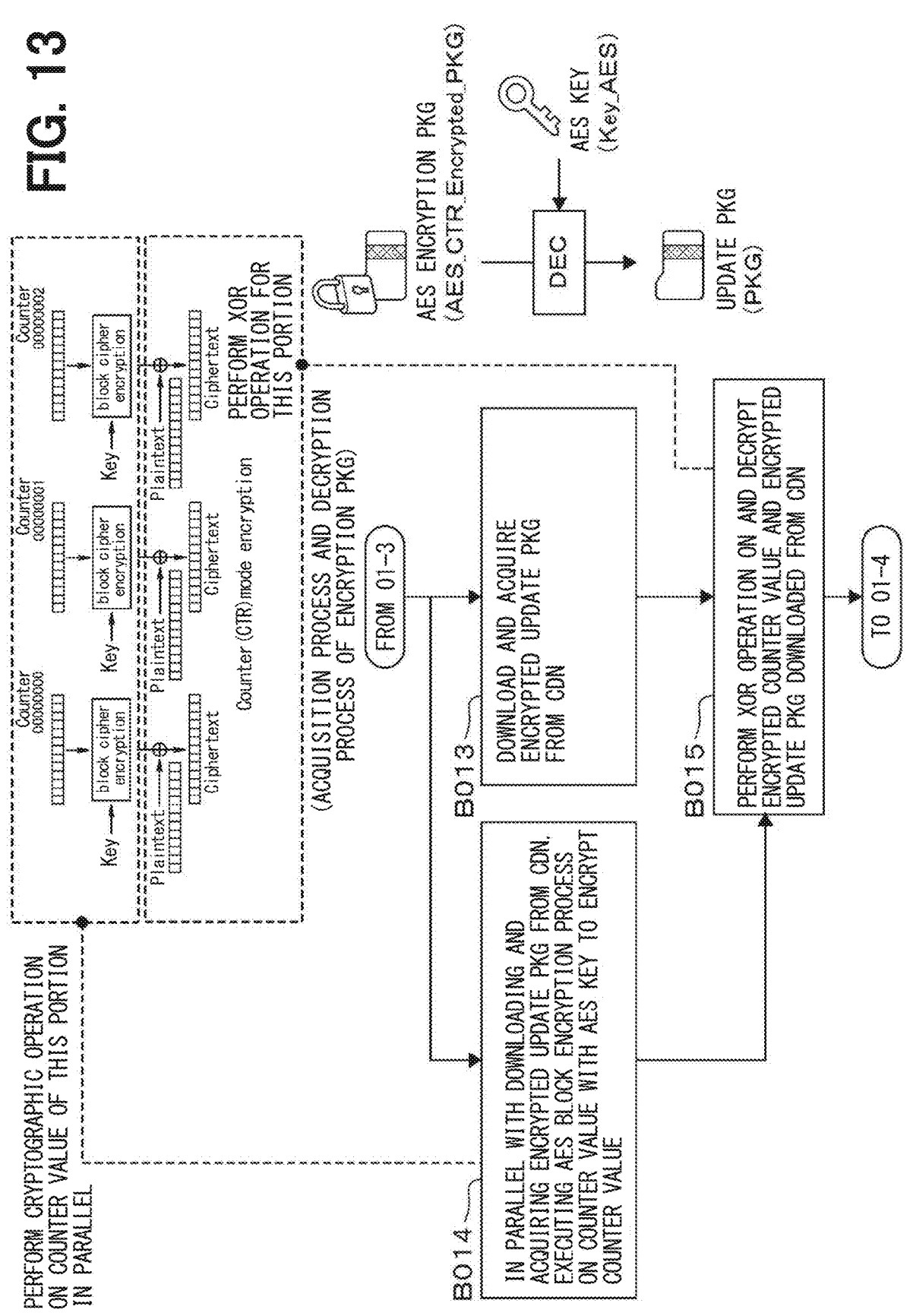
FIG. 13 is a diagram illustrating a process by the OTA master.
Figure 14:
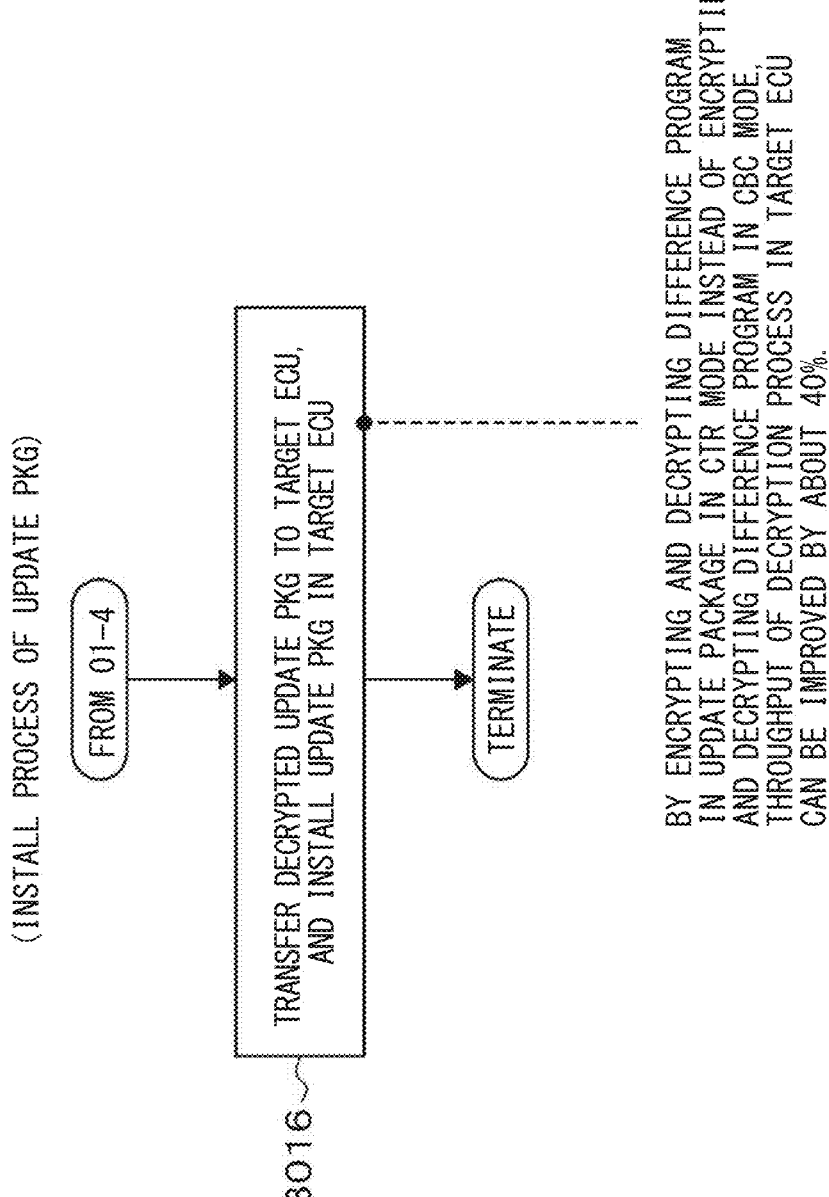
FIG. 14 is a diagram illustrating a process by the OTA master.

(1-2) Process by OTA Master 4 (See FIGS. 12 to 14)

When the OTA master 4 acquires a campaign notification as the campaign notification transmitted from the OTA center 2 is received by the OTA master 4, the OTA master 4 acquires an AES key from the acquired campaign notification (B011, corresponds to common key acquisition step). The OTA master 4 decrypts the encrypted AES key with the RSA secret key to extract the AES key (B012, corresponding to common key decryption step). The OTA master 4 downloads and acquires the encrypted update package from the CDN 8 (B013, corresponding to encrypted data acquisition step).

At this time, in parallel with downloading and acquiring the encrypted update package from the CDN 8, the OTA master 4 executes an AES block encryption process of the counter value with the AES key to encrypt the counter value (B014, corresponding to the block encryption processing step). The OTA master 4 performs an XOR operation on and decrypts the encrypted counter value and the encrypted update package downloaded from the CDN 8 (B015, corresponding to encrypted data decryption step). The OTA master 4 transfers the decrypted update package to the target ECU 5 and installs the update package in the target ECU 5 (B016, corresponding to the installation processing step). By encrypting and decrypting the difference program in the update package in the CTR mode instead of encrypting and decrypting the difference program in the CBC mode, the throughput of the decryption process in the target ECU 5 can also be improved by about 40%.

As described above, according to the first embodiment, the following operational effects can be obtained.

The CTR mode is used as the encryption method and the decryption method of the update package. By using the CTR mode, it is possible to perform preparation for encryption and decryption and it is possible to perform a parallel process of encryption and decryption as compared with the conventional case where the CBC mode is used. As a result, when the OTA master 4 downloads the update package from the OTA center 2, it is possible to enjoy the advantages of the CTR mode and to appropriately increase the throughput.

Second Embodiment

The second embodiment will be described with reference to FIGS. 15 to 26. While the first embodiment uses the CTR mode as the encryption mode, the second embodiment uses an output feedback mode (hereinafter, referred to as an OFB mode) as the encryption mode.

In this case, the package encryption section 2b encrypts the update package with the generated AES key in the OFB mode. In parallel with the encryption package acquisition section 4c downloading and acquiring the encrypted update package from the CDN 8, the block encryption processing section 4d executes an initialization vector (IV) value-based AES stream encryption process with an AES key to encrypt the IV value. The IV value is an initialization vector value, and indicates, for example, a randomly generated bit string. The encryption package decryption section 4e performs an XOR operation on and decrypts the encrypted IV value and the encrypted update package downloaded from the CDN 8.

Figure 15:
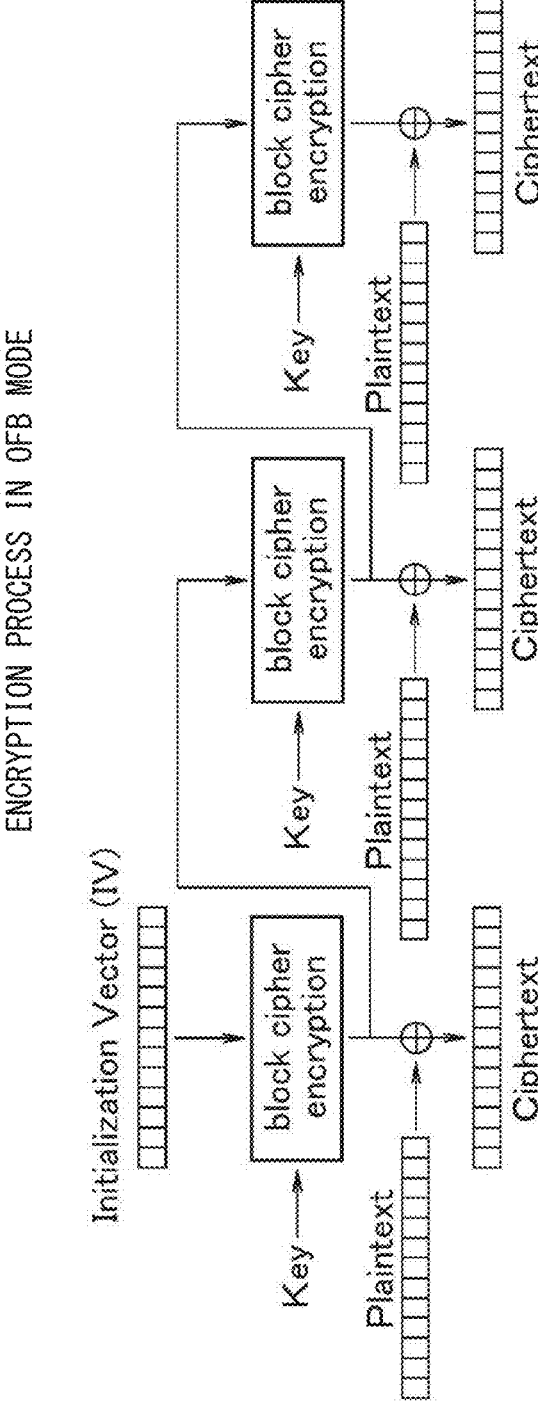
FIG. 15 is a diagram for describing an encryption process in an OFB mode according to the second embodiment.
Figure 16:
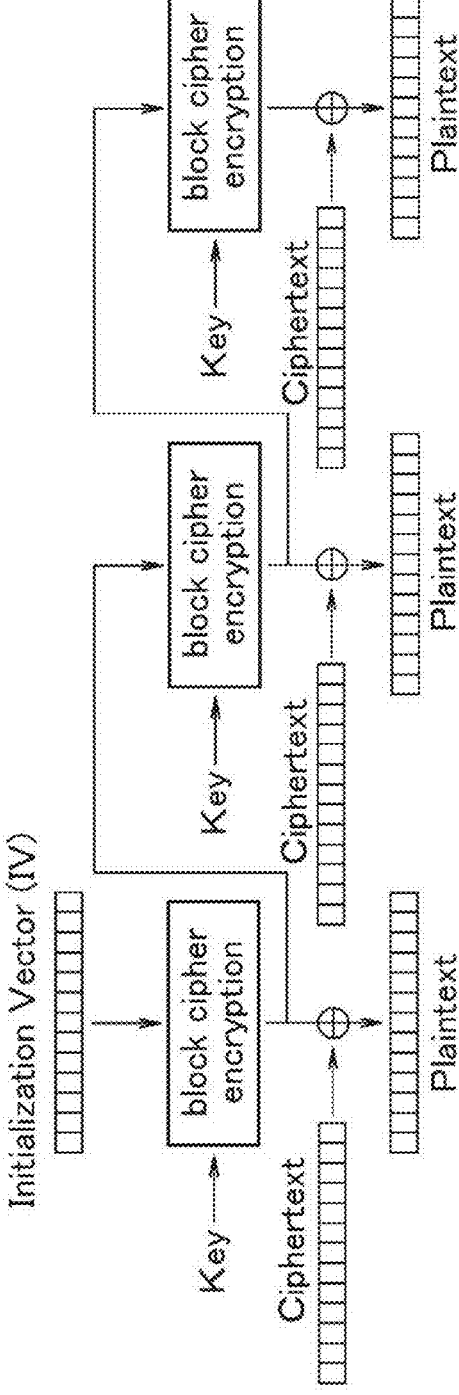
FIG. 16 is a diagram for describing a decryption process in an OFB mode.
Figure 18:
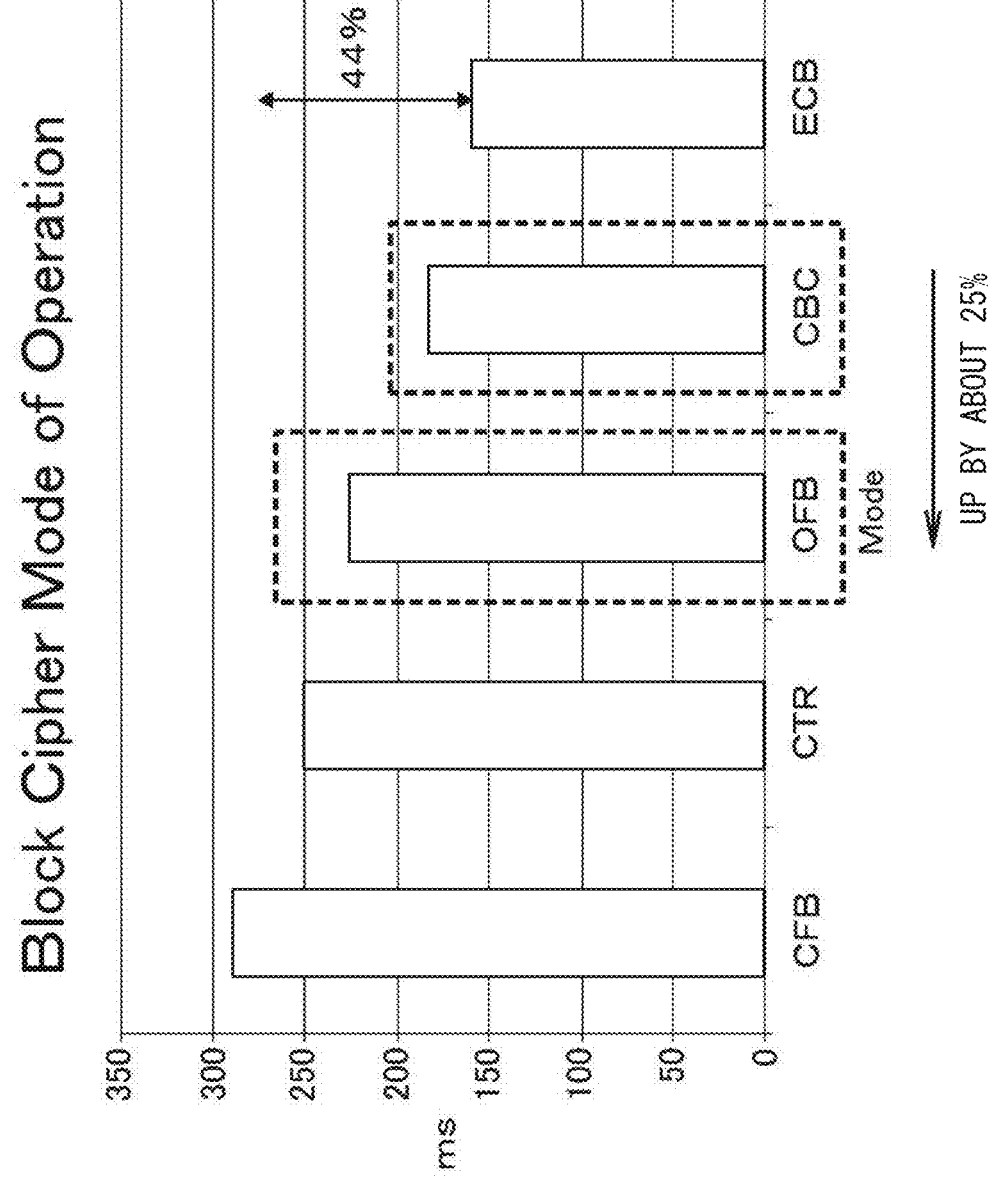
FIG. 18 is a diagram illustrating comparison in throughput between a CBC mode and an OFB mode.

The OFB mode encryption process is as illustrated in FIG. 15, and the OFB mode decryption process is as illustrated in FIG. 16. As illustrated in FIG. 17, while the disadvantage of the CBC mode is that "it is not possible to perform preparation for encryption and decryption" and "it is not possible to perform a parallel process of encryption", the advantage of the OFB mode is that "it is possible to perform preparation for encryption and decryption, so that high speed is possible". That is, as the advantage of contributing to the improvement of the throughput by using the OFB mode as the encryption mode, the throughput can be improved by about 25% as compared with the case of using the CBC mode of general block encryption as illustrated in FIG. 18.

Figure 20:
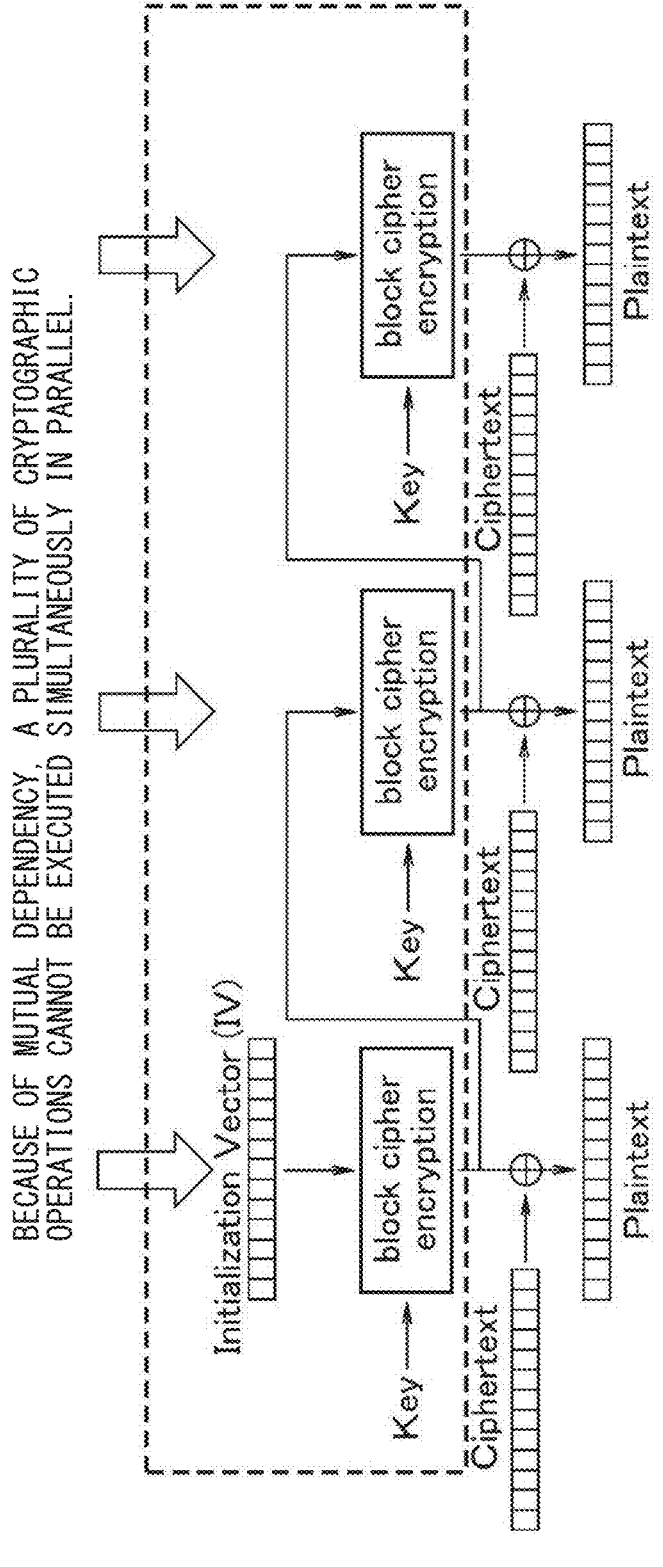
FIG. 20 is a diagram for describing a decryption process in an OFB mode.

As illustrated in FIG. 19, in the decryption process in the CTR mode, since the input is the counter value, the decryption process can be started before the update package that is the ciphertext is received. In addition, since there is no dependency relationship with each other, a plurality of cryptographic operations can be executed simultaneously in parallel. On the other hand, as illustrated in FIG. 20, in the decryption process in the OFB mode, since there is a mutual dependency relationship, a plurality of cryptographic operations cannot be executed simultaneously in parallel. However, a process of performing an XOR operation on and decrypts the encrypted IV value and the encrypted update package can be executed in parallel. Therefore, in the decryption process in the OFB mode, the throughput cannot be improved as much as the decryption process in the CTR mode described in the first embodiment, but the throughput can be improved as compared with the case of using the CBC mode.

Next, the operation of the above-described configuration will be described with reference to FIGS. 21 to 26.

Figure 21:
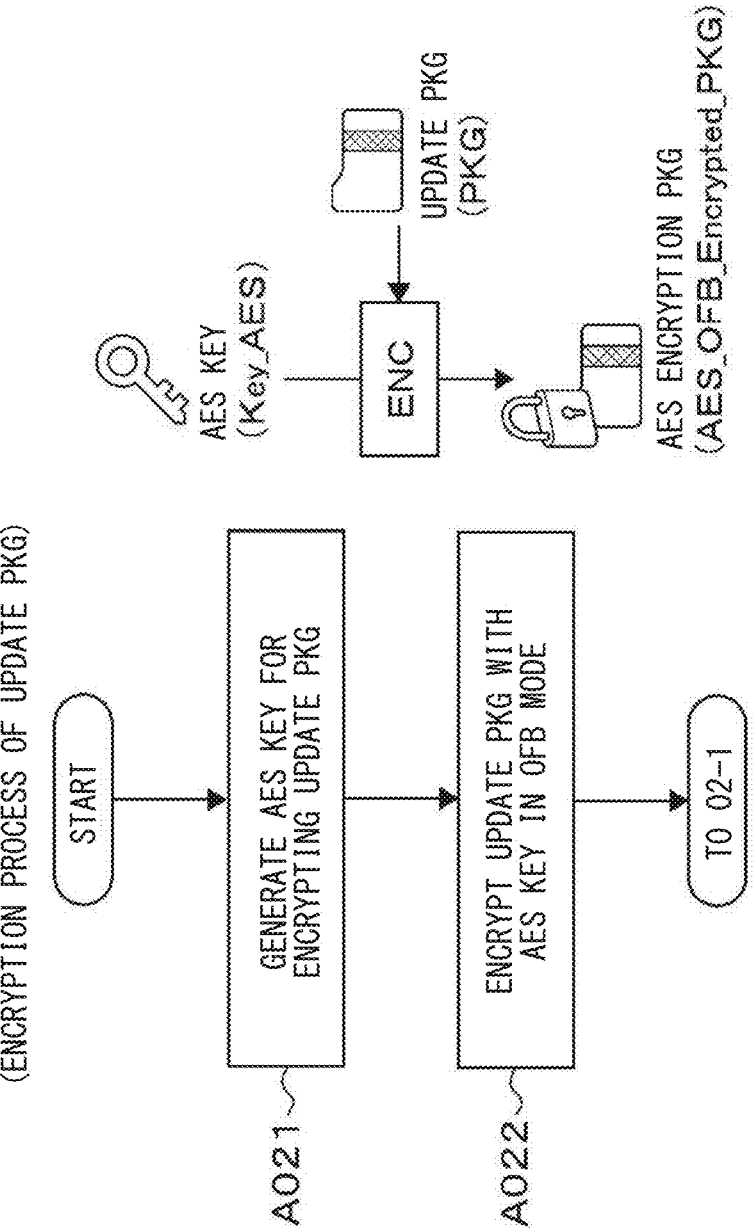
FIG. 21 is a diagram illustrating a process by the OTA center.
Figure 22:
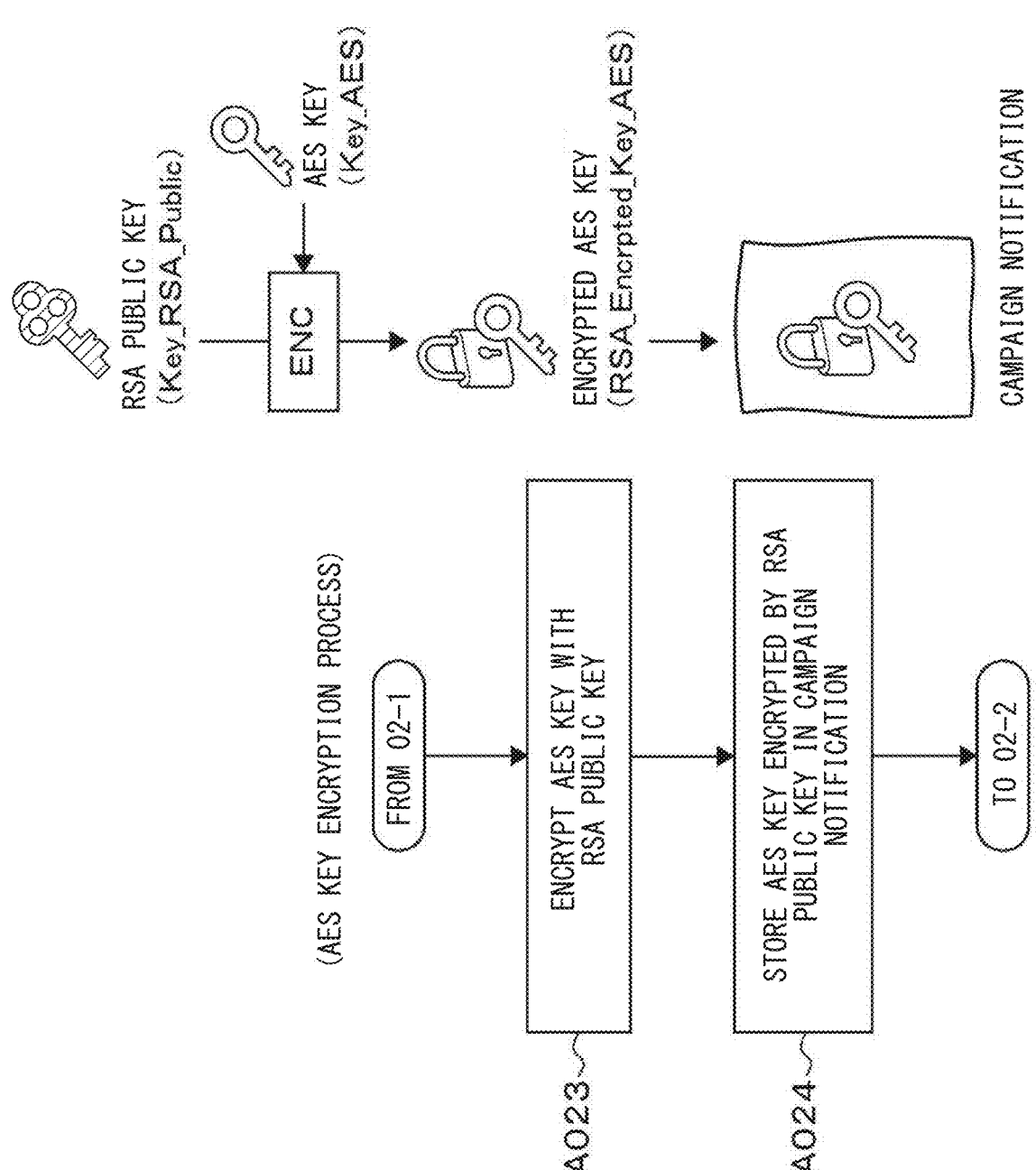
FIG. 22 is a diagram illustrating a process by the OTA center.
Figure 23:
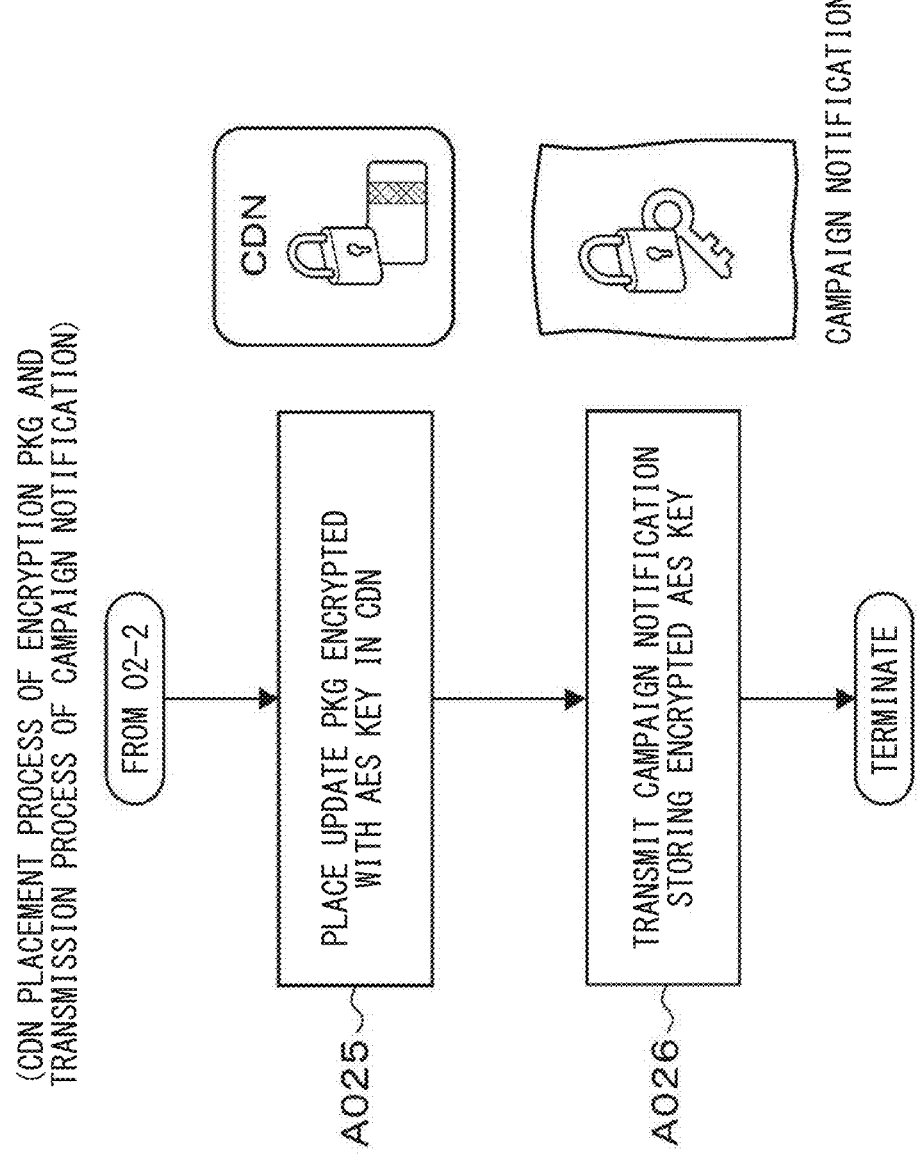
FIG. 23 is a diagram illustrating a process by the OTA center.

(2-1) Process by OTA Center 2 (See FIGS. 21 to 23)

The OTA center 2 generates an AES key for encrypting the update package (A021, corresponding to common key generation step). The OTA center 2 encrypts the update package with the generated AES key in the OFB mode (A022, corresponding to update data encryption step). The OTA center 2 encrypts the AES key with the RSA public key (A023, corresponding to common key encryption step). The OTA center 2 stores the AES key encrypted with the RSA public key in the campaign notification (A024, corresponding to common key storage step). The OTA center 2 places the update package encrypted with the AES key in the CDN 8 (A025, corresponding to encrypted data placement step). The OTA center 2 transmits a campaign notification storing the encrypted AES key to the vehicle-side system 3 to be reprogrammed (A026, corresponding to campaign notification transmission step).

Figure 24:
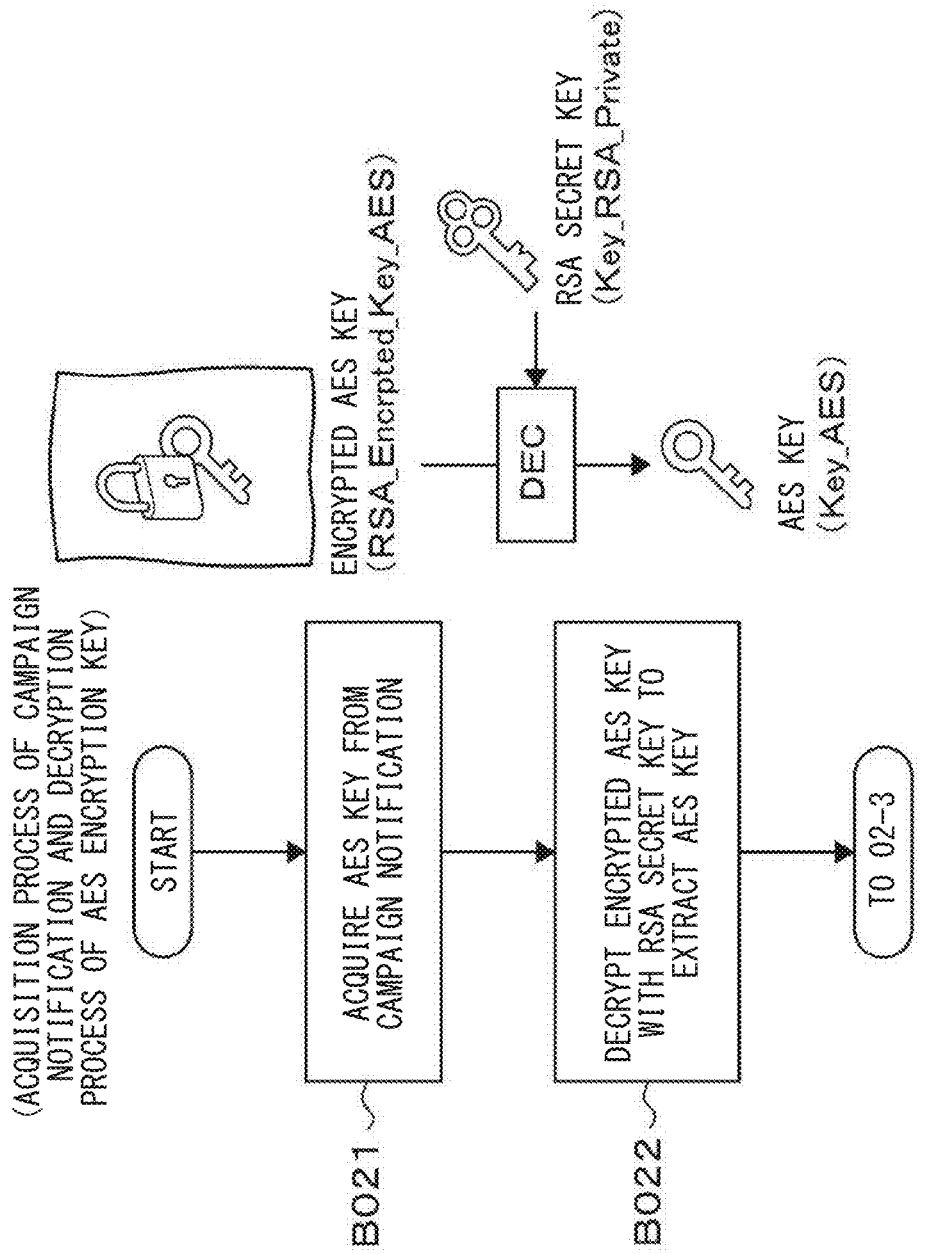
FIG. 24 is a diagram illustrating a process by the OTA master.
Figure 25:
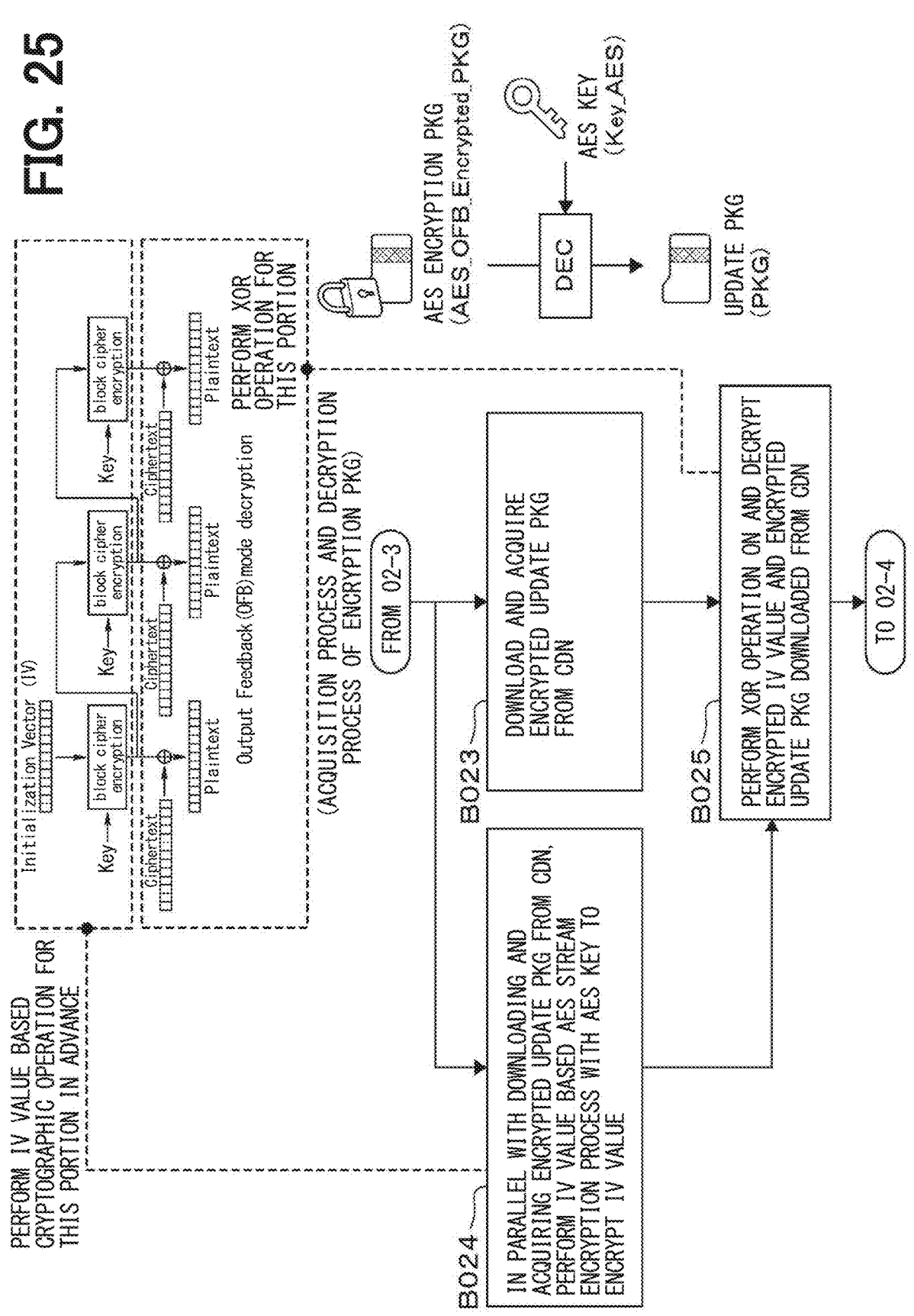
FIG. 25 is a diagram illustrating a process by the OTA master.
Figure 26:
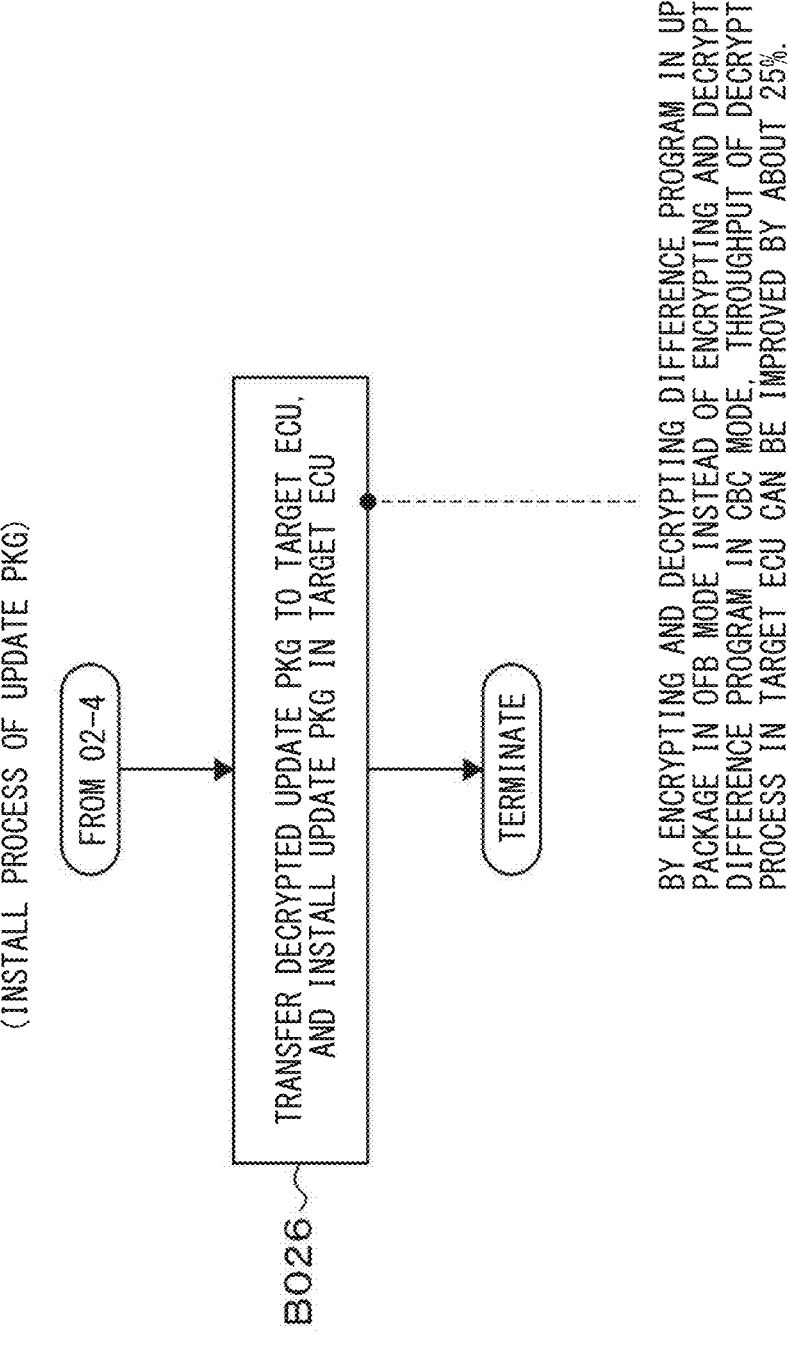
FIG. 26 is a diagram illustrating a process by the OTA master.
Figure 27:
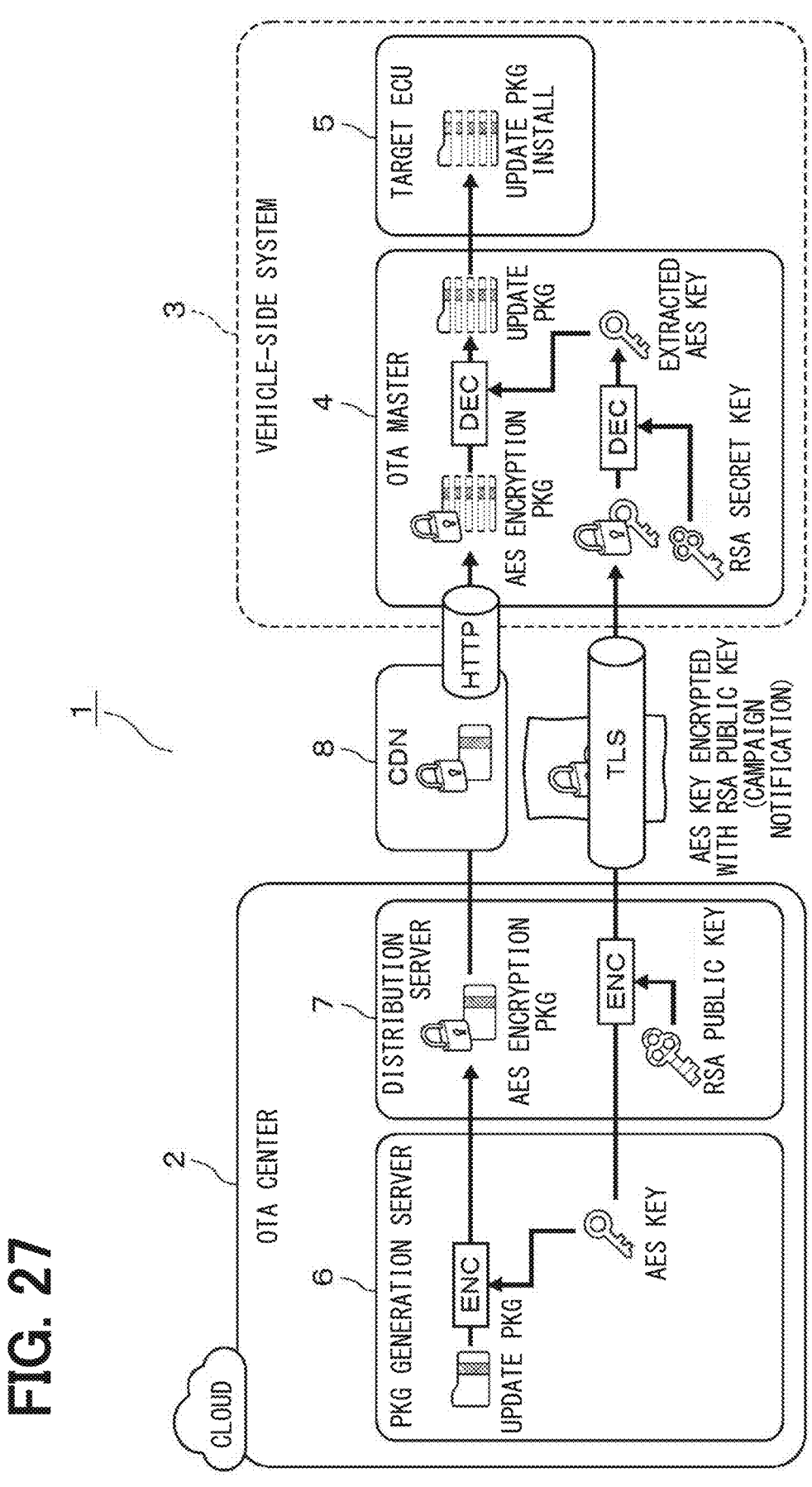
FIG. 27 is a diagram illustrating a flow of a process in the entire system according to the third embodiment.

(2-2) Process by OTA Master 4 (See FIGS. 24 to 26)

When the OTA master 4 acquires a campaign notification as the campaign notification transmitted from the OTA center 2 is received by the OTA master 4, the OTA master 4 acquires an AES key from the acquired campaign notification (B021, corresponding to common key acquisition step). The OTA master 4 decrypts the encrypted AES key with the RSA secret key to extract the AES key (B022, corresponding to common key decryption step). The OTA master 4 downloads and acquires the encrypted update package from the CDN 8 (B023, corresponding to encrypted data acquisition step).

At this time, in parallel with downloading and acquiring the encrypted update package from the CDN 8, the OTA master 4 executes the IV value-based AES stream encryption process with the AES key to encrypt the IV value (B024, corresponding to the block encryption processing step). The OTA master 4 performs an XOR operation on and decrypts the encrypted IV value and the encrypted update package downloaded from the CDN 8 (B025, corresponding to encrypted data decryption step). The OTA master 4 transfers the decrypted update package to the target ECU 5 and installs the update package in the target ECU 5 (B026, corresponding to installation processing step). By performing encryption and decryption in the OFB mode instead of performing encryption and decryption in the difference program CBC mode in the update package, the throughput of the decryption process in the target ECU 5 can also be improved by about 25%.

As described above, according to the second embodiment, the following operational effects can be obtained.

The OFB mode is used as the encryption method and the decryption method of the update package. By using the OFB mode as compared with the conventional CBC mode, it is possible to perform preparation for encryption and decryption. As a result, when the OTA master 4 downloads the update package from the OTA center 2, it is possible to enjoy the advantages of the OFB mode and to appropriately increase the throughput.

Third Embodiment

The third embodiment will be described with reference to FIGS. 27 to 33. In the third embodiment, the Hypertext Transfer Protocol (hereinafter, referred to as HTTP) is used as a communication protocol between the CDN 8 and the OTA master 4, a range request is transmitted to the CDN 8, and an update package is downloaded in a streaming method, thereby suppressing a distribution cost as compared with a case where Hypertext Transfer Protocol Secure (hereinafter, referred to as HTTPS) is used. Depending on a CDN vendor, a distribution fee of CDN8 may be differentiated between a case where HTTP is used and a case where HTTPS is used as a communication protocol to CDN8. When HTTPS is used, the CDN 8 is required to perform a handshake process, an encryption key exchange process, or a cryptographic operation process defined in transport layer security (hereinafter, referred to as TLS), and a processing load of the CPU of the CDN 8 increases. Therefore, a distribution fee of HTTPS is a fee table that is about 30% higher than that of HTTP. Therefore, the distribution cost is suppressed by using HTTP for downloading the update package. In the third embodiment, HTTPS is not used when the update package is distributed from the CDN 8 to the vehicle-side system 3.

In this case, after establishing TLS communication between the OTA center 4 and the OTA master 4, the campaign notification transmission section 2f transmits a campaign notification storing an encrypted AES key to the vehicle-side system 3 to be reprogrammed. When the common key acquisition section 4a acquires a campaign notification as the campaign notification transmitted from the OTA center 2 is received by the OTA master 4 after the TLS communication is established, the common key acquisition section 4a acquires an AES key from the acquired campaign notification. The encryption package acquisition section 4c transmits a range request to the CDN 8 to designate a data range to be downloaded, and downloads and acquires the encrypted update package from the CDN 8 by a streaming method. The installation processing section 4f transfers the decrypted update package to the target ECU 5 by a streaming method, and installs the update package in the target ECU 5.

In the present embodiment, it is described that the OTA master 4 acquires the encrypted update package from the CDN 8 by the streaming method, but the encrypted update package may be acquired from the CDN 8 by the storage method. In the streaming method, since the header information is included at the time of communication, it is possible to further suppress the distribution cost by using HTTP.

Next, the operation of the above-described configuration will be described with reference to FIGS. 28 to 33.

Figure 28:
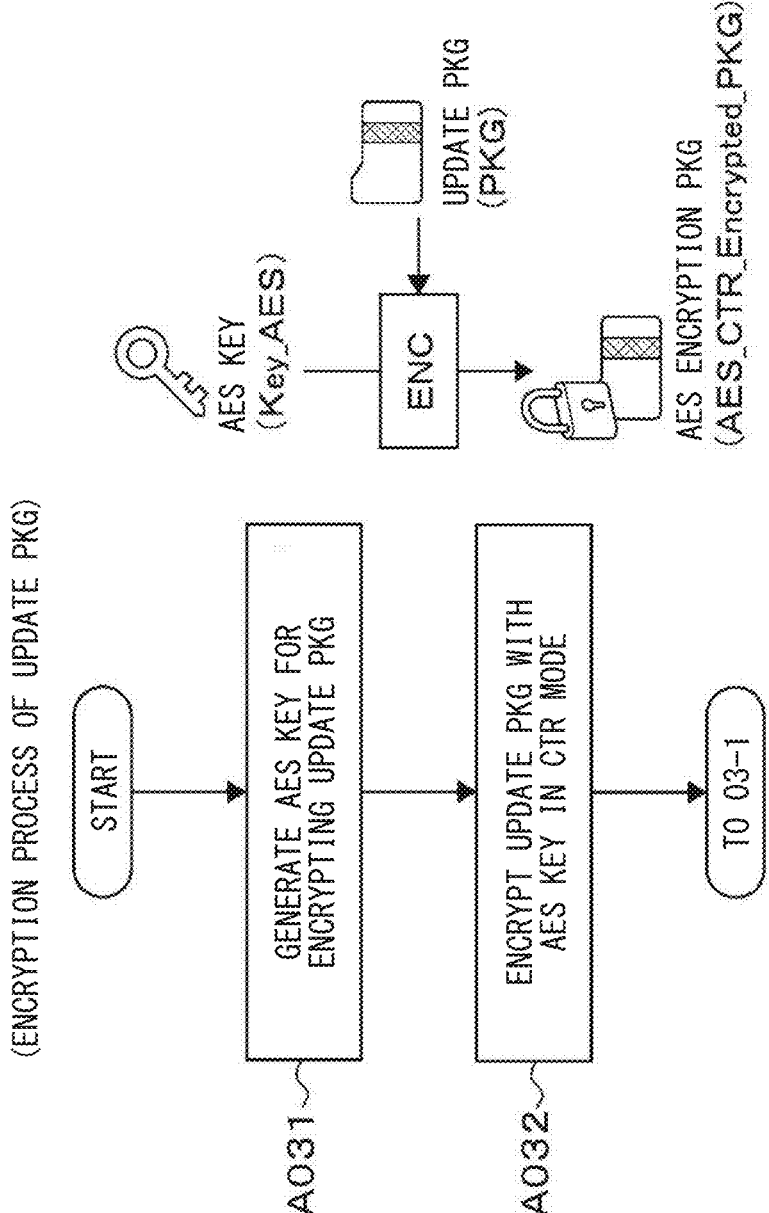
FIG. 28 is a diagram illustrating a process by the OTA center.
Figure 29:
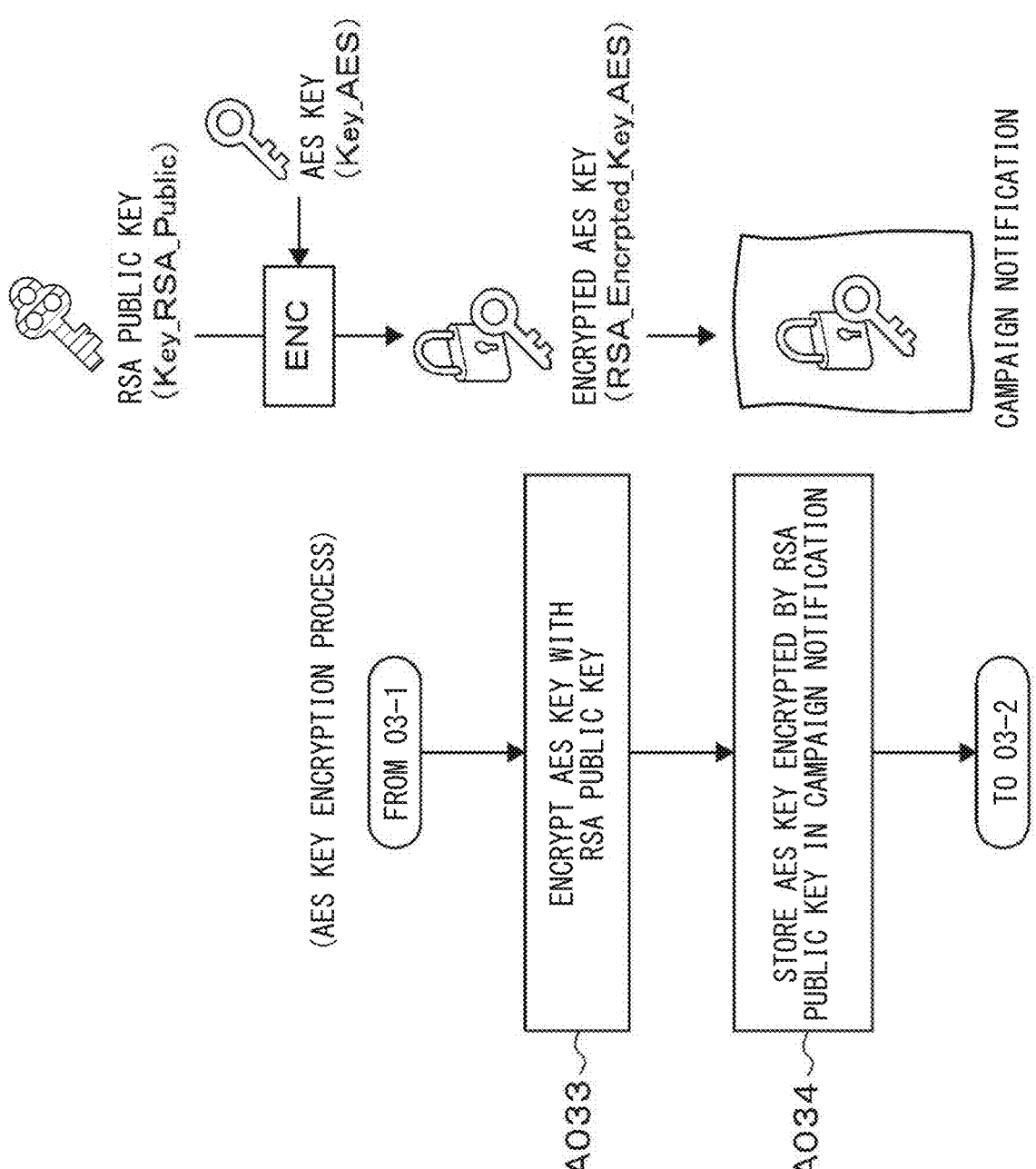
FIG. 29 is a diagram illustrating a process by the OTA center.
Figure 30:
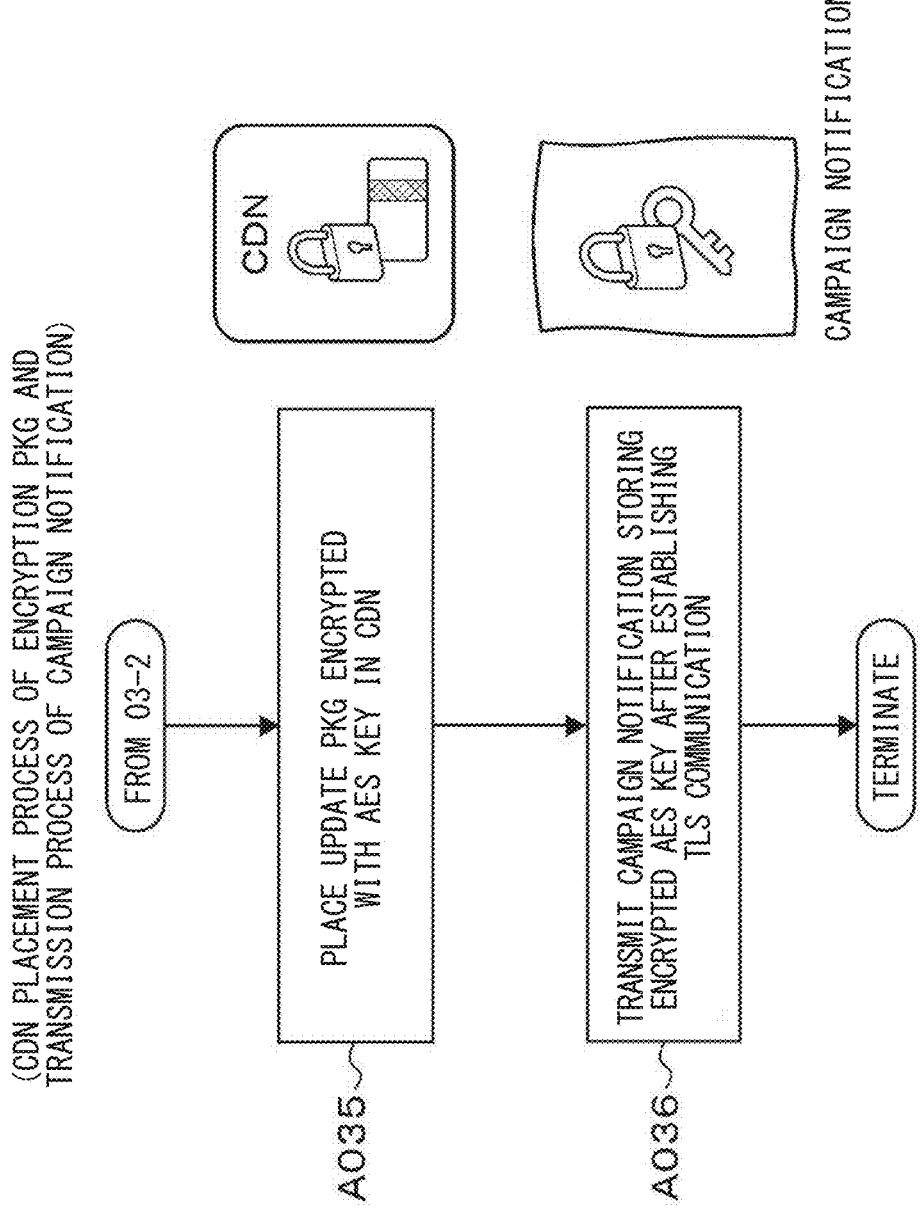
FIG. 30 is a diagram illustrating a process by the OTA center.

(3-1) Process by OTA Center 2 (See FIGS. 28 to 30)

The OTA center 2 generates an AES key for encrypting the update package (A031). The OTA center 2 encrypts the update package with the generated AES key in the CTR mode (A032). The OTA center 2 encrypts the AES key with the RSA public key (A033). The OTA center 2 stores the AES key encrypted with the RSA public key in the campaign notification (A034). The OTA center 2 places the update package encrypted with the AES key in the CDN 8 (A035). After establishing TLS communication between the OTA center 4 and the OTA master 4, the OTA center 2 transmits a campaign notification storing an encrypted AES key to the vehicle-side system 3 to be reprogrammed (A036).

Figure 31:
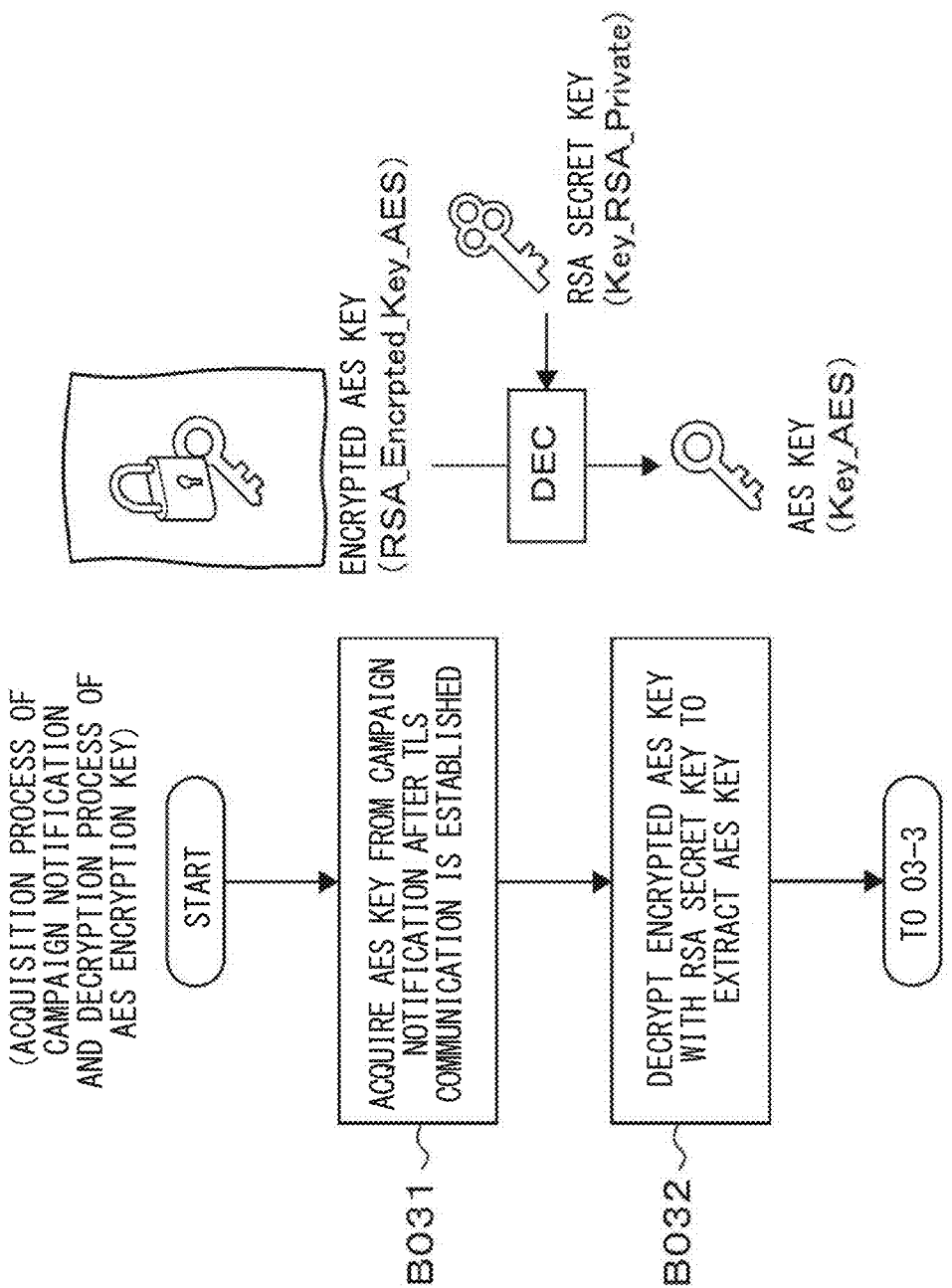
FIG. 31 is a diagram illustrating a process by the OTA master.
Figure 32:
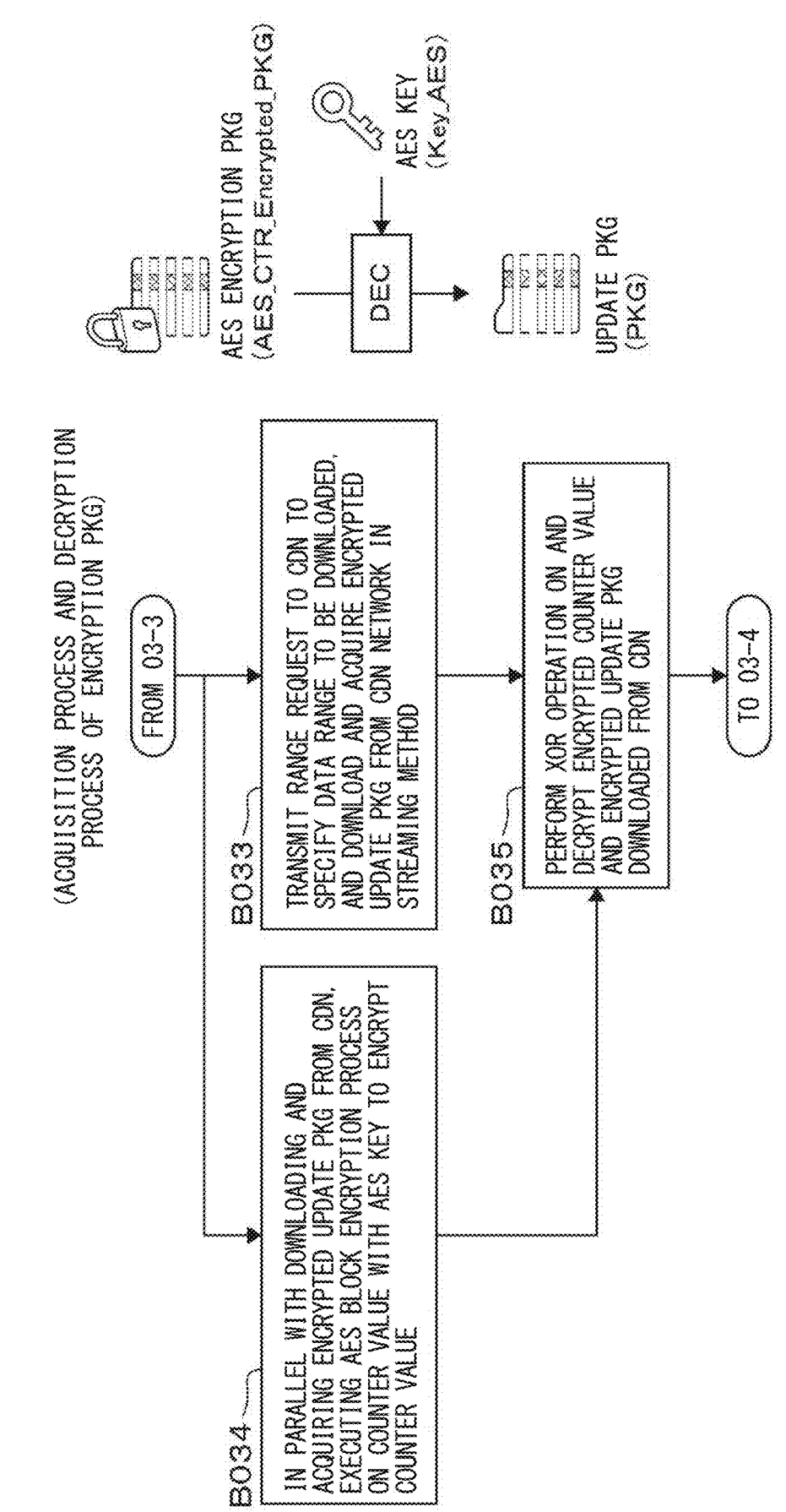
FIG. 32 is a diagram illustrating a process by the OTA master.
Figure 33:
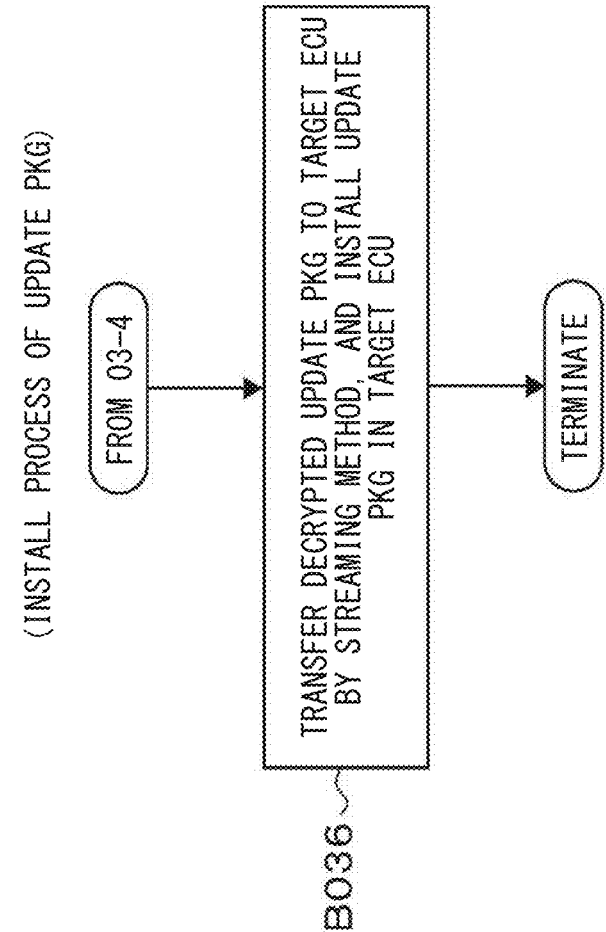
FIG. 33 is a diagram illustrating a process by the OTA master.
Figure 34:
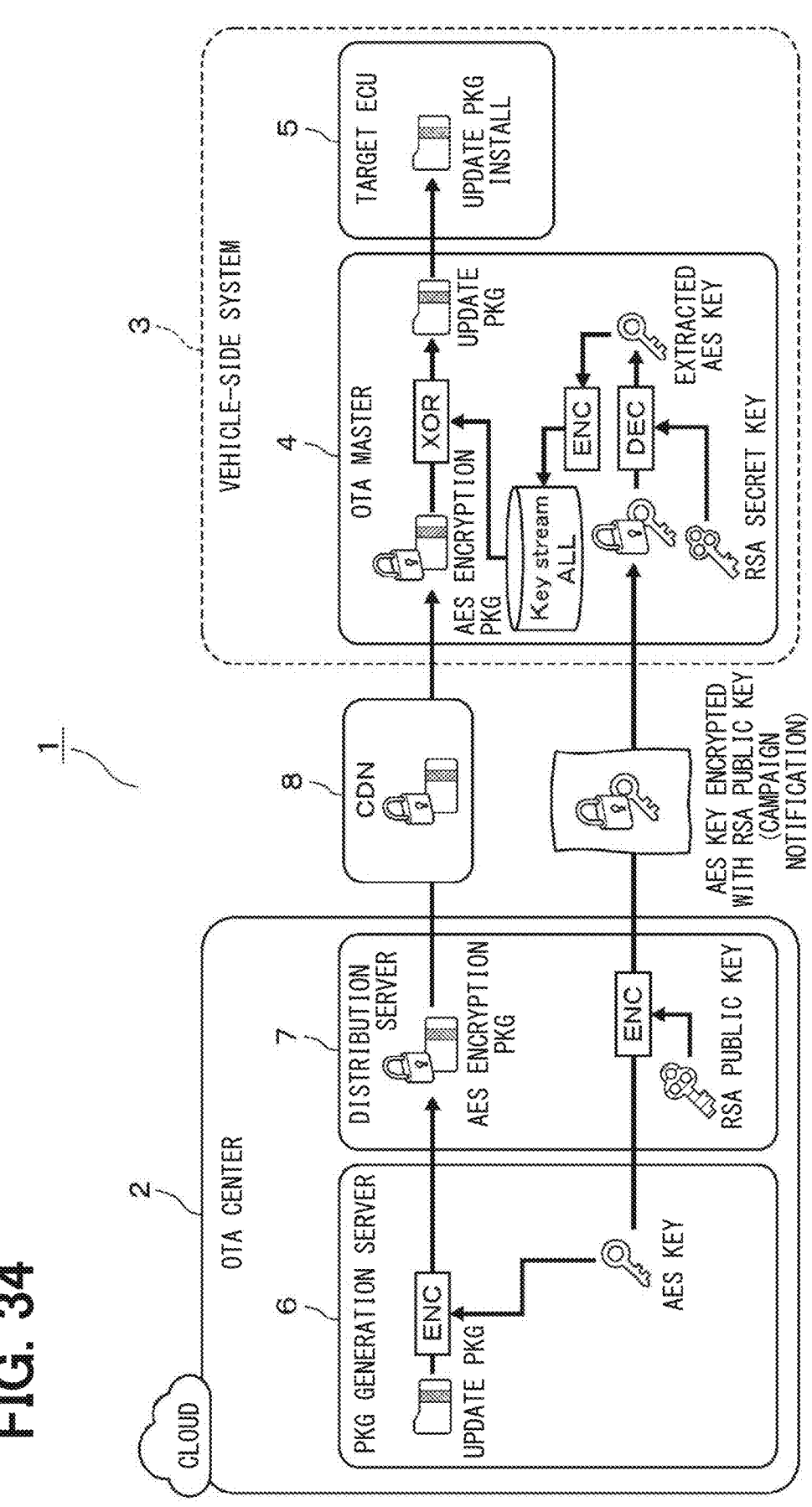
FIG. 34 is a diagram illustrating a flow of a process in the entire system according to the fourth embodiment.

(3-2) Process by OTA Master 4 (See FIGS. 31 to 33)

When the OTA master 4 acquires the campaign notification as the campaign notification transmitted from the OTA center 2 is received by the OTA master 4 after the TLS communication is established, the OTA master 4 acquires an AES key from the acquired campaign notification (B031). The OTA master 4 decrypts the encrypted AES key with the RSA secret key to extract the AES key (B032). The OTA master 4 transmits a range request to the CDN 8 to designate a data range to be downloaded, and downloads and acquires an encrypted update package from the CDN 8 by a streaming method (B033). That is, the OTA master 4 designates the data range to be downloaded, thereby downloading and acquiring the update package from the CDN 8 by the division streaming method.

At this time, in parallel with the encryption package acquisition section 4c downloading and acquiring the encrypted update package from the CDN 8, the OTA master 4 executes an AES block encryption process of the counter value with the AES key to encrypt the counter value (B034). The OTA master 4 performs an XOR operation on and decrypts the encrypted counter value and the encrypted update package downloaded from the CDN 8 (B035). The OTA master 4 transfers the decrypted update package to the target ECU 5 by a streaming method, and installs the update package in the target ECU 5 (B036).

As described above, according to the third embodiment, the following operational effects can be obtained.

HTTP is used as a communication protocol between CDN 8 and the OTA master 4, and the OTA master 4 transmits a range request to the CDN 8 to download an update package from the CDN 8 by a streaming method. As a result, it is possible to appropriately suppress the distribution cost when the OTA master 4 downloads the update package from the OTA center 2 as compared with the conventional case where HTTPS is used as the communication protocol.

Fourth Embodiment

The fourth embodiment will be described with reference to FIGS. 34 to 38. In the fourth embodiment, the calculation of all the key streams is executed in the background in advance before the download acceptance from the user is obtained, thereby speeding up the decryption process at the time of downloading the update package.

Figure 35:
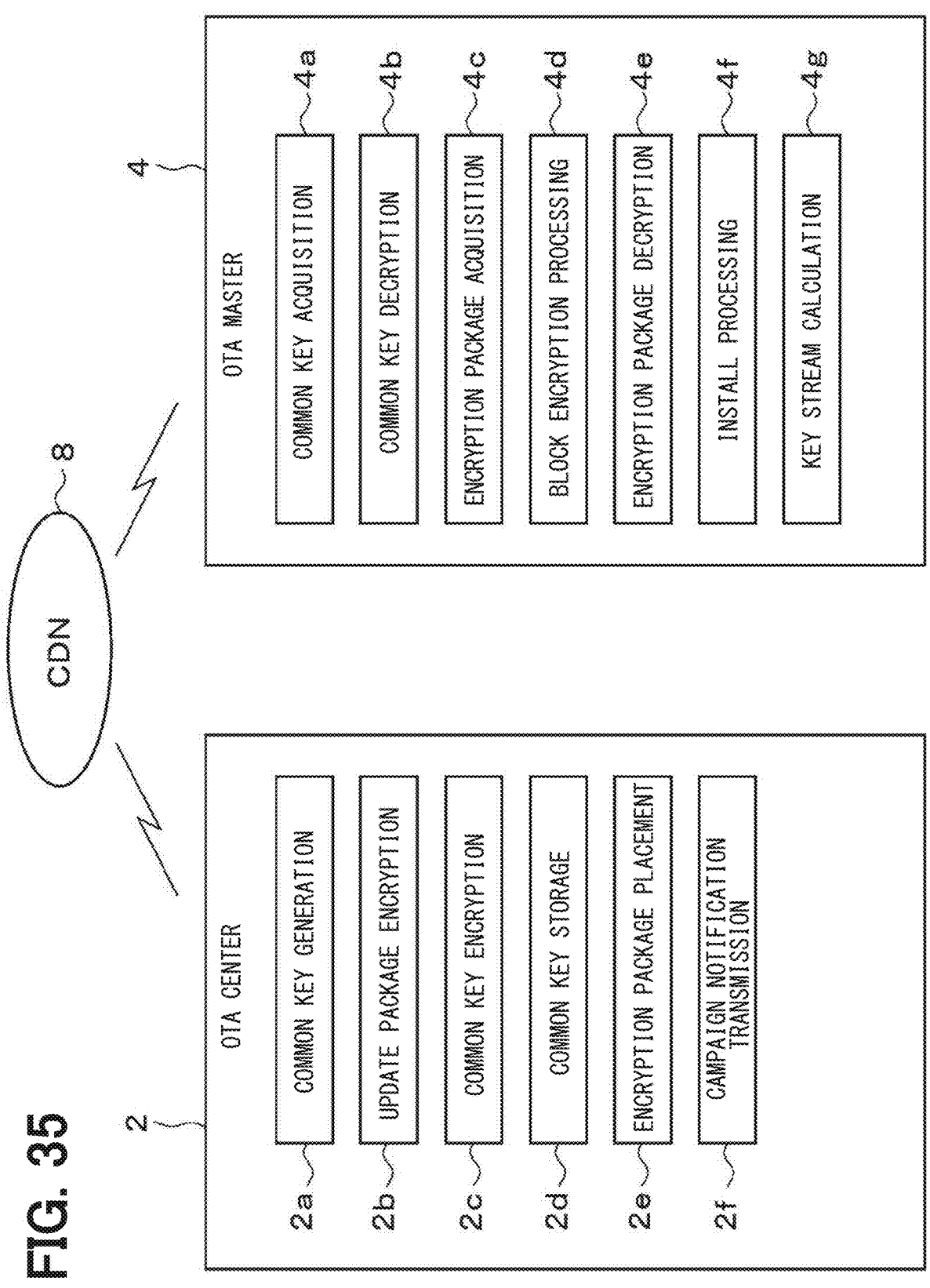
FIG. 35 is a functional block diagram of the OTA center and the OTA master.

In this case, as illustrated in FIG. 35, the OTA master 4 includes a key stream calculation section 4g in addition to the common key acquisition section 4a, the common key decryption section 4b, the encryption package acquisition section 4c, the block encryption processing section 4d, the encryption package decryption section 4e, and the installation processing section 4f. The key stream calculation section 4g executes calculation of all the key streams in the background in advance before the download acceptance from the user is obtained. The encryption package acquisition section 4c downloads and acquires the encrypted update package from the CDN 8 on condition that the download acceptance is obtained from the user. The encryption package decryption section 4e performs an XOR operation on and decrypts the calculated key stream and the encrypted update package downloaded from the CDN 8.

Next, the operation of the above-described configuration will be described with reference to FIGS. 36 to 38.

(4-1) Process by OTA Center 2

The process by the OTA center 2 is similar to the process (FIGS. 9 to 11) of the OTA center 2 described in the first embodiment.

Figure 36:
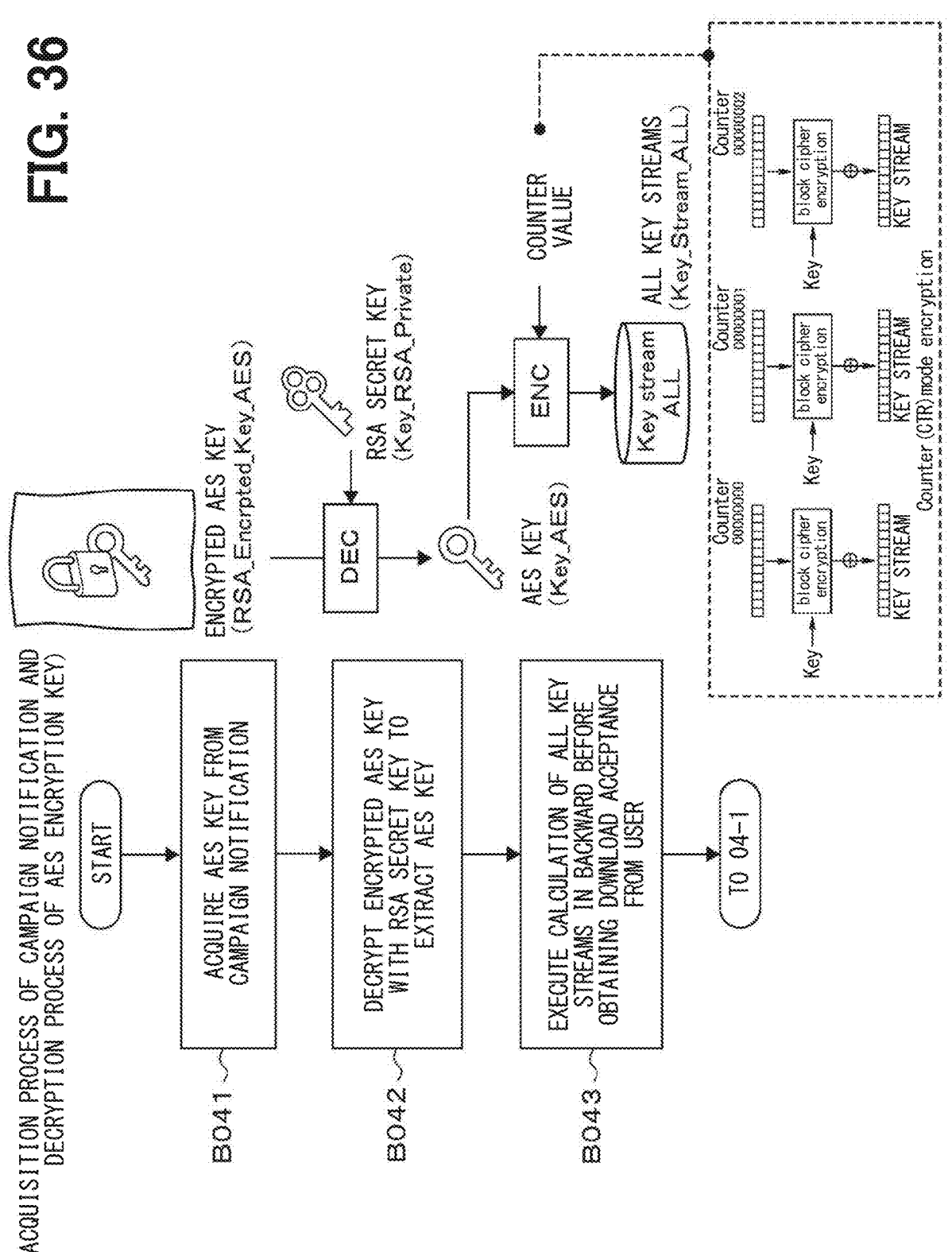
FIG. 36 is a diagram illustrating a process by the OTA master.
Figure 38:
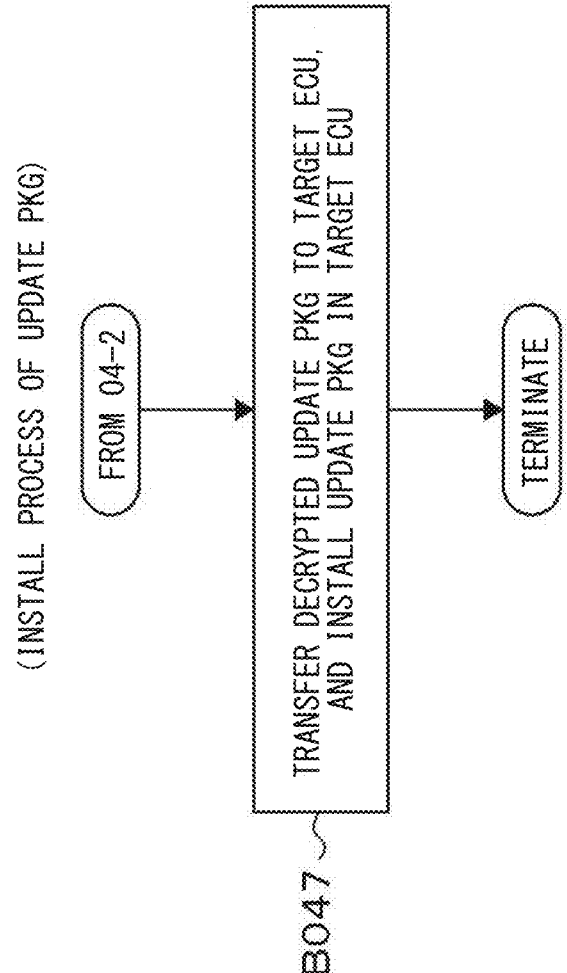
FIG. 38 is a diagram illustrating a process by the OTA master.

(4-2) Process by OTA Master 4 (See FIGS. 36 to 38)

When the OTA master 4 acquires a campaign notification as the campaign notification transmitted from the OTA center 2 is received by the OTA master 4, the OTA master 4 acquires an AES key from the acquired campaign notification (B041). The OTA master 4 decrypts the encrypted AES key with the RSA secret key to extract the AES key (B042). The OTA master 4 executes calculation of all key streams in the background in advance before obtaining download acceptance from the user (B043). Identification information is assigned to each key stream, and the order of application to the encrypted update package is indicated.

The OTA master 4 distributes the campaign notification to the vehicle-side system 3 or a mobile information terminal such as a smartphone owned by the user to display a download acceptance screen on a human machine interface (HMI) (B044). The OTA master 4 downloads and acquires the encrypted update package from the CDN 8 on condition that the download acceptance is obtained from the user (B045). The OTA master 4 performs an XOR operation on and decrypts the pre-calculated key stream and the encrypted update package downloaded from the CDN 8 (B046). The OTA master 4 transfers the decrypted update package to the target ECU 5 and installs the update package in the target ECU 5 (B047).

As described above, according to the fourth embodiment, the following operational effects can be obtained.

All key streams are calculated in the background in advance before the download acceptance from the user is obtained. As a result, the decryption process of the update package in the OTA master 4 can be speeded up, and the throughput when the OTA master 4 downloads the update package from the OTA center 2 can be increased.

Fifth Embodiment

The fifth embodiment will be described with reference to FIGS. 39 to 42. In the fourth embodiment, all the key streams are calculated in the background in advance before the download acceptance from the user is obtained, but in the fifth embodiment, some key streams are calculated in the background in advance before the download acceptance from the user is obtained. Some key stream to be calculated is determined in consideration of the memory capacity of the cache memory of the CPU and the throughput of the AES cryptographic operation, and has a size that can be stored in the cache memory.

In this case, the key stream calculation section 4g executes calculation of some of the key streams in the background in advance before the download acceptance from the user is obtained. The key stream calculation section 4g generates a key stream and adds the key stream to the cache memory in parallel with the encryption package acquisition section 4c downloading and acquiring the encrypted update package from the CDN 8.

Next, the operation of the above-described configuration will be described with reference to FIGS. 39 to 42.

(5-1) Process by OTA Center 2

The process by the OTA center 2 is similar to the process (FIGS. 9 to 11) of the OTA center 2 described in the first embodiment.

Figure 40:
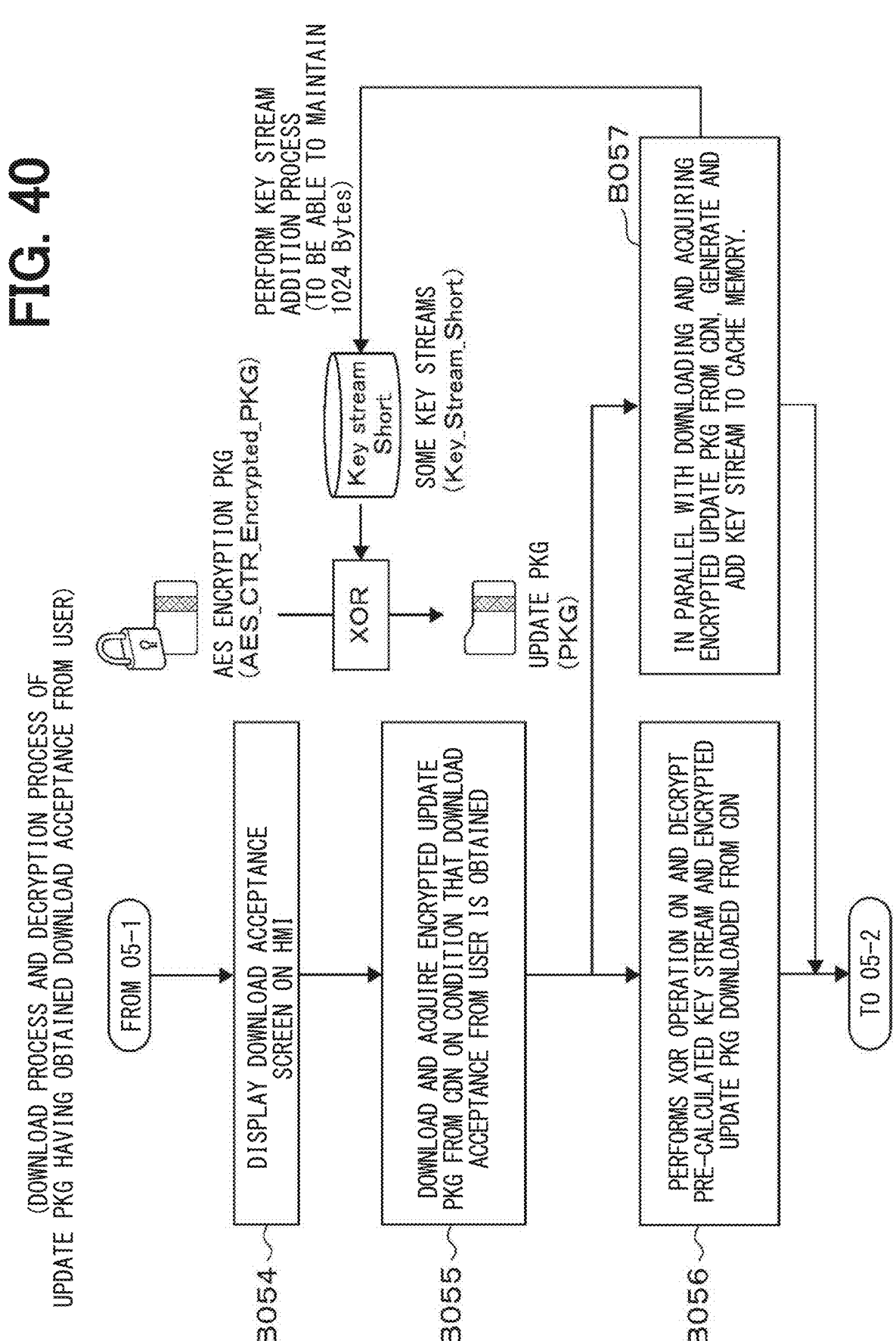
FIG. 40 is a diagram illustrating a process by the OTA master.
Figure 41:
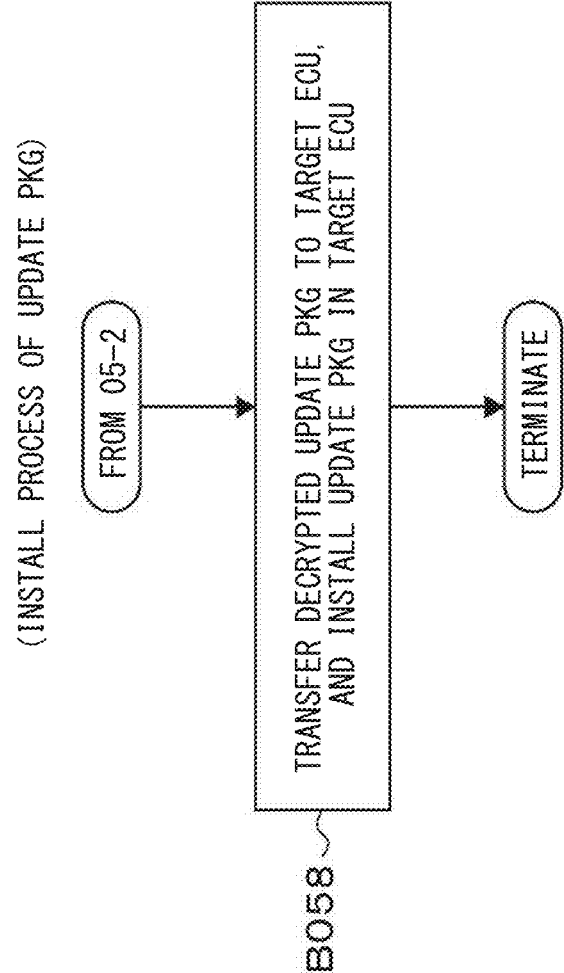
FIG. 41 is a diagram illustrating a process by the OTA master.

(5-2) Process by OTA Master 4 (See FIGS. 39 to 41)

When the OTA master 4 acquires a campaign notification as the campaign notification transmitted from the OTA center 2 is received by the OTA master 4, the OTA master 4 acquires an AES key from the acquired campaign notification (B051). The OTA master 4 decrypts the encrypted AES key with the RSA secret key to extract the AES key (B052). The OTA master 4 executes calculation of some key streams in the background in advance before download acceptance from the user is obtained (B053).

The OTA master 4 distributes the campaign notification to the vehicle-side system 3 or a mobile information terminal such as a smartphone owned by the user to display a download acceptance screen on the HMI (B054). The OTA master 4 downloads and acquires the encrypted update package from the CDN 8 on condition that the download acceptance is obtained from the user (B055). The OTA master 4 performs an XOR operation on and decrypts the pre-calculated key stream and the encrypted update package downloaded from the CDN 8 (B056).

Figure 42:
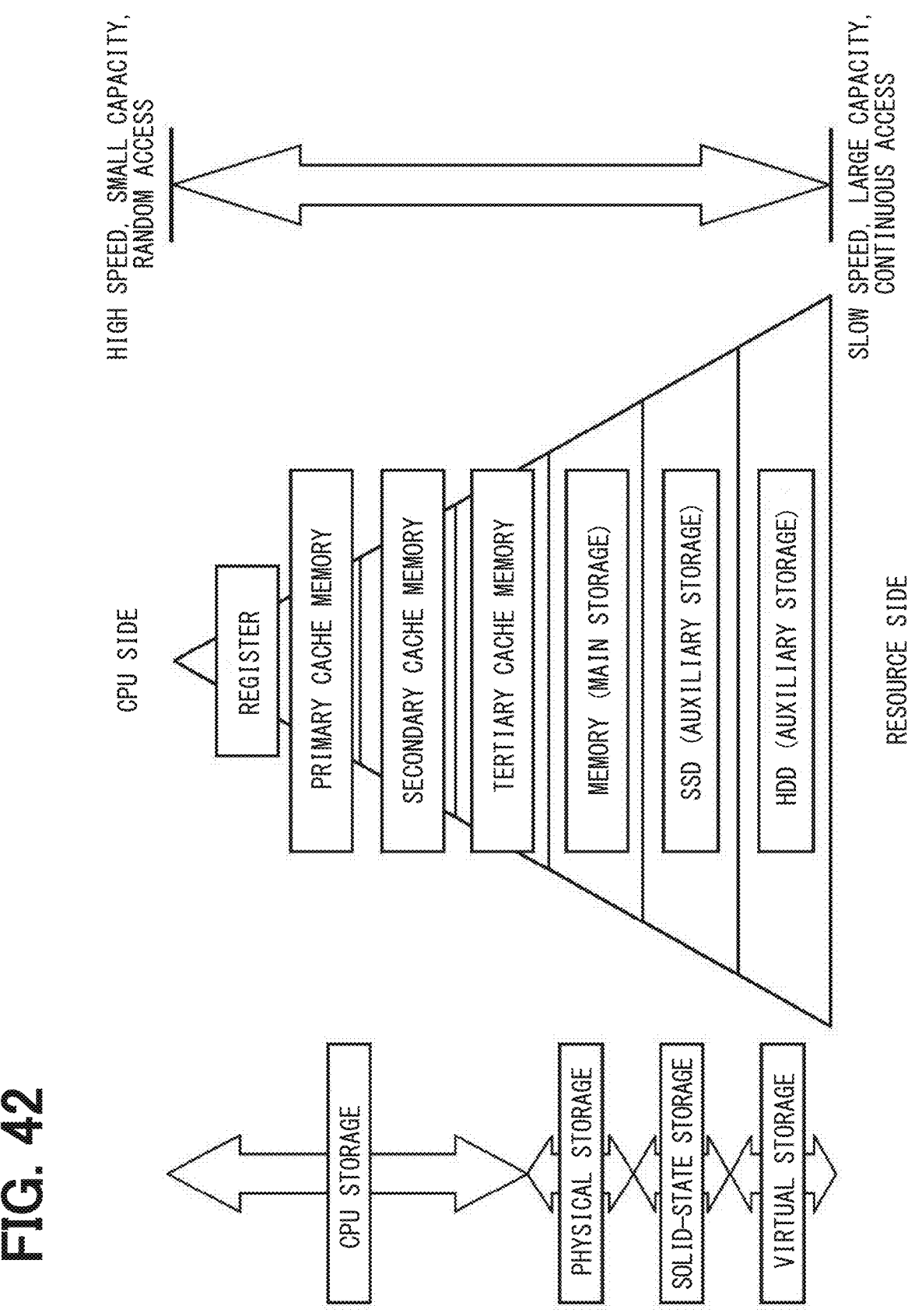
FIG. 42 is a diagram illustrating a relationship between a memory capacity and an access speed.
Figure 43:
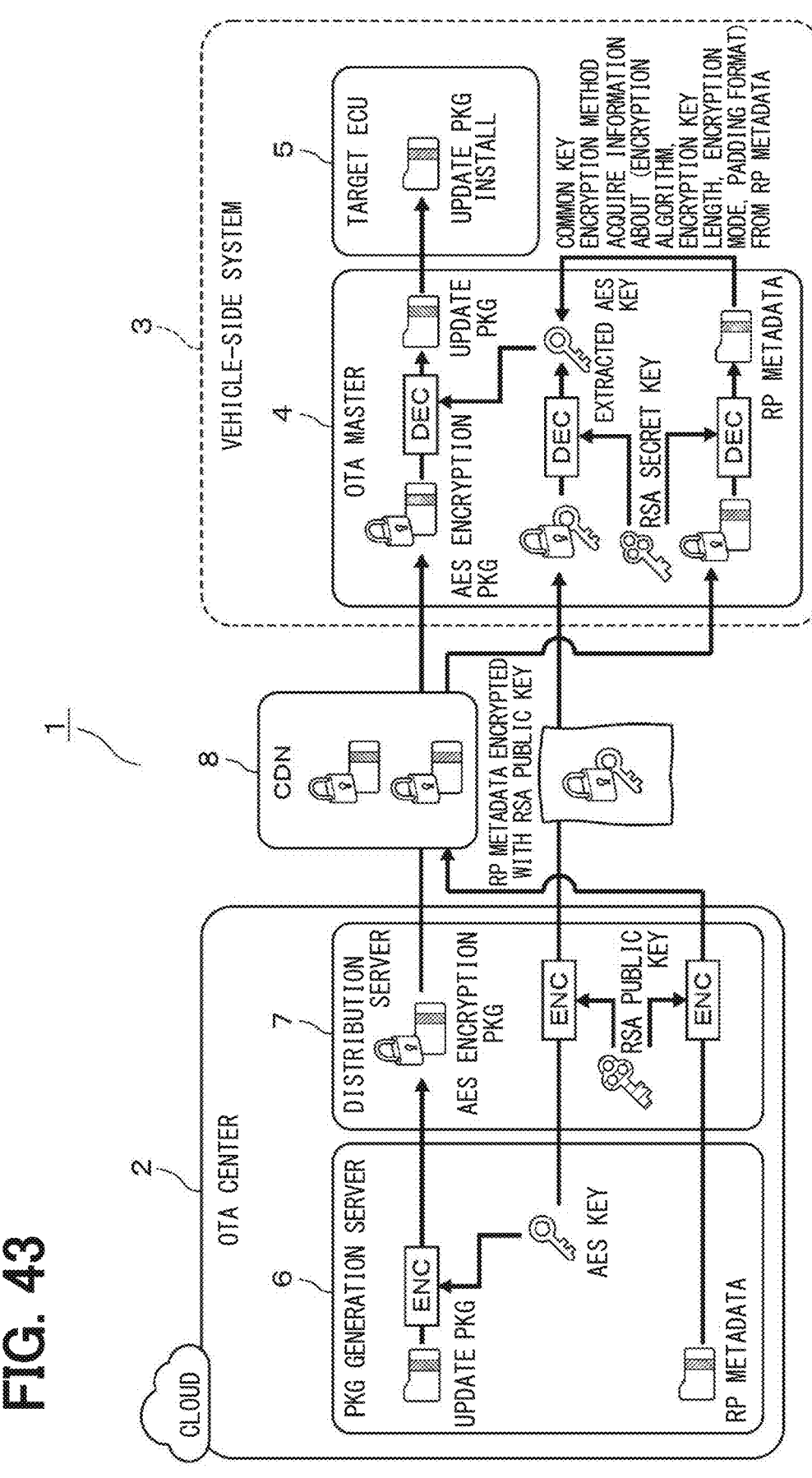
FIG. 43 is a diagram illustrating a flow of a process in the entire system according to the sixth embodiment.

At this time, in parallel with downloading and acquiring the encrypted update package from the CDN 8, the OTA master 4 generates a key stream and adds the key stream to the cache memory (B057), and calculates the remaining key stream. The OTA master 4 transfers the decrypted update package to the target ECU 5 and installs the update package in the target ECU 5 (B058). The relationship between the memory capacity and the access speed is as illustrated in FIG. 42, and the size of the cache memory may be determined according to the requested access speed.

As described above, according to the fifth embodiment, the following operational effects can be obtained.

Some key streams are calculated in the background in advance before the download acceptance from the user is obtained. As a result, the decryption process of the update package in the OTA master 4 can be speeded up while storing the memory usage amount of the OTA master 4, and the throughput when the OTA master 4 downloads the update package from the OTA center 2 can be increased.

Sixth Embodiment

The sixth embodiment will be described with reference to FIGS. 43 to 54. In the sixth embodiment, an encryption method is included in reprogramming policy metadata (hereinafter, referred to as RP metadata) or the like and transmitted from the OTA center 2 to the OTA master 4, so that the OTA master 4 identifies the encryption method. The encryption method transmitted from the OTA center 2 to the OTA master 4 includes an encryption algorithm, an encryption key length, an encryption mode, a message authentication code (hereinafter, referred to as an MAC) algorithm, and the like.

The RP metadata is data including configuration information about the update package, that is, information indicating a configuration type of the update package, and for preventing an error in distribution of the update package by checking the data content by the OTA master 4. By configuring the RP metadata to have a three-layer structure of distribution, master, and target, even in a case where a transfer method, a type of platform, a type of update package, and the like increase, it is possible to flexibly define and cope with them, and to perform reprogramming of the target ECU 5. The OTA master 4 may identify the encryption method by including the encryption method in download metadata (hereinafter, referred to as DL metadata) or the like and transmitting the encryption method from the OTA center 2 to the OTA master 4. The DL metadata is data including information for downloading an update package for each of the plurality of target ECUs 5, and defining content to be grasped by the OTA master 4.

Figure 44:
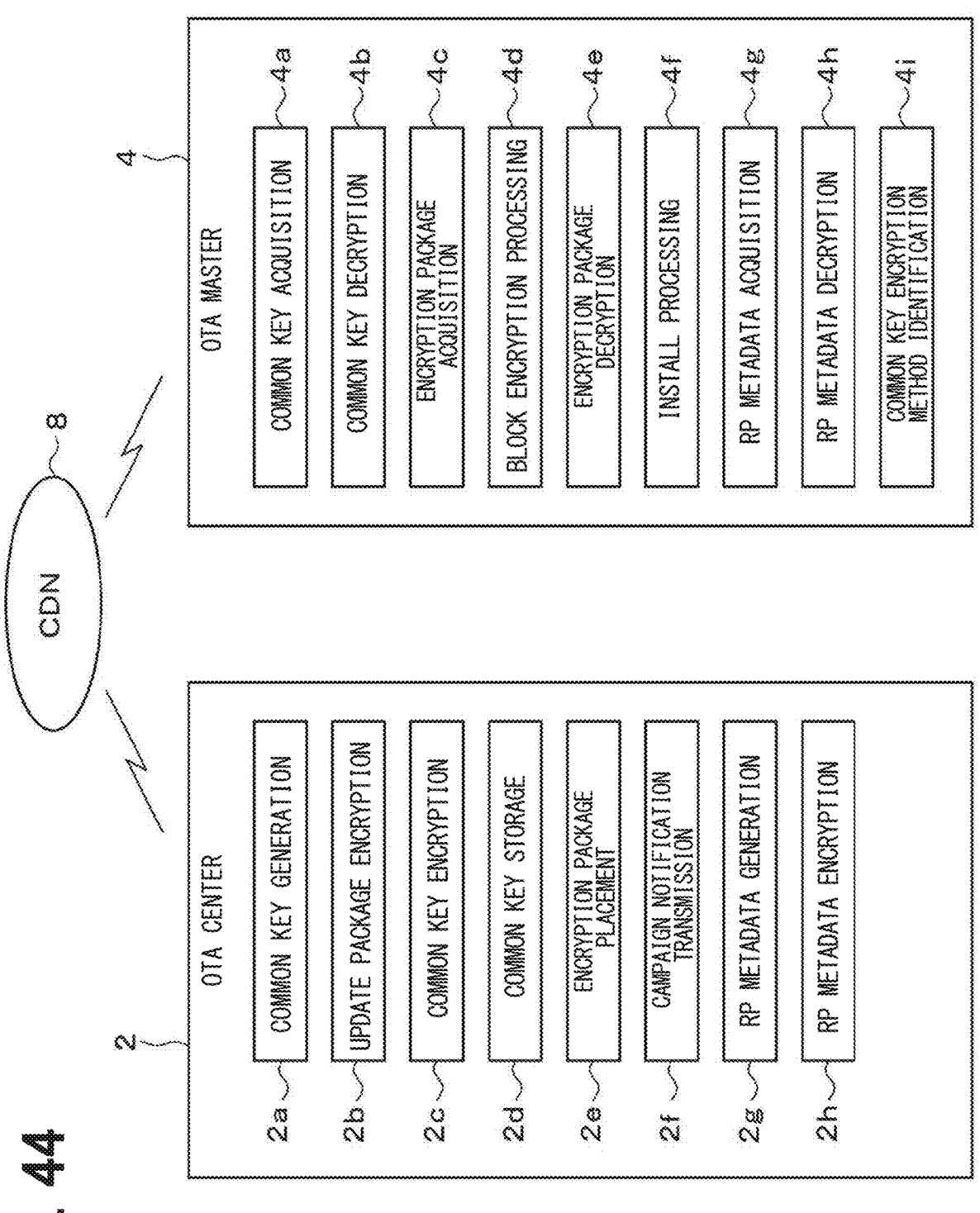
FIG. 44 is a functional block diagram of the OTA center and the OTA master.

As illustrated in FIG. 44, the OTA center 2 includes a RP metadata generation section 2g and a RP metadata encryption section 2h in addition to the common key generation section 2a, the update package encryption section 2b, the common key encryption section 2c, the common key storage section 2d, the encryption package placement section 2e, and the campaign notification transmission section 2f. The RP metadata generation section 2g generates RP metadata including a common key encryption method. The RP metadata encryption section 2h encrypts the RP metadata with the RSA public key.

The OTA master 4 includes an RP metadata acquisition section 4h, an RP metadata decryption section 4i, and a common key encryption method identification section 4j in addition to the common key acquisition section 4a, the common key decryption section 4b, the encryption package acquisition section 4c, the block encryption processing section 4d, the encryption package decryption section 4e, and the installation processing section 4f. The RP metadata acquisition section 4h downloads and acquires the encrypted RP metadata from the CDN 8. The RP metadata decryption section 4i decrypts the encrypted RP metadata with the RSA secret key to extract the RP metadata. The common key encryption method identification section 4j interprets the content of the RP metadata to identify the common key encryption method.

The flow from the CDN 8 to the distribution of the update package to the OTA center 2 is as follows. A campaign notification is transmitted from the OTA center 2 to the OTA master 4 or a mobile information terminal owned by the user. Thereafter, when the OTA master 4 accesses the CDN 8, the RP metadata and the DL metadata are transmitted from the CDN 8 to the OTA master 4, and the update package is distributed from the CDN 8 to the OTA center 2.

Figure 45:
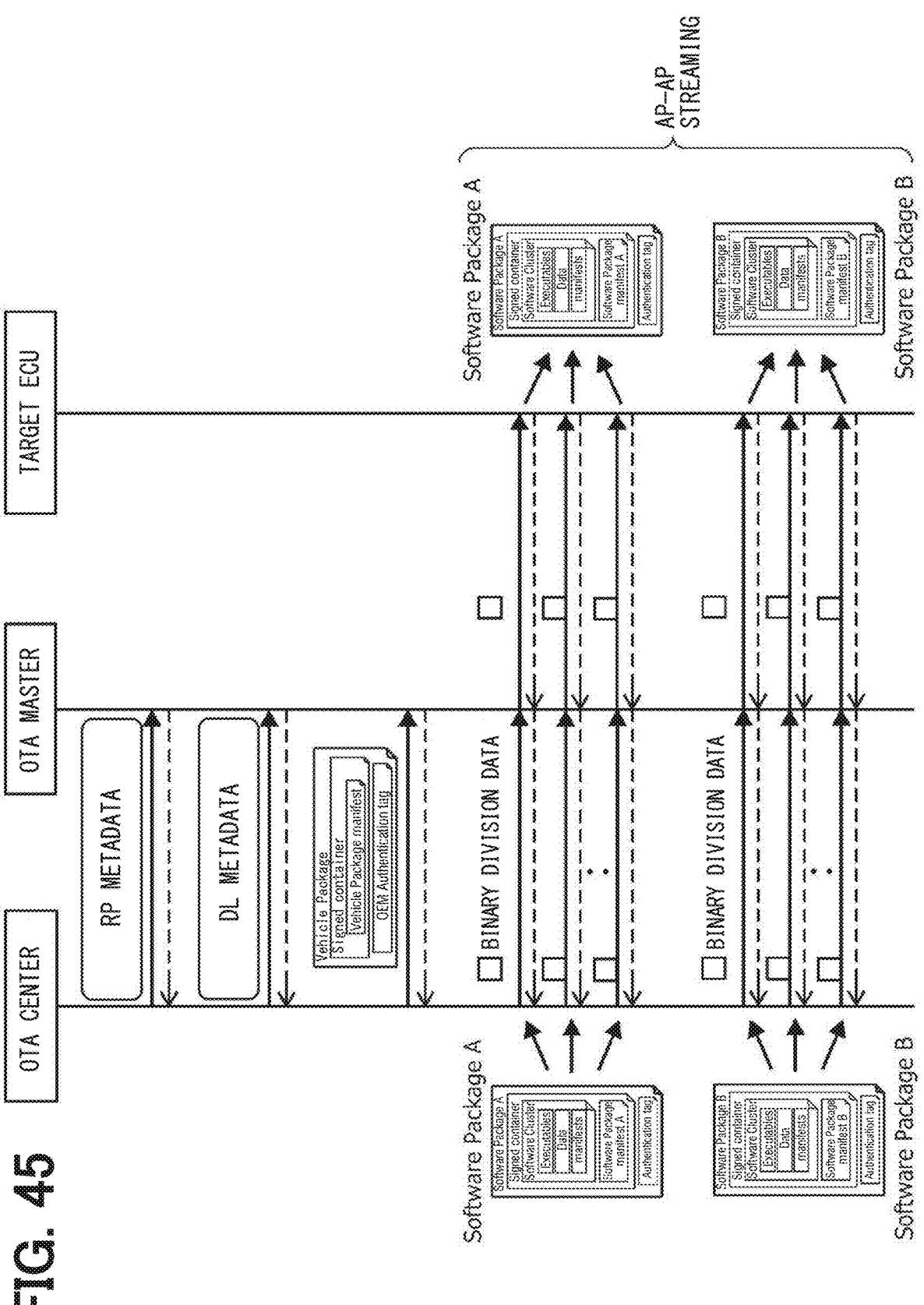
FIG. 45 is a diagram illustrating a mode in which RP metadata is transmitted.
Figure 48:
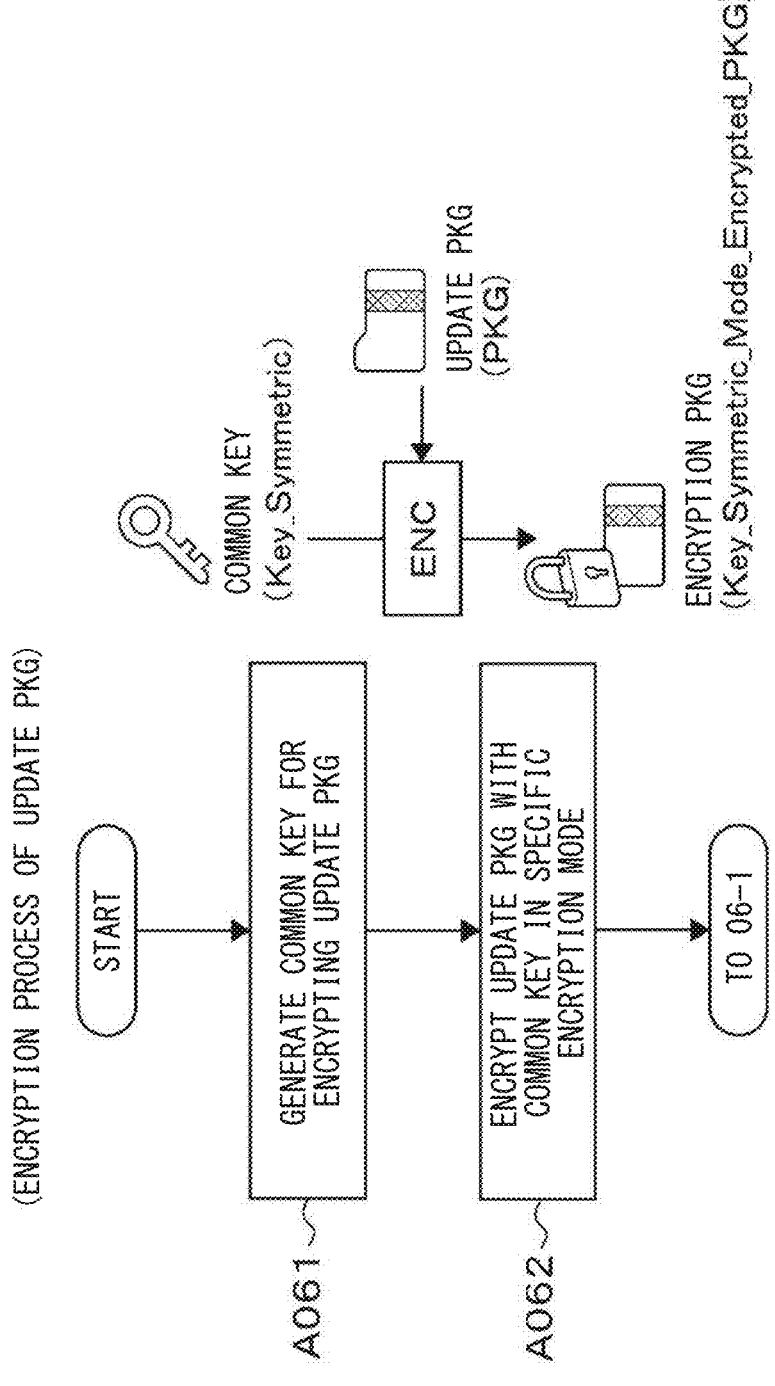
FIG. 48 is a diagram illustrating a process by the OTA center.
Figure 49:
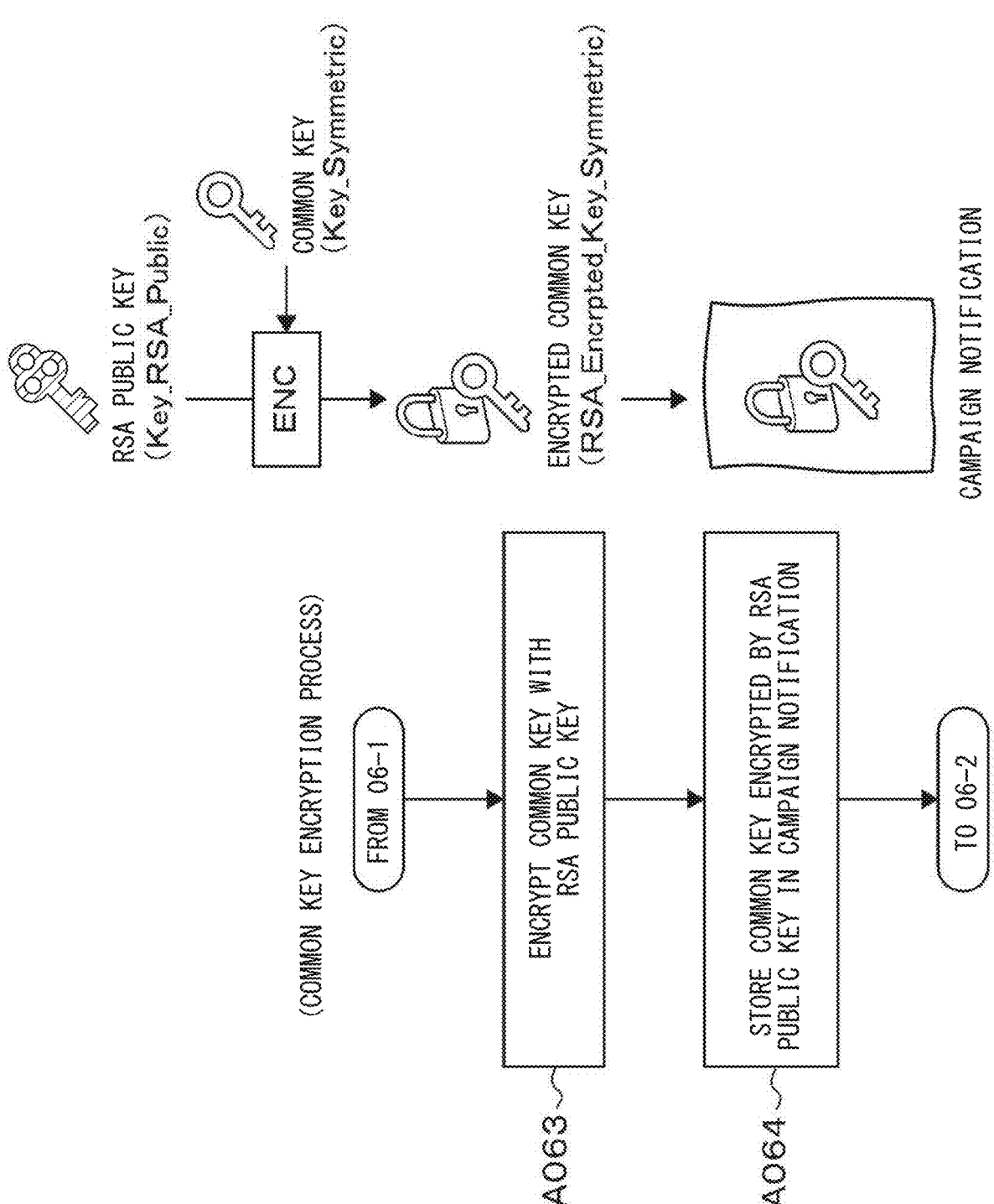
FIG. 49 is a diagram illustrating a process by the OTA center.
Figure 50:
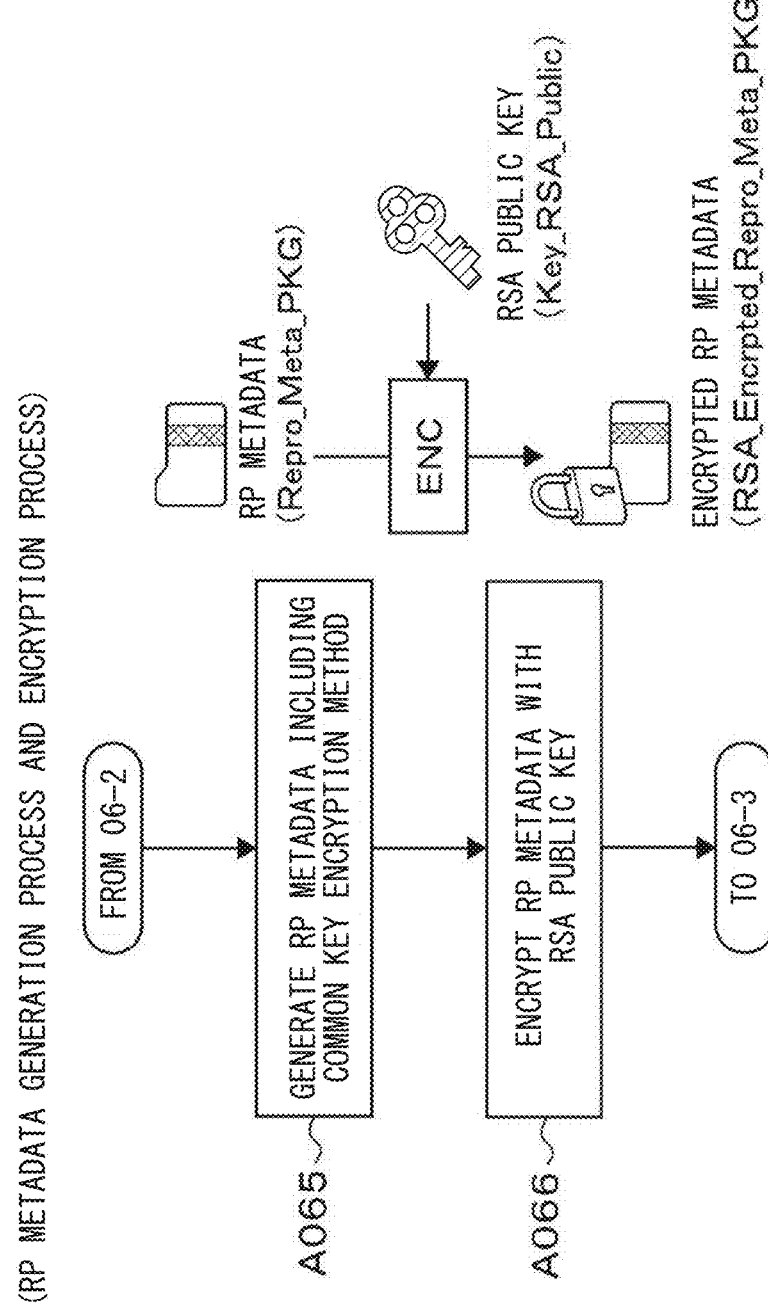
FIG. 50 is a diagram illustrating a process by the OTA center.

As illustrated in FIG. 45, the RP metadata and the DL metadata are transmitted from the OTA center 2 to the OTA master 4 prior to download of the update package. As illustrated in FIGS. 46 to 47, the RP metadata includes information about an RP metadata version, a distribution layer, a master layer, and a target layer. Each piece of information is as follows.

(a) RP Metadata Version

This is a version of the RP metadata, and is, for example, version information such as "1.0.0" or "2.0.0".

(b) Distribution Layer (b-1) Communication Protocol

This is a protocol used for communication with the OTA center 2, and is information indicating, for example, Uptane (registered trademark), Open Mobile Alliance-Device Management (OMA-DM), or the like.

(b-2) Communication Means

This is a distribution route of the update package and information indicating a cellular, a smartphone, a USB memory, or the like that indicates the OTA master 4.

(c) Master Layer

This is information about the OTA master 4.

(c-1) PF

This is information indicating that the platform (PF) of the OTA master 4 is, for example, an AUTOSAR Adaptive Platform (AP), an AUTOSAR Classic Platform (CP), Automotive Grade Linux (AGL), or Android (registered trademark). For a package structure for distributing an update package according to a platform of an ECU, a data requirement applicable to a classic platform (CP) operating on a static OS of a standardization organization AUTOSAR is defined in a specification of the Associations and General Incorporated Foundations, JASPAR. In addition, in AUTOSAR, data requirements applicable to a new type of adaptive platform (AP) operating on a dynamic OS are specified. AGL is an in-vehicle Linux (registered trademark), and Android is an Android Automotive OS. The AP and the CP indicate software platforms. The software platform is also referred to as a software architecture. The AP and the CP use different operating systems and different development languages. The structure of the receivable update package is different between the ECU that operates according to the CP specification and the ECU that operates according to the AP specification. The difference in structure between these update packages is mainly caused by a difference in processing performance of the ECU. In general, since the processing performance of the ECU that operates according to the CP specification is relatively low, specification data and the like included in the update package are also described as binary data, and the data structure is easy even for the ECU with low processing performance to interpret and process. On the other hand, since the processing performance of the ECU that operates according to the AP specification is relatively high, it is possible to install a parser function that analyzes structural character data described in some language and converts the structural character data into a data structure that can be handled by a program, and since an object-oriented data format such as JavaScript Object Notation (JSON) can be used instead of simple binary data in the data structure, a flexible data structure is obtained.

(c-2) Control Method

This is information such as a parameter to be processed according to a parameter set according to a specific format, a script to be processed in a freer description format without a specific format, and the like.

(c-3) Encryption Method

This is information including an encryption algorithm, an encryption key length, an encryption mode, a padding method, an encryption key ID, a signature algorithm, a signature key ID, a signature mode, a hash algorithm, presence or absence of region designation, an offset size, and a protection data size.

(d) Target Layer

This is information about the target ECU 5.

(d-1) PF

This is similar to the master layer.

(d-2) Transfer Method

This is any of a storage method and streaming.

(d-3) Control Method

This is similar to the master layer.

(d-4) Target ID

This is optional.

(d-5) Encryption Method

This is similar to the master layer.

Next, the operation of the above-described configuration will be described with reference to FIGS. 48 to 54.

(6-1) Process by OTA Center 2 (See FIGS. 48 to 51)

The OTA center 2 generates a common key for encrypting the update package (A061). The OTA center 2 encrypts the update package in a specific encryption mode using the generated common key (A062). The OTA center 2 encrypts the common key with the RSA public key (A063). The OTA center 2 stores the common key encrypted with the RSA public key in the campaign notification (A064). The OTA center 2 generates RP metadata including a common key encryption method (A065). The OTA center 2 encrypts the RP metadata with the RSA public key (A066). The OTA center 2 places the update package encrypted with the common key and the RP metadata encrypted with the RSA public key in the CDN 8 (A067). The OTA center 2 transmits a campaign notification storing the encrypted common key to the vehicle-side system 3 to be reprogrammed (A068).

Figure 53:
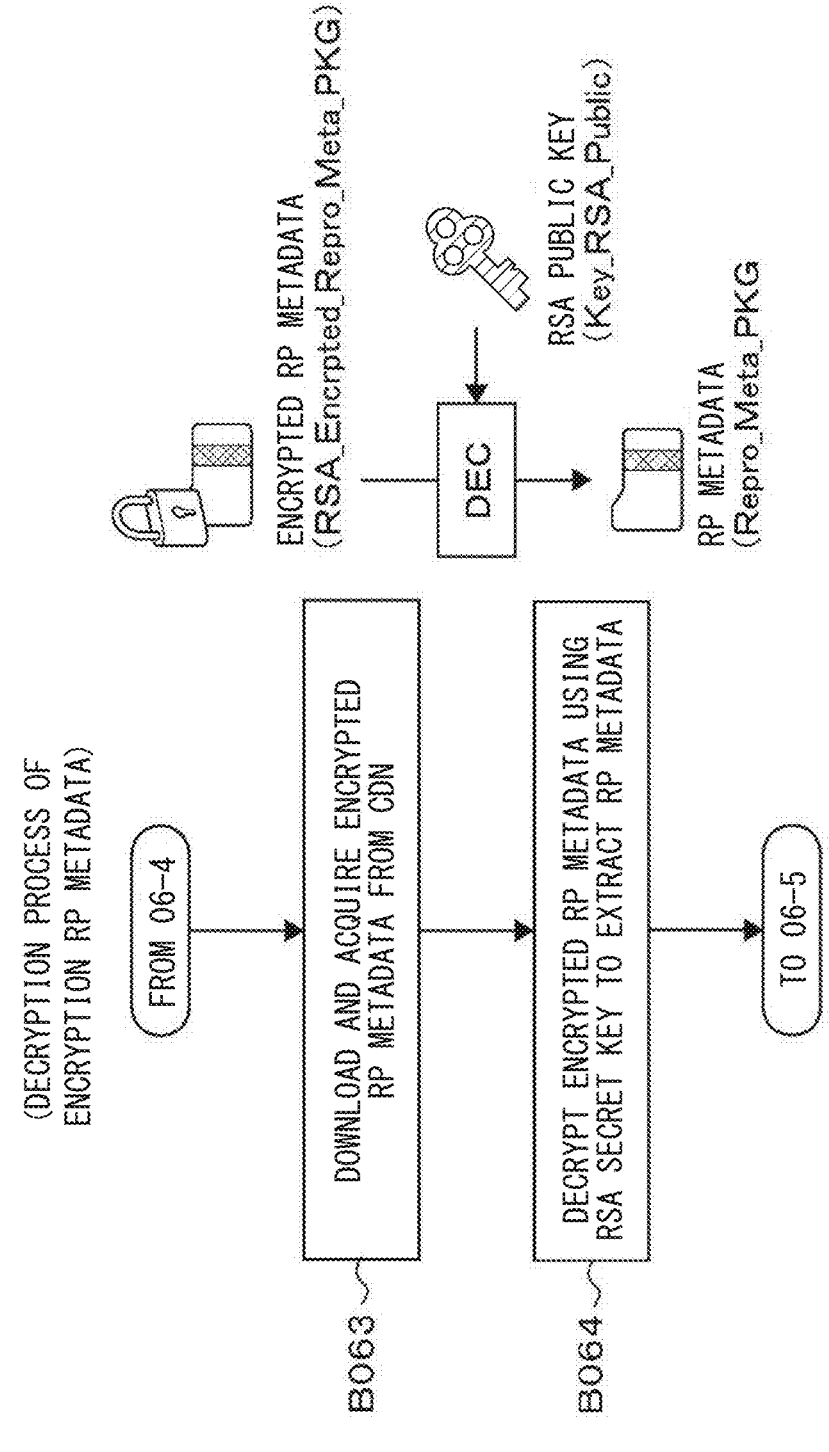
FIG. 53 is a diagram illustrating a process by the OTA master.
Figure 54:
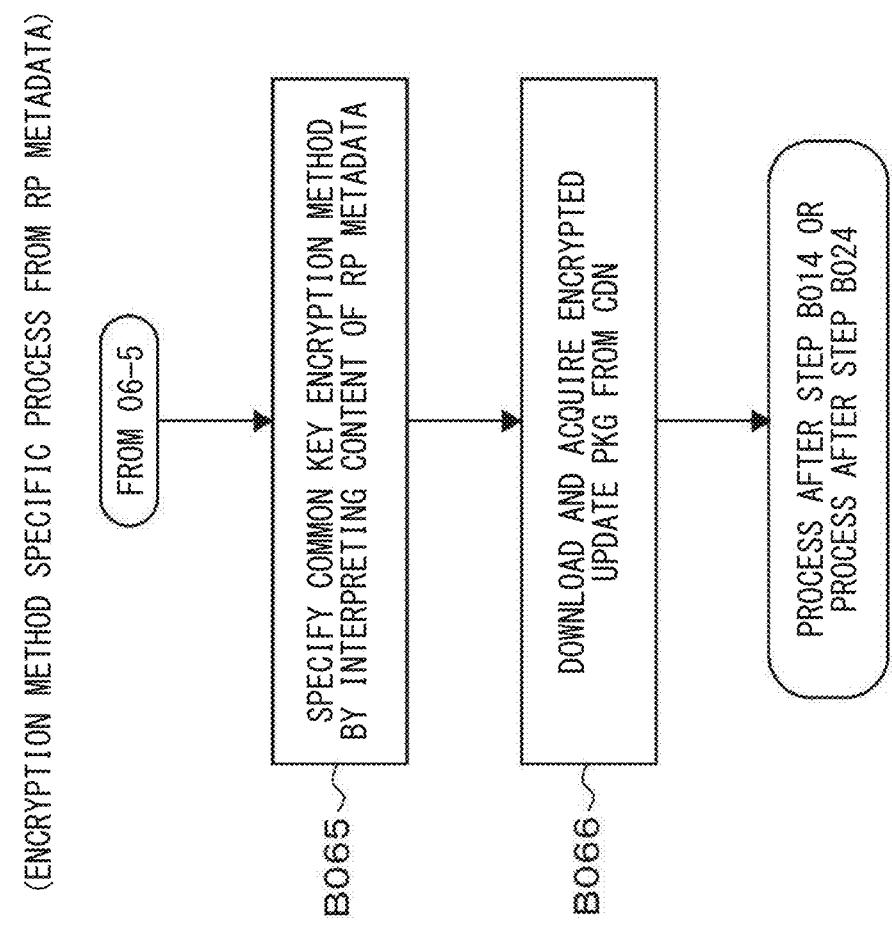
FIG. 54 is a diagram illustrating a process by the OTA master.
Figure 55:
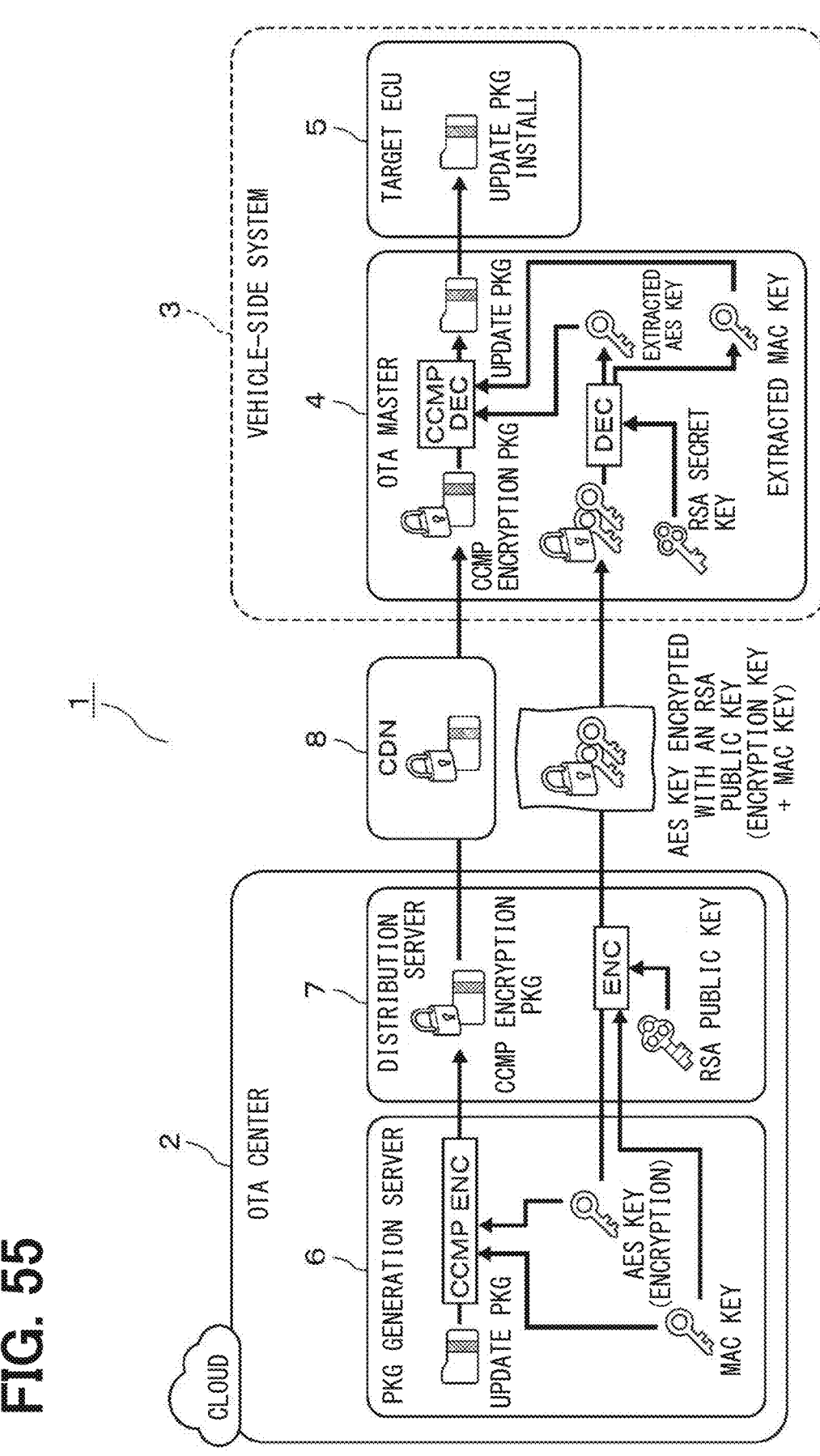
FIG. 55 is a diagram illustrating a flow of a process in the entire system according to the seventh embodiment.
Figure 58:
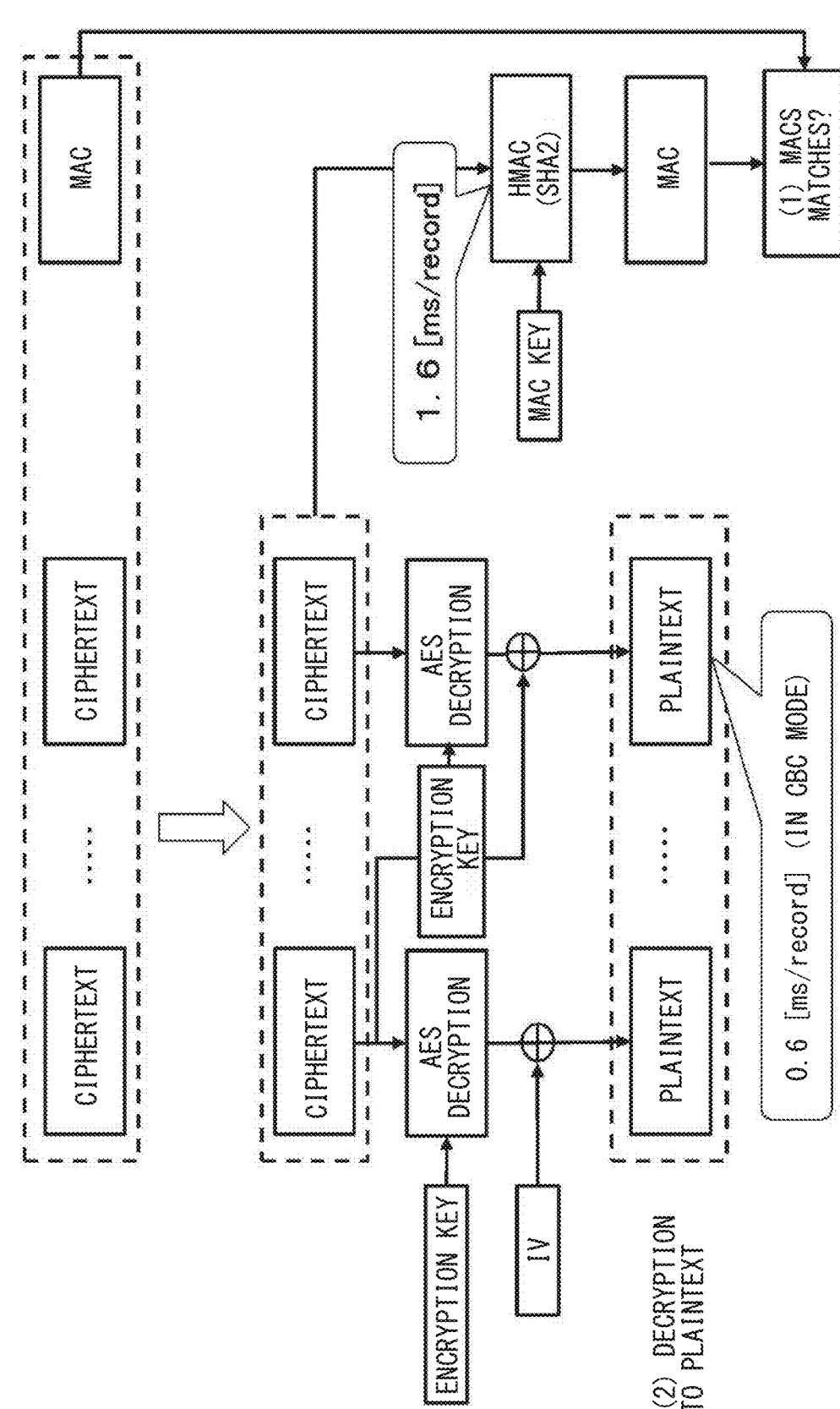
FIG. 58 is a functional block diagram of a conventional method.
Figure 60:
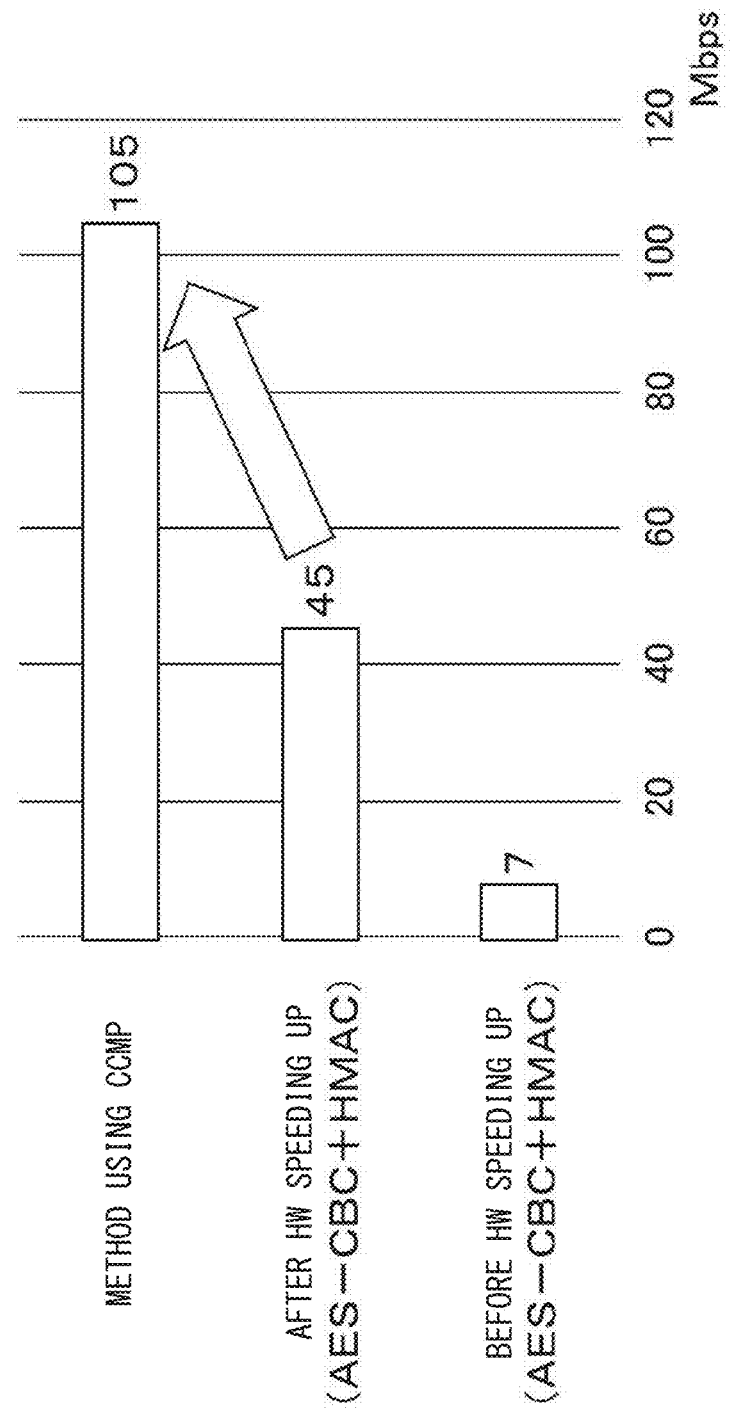
FIG. 60 is a diagram illustrating comparison in throughput between the CCMP mode and the conventional method.

(6-2) Process by OTA Master 4 (See FIGS. 52 to 54)

When the OTA master 4 acquires a campaign notification as the campaign notification transmitted from the OTA center 2 is received by the OTA master 4, the OTA master 4 acquires a common key from the acquired campaign notification (B061). The OTA master 4 decrypts the encrypted common key with the RSA secret key to extract the common key (B062). The OTA master 4 downloads and acquires the encrypted RP metadata from the CDN 8 (B063). The OTA master 4 decrypts the encrypted RP metadata RSA secret key to extract the RP metadata (B064). The OTA master 4 interprets the content of the RP metadata and identifies a common key encryption method (B065). The OTA master 4 downloads and acquires the encrypted update package from the CDN 8 (B066). Thereafter, the OTA master 4 performs the process in and after step B014 described in the first embodiment when the CTR mode is used as the specific encryption mode, and performs the process in and after step B024 described in the second embodiment when the OFB mode is used as the specific encryption mode. In the other encryption modes, similarly, the update package is decrypted and data is transferred to the target ECU according to a procedure corresponding to the encryption mode.

As described above, according to the sixth embodiment, the following operational effects can be obtained.

The encryption method is included in the RP metadata or the DL metadata and transmitted from the OTA center 2 to the OTA master 4. As a result, the OTA master 4 can identify the encryption method.

Seventh Embodiment

The seventh embodiment will be described with reference to FIGS. 55 to 67. In the seventh embodiment, a counter mode with cipher-block chaining message authentication code protocol (CCMP mode) is used as communication path encryption and a measure against data tampering.

In this case, as illustrated in FIGS. 56 to 60, when the configuration using the CCMP mode is compared with the configuration using the decryption and signature verification of Hashed Message Authentication Mode Code (AES CBC-HMAC) Secure Hash Algorithm (SHA) 2 as the conventional method, the processing time of the hardware accelerator is dominant over the processing time of the main core in both cases, but the throughput can be improved by using the CCMP mode.

Figure 61:
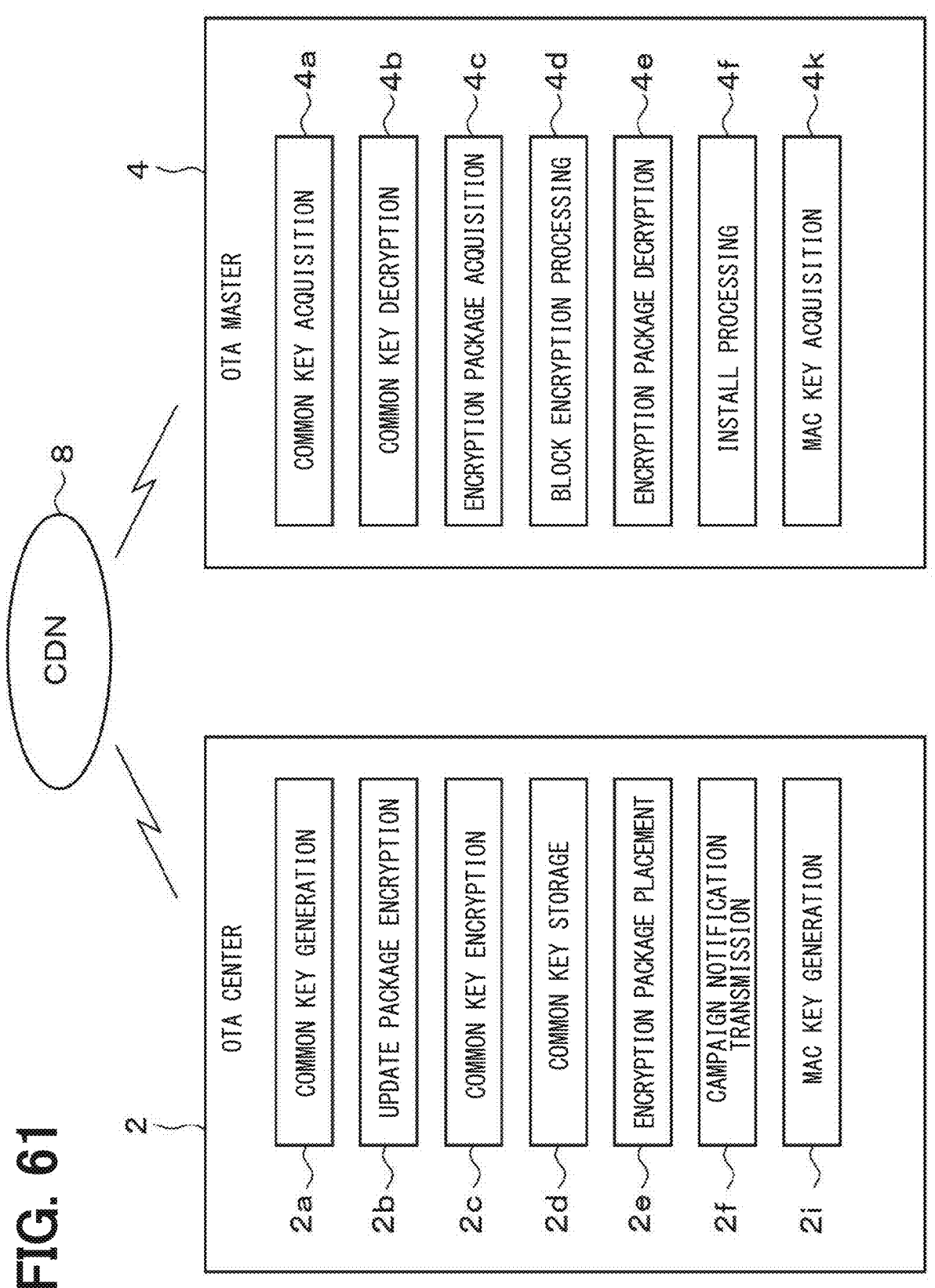
FIG. 61 is a functional block diagram of the OTA center and the OTA master.

As illustrated in FIG. 61, the OTA center 2 includes a MAC key generation section 2i in addition to the common key generation section 2a, the update package encryption section 2b, the common key encryption section 2c, the common key storage section 2d, the encryption package placement section 2e, and the campaign notification transmission section 2f. The MAC key generation section 2i generates a MAC for preventing tampering of the update package.

The OTA master 4 includes a MAC key acquisition section 4k in addition to the common key acquisition section 4a, the common key decryption section 4b, the encryption package acquisition section 4c, the block encryption processing section 4d, the encryption package decryption section 4e, and the installation processing section 4f. When the MAC key acquisition section 4*k* acquires the campaign notification as the campaign notification transmitted from the OTA center 2 is received by the OTA master 4, the MAC key acquisition section 4*k* acquires an MAC key from the acquired campaign notification.

Next, the operation of the above-described configuration will be described with reference to FIGS. 62 to 67.

Figure 62:
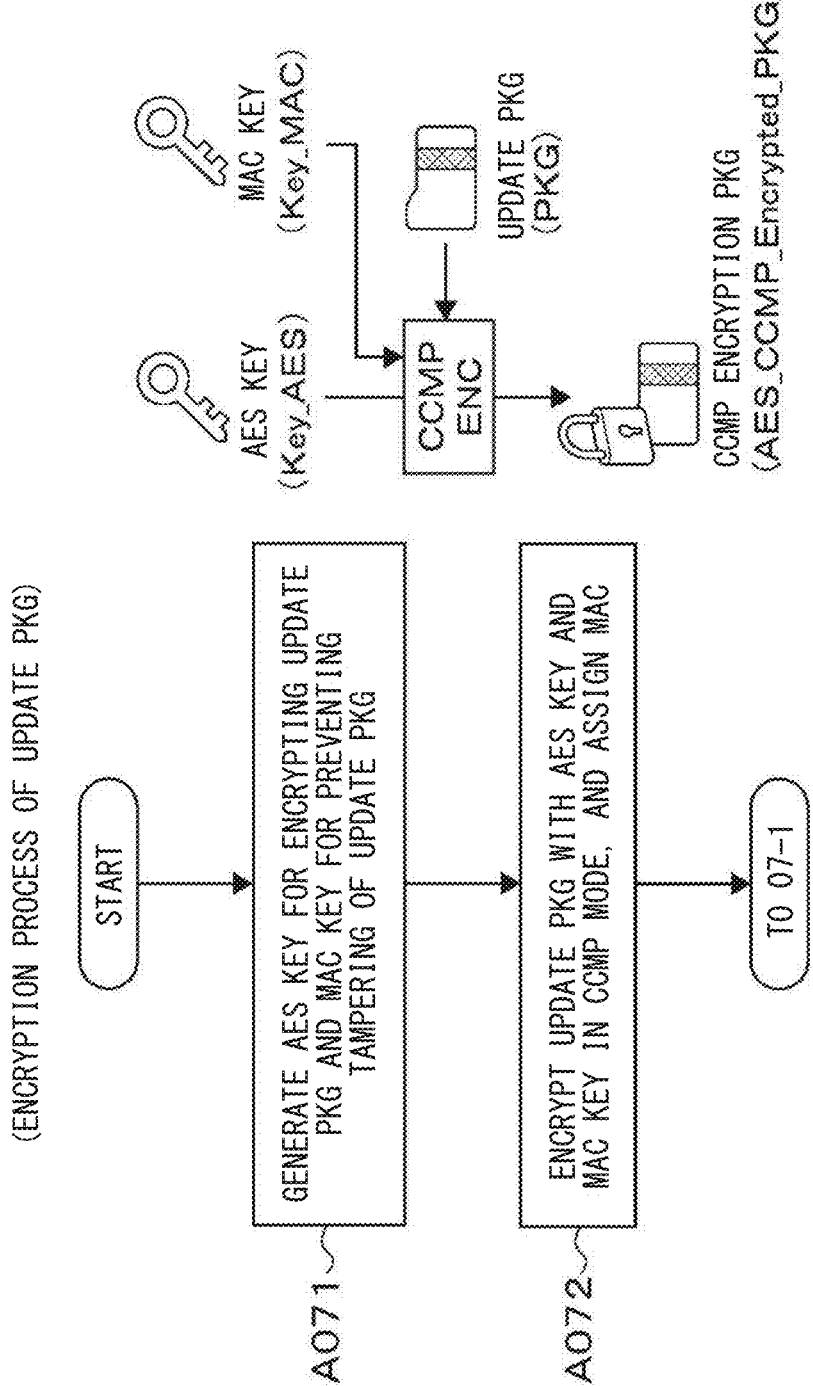
FIG. 62 is a diagram illustrating a process by the OTA center.
Figure 63:
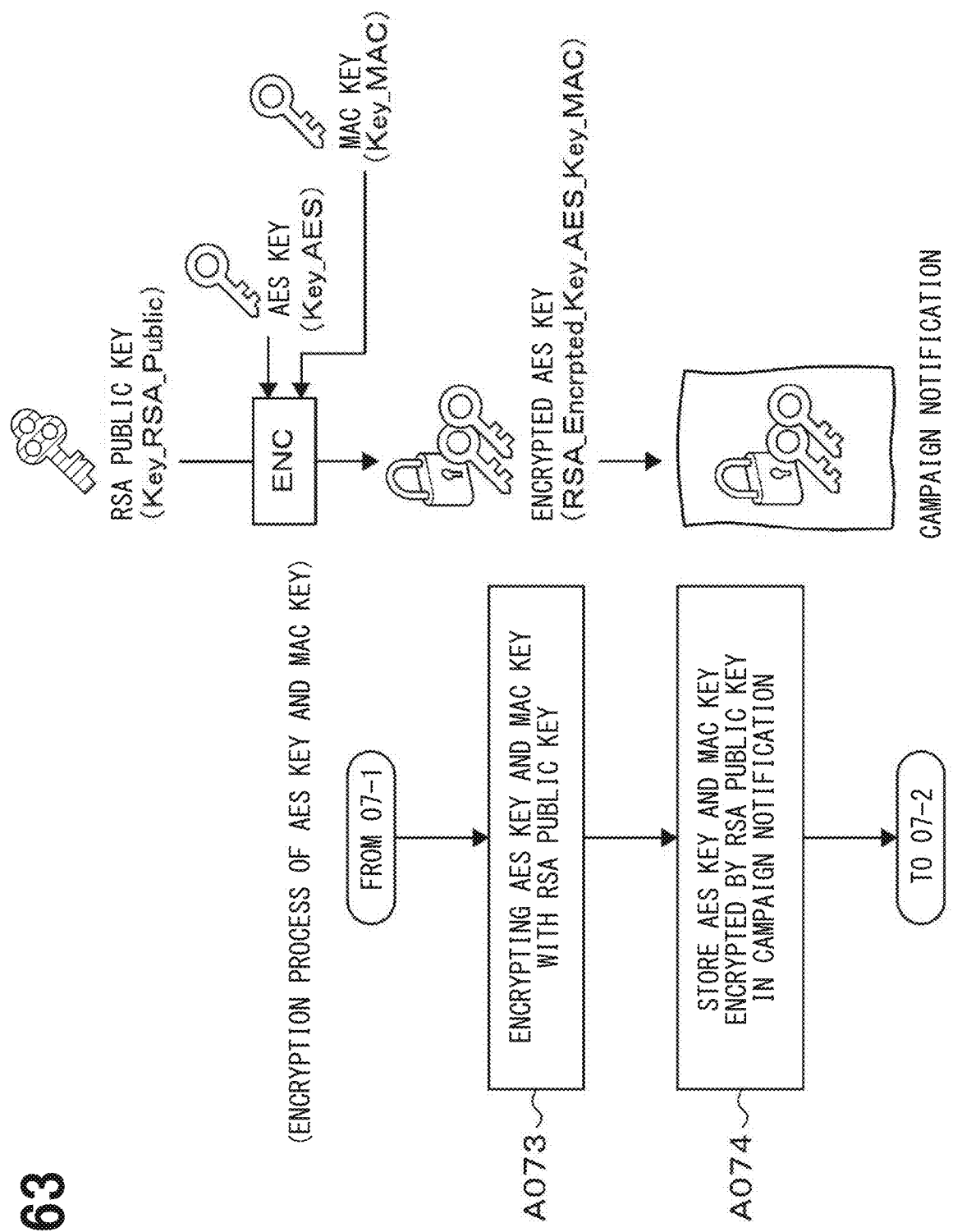
FIG. 63 is a diagram illustrating a process by the OTA center.
Figure 64:
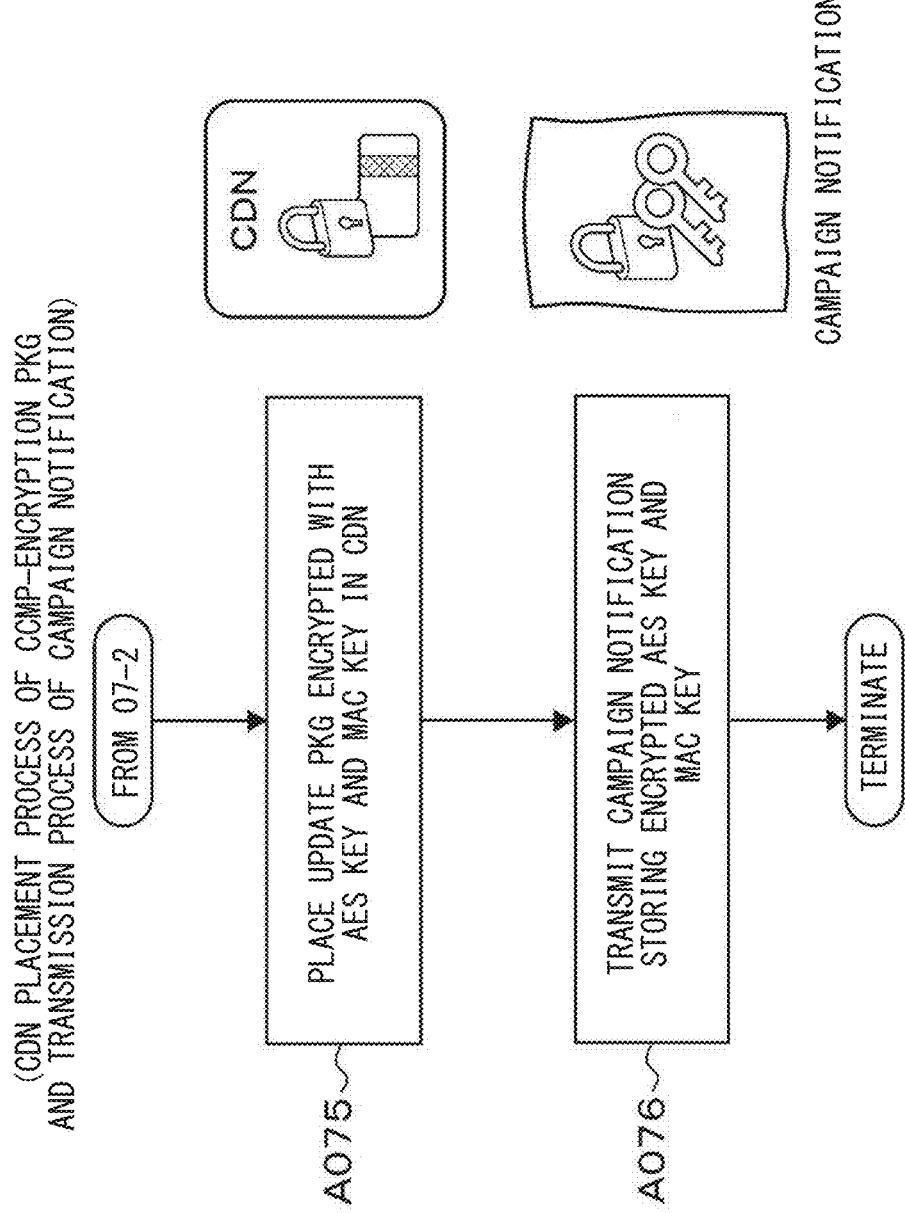
FIG. 64 is a diagram illustrating a process by the OTA center.

(7-1) Process by OTA Center 2 (See FIGS. 62 to 64)

The OTA center 2 generates an AES key for encrypting the update package and a MAC key for preventing tampering of the update package (A071). The OTA center 2 encrypts the update package with the generated AES key and MAC key in the CCMP mode, and assigns a MAC (A072). The OTA center 2 encrypts the AES key and the MAC key with the RSA public key (A073). The OTA center 2 stores the AES key and the MAC key encrypted with the RSA public key in the campaign notification (A074). The OTA center 2 places an update package encrypted with the AES key and the MAC key in the CDN 8 (A075). The OTA center 2 transmits a campaign notification storing the encrypted AES key and MAC key to the vehicle-side system 3 to be reprogrammed (A076).

Figure 65:
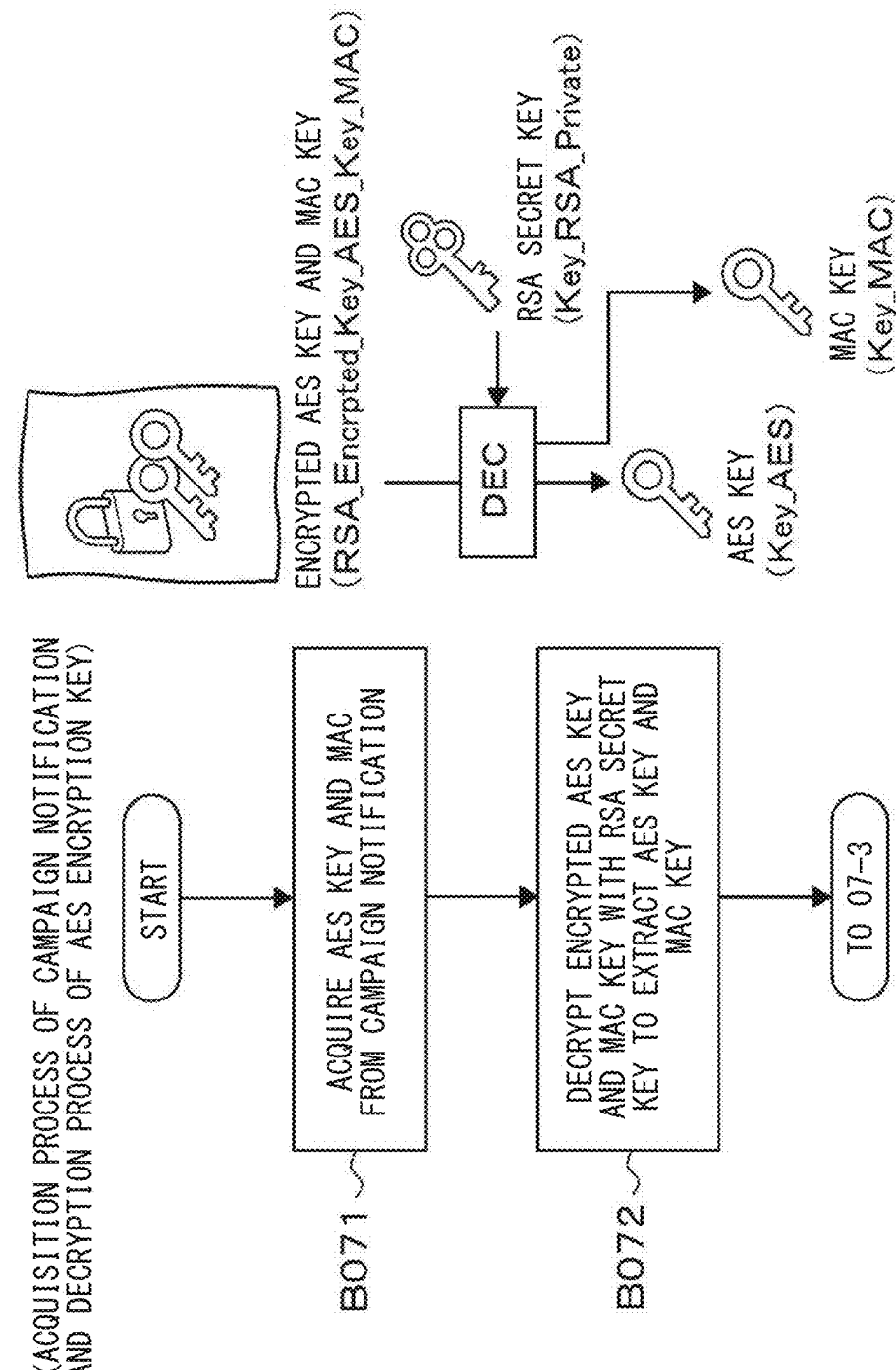
FIG. 65 is a diagram illustrating a process by the OTA master.
Figure 66:
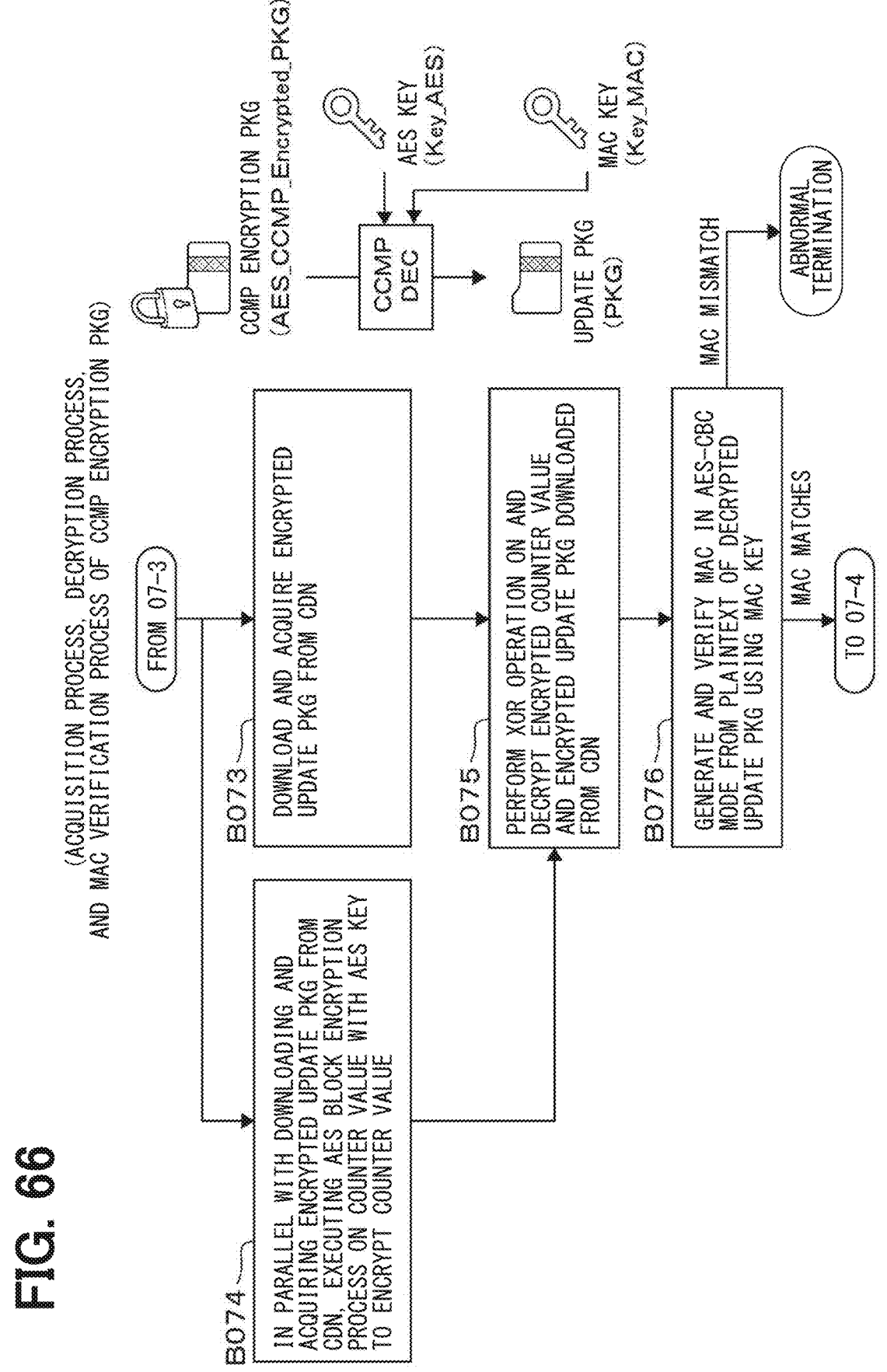
FIG. 66 is a diagram illustrating a process by the OTA master.
Figure 67:
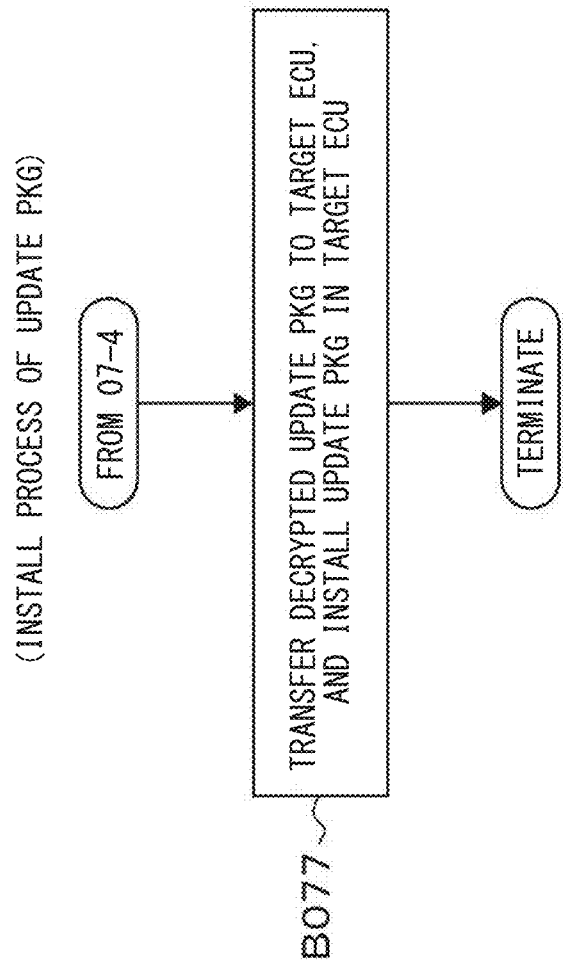
FIG. 67 is a diagram illustrating a process by the OTA master.
Figure 68:
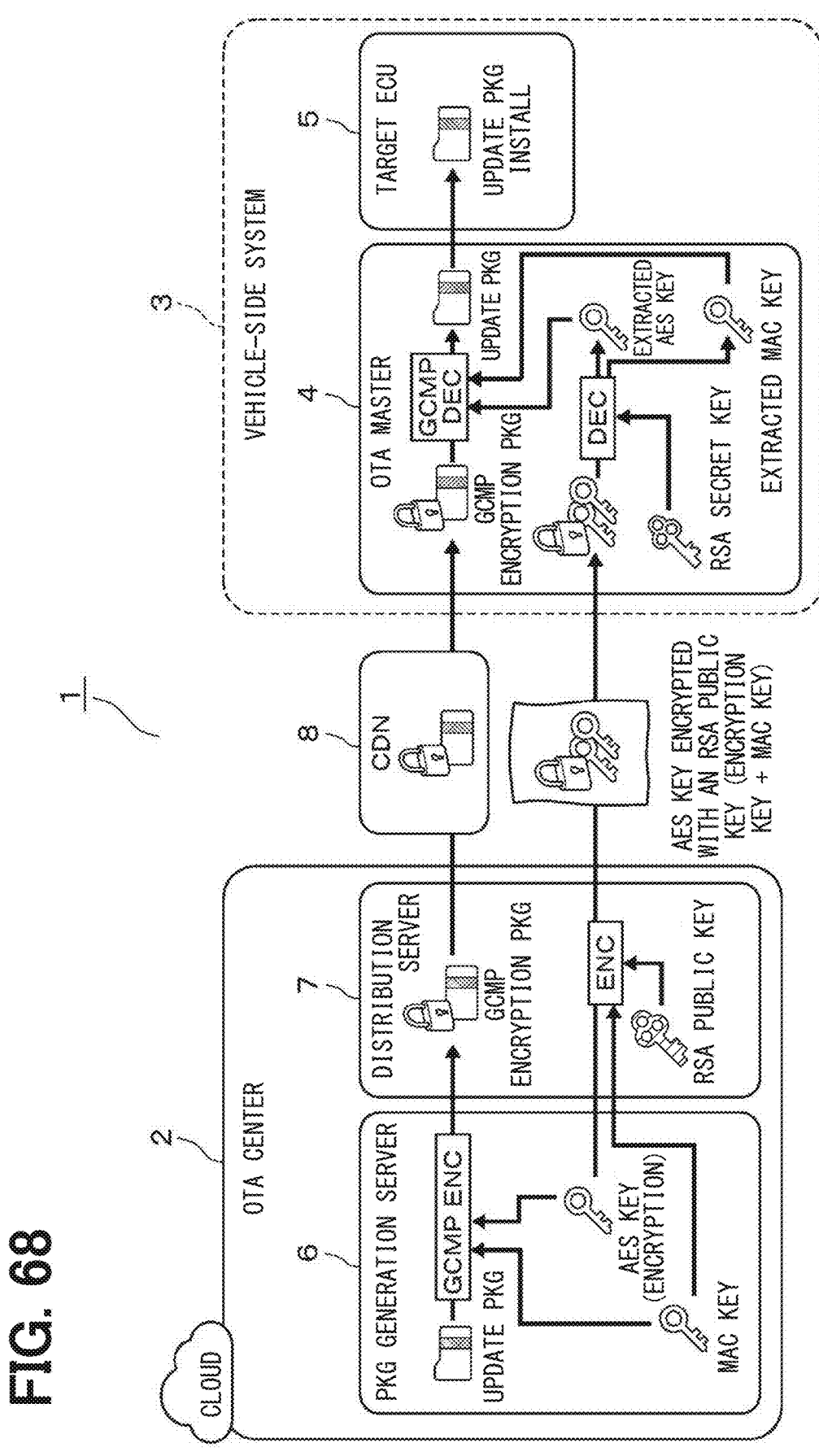
FIG. 68 is a diagram illustrating a flow of a process in the entire system according to the eighth embodiment.

(7-2) Process by OTA Master 4 (See FIGS. 65 to 67)

When acquiring the campaign notification as the campaign notification transmitted from the OTA center 2 is received by the OTA master 4, the OTA master 4 acquires an AES key and an MAC key from the acquired campaign notification (B071). The OTA master 4 decrypts the encrypted AES key and MAC key with the RSA secret key to extract the AES key and the MAC key (B017). The OTA master 4 downloads and acquires the encrypted update package from the CDN 8 (B073).

At this time, in parallel with downloading and acquiring the encrypted update package from the CDN 8, the OTA master 4 executes an AES block encryption process of the counter value with the AES key to encrypt the counter value (B074). The OTA master 4 performs an XOR operation on and decrypts the encrypted counter value and the encrypted update package downloaded from the CDN 8 (B075). The OTA master 4 generates and verifies a MAC in the AES-CBC mode from the plaintext of the decrypted update package using the MAC key (B076). When the MACs match, the OTA master 4 transfers the decrypted update package to the target ECU 5 and installs the update package in the target ECU 5 (B077). When the MACs do not match, the OTA master 4 terminates the process. In this case, when terminating the process due to the MAC mismatch, the OTA master 4 may record a log indicating that the process has been terminated due to the MAC mismatch and display an error in an HMI (not illustrated). Alternatively, the OTA master 4 may perform an XOR operation on and decrypts the encrypted update package, and may transfer the decrypted update package to the target ECU 5. In this case, the OTA master 4 may be configured to generate and verify the MAC in the AES-CBC mode from the plaintext of the decrypted update package using the MAC key, and to notify the target ECU 5 of the cancellation of the installation when it is determined that the MACs do not match.

As described above, according to the seventh embodiment, the following operational effects can be obtained.

The CCMP mode is used as communication path encryption and a measure against data tampering between the OTA center 2 and the OTA master 4. By using the CCMP mode, when the OTA master 4 downloads the update package from the OTA center 2, it is possible to provide a data tampering countermeasure in addition to the communication path encryption. As a result, security can be improved, and more secure OTA distribution can be realized.

Eighth Embodiment

The eighth embodiment will be described with reference to FIGS. 68 to 77. In the eighth embodiment, a Galois/Counter Mode Protocol (GCMP mode) is used as communication path encryption and a measure against data tampering.

Figure 69:
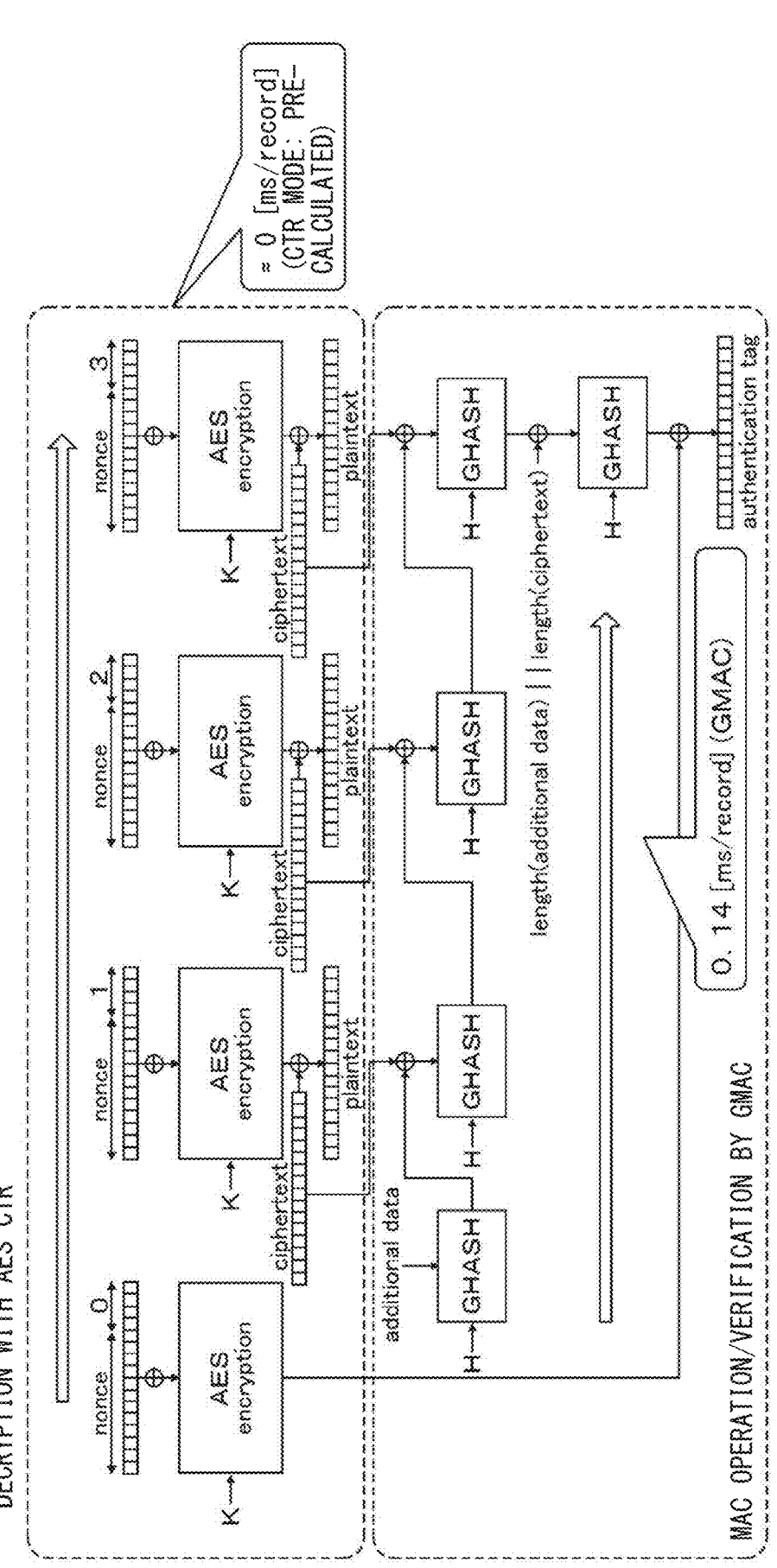
FIG. 69 is a functional block diagram in a GCMP mode.
Figure 71:
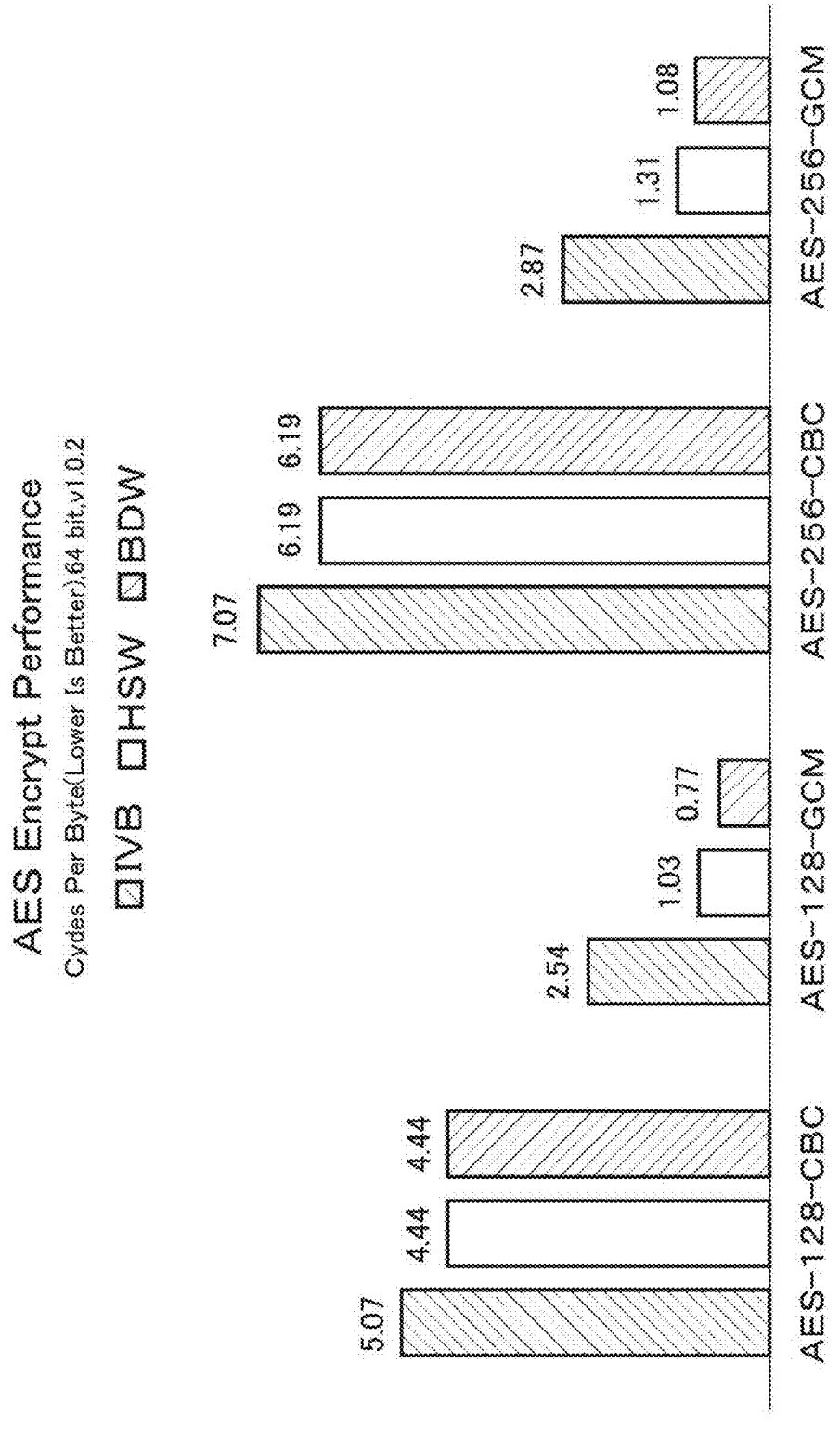
FIG. 71 is a diagram illustrating a comparison in throughput between the GCMP mode and the conventional method.

In this case, as illustrated in FIGS. 69 to 71, when the configuration using the GCMP mode is compared with the configuration using the CCMP mode or the configuration using the decryption and signature verification of AES CBC-HMAC SHA2 as the conventional method, the processing time of the hardware accelerator is dominant over the processing time of the main core in both cases, but the throughput can be further improved by using the GCMP mode.

Next, the operation of the above-described configuration will be described with reference to FIGS. 72 to 77.

Figure 73:
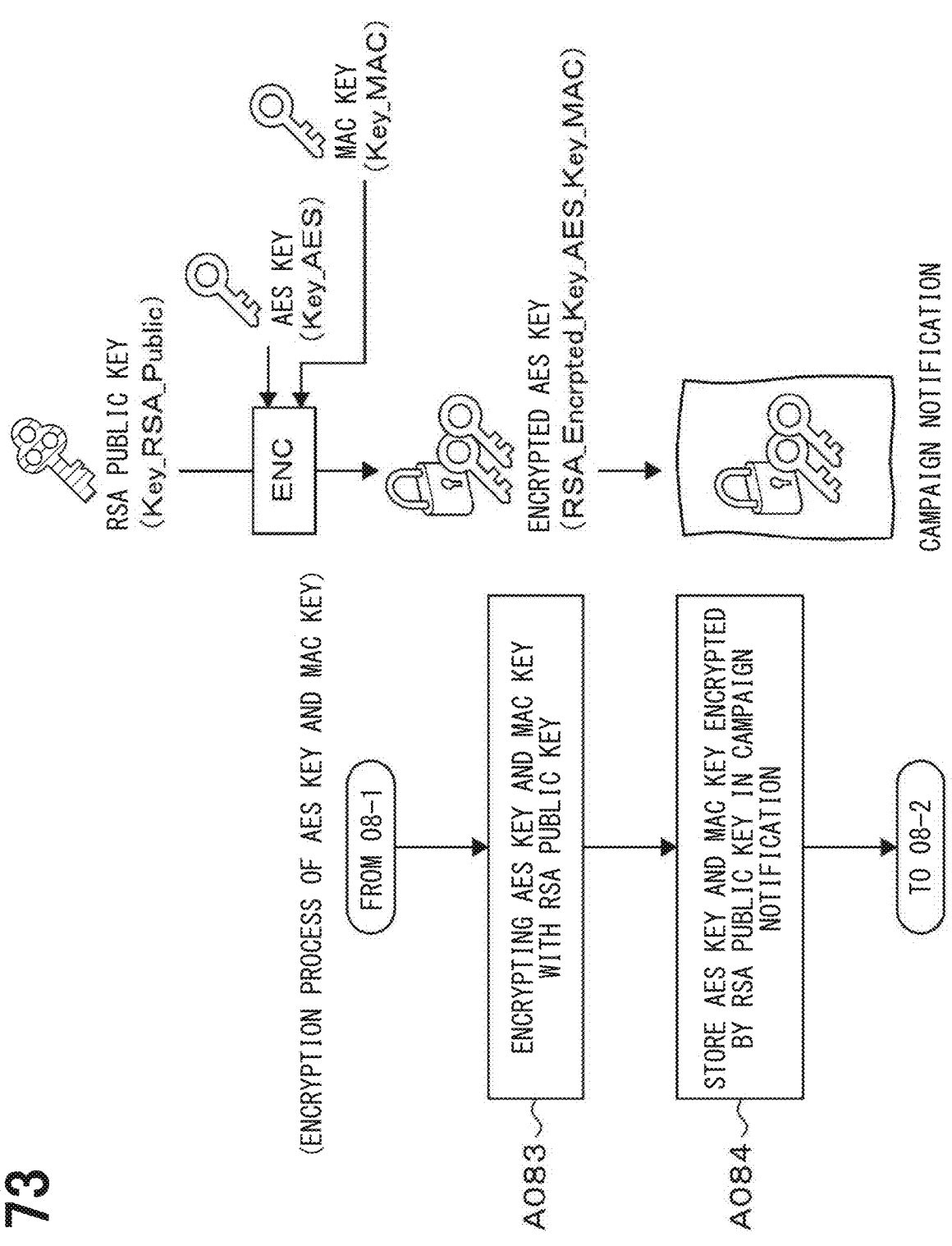
FIG. 73 is a diagram illustrating a process by the OTA center.
Figure 74:
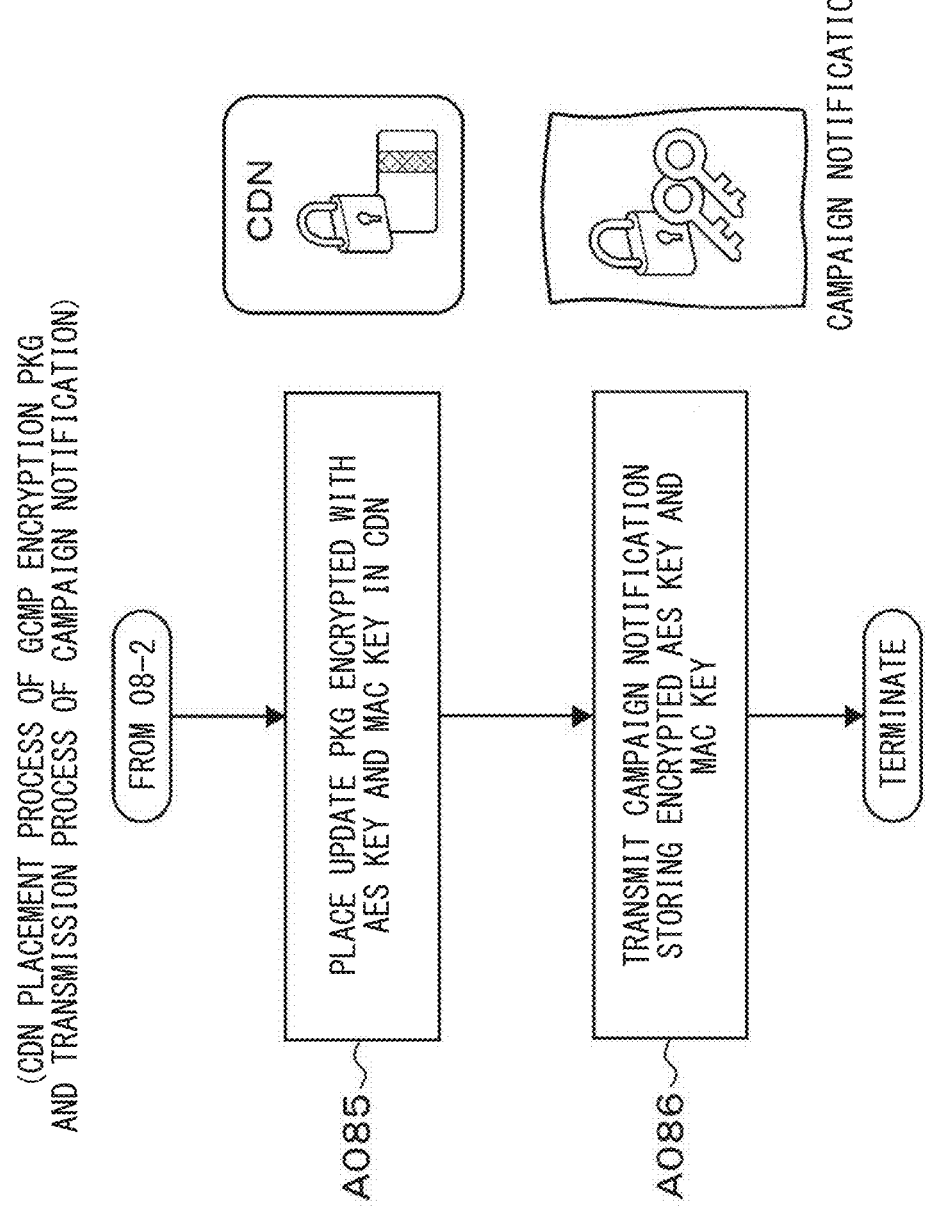
FIG. 74 is a diagram illustrating a process by the OTA center.

(8-1) Process by OTA Center 2 (See FIGS. 72 to 74)

The OTA center 2 generates an AES key for encrypting the update package and a MAC key for preventing tampering of the update package (A081). The OTA center 2 encrypts the update package with the generated AES key and MAC key in the GCMP mode, and assigns a MAC (A082). The OTA center 2 encrypts the AES key and the MAC key with the RSA public key (A083). The OTA center 2 stores the AES key and the MAC key encrypted with the RSA public key in the campaign notification (A084). The OTA center 2 places an update package encrypted with the AES key and the MAC key in the CDN 8 (A085). The OTA center 2 transmits a campaign notification storing the encrypted AES key and MAC key to the vehicle-side system 3 to be reprogrammed (A086).

Figure 75:
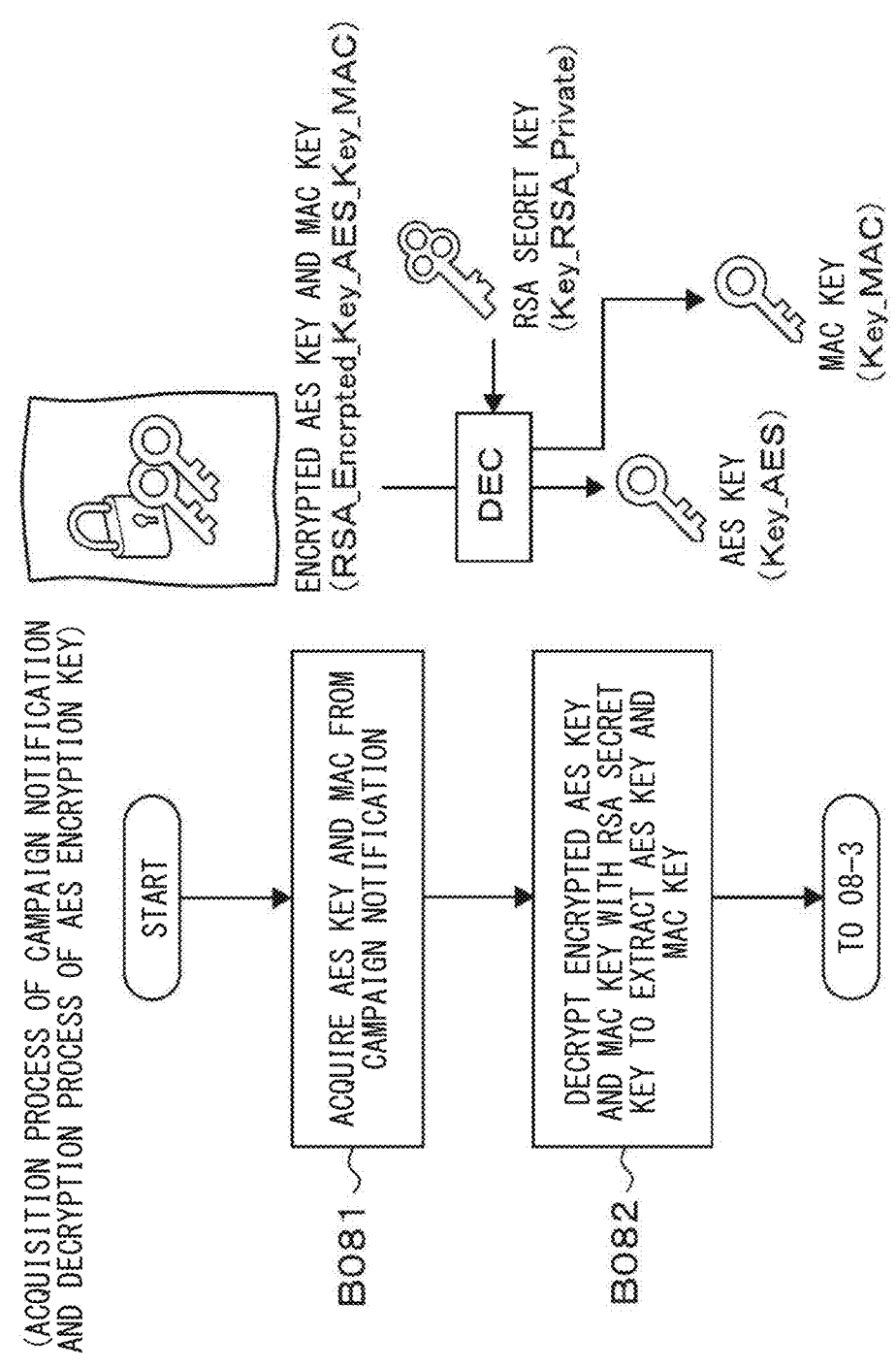
FIG. 75 is a diagram illustrating a process by the OTA master.
Figure 76:
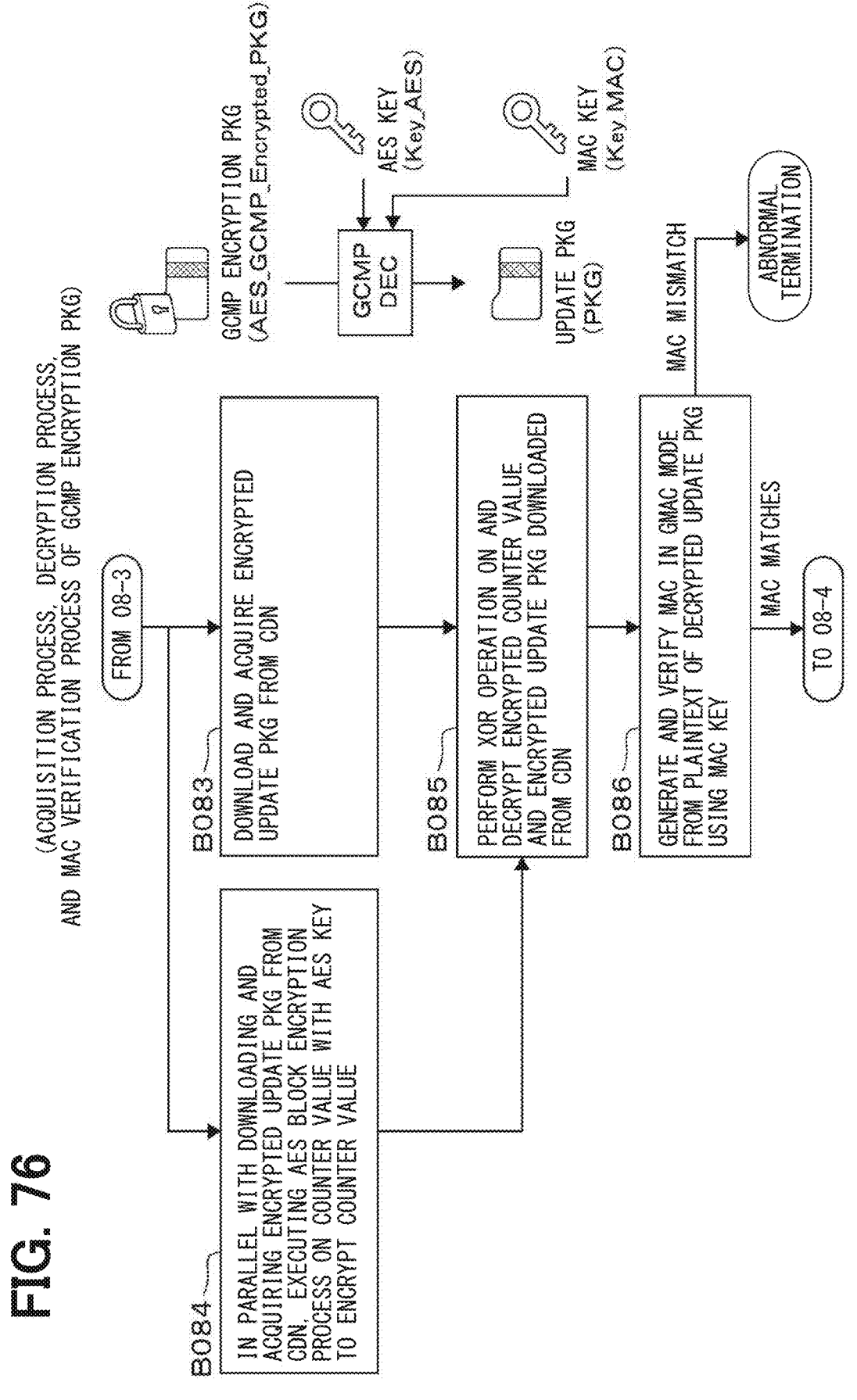
FIG. 76 is a diagram illustrating a process by the OTA master.
Figure 77:
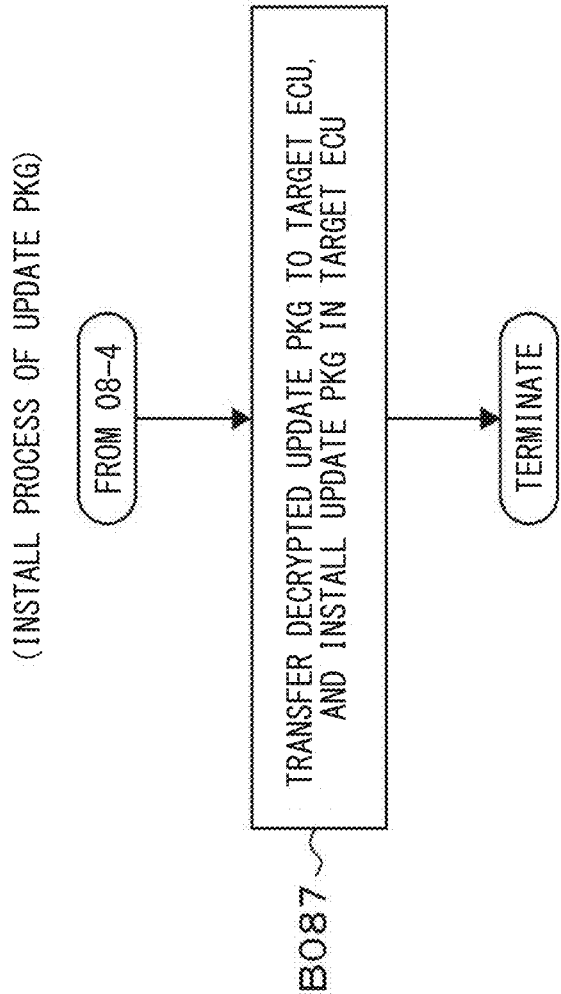
FIG. 77 is a diagram illustrating a process by the OTA master.
Figure 78:
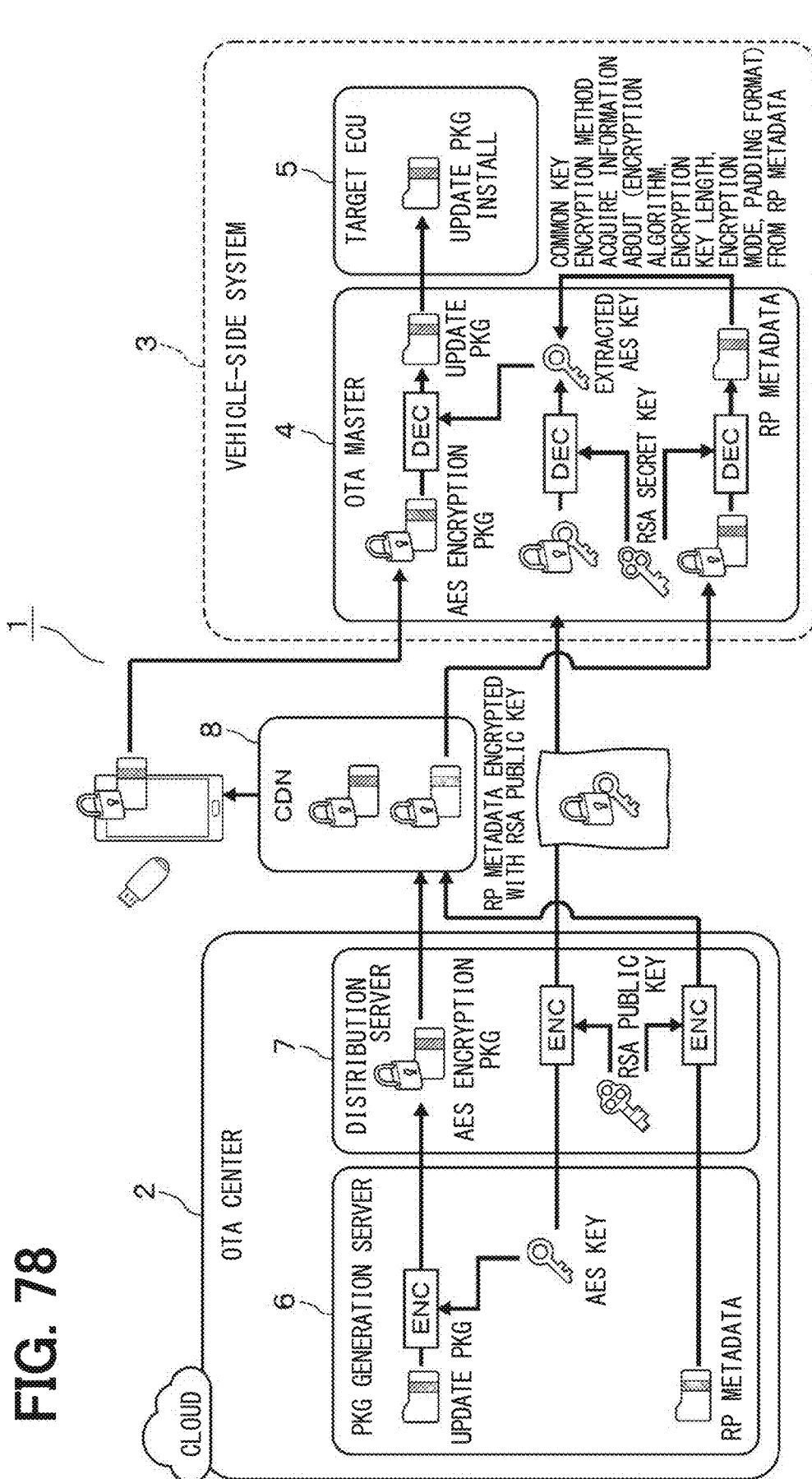
FIG. 78 is a diagram illustrating a flow of a process in the entire system according to the ninth embodiment.
Figure 79:
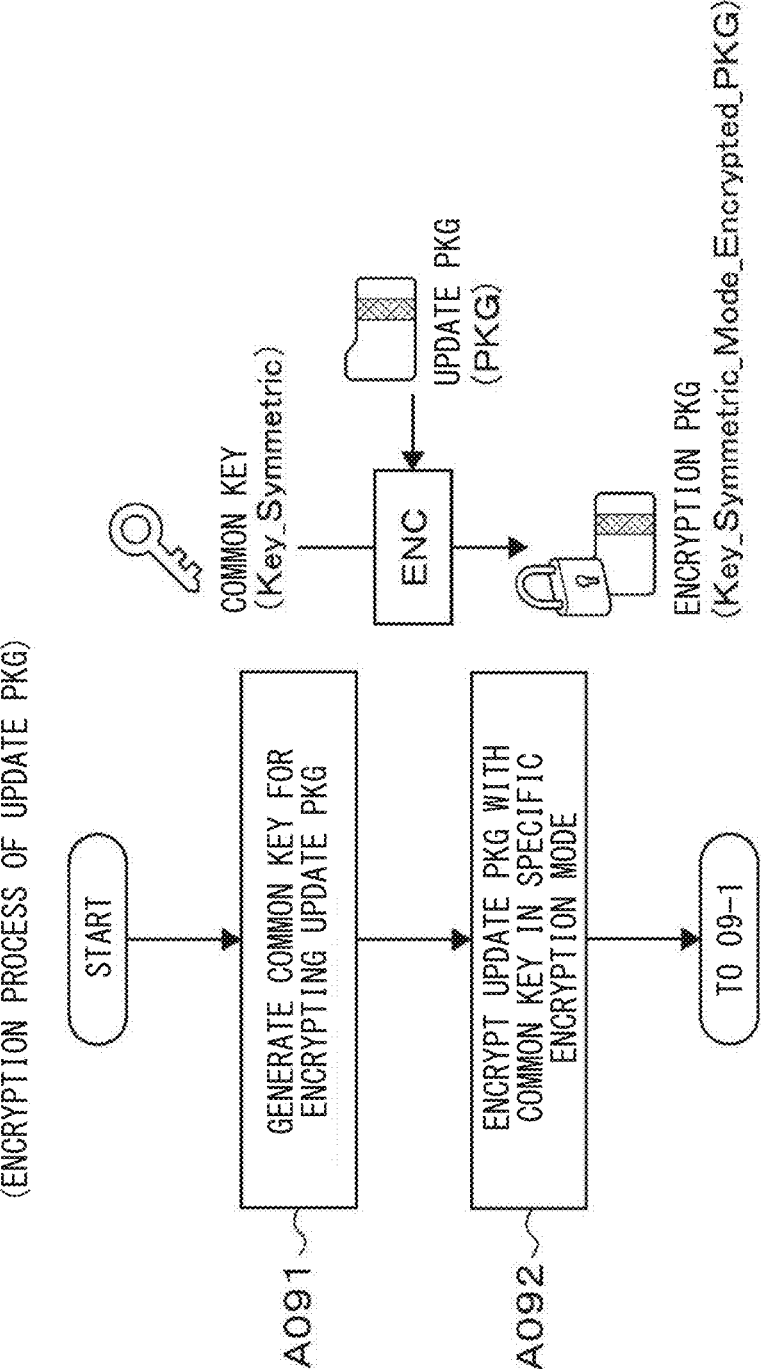
FIG. 79 is a diagram illustrating a process by the OTA center.
Figure 80:
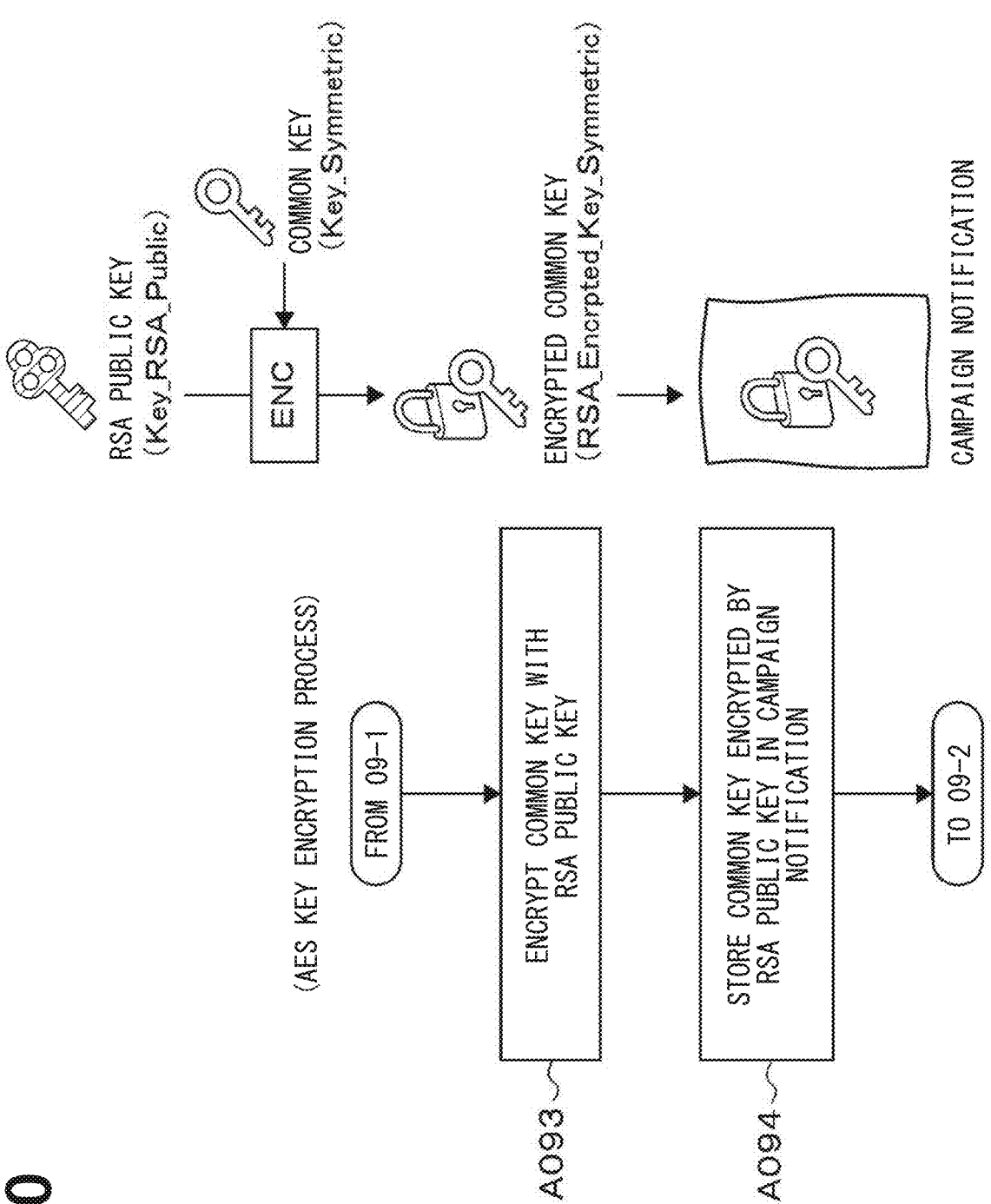
FIG. 80 is a diagram illustrating a process by the OTA center.
Figure 84:
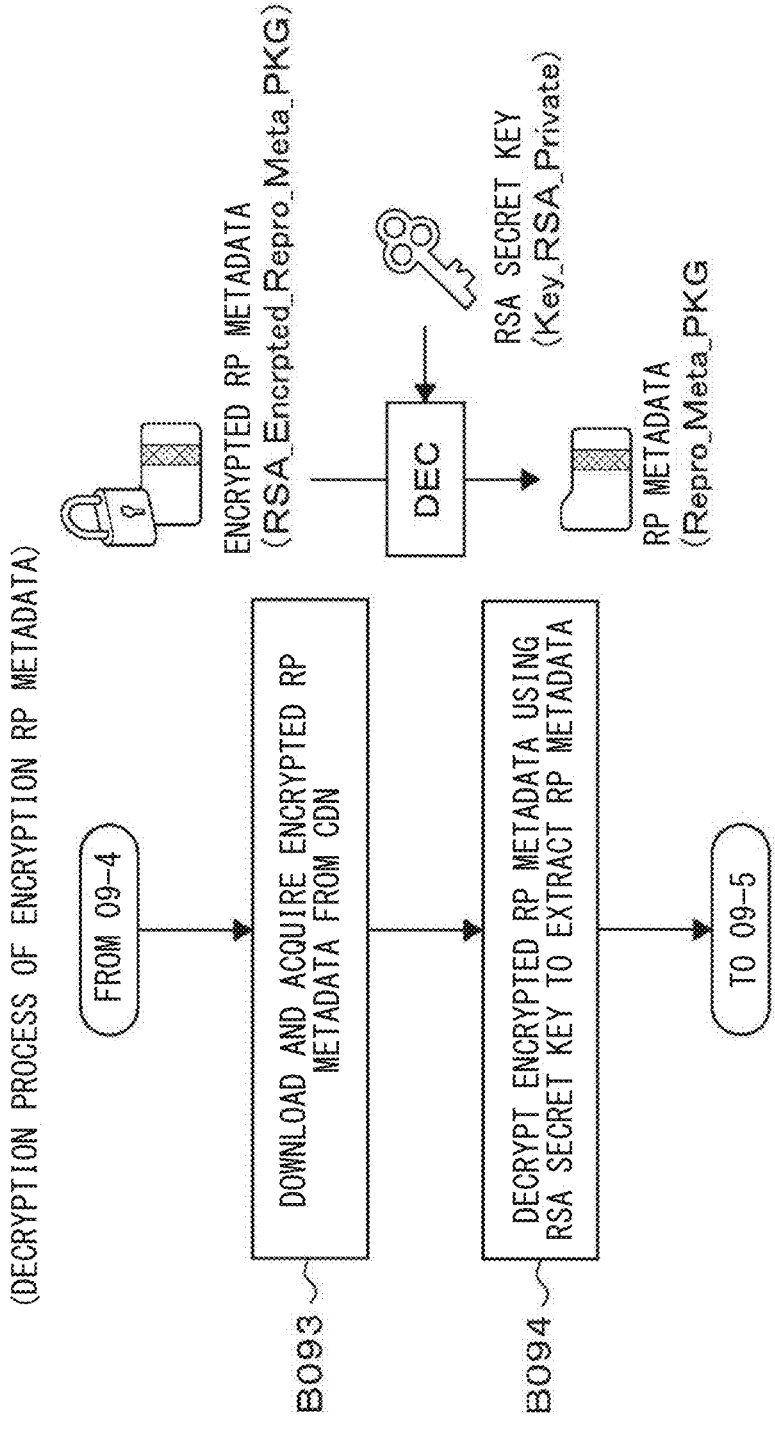
FIG. 84 is a diagram illustrating a process by the OTA master.
Figure 85:
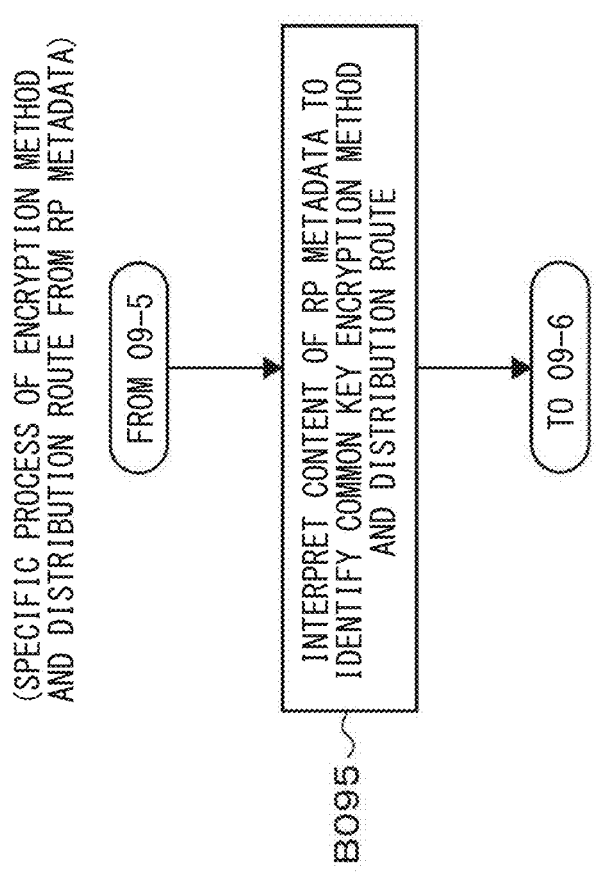
FIG. 85 is a diagram illustrating a process by the OTA master.
Figure 86:
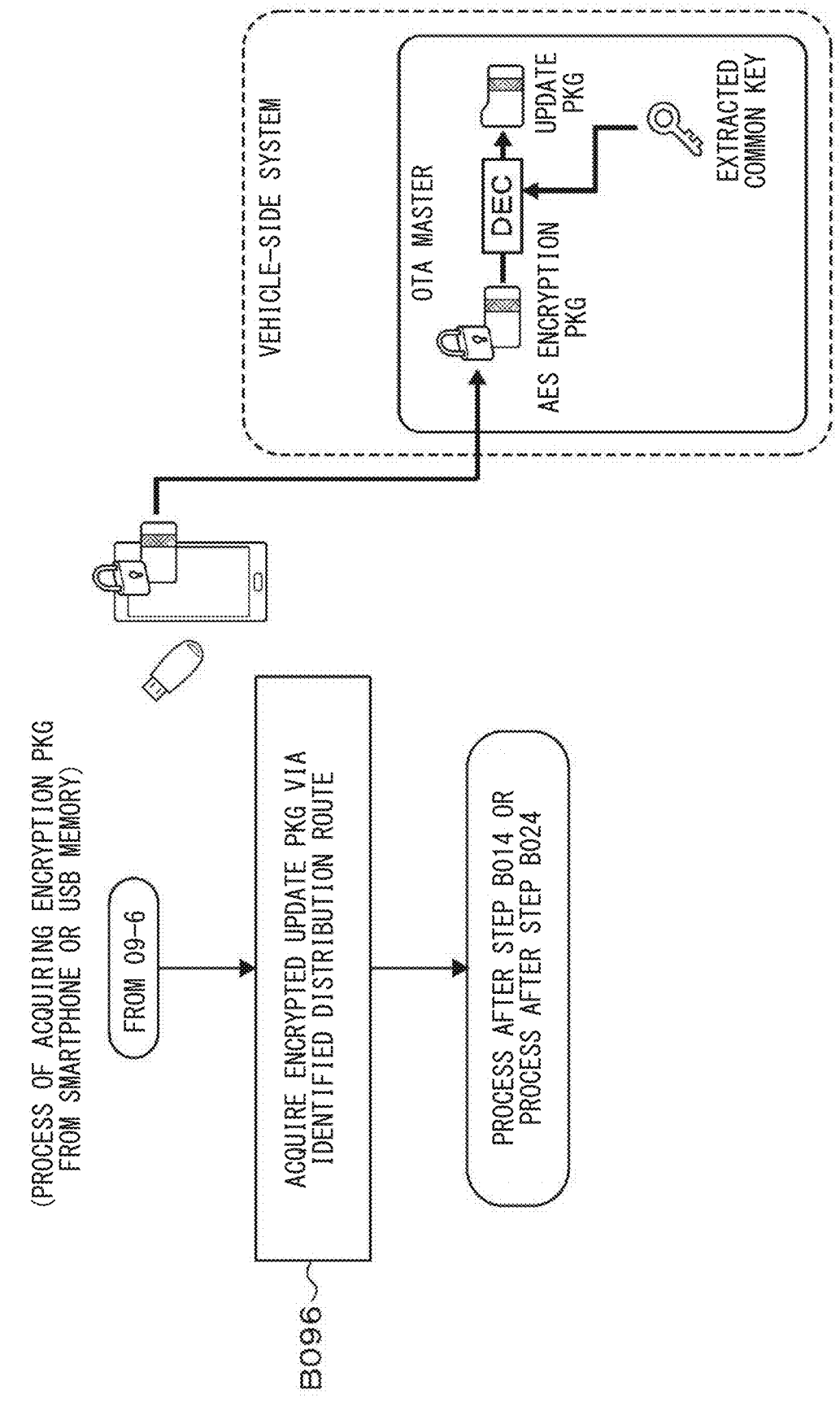
FIG. 86 is a diagram illustrating a process by the OTA master.
Figure 87:
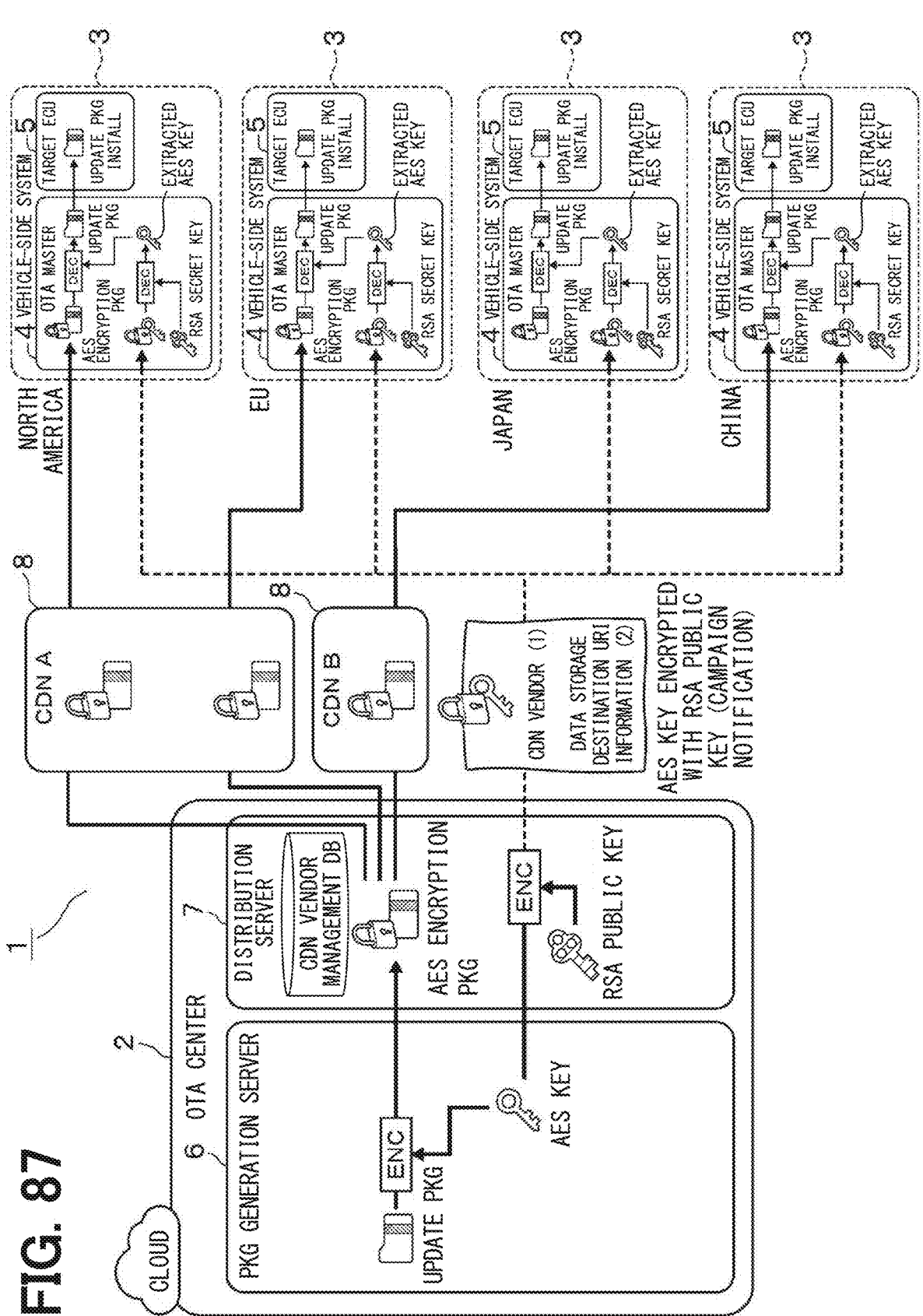
FIG. 87 is a diagram illustrating a flow of a process in the entire system according to the tenth embodiment.

(8-2) Process by OTA Master 4 (See FIGS. 75 to 77)

When acquiring the campaign notification as the campaign notification transmitted from the OTA center 2 is received by the OTA master 4, the OTA master 4 acquires an AES key and a MAC key from the acquired campaign notification (B081). The OTA master 4 decrypts the encrypted AES key and MAC key with the RSA secret key to extract the AES key and the MAC key (B082). The OTA master 4 downloads and acquires the encrypted update package from the CDN 8 (B083).

At this time, in parallel with downloading and acquiring the encrypted update package from the CDN 8, the OTA master 4 executes an AES block encryption process of the counter value with the AES key to encrypt the counter value (B084). The OTA master 4 performs an XOR operation on and decrypts the encrypted counter value and the encrypted update package downloaded from the CDN 8 (B085). The OTA master 4 generates and verifies a MAC in the GMAC mode from the plaintext of the decrypted update package using the MAC key (B086). When the MACs match, the OTA master transfers the decrypted update package to the target ECU 5 and installs the update package in the target ECU 5 (B087).

As described above, according to the eighth embodiment, the following operational effects can be obtained.

The GCMP mode is used as communication path encryption and a measure against data tampering between the OTA center 2 and the OTA master 4. By using the GCMP mode, when the OTA master 4 downloads the update package from the OTA center 2, it is possible to provide a data tampering countermeasure in addition to the communication path encryption. As a result, security can be improved, and more secure OTA distribution can be realized.

Ninth Embodiment

The ninth embodiment will be described with reference to FIGS. 78 to 86. In the ninth embodiment, not only the CDN 8 but also a smartphone, a USB memory, or the like is used for the distribution route of the update data to cope with the diversity of the distribution route, so that the degree of freedom of the OTA update system of the user is increased. The smartphone or the USB memory corresponds to a recording medium. Hereinafter, the smartphone or the USB memory will be described as an example of the storage medium, but an SD card, a micro SD card, a compact flash, or the like may be used as the storage medium.

Next, the operation of the above-described configuration will be described with reference to FIGS. 79 to 86.

(9-1) Process by OTA Center 2 (See FIGS. 79 to 82)

The OTA center 2 generates a common key for encrypting the update package (A091). The OTA center 2 encrypts the update package in a specific encryption mode using the generated common key (A092). The OTA center 2 encrypts the common key with the RSA public key (A093). The OTA center 2 stores the common key encrypted with the RSA public key in the campaign notification (A094). The OTA center 2 generates the RP metadata including the common key encryption method and the distribution route (A095). The OTA center 2 encrypts the RP metadata with the RSA public key (A096). The OTA center 2 places the update package encrypted with the common key and the RP metadata encrypted with the RSA public key in the CDN 8 (A097). The OTA center 2 transmits a campaign notification storing the encrypted common key to the vehicle-side system 3 to be reprogrammed (A098).

(9-2) Process by OTA Master 4 (See FIGS. 83 to 86)

When acquiring the campaign notification as the campaign notification transmitted from the OTA center 2 is received by the OTA master 4, the OTA master 4 acquires an encrypted common key from the acquired campaign notification (B091). The OTA master 4 decrypts the encrypted common key with the RSA secret key to extract the common key (B092). The OTA master 4 downloads and acquires the encrypted RP metadata from the CDN 8 (B093). The OTA master 4 decrypts the encrypted RP metadata RSA secret key to extract the RP metadata (B094). The OTA master 4 interprets the content of the RP metadata and identifies the common key encryption method and the distribution route (B095). The OTA master 4 acquires the encrypted update package via the identified distribution route (B096). That is, in a case where the smartphone is identified as the distribution route, the OTA master 4 downloads the encrypted update package from the CDN 8 via the smartphone by the batch storage method. In a case where the USB memory is identified as the distribution route, the OTA master 4 downloads the encrypted update package from the CDN 8 via the USB memory by the batch storage method. Thereafter, the OTA master 4 performs the process in and after step B014 described in the first embodiment when the CTR mode is used as the specific encryption mode, and performs the process in and after step B024 described in the second embodiment when the OFB mode is used as the specific encryption mode.

As described above, according to the ninth embodiment, the following operational effects can be obtained.

The update package is acquired from the CDN 8 via a recording medium such as a smartphone or a USB memory.

The distribution route of the update package can have diversity, and the distribution route having superior distribution cost and usability can be selected. As a result, the distribution cost when the OTA master 4 downloads the update package from the OTA center 2 can be appropriately suppressed, and the user experience value can be improved. In the embodiment described above, the OTA master 4 interprets the content of the RP metadata in step B095 to identify the common key encryption method and the distribution route. When a plurality of distribution routes is described in the RP metadata, the OTA master 4 may select any one of the plurality of distribution routes.

Tenth Embodiment

Figure 88:
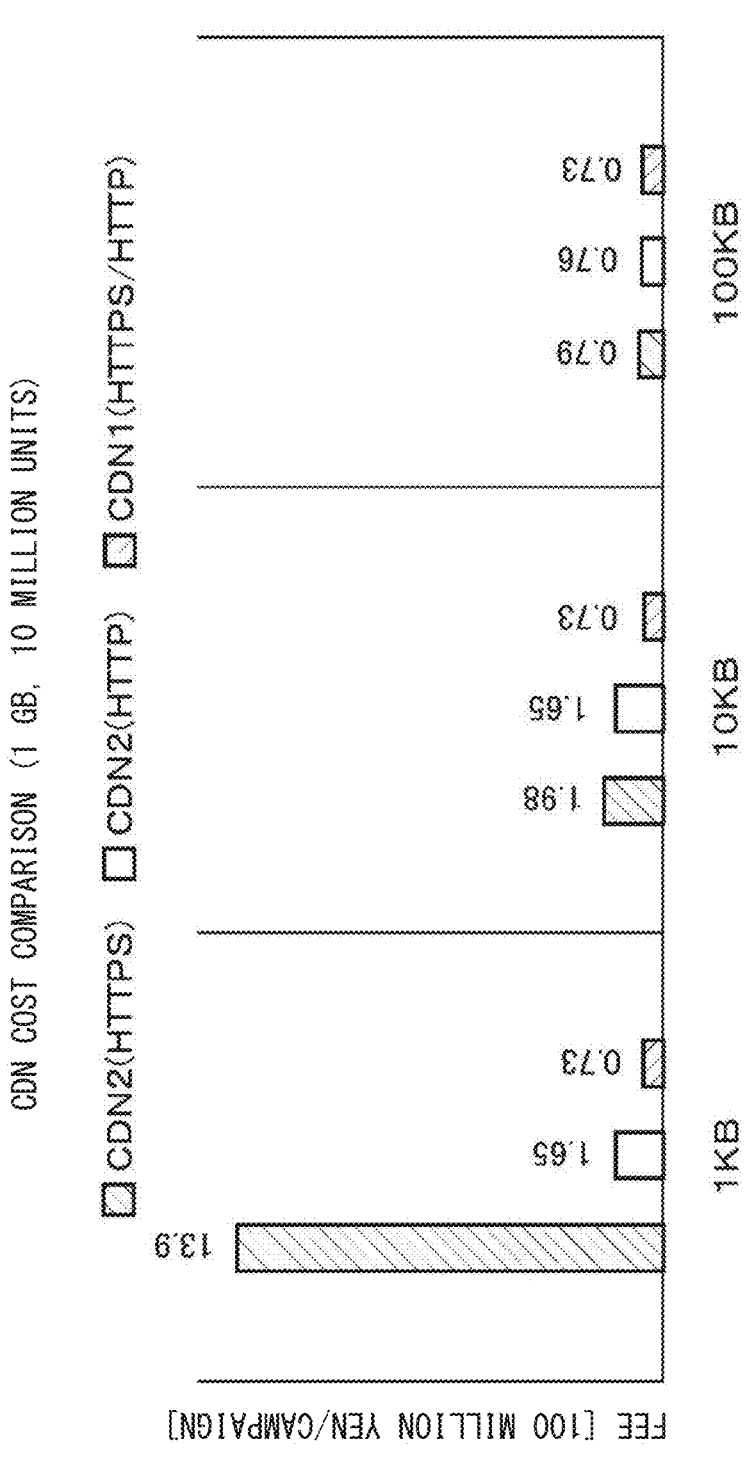
FIG. 88 is a diagram illustrating cost comparison of a CDN.
Figure 89:
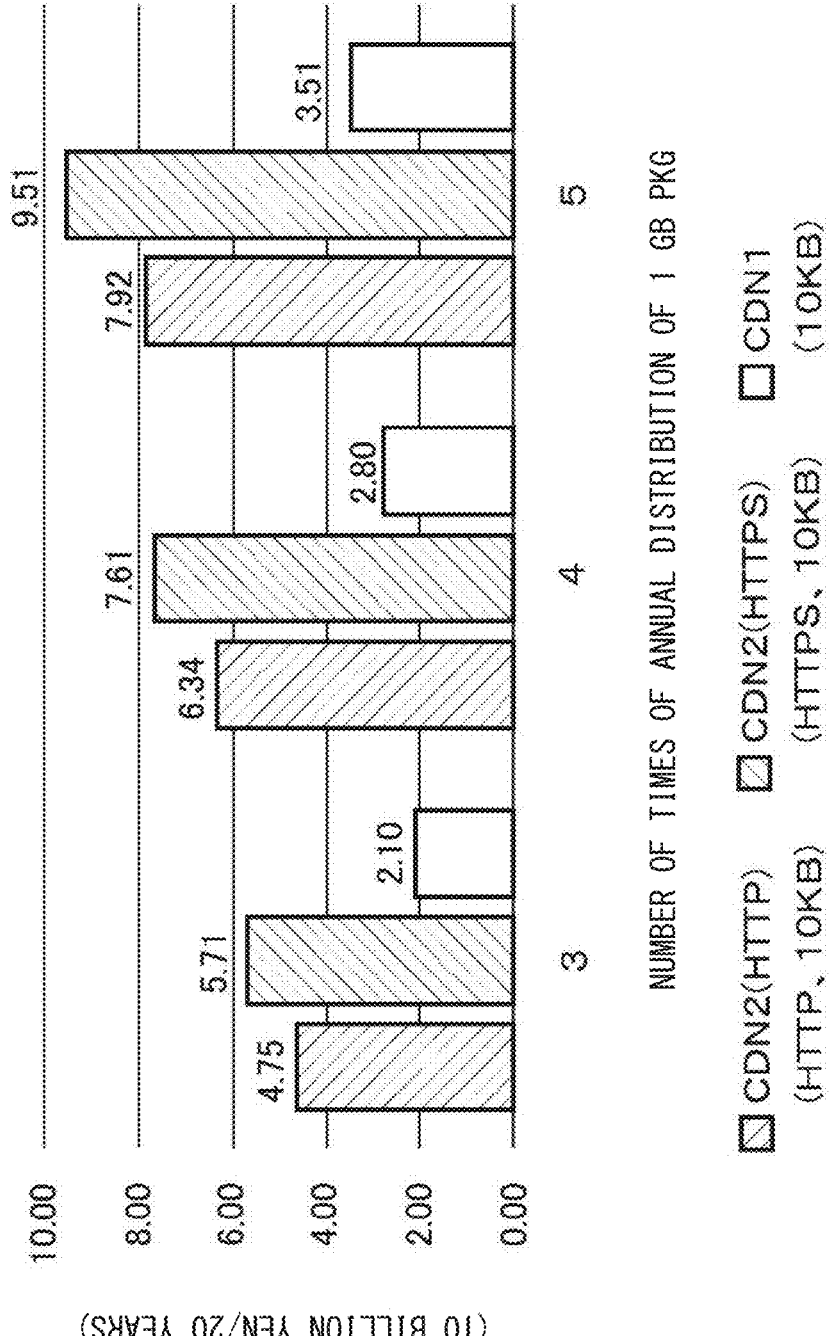
FIG. 89 is a diagram illustrating cost comparison of a CDN.

The tenth embodiment will be described with reference to FIGS. 87 to 98. In the tenth embodiment, a plurality of CDN vendors is dynamically selected as placement destinations of the update package to the CDN 8 according to a distribution method, an OTA target area which is a distribution area, and a distribution data size, and a distribution cost is suppressed. The cost comparison of the CDN is as shown in FIG. 88 to FIG. 89. The price table is as illustrated in FIGS. 90 to 93. Each CDN vendor has different superiority and inferiority in price depending on distribution areas, distribution data sizes, and the like in Japan, North America, and the like. For example, referring to FIG. 90, when a data size of 100 TB per month is distributed, the CDN 2 is the lowest in Japan, but the CDN 1 is the lowest in North America and EU. Based on this fact, a CDN vendor with the lowest distribution cost is selected according to the distribution method, the OTA target area, and the distribution data size.

Figure 94:
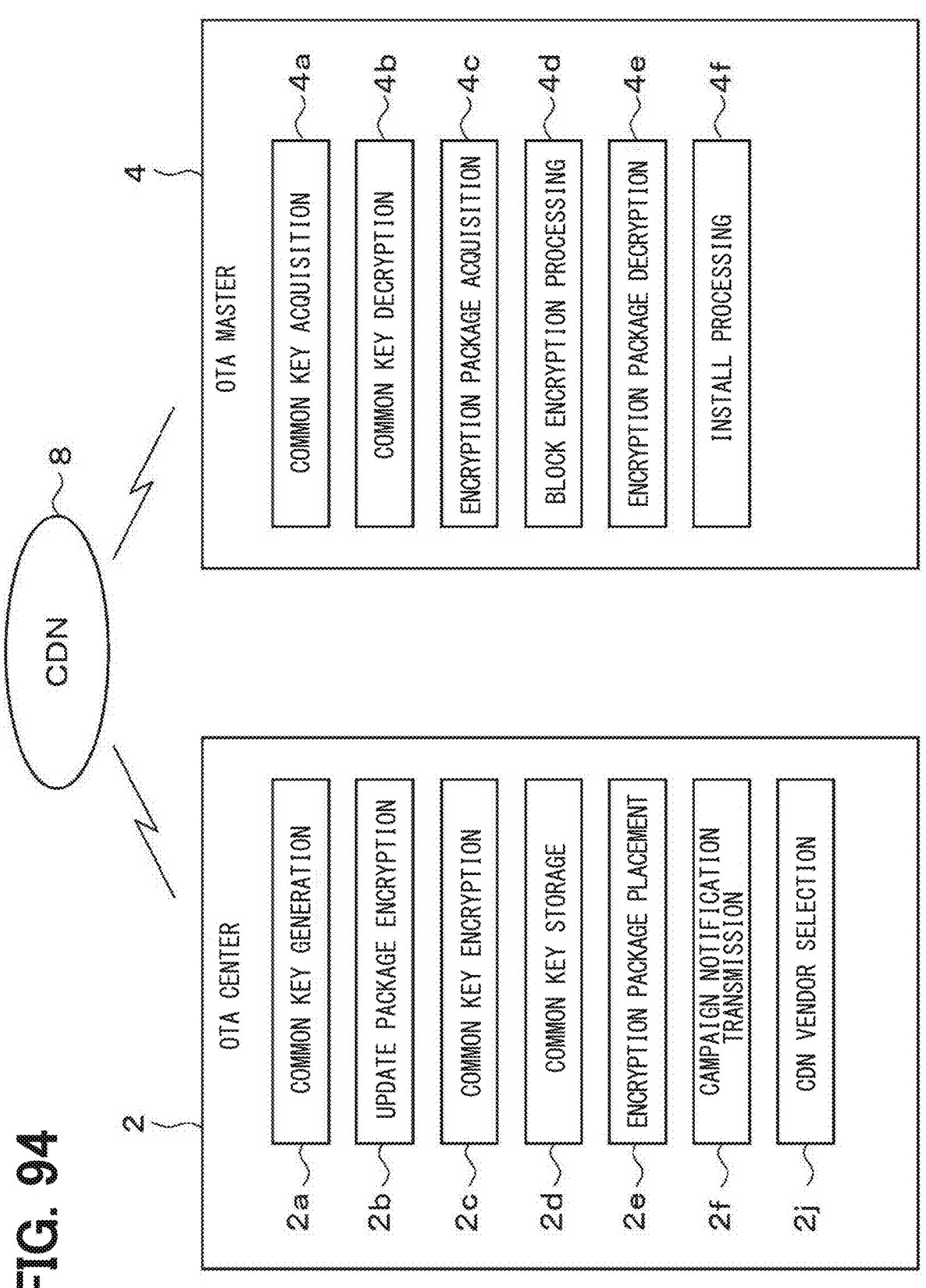
FIG. 94 is a functional block diagram of the OTA center and the OTA master.
Figure 95:
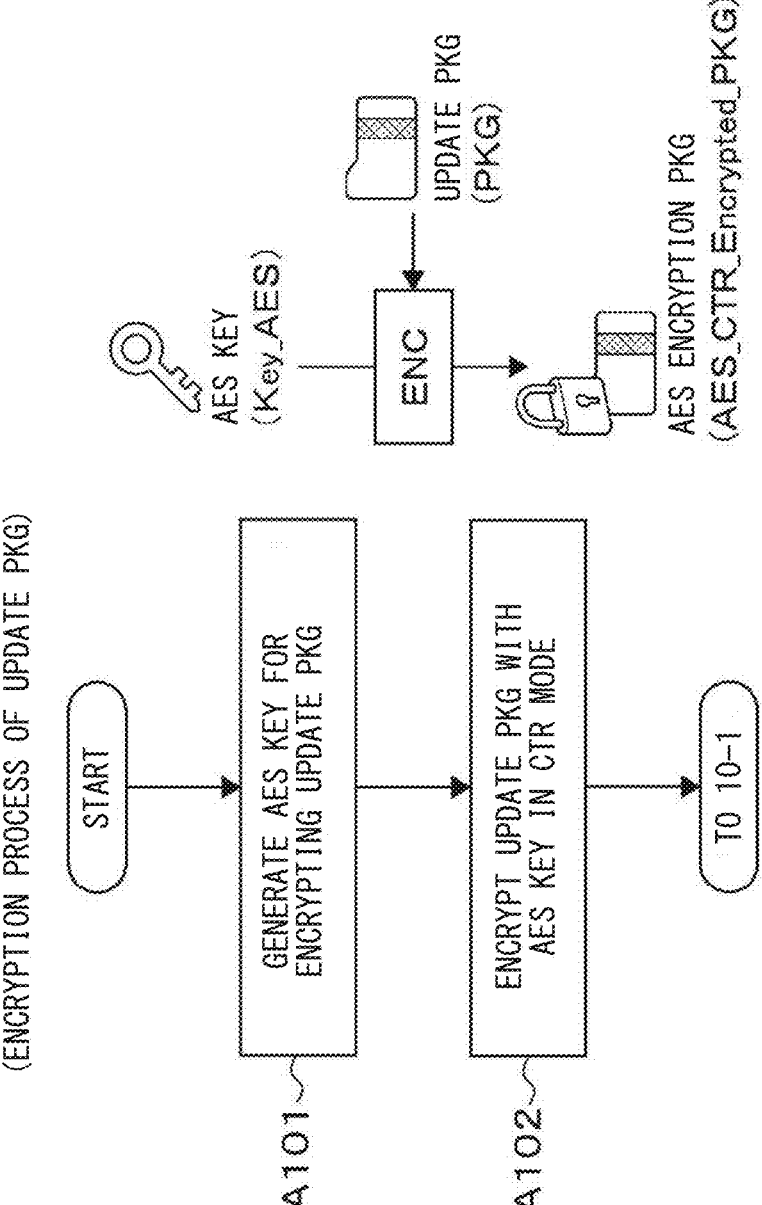
FIG. 95 is a diagram illustrating a process by the OTA center.
Figure 96:
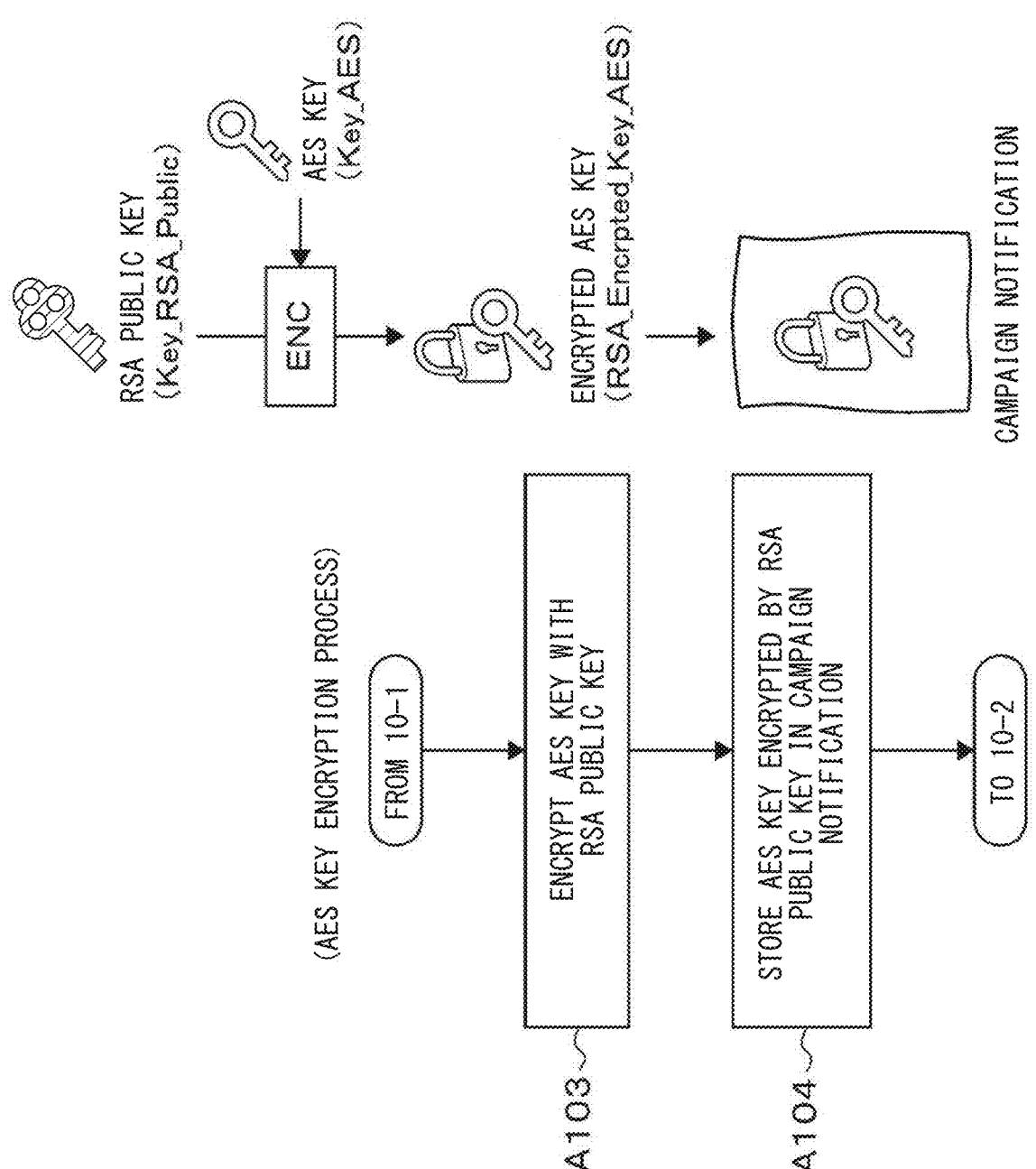
FIG. 96 is a diagram illustrating a process by the OTA center.
Figure 97:
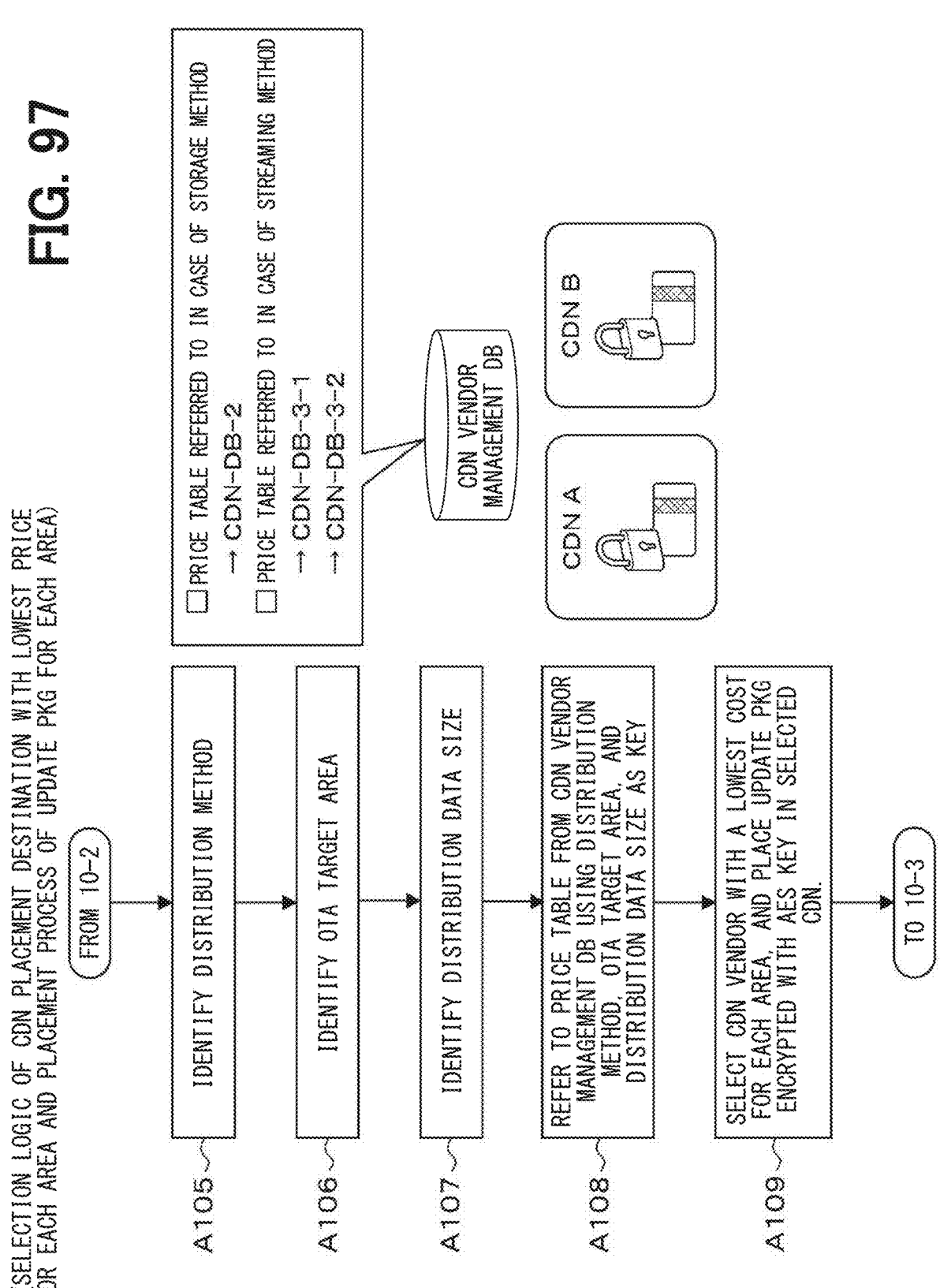
FIG. 97 is a diagram illustrating a process by the OTA center.
Figure 99:
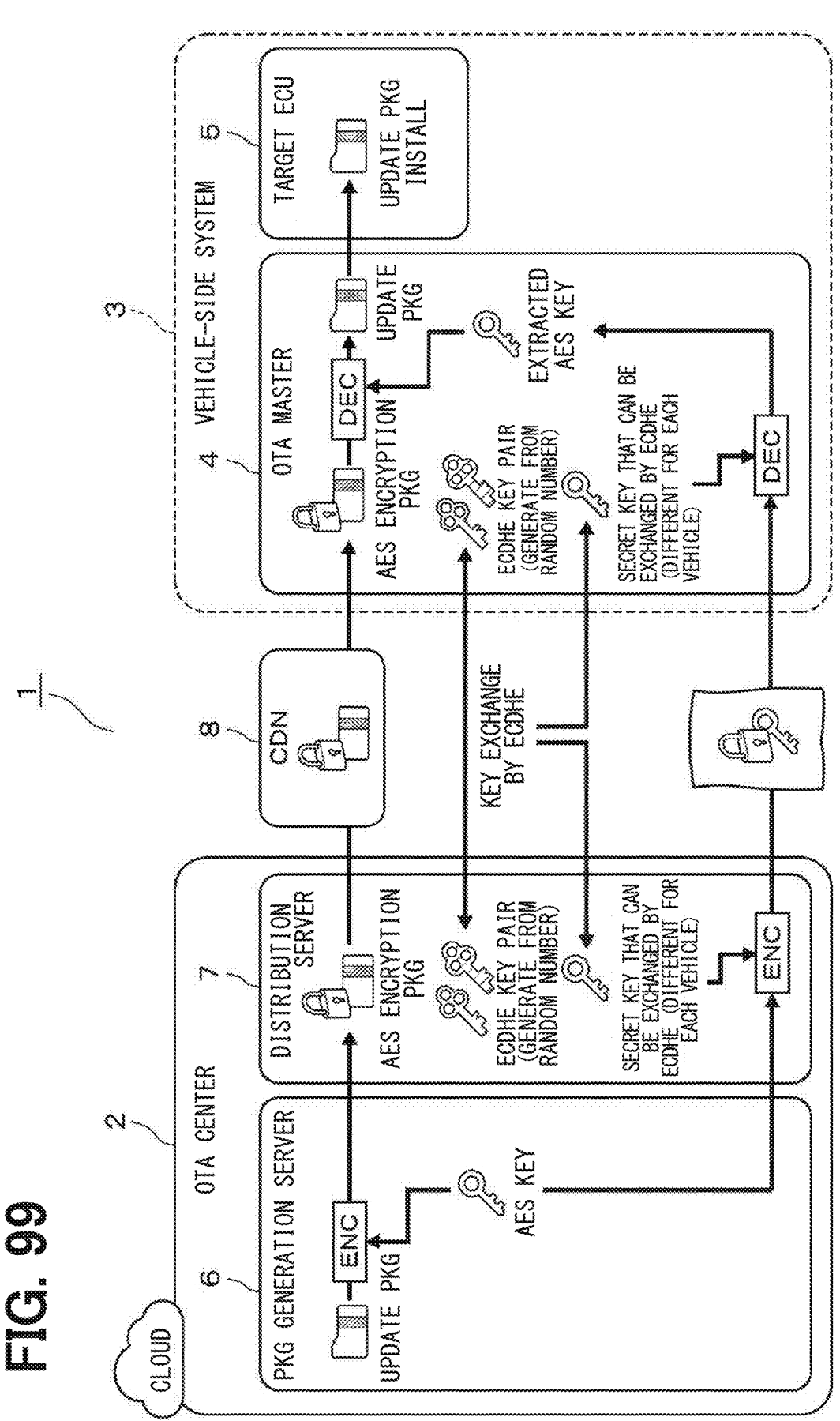
FIG. 99 is a diagram illustrating a flow of a process in the entire system according to the eleventh embodiment.

As illustrated in FIG. 94, the OTA center 2 includes a CDN vendor selection section 2j in addition to the common key generation section 2a, the update package encryption section 2b, the common key encryption section 2c, the common key storage section 2d, the encryption package placement section 2e, and the campaign notification transmission section 2f. The CDN vendor selection section 2j selects a CDN vendor by referring to the CDN vendor management database.

Next, the operation of the above-described configuration will be described with reference to FIGS. 95 to 98.

(10-1) Process by OTA Center 2 (See FIGS. 95 to 98)

The OTA center 2 generates an AES key for encrypting the update package (A101). The OTA center 2 encrypts the update package with the generated AES key in the CTR mode (A102). The OTA center 2 encrypts the AES key with the RSA public key (A103). The OTA center 2 stores the AES key encrypted with the RSA public key in the campaign notification (A104). The OTA center 2 identifies the distribution method (A105), identifies the OTA target area (A106), identifies the distribution data size (A107), and refers to the price table from the CDN vendor management database using the distribution method, the OTA target area, and the distribution data size as keys (A108). In this case, the OTA center 2 may refer to the price table using at least one of a distribution method such as a storage method or a streaming method, an OTA target area such as Japan, North America, or the European Union (EU), and a distribution data size such as GB, TB, or PB as a key. The OTA center 2 selects a CDN vendor with the lowest distribution cost for each area, and places an update package encrypted with an AES key in the selected CDN 8 (A109, corresponding to CDN vendor selection step). Alternatively, the OTA center 2 may place an update package encrypted with an AES key in each CDN 8. The OTA center 2 transmits the encrypted AES key and a campaign notification in which the data storage destination of the update package and URI information are stored so that the selected CDN vendor can be accessed to the vehicle-side system 3 to be reprogrammed (A110).

(10-2) Process by OTA Master 4

The process by the OTA master 4 is similar to the process (FIGS. 12 to 14) of the OTA master 4 described in the first embodiment.

As described above, according to the tenth embodiment, the following operational effects can be obtained.

By referring to the CDN vendor management database, the CDN 8 having the superior distribution cost is selected from a plurality of CDNs 8 having different distribution costs according to the distribution method, the OTA target area, and the distribution data size, and the update package is placed in the selected CDN 8. It is possible to appropriately suppress the distribution cost when the OTA master 4 downloads the update package from the OTA center 2. In addition, by encrypting the update package in the OTA center 2, in principle, there is no security problem even if the intermediate path is a zero trust. Therefore, there is no need to encrypt the update data on the edge side of the CDN 8, and the processing load and the security function of the CDN 8 can be reduced. Before the update package reaches the OTA master 4 from the OTA center 2, even when there is data tampering or the CDN 8 is subjected to a DDoS attack on an intermediate path, the OTA system is not affected, and it is possible to eliminate intelligent security measures, for example, safety auxiliary measures of multi-layer defense such as web application firewall, TLS communication, and a signed URL that limits the OTA master 4 to be distributed. As a result, the running cost of the OTA system can be reduced on a cost basis, and the distribution cost can be suppressed in any system configuration.

Eleventh Embodiment

The eleventh embodiment will be described with reference to FIGS. 99 to 108. In the eleventh embodiment, a Diffie-Hellman key exchange (hereinafter, referred to as DHE) or an Elliptic curve Diffie-Hellman key exchange (hereinafter referred to as (ECDHE) is used for key distribution between the OTA center 2 and the OTA master 4, and the OTA center 2 based on the exchanged secret information different for each vehicle and distributes the encrypted AES key to the OTA master 4, so that a vehicle model applicable to the CDN 8 or an update package applicable to each specific vehicle group is distributed while enjoying an advantage that forward secrecy of the ECDHE can be secured.

Figure 100:
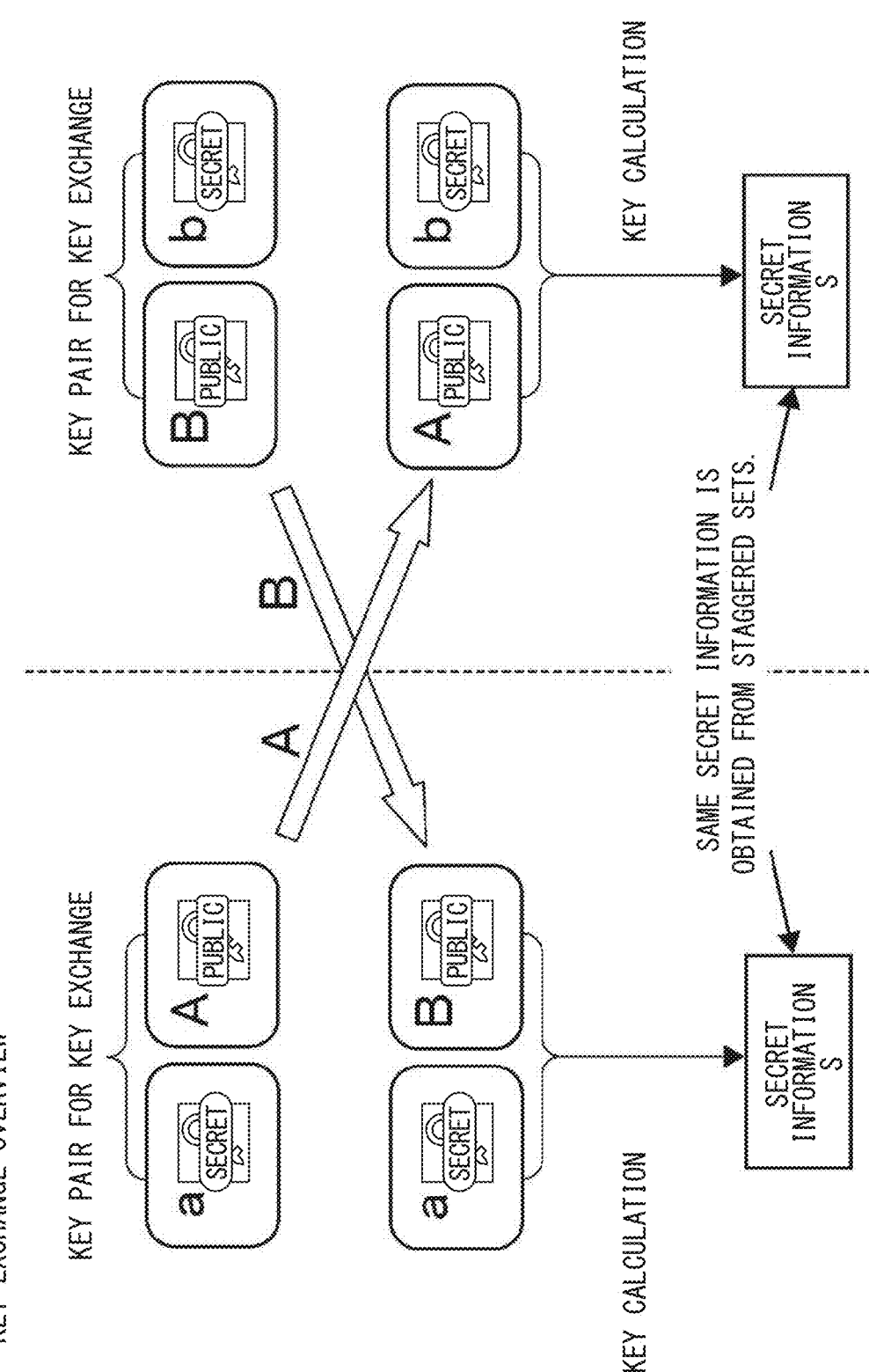
FIG. 100 is a diagram illustrating a common key that can be key exchanged by the DHE or the ECDHE.
Figure 101:
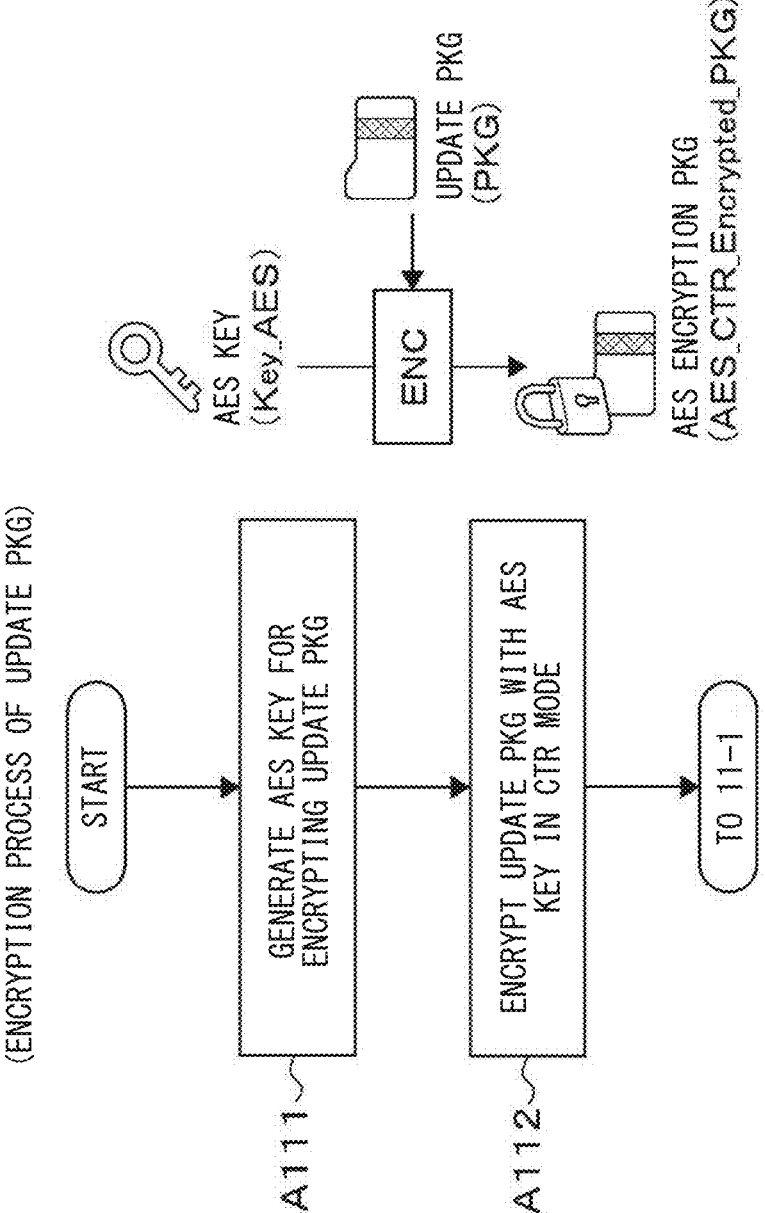
FIG. 101 is a diagram illustrating a process by the OTA center.
Figure 102:
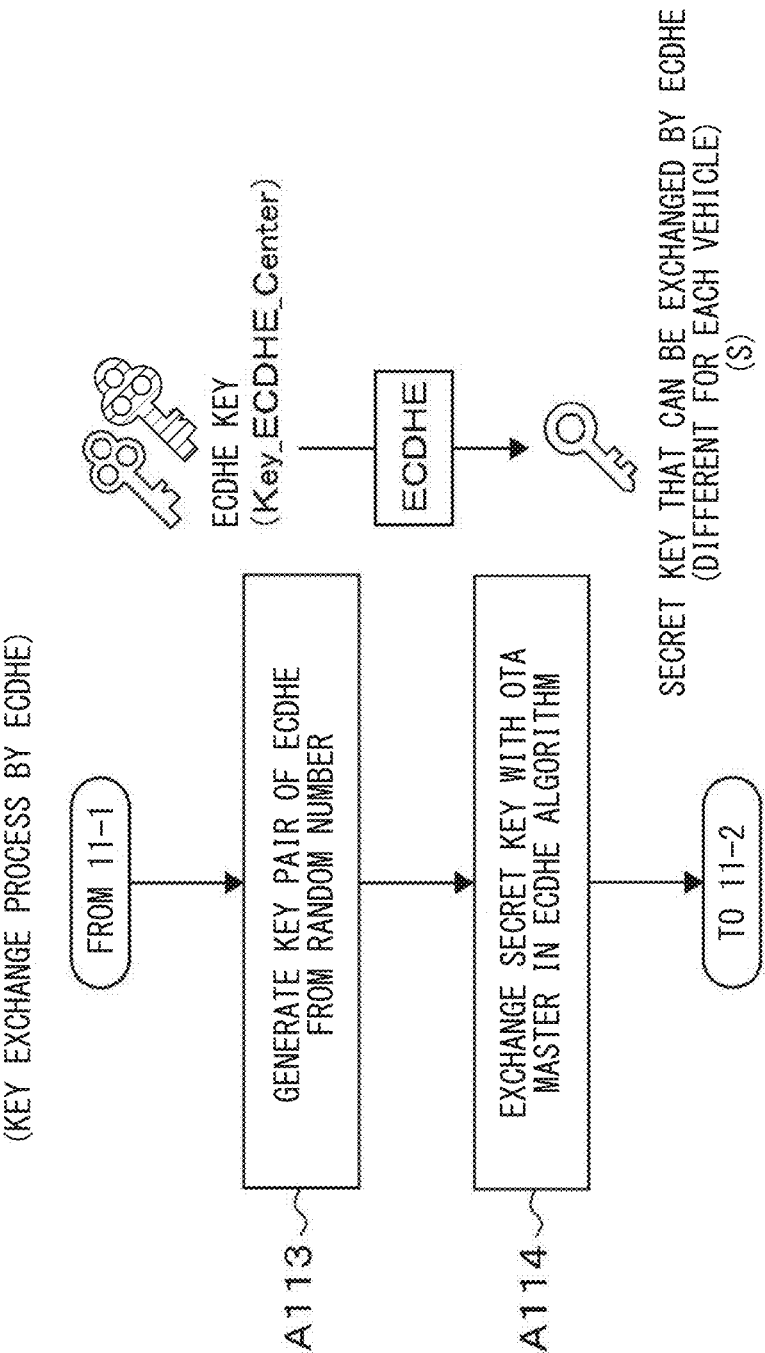
FIG. 102 is a diagram illustrating a process by the OTA center.
Figure 103:
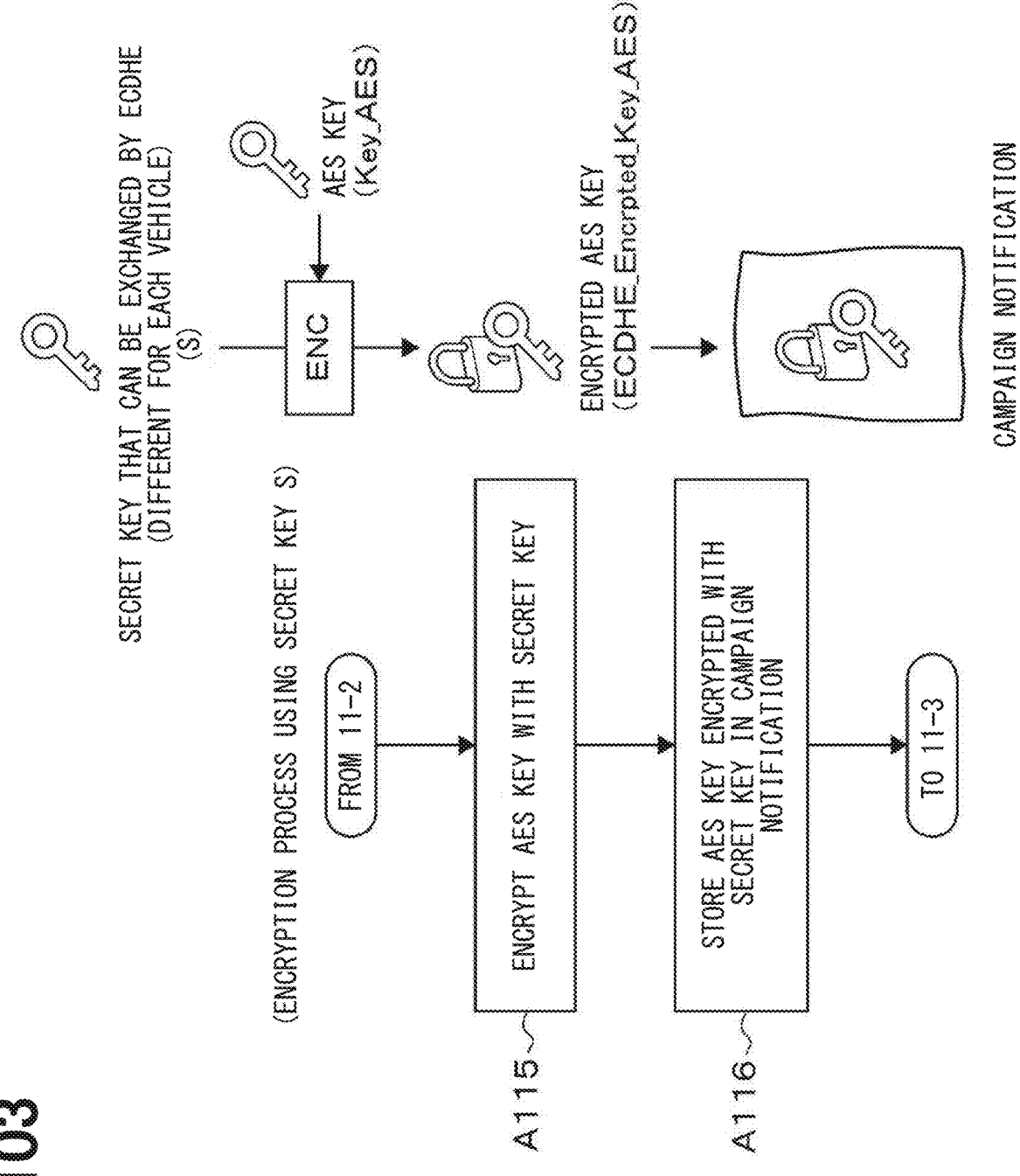
FIG. 103 is a diagram illustrating a process by the OTA center.
Figure 104:
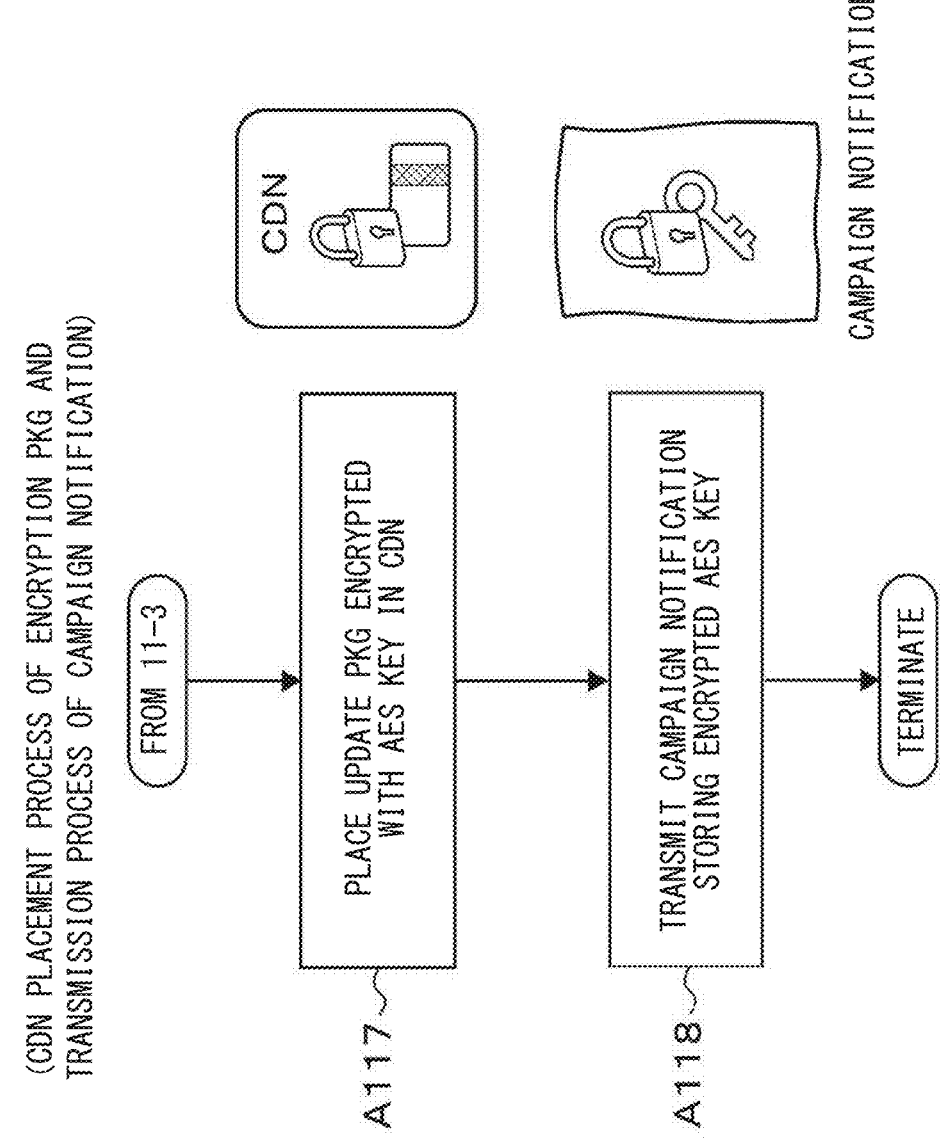
FIG. 104 is a diagram illustrating a process by the OTA center.
Figure 105:
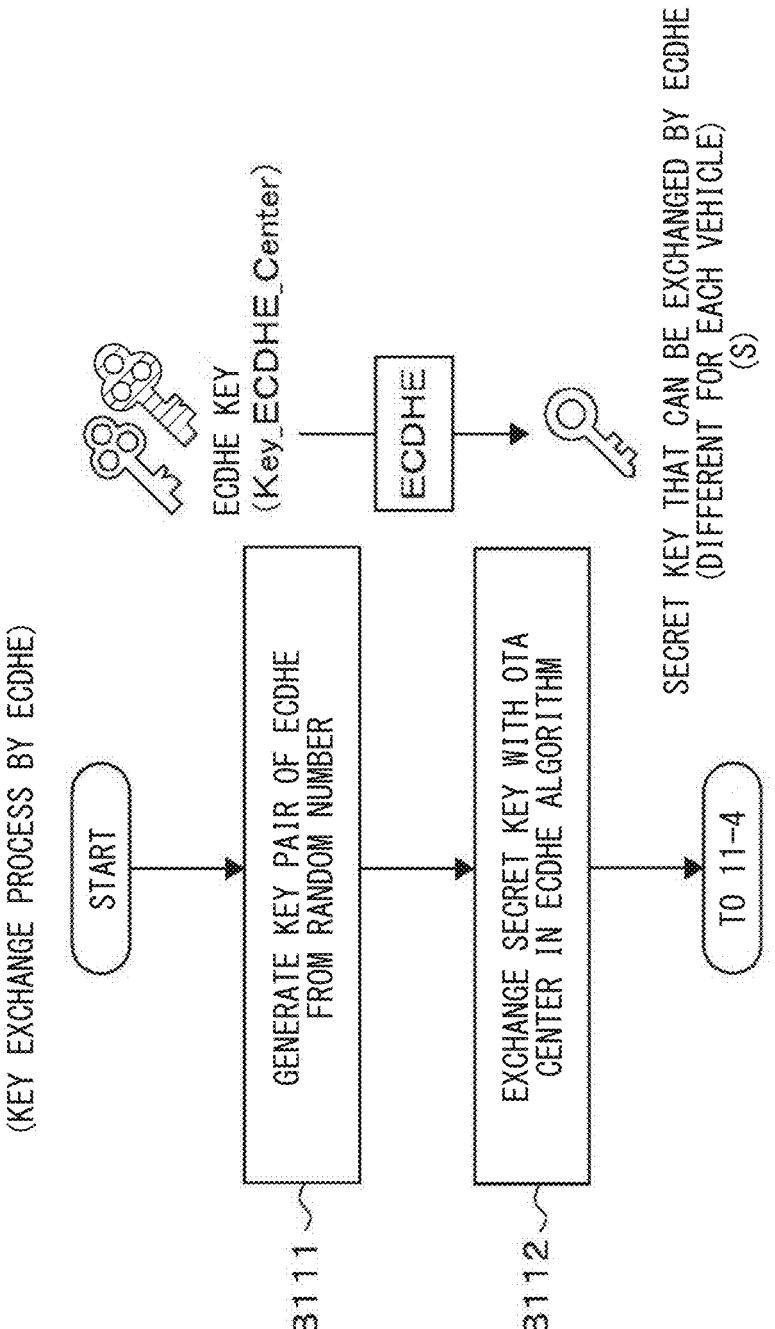
FIG. 105 is a diagram illustrating a process by the OTA master.
Figure 106:
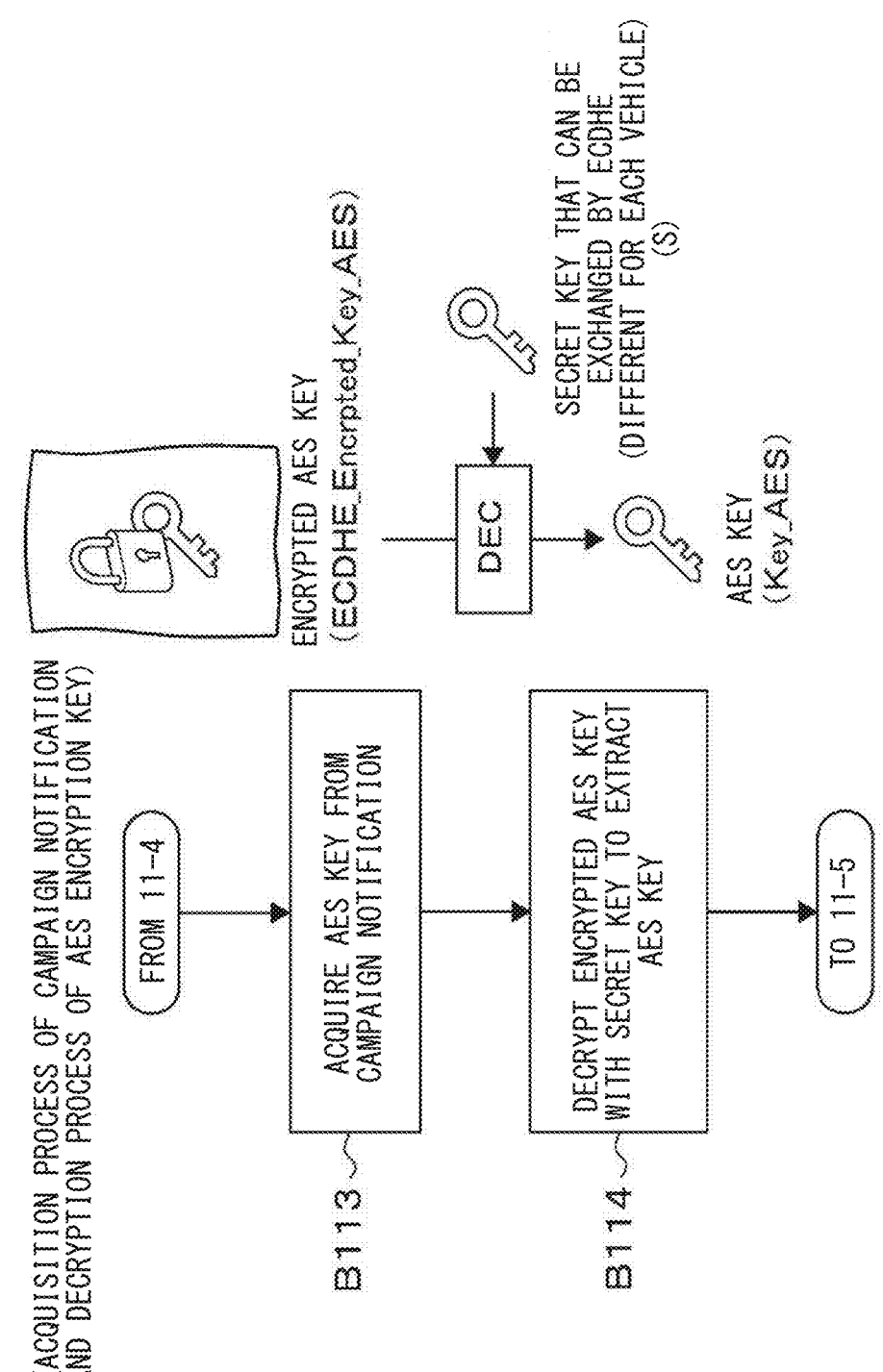
FIG. 106 is a diagram illustrating a process by the OTA master.
Figure 108:
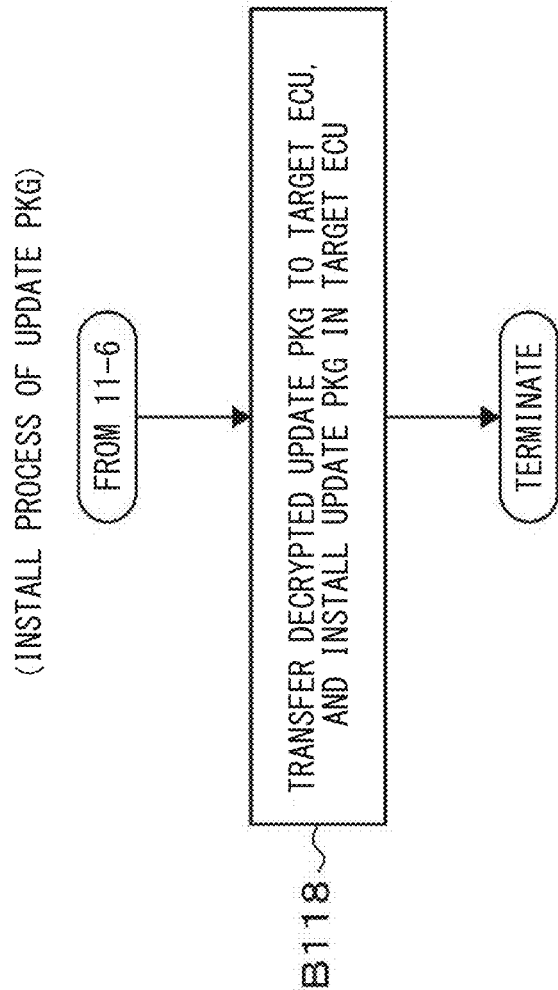
FIG. 108 is a diagram illustrating a process by the OTA master.
Figure 109:
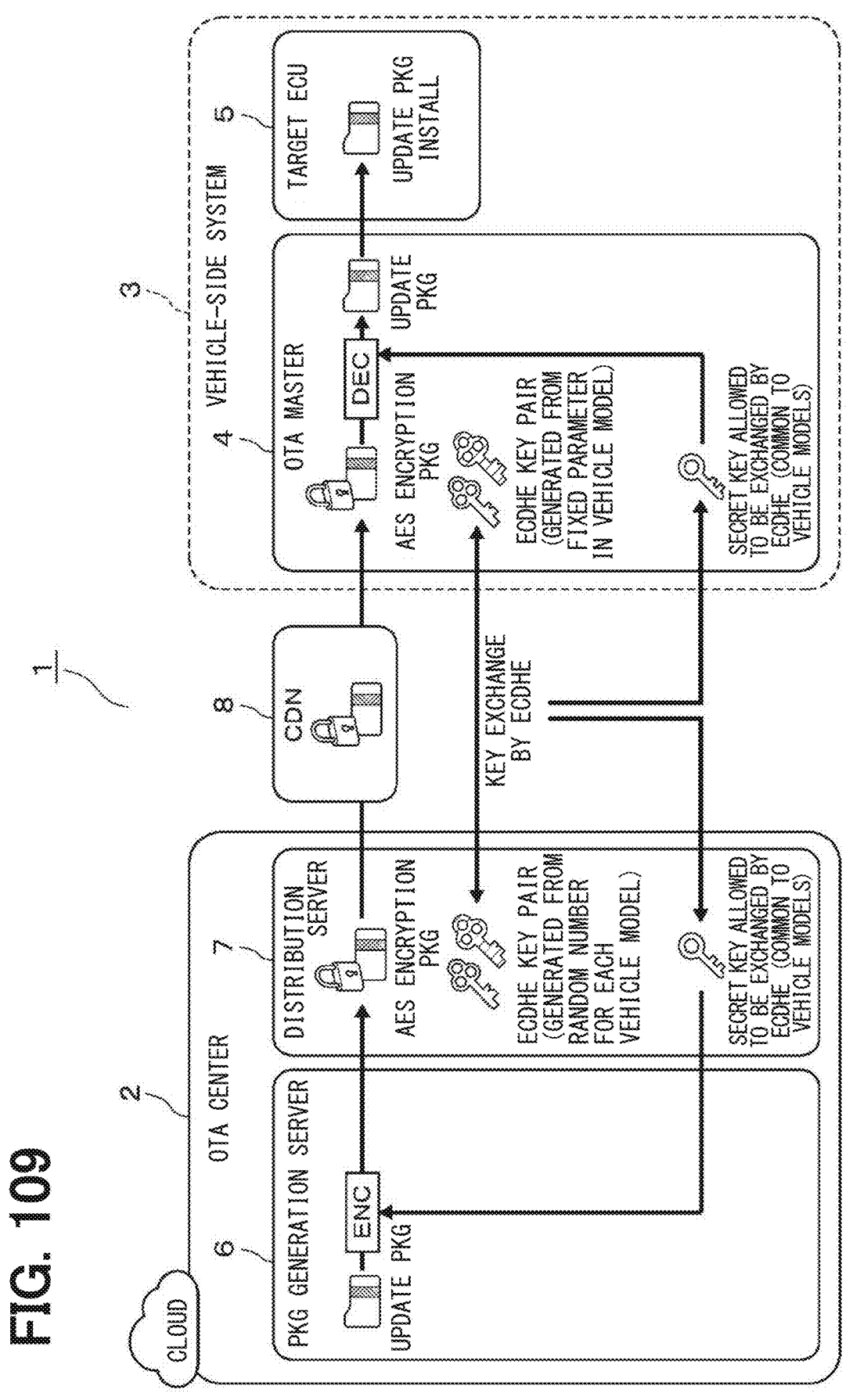
FIG. 109 is a diagram illustrating a flow of a process in the entire system according to the twelfth embodiment.

As illustrated in FIG. 100, both sides generate and exchange respective public keys (A, B) from random numbers (=secret keys a, b), and perform calculation in combination with their own secret keys, thereby exchanging the secret information(S) in secret. Pairs of the secret key and the public key (a/A, b/B) can be discarded after the secret information(S) is exchanged, and both the OTA center 2 and the OTA master 4 do not need to store the pairs the secret key and the public key in an HSM (hardware security module), so that the secret information(S) can be exchanged very securely. The exchanged secret information(S) can be used for a key of common key encryption or the like, but since the original data is a random number (a, b), the exchanged secret information(S) is a different key for each OTA master 4.

Next, the operation of the above-described configuration will be described with reference to FIGS. 101 to 108.

(11-1) Process by OTA Center 2 (See FIGS. 101 to 104)

The OTA center 2 generates an AES key for encrypting the update package (A111). The OTA center 2 encrypts the update package with the generated AES key in the CTR mode (A112). The OTA center 2 generates a key pair of the ECDHE from the random number (A113). The OTA center 2 exchanges a secret key with the OTA master 4 in the ECDHE algorithm (A114, corresponding to a secret information exchange step). The OTA center 2 encrypts the AES key with the secret key (A115). The OTA center 2 stores the AES key encrypted with the secret key in the campaign notification (A116). The OTA center 2 places the update package encrypted with the AES key in the CDN 8 (A117). The OTA center 2 transmits a campaign notification storing the encrypted AES key to the vehicle-side system 3 to be reprogrammed (A118, corresponding to encryption key distribution step).

Here, step A114 will be described. When the ignition of the vehicle is turned on and a predetermined period has elapsed since the synchronization of the previous vehicle configuration information, the OTA master 4 inquires the ECU mounted on the vehicle about the program version and collects the vehicle configuration information. Alternatively, upon receiving the push notification related to the campaign from the OTA center 2, the OTA master 4 inquires the ECU about the program version and collects the vehicle configuration information. Upon collecting the vehicle configuration information, the OTA master 4 establishes TLS communication with the OTA center 2 to transmit the vehicle configuration information to the OTA center 2. At this time, the OTA master 4 collects the vehicle configuration information and generates a key pair of the ECDHE. When establishing TLS communication with the OTA center 2, the OTA master 4 transmits a public key of the OTA master 4 of the key pair to the OTA center 2. The process in which the OTA master 4 collects the vehicle configuration information is also applied to other embodiments. The OTA center 2 acquires a secret key in the ECDHE algorithm based on the public key of the OTA master 4 acquired from the OTA master 4 and the secret key of the OTA center 2.

(11-2) Process by OTA Master 4 (See FIGS. 105 to 108)

The OTA master 4 generates a key pair of the ECDHE from the random number (B111). The OTA master 4 exchanges a secret key with the OTA center 2 in the ECDHE algorithm (B112, corresponding to a secret information exchange step). When the OTA master 4 acquires a campaign notification as the campaign notification transmitted from the OTA center 2 is received by the OTA master 4, the OTA master 4 acquires an AES key from the acquired campaign notification (B113). The OTA master 4 decrypts the encrypted AES key with the secret key to extract an AES key (B114). The OTA master 4 downloads and acquires the encrypted update package from the CDN 8 (B115).

At this time, in parallel with downloading and acquiring the encrypted update package from the CDN 8, the OTA master 4 executes an AES block encryption process of the counter value with the AES key to encrypt the counter value (B116). The OTA master 4 performs an XOR operation on and decrypts the encrypted counter value and the encrypted update package downloaded from the CDN 8 (B117). The OTA master 4 transfers the decrypted update package to the target ECU 5 and installs the update package in the target ECU 5 (B118).

As described above, according to the eleventh embodiment, the following operational effects can be obtained.

The DHE or the ECDHE is used for key distribution between the OTA center 2 and the OTA master 4, and the OTA center 2 encrypts the AES key based on the secret information different for each exchanged vehicle and distributes the AES key to the OTA master 4. As a result, efficient distribution of the update data by the CDN 8 can be appropriately realized while appropriately securing the forward secrecy of the ECDHE.

(Modification of Eleventh Embodiment)

A modification of the eleventh embodiment will be described with reference to FIGS. 166 to 173. The eleventh embodiment is described on the assumption that the wireless communication unit is mounted on the vehicle and the OTA master 4 can transmit and receive data to and from the OTA center 2 or the CDN 8 via the wireless communication line. However, there may be a case where the wireless communication unit is not mounted on the vehicle, or a case where the user does not like to use the wireless communication line. In the modification of the eleventh embodiment, a situation will be described in which the OTA master 4 does not transmit and receive data to and from the OTA center 2 or the CDN 8 via a wireless communication line, and instead executes program update using a storage medium such as an SD card.

The OTA master 4 and the OTA center 2 use a storage medium for data transfer with the outside. Data transfer between the OTA master 4 and the storage medium uses a port for the storage medium installed in the vehicle. The port installed in the vehicle is a port installed in, for example, a car navigation unit, a center display unit, or another vehicle control unit.

Data transfer between the OTA center 2 and the storage medium is performed by connecting the storage medium to a personal computer (hereinafter, referred to as a PC). For example, the storage medium is connected to a PC, a website of the OTA center 2 or the CDN 8 is accessed, and data stored in the storage medium is uploaded to the OTA center 2 by operating the PC, or data stored in the OTA center 2 is downloaded to the storage medium by operating the PC. A smartphone, a tablet terminal, or the like compatible with the storage medium can be used instead of the PC. A PC, a smartphone, a tablet terminal, or the like compatible with the storage medium is also referred to as an operation terminal.

A case where an SD card is used as a storage medium will be described with reference to FIGS. 166 to 169. In this case, the process is performed in the order of transfer of data from the OTA master 4 to a SD card 11, upload of data from the SD card 11 to the OTA center 2, download of data from the OTA center 2 to the SD card 11, and transfer of data from the SD card 11 to the OTA master 4.

The transfer of data from the OTA master 4 to the SD card 11 will be described with reference to FIG. 166. The OTA master 4 acquires software version information and the like from the target ECU 5, transfers the acquired software version information and the like to the SD card 11 as vehicle configuration information, and stores the vehicle configuration information. The OTA master 4 generates a key pair of the ECDHE from the random number, and transfers the ECDHE public key to the SD card 11 and stores the ECDHE public key. The SD card 11 stores the vehicle configuration information transferred from the OTA master 4 and the ECDHE public key of the OTA master 4.

With reference to FIG. 167, data upload from the PC to which the SD card 11 is connected to the OTA center 2 will be described. When the SD card 11 is connected, the PC reads the vehicle configuration information and the ECDHE public key of the OTA master 4 that are stored in the SD card 11, and uploads the vehicle configuration information and the ECDHE public key of the OTA master 4 that were read to the OTA center 2. The vehicle configuration information uploaded to the OTA center 2 is used by a PKG generation server 6 to determine the presence or absence of a campaign. The ECDHE public key of the OTA master 4 uploaded to the OTA center 2 exchanges a secret key based on an ECDHE algorithm in the distribution server 7. The secret key in this case is a secret key different for each vehicle.

Downloading data from the OTA center 2 to the SD card 11 will be described with reference to FIG. 168. Here, a case where there is a campaign is illustrated. The OTA center 2 downloads the update package encrypted with the AES key to the SD card 11 and stores the update package. The OTA center 2 generates a key pair of the ECDHE from the random number, downloads a key to be exchanged with the OTA master 4 (the ECDHE public key of the OTA center 2) to the SD card 11 to store the key. The OTA center 2 downloads the campaign notification in which the encrypted AES key is stored to the SD card 11 and stores the campaign notification. The SD card 11 stores the update package downloaded from the OTA center 2, the ECDHE public key of the OTA center 2, and the encrypted AES key.

The transfer of data from the SD card 11 to the OTA master 4 will be described with reference to FIG. 169. The OTA master 4 reads and acquires the encrypted update package, the ECDHE public key of the OTA center 2, and the encrypted AES key that are stored in the SD card 11 from the SD card 11.

Next, the operation of the above-described configuration will be described with reference to FIGS. 170 to 174.

(11-3) Process by OTA Master 4 (See FIG. 170)

When the SD card 11 is connected to the vehicle-side system 3 and a predetermined condition is satisfied, the OTA master 4 requests the target ECU 5 to transmit configuration information such as software version information, and acquires the configuration information such as software version information transmitted from the target ECU 5 as vehicle configuration information (B1111). Upon acquiring the vehicle configuration information, the OTA master 4 transfers the acquired vehicle configuration information to the SD card 11 and stores the vehicle configuration information (B1112). The OTA master 4 generates a key pair of the ECDHE from the random number (B1113). In this case, the key pair includes the ECDHE public key and the ECDHE secret key of the OTA master 4. The OTA master 4 transfers the ECDHE public key of the OTA master 4 to the SD card 11 and stores the ECDHE public key (B1114). When the vehicle configuration information and the ECDHE public key of the OTA master 4 are stored in this manner, the SD card 11 is disconnected from the vehicle-side system 3 and connected to the PC.

(11-4) Process by PC (See FIG. 171)

When the SD card 11 is connected, the PC reads the vehicle configuration information and the ECDHE public key of the OTA master 4 that are stored in the SD card 11, and uploads the vehicle configuration information and the ECDHE public key of the OTA master 4 that were read to the OTA center 2 (C1111). The PC waits for reception of the campaign notification in which the ECDHE public key and the AES key of the OTA master 4 are stored and the encrypted update package from the OTA center 2, and also waits for reception of the notification without campaign (C1112, C1113). When it is determined that the campaign notification in which the ECDHE public key and the AES key of the OTA master 4 are stored and the encrypted update package have been received from the OTA center 2 (C1112: YES), or when it is determined that the notification without campaign has been received (C1113: YES), the PC terminates the process.

(11-5) Process by OTA Center 2 (See FIG. 172)

The OTA center 2 generates an AES key for encrypting the update package, and encrypts the update package with the AES key in the CTR mode. The OTA center 2 acquires the vehicle configuration information and the ECDHE public key of the OTA master 4 uploaded from the PC to which the SD card 11 is connected (A1111). The OTA center 2 determines whether there is a campaign based on the vehicle configuration information (A1112). When determining that there is no campaign (A1112: NO), the OTA center 2 transmits the notification without campaign to the PC (A1113), and terminates the process.

When determining that there is a campaign (A1112: YES), the OTA center 2 generates a key pair of the ECDHE from random numbers (A1114). In this case, the key pair is the ECDHE public key and the ECDHE secret key of the OTA center 2. The OTA center 2 downloads the ECDHE public key of the OTA center 2 to the SD card 11 and stores the ECDHE public key (A1115). The OTA center 2 generates an ECDHE common key (secret key) from the ECDHE secret key of the OTA center 2 and the ECDHE public key of the OTA master 4 (A1116), and encrypts the AES key with the generated ECDHE common key (secret key) (A1117). The OTA center 2 stores the encrypted AES key in the campaign notification, and downloads the campaign notification storing the encrypted AES key to the SD card 11 and stores the campaign notification (A1118). The OTA center 2 downloads the encrypted update package to the SD card 11 and stores the encrypted update package (A1119).

(11-6) Process by OTA Master 4 (See FIG. 173)

When the SD card 11 is connected to the vehicle-side system 3, the OTA master 4 acquires the ECDHE public key, the campaign notification, and the update package of the OTA center 2 from the SD card 11 (B1121). The OTA master 4 generates an ECDHE common key (secret key) from the ECDHE secret key of the OTA master 4 and the ECDHE public key of the OTA center 2 (B1122). The OTA master 4 extracts the encrypted AES key from the campaign notification and decrypts the encrypted AES key with the ECDHE common key (secret key) (B1123). The OTA master 4 executes an AES block encryption process on the counter value with the AES key to encrypt the counter value (B1124). The OTA master 4 performs an XOR operation on and decrypts the encrypted counter value and the encrypted update package (B1125). The OTA master 4 transfers the decrypted update package to the target ECU 5 and installs the update package in the target ECU 5 (B1126).

According to such a configuration, efficient distribution of the update data by the CDN 8 can be appropriately realized while appropriately securing the forward secrecy of the ECDHE without depending on the wireless communication function of the vehicle-side system 3. Furthermore, by suppressing the number of times of data transfer between the OTA master 4 and the SD card 11 and upload and download between the OTA center 2 and the SD card 11, convenience for the user can be enhanced.

Twelfth Embodiment

The twelfth embodiment will be described with reference to FIGS. 109 to 115. In the twelfth embodiment, in the key exchange by the ECDHE, the random number a generated in the OTA center 2 is a random number (random number according to a specific rule) for each vehicle model, and the random number b generated in the OTA master 4 is any one of a fixed value, a count-up value, and a hash value of a software version of the OTA master 4, or a combination thereof for each vehicle model, so that a secret key exchanged by the ECDHE is made common for each vehicle model, a process of distributing the key is omitted while enjoying the advantage of securing the forward secrecy of the ECDHE, and an encryption package applicable to each vehicle model or specific vehicle group is CDN distributed.

Next, the operation of the above-described configuration will be described with reference to FIGS. 110 to 115.

Figure 110:
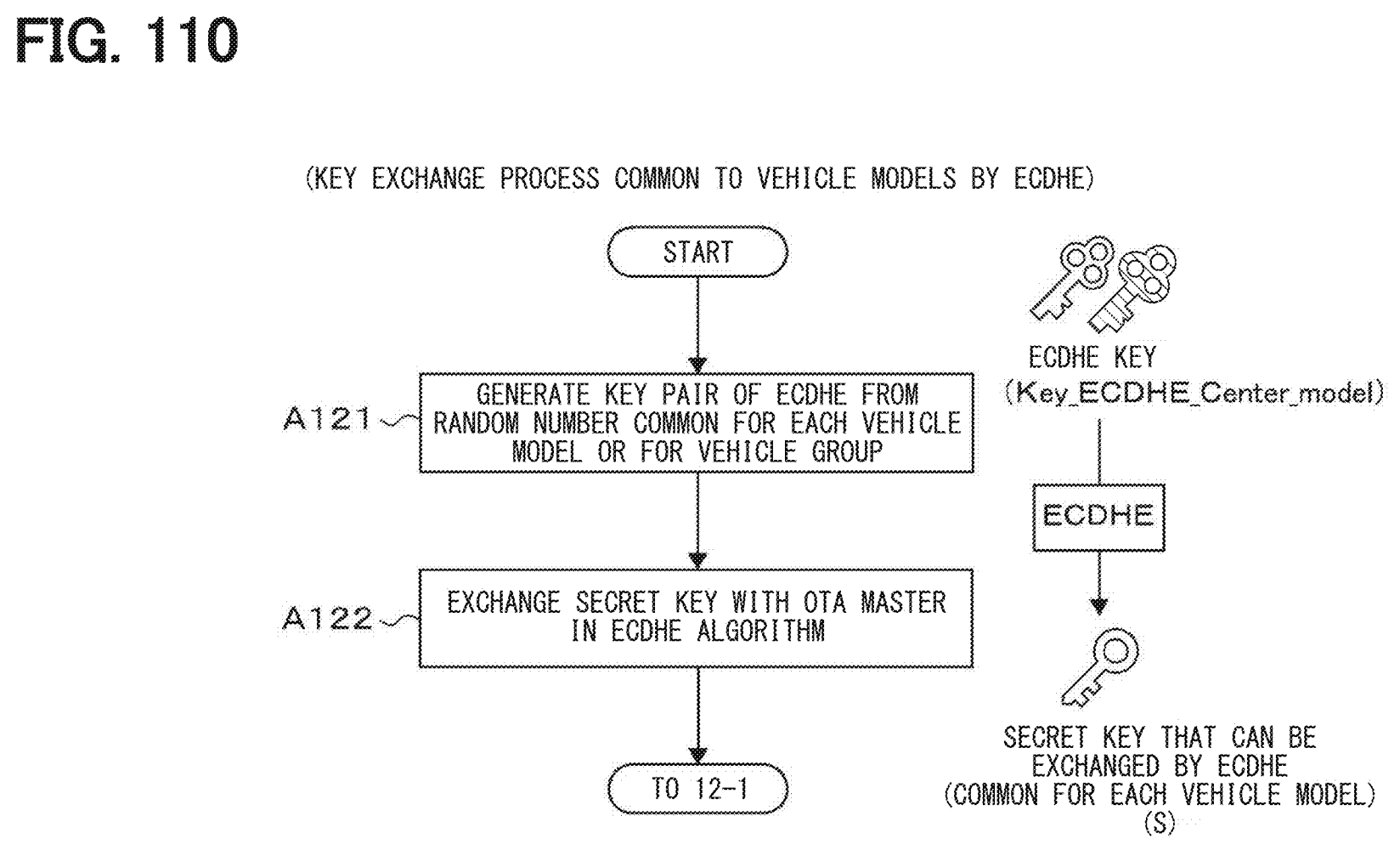

(12-1) Process by OTA Center 2 (See FIGS. 110 to 112)

The OTA center 2 generates a key pair of the ECDHE from a random number common to each vehicle model or each vehicle group (A121). The OTA center 2 exchanges a secret key with the OTA master 4 in the ECDHE algorithm (A122, corresponding to a secret information exchange step). In the present embodiment, a secret key exchanged with the OTA master 4 in the ECDHE algorithm is used as an AES key for encrypting the update package. Further, the OTA master 4 uses a secret key exchanged with the OTA center 2 as an AES key for decrypting the encrypted update package. The OTA center 2 generates an AES key for encrypting the update package (A123). The OTA center 2 encrypts the update package with the generated AES key in the CTR mode (A124). The OTA center 2 places the update package encrypted with the AES key in the CDN 8 (A125). The OTA center 2 transmits a campaign notification storing the encrypted AES key to the vehicle-side system 3 to be reprogrammed (A126, corresponding to encryption key distribution step).

Figure 113:
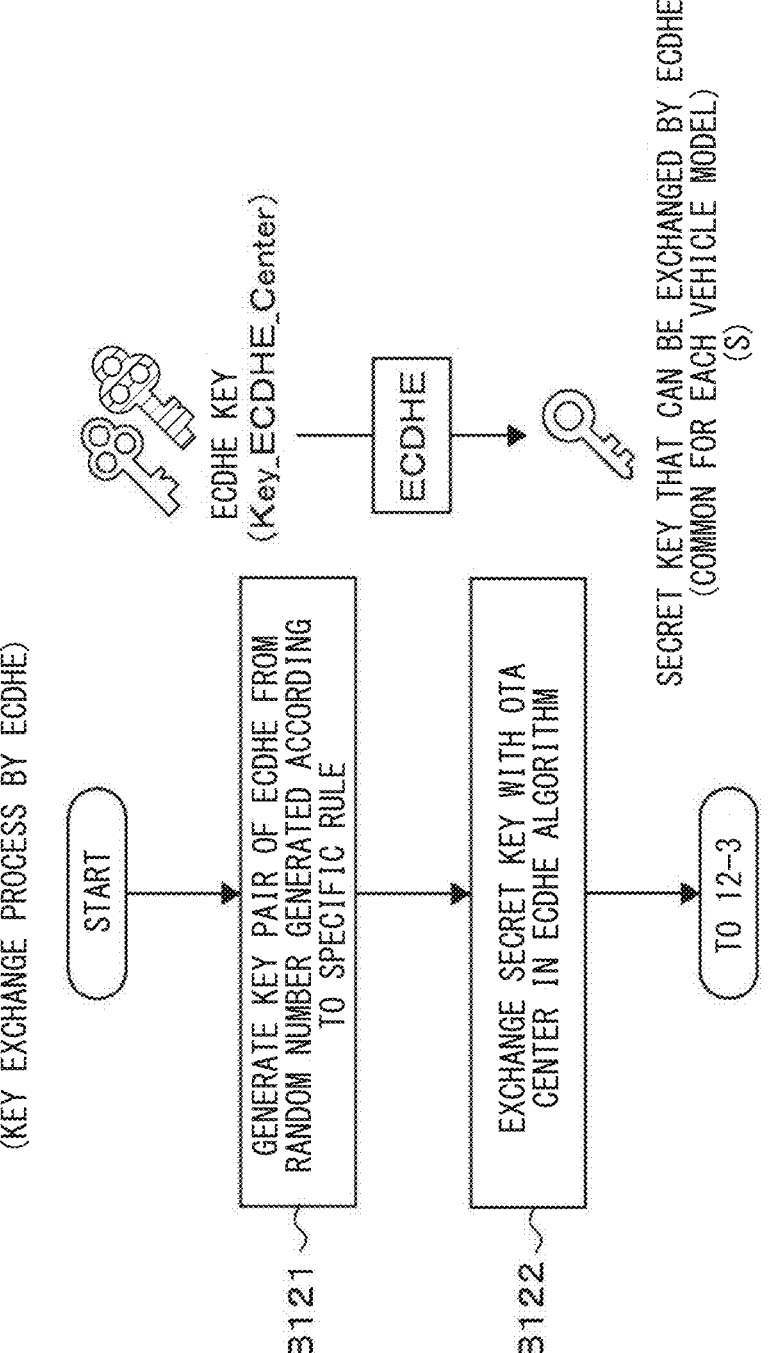
FIG. 113 is a diagram illustrating a process by the OTA master.
Figure 116:
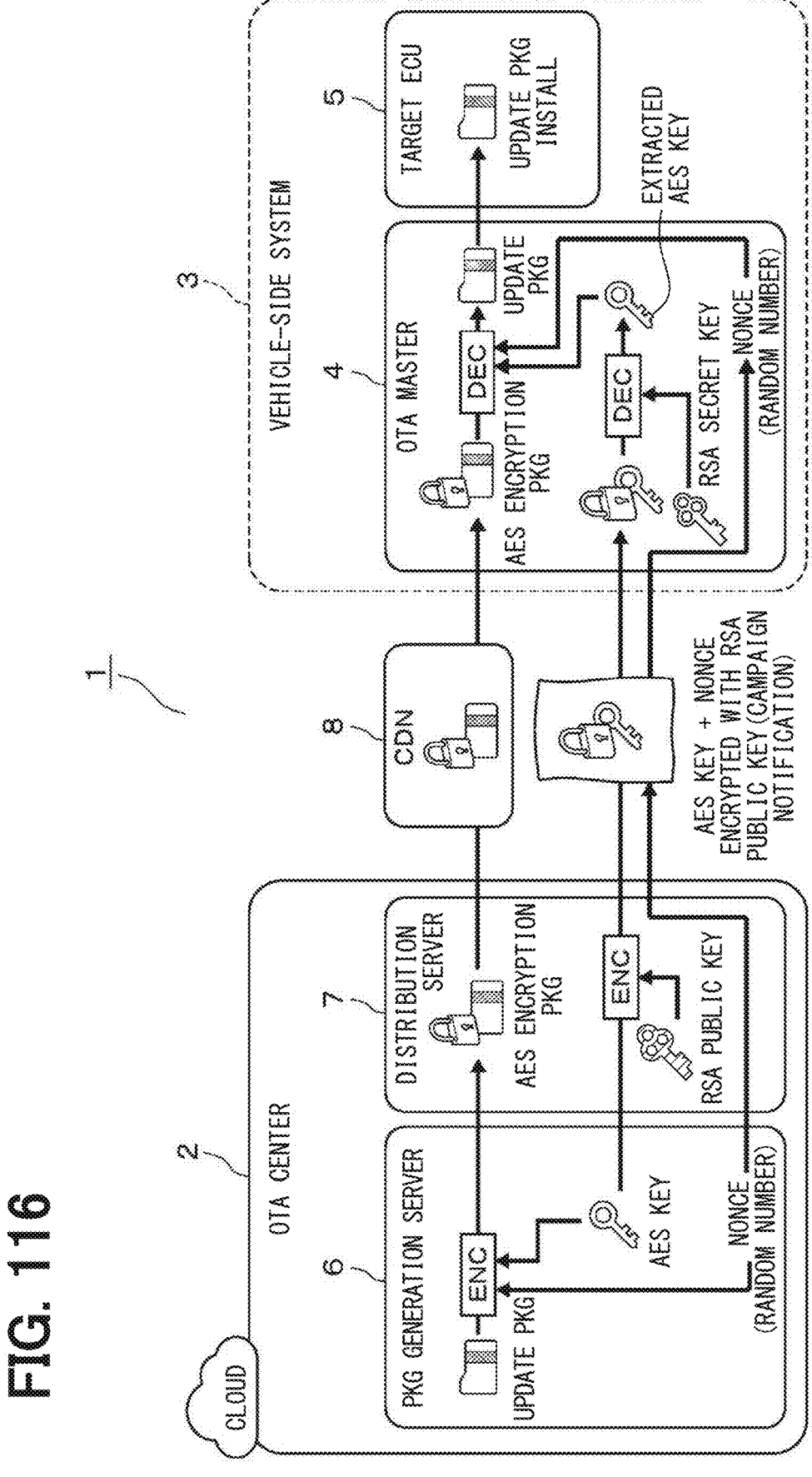
FIG. 116 is a diagram illustrating a flow of a process in the entire system according to the thirteenth embodiment.

(12-2) Process by OTA Master 4 (See FIGS. 113 to 115)

The OTA master 4 generates a key pair of the ECDHE from the random number generated according to the specific rule described above (B121). The OTA center 2 exchanges a secret key with the OTA center 2 in the ECDHE algorithm (B122, corresponding to a secret information exchange step). The OTA master 4 downloads and acquires the encrypted update package from the CDN 8 (B123).

At this time, in parallel with downloading and acquiring the encrypted update package from the CDN 8, the OTA master 4 executes an AES block encryption process of the counter value with the AES key to encrypt the counter value (B124). The OTA master 4 performs an XOR operation on and decrypts the encrypted counter value and the encrypted update package downloaded from the CDN 8 (B125). The OTA master 4 transfers the decrypted update package to the target ECU 5 and installs the update package in the target ECU 5 (B126).

As described above, according to the twelfth embodiment, the following operational effects can be obtained.

The DHE or the ECDHE is used for key distribution between the OTA center 2 and the OTA master 4, and a secret key exchanged by the ECDHE is common for each vehicle model. As a result, efficient distribution of the update data by the CDN 8 can be appropriately realized while appropriately securing the forward secrecy of the ECDHE and simplifying the time and effort of the key distribution as compared with the eleventh embodiment.

(Modification of Twelfth Embodiment)

A modification of the twelfth embodiment will be described with reference to FIGS. 174 to 181. Also in the modification of the twelfth embodiment, as in the modification of the eleventh embodiment, a situation will be described in which the OTA master 4 does not transmit and receive data to and from the OTA center 2 or the CDN 8 via the wireless communication line and instead executes program update using a storage medium such as an SD card.

The transfer of data from the OTA master 4 to the SD card 11 will be described with reference to FIG. 174. The OTA master 4 acquires software version information and the like from the target ECU 5, transfers the acquired software version information and the like to the SD card 11 as vehicle configuration information, and stores the vehicle configuration information. The OTA master 4 generate a key pair of the ECDHE common for each vehicle model using any one of a fixed value, a count-up value, and a hash value of a software version of the OTA master 4, or a combination thereof for each vehicle model, and transfers a key to be exchanged with the OTA center 2 (ECDHE public key of the OTA master 4) to the SD card 11 and stores the key. Any one of a fixed value, a count-up value, and a hash value of a software version of the OTA master 4, or a combination thereof for each vehicle model corresponds to a specific rule. The SD card 11 stores the vehicle configuration information transferred from the OTA master 4 and the ECDHE public key of the OTA master 4.

With reference to FIG. 175, data upload from the PC to which the SD card 11 is connected to the OTA center 2 will be described. When the SD card 11 is connected, the PC reads the vehicle configuration information and the ECDHE public key of the OTA master 4 that are stored in the SD card 11, and uploads the vehicle configuration information and the ECDHE public key of the OTA master 4 that were read to the OTA center 2. The vehicle configuration information uploaded to the OTA center 2 is used by a PKG generation server 6 to determine the presence or absence of a campaign. In addition, the ECDHE public key of the OTA master 4 uploaded to the OTA center 2 exchanges a secret key based on an ECDHE algorithm in the distribution server 7. The secret key in this case is a secret key common to each vehicle model.

Downloading data from the OTA center 2 to the SD card 11 will be described with reference to FIG. 176. The OTA center 2 generates a key pair of the ECDHE from a random number common to each vehicle model or each vehicle group, downloads a key to be exchanged with the OTA master 4 (the ECDHE public key of the OTA center 2) to the SD card 11 to store the key. The OTA center 2 encrypts the update package by using the secret key that can be exchanged by the ECDHE as the AES key, and downloads the encrypted update package to the SD card 11 and stores the update package. The SD card 11 stores the ECDHE public key and the update package of the OTA center 2 downloaded from the OTA center 2.

The transfer of data from the SD card 11 to the OTA master 4 will be described with reference to FIG. 177. The OTA master 4 reads and acquires the encrypted update package and the ECDHE public key of the OTA center 2 that are stored in the SD card 11. The OTA master 4 exchanges a secret key based on the ECDHE algorithm. The OTA master 4 decrypts the encrypted update package using the secret key that can be exchanged by the ECDHE as the AES key.

Next, the operation of the above-described configuration will be described with reference to FIGS. 178 to 181.
(12-3) Process by OTA Master 4 (See FIG. 178)

When the SD card 11 is connected to the vehicle-side system 3 and a predetermined condition is satisfied, the OTA master 4 requests the target ECU 5 to transmit configuration information such as software version information, and acquires the configuration information such as software version information transmitted from the target ECU 5 as vehicle configuration information (B1211). Upon acquiring the vehicle configuration information, the OTA master 4 transfers the acquired vehicle configuration information to the SD card 11 and stores the vehicle configuration information (B1212). The OTA master 4 generates a key pair of the ECDHE from a random number generated according to a specific rule (B1213). In this case, the key pair includes the ECDHE public key and the ECDHE secret key of the OTA master 4. The OTA master 4 transfers the ECDHE public key of the OTA master 4 to the SD card 11 and stores the ECDHE public key (B1214). The key pair of the ECDHE is a random number generated according to a specific rule as in the twelfth embodiment, and is common for each vehicle model. When the vehicle configuration information and the ECDHE public key of the OTA master 4 are stored in this manner, the SD card 11 is disconnected from the vehicle-side system 3 and connected to the PC.
(12-4) Process by PC (See FIG. 179)

When the SD card 11 is connected, the PC reads the vehicle configuration information and the ECDHE public key of the OTA master 4 that are stored in the SD card 11, and uploads the vehicle configuration information and the ECDHE public key of the OTA master 4 that were read to the OTA center 2 (C1211). The PC waits for reception of the campaign notification in which the ECDHE public key of the OTA master 4 is stored or the encrypted update package from the OTA center 2, and waits for reception of the notification without campaign (C1212, C1213). When determining that a campaign notification in which the ECDHE public key of the OTA master 4 is stored or an encrypted update package has been received from the OTA center 2 (C1212: YES), or when determining that the notification without campaign has been received (C1213: YES), the PC terminates the process.
(12-5) Process by OTA Center 2 (See FIG. 180)

The OTA center 2 acquires the vehicle configuration information and the ECDHE public key of the OTA master 4 uploaded from the PC to which the SD card 11 is connected (A1211). The OTA center 2 determines whether there is a campaign based on the vehicle configuration information (A1212). When determining that there is no campaign (A1212: NO), the OTA center 2 transmits the notification without campaign to the PC (A1213), and terminates the process.

When determining that there is the campaign (A1212: YES), the OTA center 2 generates a key pair of the ECDHE from a random number common to each vehicle model or each vehicle group (A1214). In this case, the key pair is the ECDHE public key and the ECDHE secret key of the OTA center 2. The OTA center 2 downloads the ECDHE public key of the OTA center 2 to the SD card 11 and stores the ECDHE public key (A1215). The OTA center 2 generates an ECDHE common key (secret key) from the ECDHE secret key of the OTA center 2 and the ECDHE public key of the OTA master 4 (A1216), and encrypts the update package with the generated ECDHE common key (secret key) (A1217). The OTA center 2 downloads the encrypted update package to the SD card 11 and stores the encrypted update package (A1218).
(12-6) Process by OTA Master 4 (See FIG. 181)

When the SD card 11 is connected to the vehicle-side system 3, the OTA master 4 acquires the ECDHE public key and the update package of the OTA center 2 from the SD card 11 (B1221). The OTA master 4 generates an ECDHE common key (secret key) from the ECDHE secret key of the OTA master 4 and the ECDHE public key of the OTA center 2 (B1222). The OTA master 4 executes an AES block encryption process on the counter value with the AES key to encrypt the counter value (B1223). The OTA master 4 performs an XOR operation on and decrypts the encrypted counter value and the encrypted update package (B1224).

The OTA master 4 transfers the decrypted update package to the target ECU 5 and installs the update package in the target ECU 5 (B1225).

According to such a configuration, efficient distribution of the update data by the CDN 8 can be appropriately realized while appropriately securing the forward secrecy of the ECDHE without depending on the wireless communication function of the vehicle-side system 3 and simplifying the time and effort of the key distribution as compared with the eleventh embodiment. Furthermore, by suppressing the number of times of data transfer between the OTA master 4 and the SD card 11 and upload and download between the OTA center 2 and the SD card 11, convenience for the user can be enhanced.

Thirteenth Embodiment

Figure 117:
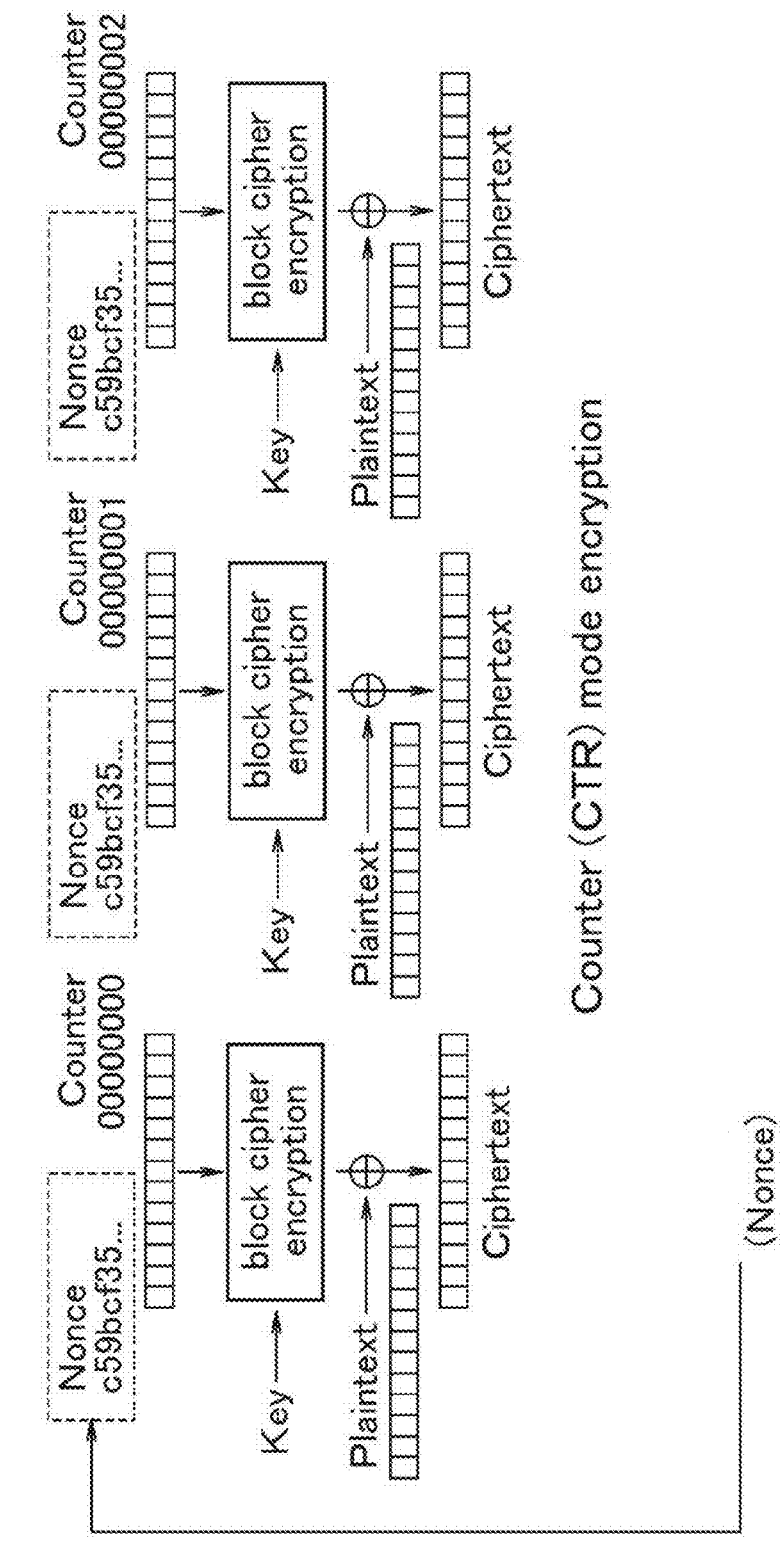
FIG. 117 is a diagram for describing an encryption process in the CTR mode.
Figure 118:
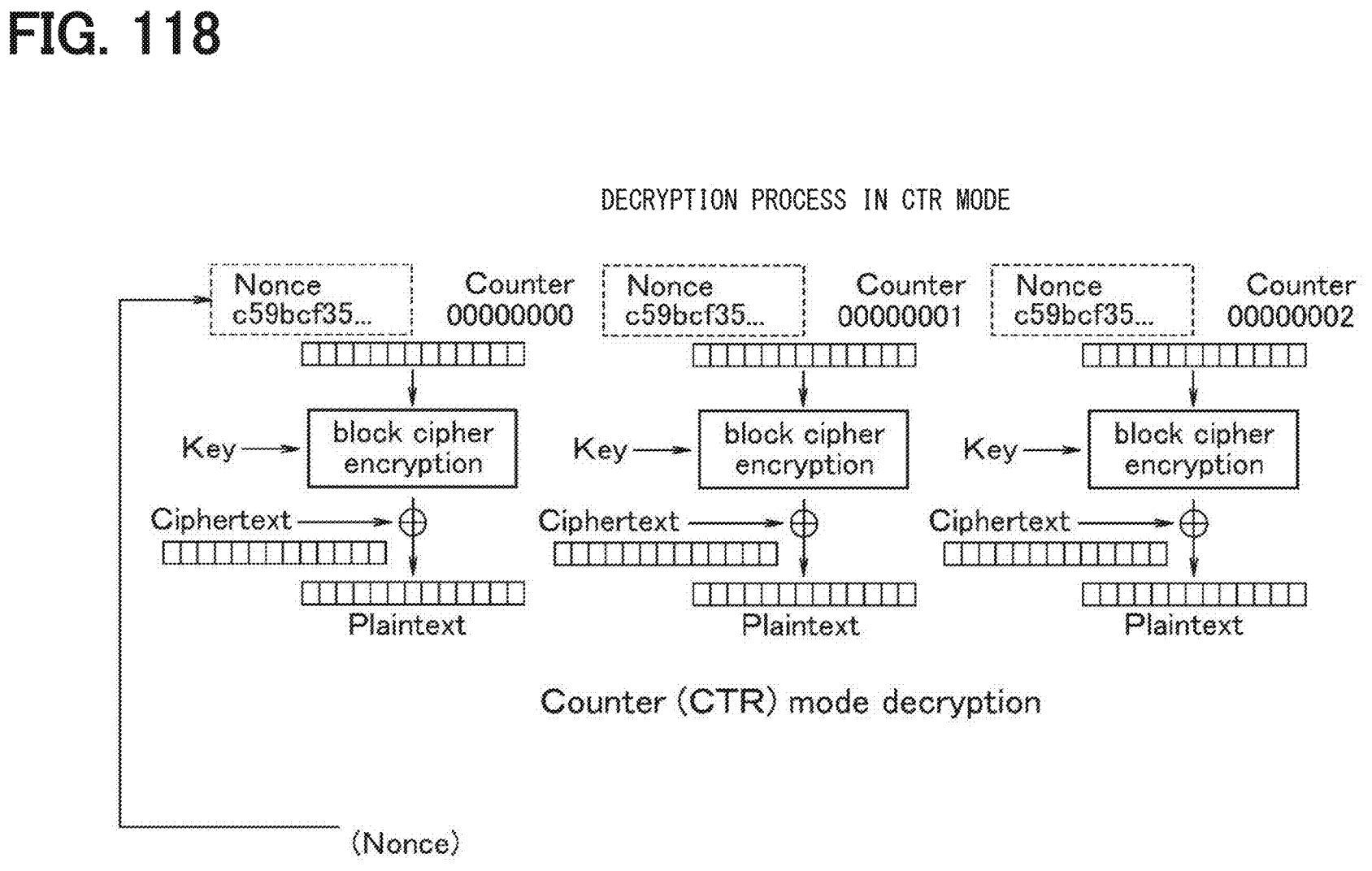

The thirteenth embodiment will be described with reference to FIGS. 116 to 124. In the thirteenth embodiment, the CTR mode is not simply applied, but the counter value is devised to be more secure. Specifically, the CTR mode is secured by inserting the nonce into the campaign notification to be first communicated between the OTA center 2 and the OTA master 4 and inserting the nonce into the counter value. The encryption process in which the nonce in the CTR mode is inserted is as illustrated in FIG. 117, and the decryption process in which the nonce in the CTR mode is inserted is as illustrated in FIG. 118.

Next, the operation of the above-described configuration will be described with reference to FIGS. 119 to 124.

Figure 120:
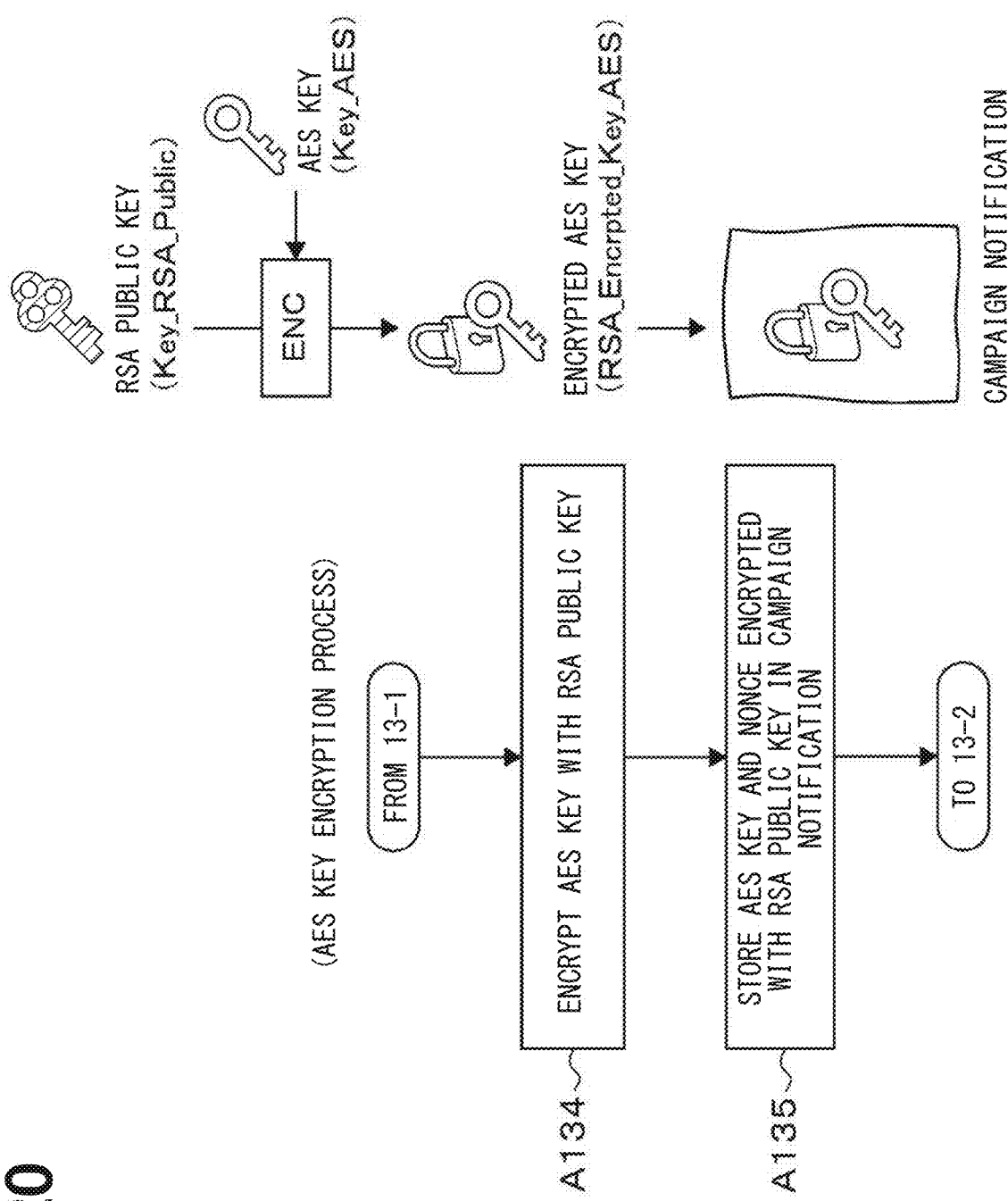

(13-1) Process by OTA Center 2 (See FIGS. 119 to 121)

The OTA center 2 generates an AES key for encrypting the update package (A131). The OTA center 2 generates a nonce based on a random number (A132). The OTA center 2 encrypts the update package with the generated AES key and nonce in the CTR mode (A133). The OTA center 2 encrypts the AES key with the RSA public key (A134). The OTA center 2 may encrypt the nonce with the RSA public key at the same time as encrypting the AES key with the RSA public key. The OTA center 2 stores the AES key and the nonce encrypted with the RSA public key in the campaign notification (A135). The OTA center 2 places the update package encrypted with the AES key in the CDN 8 (A136). The OTA center 2 transmits a campaign notification in which the encrypted AES key and nonce are stored to the vehicle-side system 3 to be reprogrammed (A137).

Figure 124:
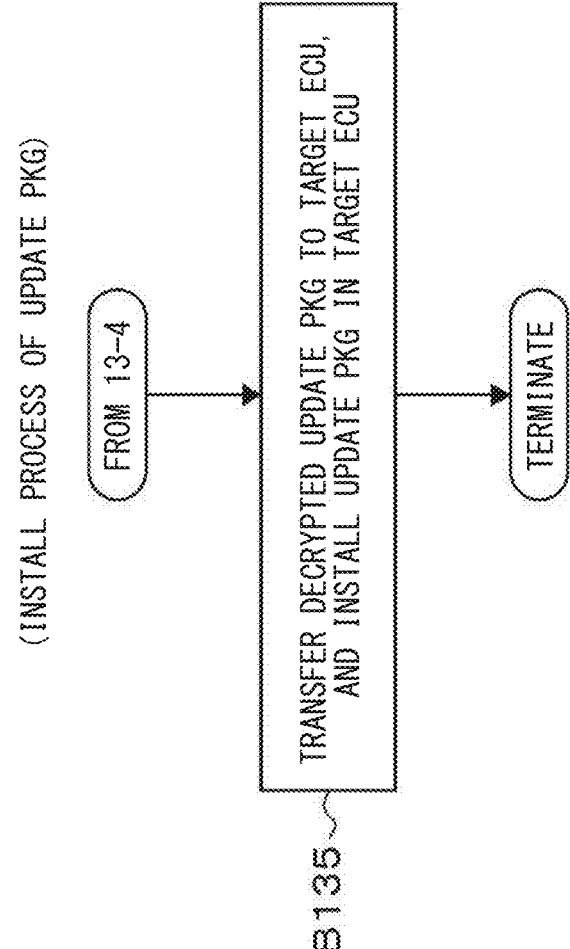
Figure 125:
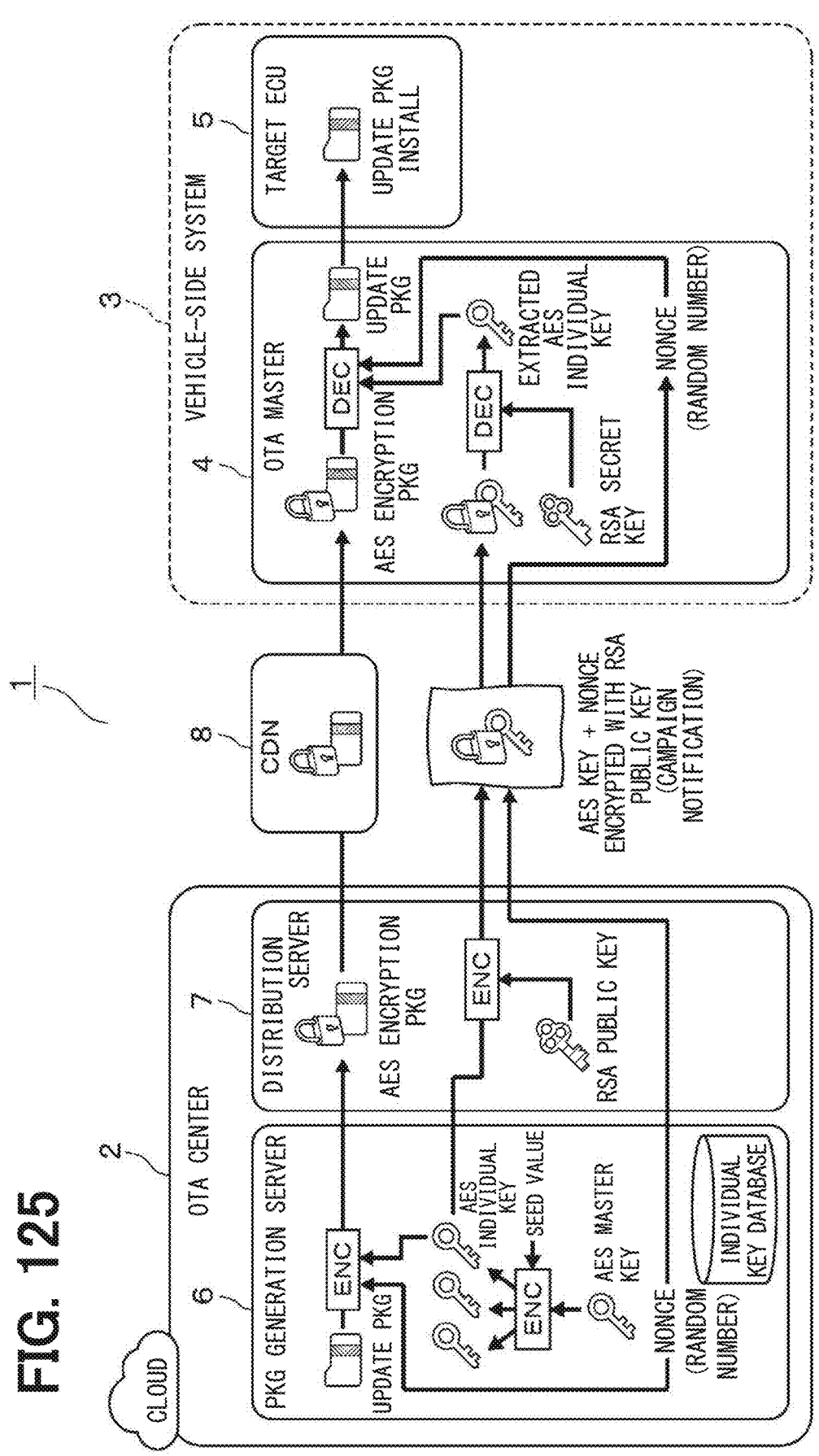

(13-2) Process by OTA Master 4 (See FIGS. 122 to 124)

When the OTA master 4 acquires a campaign notification as the campaign notification transmitted from the OTA center 2 is received by the OTA master 4, the OTA master 4 acquires an AES key and the nonce from the acquired campaign notification (B131). The OTA master 4 decrypts the encrypted AES key with the RSA secret key to extract an AES key (B132). The OTA master 4 downloads and acquires the encrypted update package from the CDN 8 (B133). The OTA master 4 decrypts the encrypted update package downloaded from the CDN 8 with the AES key and the nonce (B134). The OTA master 4 transfers the decrypted update package to the target ECU 5 and installs the update package in the target ECU 5 (B135).

As described above, according to the thirteenth embodiment, the following operational effects can be obtained.

The nonce is included in a campaign notification to be first communicated between the OTA center 2 and the OTA master 4, and the nonce is included in a counter value. As a result, it is possible to secure the CTR mode by including the nonce in the counter value.

Fourteenth Embodiment

Figure 126:
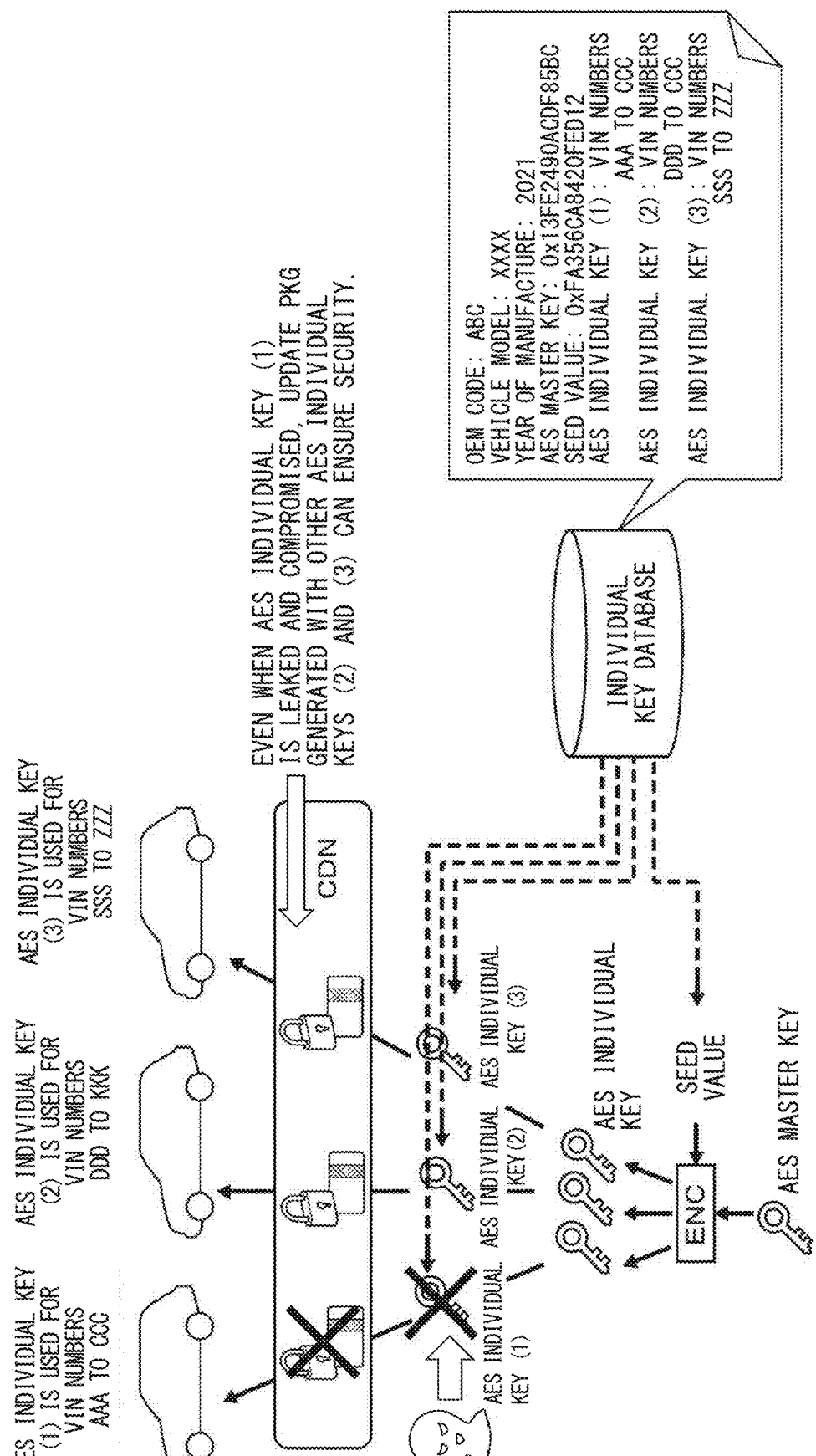

The fourteenth embodiment will be described with reference to FIGS. 125 to 132. In the fourteenth embodiment, instead of using a key common to all vehicles for a key used for encryption in order to narrow an influence range at the time of key compromise, a derived key individualized for each unit of a specific vehicle group is used, thereby localizing a loss at the time of key leakage while maintaining distribution cache efficiency of the CDN 8, and performing OTA distribution more securely. As illustrated in FIG. 126, the VIN number is divided into a plurality of sections for the same vehicle model and year of manufacture, and the different AES individual key is used for each section. For example, the number is divided in VIN numbers AAA to CCC, VIN numbers DDD to KKK, and VIN numbers SSS to ZZZ, and different AES individual keys are used. The individual key database includes, for example, an OEM code, a vehicle model, a year of manufacture, an AES master key, a seed value, and an AES individual key separated by a VIN number.

Next, the operation of the above-described configuration will be described with reference to FIGS. 127 to 132.

Figure 127:
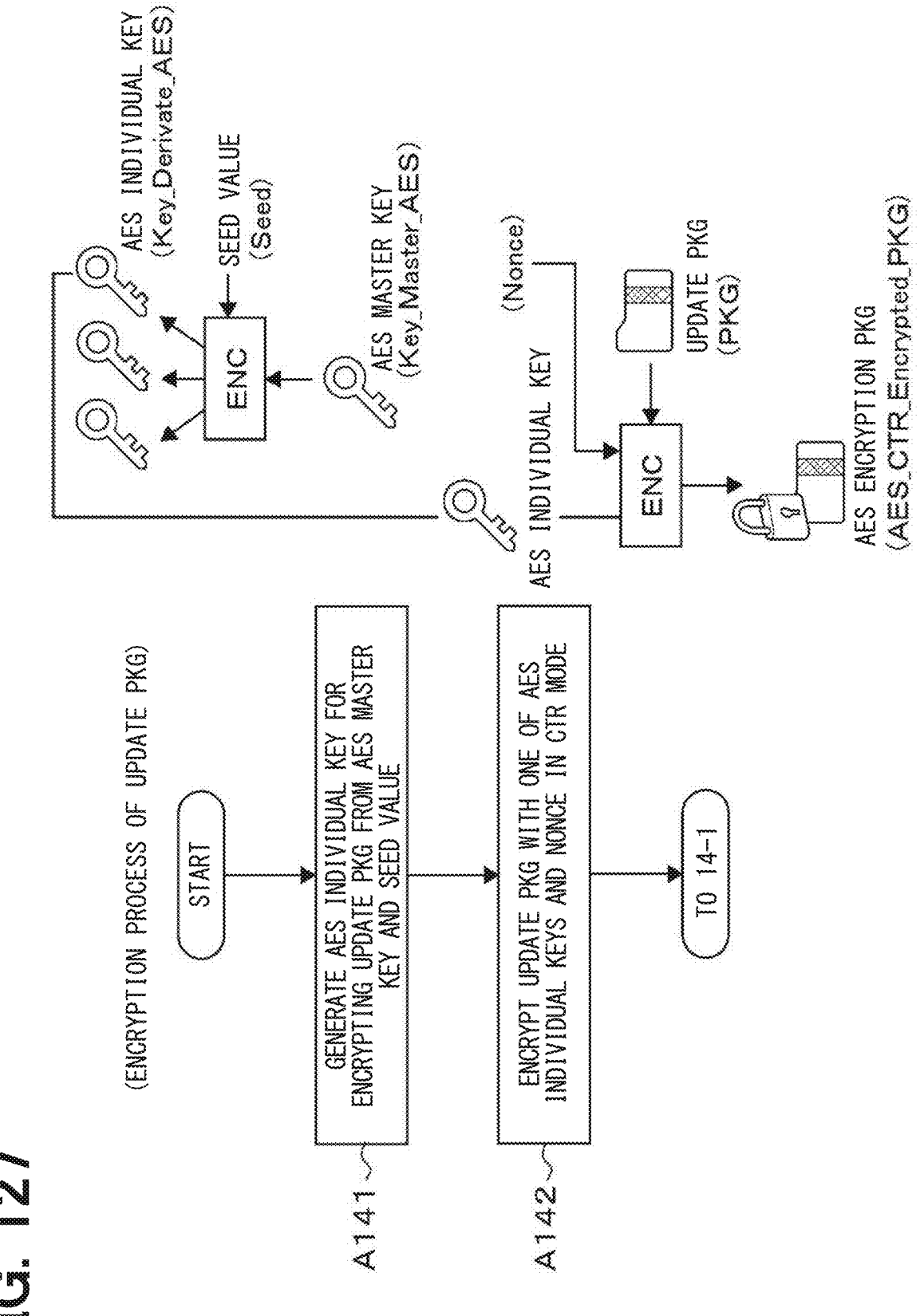
Figure 128:
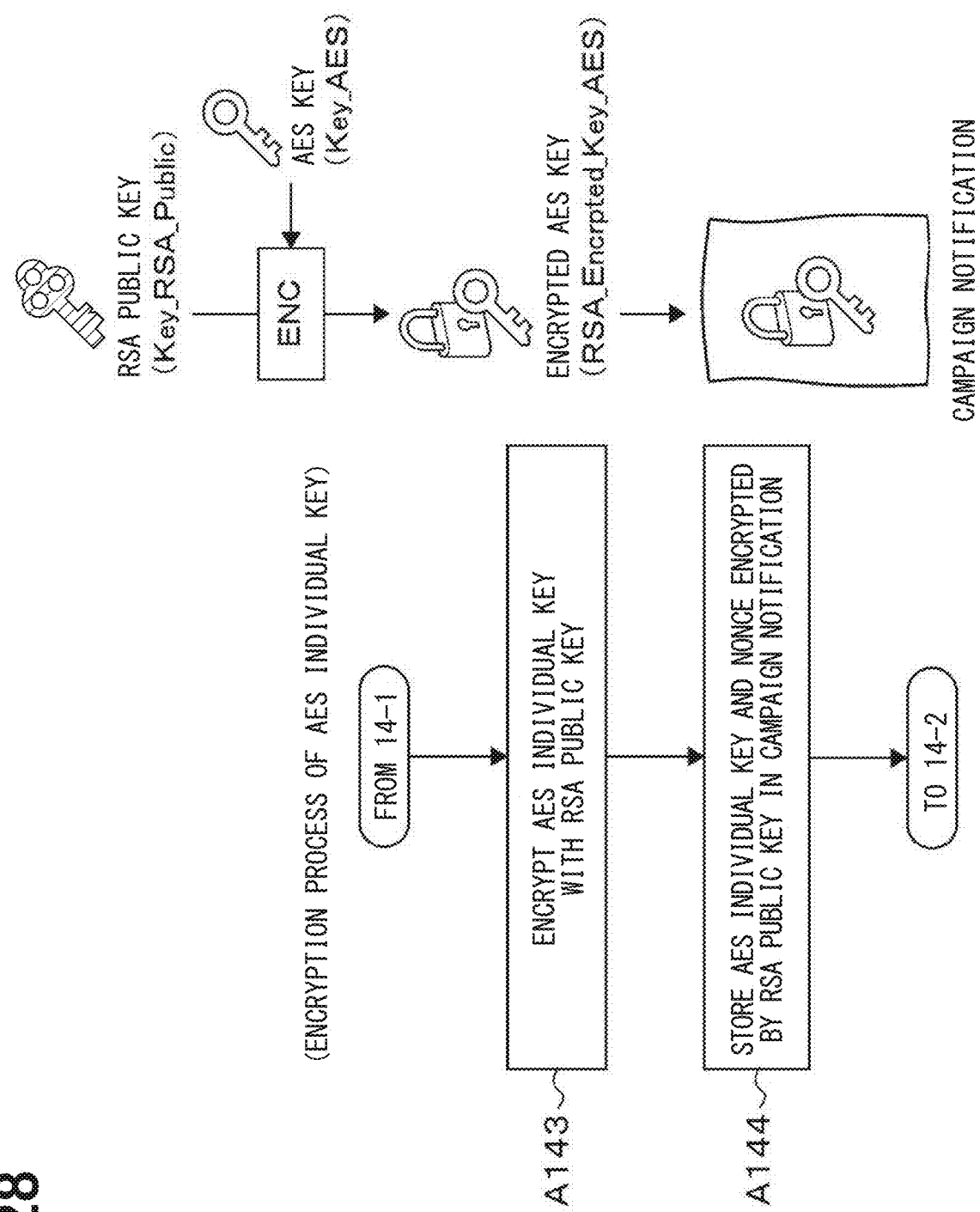

(14-1) Process by OTA Center 2 (See FIGS. 127 to 129)

The OTA center 2 generates an AES individual key for encrypting the update package from an AES master key and a seed value (A141). The seed value is, for example, a random number, a counter value, a time stamp, or the like. The OTA center 2 encrypts the update package with one of the generated AES individual keys and the nonce in the CTR mode (A142). The OTA center 2 encrypts the AES individual key with the RSA public key (A143). The OTA center 2 stores the AES individual key and the nonce encrypted with the RSA public key in the campaign notification (A144). The OTA center 2 places an update package encrypted with one of the AES individual keys and the nonce in the CDN 8 (A145). The OTA center 2 transmits a campaign notification in which the encrypted AES individual key and nonce are stored to the vehicle-side system 3 to be reprogrammed (A146).

(14-2) Process by OTA Master 4 (See FIGS. 130 to 132)

When acquiring the campaign notification as the campaign notification transmitted from the OTA center 2 is received by the OTA master 4, the OTA master 4 acquires the AES individual key and the nonce from the acquired campaign notification (B141). The OTA master 4 decrypts the encrypted AES individual key with the RSA secret key to extract an AES individual key (B142). The OTA master 4 downloads and acquires the encrypted update package from the CDN 8 (B143). The OTA master 4 decrypts the encrypted update package downloaded from the CDN 8 with the AES individual key and the nonce (B144). The OTA master 4 transfers the decrypted update package to the target ECU 5 and installs the update package in the target ECU 5 (B145).

As described above, according to the fourteenth embodiment, the following operational effects can be obtained.

Instead of using a key common to all vehicles for a key used for encryption, a derived key individualized for each unit of a specific vehicle group is used. It is possible to localize a loss at the time of key leakage while maintaining distribution cache efficiency of the CDN 8. As a result, security when the OTA master 4 downloads the update package from the OTA center 2 can be improved, and more secure OTA distribution can be realized.

Fifteenth Embodiment

The fifteenth embodiment will be described with reference to FIGS. 133 to 137. In the fifteenth embodiment, in preparation for a case of leakage of a secret key, which is the worst case, a key version is assigned so that the key can be updated by the OTA and managed by the OTA center 2, and a key update key is stored in the HSM area of the OTA master. The OTA center 2 manages version information about an RSA public key used for encryption of an AES key and an RSA secret key used for decryption thereof. The version information is managed so as not to be downgraded when the RSA secret key and the RSA public key are updated. Each of the OTA center 2 and the OTA master 4 includes a key update key used for updating the secret key. In the OTA center 2, a new secret key pair is generated at the time of secret key leakage or at regular intervals, a key update package is generated using the key update key, and the key update package is transmitted to the OTA master 4, thereby implementing key update of the secret key.

Next, the operation of the above-described configuration will be described with reference to FIGS. 134 to 137.

(15-1) Process by OTA Center 2 (See FIGS. 134 to 135)

The OTA center 2 generates a new key pair of a new RSA secret key and a new RSA public key (A151). The OTA center 2 encrypts and performs MAC operation on the generated new RSA secret key with the key update key in the CTR mode, and generates a key update package (A152). The OTA center 2 switches the old RSA public key to the new RSA public key (A153). The OTA center 2 transmits the key update package to the vehicle-side system 3 to be reprogrammed (A154).

(15-2) Process by OTA Master 4 (See FIGS. 136 to 137)

The OTA master 4 acquires the key update package, and decrypts and MAC verifies the new RSA secret key with the key update key in the CTR mode (B151). The OTA master 4 switches the old RSA secret key to the decrypted new RSA secret key (B152).

As described above, according to the fifteenth embodiment, the following operational effects can be obtained.

A new secret key pair is generated at the time of secret key leakage or at regular intervals, the key update package is generated using the key update key, and the key update package is transmitted to the OTA master 4. As a result, by key updating the secret key, security when the OTA master 4 downloads the update package from the OTA center 2 can be improved, and more secure OTA distribution can be realized.

Sixteenth Embodiment

The sixteenth embodiment will be described with reference to FIGS. 138 to 145. In the sixteenth embodiment, in key exchange by the ECDHE, key exchange between the OTA center 2 and the OTA master 4 is realized in a secure manner for a key to which a digital signature is assigned and that is applicable to an encryption package so as to resist the attack from an intermediate attacker. As illustrated in FIGS. 139 to 140, the DHE is vulnerable to the attack from an intermediate attacker, but resists the attack from an intermediate attacker by assigning a digital signature. As the digital signature, a digital signature using an encryption algorithm of the RSA or the elliptic curve DSA is used.

Next, the operation of the above-described configuration will be described with reference to FIGS. 141 to 145.

(16-1) Process by OTA Center 2 (See FIGS. 141 to 143)

The OTA center 2 generates a key pair of the ECDHE from a random number created for each vehicle model or each vehicle group (A161). The OTA center 2 assigns a digital signature to the ECDHE key with the RSA secret key (A162). Here, the RSA secret key is used, but the present invention is not limited to the RSA secret key, and substitution is possible as long as it is a public key encryption method, and, for example, an elliptic curve digital signature algorithm (ECDSA) secret key may be used. The OTA center 2 transmits the ECDHE public key to which the digital signature is assigned to the vehicle-side system 3 to be reprogrammed (A163). The OTA center 2 exchanges a secret key with the OTA master 4 in the ECDHE algorithm (A164). The OTA center 2 generates an AES key for encrypting the update package (A165). The OTA center 2 encrypts the update package with the generated AES key in the CTR mode (A166). The OTA center 2 places the update package encrypted with the AES key in the CDN 8 (A167). The OTA center 2 transmits a campaign notification storing the encrypted AES key to the vehicle-side system 3 to be reprogrammed (A168).

(16-2) Process by OTA Master 4 (See FIGS. 144 to 145)

The OTA master 4 generates a key pair of the ECDHE from a random number generated according to a specific rule (B161). The OTA master 4 digitally signs and verifies the ECDHE public key received from the OTA center 2 with the RSA public key (B162). Here, as in the OTA center 2, the present invention is not limited to the RSA public key, and substitution is possible as long as it is a public key encryption method, and, for example, the ECDSA public key may be used. When the verification result is positive, the OTA master 4 exchanges the secret key with the OTA center 2 in the ECDHE algorithm (B163). Thereafter, the OTA master 4 performs the process in and after step B113 described in the eleventh embodiment.

As described above, according to the sixteenth embodiment, the following operational effects can be obtained.

A digital signature is assigned in key exchange by the ECDHE. As a result, by assigning a digital signature, it is possible to resist the attack from an intermediate attacker, and it is possible to realize more secure OTA distribution.

(Modification of Sixteenth Embodiment)

A modification of the sixteenth embodiment will be described with reference to FIGS. 182 to 189. Also in the modification of the sixteenth embodiment, as in the modifications of the eleventh embodiment and the twelfth embodiment, a situation will be described in which the OTA master 4 does not transmit and receive data to and from the OTA center 2 or the CDN 8 via the wireless communication line, and instead executes program update using a storage medium such as an SD card. The main difference between the modification of the sixteenth embodiment and the modification of the twelfth embodiment is that the attack from an intermediate attacker is resisted by applying digital signature to an ECDHE public key of an OTA center 2 with a key of a public key encryption method.

FIGS. 182 to 185 illustrate transfer of data from the OTA master 4 to the SD card 11, upload of data from the PC to which the SD card 11 is connected to the OTA center 2, download of data from the OTA center 2 to the SD card 11, and transfer of data from the SD card 11 to the OTA master 4. The main difference from the modification of the twelfth embodiment is that, as illustrated in FIG. 184, the OTA center 2 assigns a digital signature to a key to be exchanged with the OTA master 4 (the ECDHE public key of the OTA center 2) with a key of a public key encryption method, for example, an RSA secret key or an ECDSA secret key. The OTA center 2 transfers the signed ECDHE public key to the SD card 11 and stores the signed ECDHE public key. Furthermore, as illustrated in FIG. 185, the OTA master 4 reads the signed ECDHE public key from the SD card 11, and verifies the ECDHE public key using the RSA public key stored in the vehicle-side system 3.

Next, the operation of the above-described configuration will be described with reference to FIGS. 186 to 189.

(16-3) Process by OTA Master 4 (See FIG. 186)

When the SD card 11 is connected to the vehicle-side system 3 and a predetermined condition is satisfied, the OTA master 4 requests the target ECU 5 to transmit configuration information such as software version information, and acquires the configuration information such as software version information transmitted from the target ECU 5 as vehicle configuration information (B1611). Upon acquiring the vehicle configuration information, the OTA master 4 transfers the acquired vehicle configuration information to the SD card 11 and stores the vehicle configuration information (B1612). The OTA master 4 generates a key pair of the ECDHE from a random number generated according to a specific rule (B1613). In this case, the key pair includes the ECDHE public key and the ECDHE secret key of the OTA master 4. The OTA master 4 transfers the ECDHE public key of the OTA master 4 to the SD card 11 and stores the ECDHE public key (B1614). The key pair of the ECDHE is a random number generated according to a specific rule as in the twelfth embodiment, and is common for each vehicle model. When the vehicle configuration information and the ECDHE public key of the OTA master 4 are stored in this manner, the SD card 11 is disconnected from the vehicle-side system 3 and connected to the PC.

(16-4) Process by PC (See FIG. 187)

When the SD card 11 is connected, the PC reads the vehicle configuration information and the ECDHE public key of the OTA master 4 that are stored in the SD card 11, and uploads the vehicle configuration information and the ECDHE public key of the OTA master 4 that were read to the OTA center 2 (C1611). The PC waits for reception of the campaign notification in which the ECDHE public key of the OTA master 4 is stored or the encrypted update package from the OTA center 2, and waits for reception of the notification without campaign (C1612, C1613). When determining that a campaign notification in which the ECDHE public key of the OTA master 4 is stored or an encrypted update package has been received from the OTA center 2 (C1612: YES), or when determining that the notification without campaign has been received (C1613: YES), the PC terminates the process.

(16-5) Process by OTA Center 2 (See FIG. 188)

The OTA center 2 acquires the vehicle configuration information and the ECDHE public key of the OTA master 4 uploaded from the PC to which the SD card 11 is connected (A1611). The OTA center 2 determines whether there is a campaign based on the vehicle configuration information (A1612). When determining that there is no campaign (A1612: NO), the OTA center 2 transmits the notification without campaign to the PC (A1613), and terminates the process.

When determining that there is the campaign (A1612: YES), the OTA center 2 generates a key pair of the ECDHE from a random number common to each vehicle model or each vehicle group (A1614). In this case, the key pair is the ECDHE public key and the ECDHE secret key of the OTA center 2. The OTA center 2 signs the ECDHE public key of the OTA center 2 with the RSA secret key (A1615), and downloads the signed ECDHE public key of the OTA center 2 to the SD card 11 and stores the signed ECDHE public key (A1616). The OTA center 2 generates an ECDHE common key (secret key) from the ECDHE secret key of the OTA center 2 and the ECDHE public key of the OTA master 4 (A1617), and encrypts the update package with the generated ECDHE common key (secret key) (A1618). The OTA center 2 downloads the encrypted update package to the SD card 11 and stores the encrypted update package (A1619).

(16-6) Process by OTA Master 4 (See FIG. 189)

When the SD card 11 is connected to the vehicle-side system 3, the OTA master 4 acquires the signed ECDHE public key of the OTA center 2 and the update package from the SD card 11 (B1621). The OTA master 4 verifies the signed ECDHE public key of the OTA center 2 with the RSA public key (B1622). The OTA master 4 determines whether the verification result is normal (B1623), and when determining that the verification result is not normal, that is abnormal (B1623: NO), the OTA master 4 makes an error notification (B1624).

When determining that the verification result is normal (B1623: YES), the OTA master 4 generates an ECDHE common key (secret key) from the ECDHE secret key of the OTA master 4 and the ECDHE public key of the OTA center 2 (B1625). The OTA master 4 executes an AES block encryption process on the counter value with the AES key to encrypt the counter value (B1626). The OTA master 4 performs an XOR operation on and decrypts the encrypted counter value and the encrypted update package (B1627). The OTA master 4 transfers the decrypted update package to the target ECU 5 and installs the update package in the target ECU 5 (B1628).

According to such a configuration, it is possible to resist the attack from an intermediate attacker without depending on the wireless communication function of the vehicle-side system 3, and it is possible to realize more secure OTA distribution. Furthermore, by suppressing the number of times of data transfer between the OTA master 4 and the SD card 11 and upload and download between the OTA center 2 and the SD card 11, convenience for the user can be enhanced.

Seventeenth Embodiment

The seventeenth embodiment will be described with reference to FIGS. 146 to 151. While the tenth embodiment is configured to select a CDN vendor with the lowest distribution cost from a plurality of CDN vendors for each area, the seventeenth embodiment is configured to statically select a CDN vendor that can reduce the distribution cost from a plurality of CDN vendors. Specifically, while, in the tenth embodiment, the update package is encrypted in the OTA center 2, and then the distribution cost is minimized according to the distribution method, the OTA target area, and the distribution data size, in the seventeenth embodiment, the update package is not encrypted in the OTA center 2, and communication between the CDN 8 and the OTA master 4 is protected by TLS communication, and then the distribution cost is minimized according to the distribution method, the OTA target area, and the distribution data size.

Next, the operation of the above-described configuration will be described with reference to FIGS. 147 to 151.

(17-1) Process by OTA Center 2 (See FIGS. 147 to 148)

The OTA center 2 identifies a distribution method (A171), identifies an OTA target area (A172), identifies whether TLS is used in a communication protocol to the vehicle (A173), identifies a distribution data size (A174), and refers to the price table from the CDN vendor management database with the distribution method, the OTA target area, the communication protocol, and the distribution data size as keys (A175). In this case, the OTA center 2 may refer to the price table using at least one of the distribution method, the OTA target area, the communication protocol, and the distribution data size as a key. The OTA center 2 selects a CDN vendor with the lowest distribution cost for each area, and places an update package in the selected CDN 8 (A176). The OTA center 2 transmits a campaign notification to the vehicle-side system 3 to be reprogrammed (A177).

(17-2) Process by OTA Master 4 (See FIGS. 149 to 151)

The OTA master 4 acquires the campaign notification when the campaign notification transmitted from the OTA center 2 is received by the OTA master 4 (B171). The OTA master 4 establishes TLS communication with the CDN vendor listed in the campaign notification to acquire the update package (B172). As long as the URI information is described in the campaign notification, the CDN vendor information may not be described. After establishing TLS communication, the OTA master 4 exchanges a common key of AES in the TLS communication protocol. Negotiation is performed to select the AES-CTR mode as the encryption mode. The OTA master 4 downloads and acquires the update package encrypted with the AES common key of TLS from the CDN 8 based on the URI information (B173, corresponding to update data acquisition step).

At this time, in parallel with downloading and acquiring the encrypted update package from the CDN 8, the OTA master 4 executes an AES block encryption process of the counter value with the AES key to encrypt the counter value (B174). The OTA master 4 performs an XOR operation on and decrypts the encrypted counter value and the encrypted update package downloaded from the CDN 8 (B175). The OTA master 4 transfers the decrypted update package to the target ECU 5 and installs the update package in the target ECU 5 (B176).

As described above, according to the seventeenth embodiment, the following operational effects can be obtained.

The update package is not encrypted by the OTA center 2, communication between the CDN 8 and the OTA master 4 is protected by TLS communication, and the distribution cost is minimized according to the distribution method, the OTA target area, the communication protocol, and the distribution data size. As a result, it is possible to appropriately suppress the distribution cost when the OTA master 4 downloads the update package from the OTA center 2.

Eighteenth Embodiment

The eighteenth embodiment will be described with reference to FIGS. 152 to 165. In the eighteenth embodiment, the optimum CDN vendor is selected in consideration of not only the distribution cost but also the throughput and the response delay time of the CDN vendor comprehensively, the price table and the quality characteristic of the CDN vendor are periodically checked, the CDN vendor management database is constantly maintained in the latest state, and the CDN vendor having the most competitive advantage constantly in the market is selected. The price table is as illustrated in FIGS. 153 to 160, and the quality information about each cloud service business operator is as illustrated in FIG. 161. As illustrated in FIG. 162, when comparing a CDN vendor A with a CDN vendor B, the CDN vendor B is superior to the CDN vendor A in terms of distribution cost, but the CDN vendor A is superior to the CDN vendor B in terms of weighting of throughput and weighting of response delay time. Considering not only the distribution cost but also the throughput, the response delay time, and the like of the CDN vendor comprehensively, it is possible to draw a conclusion that the CDN vendor A should be selected rather than the CDN vendor B superior in only the distribution cost in consideration of the throughput, the response delay time, and the like of the CDN vendor.

Next, the operation of the above-described configuration will be described with reference to FIGS. 163 to 165.

(18-1) Process by OTA Center 2 (See FIGS. 163 to 165)

The OTA center 2 identifies the distribution method (A181), identifies the OTA target area (A182), and refers to the price table from the CDN vendor management database using the distribution method and the OTA target area as keys (A183). In this case, the OTA center 2 may refer to the price table using at least one of the distribution method and the OTA target area as a key. The OTA center 2 identifies a quality characteristic of each CDN vendor from the CDN vendor management database (A184). The OTA center 2 selects an optimum CDN vendor for each area from the CDN vendor selection logic registered in the CDN vendor selection logic database based on the distribution cost and the quality characteristic of the CDN vendor for each area, and places the update package encrypted with the AES key in the selected CDN 8 (A185). In the OTA center 2, the OTA center 2 transmits a campaign notification in which the encrypted AES key is stored to the vehicle-side system 3 to be reprogrammed (A186).

The OTA center 2 automatically acquires the price table of each CDN vendor from the Website, and updates the CDN vendor management database (A187). The OTA center 2 measures the throughput and the response delay time of each CDN vendor and updates the CDN vendor management database (A188). For example, the distribution server 7 regularly goes around the Website of each CDN vendor and downloads the latest price table. Alternatively, when the CDN vendor distributes the update information about the Website, the distribution server 7 downloads the latest price table by registering the update information in the distribution service.

(18-2) Process by OTA Master 4

The process by the OTA master 4 is similar to the process (FIGS. 12 to 14) of the OTA master 4 described in the first embodiment.

As described above, according to the eighteenth embodiment, the following operational effects can be obtained.

The optimum CDN vendor is selected in consideration of not only the distribution cost but also the throughput and the response delay time of the CDN vendor comprehensively, the price table and the quality characteristic of the CDN vendor are periodically checked, the CDN vendor management database is constantly maintained in the latest state, and the CDN vendor having the most competitive advantage constantly in the market is selected. As a result, it is possible to appropriately suppress the distribution cost when the OTA master 4 downloads the update package from the OTA center 2.

The quality characteristic of the CDN are not limited to the throughput and the response delay time, but a content cache hit rate, past trouble records, and the like can be considered, and these can be included in the CDN vendor management database. In addition, it is also possible to periodically review addition or deletion of a CDN vendor to which the OTA center 2 is connected and to be connected to a CDN vendor having market competitiveness.

Nineteenth Embodiment

The nineteenth embodiment will be described with reference to FIGS. 90 and 190 to 193. The above-described the tenth embodiment has a configuration in which a CDN vendor with the lowest distribution cost is selected for each area from a plurality of CDN vendors. In the nineteenth embodiment, selection of a CDN vendor will be specifically described. In the nineteenth embodiment, as a placement destination of the update package to the CDN 8, a CDN vendor with the lowest distribution cost is dynamically selected according to a distribution data size, an OTA target area (also referred to as a region in some cases) as a distribution area, and a distribution method from among a plurality of CDN vendors. The nineteenth embodiment will be described with reference to the price table illustrated in FIG. 90 described above. The price table may be in a form different from that of FIG. 90.

As illustrated in FIG. 190, in the OTA center 2, the distribution server 7 includes a CDN vendor selection section 7a, a data storage section 7b, a campaign notification generation section 7c, and a CDN distribution section 7d in addition to a CDN vendor management DB. The CDN vendor selection section 7a selects a CDN vendor based on selection information and update package information that are information necessary for selection of the CDN vendor. The selection information includes information about a data size of the target campaign, the number of distribution target vehicles of the target campaign, a region, and a distribution method, and the like. In addition to storing the campaign information, the data storage section 7b stores identification information that can identify the CDN vendor selected by the CDN vendor selection section 7a. The identification information includes, for example, a name of a CDN vendor, an identification number for identifying the CDN vendor, a URL indicating the CDN vendor, and the like. The campaign notification generation section 7c acquires information from the data storage section 7b and generates a campaign notification to be distributed to the vehicle or the like.

The CDN distribution section 7d includes a storage area corresponding to each CDN vendor. For example, the storage area includes a storage area A, a storage area B, and a storage area C. Each storage area of the CDN distribution section 7d is synchronized with the CDN server. That is, for example, when data is distributed from the CDN server A to the vehicle-side system 3, the CDN distribution section 7d places the data in the storage area A and transfers the data to the CDN server A. When the data is transferred from the CDN distribution section 7d, the CDN server A distributes the transferred data to the vehicle-side system 3. Each storage area of the CDN distribution section 7d may be referred to as an origin server of each CDN server.

Next, the operation of the above-described configuration will be described with reference to FIGS. 191 to 193. The process of encryption and the like of the update package by the OTA center 2 is similar to that in the tenth embodiment or other embodiments. In addition, the process by the OTA master 4 is similar to that of the first embodiment or another embodiment. In the nineteenth embodiment, selection of a CDN vendor will be mainly described.

(19-1) Process by Campaign Notification Generation Section 7c (See FIG. 191)

When a campaign occurs, the campaign notification generation section 7c acquires campaign information from the outside such as an OEM server (A191). The campaign information includes information about the data size of the target campaign, the number of distribution target vehicles of the target campaign, the region, and the distribution method. The campaign notification generation section 7c stores the acquired campaign information in the data storage section 7b (A192). Storing the campaign information may be referred to as placing the campaign information.

The campaign notification generation section 7c notifies the CDN vendor selection section 7a of a request for selecting the CDN vendor (A193), and waits for acquisition of the selection notification from the CDN vendor selection section 7a. When acquiring the selection notification from the CDN vendor selection section 7a (A194), the campaign notification generation section 7c accesses the data storage section 7b and acquires the identification information about the CDN vendor selected by the CDN vendor selection section 7a (A195).

Based on the identification information about the CDN vendor, the campaign notification generation section 7c generates a parameter file including the URL of the selected CDN as a campaign notification (A196). The campaign notification generation section 7c distributes the generated campaign notification to the vehicle-side system 3 (A197).

(19-2) Process by CDN Vendor Selection Section 7a (See FIGS. 192 to 193)

When the CDN vendor selection section 7a acquires a request for selecting the CDN vendor notified from the campaign notification generation section 7 (A1911), the CDN vendor selection section 7a accesses the data storage section 7b, and acquires the selection information (A1912), and the process proceeds to a first CDN selection process (A1913).

When starting the first CDN selection process, the CDN vendor selection section 7a calculates a distribution data size indicating a data size distributed from the CDN server to the vehicle to be updated (A1921). Specifically, the CDN vendor selection section 7a multiplies the data size of the target campaign by the number of distribution target vehicles of the target campaign, and calculates the size of distribution data scheduled to be distributed from the CDN server.

The CDN vendor selection section 7a repeats the subsequent process for each CDN vendor (A1922 to A1929). The CDN vendor selection section 7a acquires fee information from the CDN vendor management DB based on the distribution data size calculated above and the region information related to the region (A1923). For example, in the case of the campaign of 30 TB targeting North America, the CDN vendor selection section 7a acquires fee information about "to 10 TB" and "to 40 TB" in the "North America" region. Fee information may be acquired for all data sizes.

The CDN vendor selection section 7a refers to the fee information based on the distribution data size and calculates a distribution charge amount (A1924). The calculation of the distribution charge amount may be different for each CDN vendor, and is determined by a method of calculating the distribution charge amount in the CDN vendor. For example, when the distribution charge amount is calculated for the CDN 1 in the price table of FIG. 90, the price tables of "to 10 TB" and "to 40 TB" are referred to when the region is "North America" and the distribution data size is 30 TB.

The CDN vendor selection section 7a determines whether the CDN vendor to be examined is a CDN vendor that charges according to the number of requests (A1925). When determining that the CDN vendor is a CDN vendor that does not charge according to the number of requests (A1925: NO), the CDN vendor selection section 7a determines the distribution charge amount as the charge amount of the CDN vendor (A1928), terminates the calculation of the charge amount for the CDN vendor, and calculates the charge amount of the next CDN vendor.

When determining that the CDN vendor is a CDN vendor that charges according to the number of requests (A1925: YES), the CDN vendor selection section 7*a* calculates the number of requests (A1926). The number of requests varies depending on the distribution method. When the distribution method is the storage method, the number of distribution target vehicles of the campaign is set as the number of requests. When the distribution method is the streaming method, the number of requests is calculated by dividing the data size of the target campaign by the chunk size at the time of streaming, and multiplying the number of distribution target vehicles of the campaign.

After calculating the number of requests, the CDN vendor selection section 7*a* calculates a charge amount (which may be referred to as a request charge amount) based on the calculated number of requests (A1927). The request charge amount is a multiplication of the charge amount per request and the number of requests. The CDN vendor selection section 7*a* determines the total sum of the distribution charge amount and the request charge amount as the charge amount of the CDN vendor (A1928), terminates the calculation of the charge amount of the CDN vendor to be examined, and calculates the charge amount of the next CDN vendor.

After calculating the charge amount for all the CDN vendors, the CDN vendor selection section 7*a* selects a CDN vendor with the lowest distribution cost, that is, a CDN vendor with the lowest charge amount (A1930), and terminates the first CDN selection process. Upon completion of the first CDN selection process, the CDN vendor selection section 7*a* stores the selection result, that is, the identification information about the selected CDN vendor, in the data storage section 7*b* (A1914), and notifies the campaign notification generation section 7*c* of the selection result (A1915).

As described above, according to the nineteenth embodiment, the following operational effects can be obtained.

The distribution server 7 refers to the CDN vendor management DB, selects a CDN 8 having the superior distribution cost according to the distribution method, the OTA target area, and the distribution data size from the plurality of CDNs 8 having different distribution costs, and places the update package in the selected CDN 8. As a result, it is possible to appropriately suppress the distribution cost when the OTA master 4 downloads the update package from the OTA center 2.

(Modifications of Nineteenth Embodiment)

Modifications of the nineteenth embodiment will be described with reference to FIGS. 194 to 211. Here, the first modification to the fifth modification will be described.

(First Modification of Nineteenth Embodiment)

The first modification of the nineteenth embodiment will be described with reference to FIGS. 194 to 195. In the first modification, the URL of the CDN server included in the campaign notification distributed to the vehicle-side system 3 is not changed by using a domain name system (DNS) server. In the nineteenth embodiment, a CDN vendor with the lowest distribution cost is selected for each campaign. The campaign notification includes the URL of the CDN server. Therefore, when the CDN vendor with the lowest distribution cost is changed, the URL described in the campaign notification is changed. Every time a campaign notification is generated, the campaign notification generation section 7*c* is required to access the data storage section 7*b* to acquire CDN vendor information.

On the other hand, in the first modification, by the DNS setting section 7*e* updating the translation information about the URL and the IP address registered in the DNS, the campaign notification generation section 7*c* can constantly describe the same URL in the campaign notification. When the CDN vendor with the lowest distribution cost is changed, the vehicle-side system 3 can access the selected CDN server by changing the information about a DNS server 12. In other words, in the nineteenth embodiment, each CDN server has a unique IP address and a unique URL. On the other hand, in the first modification, each CDN server has a unique IP address, but has a URL common to the CDN servers.

As illustrated in FIG. 194, in the OTA center 2, the distribution server 7 includes a DNS setting section 7*e* in addition to the CDN vendor management DB, the CDN vendor selection section 7*a*, the data storage section 7*b*, the campaign notification generation section 7*c*, and the CDN distribution section 7*d*. Differences from the nineteenth embodiment will be mainly described below.

The DNS server 12 is a server that provides a mechanism for translating a domain name and an IP address. The campaign notification received by the vehicle-side system 3 includes the URL of the CDN server to be accessed for downloading data. Upon receiving the campaign notification, the vehicle-side system 3 inquires of the DNS server 12 about the URL indicated in the received campaign notification. The DNS server 12 transmits the IP address for the URL from which the inquiry is acquired to the vehicle-side system 3 or transfers the connection destination to an address specified by the IP address.

The DNS setting section 7*e* stores the identification information and the IP address of the CDN vendor. When the CDN vendor is selected by the CDN vendor selection section 7*a*, the DNS setting section 7*e* transmits an IP address setting request to the DNS server 12 and sets registration information in the DNS.

Next, the operation of the above-described configuration will be described with reference to FIG. 195.

(19-3) Process by CDN Vendor Selection Section 7*a* (See FIG. 195)

When the CDN vendor selection section 7*a* terminates the first CDN selection process and stores the selection result in the data storage section 7*b* (A1914), the CDN vendor selection section 7*a* causes the DNS setting section 7*e* to transmit an IP address setting request to the DNS server 12, and sets registration information in the DNS by the DNS setting section 7*e* (A1931). As a result, the URL included in the campaign notification distributed to the vehicle-side system 3 is not changed even when the CDN vendor is changed. When the vehicle-side system 3 accesses the CDN server indicated by the URL, the DNS server 12 acquires an inquiry of the IP address to transmit the IP address of the selected CDN server to the vehicle-side system 3.

The DNS setting section 7*e* may acquire information about the DNS server 12 or store setting information in the previous DNS server 12, and transmit an update request of the IP address to the DNS server 12 when the CDN server registered in the DNS server 12 is different from the CDN server selected by the CDN vendor selection section 7*a*. When acquiring the selection notification from the CDN vendor selection section 7*a*, the campaign notification generation section 7*c* generates a campaign notification including a fixed URL.

According to such a configuration, in addition to obtaining the operational effect same as those of the nineteenth embodiment, the URL information about the CDN included in the campaign notification can be constantly the same, and security can be enhanced.

(Second Modification of Nineteenth Embodiment)

The second modification of the nineteenth embodiment will be described with reference to FIGS. 196 to 201. Even when the CDN vendor that minimizes the distribution cost of the update package is selected, there is a possibility that the communication speed is reduced due to maintenance, trouble, access concentration, and the like of the CDN server. The inventors of the present application have focused on selecting a CDN vendor based on the distribution cost and the distribution performance.

In the second modification, when the vehicle-side system 3 inquires of the DNS server 12 to acquire the IP address corresponding to the URL indicated in the campaign notification, the DNS server 12 checks the distribution status of the CDN server, and informs the vehicle-side system 3 of the IP address of the CDN server with the second lowest distribution cost when it is determined that the distribution is impossible.

As illustrated in FIG. 196, in the OTA center 2, the distribution server 7 includes a performance measurement section 7f in addition to the CDN vendor management DB, the CDN vendor selection section 7a, the data storage section 7b, the campaign notification generation section 7c, the CDN distribution section 7d, and the DNS setting section 7e. The DNS server 12 includes a CDN server verification section 12a. In the storage area of the CDN distribution section 7d, a test file for measuring the performance of the CDN server is placed. The performance measurement section 7f transmits a distribution request of the test file to the CDN server, distributes the test file from the CDN server, and measures a time required for distributing the test file as a distribution time. The distribution time is, for example, a time from the time when the distribution of the test file is started to the time when the reception completion of the test file is identified.

As illustrated in FIG. 197, the CDN vendor management DB includes a CDN server selection table. The selection table includes the cost rank determined by the CDN vendor selection section 7a and the distribution flag determined by the performance measurement section 7f.

The performance measurement section 7f calculates a response speed from the time required to distribute the test file for each CDN server, and inputs a determination result based on the calculated response speed to the selection table. When the response speed is equal to or greater than the specified value, the performance measurement section 7f sets the distribution flag of the CDN server to ON (TRUE), and when the response speed is less than the specified value, the performance measurement section 7f sets the distribution flag of the CDN server to OFF (FALSE).

When acquiring the inquiry about the IP address corresponding to the URL from the vehicle-side system 3, the CDN server verification section 12a determines whether the CDN server designated by the URL is in a distributable state, and when determining that the CDN server is not in a distributable state, informs the IP address of another CDN server.

Next, the operation of the above-described configuration will be described with reference to FIGS. 198 to 201.

(19-4) Process by CDN Vendor Selection Section 7a (See FIGS. 198 to 199)

In the first CDN selection process, when the charge amount is calculated for each CDN vendor (A1921 to A1929), the CDN vendor selection section 7a determines the cost rank of the CDN vendor (A1951). That is, the CDN vendor selection section 7a determines the rank of the CDN vendor with the lowest distribution cost as the first rank, and determines the rank of the CDN vendor with the second lowest distribution cost as the second rank. When storing the selection result in the data storage section 7b (A1914), the CDN vendor selection section 7a stores the cost rank in the selection table of the CDN vendor management DB (A1941).

(19-5) Process by Performance Measurement Section 7f (See FIG. 200)

The performance measurement section 7f repeats the subsequent process for each CDN vendor (A1961 to A1966). The performance measurement section 7f executes the subsequent process at regular intervals or at an any timing by the administrator of the distribution server 7 while the distribution server 7 is activated.

The performance measurement section 7f accesses the CDN server (A1962) to transmit a test file distribution request to the CDN server. The performance measurement section 7f calculates a response speed based on the time required to distribute the test file, and determines whether the calculated response speed is equal to or greater than a specified value (A1963). The time required for distribution may be compared with the specified value without calculating the response speed, or the distribution data size per unit time may be compared with the specified value.

When determining that the response speed is equal to or greater than the specified value (A1963: YES), the performance measurement section 7f determines that the CDN server is a server available for distribution, and sets the distribution flag to ON (A1964). When determining that the calculated response speed is less than the specified value (A1963: NO), the performance measurement section 7f determines that the CDN server is a server unavailable for distribution, and sets the distribution flag to OFF (A1965).

(19-6) Process by CDN Server Verification Section 12a (See FIG. 201)

The campaign notification indicates the URL to access for downloading the update data. The vehicle-side system 3 inquires of the DNS server 12 about an IP address to be accessed for downloading the update package.

The CDN server verification section 12a acquires an IP address inquiry about the URL indicated in the campaign notification from vehicle-side system 3 (A1971). The CDN server verification section 12a inquiries of the CDN vendor management DB of the distribution server 7 about the distribution status of the CDN server indicated by the campaign notification (A1972). In this case, the CDN server corresponds to the CDN vendor whose data is to be acquired, and the distribution status corresponds to the distribution flag. When acquiring the distribution flag of the CDN vendor whose data is to be acquired from the distribution server, the CDN server verification section 12a determines whether the CDN vendor whose data is to be acquired is available (A1973). That is, the CDN server verification section 12a determines whether the acquired distribution flag is ON or OFF.

When determining that the distribution flag is ON (A1973: YES), the CDN server verification section 12a informs the vehicle-side system 3 of the IP address corresponding to the CDN vendor, or transfers the connection with the vehicle-side system 3 to the IP address, and switches to the CDN vendor corresponding to the URL of the campaign notification (A1974). When determining that the distribution flag is OFF (A1973: NO), the CDN server verification section 12a sets the CDN vendor with the next highest cost rank as the CDN vendor with the second priority and sets the CDN vendor with the second priority as the CDN vendor whose data is to be acquired (A1975), and returns the process to step A1973.

According to such a configuration, it is possible to select a normally operating CDN server while suppressing the distribution cost as much as possible. The CDN server verification section 12a may request transmission of the selection table by accessing the CDN vendor management DB every time a certain period elapses. In this case, when the inquiry about the IP address is acquired from the vehicle-side system 3, it may be determined whether the CDN vendor whose data is to be acquired is available by referring to the selection table held by the CDN server verification section 12a instead of accessing the CDN vendor management DB. In addition, it is possible to reduce communication between the DNS server 12 and the distribution server 7 in addition to selecting a normally operating CDN server while suppressing the distribution cost as much as possible.

(Third Modification of Nineteenth Embodiment)

The third modification of the nineteenth embodiment will be described with reference to FIGS. 202 to 205. In the third modification, in the distribution server 7, the performance measurement section 7f measures and evaluates the performance of the CDN server based on the log information from the vehicle-side system 3. The operation when the DNS server 12 acquires an inquiry of an IP address for a URL from the vehicle-side system 3 is similar to that of the second modification. Also in the third modification, as in the second modification, the CDN vendor management DB includes a selection table.

The vehicle-side system 3 includes a log transmission section 3a. When completing the download of the update data from the CDN server, the log transmission section 3a transmits log information related to the download including a download time indicating a time required for the download to the performance measurement section 7f of the distribution server 7. The log information related to download may include information such as identification information about a downloaded package, a data size, and a maximum throughput during download, in addition to the download time.

Upon receiving the log information related to download from the log transmission section 3a, the performance measurement section 7f calculates a throughput from the download time and inputs a determination result based on the calculated throughput to the selection table. The performance measurement section 7f sets the distribution flag of the CDN server to ON (TRUE) when the throughput is equal to or greater than the specified value, and sets the distribution flag of the CDN server to OFF (FALSE) when the throughput is less than the specified value.

Next, the operation of the above-described configuration will be described with reference to FIGS. 203 to 205.

(19-8) Process by Log Transmission Section 3a (See FIG. 203)

When completing the download of the update package from the CDN server (A1981), the log transmission section 3a transmits log information related to the download including a download time indicating a time required for the download to the distribution server 7 (A1982).

(19-9) Process by Performance Determination Section 7f (See FIG. 204)

When receiving the log information related to download from the log transmission section 3a (A1991), a performance determination section 7f calculates a throughput from the download time (A1992), and determines whether the calculated throughput is equal to or greater than a specified value (A1993).

When determining that the calculated throughput is equal to or greater than the specified value (A1993: YES), the performance measurement section 7f determines that the CDN server is a server available for distribution and sets a distribution flag to ON (A1994). When determining that the calculated throughput is less than the specified value (A1993: NO), the performance measurement section 7f determines that the CDN server is a server unavailable for distribution, and sets the distribution flag to OFF (A1995).

(19-10) Process by Performance Determination Section 7f (See FIG. 205)

The performance determination section 7f periodically performs a return process of the CDN server in which the distribution flag is turned OFF. The performance measurement section 7f notifies the CDN vendor management DB of the information request of the CDN server in which the distribution flag is set to OFF, identifies the CDN server in which the distribution flag is set to OFF (A19101), and repeats the subsequent process for each CDN vendor (A19102 to A19107). The performance measurement section 7f executes the subsequent process at regular intervals or at an any timing by the administrator of the distribution server 7 while the distribution server 7 is activated.

The performance measurement section 7f notifies the CDN server of distribution for requesting the test file, calculates the throughput from the download time of the file distributed from the CDN server (A19103), and determines whether the calculated throughput is equal to or greater than a specified value (A19104).

When determining that the calculated throughput is equal to or greater than the specified value (A19104: YES), the performance measurement section 7f changes the distribution flag from OFF to ON (A19105). When determining that the calculated throughput is less than the specified value (A19104: NO), the performance measurement section 7f keeps the distribution flag OFF (A19106). The performance measurement section 7f may set the distribution flag set to OFF in the CDN vendor management DB to ON when the distribution server is activated or every predetermined period.

According to such a configuration, unlike the second modification in which the distribution request of the test file is transmitted to the CDN server in order to identify the response of the CDN server, it is not necessary to transmit the distribution request of the test file to the CDN server, and it is possible to suppress the load and cost on the communication network. When determining that the throughput is less than the specified value by providing the function of measuring the download speed of the update package in the vehicle-side system 3, the connection may be changed to another CDN server.

The campaign notification distributed from the distribution server 7 may include, in addition to the URL of the CDN server to be connected first, the URL of a spare CDN server to be connected when the throughput of the CDN server is low. The spare CDN server is, for example, a CDN server with the second lowest distribution cost or a spare CDN server determined in advance. When a plurality of CDN servers is designated as spare CDN servers, information indicating a connection order may be added.

When the download of the update package is started, the vehicle-side system 3 measures the throughput and checks whether the throughput equal to or greater than the specified value is obtained. When determining that the throughput equal to or greater than the specified value is not obtained, the vehicle and the both-side system 3 inquires the DNS server 12 about the IP address of the URL of the spare CDN server indicated in the campaign notification, and changes the connection from the original CDN server to the new CDN server. Since the identification information is added to the distributed data for each packet, even when the CDN server is changed in the middle of downloading the update package, the update package can be continuously downloaded.

(Fourth Modification of Nineteenth Embodiment)

The fourth modification of the nineteenth embodiment will be described with reference to FIGS. 206 to 207. In the fourth modification, the CDN vendor selection section 7a selects a plurality of CDN vendors, and the campaign notification generation section 7c generates a plurality of campaign notifications for each CDN vendor. When the campaign notification is distributed to the vehicle-side system 3, a different CDN server is designated using a round robin method.

(19-11) Process by Campaign Notification Generation Section 7c (See FIG. 206)

When acquiring CDN vendor information (A195), the campaign notification generation section 7c generates a campaign notification for each CDN vendor (A19111). That is, the campaign notification generation section 7c generates two or more campaign notifications for one campaign. The campaign notification generation section 7c distributes a campaign notification so as to change the CDN server in a round robin manner (A19112). For example, in a case where two CDN servers of a CDN 11 and a CDN 12 are selected, the campaign notification generation section 7c distributes a campaign notification including the URL of the CDN 11 to the first vehicle, distributes a campaign notification including the URL of the CDN 12 to the next vehicle, and distributes a campaign notification including the URL of the CDN 11 to the further next vehicle when distributing the campaign notification.

(19-12) Process by CDN Vendor Selection Section 7a (See FIG. 207)

In the nineteenth embodiment, the CDN vendor selection section 7a selects the CDN vendor with the lowest distribution cost, but in the fourth modification, a plurality of CDN vendors are selected in ascending order of distribution cost (A19121).

According to such a configuration, it is possible to prevent access from concentrating on a specific CDN server while suppressing distribution cost from the CDN server, and it is possible to prevent a decrease in throughput by preventing access concentration.

(Fifth Modification of Nineteenth Embodiment)

The fifth modification of the nineteenth embodiment will be described with reference to FIGS. 208 to 211. In the fourth modification, a plurality of CDN vendors whose distribution cost is suppressed is selected, a plurality of campaign notifications having different CDN server information is generated, and the campaign notification is distributed to vehicle-side system 3 such that the CDN server is changed in a round robin manner. On the other hand, in the fifth modification, a plurality of CDN vendors whose distribution cost is suppressed is selected, one campaign notification is generated, and the generated campaign notification is distributed to vehicle-side system 3. When the DNS server 12 acquires the inquiry of the IP address corresponding to the URL indicated in the campaign notification from the vehicle-side system 3, the CDN server that replies to the vehicle-side system 3 is changed for each vehicle-side system 3. In other words, in the DNS server 12, the CDN server is selected in the round robin manner.

As illustrated in FIG. 208, the DNS server 12 includes a switching section 12b. When acquiring an inquiry of the IP address from the vehicle-side system 3, the switching section 12b sequentially changes the IP address to be answered to the vehicle-side system 3 in the round robin method. The distribution server includes the DNS setting section 7e. The DNS setting section 7e of the fifth modification transmits the round robin record illustrated in FIG. 209 to the DNS server 12.

(19-13) Process by CDN Vendor Selection Section 7a (See FIG. 210)

As in the fourth modification, the CDN vendor selection section 7a selects a plurality of CDN vendors in ascending order of distribution cost (A19121), and sets a round robin record (A19131).

(19-14) Process by Switching Section 12b (See FIG. 211)

When acquiring the inquiry of the IP address from the vehicle-side system 3 (A19141), the DNS server 12 refers to the round robin record (A19142) to transmit the IP address corresponding to the described CDN server to the vehicle-side system 3 (A19143). The DNS server 12 repeats the above-described process every time the inquiry of the IP address is acquired from the vehicle-side system 3, and when the inquiry of the IP address is acquired from another vehicle-side system 3, the DNS server 12 refers to the round robin record to transmit an IP address corresponding to a CDN server different from that in the previous time to the vehicle-side system 3. That is, the DNS server 12 sequentially transmits the IP addresses of the CDN servers to the vehicle-side system 3 according to the round robin method.

According to such a configuration, it is possible to prevent access from concentrating on a specific CDN server while suppressing distribution cost from the CDN server, and it is possible to prevent a decrease in throughput by preventing access concentration.

Twentieth Embodiment

The twentieth embodiment will be described with reference to FIGS. 212 to 224.

In the twentieth embodiment, in a case where information about a plurality of campaigns in a predetermined period can be acquired, a plurality of CDN vendors is dynamically selected as placement destinations of an update package to the CDN 8 according to a distribution method, an OTA target area which is a distribution area, and a distribution data size to suppress a distribution cost. The predetermined period is, for example, the following month.

In the above-described the nineteenth embodiment, the CDN vendor with the lowest distribution cost for one campaign is selected. However, it is also conceivable that a campaign is registered from the OEM server for a plurality of campaigns scheduled to be distributed for a predetermined period of time, for example, the following month. As described above, in a case where information about the data size of each campaign, the number of distribution target vehicles, the OTA target area, and the distribution method is acquired in advance for a plurality of campaigns, there is a possibility that a CDN vendor different from that in the case where a CDN vendor is selected for each campaign as in the nineteenth embodiment will be the CDN vendor with the lowest distribution cost.

As illustrated in FIG. 212, the OTA center 2 includes the CDN vendor management DB, the CDN vendor selection section 7a, the data storage section 7b, the campaign notification generation section 7c, the CDN distribution section 7d, and a progress information management section 7g. The progress information management section 7g holds a prediction value indicating how much the campaign is distributed to the vehicle-side system 3 within a predetermined period. Even when the campaign is registered in the OTA center 2 and the campaign notification is distributed to the vehicle-side system 3, not all vehicles immediately apply the campaign and download the update package from the CDN server. The progress information management section 7g stores the prediction value in order to more accurately predict the distribution data size of the update package from the CDN server to the vehicle-side system 3. In the present embodiment, the predetermined period will be described as one month, but other periods may be used.

A calculation method in the twentieth embodiment will be described with reference to FIG. 213. In the twentieth embodiment, the charge amount of the CDN vendor is calculated by three calculation methods as described later. In the first calculation method, a CDN vendor with the lowest distribution cost in each campaign is selected. In this case, different CDN vendors may be selected for each campaign. FIG. 213 illustrates a case where a CDN 1 is selected for a campaign 1, a CDN 2 is selected for a campaign 2, and a CDN 3 is selected for a campaign 3.

In the second calculation method, the distribution total data size of all the campaigns is calculated, and the CDN vendor with the lowest distribution cost is selected based on the calculated distribution total data size of all the campaigns. In this case, the same CDN vendor is selected in all campaigns. FIG. 213 illustrates a case where the CDN 1 is selected for campaigns 1 to 3. In the third calculation method, the distribution total data size of the campaign for each distribution method is calculated, and the CDN vendor with the lowest distribution cost is selected based on the calculated distribution total data size of the campaign for each distribution method. For each distribution method, a CDN vendor is selected for each of the streaming method and the storage method. FIG. 213 illustrates a case where a distribution method is different between the campaign 1 and the campaigns 2 and 3, the CDN 1 is selected for the campaign 1, and the CDN 2 is selected for the campaigns 2 and 3.

Next, the operation of the above-described configuration will be described with reference to FIGS. 214 to 224.

(20-1) Process by Campaign Notification Generation Section 7c (See FIG. 214)

The campaign notification generation section 7c acquires campaign information scheduled to be distributed from the outside such as an OEM server from the OEM server (A201). The campaign information scheduled to be distributed includes information about a distribution start date, a data size of a target campaign, the number of distribution target vehicles of the target campaign, a region, and a distribution method. The campaign notification generation section 7c stores the acquired campaign information in the data storage section 7b (A202).

The campaign notification generation section 7c notifies the CDN vendor selection section 7a of the CDN vendor selection request (A203), and waits for acquisition of the selection notification from the CDN vendor selection section 7a. When acquiring the selection notification from the CDN vendor selection section 7a (A204), the campaign notification generation section 7c accesses the data storage section 7b and acquires the identification information about the CDN vendor selected by the CDN vendor selection section 7a (A205).

Based on the identification information about the CDN vendor, the campaign notification generation section 7c generates a parameter file including the URL of the selected CDN as a campaign notification scheduled to be distributed (A206). The campaign notification generation section 7c distributes the generated campaign notification scheduled to be distributed to the vehicle-side system 3 (A207).

(20-2) Process by CDN Vendor Selection Section 7a (See FIGS. 215 to 221)

When the CDN vendor selection section 7a acquires the CDN vendor selection request notified from the campaign notification generation section 7 (A2011), the CDN vendor selection section 7a accesses the data storage section 7b to acquire selection information (A2012). In this case, the selection information includes information about the data sizes of all the target campaigns scheduled to be distributed, the number of distribution target vehicles, the region, the distribution method, and the distribution start date of each campaign.

The CDN vendor selection section 7a acquires the distribution prediction value from the progress information management section 7g (A2013). The CDN vendor selection section 7a calculates the distribution data size for each campaign (A2014). Specifically, the CDN vendor selection section 7a multiplies the data size of the campaign, the number of distribution target vehicles of the campaign, and the distribution prediction value, and further multiplies a correction value corresponding to the distribution period. Depending on the campaign, there is a case where the distribution period is short such as a case where the distribution start date is set to the end of next month, and thus, adjustment is performed with a correction value corresponding to the distribution period. For example, as a result of delaying the distribution start date, in a case where the distribution period is only 10 days, 10 days out of 30 days are the distributable period, and thus, 0.3 or the like is set as the correction value.

The CDN vendor selection section 7a advances the process to the second CDN selection process (A2015). When the second CDN selection process is started, the CDN vendor selection section 7a sequentially transitions to a charge amount calculation process by the first calculation method, a charge amount calculation process by the second calculation method, and a charge amount calculation process by the third calculation method (A2021 to A2023).

In the charge amount calculation process by the first calculation method, the CDN vendor selection section 7a selects a CDN vendor with the lowest distribution cost for each campaign. When starting the charge amount calculation process by the first calculation method, the CDN vendor selection section 7a repeats the subsequent process for each campaign (A2031 to A2041) and further repeats the process for each CDN vendor (A2032 to A2039). The CDN vendor selection section 7a acquires the fee information from the CDN vendor management DB based on the distribution data size and the region information (A2033). The CDN vendor selection section 7a refers to the fee information based on the distribution data size and calculates a distribution charge amount (A2034).

As in the nineteenth embodiment, the CDN vendor selection section 7a determines whether the CDN vendor to be examined is a CDN vendor that charges according to the number of requests, and determines the charge amount of the CDN vendor (A2035 to A2038). The CDN vendor selection section 7a repeats the calculation of the distribution charge amount for each CDN vendor and each campaign. When the charge amounts of all the CDN vendors are calculated for one campaign, the CDN vendor selection section 7a selects the CDN vendor with the lowest distribution cost for the campaign (A2040).

Upon completion of the calculation of the distribution charge amount and the selection of the CDN vendor for all the campaigns, the CDN vendor selection section 7a sums up the distribution charge amounts of all the campaigns and calculates the total amount (A2042), and terminates the process of calculating the charge amount by the first calculation method and proceeds to the process of calculating the charge amount by the second calculation method.

In the charge amount calculation process by the second calculation method, the CDN vendor selection section 7a selects one CDN vendor based on the total distribution data size of all the campaigns scheduled to be distributed. When starting the charge amount calculation process by the second calculation method, the CDN vendor selection section 7a sums up the distribution data sizes of the respective campaigns, calculates the total distribution data size (A2051), and repeats the subsequent process for each CDN vendor (A2052 to A2059). The CDN vendor selection section 7a acquires the fee information from the CDN vendor management DB based on the total distribution data size and the region information (A2053). The CDN vendor selection section 7a refers to the fee information based on the total distribution data size and calculates a distribution charge amount (A2054).

As in the nineteenth embodiment, the CDN vendor selection section 7a determines whether the CDN vendor to be examined is a CDN vendor that charges according to the number of requests, and determines the charge amount of the CDN vendor (A2055 to A2058). The CDN vendor selection section 7a repeats the calculation of the distribution charge amount for each CDN vendor. The CDN vendor selection section 7a selects a CDN vendor with the lowest distribution cost (A2060). The distribution charge amounts of all the campaigns scheduled to be distributed are summed to calculate the total amount (A2061), the charge amount calculation process by the second calculation method is terminated, and the process proceeds to the charge amount calculation process by the third calculation method.

In the charge amount calculation process by the third calculation method, the CDN vendor selection section 7a selects a CDN vendor after collecting campaigns for each distribution method. When starting the charge amount calculation process by the third calculation method, the CDN vendor selection section 7a determines whether all the distribution methods of the campaign scheduled to be distributed are the same (A2071). When determining that all the distribution methods of the campaigns scheduled to be distributed are the same, that is, all the campaigns scheduled to be distributed are the streaming method or all the campaigns are the storage method (A2071: YES), the CDN vendor selection section 7a terminates the charge amount calculation process by the third calculation method since the charge amount calculation process is the same as the charge amount calculation process by the second calculation method described above.

When determining that all the distribution methods of the campaigns scheduled to be distributed are not the same, that is, the streaming method and the storage method are mixed as the campaigns scheduled to be distributed (A2071: NO), the CDN vendor selection section 7a groups the campaigns according to the distribution method (A2072), and shifts the process to the charge amount calculation process by the streaming method for the groups by the streaming method (A2073), and shifts the process to the charge amount calculation process by the storage method for the groups by the storage method (A2074).

When starting the charge amount calculation process by the streaming method, the CDN vendor selection section 7a calculates the total value of the distribution data sizes of the respective campaigns distributed by the streaming method (A2081), and repeats the subsequent process for each CDN vendor (A2082 to A2089). The CDN vendor selection section 7a acquires the fee information from the CDN vendor management DB based on the total value of the distribution data sizes and the region information (A2083). The CDN vendor selection section 7a refers to the fee information based on the total value of the distribution data sizes, and calculates the distribution charge amount (A2084).

As in the nineteenth embodiment, the CDN vendor selection section 7a determines whether the CDN vendor to be examined is a CDN vendor that charges according to the number of requests, and determines the charge amount of the CDN vendor (A2085 to A2088). The CDN vendor selection section 7a repeats the calculation of the distribution charge amount for each CDN vendor. The CDN vendor selection section 7a selects the CDN vendor with the lowest distribution cost in the streaming method (A2090), and terminates the charge amount calculation process in the streaming method.

On the other hand, when starting the charge amount calculation process by the storage method, the CDN vendor selection section 7a calculates the total value of the distribution data sizes of the respective campaigns distributed by the storage method (A2091), and repeats the subsequent process for each CDN vendor (A2092 to A2099). The CDN vendor selection section 7a acquires the fee information from the CDN vendor management DB based on the total value of the distribution data sizes and the region information (A2093). The CDN vendor selection section 7a refers to the fee information based on the total value of the distribution data sizes, and calculates the distribution charge amount (A2094).

As in the nineteenth embodiment, the CDN vendor selection section 7a determines whether the CDN vendor to be examined is a CDN vendor that charges according to the number of requests, and determines the charge amount of the CDN vendor (A2095 to A2098). The CDN vendor selection section 7a repeats the calculation of the distribution charge amount for each CDN vendor. The CDN vendor selection section 7a selects the CDN vendor with the lowest distribution cost in the storage method (A20100), and terminates the charge amount calculation process in the storage method.

Upon completion of the charge amount calculation process by the first calculation method, the charge amount calculation process by the second calculation method, and the charge amount calculation process by the third calculation method, the CDN vendor selection section 7a determines a calculation method that minimizes the distribution cost (A2024), selects a CDN vendor of each campaign (A2025), and terminates the second CDN selection process. Upon completion of the second CDN selection process, the CDN vendor selection section 7a stores the selection result, that is, the identification information for identifying the selected CDN vendor, in the data storage section 7b (A2016). Here, the CDN vendor selection section 7a stores identification information for identifying the CDN vendor of the campaign scheduled to be distributed in the data storage section 7b. The CDN vendor selection section 7a notifies the campaign notification generation section 7c of the selection notification (A2017).

(20-3) Process by Progress Information Management Section 7g (See FIG. 222)

The progress information management section 7g stores a prediction value indicating how many campaigns are distributed to the vehicle-side system 3 in a predetermined period. It is assumed that this prediction value is updated according to the actual distribution status transmitted from the OEM server.

The progress information management section 7g acquires the distribution status from the OEM server (A20111). The progress information management section 7g determines whether the difference between the distribution status and the stored prediction value is equal to or greater than a predetermined value (A20112). When determining that the difference between the distribution status and the stored prediction value is less than the predetermined value (A20112: NO), the progress information management section 7g terminates the process.

When determining that the difference between the distribution status and the stored prediction value is equal to or greater than the predetermined value (A20112: YES), the progress information management section 7g updates the stored prediction value (A20113) and notifies the CDN vendor selection section 7a of the update of the prediction value (A20114). The progress information management section 7g may have one prediction value common to all campaigns, or may have different prediction values for respective campaigns, respective vehicles to be updated, and respective types of campaign.

(20-4) Process by CDN Vendor Selection Section 7a (See FIG. 223)

When acquiring the update of the prediction value notified from the progress information management section 7g (A20121), the CDN vendor selection section 7a acquires the selection information (A20122), acquires the distribution prediction value from the progress information management section 7g (A20123), and calculates the distribution data size for each campaign (A20124). In this case, when calculating the distribution data size, the CDN vendor selection section 7a sets the correction value in consideration of the number of distribution days.

The CDN vendor selection section 7a advances the process to the second CDN selection process (A20125), and when terminating the second CDN selection process, the CDN vendor selection section 7a determines whether there is a change in the CDN vendor (A20126). When determining that there is no change in the CDN vendor (A20126: NO), the CDN vendor selection section 7a terminates the process. When there is a change in the CDN vendor, the selection result in the data storage section 7b is updated. When determining that there is a change in the CDN vendor (A20126: YES), the CDN vendor selection section 7a updates the selection result (A20127) to transmit a CDN change notification to the campaign notification generation section 7c (A20128). The CDN vendor selection section 7a may check at predetermined intervals whether the prediction value stored in the progress information management section 7g has been changed.

(20-5) Process by Campaign Notification Generation Section 7c (See FIG. 224)

When acquiring the CDN change notification notified from the CDN vendor selection section 7a (A20131), the campaign notification generation section 7c accesses the data storage section 7b, acquires updated CDN vendor information (A20132), and regenerates the campaign notification scheduled to be distributed based on the acquired updated CDN vendor information (A20133).

As described above, according to the twentieth embodiment, the following operational effects can be obtained.

By referring to the CDN vendor management database, the CDN 8 having the superior distribution cost is selected from a plurality of CDNs 8 having different distribution costs according to the distribution method, the OTA target area, and the distribution data size, and the update package is placed in the selected CDN 8. It is possible to appropriately suppress the distribution cost when the OTA master 4 downloads the update package from the OTA center 2.

Other Embodiments

In the above embodiment, the embodiment not specified as the streaming method or the storage method can be applied to both the streaming method and the storage method.

In some embodiments described above, it is described that the campaign notification is transmitted from the OTA center 2 to the OTA master 4 after the TLS communication is established. However, in all the embodiments, the campaign notification may be transmitted from the OTA center 2 to the OTA master 4 after the TLS communication is established. By establishing TLS communication, security can be further enhanced. Alternatively, the campaign notification may be transmitted from the OTA center 2 to the OTA master 4 without establishing TLS communication.

The vehicle-side system 3 of the present embodiment may have the following configuration. The vehicle-side system 3 may include a data communication module (DCM) and a central gateway (CGW), and the DCM and the CGW may be data communicably connected via a bus. The CGW is also referred to as a central ECU. The bus may be, for example, an Ethernet, a CAN (registered trademark) bus, or the like.

Some or all of the functions of the OTA master 4 may be implemented in the CGW. As an example, the DCM may perform data communication with the outside such as the CDN 8 and the OTA center 2, and all the functions of the OTA master 4 may be implemented in the CGW. In this case, the DCM transfers all the data received by the wireless communication with the outside to the CGW. Alternatively, the DCM may function as a downloader of the OTA master 4 in addition to performing data communication with the outside. The functions of the downloader are, for example, generation of vehicle configuration information, metadata verification, package verification, and verification of campaign information. Alternatively, the function of the OTA master 4 may be implemented in the DCM. In this case, functions other than the OTA master 4 are implemented in CGW. Alternatively, the DCM and the CGW may be integrated.

The CGW may have some or all of the functions of the DCM, or the DCM may have some or all of the functions of the CGW. That is, in the OTA master 4, the function sharing between the DCM and the CGW may be configured in any manner. The OTA master 4 may include two ECUs of the DCM and the CGW, or may include one integrated ECU having a function of the DCM and a function of the CGW.

Although the present disclosure is described in accordance with the embodiments, it is understood that the present disclosure is not limited to the embodiments and structures. The present disclosure also includes various modification examples and modifications within an equivalent range. In addition, various combinations and modes, and further, other combinations and modes including only one element, more elements, or less elements are also within the scope and idea of the present disclosure.

Means and functions provided by each device or the like can be provided by software recorded in a substantial memory device and a computer that executes the software, only software, only hardware, or a combination thereof. For example, when the control section is provided by an electronic circuit that is hardware, the control section can be provided by a digital circuit including a large number of logic circuits or an analog circuit.

The control section and the method thereof described in the present disclosure may be realized by a dedicated computer provided by configuring a processor programmed to execute one or a plurality of functions embodied by a computer program and a memory. Alternatively, the control section and the method thereof described in the present disclosure may be realized by a dedicated computer provided by configuring a processor by one or more dedicated hardware logic circuits. Alternatively, the control section and the method thereof described in the present disclosure may be realized by one or more dedicated computers configured by a combination of a processor programmed to execute one or more functions and a memory and a processor configured by one or more hardware logic circuits. Furthermore, the computer program may be stored in a computer-readable non-transition tangible recording medium as an instruction executed by a computer.

What is claimed is:

1. A data communication system comprising:
a center device that distributes update data to a master device; and
a master device that installs the update data downloaded from the center device in an electronic control unit to be reprogrammed,
wherein
the center device generates a common key for encrypting the update data; encrypts the update data with the common key in a counter (CTR) mode; encrypts the common key with an RSA public key; stores the common key encrypted with the RSA public key in a campaign notification; places the update data encrypted with the common key in a content delivery network (CDN); and transmits the campaign notification in which the encrypted common key is stored to a vehicle-side system to be reprogrammed,
the master device acquires the common key from the campaign notification acquired from the center device; decrypts the encrypted common key with an RSA secret key to extract the common key; downloads and acquires encrypted update data from the CDN; encrypts a counter value by executing an AES block encryption process on the counter value with an AES key in parallel with downloading and acquiring of the encrypted update data from the CDN; performs an exclusive OR operation on the encrypted counter value and the encrypted update data downloaded from the CDN to decrypt the encrypted counter value and the encrypted update data; and transfers the decrypted update data to the electronic control unit to be reprogrammed, and installs the update data in the electronic control unit,
the master device starts preparation for a decryption process on the update data in a background separately from downloading the update data from the center device.

2. The data communication system according to claim 1, wherein
the master device executes a decryption process on the update data in parallel.

3. The data communication system according to claim 1, wherein
the center device and the master device include a nonce in a counter.

4. The data communication system according to claim 1, wherein
the master device starts preparation for the decryption process on the update data in the background at a timing when a campaign notification transmitted from the center device is received.

5. The data communication system according to claim 1, wherein
the master device starts preparation for the decryption process on the update data in the background before download acceptance from a user is obtained.

6. The data communication system according to claim 1, wherein
the master device calculates all key streams as preparation for the decryption process on the update data.

7. The data communication system according to claim 1, wherein
the master device calculates some key streams as preparation for the decryption process on the update data.

8. The data communication system according to claim 1, wherein
the center device uses a key individualized for a specific vehicle group as an encryption key.

9. The data communication system according to claim 1, wherein
the center device and the master device use a cipher block chaining (CBC) mode as a message authentication code (MAC).

10. The data communication system according to claim 1, wherein
the center device and the master device use a Galois message authentication code (GMAC) mode as a message authentication code (MAC).

11. The data communication system according to claim 9, wherein
the center device and the master device mutually recognize a data size unit to which the message authentication code is assigned.

12. The data communication system according to claim 1, wherein
the center device includes an encryption method in at least one of reprogramming policy metadata and download metadata to transmit the encryption method to the master device.

13. A data communication system comprising:
a center device that distributes update data to a master device; and
a master device that installs the update data downloaded from the center device in an electronic control unit to be reprogrammed,
wherein
the center device generates a common key for encrypting update data; encrypts the update data with the common key in an output feedback (OFB) mode; encrypts the common key with an RSA public key; stores the common key encrypted with the RSA public key in a campaign notification; places the update data encrypted with the common key in a content delivery network (CDN); and transmits the campaign notification in which the encrypted common key is stored to a vehicle-side system to be reprogrammed, the master device acquires the common key from the campaign notification acquired from the center device; decrypts the encrypted common key with an RSA secret key to extract the common key; downloads and acquires encrypted update data from the CDN; encrypts an initialization vector (IV) value by executing an IV value-based common stream encryption process with an AES key in parallel with downloading and acquiring of the encrypted update data from the CDN; performs an exclusive OR operation on the encrypted IV value and the encrypted update data downloaded from the CDN to decrypt the encrypted IV value and the encrypted update data; and transfers the decrypted update data to the electronic control unit to be reprogrammed, and installs the update data in the electronic control unit, the master device starts preparation for a decryption process on the update data in a background separately from downloading the update data from the center device.

14. A center device that distributes update data to a master device, the center device comprising:
  a common key generation section that generates a common key for encrypting update data;
  an update data encryption section that encrypts the update data with the common key in a counter (CTR) mode;
  a common key encryption section that encrypts the common key with an RSA public key;
  a common key storage section that stores the common key encrypted with the RSA public key in a campaign notification;
  an encrypted data placement section that places the update data encrypted with the common key in a content delivery network (CDN); and
  a campaign notification transmission section that transmits a campaign notification in which the encrypted common key is stored to a vehicle-side system to be reprogrammed;
  wherein
  the center device and the master device hold a key update key for key updating a secret key, and
  the center device generates a secret key update package using the key update key to transmit the generated secret key update package to the master device.

15. A center device that distributes update data to a master device, the center device comprising:
  a common key generation section that generates a common key for encrypting update data;
  an update data encryption section that encrypts the update data with the common key in an output feedback (OFB) mode;
  a common key encryption section that encrypts the common key with an RSA public key;
  a common key storage section that stores the common key encrypted with the RSA public key in a campaign notification;
  an encrypted data placement section that places the update data encrypted with the common key in a content delivery network (CDN); and
  a campaign notification transmission section that transmits a campaign notification in which the encrypted common key is stored to a vehicle-side system to be reprogrammed;

wherein
  the center device and the master device hold a key update key for key updating a secret key, and
  the center device generates a secret key update package using the key update key to transmit the generated secret key update package to the master device.

16. A master device that installs update data downloaded from a center device in an electronic control unit to be reprogrammed, the master device comprising:
  a common key acquisition section that acquires an encrypted common key from a campaign notification acquired from a center device;
  a common key decryption section that decrypts the encrypted common key with an RSA secret key to extract the common key;
  an encrypted data acquisition section that downloads and acquires encrypted update data from a content delivery network (CDN);
  a block encryption processing section that encrypts a counter value by executing an AES block encryption process on the counter value with an AES key in parallel with the encrypted data acquisition section downloading and acquiring the encrypted update data from the CDN;
  an encrypted data decryption section that performs an exclusive OR operation on the encrypted counter value and the encrypted update data downloaded from the CDN to decrypt the encrypted counter value and the encrypted update data; and
  an installation processing section that transfers the decrypted update data to the electronic control unit to be reprogrammed, and installs the update data in the electronic control unit;
  wherein the master device starts preparation for a decryption process on the update data in a background separately from downloading the update data from the center device.

17. A master device that installs update data downloaded from a center device in an electronic control unit to be reprogrammed, the master device comprising:
  a common key acquisition section that acquires an encrypted common key from a campaign notification acquired from a center device;
  a common key decryption section that decrypts the encrypted common key with an RSA secret key to extract the common key;
  an encrypted data acquisition section that downloads and acquires encrypted update data from a content delivery network (CDN);
  a block encryption processing section that encrypts an initialization vector (IV) value by executing an IV value-based common stream encryption process with an AES key in parallel with the encrypted data acquisition section downloading and acquiring the encrypted update data from the CDN;
  an encrypted data decryption section that performs an exclusive OR operation on the encrypted IV value and the encrypted update data downloaded from the CDN to decrypt the encrypted IV value and the encrypted update data; and
  an installation processing section that transfers the decrypted update data to the electronic control unit to be reprogrammed, and installs the update data in the electronic control unit;
  wherein the master device starts preparation for a decryption process on the update data in a background separately from downloading the update data from the center device.

18. A non-transitory computer readable storage medium storing an encryption program for causing a center device that distributes update data to a master device to execute:

a common key generation step of generating a common key for encrypting update data;

an update data encryption step of encrypting the update data with the common key in a counter (CTR) mode;

a common key encryption step of encrypting the common key with an RSA public key;

a common key storage step of storing the common key encrypted with the RSA public key in a campaign notification;

an encrypted data placement step of placing the update data encrypted with the common key in a content delivery network (CDN); and a campaign notification transmission step of transmitting a campaign notification in which the encrypted common key is stored to a vehicle-side system to be reprogrammed;

wherein the center device and the master device hold a key update key for key updating a secret key, and the center device generates a secret key update package using the key update key to transmit the generated secret key update package to the master device.

19. A non-transitory computer readable storage medium storing an encryption program for causing a center device that distributes update data to a master device to execute:

a common key generation step of generating a common key for encrypting update data;

an update data encryption step of encrypting the update data with the common key in an output feedback (OFB) mode;

a common key encryption step of encrypting the common key with an RSA public key;

a common key storage step of storing the common key encrypted with the RSA public key in a campaign notification;

an encrypted data placement step of placing the update data encrypted with the common key in a content delivery network (CDN); and a campaign notification transmission step of transmitting a campaign notification in which the encrypted common key is stored to a vehicle-side system to be reprogrammed;

wherein the center device and the master device hold a key update key for key updating a secret key, and the center device generates a secret key update package using the key update key to transmit the generated secret key update package to the master device.

20. A non-transitory computer readable storage medium storing a decryption program for causing a master device that installs update data downloaded from a center device in an electronic control unit to be reprogrammed to execute:

a common key acquisition step of acquiring an encrypted common key from a campaign notification acquired from a center device;

a common key decryption step of decrypting the encrypted common key with an RSA secret key to extract the common key;

an encrypted data acquisition step of downloading and acquires encrypted update data from a content delivery network (CDN);

a block encryption processing step of encrypting a counter value by executing an AES block encryption process on the counter value with an AES key in parallel with downloading and acquiring the encrypted update data from the CDN by the encrypted data acquisition step;

an encrypted data decryption step of performing an exclusive OR operation on the encrypted counter value and the encrypted update data downloaded from the CDN to decrypt the encrypted counter value and the encrypted update data; and an installation processing step of transferring the decrypted update data to the electronic control unit to be reprogrammed, and installs the update data in the electronic control unit;

wherein the master device starts preparation for a decryption process on the update data in a background separately from downloading the update data from the center device.

21. A non-transitory computer readable storage medium storing a decryption program for causing a master device that installs update data downloaded from a center device in an electronic control unit to be reprogrammed to execute:

a common key acquisition step of acquiring an encrypted common key from a campaign notification acquired from a center device;

a common key decryption step of decrypting the encrypted common key with an RSA secret key to extract the common key;

an encrypted data acquisition step of downloading and acquires encrypted update data from a content delivery network (CDN);

a block encryption processing step of encrypting an initialization vector (IV) value by executing an IV value-based common stream encryption process with an AES key in parallel with downloading and acquiring the encrypted update data from the CDN by the encrypted data acquisition step;

an encrypted data decryption step of performing an exclusive OR operation on the encrypted IV value and the encrypted update data downloaded from the CDN to decrypt the encrypted IV value and the encrypted update data; and an installation processing step of transferring the decrypted update data to the electronic control unit to be reprogrammed, and installs the update data in the electronic control unit;

wherein the master device starts preparation for a decryption process on the update data in a background separately from downloading the update data from the center device.

22. A data communication system comprising:

a center device that distributes update data to a master device; and a master device that installs the update data downloaded from the center device in an electronic control unit to be reprogrammed, wherein the center device generates a common key for encrypting the update data; encrypts the update data with the common key in a counter (CTR) mode; encrypts the common key with an RSA public key; stores the common key encrypted with the RSA public key in a campaign notification; places the update data encrypted with the common key in a content delivery network (CDN); and transmits the campaign notification in which the encrypted common key is stored to a vehicle-side system to be reprogrammed, the master device acquires the common key from the campaign notification acquired from the center device; decrypts the encrypted common key with an RSA secret key to extract the common key; downloads and acquires encrypted update data from the CDN; encrypts a counter value by executing an AES block encryption process on the counter value with an AES key in parallel with downloading and acquiring of the encrypted update data from the CDN; performs an exclusive OR operation on the encrypted counter value and the encrypted update data downloaded from the CDN to decrypt the encrypted counter value and the encrypted update data; and transfers the decrypted update data to the electronic control unit to be reprogrammed, and installs the update data in the electronic control unit, the center device and the master device hold a key update key for key updating a secret key, and the center device generates a secret key update package using the key update key to transmit the generated secret key update package to the master device.

23. A data communication system comprising:

a center device that distributes update data to a master device; and a master device that installs the update data downloaded from the center device in an electronic control unit to be reprogrammed, wherein the center device generates a common key for encrypting update data; encrypts the update data with the common key in an output feedback (OFB) mode; encrypts the common key with an RSA public key; stores the common key encrypted with the RSA public key in a campaign notification; places the update data encrypted with the common key in a content delivery network (CDN); and transmits the campaign notification in which the encrypted common key is stored to a vehicle-side system to be reprogrammed, the master device acquires the common key from the campaign notification acquired from the center device; decrypts the encrypted common key with an RSA secret key to extract the common key; downloads and acquires encrypted update data from the CDN; encrypts an initialization vector (IV) value by executing an IV value-based common stream encryption process with an AES key in parallel with downloading and acquiring of the encrypted update data from the CDN; performs an exclusive OR operation on the encrypted IV value and the encrypted update data downloaded from the CDN to decrypt the encrypted IV value and the encrypted update data; and transfers the decrypted update data to the electronic control unit to be reprogrammed, and installs the update data in the electronic control unit, the center device and the master device hold a key update key for key updating a secret key, and the center device generates a secret key update package using the key update key to transmit the generated secret key update package to the master device.

* * * * *